US005828575A

United States Patent [19]

Sakai

[11] Patent Number: 5,828,575

[45] Date of Patent: Oct. 27, 1998

[54] APPARATUS AND METHOD FOR MANAGING AND DISTRIBUTING DESIGN AND MANUFACTURING INFORMATION THROUGHOUT A SHEET METAL PRODUCTION FACILITY

[75] Inventor: Satoshi Sakai, Newport Coast, Calif.

[73] Assignee: Amadasoft America, Inc., Lamirada, Calif.

[21] Appl. No.: 688,860

[22] Filed: Jul. 31, 1996

Related U.S. Application Data

[60] Provisional application No. 60/016,958 May 6, 1996.

[51] Int. Cl.$^{6}$ ........................ G06F 19/00; G05B 19/4097

[52] U.S. Cl. ................................ 364/474.24; 364/474.07

[58] Field of Search ......................... 364/474.24, 474.05, 364/424.07, 472.01, 188, 189, 476.01; 395/964, 965, 966, 967; 72/389.1, 379.2

[56] References Cited

U.S. PATENT DOCUMENTS

| | | | |
|---|---|---|---|
| 4,912,644 | 3/1990 | Aoyama et al. | 364/472.01 |
| 5,005,394 | 4/1991 | Sartorio et al. | 364/474.07 X |
| 5,029,462 | 7/1991 | Wakahara et al. | 72/379.2 |
| 5,089,970 | 2/1992 | Lee et al. | 364/474.24 |
| 5,115,400 | 5/1992 | Watanabe et al. | 364/474.24 |
| 5,237,647 | 8/1993 | Roberts et al. | 364/974.24 |
| 5,276,606 | 1/1994 | Mizukami et al. | 364/474.22 |
| 5,297,054 | 3/1994 | Kienzle et al. | 364/474.24 |
| 5,307,282 | 4/1994 | Conradson et al. | 364/468.09 |
| 5,315,522 | 5/1994 | Kauffman et al. | 364/474.07 |
| 5,396,265 | 3/1995 | Ulrich et al. | 364/474.24 X |
| 5,429,682 | 7/1995 | Harlow, Jr. et al. | 118/681 |
| 5,434,791 | 7/1995 | Koko et al. | 364/468.03 |
| 5,453,933 | 9/1995 | Wright et al. | 364/474.23 |
| 5,485,390 | 1/1996 | LeClair et al. | 364/474.24 |
| 5,587,914 | 12/1996 | Conradson et al. | 364/468.01 |

FOREIGN PATENT DOCUMENTS

| | | |
|---|---|---|
| 0290809 | 11/1988 | European Pat. Off. . |
| 0397904 | 11/1990 | European Pat. Off. . |
| 0402475 | 12/1990 | European Pat. Off. . |
| 0419013 | 3/1991 | European Pat. Off. . |
| 0485766 | 5/1992 | European Pat. Off. . |
| 0664186 | 7/1995 | European Pat. Off. . |
| 1309727 | 12/1989 | Japan . |
| 1309728 | 12/1989 | Japan . |
| 2-15827 | 1/1990 | Japan . |
| 2-15828 | 1/1990 | Japan . |
| 5216525 | 8/1993 | Japan . |
| 7121418 | 12/1995 | Japan . |

OTHER PUBLICATIONS

*Computer Dictionary*—Microsoft Press, 1994—pp. 133 & 226.

"Method For Understanding Drawing Attributes For 3D Models", IBM Technical Disclosure Bulletin, vol. 37, No. 07, pp. 99–104, (Jul. 1994).

Tseng et al., Yuan–Jye, "Recognizing Multiple Interpretations Of Interacting Machining Features", Computer–Aided Design, vol. 26, No. 9, pp. 667–688 (Sep. 1994).

(List continued on next page.)

*Primary Examiner*—Joseph Ruggiero

*Attorney, Agent, or Firm*—Greenblum & Bernstein P.L.C.

[57] ABSTRACT

An apparatus and method is provided for managing and distributing design and manufacturing information throughout a factory in order to facilitate the production of components, such as bent sheet metal components. In accordance with an aspect of the present invention, the management and distribution of critical design and manufacturing information is achieved by storing and distributing the design and manufacturing information associated with each job. By replacing the traditional paper job set-up or work sheet with, for example, an electronically stored job sheet that can be accessed instantaneously from any location in the factory, the present invention improves the overall efficiency of the factory. In addition, through the various aspects and features of the invention, the organization and accessibility of part information and stored expert knowledge is improved.

107 Claims, 68 Drawing Sheets

OTHER PUBLICATIONS

Gu et al., P. "Product Modelling Using STEP", Computer–Aided Design, vol. 27, No. 3, pp. 163–179 (Mar. 1995).
An International Search Report mailed Oct. 1, 1997 with Application No. PCT/US97/07472.
An International Search Report mailed Nov. 6, 1997 with Application No. PCT/US97/07473.
An International Search Report mailed Nov. 4, 1997 with Application No. PCT/US97/07474.
An International Search Report mailed Oct. 1, 1997 with Application No. PCT/US97/07471.
Amada Windows Unfold: Manual for Cadkey, Table of Contents, pp. 1–35, & Index, U.s. Amada, Ltd., Buena Park California (Nov. 1995).
An English Language Abstract of JP 5–216525; Aug. 27, 1993.
An English Language Abstract of JP 2–15828; Jan. 19, 1990.
An English Language Abstract of JP 1–309727; Dec. 14, 1989.
An English Language Abstract of JP 63–154220 which corresponds to JP 7–121418; Dec. 25, 1995.
An English Language Abstract of JP 2–15827; Jan. 19, 1990.
An English Language Abstract of JP 1–309728; Dec. 14, 1989.
Chu et al., Wesley W., *Cooperative Query Answering Via Type Abstraction Heirarchy,* Computer Science Department Technical Report, CSD–900032, Department of Computer Science, University of California, Los Angeles, pp. 1–28 (Oct. 1990).
Chiang, Kuorong, *Automatic Generation of Type Abstraction Hierarchies For Cooperative Query Answering* (A dissertation submitted as part of the requirements for the degree of Doctor of Philosophy in Computer Science), University of California, Los Angeles, pp. 1–98 (1995).
Mortenson, Michael E., *Geometric Modeling* (Title Page & Table of Contents), John Wiley & Sons, New York, (1988).
Foley et al., James D. *The Systems Programming Series: Fundamentals of Interactive Computer Graphics,* (Title Page & Table of Contents), Addison–Wesley Publishing Co., Reading, Massachusetts (Mar. 1983).
Mantyla, Martti, *An Introduction To Solid Modeling* (Title Page & Table of Contents), Computer Science Press, Inc. Rockville, Maryland (1988).
Wesley et al., M.A., "Fleshing Out Projections", *IBM J. Res. Develop.,* vol. 25, No. 6, pp. 934–954 (Nov. 1981).
Aomura et al., Shigeru, "Creating Solid Model With Machine Drawings", *The Sixth Computational Mechanics Conference,* JSME, No. 930–71, pp. 497–498, Japan (1983).
Aomura, Shigeru, "Recent Trends And Future Prospect of Research And Practical Use (Automatic Reconstruction of 3D Solid From Drawings", JSME, No. 586–61, pp. 2180–2187, Japan (1995).
*Open GL Reference Manual* (Title Page & Table of Contents), Release 1, Open GL Architecture Review Board, Addison–Wesley Publishing Co., Reading, Massachusetts (Jan. 1995).
*Open GL Programming Guide* (Title Page & Table of Contents),Release 1,Open GL Architecture Review Board, Addison–Wesley Publishing Co., Reading, Massachusetts (Jun. 1995).
*RenderWare,* API Reference Manual (Title Page & Table of Contents), v2.0, Criterion Software Ltd., United Kingdom (Oct. 1995).
*2D–3D: UNKEI/Solid and UNKEI/ Drawing Check & Projection/Reconstruction System,* Sales Brochure, Toyo Engineering Corp. (TEC), Tokyo, Japan (1993).
Naessens, Diederik, "Flexible Automation on Press Brakes", *American Machinist,* pp. 36–39 (Jun. 1994).
Wysong Literature, *The Perfect Forming Touch: New, PH Plus Series, DNC Press Brakes,* Cat. PHP–1, Wysong & Miles Company, Greensboro, North Carolina (1993).
Bourne, David A., "Intelligent Manufacturing Workstrations", *Knowledge–Based Automation of Processes,* Session at the 1992 ASME Winter Annual Meeting (Nov. 1992).
Wang, Cheng–Hua, "A Parallel Design System For Sheet Metal Parts", *Mechanical Engineering Report,* presented to the Mechanical Engineering Department, Carnegie Mellon University, Pittsburgh, Pennslyvania, pp. 1–31 (May 1992).
Wang et al., Cheng–Hua, "Concurrent Product/Process Design With Multiple Representations Parts", IEEE, No. 1050–4729/93, pp. 298–304 (1993).
*Amada Unfold: Manual For Autocad,* Table of Contents, Index & pp. 1–18, U.S. Amada, Ltd., Buena Park, California (May 1994).
*Amada Unfold: Manual For Cadkey,* Table of Contents, Index & pp. 1–18, U.S. Amada, Ltd., Buena Park California (May 1994).
*Amada Windows Unfold: Manual for Cadkey,* Table of Contents & pp. 1–13, U.S. Amada, Ltd., Buena Park, California (Nov. 1995).
*Amacom: AP40 Literature,* Version 4, Amada Co., Ltd., Japan (Jul. 1996).
*Amacom: AP60 Literature,* Amada Co., Ltd., Japan (Jul. 1996).
*Amacom: AP200 Literature,* Amada Co., Ltd., Japan (Jul. 1996).
*Bending Soft,* Literature on the Amacom AP40, No. 9112–01, Amada Co., Ltd., Japan (Publication Date Unknown).
Papanikolopoulos, Nikolaos P., "FORS: A System For Flexible Design," *Conference Proceedings: 1990 IEEE International Conference On Systems, Man, And Cybernetics,* Nov. 4–7, 1990, Los Angeles, California, pp. 724–726.
Patent Abstracts of Japan, vol. 18, No. 689 (P–1850), Dec. 26, 1994.
An International Search Report issued with PCT App. No. PCT/US97/0747; Feb. 2, 1998.

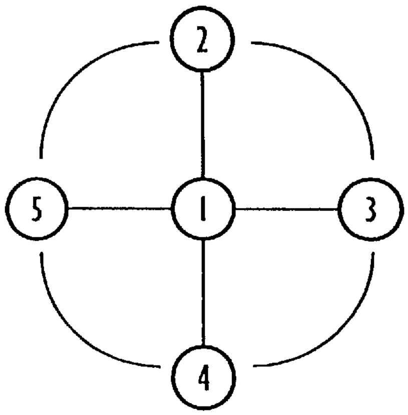
FIG. 6D
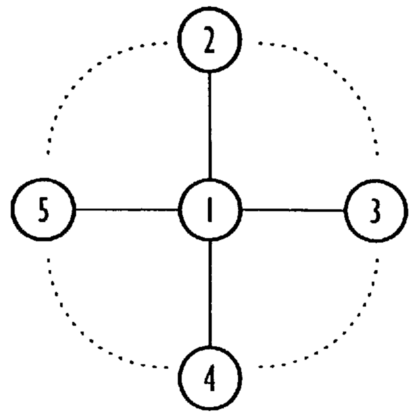
FIG. 6E
| | | | | | |
|---|---|---|---|---|---|
| 5 | + | T | | T | |
| 4 | + | | T | | T |
| 3 | + | T | | T | |
| 2 | + | | T | | T |
| 1 | | + | + | + | + |
| | 1 | 2 | 3 | 4 | 5 |
WHERE: + = 90 DEGREE POSITIVE BEND
T = TOUCHED CORNER
0 = OPEN CORNER
FIG. 6F
| | | | | | |
|---|---|---|---|---|---|
| 5 | + | 0 | | 0 | |
| 4 | + | | 0 | | 0 |
| 3 | + | 0 | | 0 | |
| 2 | + | | 0 | | 0 |
| 1 | | + | + | + | + |
| | 1 | 2 | 3 | 4 | 5 |
WHERE: + = 90 DEGREE POSITIVE BEND
T = TOUCHED CORNER
0 = OPEN CORNER
FIG. 6G

| FEATURE | FEATURE RELATION |
|---|---|
| 1 & 2 | 2 BENDLINES |
| 1 & 3 | 4 BENDLINES |
| 2 & 3 | 2 BENDLINES |

SEARCH KEYS (i) FOUR BEND BOX
FOUR BEND BOX (ii) 4 BENDLINES (iii) BRIDGE (iv) 2 BENDLINES
2 BENDLINES FIG. 27A
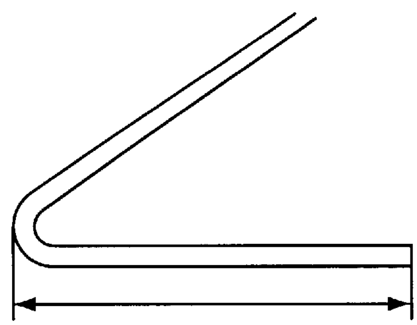
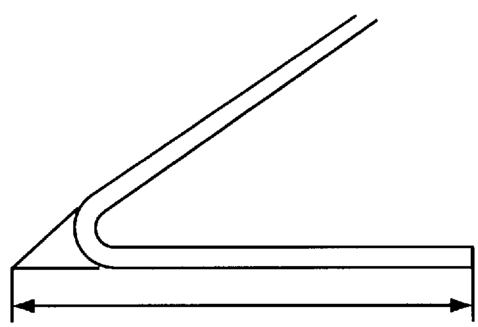
FIG. 27B

| TOOL # | SOLID/ SECTION | ANDLE(0) | | RADIUS | TIP WIDTH | HEIGHT | ALLOWABLE TONNAGE |
|---|---|---|---|---|---|---|---|
| 47 | SOLID | 88 | | 0.008 | 0.354 | 4.721 | 15 |
| 52 | SECTION | 88 | | 0.008 | 0.354 | 4.721 | 15 |
| 45 | 64502 | SOLID | | 0.008 | 88 | 0.354 | 15 |
| ___ | ___ | ___ | ___ | ___ | ___ | ___ | ___ |
| ___ | ___ | ___ | ___ | ___ | ___ | ___ | ___ |

FILE (F) OPTION (O) WINDOW (W) HELP (H)

| NUMBER | ANGLE | LENGTH | IR | DEDUCTION | TYPE | F/B | PITCH | COUNT |
|---|---|---|---|---|---|---|---|---|
| 1 | 90 | 25 | 1.2 | 1.8 | STD | F | 1 | 1 |
| 2 | 90 | 25 | 1.2 | 1.8 | STD | F | 1 | 1 |
| 3 | 90 | 65 | 1.2 | 1.8 | STD | F | 1 | 1 |
| 4 | 90 | 30 | 1.2 | 1.8 | STD | F | 1 | 1 |
| 5 | 90 | 65 | 1.2 | 1.8 | STD | F | 1 | 1 |
| 6 | 90 | 83 | 1.2 | 1.8 | STD | F | 1 | 1 |
| | | | | | | | | |
| | | | | | | | | |

FIG. 48

USER MENU

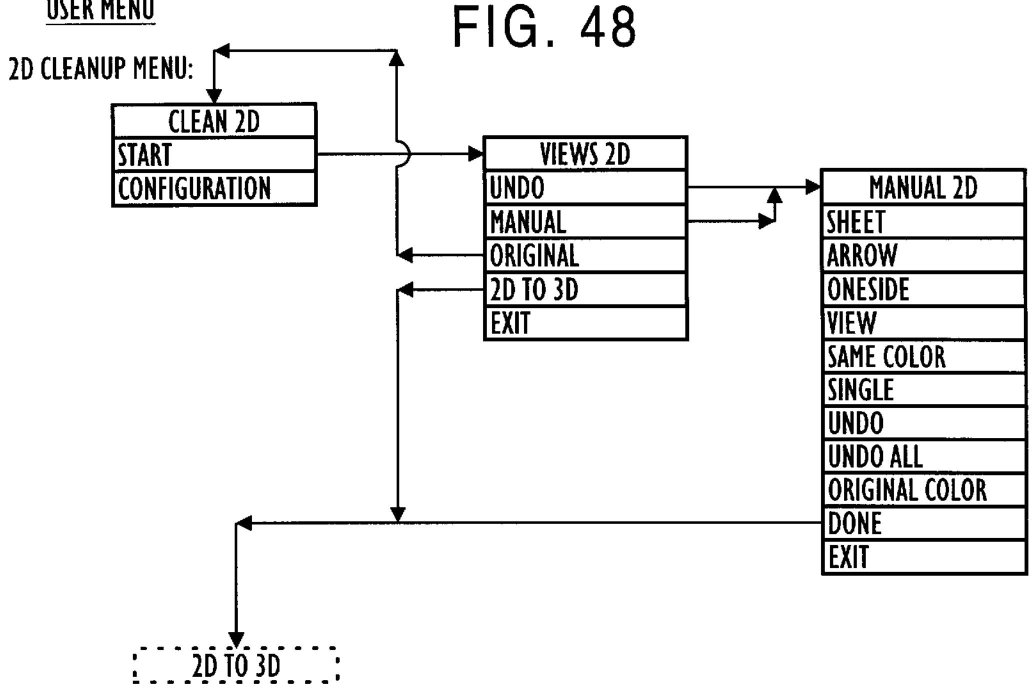

| OPTION NAME | FUNCTIONALITY |
|---|---|
| MENU CLEAN 2D | |
| START | EXECUTES AUTOTRIM (CONNECTIVITY), THEN DETECTS SHEET INFORMATION, DIMENSION LINES, CENTER LINES, SINGLE SIDE OPEN LINES HOLES, VIEW BOUNDARIES, AND REMOVES SUPERFLUOUS LINES. |
| CONFIGURATION | SETS AUTOTRIM'S CONFIGURATION FOR THE 2D CLEAN UP ONLY. CHANGE TOLERANCE |
| MENU VIEWS 2D | |
| UNDO | BACK TO START CLEAN 2D MANUAL, BUT ENTITIES WERE TRIMED |
| MANUAL | START MANUAL FUNCTION TO CLEAN UP 2D DRAWING |
| ORIGINAL | SHOW INPUT DRAWING |
| 2D TO 3D | START 2DTO3D MENU |
| EXIT | EXIT WITH ORIGINAL PART. |
| MENU MANUAL 2D | |
| SHEET | DETECT A DRAWING SHEET FROM THE INPUT DRAWING |
| ARROW | DETECT DIMENSION ENTITIES WHICH MADE ARROWS TYPE |
| ONESIDE | DETECT UNUSE ENTITIES WHICH ARE NOT HAVE CONNECTED WITH OTHERS |
| VIEW | FIND OUT A VIEW WHEN USER SELECT ONE ENTITY FROM THE VIEW. |
| SAME COLOR | SHOW ORIGINAL COLOR AND DETECT ALL SAME COLOR ENTITIES FROM THE DRAWING WHEN USER SELECT ONE ENTITY |
| SINGLE | SELECT AND RELEASE AN ENTITY |
| CLEAR | RELEASE ALL SELECTED ENTITY |
| UNDO | BACK ONE STEP ONLY |
| UNDO ALL | RETURN TO START MANUAL CLEANUP 2D |
| ORIGINAL COLOR | CHANGE ENTITIES' COLOR TO ORIGINAL COLOR AND REVERSE |
| DONE | FINISH THE MANUAL FUNCTION AND DELETE ALL UNUSE ENTITIES |
| EXIT | EXIT FROM CLEANUP 2D |

APPARATUS AND METHOD FOR MANAGING AND DISTRIBUTING DESIGN AND MANUFACTURING INFORMATION THROUGHOUT A SHEET METAL PRODUCTION FACILITY

RELATED APPLICATION DATA

This application claims the benefit of U.S. Provisional application Ser. No. 60/016,958, filed May 6, 1996 abandoned, entitled "Apparatus and Method for Managing and Distributing Design and Manufacturing Information Throughout a Sheet Metal Production Facility," the disclosure of which is expressly incorporated herein by reference in its entirety.

COPYRIGHT NOTICE

A portion of the disclosure of this patent document contains material which is subject to copyright protection. The copyright owner has no objection to the facsimile reproduction by anyone of the patent disclosure, as it appears in the U.S. Patent and Trademark Office patent files or records, but otherwise the copyright owner reserves all copyright rights whatsoever.

BACKGROUND OF THE INVENTION

1. Field of the Invention

The present invention generally relates to the field of manufacturing and to the production of components, such as sheet metal components. More particularly, the present invention relates to an apparatus and method for managing and distributing design and manufacturing information throughout a factory in order to facilitate the production of bent sheet metal components.

2. Background Information

Traditionally, the production of bent sheet metal components at, for example, a progressive sheet metal manufacturing facility, involves a series of production and manufacturing stages. The first stage is a design stage during which a sheet metal part design is developed based on a customer's specifications. A customer will typically place an order for a particular sheet metal component to be produced at the facility. The customer's order will usually include the necessary product and design information so that the component may be manufactured by the factory. This information may include, for example, the geometric dimensions of the part, the material required for the part (e.g., steel, stainless steel, or aluminum), special forming information, the batch size, the delivery date, etc. The sheet metal part requested by the customer may be designed and produced for a wide variety of applications. For example, the produced component may ultimately be used as an outer casing for a computer, an electrical switchboard, an armrest in an airplane, or part of a door panel for a car.

During the design stage, a sheet metal part design may be developed by the design office of the manufacturing facility using an appropriate Computer-Aided Design (CAD) system. Based on a customer's specifications, a 2-dimensional (2-D) model of the sheet metal part may be developed by a programmer with the CAD system. Typically, a customer will provided a blueprint containing one or more drawings of the component and the critical geometric dimensions of the part. The blueprint may also indicate any special forming or marking to be included in the part, as well as the location of holes or other types of openings on the surface(s) of the sheet metal part. The design programmer will often use this blueprint to develop a 2-D model on the CAD system. The 2-D model may include a flat view and one or more other perspective views of the sheet metal part, with bending line and/or dimensional information.

Before actual bending of the sheet metal part takes place, the part must first be punched and/or cut from initial stock material. Computer Numerical Control (CNC) or Numerical Control (NC) systems are typically used to control and operate punch presses and plasma or laser cutting machinery to process the stock material. In order to facilitate processing of the stock material, a Computer-Aided Manufacturing (CAM) system or CAD/CAM system can be used by a design programmer to generate control code based on the 2-D model. The control code may comprise a part program that is imported to and utilized by the punch press and/or cutting machinery to punch or cut the sheet metal component from the stock material.

The next stage in the production process is a bending plan stage. During this stage, a bending plan is developed by a bending operator at the shop floor. The operator will normally be provided with the blueprint or 2-D drawing of the component, along with one or more samples of the cut or punched stock material. With these materials, the bending operator will develop a bending plan which defines the tooling to be used and the sequence of bends to be performed. The bending workstation may include CNC metal bending machinery, such as a CNC press brake, that enables the operator to enter data and develop a bending code or program based on the bending plan.

Once the bending plan is developed, the operator will set up the workstation for initial testing of the bending sequence. During this testing stage, the punched or cut stock material will be manually loaded into the press brake and the press brake will be operated to execute the programmed sequence of bends on the workpiece. The operator will analyze the final bent sheet metal part and inspect it for conformance with the customer's specification. Based on the results of the initial runs of the press brake, the operator may modify the bending sequence by editing the bending program. The operator may also provide feedback to the design office so that the sheet metal part design can be appropriately modified. Further testing will typically be conducted until the bent sheet metal component is within the required design specifications.

One of the final stages in the production process is the bending stage. After the bending plan has been developed and tested, the bending operator will set up the required tooling at the bending station and operate the press brake based on the bending plan and the stored bending program or code. Job scheduling is also performed in order to ensure that the necessary amount of punched or cut stock material will be available on time at the bending station, and so that other jobs will be completed by the requested delivery dates. Job scheduling may be developed or modified by a shop floor foreman during the earlier stages of the production process and/or concurrently throughout the entire process. After the final bent sheet metal parts have been produced, the parts may then be assembled and packaged for shipping to the customer.

The conventional production and manufacturing process described above suffers from several drawbacks and disadvantages. For example, although the design and manufacturing data for each customer's order is normally archived physically (e.g., by paper in a file cabinet) or electronically (e.g., by storing on a disk or magnetic tape), such data are normally stored separately and not easily retrievable.

Further, in most factory settings, the distribution of critical job information takes the form of a paper job or work sheet that is distributed throughout the factory floor. As a result, data is often lost or damaged, and it is difficult to search for both the design and manufacturing data relating to a previous or similar job. In addition, due to the inefficient manner in which the data is stored, valuable time is lost in attempting to distribute the design and manufacturing information to the shop floor and to other locations throughout the factory. Considerable manufacturing time is also lost during the development of the sheet metal part design and bending plan, since the development of the part design and bending plan is primarily performed by the design programmer and bending operator, and relies heavily on the individual's knowledge, skill and experience.

In recent years, there have been developments and attempts to improve the conventional sheet metal manufacturing process and to improve the efficiency of the overall process. For example, the use and development of 2-D and 3-dimensional (3-D) modeling in commercially available CAD/CAM systems has facilitated and improved the production process and modeling of bent sheet metal components. The design programmer and operator can now utilize both the 2-D and 3-D representations to better understand the geometry of the part and more efficiently develop a part design and bending code sequence. The ability to store and transfer data electronically has also improved the flow of information from the design office to locations on the shop floor. With the advancement of computers and data communication networks, it is no longer necessary to search through a cabinet or file of old paper tapes or magnetic disks.

Despite such advancements, there is still a need to improve the organization and flow of design and manufacturing information throughout the factory environment. For example, conventional manufacturing systems do not logically associate both critical design and manufacturing information associated with each customer's order so that it may be easily accessed and retrieved from any area in the factory. Previous systems also fail to provide the ability to search previous job information based on various criteria, such as the features and attributes of the sheet metal component. The ability to search and retrieve previous job information based on, for example, an identical or similar part search, would greatly enhance the overall production process and reduce the required manufacturing time for future jobs.

Past attempts also fail to facilitate the development of the sheet metal part design and bending plan by the design programmer and shop floor operator. While the introduction of 2-D and 3-D modeling systems have enabled the designer to have a better understanding of the shape and geometry of the part, such systems have not reduced the burdens placed on the design programmer and shop floor operator. For example, such systems have not enabled the design programmer to easily convert an existing 2-D CAD model into a 3-D representation. In addition, while 2-D and/or 3-D drawings of the component may be provided to the shop floor operator to assist in the development of the bending plan, the operator must still determine and develop the tooling requirements and bending sequence by hand and/or experimentation.

SUMMARY OF THE INVENTION

In view of the foregoing, the present invention, through one or more of its various aspects, embodiments and/or specific features or sub-components thereof, is provided to bring about one or more objects and advantages, such as those specifically noted below.

A general object of the present invention is to provide an apparatus and method for managing and distributing design and manufacturing information throughout a factory in order to facilitate the production of components, such as bent sheet metal components.

A further object of the present invention is to provide an apparatus and method that prevents the loss or destruction of critical job information, and that enhances the efficiency and organization of stored expert knowledge at, for example, a progressive sheet metal production facility.

Another object of the invention is to provide an apparatus and method for logically storing both the design and manufacturing information for each customer's order, so that it may be easily accessed and retrieved from any area in the factory.

Yet another object of the present invention is to provide an apparatus and method for managing and distributing design and manufacturing information, wherein the job data is stored at a central database or file server in a logical fashion so that it may be easily searched and retrieved from any location throughout the factory. The job data may provide not only the design and manufacturing information associated with the job, but also the actual bend code for executing the required bending operations.

Still another object of the present invention is to provide an apparatus and method for searching previous job information, including design and manufacturing information, based on various search criteria. The search criteria may include, for example, the basic features and attributes of the sheet metal component to be manufactured, so that previous job information relating to an identical or similar part can be utilized to reduce the overall manufacturing time of future jobs.

Another object of the present invention is to replace the traditional paper job or work sheet, associated with each customer's order, with an electronic job sheet that can be instantaneously accessed from any location in the factory. The electronic job sheet may be displayed at any location and include critical design and manufacturing information, including the 2-D and/or 3-D model view of the component, the tooling selection, the optimum bending sequence, the required staging information, and the bar code or identification number associated with the job. The electronic job sheet may also include an audio and/or video portion recorded by a bending operator to indicate, for example, any special instructions or procedures that may be helpful when running the same job or a similar job again in the future.

Another object of the invention is to shorten the time required to analyze a part drawing by providing 2-D and 3-D computerized views of the sheet metal part. Various viewing modes may be provided, including a solid 3-D viewing mode, a 3-D wire frame viewing mode, a 2-D flat screen viewing mode, and an orthographic viewing mode. Different viewing functions may also be provided, including zooming, panning, rotating and auto-dimensioning, to facilitate analysis of the sheet metal part.

A further object of the invention is to provide an apparatus and method that facilitates the development of the sheet metal part design and bending plan by the design programmer and shop floor operator. For example, it is an object of the present invention to enable the design programmer to easily develop a 3-D representation of the component from an existing 2-D model. It is also another object of the invention to provide a graphical user interface to shorten the time required to develop the bending plan and programmed bending code.

The present invention, therefore, is directed to a system and method is provided for developing a bending plan through the use of a graphical user interface, wherein the bending plan is adapted for use in the production of a part at a facility. The system comprises a bend sequence display system for generating and displaying a bend sequence input window on a display device, wherein the bend sequence input window comprises a 2-D flat image of the part. A tooling display system is also provided for generating and displaying tooling information on the display device, and an input device is provided for entering a bend sequence based on the 2-D flat image of the part and for selecting tooling based on the tooling information displayed on the display device. In addition, the system includes a bending plan storage system for storing the bending plan for the part based on the bend sequence and the tooling entered and selected by the input device.

The 2-D flat image of the part may include representations of each bendline of the part, and the input device may be adapted to enter the bend sequence by selecting each of the bendlines displayed in the 2-D flat image of the part. The input device may also be adapted to enter the bend sequence based on a sequence in which each the bendline is selected. Alternatively, or in combination, the input device may also be adapted to enter the bend sequence based on a bend sequence number entered by the input device when each the bendline is selected. As disclosed herein, the input device that is used with the system may comprises a joystick device or mouse device.

The system may further comprise a bend sequence number display system for displaying, on the display device, a bend sequence number for each of the bendlines based on the bend sequence entered by the input device. An insert direction determination system may also be provided for determining and displaying, on the display device, insert direction information for each of the bendlines of the part. The insert direction information may include an arrow representing an insert direction for each bendline may be displayed. Further, each of the bendlines may divide the part into two sides, and the insert direction determination system may be adapted to determine the insert direction information for each of the bendlines based on the side of the part that has a smaller predetermined dimension. The predetermined dimension may relate to a length of each side that is perpendicular to the bendline or it may relate to an area of each side relating to the bendline.

The bend sequence display system may be further adapted to generate and display a plurality of images of the part on the display device based on the bend sequence, wherein each of the plurality of images relate to a representation of the part at a stage within the bend sequence. The plurality of images that are displayed may be displayed in a sequence corresponding to the bend sequence. A drag and drop editing system may also be provided for modifying the bend sequence based on a modification of the displayed sequence of the plurality of images on the display device. The drag and drop editing system may be adapted to modify the displayed sequence when one of the plurality of images is selected by the input device and moved to a different position within the displayed sequence.

In accordance with an aspect of the invention, the displayed tooling information may comprise a plurality of tool icons displayed on the display device, wherein each of the tool icons represents a predetermined tool. The displayed tooling information may also comprise a table of tool data displayed on the display device, wherein each entry within the table of tool data relates to a predetermined tool. According to one feature of the invention, the tooling information is displayed by the tooling display system through a series of successively displayed screen displays, whereby at least one of the successively displayed screen displays is displayed based on a previous selection by the input device.

For example, the tooling display system may be adapted to display, on the display device, a first screen display comprising a plurality of tool type icons, wherein each of the tool type icons represents a tool type. The tool type may relate to at least one of a punch, die, die holder or die rail. The tooling display system may also be adapted to display, in response to the selection of one of the tool type icons, a second screen display on the display device, wherein the second screen display comprises a plurality of tool shape icons, and each of the tool shape icons relate to the tool type icon selected by the input device. The tooling display system may be further adapted to display, in response to the selection of one of the tool shape icons, a table of tool dimension data on the display device, wherein the tool dimension data relates to a plurality of tools, and each of the tools relate to the tool shape icon selected by the input device. At least part of the tooling may be selected and entered by the input device based on a selection of data from the table of tool dimension data.

Other feature may be included with the system of the present invention. For example, the tooling information may comprise tool-setup information relating to the tooling location within a bending machine for each tool to be used in the bending plan. Further, the tooling display system may be adapted to generate and display a tool set-up window on the display device for entering the tool set-up information with the input device. In addition, the system may be adapted such that a 2-D flat image of the part and the plurality of images of the part are simultaneously displayed on the display device.

According to yet another aspect of the invention, a method for developing a bending plan through the use of a graphical user interface is provided. The method comprises the steps of: generating and displaying a bend sequence input window on a display device, wherein the bend sequence input window comprises a 2-D flat image of the part; entering, with an input device, a bend sequence based on the 2-D flat image of the part; generating and displaying tooling information on the display device, wherein the tooling information relates to a plurality of tools; selecting, with the input device, tooling based on the tooling information displayed on the display device; and storing, in a storage device, the bending plan for the part based on the entered bend sequence and the selected tooling.

According to the method, the 2-D flat image of the part may include representations of each bendline of the part, and the bend sequence may be entered by selecting each the bendline displayed in the 2-D flat image of the part. In particular, the bend sequence may be entered based on a sequence in which each the bendline is selected or based on a bend sequence number entered by the input device when each the bendline is selected. As disclosed herein, the input device that is used with the method may comprises a joystick device or mouse device.

The method may further comprise displaying, on the display device, a bend sequence number for each bendline based on the bend sequence entered by the input device. Other steps may also be provided, such as determining and displaying, on the display device, insert direction information for each the bendline of the part. The insert direction information for each the bendline may be determined based on the side of the part, divided by the bendline, that has a smaller predetermined dimension. In addition, the displayed insert determination information for each the bendline may comprise an arrow relating to an insert direction for the bendline.

According to another feature, the invention may include the step of generating and displaying a plurality of images of the part on the display device based on the bend sequence, wherein each of the plurality of images of the part relates to a representation of the part at a stage within the bend sequence. A drag and drop editing step may be provided to modify the bend sequence based on a modification of the displayed sequence of the plurality of images on the display device. The displayed sequence may be modified by moving at least one of the plurality of images to a different position within the displayed sequence, and the plurality of images and each the representation of the part may be regenerated and displayed based on the modified bend sequence.

The method may also include displaying the tooling information through a series of successively displayed screen displays, wherein at least one of the successively displayed screen displays is displayed based on a previous selection by the input device. The step of displaying may be provided to display, on the display device, a first screen display comprising a plurality of tool type icons, for each of the tool type icons representing a tool type. Further, the method may also include the steps of selecting one of the tool type icons with the input device and displaying, in response to the selection of one of the tool type icons, a second screen display on the display device, wherein the second screen display comprises a plurality of tool shape icons, and each of the tool shape icons relate to the tool type icon selected by the input device. The method may also include the step of selecting one of the tool shape icons with the input device and displaying, in response to the selection of one of the tool shape icons, a table of tool dimension data on the display device. The tool dimension data may relate to a plurality of tools, and each of the tools may relate to the tool shape icon selected by the input device.

According to yet another aspect of the invention, a system is provided for developing a bend sequence through the use of a graphical user interface. The system includes a bend sequence display system for generating and displaying a bend sequence input window on a display device, wherein the bend sequence input window comprises a 2-D flat image of the part, and an input device for entering a bend sequence based on the 2-D flat image of the part. The bend sequence display system may further be adapted to generate and display a plurality of images of the part based on the bend sequence entered by the input device, and each of the plurality of images of the part may relate to a representation of the part at a stage within the bend sequence.

The system may also comprise a bending sequence storage system for storing the bending sequence for the part based on the bend sequence entered by the input device. The bend sequence may be entered by the input device by selecting each of the bendlines of the part displayed in the 2-D flat image of the part. A bend sequence number display system may also be provided for displaying, on the display device, a bend sequence number for each of the bendlines based on the bend sequence entered by the input device. In addition, an insert direction determination system may be provided for determining and displaying, on the display device, insert direction information for each the bendline of the part.

In order to modify the bend sequence, a drag and drop editing system may be provided for modifying the bend sequence based on a modification of the displayed sequence of the plurality of images on the display device. The drag and drop editing system may comprise means for modifying the displayed sequence when one of the plurality of images is selected by the input device and moved to a different position within the displayed sequence. The bend sequence display system may also comprise means for regenerating and displaying the plurality of images and each the representation of the part based on the modified bend sequence.

A method for developing a bend sequence through the use of a graphical user interface is also provided, wherein the bend sequence is adapted for use in the production of a part at a facility. The method comprises the steps of: generating and displaying a bend sequence input window on a display device, wherein the bend sequence input window comprises a 2-D flat image of the part; entering, through an input device, a bend sequence based on the 2-D flat image of the part; and generating and displaying a plurality of images of the part based on the bend sequence entered by the input device, such that each of the plurality of images of the part relate to a representation of the part at a stage within the bend sequence.

According to yet another aspect of the invention, a system is provided for developing tooling for a part through the use of a graphical user interface. The system comprises a tooling display system for generating and displaying tooling information on the display device, whereby the tooling information is displayed through a series of successively displayed screen displays, and an input device for selecting tooling based on the tooling information displayed on the display device.

At least one of the successively displayed screen displays may be displayed based on a previous selection by the input device. The displayed tooling information may relate to a plurality of tools and may comprise a plurality of tool icons displayed on the display device, wherein each of the tool icons represents a predetermined tool. The displayed tooling information may also comprise a table of tool data displayed on the display device, wherein each entry within the table of tool data is related to a predetermined tool.

According to the present invention, a method may also be provided for developing tooling for a part through the use of a graphical user interface. The method comprises the steps of: generating and displaying tooling information on the display device, wherein the tooling information is displayed on a series of successively displayed screen displays; and selecting, with an input device, tooling based on the tooling information displayed on the display device. The method may further comprise displaying at least one of the successively displayed screen displays based in part on a previous selection made by the input device.

The step of displaying may also be provided to display, on the display device, a first screen display comprising a plurality of tool type icons, for each of the tool type icons representing a tool type. Further, the method may also include the steps of selecting one of the tool type icons with the input device and displaying, in response to the selection of one of the tool type icons, a second screen display on the display device, wherein the second screen display comprises a plurality of tool shape icons, and each of the tool shape icons relate to the tool type icon selected by the input device. The method may also include the step of selecting one of the tool shape icons with the input device and displaying, in response to the selection of one of the tool shape icons, a table of tool dimension data on the display device. The tool dimension data may relate to a plurality of tools, and each of the tools may relate to the tool shape icon selected by the input device.

Further features and/or variations may be provided in addition to those noted above. For example, the invention may be directed to various combinations and subcombinations of the above-described features and/or combinations and subcombinations of several further features noted below in the detailed description.

The above-listed and other objects, features and advantages of the present invention will more be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the illustrations, and wherein:

FIGS. 6A, 6B, 6C, 6D, 6E, 6F and 6G illustrate, in accordance with an aspect of the invention, a feature extraction operation for a four bend box with touched corners and for a four bend box with open corners;

FIGS. 27A and 27B illustrate manners in which the flange length of parts with acute bend angles may displayed, in accordance with a tangent dimension method and an intersection dimension method of the invention;

FIG. 48 is an exemplary menu screen diagram and structure for a 2-D clean-up operation of the present invention.

BRIEF DESCRIPTION OF THE APPENDICES

In order to further facilitate the detailed description of the present invention, reference is made to the noted plurality of appendices by way of non-limiting examples of preferred embodiments of the present invention, in which sample source code and comments are provided with respect to the various features, operations and functions of the invention, and wherein:

Appendix A is an exemplary source code for executing a feature extraction operation of the present invention when performing, for example, a similar part search;

Appendix B is an exemplary source code for effectuating a similarity index operation when performing, for example, a similar parts search of the invention;

Appendix C is an exemplary source code for performing a bendline detection operation of the invention;

Appendix D is an exemplary source code for implementing a 2-D cleanup operation of the present invention, which may be utilized when developing a 3-D model of a sheet metal part based on an original 2-D, three view drawing;

Appendix E is an exemplary source code for implementing the various view modes and functions of a bend model viewer of the present invention;

Appendices F, G, H and I are exemplary source code and comments relating to executing and performing an auto dimensioning feature of the present invention;

Appendix J is an exemplary source code for implementing a part and entity visibility function of the bend model viewer of the invention;

Appendix K includes general comments relating to the implementation of the bend model and the organization of the part structure, according to the various teachings of the present invention; and Appendix L includes exemplary source code for implementing a 3-D manipulation and navigation system with dynamic calculation of the rotation axis of the rendered part.

DETAILED DESCRIPTION OF THE INVENTION

According to an aspect of the present invention, an apparatus and method are provided for managing and distributing design and manufacturing information throughout a factory, and for facilitating the production of components within the factory. The features of the present invention may be used in a wide variety of factory environments and settings and, more particularly, the invention may be implemented in factory environments wherein a series of production and manufacturing stages are effectuated at different locations. By way of non-limiting embodiments and examples, the present invention will now be described with reference to the production of bent sheet metal components at, for example, a progressive sheet metal manufacturing facility.

Figure 1A:
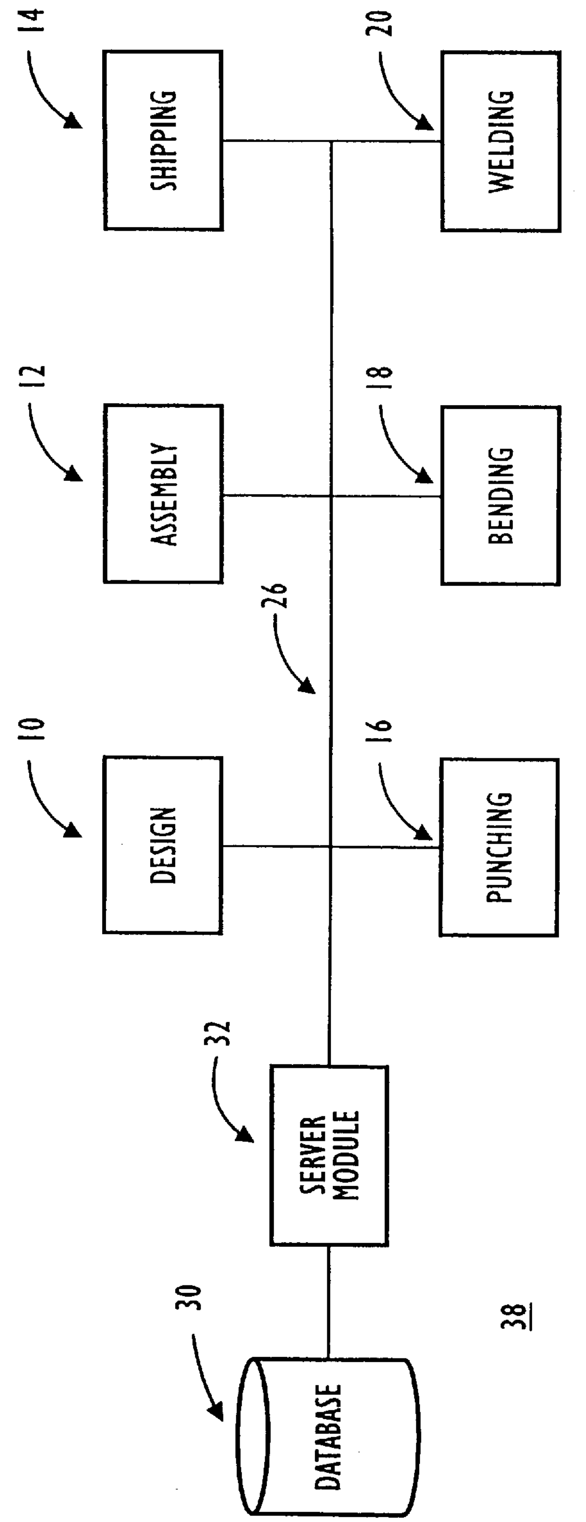
FIG. 1A is a block diagram illustration of a progressive sheet metal manufacturing facility constructed according to an embodiment of the present invention.

Referring to FIG. 1A, a progressive sheet metal manufacturing facility 38 is generally illustrated in block diagram form, according to an embodiment of the present invention. As shown in FIG. 1A, the sheet metal manufacturing facility or factory 38 may include a plurality of locations 10, 12, 14 . . . 20 that are dispersed throughout the factory. These locations may comprise a design office 10, an assembly station 12, a shipping station 14, a punching station 16, a bending station 18, and a welding station 20. Although the sheet metal factory 38 in FIG. 1A is depicted as having only six discrete locations, the factory may of course include more than six discrete locations and may also include more than one location for each type of office or station illustrated in FIG. 1A. For example, depending on the size of and production capacity requirements for the facility 38, more than one punching station 16, bending station 18, and/or welding station 20 may be provided. In addition, the factory 38 may include more than one design office 10, assembly station 12 or shipping station 14, and may also include other types of locations for facilitating the production and manufacturing of components, such as bent sheet metal components.

Each of the locations 10, 12, 14 . . . 20 within the factory 38 may be adapted and include equipment to execute one or more of the discrete production and manufacturing stages or processes associated with the production and manufacturing of the components. For example, the design office 10 may include an appropriate CAD/CAM system, to facilitate the development of the sheet metal part design based on a customer's specification. The CAD/CAM system may comprise one or more personal computers, a display unit, a printer, and commercially available CAD/CAM software. By way of a non-limiting example, the CAD/CAM system of the design office 10 may include AUTOCAD or CADKEY, or an Amada AP40 or AP60 CAD/CAM system available from Amada America, Inc. (previously operating under the corporate name of U.S. Amada Ltd.), Buena Park, Calif. In addition, other commercially available CAD systems may be used, such as VELLUM, which is a Windows based CAD system available from Ashlar Incorporated. With the CAD/CAM software, the design programmer may develop a 2-D model and/or 3-D model of the sheet metal part based on the drawings and data provided in the customer's order. The design programmer may also generate control code based on the sheet metal part design, in order to generate a part program for controlling, for example, CNC punch presses and/or cutting machinery to punch or cut the sheet metal component from stock material.

Punching station 16 and bending station 18 may each be provided with any combination of CNC and/or NC based machine tools. For example, punching station 16 may include one or more CNC and/or NC punch presses, such as COMA series and/or PEGA series Amada turret punch presses or other commercially available CNC and/or NC punch presses, and bending station 18 may include one or more CNC and/or NC press brakes, such as RG series Amada press brakes or other commercially available multiple-axis, gauging press brakes. Further, welding station 20 may be provided with appropriate welding machinery in order to effectuate any required welding to the sheet metal component. Punching station 16, bending station 18 and welding station 20 may be located at various areas on the factory floor of the facility 38 and include machinery that is manually operated by skilled operators (e.g., punch press operators, bending operators, etc.). Fully automated or robot assisted machinery, such as the Amada CELLROBO MINI and the Amada PROMECAM, may also be provided at these locations. The required punching and bending operations, and any necessary welding operations, may be performed at these stations during the production process.

As further shown in FIG. 1A, the progressive sheet metal facility 38 may also include assembly station 12 and shipping station 14. Assembly station 12 and shipping station 14 may include the necessary packaging, routing and/or transportation equipment to facilitate the assembly and shipping of the manufactured components to the customer. The assembly and shipping of the components may be performed or controlled manually by factory personnel and also may be machine automated and/or machine assisted. In addition, assembly station 12 and shipping station 14 may be physically located near the factory floor (e.g., in close proximity to punching station 16, bending station 18 and/or welding station 20) or within a separate facility or area of the sheet metal factory 38.

In accordance with an aspect of the present invention, the management and distribution of critical design and manufacturing information is achieved by electronically storing and distributing the design and manufacturing information. By replacing or at least supplementing the traditional paper job set-up or work sheet with an electronic job sheet that can be accessed instantaneously from any location in the factory, the present invention improves the overall efficiency of the factory. In addition, through the various aspects and features of the invention, the organization and accessibility of stored design and manufacturing information is improved. Further, the ability to access and retrieve previous job information relating to similar or identical sheet metal parts is enabled through the various features of the invention.

Figure 1B:
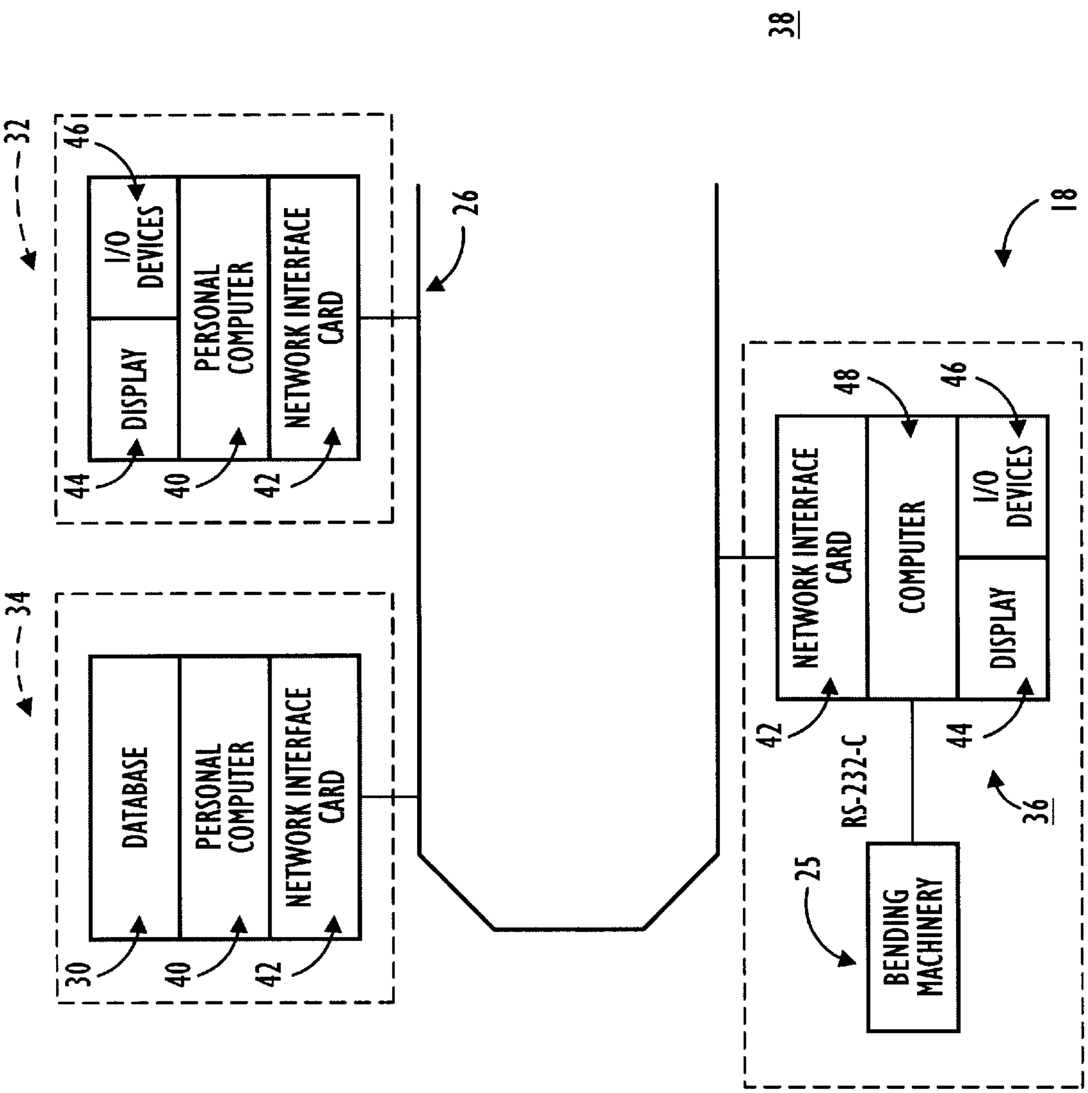
FIG. 1B is a block diagram illustration of a progressive sheet metal manufacturing facility constructed according to another embodiment of the present invention.
Figure 2:
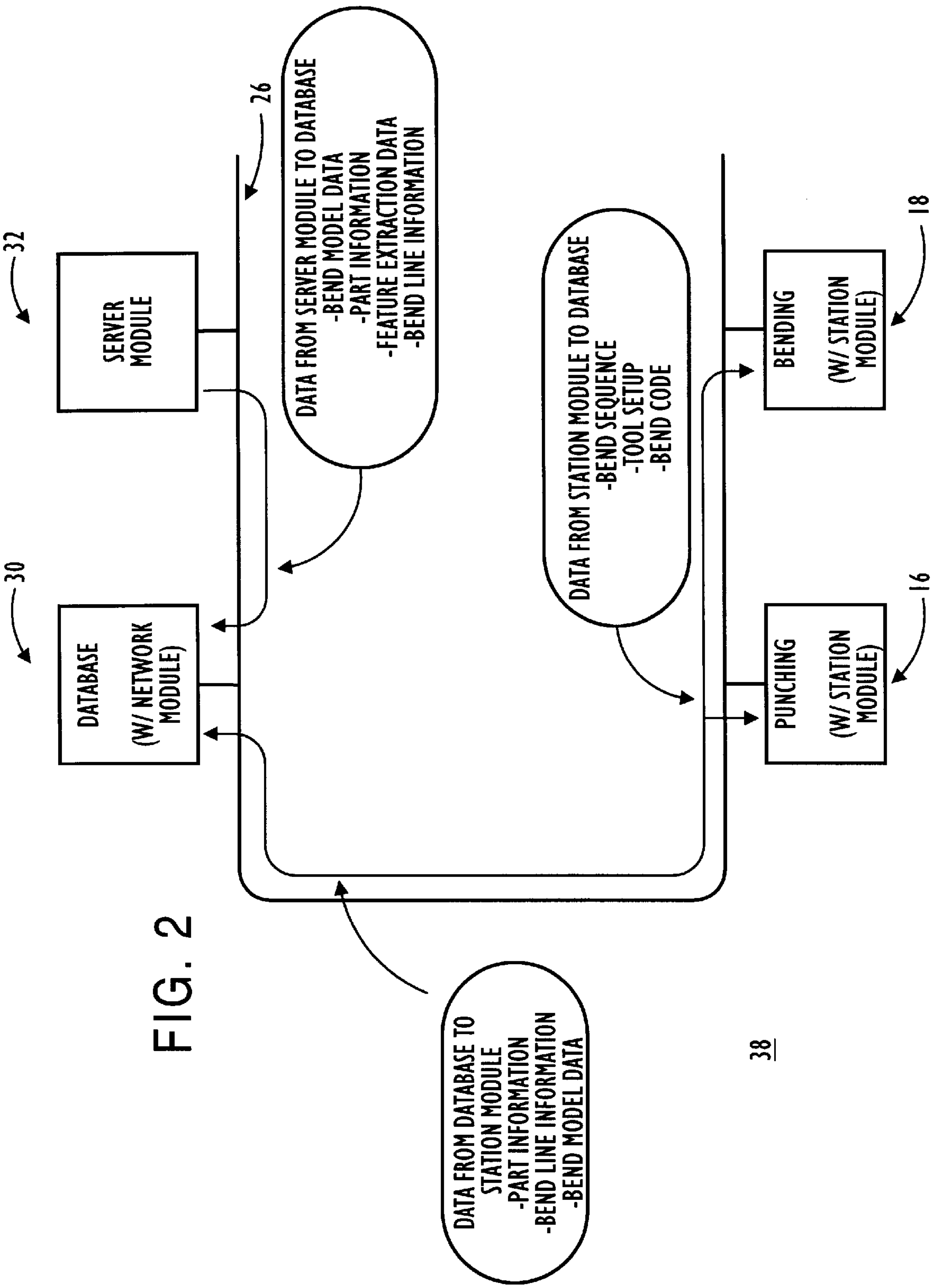
FIG. 2 illustrates the respective data flow between the server module, database and station modules, in accordance with an aspect of the present invention.

To this end, the various aspects of the present invention may be implemented and effectuated by providing a communications network 26 that interconnects a server module 32 and a database 30 to each of the plurality of locations 10, 12, 14 . . . 20 within the sheet metal facility 38. As further discussed below, each of the locations 10, 12, 12 . . . 20 may include station modules that interface with communications network 26 and database 30. FIGS. 1A, 1B and 2 illustrate non-limiting examples of these features and implementation of the invention.

As shown in FIGS. 1A and 1B, communications network 26 may interconnect each of the various locations 10, 12, 14 . . . 20 of the facility 38 with server module 32 and database 30. Communications network 26 may comprise any network capable of transmitting data and information to and from the locations 10, 12, 14 . . . 20 and the server module 32 and database 30. Such transmission may be achieved electronically, optically, by RF transmission or by infrared transmission. By way of non-limiting example, communications network 26 may be implemented by a Local Area Network (LAN), Ethernet or an equivalent network structure. As further discussed below, each of the locations 10, 12, 14 . . . 20 may also include station modules having network terminating equipment (such as a computer, minicomputer or workstation) and/or peripheral devices (such as a display monitor or screen, printers, CD-ROMs, and/or modems) to transmit and receive information over communications network 26. The network terminating equipment and peripheral devices may include hardware and appropriate software or programmed logic for interfacing with communications network 26 and for providing the various features and aspects of the present invention, as more fully discussed below. If a computer is provided at the factory location, the computer may be a stand-alone, personal computer or a general purpose computer that is part of an interface device of the equipment or machinery provided at the location. For example, the computer may be an IBM compatible personal computer or may be a computer that is part of an interface/control system of the machinery, such as an Amada AMNC system.

Server module 32 and database 30 are also connected to communications network 26. Server module 32 may comprise network terminating equipment, such as a personal computer, minicomputer or mainframe, with suitable hardware and software for interfacing with communications network 26. Server module 32 may also include software or firmware for implementing the various features of the invention, such as those described in greater detail hereinafter. Further, according to an aspect of the present invention, server module 32 may also include database 30 for storing the design and manufacturing information associated with each customer's order. Database 30 may be implemented by any commercial available database with sufficient memory capacity for storing the design and manufacturing information of the factory's customers and storing other data, tables and/or programs. For example, database 30 may comprise a SCSI memory disk with 4 GB or more of available memory space. The design and manufacturing information that is stored in database 30 may be accessed and distributed to the various locations 10, 12, 14 . . . 20 within the sheet metal facility 38 via communications network 26. Various data formats, such as Structured Query Language (SQL), may be used for accessing and storing data to database 30. In addition, information that is stored in database 30 may be backed-up and stored on a wide variety of storage medium, such as magnetic tape, optical disks or floppy disks. Server module 32 and database 30 may be connected to communications network 26 at a separate area or location within the factory 38 (see, e.g., FIG. 1A), or at a location that is within or in close proximity to one of the predefined stations (e.g., within design office 10). Although the embodiment of FIG. 1A depicts database 30 as being part of server module 32 and interfacing with communications network 26 via the server module, database 30 may of course be physically located separately from server module 32 and connected to communications network 26 via a network database module 34, such as that shown in FIG. 1B.

By way of a non-limiting example, and in accordance with a preferred embodiment of the present invention, server module 32 and each of the locations 10, 12, 14 . . . 20 may comprise a personal computer, such as an IBM compatible computer with a 100–200 MHz central processor unit (CPU), including a Pentium or an equivalent microprocessor, at least 32 MB of memory and a high resolution display screen, such as any commercially available SVGA monitor with 800×600 resolution. Server module 32 and locations 10, 12, 14, . . . 20 may also include a joystick or mouse device and a Sound Blaster or compatible sound and game port adapter card for interfacing and controlling the display of information. Operating system software may also be provided to support communications. For example, server module 32 may be provided with Microsoft Windows New Technology (NT) or Windows 95 operating system software (both of which are available from Microsoft Corporation, Redmond, Wash.), and each of the locations 10, 12, 14 . . . 20 may include Microsoft Windows 95 operating system software. In addition, server module 32 and locations 10, 12, 14 . . . 20 may be adapted to support multiple languages (such as English, Japanese, etc.) and full support for an Object Linking and Embedding (OLE) server, such as an OLE2 server, may be provided.

Various database languages and management systems may also be used for creating, maintaining and viewing information stored in database 30. A database language such as Structured Query Language (SQL) may be used for defining, manipulating and controlling data in database 30. For example, SQL Server (which is a retail product available from Microsoft Corporation) may be utilized to implement the present invention. In addition, the invention may be provided with an Open Database Connectivity (ODBC) compatible driver to facilitate access of information from database 30 over communications network 26. More information concerning OBDC may be found, for example, in the Microsoft Open Database Connectivity Software Development Kit Programmers Reference manual.

FIG. 1B illustrates, in block diagram form, a progressive sheet metal manufacturing facility constructed according to another embodiment of the present invention. In the embodiment of FIG. 1B, the database 30 and server module 32 are provided separately, with the database 30 being connected to communications network 26 via a network database module 34. As discussed above, the present invention is not limited to this arrangement and the database 30 and server module 32 may be provided together (as shown, e.g., in FIG. 1A), with the functionality of the network database module 34 for providing access to the database being incorporated in the server module. The embodiment of FIG. 1B also illustrates an example of the station module 36 that may be provided at each of the various locations 10, 12, 14 . . . 20 throughout the sheet metal manufacturing facility 38. For purposes of illustration, an exemplary station module 36 that may be located at bending station 18 is provided in FIG. 1B. Although not depicted in the example of FIG. 1B, similar station modules 36 may also be provided at the other locations within the facility 38.

As shown in FIG. 1B, each of the modules (i.e., server module 32, network database module 34, and station module 36) may be connected to communications network 26 via a network interface card or port 42. The network interface card 26 may be vendor specific and be selected based on the type of communications network that is selected. Each of the modules 32, 34 and 36 may also include network software or programmed logic for interfacing with the communications network 26. The communications network 26 may be an Ethernet with any of a number of commercially available cable types, such as 10 Base/T (twisted pair), 10 Base/2 (coax), or 10 Base/5 (thick cable), with the cable type being selected based on the size of facility 38 and the amount or length of the cable required.

In FIG. 1B, server module 32 may comprise a personal computer 40 with display monitor or CRT 44 and input/output devices 46, which may include a keyboard, mouse and/or joystick. The network interface card 42 may be plugged into an available expansion slot or port of the personal computer 40. In addition, personal computer 40 may comprise an IBM compatible computer with 100–200 Mhz operating speed and a Pentium or Pentium Pro microprocessor. Personal computer 40 may also include, for example, 32 MB or more of available main memory and 1.2 GB or more of available random access memory (RAM).

Display 44 may include a high resolution display screen, such as any commercially available SVGA monitor with, for example, 800×600 resolution. To support the various graphics and information that may be displayed on display 44, personal computer 40 may also include any commercially available graphics card such as a PCI graphics card. Further, computer 40 may include a Sound Blaster or compatible sound and game port adapter card and input/output devices 46 may include a keyboard, joystick and/or mouse device.

In order to implement the various features of the invention, server module 32 may be configured with software and various software packages. For example, server module 32 may be provided with operating system software, such as Microsoft Windows NT (workstation version) or Windows 95. Further, in order to provide the server module specific functionality and features of the invention (see, e.g., FIG. 3), server module 32 may include software or programmed logic implemented routines. As discussed in greater detail below, these routines may be developed using a high level programming language, such as C++, and object oriented programming techniques. Server module 32 may also include or interface with CAD or CAD/CAM software, such as VELLUM or Amada AP40 or AP60 software, to enter and/or develop original 2-D and 3-D drawings based on a customer's specifications. For this reason, server module may be located in the design office 10 of the manufacturing facility 38. In order to access data from database 30, server module 32 may also include an OBDC driver, such as Microsoft ODBC driver, and may use SQL as a standard for accessing data. An OLE server, such as OLE2 server, may also be provided to link the data.

In the embodiment of FIG. 1B, database 30 is provided separate from server module 32 and is connected to communications network 26 via network database module 34. As indicated above, database 30 may comprise a SCSI disk with appropriate memory space (e.g., 1–4 GB), which may be selected based on the size of the factory 38 and the amount of part information to be stored in the database. Network database module 34 may include a personal computer 40, such as an IBM compatible computer with a Pentium microprocessor, and an expansion slot fitted with network interface card 42 for interfacing with communications network 26. Database 30 may be connected to personal computer 40 via a data bus and personal computer 40 may include standard display and input/output devices (not shown in FIG. 1B), such as a display monitor or CRT and a keyboard.

In order to facilitate access to database 30 based on SQL, personal computer 40 of network database module 34 may be configured with a commercially available SQL server, such as a Microsoft SQL server or Oracle SQL server. An OLE server, such as OLE2 server, may also be provided to link the data. Personal computer 40 may also be configured with various operating software, such as DOS and Microsoft Windows NT (server version).

The embodiment of FIG. 1B also includes an exemplary implementation of one station module 36. In this embodiment, the station module 36 is implemented at bending station 18. As shown in FIG. 1B, the station module 36 may include similar hardware to that of the server module 32. That is, each station module (e.g., at the other stations shown in FIG. 1A) may comprise a computer 48 with display monitor or CRT 44 and input/output devices 46, which may include a joystick or mouse. The network interface card 42 may be plugged into an available expansion slot or port of the computer 40. As discussed above, the computer of the station module 36 may be a stand-alone, personal computer or a general purpose computer that is part of an interface device of the equipment or machinery provided at the location. For example, computer 48 may comprise a free-standing, personal computer such as an IBM compatible computer with 100–200 Mhz operating speed and a Pentium or Pentium Pro microprocessor, or computer 48 may be a computer that is part of or built into an interface/control system of the machinery, such as an Amada AMNC system. Computer 48 may also include, for example, 32 MB or more of available main memory and 1.2 GB or more of available random access memory (RAM). Display 44 may include a high resolution display screen, such as any commercially available SVGA monitor with, for example, 800×600 resolution. To support the various graphics and information that may be displayed on display 44, computer 48 may also include any commercially available graphics card such as a PCI graphics card. Further, computer 48 may include a Sound Blaster or compatible sound and game port adapter and to support, for example, a joystick or mouse of the input/output devices 46.

In order to implement the various features of the invention, station module 36 may also be configured with software and various software packages. For example, station module 36 may be provided with operating system software, such as Microsoft Windows 95 or Windows NT (workstation version). Further, in order to provide the station module specific functionality and features of the invention (see, e.g., FIG. 4), station module 36 may include software or programmed logic implemented routines. As discussed in greater detail below, these routines may be developed using a high level programming language, such as C++, and object oriented programming techniques. In order to access and link data, station module 36 may also include an OBDC driver, such as Microsoft ODBC driver, and an OLE server, such as OLE2 server. Similar to server module 32, station module may use SQL as a standard for accessing data from database 30.

If the station module 36 of bending station 18 is provided as a free-standing personal computer, then software may be provided to create bending code data (i.e., NC data) and to interface with the machinery 25 (e.g., a CNC or NC controlled press brake). In the embodiment of FIG. 1B, computer 36 is illustrated as being implemented as a personal computer and is configured with software to interface with bending machinery 25 via a standard RS-232-C wire interface. This interface may be provided to permit the station module 36 to communicate with and send or receive bending code data to the bending machinery 25 via the RS-232-C interface. The implementation of the interface is vendor specific and will depend on the data format and machine instruction set used for the bending machinery 25. All data that is sent from the station module 36 to the bending machinery 25 should thus be formatted based on the machine instruction set that is defined for the machinery. The computer 48 of station module 36 may also be provided with any commercially available CNC or NC software for generating bending code data, in order to simulate the functionality that is normally provided by a built-in computer of CNC or NC systems (such as a Amada AMNC) for such machinery.

FIG. 2 illustrates an exemplary embodiment of the respective data flows between server module 32, database 30 and the various locations of the sheet metal manufacturing facility 38. For purposes of illustration, and to better facilitate the description of the respective data flow in the embodiment, server module 32 and database 30 (integrated with network database module 34) are each shown in FIG.

2 as being separately and directly connected to communications network 26, with the data flow between these elements being carried out across the communications network. Of course, as will be appreciated by those skilled in the art, a wide variety of data flow arrangements may be provided between these elements; and, if database 30 is arranged to be directly connected to server module 32, then the data and information can be directly transferred from the server module to the database without use of communications network 26. In addition, for purposes of facilitating the description herein, the illustration of communications network 26 in FIG. 2 has been simplified and only punching station 16 and bending station 18 are shown in the drawing. Nonetheless, it will be appreciated that the data flow to and from locations 10, 12, 14 . . . 20 (as well as any other location or area that may be present in the factory) may be carried out in a similar manner to that described for punching station 16 and bending station 18.

The design and manufacturing information associated with each customer's order may be organized and stored in database 30. When a customer's order is initially received, basic product and design information may be entered at server module 32 and then transferred and stored to database 30. As discussed above, server module 32 may include any suitable means for entering the data, such as a personal computer with a keyboard, etc. If a personal computer is utilized at server module 32, software may be provided to generate menu driven screens to facilitate the entry of the data by factory personnel. The data entry program may be, for example, a Microsoft Windows based application with help and/or menu screens, etc. By way of a non-limiting example, the data that is entered and/or developed at server module 32 and transferred to database 30 may include part information, bend model data, feature extraction data, and bend line information, as generally illustrated in FIG. 2.

The part information may comprise, for example, a part or order reference number, the customer's name, a brief description of the part, the batch size or quantity, and scheduled delivery date. The bend model data may include, for example, part geometry and manufacturing data, such as the overall dimensions of the part (e.g., width, height, depth), and part material information such as the material type (e.g., steel, stainless steel, or aluminum), thickness and tensile strength. Further, feature extraction data may be manually entered and/or automatically generated to identify the key features of the part and to facilitate similar part searches and other searches of the database. The feature extraction data may be stored in a separate data file in database 30, or may be stored with the bend model data and other job information for each part. The feature extraction data may comprise, for example, features of the part such as the number of surfaces or faces, the number or types of bends present (e.g., a positive bend between two faces or a negative bend between two faces), the relationships between the faces and/or the number of holes or other types of openings in the part. As discussed more fully below, such data may be represented and organized in a feature based part matrix and/or a sequence of search keys (see, e.g., FIGS. 5–7 below). Lastly, bend line information may be entered at server module 32 for storage in database 30. The bend line information may comprise, for example, pertinent bend line information for each bend in the part, including the bend angle, the bend length, the inside radius (IR) of the bend, the amount of deduction, and the bend direction (e.g., front or back).

In order to transmit to and receive data from database 30 over communications network 26, each of the locations 10, 12, 14 . . . 20 may comprise a station module (such as station module 36 described above) that is connected to the communications network. In FIG. 2, punching station 16 and bending station 18 are generally illustrated in block diagram form with a station module. As discussed above, the station module may comprise, for example, software or control logic and a stand-alone personal computer or a general purpose computer that is part of the equipment or machinery provided at the location. For each customer's order, the design and manufacturing information (including the part information, bend line information, and bend model data) may be accessed and retrieved by entering, for example, a predetermined reference number or code. The reference number or code may be entered manually (e.g., by keyboard or digital input pad) or by scanning a bar code with a bar code reader or scanner provided at the station module. In addition, in accordance with an aspect of the present invention, previous job data may be accessed and retrieved from database 30 from any location 10, 12, 14 . . . 20 within the factory 38 by performing a similar part search. As discussed more fully in the detailed description that follows, a similar part search may be conducted based on the feature extraction data or search keys stored in database 30 so that previous job information relating to identical or similar part(s) can be retrieved and utilized to reduce the overall manufacturing time of future jobs.

The design and manufacturing information that is retrieved from database 30 may be used by the shop floor operators to develop and test the bending plan. For example, a bending operator at bending station 18 may access and retrieve the part information, bend line information and bend model data from database 30 in order to determine the necessary tooling and the optimum bend sequence for the sheet metal part. In accordance with an aspect of the present invention, an ODBC driver may be provided to permit each station module to interface database 30 and display information stored in the database. In addition, server module 32 or the network database module of database 30 may comprise a SQL server to facilitate the access and retrieval of data stored in the database. Once the bending code has been programmed based on the final bending plan, the bending code along with the bend sequence and tool setup information may be sent from the station module of bending station 18 to database 30 over communications network 30, as generally shown in FIG. 2. This information may then be stored along with the other design and manufacturing information associated with that job.

Other information may also be stored in database 30. For example, the 2-D and/or 3-D image representation of the part may be stored with the bend model data for the part. The 2-D or 3-D image representation may be developed at design station 10 or another location with a CAD/CAM system and transferred to database 30 via the station module of the design station (or another appropriate location) and through the communications network 26. Alternatively, the 2-D or 3-D image may be developed at server module 32, by utilizing or interfacing with an appropriate CAD/CAM system or modeling software and performing a series of functions or operations, as will be discussed more fully below.

Figure 3:
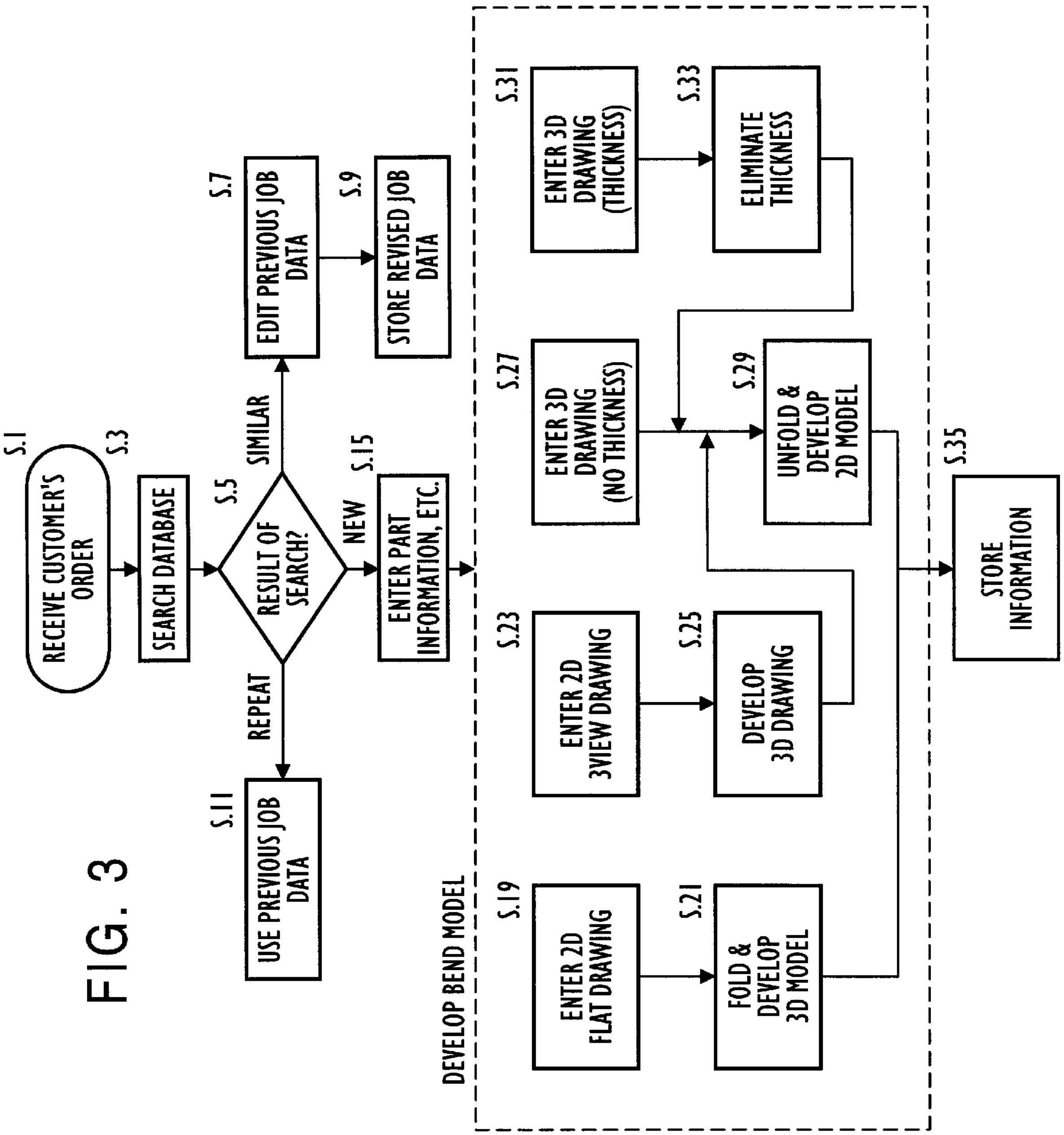
FIG. 3 is a flow chart of the general processes and operations that may be performed by the server module, according to another aspect of the invention.
Figure 4:
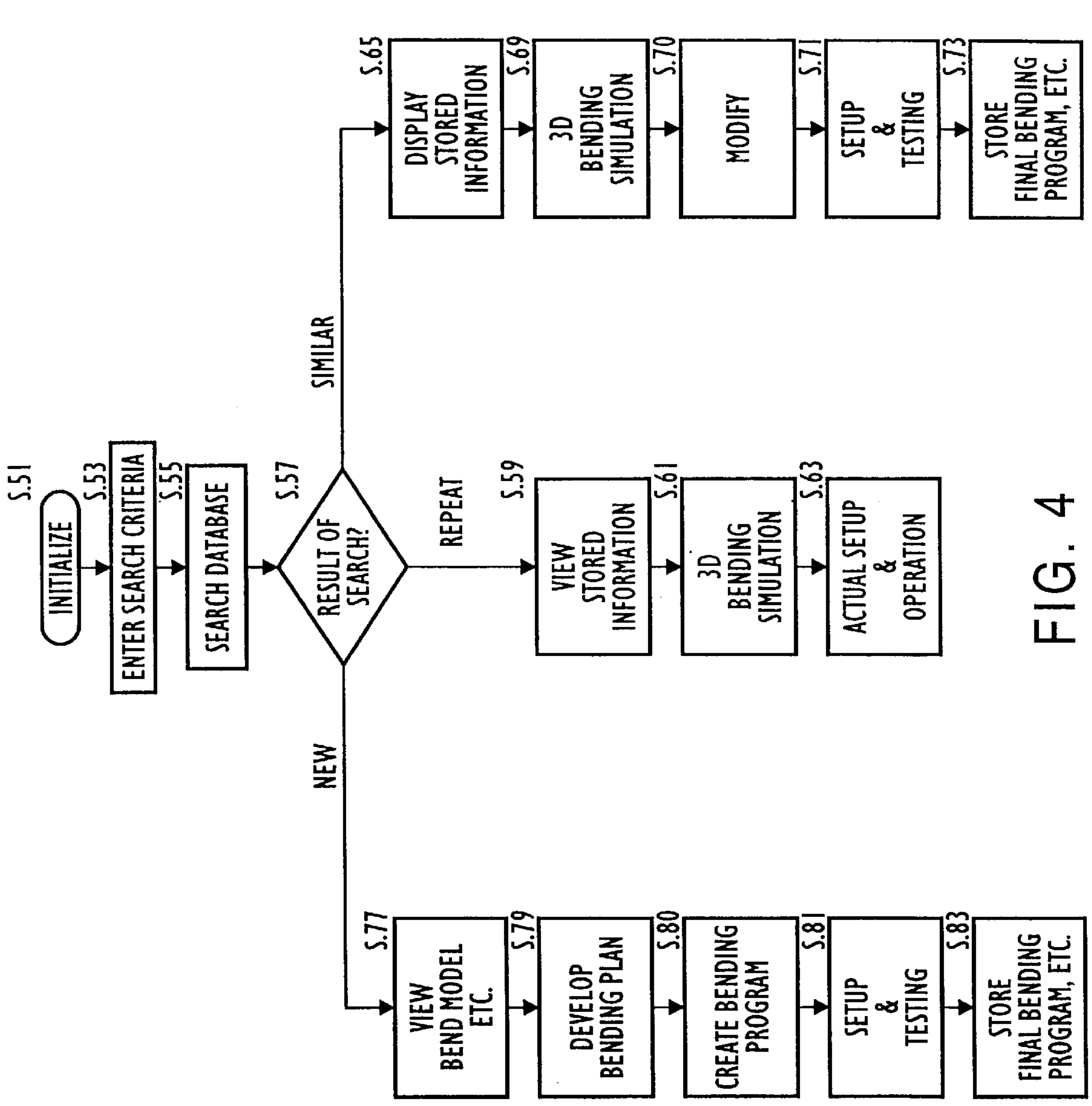
FIG. 4 is a representative flow chart of the basic processes and operations that may be performed by each of the station modules, in accordance with the teachings of the present invention.

Referring now to FIGS. 3 and 4, a detailed description of the processes and operations that may be programmed and performed by server module 32 and the station modules of each of the locations 10, 12, 14 . . . 20 will be provided. FIGS. 3 and 4 are flow charts of the basic logic flow that may be performed by server module 32 and the station modules of each of the locations 10, 12, 14 . . . 20 within the sheet metal manufacturing facility 38. While FIG. 4 is directed to the processes and operations that would typically be performed at, for example, bending station 18, it will be appreciated that other processes and steps may be performed depending upon the operations performed at each particular location within the facility 38. The processes and operations discussed below may be implemented by software and by using any one of a wide variety of programming languages and techniques. For example, in accordance with an aspect of the present invention, the processes and operations described below with reference to the accompanying drawings may be implemented by using a high level programming language such as C++ and using object oriented programming techniques. Further, by way of a non-limiting example, VISUAL C++ may be utilized, which is a version of the C++ programming language written by Microsoft Corporation for Windows based applications.

FIG. 3 is a flow chart of the basic processes and operations performed by server module 32, in accordance with an aspect of the invention. FIG. 3 illustrates the basic logic flow of the processes and operations performed by the software or programmed logic of server module 32. Server module 32 may include a Windows based application with tool bar icons and help and/or menu screens to assist an operator or user in selecting and executing the various processes and operations of the server module. The process begins at step S.1, when a customer's order is received at the sheet metal manufacturing facility 38. The customer's order will normally include the necessary product and design information so that the component may be manufactured by the factory 38. This information may include, for example, the geometric dimensions of the part, the material required for the part, and other design information. Based on the information received from the customer, server module 32 may perform a search of previous job information stored in database 30, as illustrated in step S.3. The job information stored in database 30 may be searched based on a wide variety of search criteria. For example, information may be searched based on a predetermined reference or job number or a similar part search may be performed based on certain design features of the part, so that previous job information relating to an identical or similar part can be retrieved and utilized for the current job. A more detailed description of a similar parts search that may be utilized is provided below with reference to FIGS. 5–7.

At step S.5, the results of the search of the database are analyzed to determine whether the current customer's order relates to a new part, a part that is similar to a previous job, or a repeat of a previous job. If an identical match is found (e.g., the same part or reference number is located) and the present customer's order is a complete repeat of a previous job performed at the factory, then no further modifications to the job information is necessary and the previous job information may be accessed from database 30 and used to carry out the present customer's order, as shown at step S.11. The search of the database may provide the part or reference number and/or file name of the previous job so that the job information may be accessed from the database by an operator at the server module 32 or any of the station modules. If only the part or reference number is provided, then a translation table may be provided so that the file name of the previous job information may be determined and accessed based on the entry of the part reference or job number by an operator. Thus, an operator at, for example, server module 32 may access the job information and the 2-D and 3-D modeling information from database 30 to analyze the geometry of the part and confirm that it is similar to that of the repeat order. If the order is confirmed to be a repeat order, then a bending operator located at the station module of bending station 18 may also access the previous job information and utilize the manufacturing information, including the bending code data and tool setup information, to bend and produce the part. The use of such stored expert knowledge thus enables repeat orders to be manufactured more efficiently and without the need to reproduce previously entered and developed job information.

If, however, it is determined at step S.5 that the current customer's order is similar to a previous job or the same as a previous job but requires modification of, for example, the job or reference number or batch size, etc., then at step S.7 the previous job data located by the search may be retrieved from database 30, and edited and modified by an operator at server module 32. An editing function may be provided to allow editing and modification of previous job data to create new job data that may be stored in database 30 for the present customer's order. The amount of editing required will depend upon the amount of similarity that exists between the previous job and the current job. The amount of editing may encompass simply modifying the reference or job number or batch size, and/or may involve more extensive modifications such as editing the dimensions of the part and the defined bend sequence. After the previous job information has been edited, the revised job information may then be stored in database 30 at step S.9. The revised job information may be stored under a new reference or job number. In addition, various database management functions (such as copy, delete, save, rename, etc.) may be provided to permit the previous job information to be maintained in database 30 or to permit the previous job information to be erased or overwritten upon entry of a special command.

If it is determined that there is no similar or identical match to the current job and, thus, that the present customer's order relates to a new job, then logic flow proceeds to step S.15, as shown in FIG. 3. Since, in this case, the current job relates to a new job it will be necessary to independently develop and enter the design and manufacturing information. Menu and/or help screens may be provided by the server module 32 to assist the operator in entering all of the necessary job information. In accordance with an aspect of the invention, an operator at server module 32 may create a new file by first entering the basic part information for the new job. The part information may comprise, for example, a reference or job number, the customer's name, a brief description of the part, the required batch size or quantity for the job, and the scheduled delivery date. The feature extraction data or search keys may also be entered at step S.15, or this data may be automatically developed or extracted concurrently with the development of the bend model data, as described below. Other data or information may also be entered at step S.15, or entered after or during the entry of the bend model data, such as the bend line information which may comprise, for example, the bend angle, radius and length for each bend line in the part. After step S.15, logic flow proceeds so that the bend model data may be developed and entered at server module 32 by an operator, as shown in FIG. 3.

The development and entry of the bend model data may depend upon the original drawings and information provided from the customer. The customer's order may include, for example, a 2-D, single view flat drawing of the part to be manufactured and/or a 2-D, three view (e.g., including top, front and side views) drawing of the part. Occasionally, the customer may also provide a 3-D, wire frame drawing of the part, with or without the thickness of the material of the part being indicated in the drawing. In accordance with an aspect of the present invention, the bend model data may include both the unfolded (i.e., the 2-D flat representation) and the folded (i.e., the 3-D representation) information for the part to be manufactured. Thus, if only a 2-D flat drawing is provided by the customer, it will be necessary to develop a 3-D drawing of the part by applying, for example, a folding algorithm or process to the 2-D drawing. Alternatively, if only a 3-D drawing of the part is provided, then it will be necessary to develop a 2-D flat drawing by applying, for example, an unfolding algorithm or process to the 3-D drawing. In accordance with another aspect of the present invention, the 2-D and 3-D models that are saved in the bend model may be developed and represented without the sheet material thickness (i.e., with no thickness). This is possible due to the unique symmetry of all sheet metal parts. Providing and representing the 2-D and 3-D drawings with no thickness provides modeling and simulation views of the part that can be more easily interpreted and understood by the design programmer, the bending operator and other users. Removing the thickness information also shortens and improves the processing time required by the server module and station modules when performing and executing the various features of the invention described herein. A more detailed description of such features, as well as the folding and unfolding algorithms that may be utilized in the present invention, is provided below with reference to the accompanying drawings.

FIG. 3 shows the general processes and operations performed when developing the bend model data. The various types of drawings that may be received or developed based on the customer's order and that may be entered to develop the bend model data are generally shows at steps S.19, S.23, S.27 and S.31. A tool icon bar and menu and/or help screens may be provided by the server module 32 to assist the operator in selecting and executing each of these steps. The processing of these drawings to develop the 2-D and 3-D models of the part for the bend model will depend on what type of drawings are initially provided. These drawings may be manually entered or developed at server module 32, or they may be downloaded from a tape or disk. Server module 32 may, for example, interface with a CAD/CAM system located at, for example, design office 10, or server module 32 may include a stand alone CAD/CAM system. Further, the 2-D and 3-D drawings may be saved as DXF or IGES files and imported to server module 32.

If a 2-D, single view flat drawing is provided, then processing to develop the bend model may begin at step S.19, as shown in FIG. 3. At step S.19, the 2-D, flat drawing that was received or developed may be entered at server module 32. Other bend model data, such the overall dimensions of the part (e.g., width, height, depth), and part material information may also be enter at step S.19. Thereafter, a folding algorithm or process may be utilized to develop a 3-D model (with no material thickness) based on the original 2-D single view drawing, as generally shown at step S.21. An example of the processes and operations that may be performed to develop a 3-D model from a 2-D, flat drawing is provided below with reference to FIGS. 8–11.

If a 3-D, wire frame drawing (with no material thickness) of the part is received or developed, the drawing information may be entered at step S.27. In addition, other bend model data, such the overall dimensions of the part (e.g., width, height, depth), and part material information may be entered at step S.27. Thereafter, an unfolding algorithm or process may be executed at server module 32 in order to develop a 2-D model of the part, as shown at step S.29. An example of the processes and operations that may be performed to develop a 2-D model from a 3-D drawing (with no thickness) is provided below with reference to, for example, FIG. 12.

The 2-D and 3-D model representations of the part may be stored as part of the bend model for that part. In addition, as noted above, during the development and entry of the 2-D and 3-D models, other bend model data may be entered (such as the part material information and other manufacturing information) so that it may be stored with the bend model data in database 30. The various features and data structure arrangements that may be implemented for organizing and storing the bend model data are discussed more fully below (see, for example, FIGS. 17 and 18).

As shown in FIG. 3, if a simple 3-D drawing (with no material thickness) of the component is not originally developed or received, additional processing may be necessary in order to develop a 3-D model of the part (with no thickness), before executing the necessary unfolding algorithm or processes to develop the final 2-D model. Steps S.23, S.25, S.31 and S.33 generally show the additional processing and operations that may be performed by server module 32 before executing an unfolding algorithm and developing the 2-D model at step S.29.

For example, if a 2-D, three-view drawing of the part is originally provided or developed, then at step S.23 the drawing may be entered at or imported to server module 32. Further, other bend model data, such the overall dimensions of the part (e.g., width, height, depth), and part material information may also be enter at step S.23. Thereafter, at step S.25, a simple 3-D, flat drawing of the part may be developed based on the 2-D, three-view drawing that was entered. The developed 3-D drawing may then be used to develop the 2-D model at step S.29, as shown in FIG. 3. An example of the processes and operations that may be performed to develop a 3-D model from a 2-D, three view drawing is provided below with reference to, for example, FIG. 13.

If, however, a 3-D drawing with material thickness is originally received or developed, then the drawing information may be entered at step S.31 for further processing before applying the unfolding algorithm. Other bend model data, such the overall dimensions of the part (e.g., width, height, depth), and part material information may also be enter at step S.31. Thereafter, at step S.33, an eliminate thickness procedure may be executed to eliminate the thickness in the 3-D drawing. In accordance with an aspect of the invention, server module 32 may prompt the operator or user to indicate the thickness in the drawing and to indicate which surfaces (e.g., the outside or inside) should be retained when executing the eliminate thickness procedure. An example of an eliminate thickness procedure that may be utilized in the present invention is provided below with reference to, for example, FIGS. 15A and 15B. After the thickness in the 3-D drawing has been eliminated at step S.33, logic flow will proceed to step S.29, where the revised 3-D model with no thickness may be utilized and an appropriate unfolding algorithm or process may be applied to develop the final 2-D model. An example of an unfolding process and the various processes and operations that may be performed to develop a 2-D model from a 3-D drawing is provided below with reference to, for example, FIG. 12.

As shown in FIG. 3, after all of the relevant information has been developed and entered, the part information, bend model information and other data associated with the customer's order may be transferred from server module 32 and stored in database 30 at step S.35. The data stored in database 30 may include feature extraction or search data that may be utilized when performing database searches. As described below, the feature extraction or search data may include data that is indicative of the basic or key features of the part associated with each job, so that searches of the database may be performed to locate job information and stored expert knowledge relating to the same or similar parts. The data and information entered at server module 32 may be sent directly to database 30 or transferred over communications network 26, as shown, for example, in FIG. 2. As indicated above, a more detailed description of the various processes and operations that may be performed for the various drawings when developing the bend model data will be provided below with reference to the accompanying drawings.

FIG. 4 is a flow chart of the basic processes and operations performed by each of the station modules that may be provided at the locations 10, 12, 14 . . . 20 of the sheet metal manufacturing facility 38. For purposes of illustration, FIG. 4 provides an example of basic logic flow of the processes and operations that may be performed by a station module located at, for example, bending station 18. As will be appreciated by those skilled in the art based on the teachings of the present invention, the logic flow illustrated in FIG. 4 may of course be modified for each station module depending upon the nature of the operations and processes to be performed at each of the locations. Further, as with server module 32, the processes and operations of the station module described below may be implemented by software or programmed logic. In addition, the station module may include a Windows based application with tool bar icons or help and/or menu screens to facilitate an operator or user in selecting and executing the various processes and operations of the station module. Such help and/or menu screens may also be provided to facilitate the entry or transfer of data at the station module.

As shown in FIG. 4, after initializing the station module at step S.51, an operator may input one or more database search criteria or key terms at step S.53. The search criteria may be entered to locate previous job information or job information relating to a new or current job that is stored in database 30. The operator may input, for example, a predetermined reference number or code in order to retrieve particular job information from database 30. For example, in accordance with an aspect of the present invention, a bar code may be provided on a routing sheet or may be affixed to the punched stock material and scanned by a bar code reader at the station module to access the information. Alternatively, the reference code or number could be entered manually through a keyboard or digital input pad at the station module. A translation table may be provided so that the file name of the previous job information may be determined based on the entry of the part reference or job number by an operator. In addition, it is contemplated that search criteria or keys may be entered to perform a similar part search for previously stored job information. Such a search may be performed based upon the various design features or feature extraction data of the part. A description of a similar part search that may be implemented, in accordance with an aspect of the present invention, is provided below with reference to FIGS. 5–7.

After the search criteria has been entered at step S.53, the station module may execute a search of the database 30 at step S.55 via communications network 26 and network database module 34. The results of the search may then be sent back to the station module and analyzed at step S.57 in order to determine whether the operator or user has requested information relating to a new job or a similar previous job, or whether the request relates to the complete repeat of a previous job.

If an identical match is found (e.g., the same part or reference number is located) and it is determined that a previous job is to be repeated, then the stored design and manufacturing information relating to the job may be transferred from database 30 to the station module, where it may be displayed for viewing by the operator, as generally shown at step S.59. The station module may include one or more menu display screens or directories to permit the operator to select and display the various information retrieved from database 30. The operator may review the displayed information and run various simulations, such as a 3-D bending simulation at step S.61, to view the various stages in the bending sequence and to understand the geometry of the part for that job. The operator may also review other information such as the required tooling and any other special instructions or messages that may have been recorded with the job information. After confirming the job information, the operator can then set-up the bending or other required machinery and operate the machinery to produce the specified sheet metal components. The job information that is retrieved from database 30 may include the final bending plan data, including the bending code to control the machinery at, for example, bending station 18. The set-up and actual operation of the machinery may thus be carried out by the operator, as generally shown at step S.63 in FIG. 4.

If no identical or similar job information is located and it is determined that the information relates to a new job (i.e., only preliminary job information has been entered at the server module 32 and complete job information has not yet been developed), then the partial part information and bend model data may be downloaded from database 30 and sent to the station module where it may be viewed by the operator at step S.77. Since the information requested relates to a new job, it will be necessary for the operator to develop and enter a bending plan, including the required tooling and bending sequence. Thus, at step S.79, with the information provided at the station module, the bending operator may develop and define the bending sequence and tooling selection for the new job. As will be discussed in greater detail below, a graphical user interface (GUI) and other features may be provided at the station module to facilitate the bending operator in developing the bending plan. The GUI may be provided to help the operator develop a bending plan by, for example, displaying tooling options, automatically checking for potential collisions between the part and tool(s), and simulating each of the intermediate steps in a proposed bend sequence. After developing and entering the bending plan at the server module, the operator may program the bending sequence at step S.80 to generate the bending code (i.e., the CNC or NC code for executing the bend sequence with the bending machinery). The bending code may be directly entered at the server module or imported to the server module by interfacing with, for example, a CNC or NC controller of the bending machinery. Thereafter, the operator may set-up and test the bending plan at the bending work station at step S.81. When all of the necessary testing and any necessary modifications to the bending plan have been completed, the final bending data may be entered and saved to database 30 at step S.83. The final bending data may include the bend sequence and tool set-up information, as well as the bending program. This information may be sent from the station module of, for example, bending station 18 to database 30 so that it may be saved with the other design and manufacturing information associated with the new job.

If it is determined at step S.57 in FIG. 4 that the information relates to a similar part of a previous job or the same part of a previous job but having, for example, a different reference or job number or batch size, etc., then logic flow may proceed to step S.65. At step S.65, the previous job information may be retrieved from database 30 and displayed at the bending station 18. The bending operator or user may then view the data to determine which changes to the data will be necessary for the similar part. Once again, the station module may include a series of menu display screens or directories to enable the operator to select which information to display and the manner in which the information is to be displayed or modified. For example, at step S.69, the station module may provide a 3-D bending simulation based on the retrieved information in order to facilitate the operator's development of a bending plan for the similar part. After reviewing the previous job information, the operator may modify the tooling and bending information, as well as the bending program, at step S.70. Other job information, such as the dimensions of the part, the reference number or batch size, may also be modified and edited at step S.70. Thereafter, at step S.71, actual tooling set-up and testing may be performed by the operator on the shop floor in order to test the modified bending plan. Upon completion of testing and any further modifications to the bending plan, the operator may enter at step S.73 the final bending data and store the same in database 30 under a new reference or job number. As noted above, the previous job information may be maintained in database 30 along with the other stored job files. Further, various database management functions may be provided for storing, deleting, renaming, etc. the files stored in the database.

Referring now to FIGS. 5–7, a detailed description of an example of a similar part search function that may be implemented in accordance with the teachings of the invention will be provided. In accordance with an aspect of the present invention, a similar part search procedure may be provided that utilizes a feature based topology similarity search algorithm to search and retrieve previous job information from database 30. The similar part search may involve a search for identical and/or similar parts based the design features and/or manufacturing information relating to the part to be produced. Further, the similar part search may be implemented through use of software or programmed logic residing within, for example, server module 32 and/or the various station modules throughout the factory 38. The similar part search may be executed from server module 32 or any of the station modules of the locations 10, 12, 14 . . . 20 within the sheet metal bending factory 38. A high level programming language, such as C++ or Microsoft's VISUAL C++ programming language, and object oriented programming techniques may be utilized to implement the various processes and operations of the similar part search.

Figure 5A:
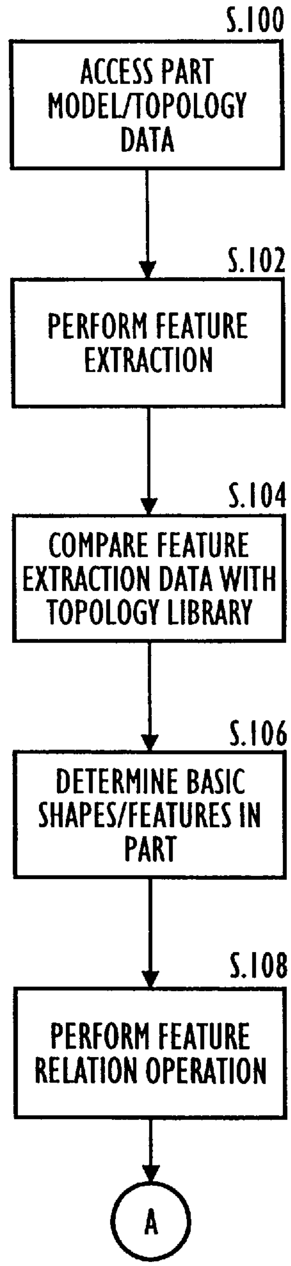
FIGS. 5A and 5B are flowcharts that illustrate the logic flow of a similar part search algorithm or process, according to an aspect of the present invention.
Figure 5B:
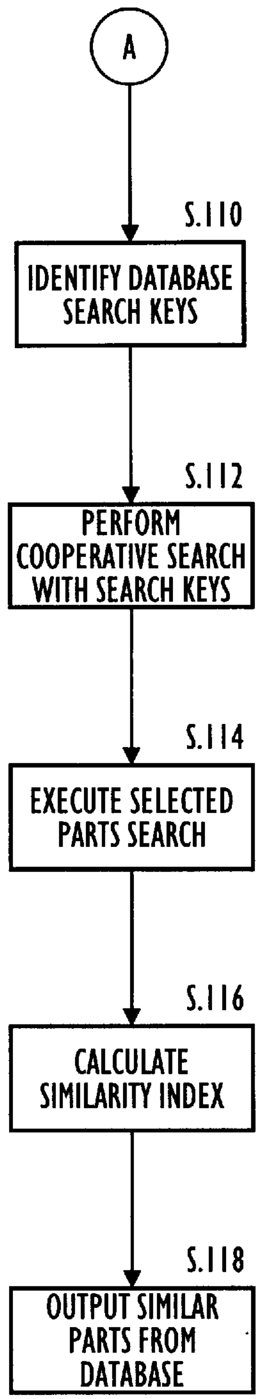

FIGS. 5A and 5B illustrate the logic flow of a similar part search algorithm or process that may be utilized. As shown in FIG. 5A, the relevant part model data file may be accessed at step S.100. The part model may comprise, for example, the bend model data developed at a CAD system located at design office 10 and/or the data developed and entered at server module 32. The part model data may include, for example, part topology data representing the orientation, geometric relationships and relative position of the various surfaces or faces and bendlines of the part. After the part model data has been retrieved, or after the bend model data for a part has been manually entered, a feature extraction operation may be performed at step S.102 to automatically derive feature extraction data for that part based on the bend model and/or part topology data of the part.

According to an aspect of the present invention, feature extraction data may be derived automatically by analyzing the various features of the sheet metal part. For example, various surface or face features and bend features may be analyzed to determine the similarities between various parts. For instance, the various faces of a part may be analyzed to determine whether adjacent faces have open or touching corners. Other features such as the existence of parallel bends, serial bends, collinear bends or opposite bends may be analyzed to determine and extract the distinct and unique features of each part.

Table 1 indicates various bend and face features that may be analyzed when performing a similar part search. The extraction features that should be included in the feature extraction operation include the positive bend and negative bend features, as well as the touch corner and open corner features. In addition, the feature extraction operation should also include at least feature analysis of parallel bends, serial bends, collinear bends, different phase, collinear bends and thickness offset bends.

TABLE 1

| Feature | Brief Description |
|---|---|
| PosBend | positive bend between two faces |
| NegBend | negative bend between two faces |
| P90Bend | 90 degree positive bend angle |
| N90Bend | 90 degree negative bend angle |
| MrPosBend | multiple positive bendlines between two faces |
| MrNegBend | multiple negative bendlines between two faces |
| ZBend | Z bend |
| heMBend | Hemming bend in positive direction |
| hemBend | Hemming bend in negative direction |
| TouchCnr | two faces touched in corners with same bend direction |
| OpenCnr | two faces open in corners with same bend direction |
| PrllBend | two parallel bendlines with same bend angle direction and opposite bendline direction |
| SerlBend | two parallel bendlines with same bend angle direction and same bendline direction |
| cLnrBend | collinear bendlines with same bend angle direction on one face |
| DfClnrBend | collinear bendlines with same bend angle and on different faces |
| tHkOffBend | thickness offset bendlines with same bend angle direction and on two neighboring faces |
| touchCnr | two faces touched in corners with opposite bend direction |
| openCnr | two faces open in corners with opposite bend direction |
| prllBend | two parallel bendlines with opposite bend angle direction and opposite bendline direction |
| serlBend | two parallel bendlines with opposite bend angle direction and same bendline direction |
| clnrBend | collinear bendlines with opposite bend angle direction on one face |
| thkOffBend | thickness offset bendlines with opposite bend angle direction on two neighboring faces |
| NoRelation | no relation between two faces |

The feature extraction operation performed at step S.102 may include a series of operations including analyzing the bend model data and topology for each feature, modifying the topologies, and developing feature based matrices from the topologies for further analysis. For purposes of illustration, FIGS. 6A–6G show an example of a feature extraction operation for a part consisting of a four bend box with touched corners and a part consisting of a four bend box with open corners. For purposes of illustration, FIGS. 6A–6G show the feature extraction based on the corner relationship of adjacent faces. For a closed, four bend box, with five faces (1–5) such as that shown in FIG. 6A, and for an open, four bend box, with five faces (1–5) such as that shown in FIG. 6B, the same simple face topology, such as that shown in FIG. 6C, may be provided to represent either part. This topology may be stored in and provided with the part or bend model data. The simple face topology of FIG. 6C, however, only provides basic information regarding the relationship of the faces (1–5) of the part and does not provide any information as to the various features of the part, such as the corner relationship between adjacent faces or the type of bends that are included. Accordingly, during the feature extraction operation, by analyzing the part or bend model data and the related face topology stored therewith, the basic face topology may be modified to contain additional information with respect to the various features of the part.

Figure 6A:
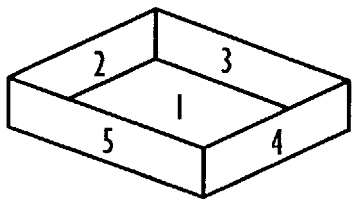
Figure 6B:
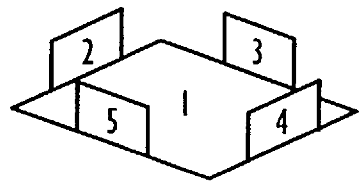
Figure 6C:
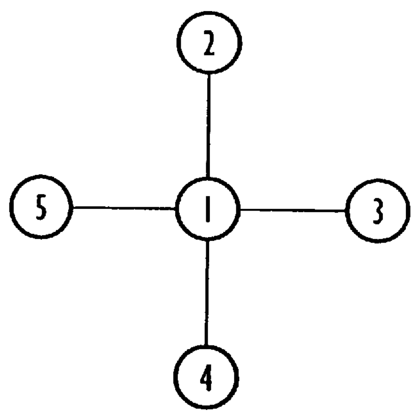

For instance, by examining the part or bend model data for the closed, four bend box of FIG. 6A, the corner relationship of adjacent faces may be analyzed and a modified face topology, such as that indicated in FIG. 6D, may be developed to indicate the touched corner status of the respective faces. Similarly, by examining the part or bend model data of the open, four bend box of FIG. 6D, a modified face topology, such as that shown in FIG. 6E, may be developed to indicate the open corner relationship between the various adjacent faces in the part. As shown in FIGS. 6D and 6E, special connectors may be added to the face topology to indicate the relationship (e.g., touched or open) between the corners of the faces. Other data may be added to the face topology data structure to indicate other features (e.g., the type of bends present, etc.) and to developed a featured based, face topology. After modifying the topology to include the feature based information, a matrix may be developed so that the extracted information may be more easily analyzed and compared. For example, based on the feature based face topology of FIG. 6D, a matrix such as that shown in FIG. 6F may be developed to indicate the various features of the closed, four bend box of FIG. 6A. Similarly, for the open, four bend box of FIG. 6B, a matrix such as that shown in FIG. 6G may be developed based on the feature based face topology shown for example in FIG. 6E. Other feature extraction data may also be indicated in the matrix, such as the bend features of the part (e.g., a 90° positive bend angle or a 90° negative bend angle, etc.).

As noted above, the features extraction operation of step S.102 may be performed by analyzing the bend model data and topologies to determine if various features are present in the part. In accordance with an aspect of the present invention, the feature extraction operation may be performed on the bend model and topology data provided for the part. This data includes all of the critical geometric and location data (e.g., in 2-D space (X,Y) and/or 3-D space (X,Y,Z)) relating to the sheet metal part, including face data, bendline data (e.g., bendline length and location, etc.), face-bendline relationship data, bend angle data, and special features data (e.g., data relating to special bending such as Z-bends and Hemming, etc.). The lines, bendlines and other entities may be defined by endpoints and/or vectors. For example, each 2D line may be specified by a set of 2D endpoints (e.g., X1, Y1 and X2, Y2) and each 3D line may be defined by a set of 3D endpoints (e.g., X1, Y1, Z1 and X2, Y2, Z2). Bendlines may be represented by vectors, which indicate 2D or 3D space location as well as direction of the bendline. Further, 2D arcs may be specified by 2D space data (e.g., CenterX, CenterY, Radius, Begin Angle, End Angle) and 3D arcs may be defined by 3D space data (e.g., CenterX, CenterY, CenterZ, View Matrix, Radius, Begin Angle, End Angle). Part topology data may also be provided to indicate the location of the various faces and bendlines of the part, as well as their geometric relationships to one another. Each face may be defined by a collection or linked data list of lines and/or arcs.

To extract features of the part, the feature extraction operation may be performed on the bend model and topology data to analyze and determine whether certain features are present in the part. This process may include analyzing the bend model and topology data for the part based on the various characteristics and relationships associated with each of the features to be extracted. By analyzing the bend model and topology data for the existence of the characteristics and relationships for each feature to be analyzed, the presence of features (such as a touched corner or open corner feature between faces, or a parallel or serial bends feature) may be detected. Different processes may be provided to detect the particular characteristics and relationships of each feature in the feature extraction operation. Based on the similarity of characteristics and relationships among the features to be analyzed, processes may be combined or developed to check for the existence of more than one feature in the part.

By way of a non-limiting example, a process that may be performed during the feature extraction operation of step S.102 in order to extract and detect corner features, such as a touch corner feature of two faces having the same bend direction (i.e., a TouchCnr feature in Table 1), will be provided. The process described below may also be applied to detect other features, such as a touch corner feature of two faces having with opposite bend direction (i.e., a touchCnr feature in Table 1) or open corner features between two faces having the same or opposite bend direction (i.e., a OpenCnr or openCnr feature in Table 1). The process may also be modified to detect other features (e.g., parallel bends, serial bends, etc.). In addition, the data relating to each possible combination of faces may be analyzed for the characteristics and relationships of each of the features to be extracted.

For example, for the touched corner feature TouchCnr, the basic characteristics or relationship to be detected include: two faces with a common face; the same bendline directions; non-parallel bendline directions; and bendlines with a common vertex (or vertices with a distance therebetween that is within a predefined range). For the touched corner feature touchCnr, similar characteristics or relationships should be detected; however, instead of the faces having bendlines that are in the same direction, the faces should have bendlines that are in the opposite direction (see, e.g., Table 1). The open corner features OpenCnr and openCnr may be similarly detected, however, for each feature the presence of an open corner between the faces (e.g., the bendlines of the faces are spaced apart by a distance that is greater than a predefined range) instead of a touched corner relationship, and the detection of the bendlines having the same bendline direction or the opposite direction (see, e.g., Table 1 and the definitions provided therein for OpenCnr and openCnr) should be analyzed.

To detect the touch corner feature (e.g., the TouchCnr feature in Table 1), the bend model and topology data for any two faces may first be analyzed to determine if the two faces are attached to a common face. This may be detected by looking at the bendline data for each of the faces and the bendline-face relationship data for each of the bendlines to determine if a common face exists. If the two faces are attached to a common face, then the bendline direction of each of the faces may be analyzed to see if they have the same bendline direction (or the opposite bendline direction if detecting, for example, the touchCnr feature). This may be determined by analyzing, for example, the vector data indicating the bendline direction for each of the faces.

If it is determined that the two faces have a common face and have the same bendline direction based on the bend model and topology data, then the data may be checked to detect if the bendlines are parallel. Various methods may be used to detect whether the bendlines are parallel based on the bend model and topology data. For example, the detection of parallel bendlines may be determined by taking the cross-product of the vectors defining the bendline directions. If the cross-product of the vectors equals zero (or is approximately zero), then it may be determined that the bendlines are parallel. If the cross-product of the vectors does not equal zero (or is not approximately zero), then the bendlines of the two faces are not parallel.

After determining that the two faces have a common face, the same bendline direction and the bendlines are not parallel, then the bend model data may be analyzed to determine the corner relationship between the faces (e.g., touched or open). The corner relationship of the two faces may be determined by detecting from the bend model data whether the bendlines of the faces have a common vertex. If the bendlines have a common vertex, then the two faces have a touched corner relationship with the same bendline direction (e.g., TouchCnr feature in Table 1). If the bendlines have a common vertex, but it was determined that the bendlines of the two faces do not have the same direction, then it may be determined that the two faces instead have a touched corner relationship with opposite bendline direction (e.g., touchCnr feature in Table 1).

If the bendlines of the two faces do not have a common vertex, then it still may be determined that the two faces have a touched corner relationship if the distance between the vertices is within a predefined range. Often, a minimum amount of space will be provided between adjacent faces of the part to provide clearance for passage of, for example, the punch tool. This spacing is usually defined by the width of the tool at the height of the flange. By way of example, a touched corner feature may be determined to be present if the spacing between the vertices of the bendlines of the two faces is within 0–5 mm. If the spacing between the corner of the two faces is greater than the predefined range, then it may determined that a open corner feature is present (e.g., the OpenCnr or openCnr feature of Table 1).

The above described process may be performed for every possible combination of faces in the part, to determine the corner feature of each of the faces. Other features relating to the faces and bendlines of the part may be conducted in a similar fashion by analyzing the part geometry and topology data. An exemplary code for performing the feature extraction operation of step S.102 is provided in Appendix A. The code was written in C++ programming language and includes the various processes for extracting and detecting features such as those noted in Table 1. Comments are provided in the code of Appendix A to facilitate the analysis of the logic and algorithms used therein. In addition, the terminology for the various features in Table 1 is maintained in the sample code to aid understanding of the same.

After detecting the various features of the part, the basic topology of the part may be modified to include the extracted features. While it may be useful to provide feature based topologies, such topologies can not be easily compared with one another. Instead, the inventors of the present application have discovered that it is more efficient and easier to compare feature extraction information when provided in the form of matrices. Therefore, according to one of the features of the present invention, a feature based part matrix (such as the representative matrix shown in FIGS. 6F and 6G) may be created based on the features detected during the feature extraction operation. The feature based matrix for the part may then be compared with other predefined and stored matrices to determine what basic shapes or features are included in the part.

A feature based matrix may be created and stored for each part after detecting and extracting the various features for the part. As shown in FIGS. 6F and 6G, the matrix may be a two dimensional matrix that is symmetric and that has an order that is equal to the number of faces in the part. The matrix may contain all of the detected feature information for the part, with the various features between each of the faces being provided in each of the locations of the matrix. The feature based part matrix may be temporarily stored in the memory of the server or station module and only used and compared with the predefined matrices during execution of the similar part search. Alternatively, the feature based part matrix may be permanently stored with the other job information in database 30 and accessed from any location within the factory.

Referring back to FIG. 5A, after the feature extraction operation has been performed, the resultant feature extraction data matrix may be compared with predefined feature extraction data matrices provided in a feature topology library. The feature topology library may be stored as a separate datafile in a database, such as database 30, or the memory of the server module or the station module. The feature library may consist of predefined matrices with feature extraction data corresponding to or defining basic or fundamental part shapes (e.g., a four bend box, a bridge, etc.). Each of the predefined feature based matrices, as well as the feature based part matrix, may be stored as ASCII or text files. The comparison at step S.104 may be conducted to determine the basic or fundamental shapes/features that are present in the sheet metal part, as illustrated at step S.106. A stored lookup table may be provided to indicate which fundamental shape corresponds to each of the predefined feature matrices. When a match is located, the lookup table may be accessed at step S.106 to determine which fundamental shapes are present. The matched matrices from the predefined library may be of the same order as the feature based part matrix (in which case the part is determined to exactly correspond and include only one fundamental shape), or may be sub-matrices of the part matrix (in which case the part may include more than one fundamental shape).

Recursive programming techniques may be utilized to compare the feature based part matrix with the matrices in the predefined library. By interchanging the indexes of the matrices when comparing the information therein, the use of data assignments may be avoided and the amount of required processing time reduced. The use of recursive programming techniques and interchanging of indexes also facilitates the comparison of matrices that have different orders and different base faces.

According to an aspect of the present invention, the comparison operation that is performed at step S.104 may consist of a series of comparisons and may initially begin based on the comparisons of matrices relating to more complicated shapes (e.g., those shapes containing multiple bends or complex forming such as tabs) and then proceed through less complicated shapes (e.g., those shapes containing fewer bends or less complex bends or number of faces). This series of comparisons may be performed until a predetermined number of fundamental shapes are located in the part. For example, the comparison operation may be performed to extract the three most complicated features or shapes within any particular part. In addition, this operation may be performed by first conducting the series of comparisons on groups of matrices that relate to shapes that are more common or frequently found in sheet metal parts, and then proceeding to less common shapes. Various methods for comparing the part with the predefined library may be performed to provide useful results.

For example, the series of comparisons may be first applied to a right angle group of matrices that include fundamental shapes that include right angle bends, such as rectangular and square shapes with multiple right angle bends and simple parts with right angle bends. This group of matrices may be searched based upon a series of comparisons extending from more complex matrices within the group (e.g., a matrix corresponding to a four bend box with tabs) to less complex matrices within the group (e.g., a matrix relating to a simple hat part). The series of the comparisons may then be applied to a polygonal part group of matrices and then a special features group of matrices. The polygonal part group may include matrices defining parts having more than five sides and at least one bend angle that is greater than 90 degrees. The special features group of matrices may include matrices within the predefined library that relate to parts with special features or forming, such as Z-bends or Hemming. Once again, the series of comparisons between the feature based matrix of the part and the predefined matrices within each of the groups may be performed based on decreasing levels of complexity. Thereafter, other groups of predefined matrices may be compared, such as a multiple features group of matrices that includes parts that have two or more features on a single face of the part.

By comparing the part with the matrices in the predefined library in order of complexity, and by applying the series of comparisons to groups of matrices based on frequency of appearance and use, a more effective and efficient comparison of the library may be conducted to determine the fundamental shapes in the part. In addition, an overlap of detected features is prevented and only the more complex shapes are identified.

At step S.108, a feature relation operation may be performed to determine the relationship between the fundamental features or shapes located in the part. The relation between the features or shapes may be defined in terms of distance. The distance between any two shapes may be determined based on the number of bendlines or faces between the base face of each of the shapes. Alternatively, the relationship between features may be defined in terms of the physical distance or real dimension between the features, by geometrically analyzing the part and the relative position and distance between the base face of each of the features.

Figures 7A, 7B, 7C:
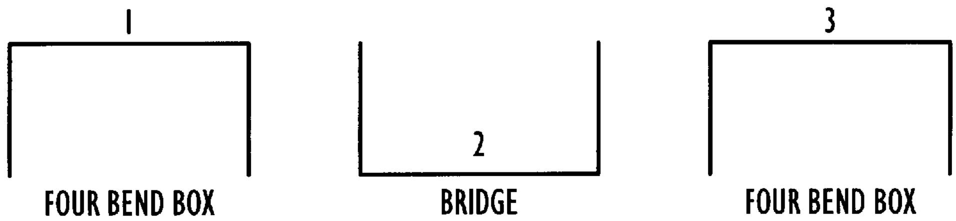
FIGS. 7A, 7B and 7C illustrate, in accordance with another aspect of the present invention, a feature relation operation and process for identifying search keys for a part having a four bend box, a bridge and another four bend box.

Assume, for purposes of illustration, that the three most complicated features or shapes determined at step S.106 for the part consist of a four bend box, a bridge, and another four bend box, as shown in FIG. 7A. A feature relation operation performed on such a part may be conducted to determine, for example, the number of bendlines between the base surface or face of each fundamental feature. As shown in FIG. 7B, the feature relation between the base (1) of the first four bend box and the base (2) of the bridge is a spacing of two bendlines. Further, the relation between the base (1) of first four bend box and the base (3) of the second four bend box is a spacing of four bendlines, and the relation between the base (2) of the bridge and the base (3) of the second four bend box is a spacing of two bendlines.

Various processes may be provided for determining the number of bendlines between the base faces of the fundamental shapes of the part. For example, a matrix analysis of the feature based part matrix and the predefined shape matrices may be utilized to determine the feature relation in step S.108. First, the corresponding base faces of each of the fundamental shapes may be located in the part matrix. This may be performed by correlating the base face of the predefined shape matrix with the face index in the part matrix. As discussed above, the predefined shape matrices isolated during the comparison operation may be submatrices of the part matrix. In order to locate the corresponding base face for each fundamental shape in the part matrix, the location of the shape matrix within the part matrix and the correlation between the indices of the matrices may be analyzed. With the base face of each of the fundamental shapes being predefined and located within the first column of the shape matrix, the corresponding location and base face within the part matrix may be located.

After determining the base faces of each of the fundamental shapes in the feature based part matrix, the distance between the base faces of each shape may be analyzed to determine the feature relationships. This analysis may include a search process to identify the distance between any two base faces. By looking at the feature and bendline information in the part matrix, the number of bendlines between any two base faces may be determined. If more than one path is possible between two faces, the minimum distance may be used to define the feature relation at step S.108.

After performing the feature relation operation, logic flow continues to step S.110. As shown in FIG. 5B, an identification of database search keys may be performed at step S.110 in order to determine the search keys to be utilized in the similar part search of the database. The search keys may consist of any number of combination of features and feature relations identified for the part. In addition, any hierarchy of criteria may be used for assembling the search keys. By way of a non-limiting example, the search keys may be developed by the following criteria: (i) the first and second most complicated features or shapes identified in the part; (ii) the distance or feature relation between the two most complicated features; (iii) the third most complicated feature or shape identified in the part; and (iv) the feature relation or distance between the first most complicated feature and the third most complicated feature, and the distance or feature relation between the second most complicated feature and the third most complicated feature identified in the part. FIG. 7C illustrates the search keys that may be developed based on the example of FIG. 7A.

In order to simplify the search of the database, the search keys may be represented by a string of integers, with predetermined codes being assigned to the various fundamental shapes defined in the topology library. For example, assume that the integer code "16" was assigned to a four bend box, and that the integer code "32" was assigned to a bridge. In such a case, the search keys of the example in FIG. 7C would be represented by a string of integers comprising "16, 16, 4, 32, 2, 2", wherein "4" and "2" represent the various distances between the fundamental shapes or features. The representation of the search keys, however, is not limited to integer strings and any combination of integers and/or character strings may be used to represent the search keys.

The search keys for each part may be stored with the job information (as a separate file or in the same file) in a database, e.g., database 30. The search keys, which are representative of the feature extraction data, may be manually entered or automatically developed, as described above. Additional feature extraction data, such as the feature based part matrix, may also be stored with the search keys. If the search keys are stored in a separate data file, a lookup table may be provided for locating the part information associated with each set of search keys. Alternatively, the search keys may be saved with a data field identifying the part information (e.g., by part or reference number).

At step S.112, a cooperative search of the database is performed based on the identified search keys. The cooperative search is a search using a cooperative database search technique. The cooperative search technique not only locates parts with identical search keys, but also parts having similar search keys. This enables the identification of similar and identical parts in the database. When a search is performed based on a particular part, the identified search keys for that part may be compared with the other search key data in the database. The cooperative search performed at step S.112 may be adapted to identify those items in the database which exactly match or are most similar to a particular part defined by the search keys, by relaxing or modifying the sequence of search keys. Various processes and methods may be employed for adapting the search keys during the cooperative search.

For example, an initial search of the database is performed to identify parts having the exact sequence of search keys as that identified for the part to be searched. This is performed by comparing the identified search keys with the search keys stored in the database. After identifying the parts (if any) with the same search keys, subsequent searches of the database may be performed based on different modified search key sequences to locate other similar parts. Initially, the items or criteria within the search keys that are less critical or sensitive (such as the feature relation or distances) may be modified and searched before modifying the more critical or sensitive search items (such as the fundamental features or shapes located within the part). In addition, each of these items may be modified in terms of their importance, with more weight or importance given to those items relating to the first and second most complicated features or shapes located in the part. For instance, a first subsequent search may be performed after modifying the defined distances between the third most complicated feature and the first and second most complicated features. The distance may be modified by increasing the distance by a predetermined number of bendlines (e.g., 1–3) or defining a predetermined range for the distance based on the current value for the distance. Thereafter, the distance between the first and second most complicated features or shapes may be altered to provide another set of modify search keys for searching the database. After modifying the feature relation or distance search keys for the part, the identified shapes may be altered to derive additional modified search keys in the cooperative search. For example, the search key item relating to the third most complicated feature or shape may be changed to a related but less complex shape depending on the current feature or shape (e.g., from a four bend box with tabs to a simple four bend box). In addition, the search keys for the first and second most complicated features may be similarly altered to provided further modified search keys for the cooperative search.

The manner in which the distance and feature/shape related to the search keys are modified during the cooperative search may be executed according to various methods and techniques. As described above, the amount by which to vary the distance may depend on the current value of the distance. The distance amount (e.g., 4 bendlines) may be modified to a distance range (e.g., 3–5 bendlines) to expand and make the search more cooperative. For the features or shapes, modification of the search keys may also be performed to identify similar parts. The features or shapes may be modified through a hierarchical structure of feature types. For example, the current feature type (e.g., a four bend box) may be modified to a less complex feature type (e.g., a three bend box) that is related and within the same feature type. The hierarchical structure by which the features/shapes are modified may be predetermined and developed based on different methodologies, such as type abstraction hierarchy (TAH). More information on TAH and TAH generation are provided, for example, in CHU et al., Wesley W., *Cooperative Query Answering via Type Abstraction Hierarchy*, CSD-900032, Department of Computer Science, University of California, Los Angeles, (October 1990) and CHIANG, Kuorong, *Automatic Generation of Type Abstraction Hierarchies for Cooperative Query Answering*, a dissertation submitted as part of the requirements for a Degree of Philosophy in Computer Science, University of California, Los Angeles, (1995), the disclosures of which are expressly incorporated herein by reference in their entireties.

Other processes and steps may be performed during the cooperative search. For example, in addition to searching the database based on the identified search keys relating to the features of the part, searching may also be performed based on search criteria relating to the manufacturing information for the part. For instance, additional search keys may be utilized to compare, for example, the machine set-up required for each part. The machine set-up information may include the type of machine or machinery required to produced the part, the tool(s) and tool set-up used to produce the part, and/or the backgaging setting(s) of the machinery. The additional search keys may be developed based on the machine set-up information and/or other manufacturing information and be used along with the identified search keys when performing the cooperative search of the present invention. As a result, the parts that are identical or similar to the part to be produced may be identified based on both the design and manufacturing features of the part.

In order to select the most similar parts, a selected parts search may be executed at step S.114 to perform a more detailed comparison of the results from the cooperative search and to select a predetermined number of parts that are the same or most similar to the part searched. The selected parts search may involve the analysis of additional information or characteristics of each of the parts identified from the cooperative search. This may involve analyzing various features of the located parts, such as the dimensions of the part or the types of holes or openings in the part, which are not provided from the search key data. This may also involve comparing the manufacturing information relating to each of the located parts, such as the machine set-up required for each part. As noted above, the machine set-up information may include the type of machine or machinery required to produced the part, the tool(s) and tool set-up used to produce the part, and/or the backgaging setting(s) of the machinery. In order to perform the selected parts search, the bend model and other job information for each part may be accessed from the database based on the search keys identified during the cooperative search. As noted above, a lookup table or additional data field may be provided to provide the job reference number or code associated with each set of search keys. After retrieving the part information from the database, the additional information concerning each part (e.g., part dimension, material type, special forming, part holes or openings, etc.) may be analyzed to determine which parts are most similar to the part searched. This process is optional and may act as an additional screening process for selecting and grouping those parts from the database that are most similar to the part. By analyzing and matching this additional information or characteristics of the part, the selected parts search may be performed to identify or select a predetermined number or set of most similar parts. For example, the selected parts search may identify the five most similar parts based on the number of matching search keys and matching additional part characteristics. The number of parts to be selected from the selected parts search is not limited to five, and may be selected based on the needs of the factory and the number of the parts actually stored in the database. This number may also be selectively modified to provide more effective and useful search results, and the user may be given the opportunity to modify this number to vary the search set.

After performing the selected parts search, a similarity index may be calculated at step S.116 to rank the parts (in terms of similarity of features and number of matching search keys) identified in the selected parts search. The similarity index may be calculated and provided as output at the server or station module at step S.118, so that the user may select which job files are to be retrieved from the database and provided for viewing. The similarity index may provide a ranking of the selected parts (e.g., a ranking of 1 through 5 with the job or reference number for each part) based on the level of similarity of features between the selected parts and that of the searched part. For this purpose, the feature based matrix for each of the parts may be compared to that of the searched part. Comparing the feature based matrices may provide a better indication of the similarity between the selected parts and the searched part. As noted above, a feature based part matrix may be stored along with search keys for each part. However, permanently storing the feature based part matrix for each previous job along with the search keys may unnecessarily take up a large amount of memory space (particularly when a large number of parts are stored on the database). As such, it is possible to only store the search key data for each of the parts and to automatically generate the feature based matrix for each of the selected parts when a similar part search is performed.

Accordingly, after the bend model and other job information has been retrieved for each of the selected parts, a feature based matrix may be developed through the feature extraction operation of the invention, as described above with respect to step S.102. The feature based matrix for the searched part, which may be temporarily stored during a similar part search, may then be compared with each of the developed feature based matrices of the selected parts. Various methods and processes may be utilized to compare the feature based matrices of the parts and to determine the similarity between the parts. For example, for each feature based matrix of the selected parts, the locations within the matrix may be compared with those of the searched part. Each location within the matrices may be compared based on recursive programming techniques. The information in the matrices may be compared by determining the location of corresponding base faces in each matrix and interchanging the indexes of the matrices. Since the selected parts may correspond to or have shapes that are sub-features of the searched part, and since the indexes of the matrices may not be identical or numbered in the same way, it will be necessary to locate comparable faces in the part matrices and to switch the indices when comparing the information therein. In addition, where more than one sub-feature is located in a searched part, it may also be necessary to introduce one or more pseudo faces (i.e., face columns and rows in the matrix with no or blank information) in order to provide matrices of the same order when comparing the information in the matrices.

When comparing the information in the matrices, different ranking schemes may be used in order to determine the level of similarity between each of the selected parts and the searched part. For example, a penalty based ranking scheme may be used wherein a predetermined penalty level or amount is assigned for each non-matching location within the matrix. After comparing all of the information in the matrices, the total penalty level for each selected part may then be used to determine the similarity index. The selected part with the lowest penalty level may be determined to be the most similar part to the searched part. The other selected parts may also be ranked based on the total penalty level associated with each part (e.g., the lower the penalty level the higher the similarity index).

In accordance with another aspect of the present invention, the penalty levels for each non-matching location may be assigned based on the type of information located therein. The penalty level may be an integer amount and may be varied based on the criticality or importance of the non-matching information. For example, a higher penalty level or amount may be assigned for non-matching locations relating to different and unrelated feature groups (e.g., a parallel bend feature versus a serial bend feature). In contrast, for non-matching locations relating to different but similar feature groups (e.g., a touch corner feature with same bendline direction versus a touch corner feature with opposite bendline direction). The penalty levels or amounts may be predetermined and categorized based on the type of information and the type of difference present for non-matching locations.

An exemplary code for performing the similarity index operation of step S.116 is provided in Appendix B. The code was written in C++ programming language and includes the various processes and operations described above with respect to comparing the matrices and assigning penalty levels for non-matching location. As noted above, the resultant total penalty levels for each selected part that was compared may be used to derive and display the similarity index. The code listing in Appendix B includes comments to facilitate understanding of the logic and structure of the exemplary program code therein.

Figure 12:
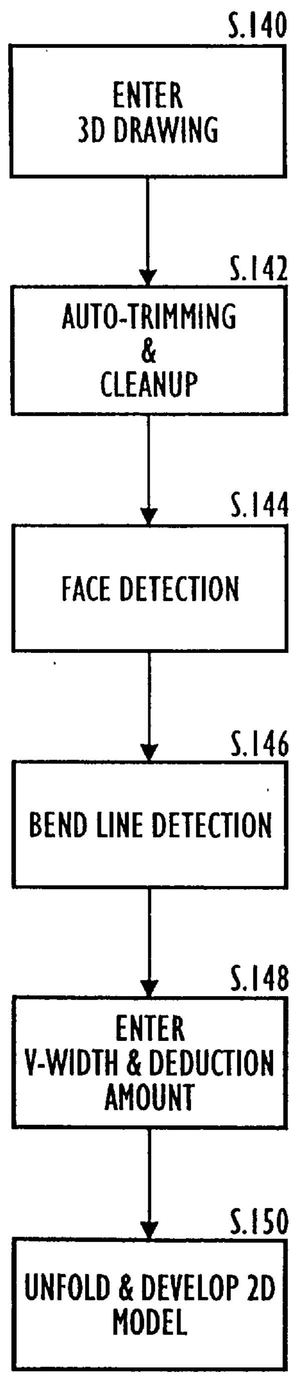
FIG. 12 is a flow chart of the basic logic flow for developing a 2-D model based on an original 3-D drawing (with no thickness) using an unfolding algorithm and other processes, according to the teachings of the invention.

Referring now to FIGS. 8–16, a more detailed description of the various processes and operations that may be performed for developing the bend model data and developing the 2-D and 3-D models of the part based on various 2-D and 3-D drawings will be provided in accordance with an aspect of the present invention. As discussed above, the bend model data associated with each sheet metal component includes data relating to both the 2-D and 3-D representations of the part. Based on the type of original drawings provided or developed based on the customer's order, various folding and unfolding algorithms and other processes may be utilized to develop the 2-D and 3-D models. In particular, FIGS. 8–11 show an example of the logic flow of the folding algorithm and other processes that may be utilized for developing a 3-D model based on an original 2-D, single view drawing of the part. Further, FIG. 12 shows an example of the basic logic flow of the unfolding algorithm and other processes that may be used for developing a 2-D model based on an original 3-D drawing (with no thickness). Lastly, FIGS. 13–15 and FIG. 16 show examples of the logic flow of the various processes and operations that may be implemented to develop a 3-D model with no thickness from, respectively, a 2-D, three view drawing and a 3-D drawing with thickness. The resultant 3-D model (with no thickness) that is developed from these processes and operations may then be utilized to develop a 2-D model based on an unfolding algorithm or process, such as that disclosed herein.

Figure 8:
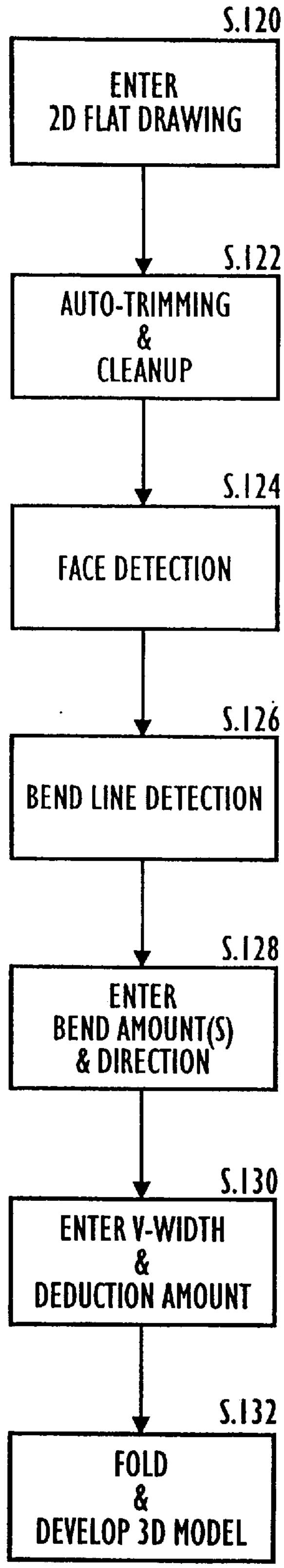
FIG. 8 is a flow chart that illustrates the logic flow of the processes and operations that may be performed to develop a 3-D model from a 2-D, single view drawing using a folding algorithm.

FIG. 8 illustrates the logic flow of the processes and operations for developing a 3-D model from a 2-D, single view drawing using a folding algorithm. The functions and operations performed in the flow chart of FIG. 8 may be implemented with software or programmed logic residing in, for example, server module 32. At step S.120, the 2-D, single view flat drawing that was provided or originally developed based on the customer's specifications is entered or imported to the server module 32. The 2-D flat drawing may be developed and entered into the server module 32 through the use of CAD software, or may be imported to the server module by interfacing with an appropriate CAD or CAD/CAM system, such as VELLUM or CADKEY. The 2-D drawing may be stored, for example, as a DXF or IGES file and may illustrate the punched and/or cut stock material that is to be bent. The 2-D flat drawing may also indicate the location of the bending lines and the location of holes or other openings in the surfaces or faces of the sheet metal part. In order to prepare the 2-D drawing for later processing, an auto-trimming and cleanup function may be performed by server module 32 at step S.122, before a succeeding face detection process is performed at step S.124 and a bendline detection operation is executed at step S.126.

The auto-trimming and cleanup function of the present invention is provided in order to prepare the 2-D flat drawing for processing. The 2-D flat drawing is a 2-D representation of the sheet metal part in its unfolded state and includes part entities, such as lines and arcs, that make up and represent the geometry of the part, as well as indicate the location of any openings or holes in the part. Normally, the entities of such 2-D flat drawings are entered and developed using a CAD or CAD/CAM system. However, when constructing the 2-D flat drawing, such entities are often improperly connected or overlapped, and a single entity may be used to indicate the boundaries of more than one face. Further, outside lines defining the boundary of the part may be disconnected at their adjacent corners, making it difficult to detect the out dimensions of the part and each face. Further, the 2-D flat drawing may include extraneous information, such as dimensional information and text. Such irregularities make it difficult to properly analyze the original 2-D drawing and to uniformly detect the faces and bendlines of the part. By providing the auto-trimming and cleanup operation of the present invention, each of the faces may be represented by a unique set of connected entities. As a result, the 2-D flat drawing may be more easily and efficiently analyzed for subsequent processing and eventual folding in order to develop the 3-D model representation.

Figure 9A:
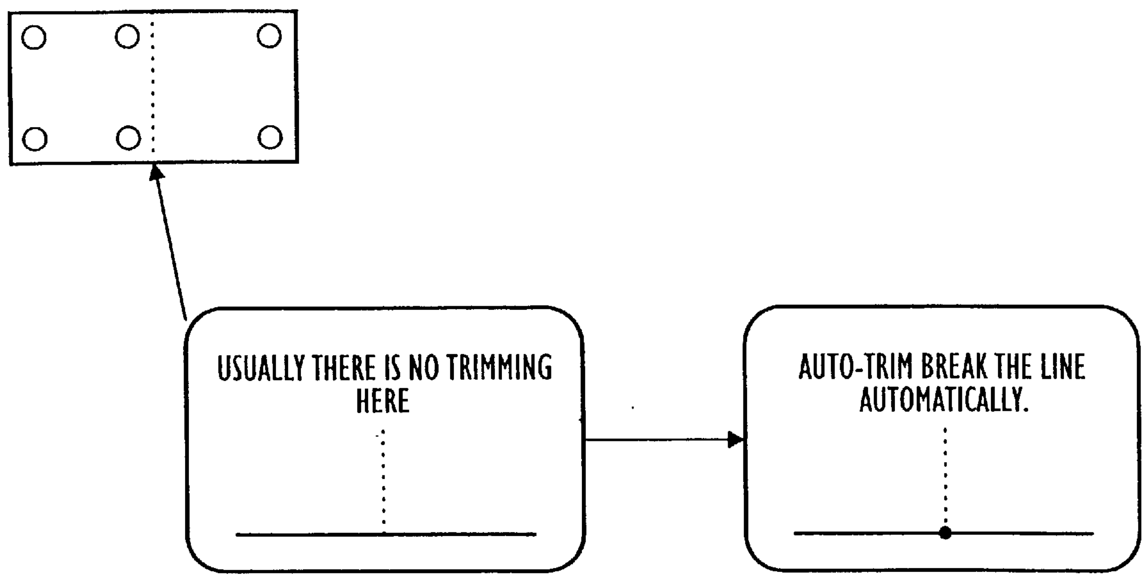
FIGS. 9A, 9B, 9C, 9D and 9E illustrate examples of an auto-trimming function and cleanup function that may be performed to prepare a drawing for a face detection process.

As shown in FIG. 9A, an original 2-D drawing may not provide trimming between faces and a single line entity in the drawing may define the outer boundary or boundaries of more than one face. As discussed above, such an arrangement makes it difficult to detect each of the faces. The auto-trimming function of the present invention may be provided to analyze the end points and intersection points of each of the part entities (such as lines, arcs and bendlines), in order to determine connectivity information and to break such entities at their intersection points. Such a trimming function may include setting the endpoints for each of the broken entities to the determined intersection point. For example, trimming of the intersection point illustrated in FIG. 9A would result in three meeting entities (two lines and one bendline), each having a common endpoint at the intersection point. By providing such a trimming function, the faces of the part may be more easily detected based on entity analysis and connectivity. A more detailed description of a face detection operation that may be implemented is provided below with reference to FIGS. 10A–10G.

Various processes and operations may be utilized to detect the intersection points of the entities of the 2-D drawing. Such processes and operations may be developed based on the format and arrangement of the data in the 2-D drawing file. Typically, a 2-D flat drawing will include geometrical data (defining the various part entities, etc.) and non-geometrical (e.g., text, etc.) data. It is possible to distinguish between the geometrical data from the non-geometrical data based on the keywords provided for each line or sequence of data. Such keywords are set in accordance with the data format of the 2-D drawing. Common formats for 2-D and 3-D drawings include DXF and IGES formats. By analyzing the geometrical data for each of the entities, the end points and intersection points for such entities may be detected and, where appropriate, trimming may be performed.

As discussed above, the lines, bendlines and other entities may be defined by endpoints and/or vectors. For example, for a 2-D flat drawing, each 2-D line may be specified by a set of 2-D endpoints (e.g., X1,Y1 and X2,Y2) and bendlines may be represented by vectors, which indicate 2-D space location as well as direction of the bendline. Further, 2-D arcs may be specified by 2-D space data (e.g., CenterX, CenterY, Radius, Begin Angle, End Angle). The geometrical data may also include attributes to distinguish between the various types of line entities (e.g., arc, solid line, dashed line, dot-dashed line, etc.). Typically, arc entities are used to indicate holes and openings in a sheet metal part, and solid lines are used to indicate the boundaries and shape of the part. Bendlines are usually represented by dashed lines, and the centerline of the part is represented by a dot-dashed line.

The geometrical data from the original 2-D flat drawing may be analyzed to determine the intersection points between each entity. Various data analysis techniques, such as data assignment or recursion, may be used to analyze the geometrical data for each entity of the 2-D drawing. Based on the endpoints and/or other 2-D space data for each entity, simple geometrical analysis may be applied to determine whether lines and other entities intersect. If two entities are determined to intersect, then each entity may be broken at the determined intersection point and the resultant entities may have their endpoints assigned to a common point defined by the intersection point.

Figure 9B:
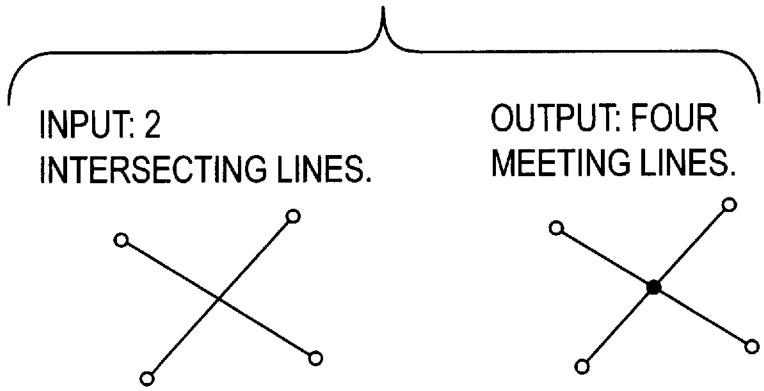
Figure 9C:
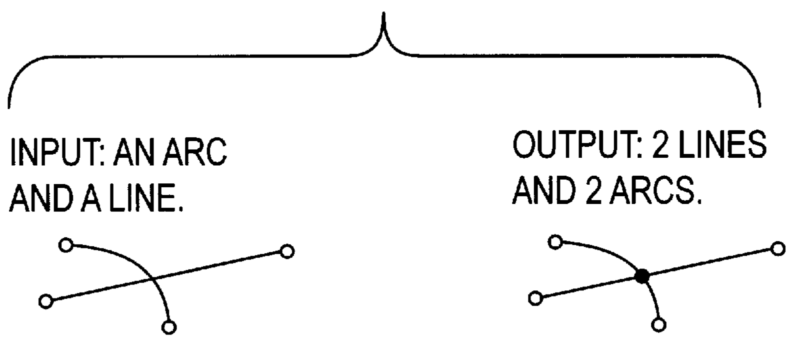
Figure 9D:
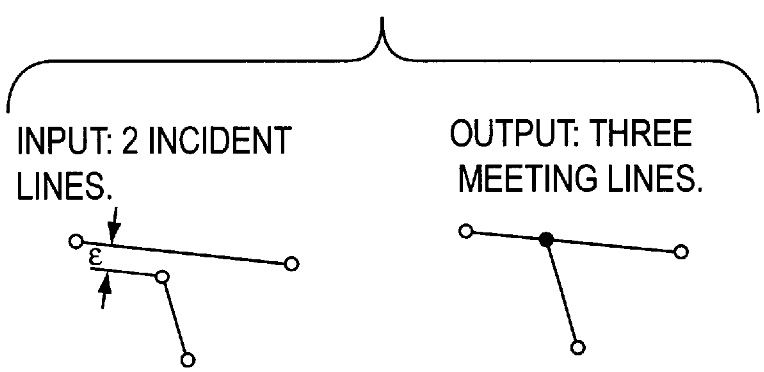
Figure 9E:
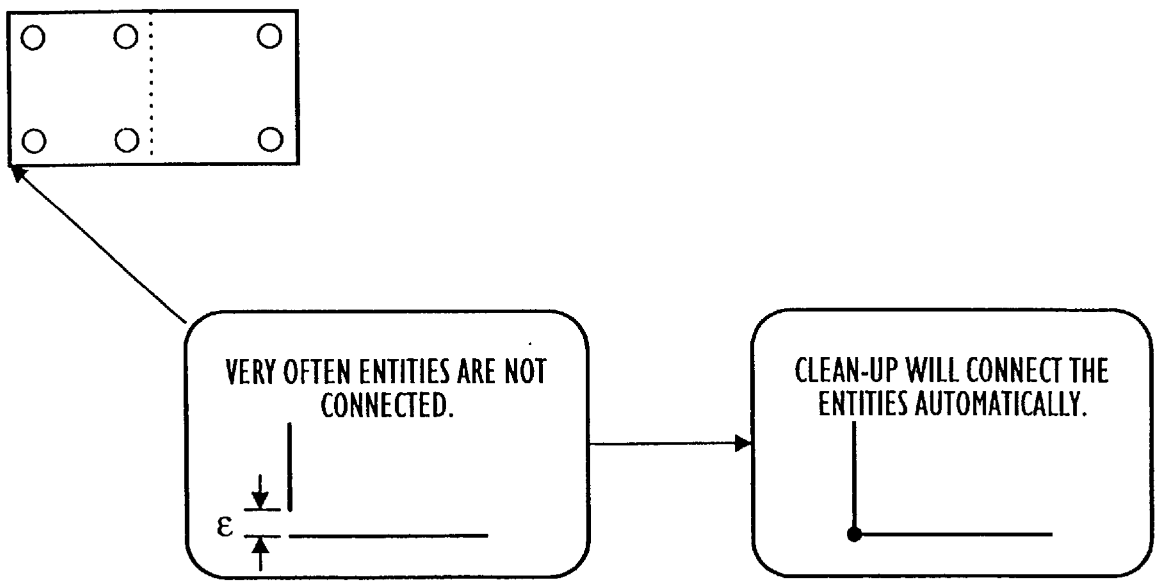

The manner in which trimming is performed may be based on the type of entities that are detected to intersect. For example, if two solid line entities are detected to intersect, then each line entity may be broken to provide four line entities that meet at the determined intersection point, as shown in FIG. 9B. Further, if a line entity and arc entity are determined to intersect, such as that shown in FIG. 9C, then each entity may be broken to provide two line entities and arc entities that have common endpoints. Detection of the intersection of other entities, however, may not result in trimming. For example, if any entity is determined to intersect with a centerline (e.g., a dot-dashed entity), then no breaking of the entities is required, since the centerline of any part does not define or distinguish the faces or bendlines of the part and trimming is not required. In addition, unconnected entities may be broken if the open intersection or area is within a predetermined tolerance. For instance, if the endpoint of a potentially intersecting line is within a predetermined tolerance or distance ϵ (e.g., 0.0–0.01 mm, or 0.0–0.001 inches) of actually intersecting another entity, then the entities may be treated as connecting and intersecting at that projected point; and the entities may be broken, as shown, for example, in FIG. 9D.

After auto-trimming has been performed, the resultant data may then be processed by a cleanup function to detect and correct non-connected entities; however, the present invention is not limited to such processing; and, in order to reduce processing time, the cleanup function may performed simultaneously with the auto-trimming function while each of the entities are being analyzed. During cleanup, the geometrical data of the 2-D drawing is analyzed to detect open intersections or areas between adjacent entities. As with the auto-trimming function, the endpoints and other 2-D space data of each entity may be analyzed to detect an open intersection areas between the entities. Simple geometrical analysis may be applied to such data to determine whether the endpoints of the entities are within a predetermined tolerance or distance E (e.g., 0.0–0.01 mm, or 0.0–0.001 inches) of one another. If the endpoints of the entities are determined to have such an open intersection, then the entities may be connected and assigned a common endpoint, such as that shown in FIG. 9E.

Once again, the manner in which the cleanup function is performed may be controlled based on the type of entities that are detected to have an open intersection. If two solid lines are detected to have an open intersection, then the endpoints of the lines may be assigned a common endpoint (see, for example, FIG. 9E). However, if any entity is determined to have an open intersection with a centerline of the part (e.g., a dot-dashed entity), then the entities should not be connected nor assigned a common endpoint and the centerline entity should be ignored. In addition, the cleanup function may include additional processes or operations for deleting the non-geometrical data (text, etc.) from the 2-D drawing. As noted above, the non-geometrical data may be distinguished from the geometrical data based on the keywords provided with the 2-D drawing data. The cleanup function may also incorporate other cleanup functions, such as those described in greater detail below with reference to the 2-D cleanup function of the invention (see, for example, FIGS. 14A–14E).

After the auto-trimming and cleanup functions are performed at step S.122, a face detection procedure may be performed on the processed 2-D drawing, at step S.124. In accordance with an aspect of the present invention, the face detection procedure may include face detection logic for detecting and defining the faces of the part based on entity (line and arc) and loop analysis. FIGS. 10A–10H illustrate an example of the various processes and operations that may be performed in the face detection procedure. Loop detection techniques may be used in the present invention to determine and detect the faces of the part. The face detection procedure may be implemented through software or programmed logic residing at, for example, server module 32.

According to an aspect of the present invention, a loop detection analysis of the outside boundary of the part followed by analysis of the minimum or inside loops of the part may be utilized to detect each of the faces. Due to the unique geometry of sheet metal parts, the faces and openings of the part may be detected based on the analysis of the sequence of the relative maximal (e.g., outside) and minimal (e.g., inside) loops. As discussed below, loop analysis may be performed based on the connectivity of the line and arc entities of the part. By performing loop analysis from the outside of the part and proceeding towards the center of the part, the openings and faces of the part may be detected based on the boundaries defined between the loops in accordance with a cyclic sequence (e.g., face material, opening, face material, opening, etc.).

Figure 10A:
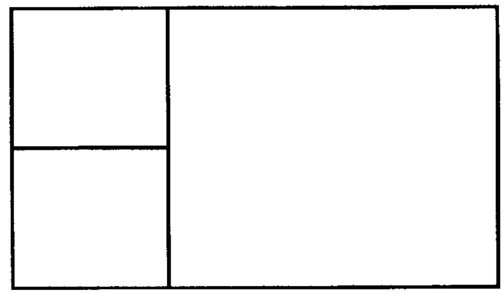
FIGS. 10A, 10B, 10C, 10D, 10E, 10F, 10G, and 10H illustrate the various processes and operations that may be performed in a face detection process, in accordance with an aspect of the present invention.
Figure 10B:
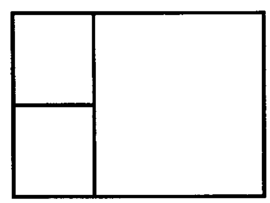
Figure 10C:
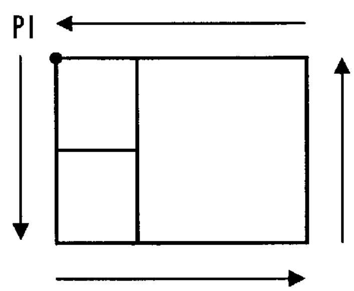

Assume that a 2-D flat drawing, such as that shown in FIG. 10A, is provided with various line entities for each face as shown in the drawing. As noted above, loop and entity analysis may be performed by starting from the outside boundary of the part. Any entity on the outside boundary of the part may be used as an initial reference point. By way of non-limiting example, the left most side line entity may be detected and used as an initial reference point, as shown in FIG. 10B. The left most side line entity may be detected by comparing the geometrical data of each of the entities in the 2-D drawing and determining which entity has the lowest X-coordinate value. After the left most line entity has been detected, an outward appearance of the part may be derived from a point P1 to detect the outside boundary of the part, as shown in FIG. 10C. Either endpoint of the left most line entity may be used to define point P1. In the illustrated embodiment of FIG. 10C, the upper endpoint (i.e., the endpoint with the greatest Y-coordinate value) has been used as point P1.

Conventional loop analysis techniques may be used to derive the outward appearance or loop about the part. For example, lead line vectors may be projected from the initial point P1 and the endpoints of the connecting entities as the outward appearance of the part is followed. As each entity is detected and traversed, a flag may be provided to indicate that the entity has been picked (e.g., a flag in memory may be set to 1 to indicate that it has been selected once). The loop path may be initiated in either direction from the initial point P1. For example, the lead line vector may be projected in the counterclockwise direction (e.g., by projecting the lead line vector in the Y-coordinate direction) from the point P1. The loop is completed when the loop path returns to the initiating point (i.e., point P1).

As noted above, from the initial point P1 a lead line vector may be projected in the counterclockwise direction (e.g., by initiating the first lead line vector in the Y-coordinate direction). Thereafter, in order to detect the first entity in the path of the loop, the angle that each unselected entity about point P1 forms with the lead line vector is measured and analyzed based on a coordinate frame, with the entity that forms the smallest angle with the lead line vector being selected. For the outside loop, each angle may be measured based on the outside angle that the entity line forms with the lead line vector. The entities about point P1 may be determined based on which entities have an endpoint that is common to point P1. The unselected status of each entity may be determined by analyzing the flag associated with each entity. As shown in FIG. 10C, two entity lines (one extending in the X-coordinate and one extending in the Y-coordinate) are provided about P1 in the exemplary 2-D drawing illustrated therein. When analyzing these entities, the line entity that extends in the Y-coordinate would be selected since it forms a smaller angle (i.e., 0 degrees) with the lead line vector than the angle (i.e., 270 degrees) of the other line entity.

The loop analysis would then continue to the other endpoint of the selected line entity, which would have a flag set to indicate that it has been selected. At that endpoint, another lead line vector would be projected and the unselected entities about that point would be compared to determine which forms the smaller angle with the lead line vector. Once again, the angle should be measured from the outside of the lead line vector and a coordinate frame may be used to determine the angle amount. If an arc entity is encountered, then the angle should be measured from the outside of the lead line vector to a line that is tangent to the arc. Further, if only one entity is about the next endpoint (such as at the corner positions of the part), then no comparison is necessary and that entity is simply selected and included in the loop.

Figure 10D:
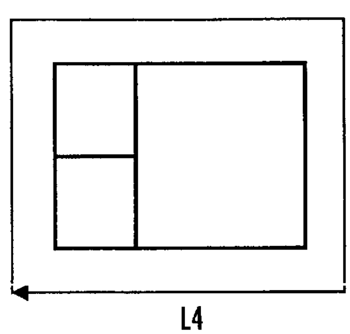

As the loop path proceeds about the outward appearance of the part, each selected entity may be included in a linked list to indicate the connectivity of the entities within the loop. When the path returns to the initial point P1, the cycle is complete and the loop may be defined (L4) based on the outward appearance and the linked list of entities or lines that indicate the outside boundary of the part. Each of the lines or entities within the loop L4 may be connected at their end points. The direction of the loop L4 may be turned in the opposite direction (i.e., clockwise), as shown in FIG. 10D, in order to indicate that it is an outside loop. The direction of the loop may be defined based on the order in which the lines are linked in the loop L4; and, thus, the direction may be changed by reversing the order of the link list.

Figure 10E:
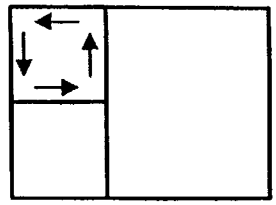
Figure 10F:
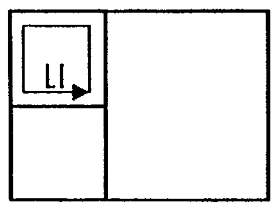
Figure 10G:
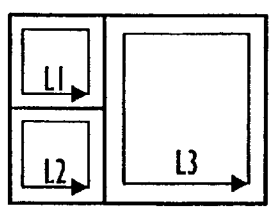

After the outward loop has been completed, inside loop analysis of the part may be performed based on a similar process to that used for the outside loop analysis. In the inside loop analysis, however, each of the unselected entities are compared based on the inside angle that each entity forms with the lead line vector. Further, during the inside loop analysis, where both entities about a point are indicated as being selected (e.g., when comparing two outside line entities which border a face), the two entities may still be compared unless they have been selected twice (i.e., a flag setting of 2). When there is an entity that has been selected at least once (e.g., an outside entity) and an unselected entity (e.g., an inside entity), no comparison may be performed and the unselected entity may be selected as part of the loop. FIGS. 10E–10G illustrated exemplary inside loops that may be performed to detect and define the faces of the part shown in FIG. 10A.

The inside loop analysis may begin at any of the outside entity endpoints or by detecting an entity that has not been selected. For example, point P1 may be selected to initiate the inside loop analysis and may be used to project the lead line vector; alternatively, one of the inside line entities that was not selected during the outside loop analysis may also be used as an initial point for analysis. As with the outside loop analysis, the lead line vector may be extended in the counterclockwise direction (e.g., by initiating the first lead line vector in the Y-coordinate direction). Each entity about point P1 is then compared to determine which entity forms the smallest angle with the lead line vector. A coordinate frame may be used to determine the angle formed with the lead line vector. As noted above, during inside loop analysis the entities are compared based on the inside angle that each entity forms with the lead line vector instead of with the outside angle. After the initial entity has been selected and included in the linked list for the loop, its flag may be increment by one and further analysis may be performed by projecting the next lead line vector. The process continues until the loop returns to the initial starting point, at which point the first inside loop is defined (e.g., L1) by its associated linked list of entities.

Further inside loop analysis may performed in a similar fashion by proceeding inwardly of the part. Subsequent starting points may selected by determining which entities have been only selected once. Entities with flags that have been selected twice will indicate that it is an outside entity that has already been selected for the outside loop (e.g., L4) and for at least one of the inner loops (e.g., L1). Once again, as each entity is selected, its associated flag may be incremented by one to indicate that it has been included in the inside loop link list.

Figure 10H:
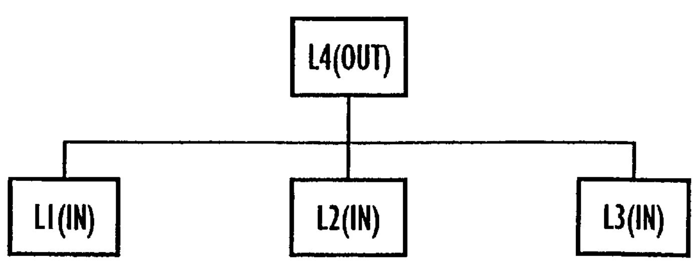
Figure 11A:
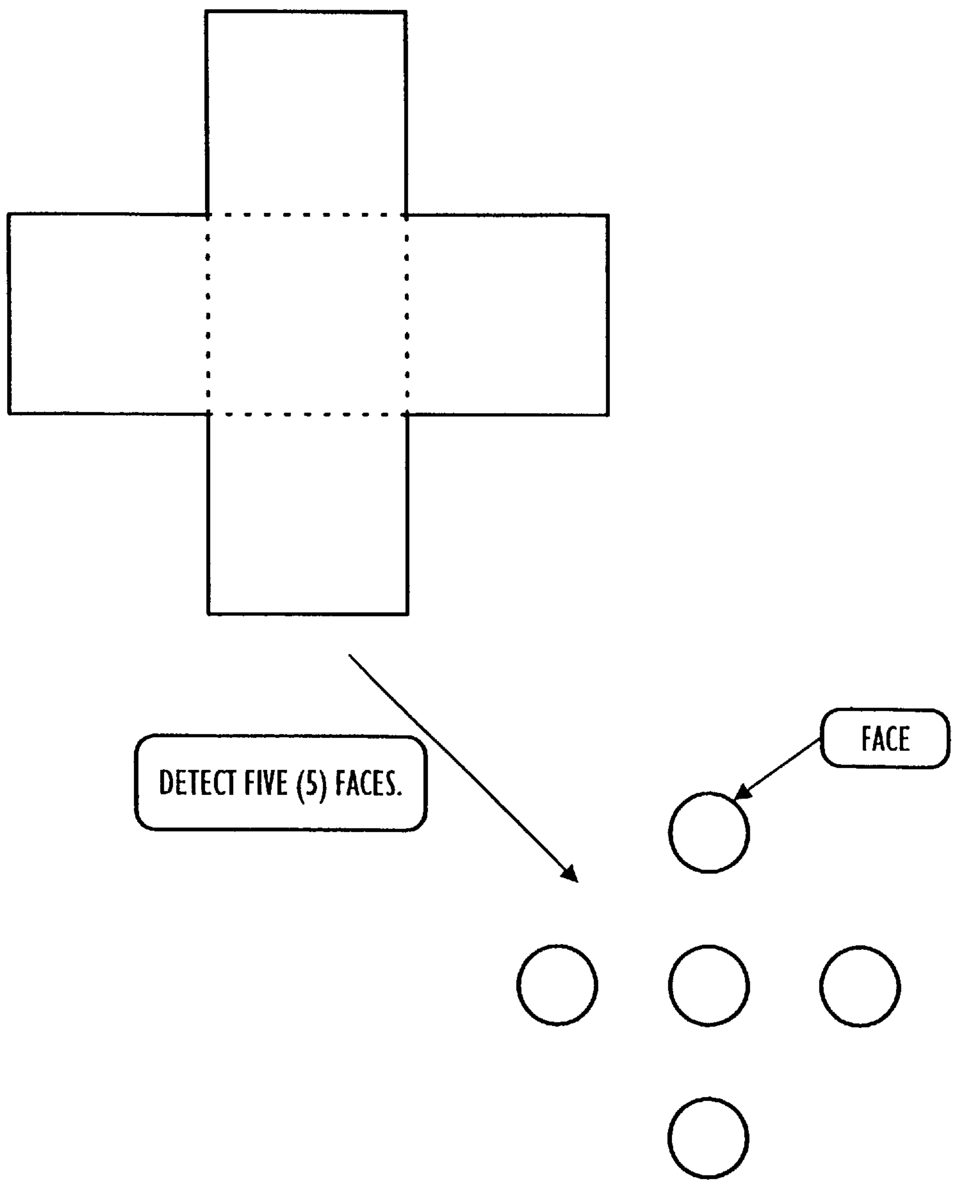
FIGS. 11A and 11B illustrate the development of a final bend graph data structure from the execution of a face detection process and bend line detection operation, according to an aspect of the present invention.
Figure 11B:
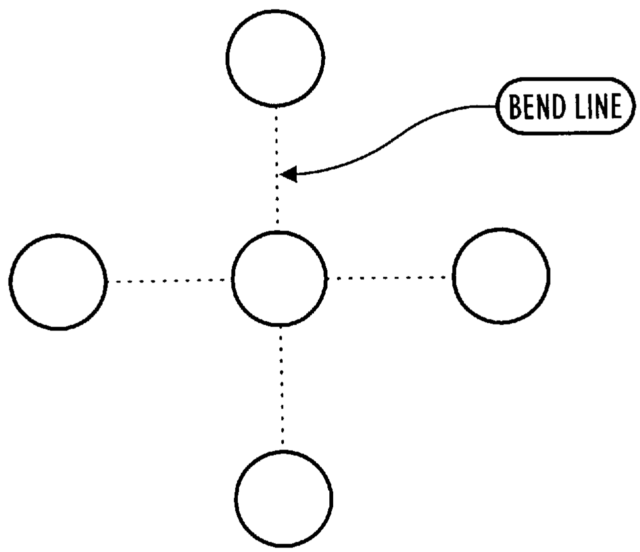

After all of the inside loops have been defined (e.g., after all of the entities have been selected twice in the example of FIG. 10G), the resultant loops may be used to construct a loop tree. FIG. 10H illustrates an exemplary loop tree that may be defined based the detected loops L1–L4. The outside loop (L4) of the part may be defined as the root of the tree, with each inside loop (L1–L3) that has a common entity with the outside loop being defined as children of the root. The presence of common entities may be detected based on analyzing and comparing the linked list of entities that define each loop. If additional entities (e.g., holes or openings) are detected within the inside loops, then these loops may be defined as children of the inside loops (i.e., grandchildren of the root of the loop tree) within which they are located.

After the face detection procedure has been performed at step S.124, a bendline detection operation may be performed at step S.126. As shown for example in FIG. 11A, when detecting and analyzing the loops of a part at step S.124, the face detection logic of the invention may utilize the loop tree to define the face information and store the detected faces as nodes in a bend graph data structure. The faces of the part may be detected from the sequence of the outside and inside loops in the loop tree. As indicated above, each of the loops may include a link list of entities or lines. These entities may be used to define the boundaries of each face of the part. The bendline detection operation of step S.126 may then be performed to determine the relationship between the faces and bendlines of the part. The bendline detection operation of step S.126 may include bendline detection logic for detecting all of the bendlines between the various faces of the part by searching for common edges or line entities between any two adjacent faces. Further, for faces that connect at more than one area (e.g., when applying the bendline detection algorithm to a 3-D model—see, e.g., FIG. 12 discussed below) a number of heuristics may also be applied to detect and select the minimum number of bendlines for the part. The detected bendlines then may be stored as connecting agents between the face nodes to produce the final bend graph data structure, as shown for example in FIG. 11B.

The bendline detection operation of the present invention may be implemented through software or programmed logic residing at, for example, server module 32. The purpose of the bendline detection operation is to detect and select the bendlines for the part so that the part becomes connected with the minimum number of bendlines. The bendline detection operation may be provided for both 2-D and 3-D versions of the part. A discussion of an application of the bendline detection operation in connection with an original 3-D model is provided below with reference to FIG. 12. As noted above, the detected bendlines may be stored as connecting agents between the face nodes to produce the final bend graph data structure. This final bend graph data structure may then be utilized to fold and construct the 3-D version of the part from the 2-D data model.

The original 2-D drawing that is provided as input at step S.120 in FIG. 8 may not include bendline information or such bendline information may be ambiguous and not uniquely or consistently defined. Thus, the bendline detection operation may be performed to detect the bendlines and their relation to the detected faces of the part. During this process, the linked list of entities defining each of the faces may be analyzed to determine adjacent edges or line entities that each face has with other faces of the part. This may performed by analyzing all possible contacts between any given two faces. A contact may be determined based on the presence of a common line entity (or entities that are within a predetermined distance tolerance of one another) that has a length that is greater than 0 (i.e., the line entity is not a point but a real line). The geometrical data in the linked lists may be analyzed to determine the presence of such contact between any two faces in the part.

If a particular face only has one common edge or area of contact with another face, then the entity that is common to both faces may be defined as a bendline. For faces that have common contact at more than one area (e.g., a 3-D model; however, this may occur with 2-D models as well), a number of heuristics may be applied to detect and select the minimum number of bendlines for the part. The heuristics that are applied should be adapted so that the faces of the part become connected at the bendlines and so that no continuous loop of faces is formed (since such a bend sheet metal part is impossible to manufacture).

For example, one such heuristic that may be applied is to select the common area that has the longest contact area as the bendline. Thus, where a face has more than one common edge with other faces, this heuristic may be applied so that the common entity having the longest length is selected as the bendline for the face. This heuristic is based on the principal that is usually better to have a longer contact area when manufacturing bent sheet metal parts. Another heuristic that may be applied relates to selecting among different possible combinations of bendlines (such as when determining the bendlines for a 3-D model). According to this heuristic, when all possible common areas are detected and various combinations of bendlines may be selected, the combination of bendlines that produces the minimum number of bendlines is selected.

After the bendlines have been detected, the faces of the part and the determined bendlines may be displayed to the operator for verification. If the operator is not satisfied with the selection of bendlines for the part, the bendline detection operation may provide a manual selection feature to permit the operator at the server module 32 to selectively indicate the preferred bendlines for the sheet metal part. The operator may indicate to keep or change a bendline by any suitable input means, such as a mouse or keyboard, etc. The revised bendlines selected by the operator may then be used for developing the final 3-D (or 2-D) part.

Various processes and operations may be provided to implement the bendline detection operation of the present invention. An exemplary code for implementing the bendline detection operation is provided in Appendix C attached hereto. The sample code was written in C++ programming language and includes comments to facilitate the understanding of the logic flow therein. The sample code is an exemplary implementation for the bendline detection operation that may be performed on a 2-D or 3-D model, and includes heuristics (such as those described above) for determining the optimum selection of bendlines.

The detected face and bendline information may be utilized in the folding and unfolding process of the invention. By performing a three dimensional rotation around each bendline during folding or unfolding, the resultant 3-D or 2-D model may be derived. This task may be accomplished by simply applying matrix transformation, involving rotations and translations, to each of the faces and other entities of the part. The features of various commercially available unfolding and folding software applications may be utilized to implement these basic unfolding or folding steps of the invention. For example, the Amada UNFOLD and FOLD system software may be utilized to perform these basic operations. The Amada UNFOLD and FOLD system software is available from Amada America, Inc. (previously operating under the corporate name of U.S. Amada Ltd.), Buena Park, Calif. Information concerning the Amada UNFOLD and FOLD system software may be found in the Amada UNFOLD Manual for AUTOCAD (March 1994 Edition), the Amada UNFOLD Manual for CADKEY (May 1994 Edition), and the Amada Windows UNFOLD Manual for CADKEY (November 1995 Edition), the disclosures of which are expressly incorporated herein by reference in their entireties. Further discussion of the folding process to develop the 3-D model from the 2-D model is provided below with reference to step S.132.

Referring back to FIG. 8, after the bendline detection operation has been performed at step S.126, server module 32 may prompt the user for pertinent bend and deduction information for subsequent use during the folding process. For example, at step S.128, server module 32 may prompt the user to indicate the bend amount for each bend line, including the bend angle and/or bend inside radius, as well as the bend direction (e.g., front or back, etc.). At step S.130, the user may also be prompted by the server module 32 to enter the V-width, material type, and/or the deduction amount. This information may be utilized to compensate for bend deduction during the folding process. Depending upon the thickness and type of material used for the sheet metal part, as well as the angle of the bend and the V-width of the die to be utilized, the actual sheet metal part will tend to stretch by a deduction amount during folding of the sheet metal part.

In order to compensate for this effect in the model, the deduction amount information may be utilized so that the dimensions of the faces of the part are stretched by half of the deduction amount on each side of the bending line when constructing the 3-D model through the folding process. In accordance with an aspect of the present invention, this deduction amount may be entered directly by the user at the server module 32 (e.g., by keyboard, etc.). Alternatively, a material table may be displayed to the operator that includes the deduction amounts based on the material type and thickness of the part. The material table may indicate the various deduction amounts based on different bend angles and V-widths. The user may then automatically set the deduction amount by selecting a desired V-width and bend angle from the material table displayed at the server module 32 (e.g., by mouse or keyboard). The inside radius of the bend angle may also be automatically set by the user through the material table when selecting a desired V-width.

The deduction amount entered by the operator may be in (or converted after entry by the operator to) a unit measure of length (e.g., mm) that is identical to that represented by the part geometry data. During a folding process, the dimensional length of each of the faces on either side of the bendline may be increased by one-half of the deduction amount entered for that particular bendline. The dimensional length of the face that is perpendicular to the bendline may be increased by extending the endpoints of the entities defining the boundaries of the faces that are located on either side of the bendline. Such deduction compensation may also be performed at each of the other bendlines of the part based on the deduction amount provided by the operator for each bend.

In step S.132, a folding process is performed with deduction compensation to develop the 3-D model based on the processed 2-D, flat drawing. As noted above, the folding procedure may be carried out by conventional geometric modeling methods, including the use of matrix transformation and using each of the respective bendlines defined in the final bend graph data structure as a rotational axis. In addition, in order to compensate for the effect of deduction, when folding and developing the 3-D model, the faces of the part may be stretched by half of the deduction amount on each side of the bendline to more accurately reflect the change in the dimensions of the faces when actual bending of the sheet metal is performed.

For example, when performing the folding process at step S.132, the part geometry and topology data (or bend graph structure) may be utilized, along with the bend parameters (e.g., bend angle, inside radius, etc.). A transformation matrix may be computed for each face, bendline, hole and forming in the part represented in 2-D space. Conventional matrix transformation may be applied to the 2-D flat data to get the 3-D space data. The transformation generally involves a rotation followed by a translation. As noted above, rotation is performed about each bendline axis in accordance with bend angle amount. Translations are performed for shifting and moving the geometrical data about space. Such translations may be determined based on the bending radius, bending angle and deduction amount for each bend. During folding, deduction compensation is performed so as to stretch or increase the dimensions of the faces by one-half of the deduction amount on either side of the bendline, as described above. Such deduction compensation will provide a 3-D representation of the part that more accurately reflects the dimensions of the 2-D sheet metal part when it is folded by bending machinery.

For further information on geometrical modeling and transformations, see, for example, MORTENSON, Michael M., *Geometric Modeling*, John Wiley & Sons, New York (1988) and FOLEY et al., James, *The Systems Programming Series: Fundamentals of Interactive Computer Graphics*, Addison-Wesley Publishing Company, Reading, Mass. (1983), the disclosures of which are expressly incorporated herein by reference in their entireties. Chapter 8 of MORTENSON provides a discussion of geometrical transformations, including translations and rotations (see, e.g., pp. 345–354). Further, FOLEY et al. at Chapter 7, pp. 245–265 provides information on geometrical transformations, including matrix representation of 2-D and 3-D transformations. Additional information of modeling and geometrical transformations may also be found in MANTYLA, Martti, *An Introduction to Solid Modeling*, Computer Science Press, Inc., Rockville, Md. (1988), the disclosure of which is expressly incorporated herein by reference in its entirety. Information on coordinate transformations may be found at pp. 365–367 of MANTYLA.

Referring now to FIG. 12, a description of the processes and operations that may be performed for developing a 2-D model based on an original 3-D, flat drawing (with no thickness) will be provided, in accordance with another aspect of the present invention. Similar to the folding process described above with reference to FIG. 8, the various processes and operations for unfolding a 3-D drawing and developing a resultant 2-D model may be implemented through the software and/or programmed logic at server module 32. As shown in FIG. 12 at step S.140, the original 3-D, flat drawing which was provided or developed based on the customer's specification may be entered or imported into server module 32. The 3-D drawing may be stored as a DXF or IGES file and may be entered by interfacing with or utilizing a CAD or CAD/CAM system from server module 32. After entering the 3-D drawing, an auto-trimming and cleanup operation may be performed at step S.142 by server module 32 to prepare the drawing for subsequent face detection and other processing. As discussed above with reference to FIGS. 9A–9E, the auto-trimming and cleanup functions may break and connect entities and surfaces so that the various faces of the part may be properly detected and defined.

The auto-trimming and cleanup operation described above with reference to FIGS. 8 and 9 may similarly be applied to the geometric data of the 3-D drawing entered at step S.140 of FIG. 12. Instead of analyzing the data in 2-D space (as was the case with the 2-D flat drawing), each of the entities (e.g., lines, arcs, etc.) represented in the 3-D drawing may be analyzed based on the 3-D coordinate and space information provided therein. The intersection points and open intersection areas may be detected by analyzing each entity individually and comparing it with other entities one at a time. Once again, basic geometrical analysis of the endpoints and other attributes of the entities may be utilized to determine intersection points and open intersection areas within tolerance.

After performing auto-trimming and cleanup functions on the 3-D drawing, at step S.144 a face detection operation may be performed to detect and define each of the faces of the sheet metal part. Face detection for the 3-D drawing may be performed by analyzing and detecting each of the faces in 2-D space and developing a loop tree, similar to that described above. Face detection may be executed by starting at any predetermined entity. For example, the left most entity (i.e., the entity with the lowest X-coordinate) may be used as the initial entity. Thereafter, a plane may be defined by taking the initial line entity and another connecting or adjacent line entity (e.g., any entity with a common endpoint to the initial entity). A face detection operation may then be performed using loop and entity analysis, such as that described above with respect to FIGS. 10A–10H. As each entity is detected within the defined 2-D plane, the various outside and inside loops may be defined and the entities may be marked (e.g., by setting or incrementing a flag of the selected entity) to indicate that they have been selected and included in a linked list defining one of the loops in that plane.

Subsequent loop analysis may then be performed in the other 2-D planes that comprise the 3-D drawing. In order to proceed with loop analysis of the other entities, additional planes may be defined by searching for unmarked or unselected entities within the 3-D drawing. Such planes may be defined between two unselected entities or an unselected entity and a previously selected entity that was previously analyzed. In each of the additional 2-D planes, further loop analysis may be performed to detect the inside and outside loops. Once again, linked lists of connecting entities may be maintained and the selected entities marked (e.g., by incrementing a flag associated with the selected entity) as each of the loop paths are defined.

After all of the entities have been detected, the resulting loops may be used to develop a loop tree for each of the 2-D planes that were analyzed. As discussed above, a loop tree may be provided to determine the faces and opening or holes in the sheet metal part. For a 3-D drawing, a loop tree may be developed for each of the planes of the sheet metal part. The loops detected within each plane may be grouped and analyzed to develop each loop tree. The root of each tree may be defined as the outside loop detected in the plane, with each inside loop of that plane that has a common entity with the outside loop being defined as children of the root. The presence of common entities may be detected based on analyzing and comparing the linked list of entities that define each loop. If additional entities (e.g., holes or openings) are detected within the inside loops of the plane, then these loops may be defined as children of the inside loops (i.e., the grandchildren of the root of the loop tree) within which they are located. The generated loop trees may then be used to detect all of the faces of the 3-D drawing. The detected faces may then be stored as nodes in a bend graph data structure.

The resultant bend graph structure may then be supplemented with the connecting bending line connecting agents after performing a bendline detection operation at step S.146. The bendline detection operation and the development of the final bend graph structure or part topology may be carried out in a similar manner to that described above with reference to FIGS. 11A and 11B.

As discussed above, an exemplary code for implementing the bendline detection operation is provided in Appendix C attached hereto. The sample code is an exemplary implementation for the bendline detection operation that may be performed on a 2-D or 3-D model, and includes heuristics (such as those described above) for determining the optimum selection of bendlines. The bendline detection operation may include a manual selection feature to permit the operator at the server module 32 to selectively indicate the preferred bendlines for the sheet metal part if not satisfied with the bendlines that were detected. The operator may indicate to keep or change a bendline by any suitable input means, such as a mouse or keyboard, etc. The revised bendlines selected by the operator may then be used for developing the final 2-D part.

Before performing an unfolding process about the bending lines of the final bend graph structure, the user may be prompted for the V-width, material type and/or deduction amount at step S.148. As discussed above, since metal tends to stretch when it is folded, the dimensions of the 3-D part will be slightly larger than that of the 2-D flat part. As such, during unfolding of the sheet metal part, the dimensions of the part should be shrunk or reduced by the deduction amount based on the material type and V-width selected. Accordingly, in accordance with an aspect of the present invention, a shrinking process may be performed when unfolding the 3-D model to more accurately develop the 2-D model and the respective dimensions of its surfaces. As described above, the deduction amount may be entered directly by the user or a material table may be displayed in order to enable the user to automatically set the deduction amount by selecting a desired V-width and bend angle.

The deduction amount entered by the operator may be in (or converted after entry by the operator to) an unit measure of length (e.g., mm) that is identical to that represented by the part geometry data. During an unfolding process, the dimensional length of each of the faces on either side of the bendline may be decreased by one-half of the deduction amount entered for that particular bendline. The dimensional length of the face that is perpendicular to the bendline may be decreased by reducing the endpoints of the entities defining the boundaries of the faces that are located on either side of the bendline. Such deduction compensation may also be performed at each of the other bendlines of the part based on the deduction amount provided by the operator for each bend.

After entry of all of the necessary data, an unfolding process may be performed at step S.150 to develop the 2-D model. Conventional methods may be used for unfolding the 3-D bend model, including the use of matrix transformation with each of the bending lines being used as a rotational axis. During the unfolding process, each of the bend angles may be measured and the part may be unfolded by the bend angle amount to develop the flat 2-D model. In addition, based on the deduction amount entered, a shrinking or reduction of the dimensions of the faces may be performed by half of the deduction amount on each side of the bending line to more accurately simulate the physical characteristics of the sheet metal material and the difference between the 3-D and 2-D models.

When performing the unfolding process at step S.150, the part geometry and topology data (or bend graph structure) may be utilized, along with the bend parameters (e.g., bend angle, inside radius, etc.). A transformation matrix may be computed for each face, bendline, hole and forming in the part represented in 3-D space. Conventional matrix transformation may be applied to the 3-D data to get the 2-D space data. The transformation generally involves a rotation followed by a translation. As noted above, rotation is performed about each bendline axis in accordance with bend angle amount. For unfolding, rotation is carried out in the reverse direction until there is a 180 degree angle between the two faces (i.e., until the part is flat). Translations are performed for shifting and moving the geometrical data about space. Such translations may be determined based on the bending radius, bending angle and deduction amount for each bend. During unfolding, deduction compensation is performed so as to shrink or decrease the dimensions of the faces by one-half of the deduction amount on either side of the bendline, as described above. Such deduction compensation will provide a 2-D representation of the part that more accurately reflects the dimensions of the sheet metal part before it is folded during a bending operation.

Once again, further information on geometrical modeling and transformations may be found in MORTENSON, FOLEY et al. and MANTYLA. As indicated above, Chapter 8 of MORTENSON provides a discussion of geometrical transformations, including translations and rotations (see, e.g., pp. 345–354). Further, FOLEY et al. at Chapter 7, pp. 245–265 provides information on geometrical transformations, including matrix representation of 2-D and 3-D transformations. In addition, information on coordinate transformations may be found at pp. 365–367 of MANTYLA.

Figure 13:
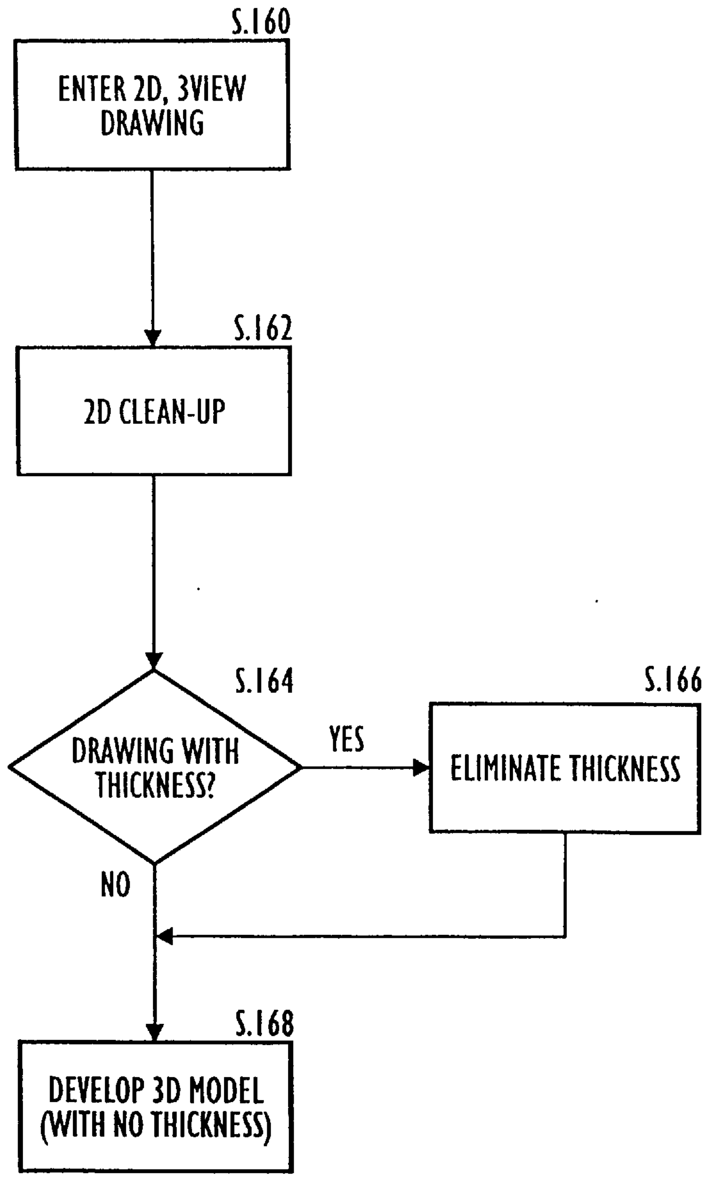
FIG. 13 is a flow chart of the basic logic flow for developing a 3-D model based on an original 2-D, three view drawing using a 2-D clean-up operation, in accordance with an aspect of the present invention.
Figure 15A:
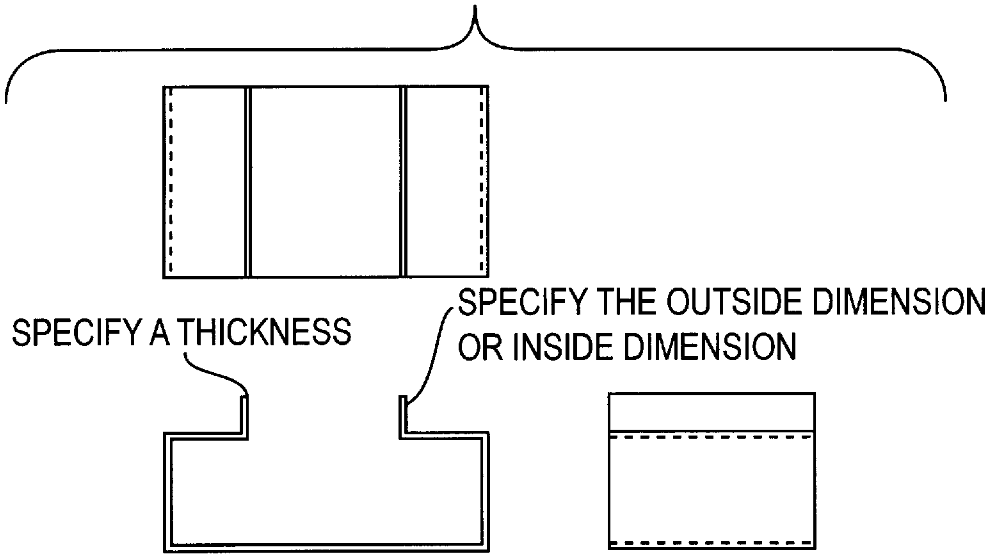
FIGS. 15A and 15B illustrate an example of a 2-D, three view drawing with thickness and a simplified 2-D, three view drawing model with no thickness that may be developed using an eliminate thickness procedure, according to the teachings of the present invention.
Figure 15B:
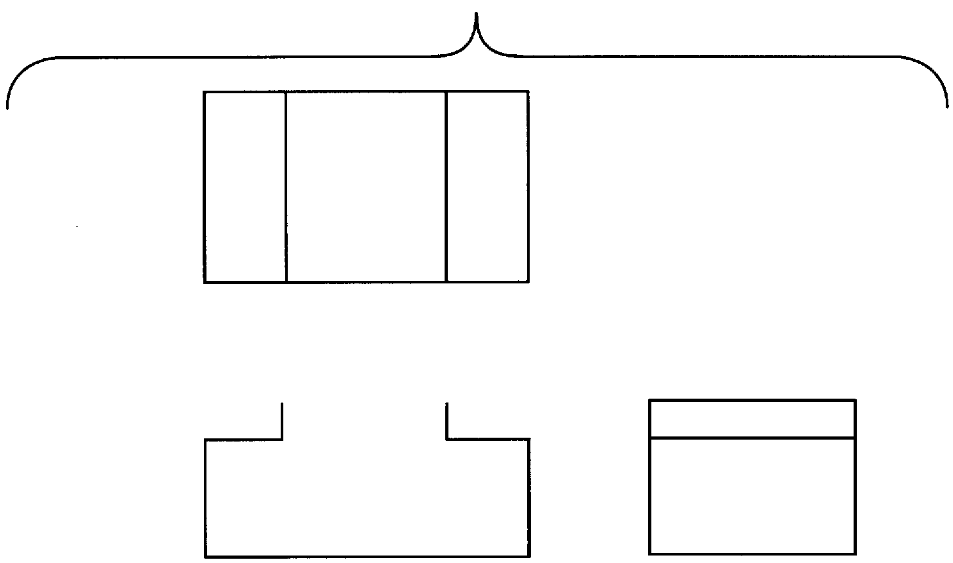
Figure 15C:
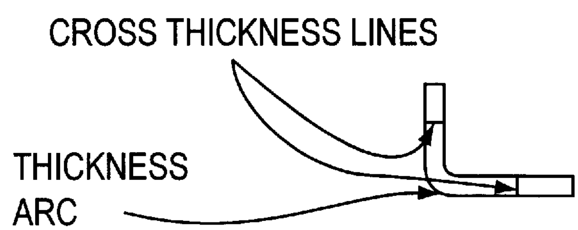
FIG. 15C is an illustration of a cross thickness line and thickness arc of an exemplary part, according to an aspect of the invention.
Figure 16:
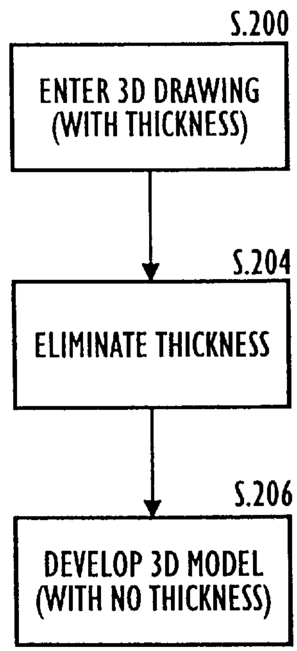
FIG. 16 is a flow chart of the logic flow of the various processes and operations that may be implemented to develop a 3-D model with no thickness from a 3-D drawing with thickness, in accordance with an aspect of the present invention.

As discussed above with reference to FIG. 3, if a 2-D, three view drawing or a 3-D, wire frame drawing with thickness is originally provided or developed based upon the customer's order, then further processing will be required in order to develop a 3-D model without thickness; and, thereafter, the developed 3-D model without thickness may be used to create a 2-D model by applying an unfolding process or algorithm. FIGS. 13–15 illustrate the various processes and operations that may be applied in order to develop a 3-D model based on an original 2-D, three view drawing. Further, FIG. 16 illustrates, in accordance with another aspect of the present invention, the additional processes and operations that may be applied for developing a 3-D model without thickness from an original 3-D, wire frame drawing with thickness. Once again, the various processes and operations depicted in FIGS. 13–16 may be implemented through the software and/or programmed logic residing at, for example, server module 32.

Figure 14A:
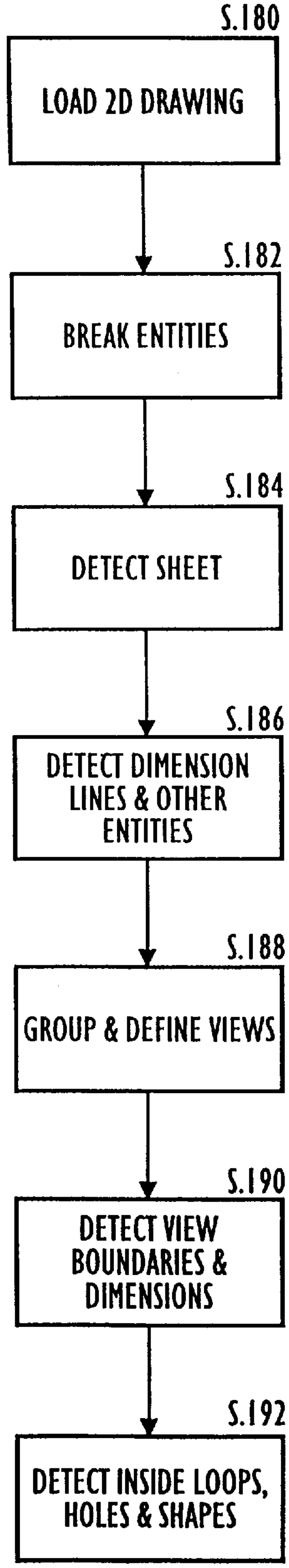
FIG. 14A is a flow chart, according to an aspect of the invention, of the basic logic flow of the processes and operations for performing a 2-D clean-up operation on a 2-D, three view drawing.

Referring now to FIG. 13, a description of the logic flow of the operations and processes that may be performed in order to develop a 3-D model (with no thickness) based on an original 2-D, three view drawing will be provided, in accordance with the teachings of the invention. Initially, the 2-D, three view drawing may be entered or imported to server module 32 at step S.160. The original 2-D, three view drawing may comprise various views of the part (e.g., a front view, a top view and a right side view—see, e.g., FIGS. 14B and 14C) and may be a CAD drawing such as a DXF or IGES file that may be downloaded or imported to server module 32. Thereafter, at step S.162, a 2-D cleanup operation may be performed by server module 32 in order to prepare the drawing for subsequent processing into the 3-D model. The 2-D cleanup operation may be performed in order to eliminate extraneous and non-geometrical information, including text, centerlines and dimension lines, which do not represent the actual geometry of the part. The 2-D cleanup operation may also be performed in order to connect all exterior lines at, for example, their connecting ends and to break and trim any intersecting lines or entities. FIG. 14A illustrates an example of the logic flow of the various processes that may be carried out when the 2-D cleanup operation is performed by server module 32.

As shown in FIG. 14A, the 2-D drawing is first read from a data file or loaded at step S.180 by server module 32. Thereafter, at step S.182, server module 32 may analyze the respective entities and geometrical data in the 2-D drawing and break the various entities in order to prepare the drawing for further processing. The break and trimming function performed at step S.182 may be carried out in a similar manner to that described above with respect to the auto-trimming and cleanup function of the present invention. Thus, at step S.182, all of the geometrical data in the 2-D, three view drawing may be analyzed in order to detect the intersection of entities and any open intersections that are within tolerance. Any intersecting lines may be broken, with the resultant entities meeting at a common endpoint defined by the intersection point. Further, for entities having an open intersection area that is within a predetermined tolerance (e.g., 0.0–0.01 mm or 0.0–0.001 inches), such entities may be joined, in a similar manner to that described above with respect to, for example, FIG. 9E.

Figure 14B:
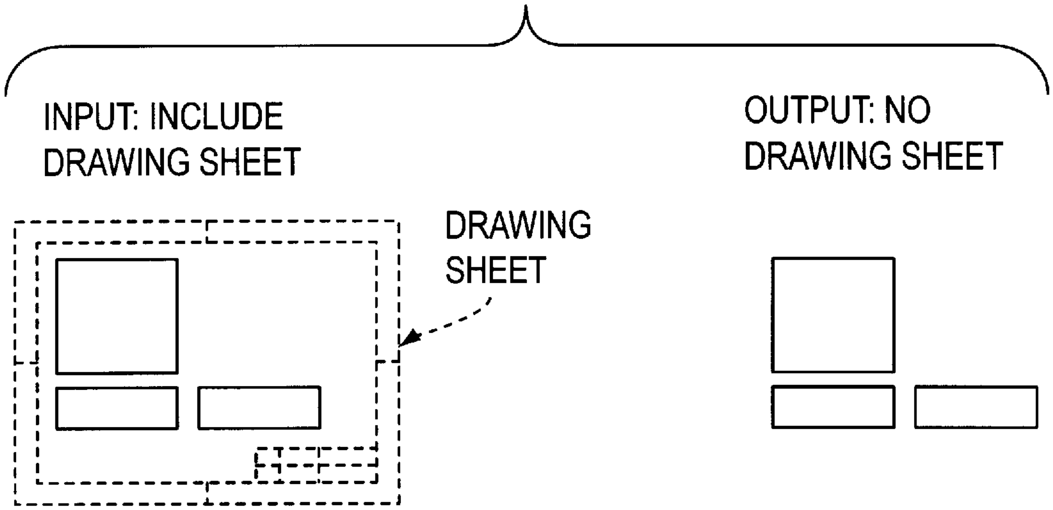
FIGS. 14B and 14C illustrate views and aspects of an exemplary 2-D, three view drawing that may be processed by the 2-D clean-up operation of the present invention.
Figure 14C:
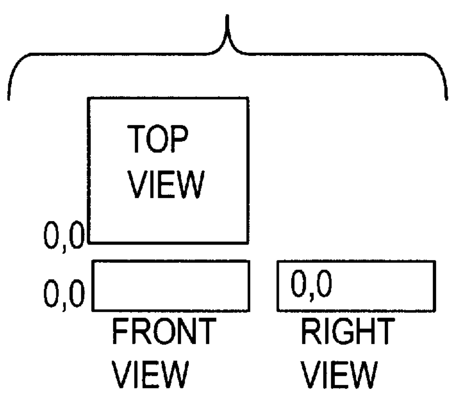

At step S.184, the perimeter of the 2-D drawing sheet may be detected and any exterior lines or data (such as border lines, coordinate grids and numbers, etc.) may be eliminated. As shown in FIG. 14B, a 2-D, three view drawing will often be provided on a drawing sheet. The drawing sheet may include extraneous and non-geometrical information that is not necessary to process the views of the sheet metal part. As such, during step S.184, this type of information may be detected and eliminated from the 2-D drawing when developing the 3-D model utilizing the 2-D clean-up process of the invention.

The 2-D drawing data may include key words or type fields to indicate the type of data contained therein (e.g., geometrical or non-geometrical/text). Thus, these key words or type fields, which are provided based on the data format of the drawing file, may be used to eliminate various extraneous information, such as text and other non-geometrical data. However, further processing is usually necessary in order to properly eliminate all of the unwanted drawing sheet data. Often, the border lines and other outside information are saved as entities (e.g., lines, etc.) that can not easily be distinguished based on the data key words or type fields. As such, according to an aspect of the present invention, a connectivity graph structure may be developed when analyzing the data of the 2-D drawing. The connectivity graph structure may indicate for each entity a list of incident vertices and a list of connected entities. For each vertex, a list of adjacent vertices and a list of entities on which it is incident may also be provided. With this graph structure, which may be developed when performing the break and trimming function of step S.182, it may be determined which entities are connected by matching endpoints. As a result, extraneous data, such as as border lines, information boxes and other non-geometrical data, may be eliminated since this data will typically not be constructed with or include connecting entities.

As noted above, the 2-D, three view drawing may include extraneous information, such as dimension lines, arrow lines, centerlines, and text, which do not represent the actual geometry of the part. These entities may be detected at step S.186 and deleted from the 2-D data file in order to prepare the 2-D drawing for further processing. The detection of these extraneous entities may be performed automatically by server module 32 (e.g., by detecting items in the 2-D data file that do not relate to the actual geometry of the part). For example, by using the connectivity data graph structure, two-sided opened entities (e.g., lines used for underlining text or to indicate a dimension or centerline in the part) may be detected and eliminated. Other entities, such as arrows, may also be detected based on the presence of floating endpoints and other characteristics of such entities. In order to effectively eliminate all unnecessary data, the server module 32 may also provide a manual editing function to permit an operator to indicate (e.g., by mouse or keyboard) which items in the 2-D drawing should be eliminated. Through the assistance or confirmation of the operator, additional extraneous information may thus also be removed from the drawing.

After step S.186, the various views in the 2-D drawing may be grouped and then respectively defined at step S.188. In accordance with an aspect of the present invention, server module 32 may support predefined or standard views and orientations, such as a top view, front view, right side view layout, such as that shown in FIGS. 14C and 14D. Other views and layouts, such as combinations of a top view, a front or back view, and a right or left view, may also be supported. As further described below, server module 32 may also support rotated views (see, for example, FIG. 14D) in order to process the views in the 2-D drawing into the 3-D representation of the part. In any event, at least two (and preferably three) different views of the part with thickness representations should be provided so that a 3-D model of the part may be constructed. By analyzing the connectivity and grouping of the entities in the connectivity graph structure, server module 32 may group and define the views based on the relative position and/or coordinate location of each of the views.

By way of a non-limiting example, the definition of the views by server module 32 may be carried out in accordance with a predefined or customary arrangement or layout for analyzing the views in the data file, and/or based upon detecting the orientation of the views and matching the various dimensions of the part in each of the respective views in the drawing. A predefined or canonical form, such as that shown in FIG. 14E, may be used to determine and define each of the views according to possible view types. Geometric comparisons of the various endpoints and relationships between the entities defining each group may be performed in order to effectuate step S.188. The view detection feature of server module 32 may label each of the views according to one of plurality of possible view types (e.g., top view, front view, back view, left view, right view). The detection of each of the views may be based on a predefined or canonical view layout or form, and based on the detected relationships between each of the views that are present.

Various processes and operations may be used at step S.188 to group and define the views in the 2-D, three view drawing. For example, after accessing the processed 2-D, three view drawing, the server module 32 may first identify the top view of the part in the drawing data. The top view may be detected based on the predefined or canonical form, view layout (such as that in FIG. 14E). If three separate views are detected in either a horizontal or vertical direction, then the center view may be defined as the top view. Further, if three separate views are not detected, and only two separate views are detected in a vertical direction, then the upper view may be defined as the top view. Once again, the connectivity and grouping of the entities in the connectivity graph structure may be utilized to detect each of the views. A stored lookup table or matrix representing the predefined or canonical form may be used to compare the views of the 2-D drawing and detect each of the views.

After detecting the top view from the 2-D, three view drawing data, the other views of the part may be detected based on the relative position of each of the views to the detected top view. For example, based on the canonical view layout of FIG. 14E, if a view grouping is located above the top view, then the view may be defined as a back view. If, however, a view grouping is located below the top view, then the view may be defined as a front view of the part. Further, a right view and a left view may be detected based on their relative position on the corresponding right hand side and left hand side, respectively, of the top view. Thereafter, any remaining views, which do not conform to the canonical form (such as FIG. 14E), may be detected based on their relative position to the detected views (e.g., a detected back view or front view). For example, for the layout B shown in FIG. 14D, the right view has been provided in a rotated position relative to the top view. The right view in layout B, however, may still be detected based on its relation to the detected front view. That is, undetected views that are present on the right hand side or left hand side of a detected back or front view may be defined, respectively, as a right view or a left view of the part.

Various predefined or canonical view layouts may be used to detect and define views in the 2-D, three view drawing. The canoncial forms (such as that in FIG. 14C or FIG. 14D) may be selected based on the numbers of view types that are to be supported and/or based on the view layouts that are more prevalent or selected/required by the manufacturing facility. If any views are not detected, a warning signal may be provided by the server module so that an operator may modify the 2-D, three view drawing data in accordance with the preferred view layout, or take other appropriate action. In addition to providing a predefined or canonical form for detecting the views in the 2-D drawing, a predefined or canonical form (such as layout A in FIG. 14D) may also be provided for processing the detected views and developing the 3-D model of the part. As such, a rotated view feature may be provide to properly group the detected views in accordance with the canonical form before further processing is performed.

Figure 14D:
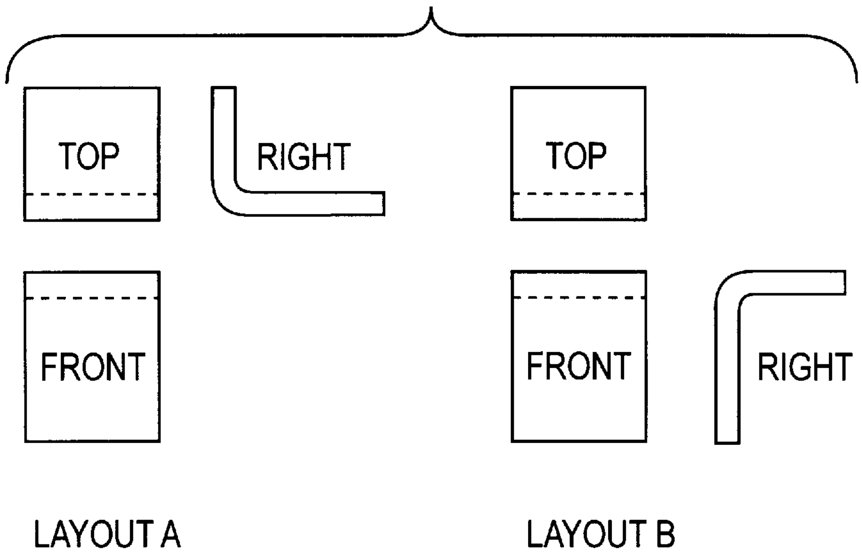
FIG. 14D illustrates a rotated view feature of the 2-D cleanup operation of the present invention.
Figure 14E:
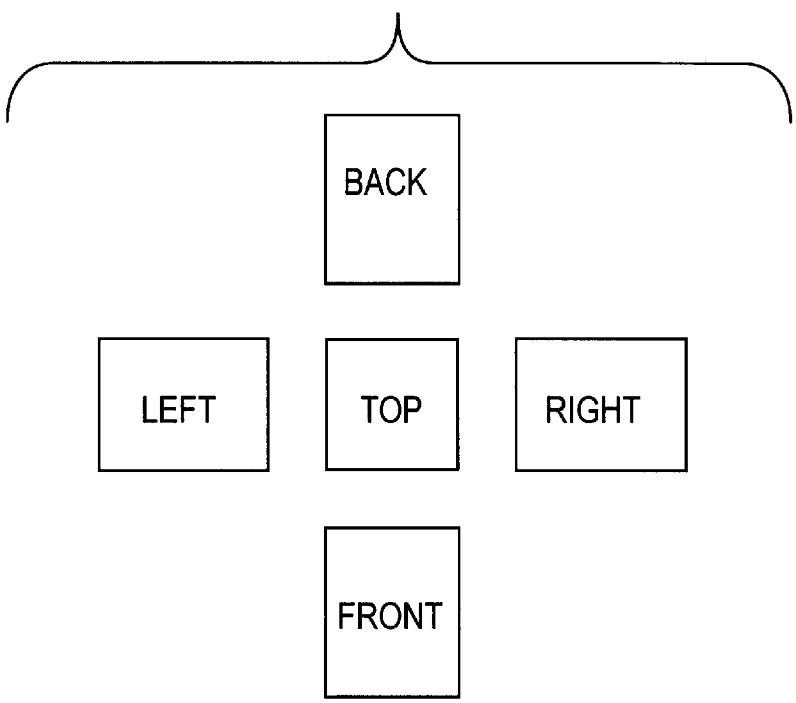
FIG. 14E illustrates, in accordance with an aspect of the present invention, a canonical form relating to the 2-D clean-up operation of the present invention.

As mentioned above, the 2-D cleanup operation may support and detect rotated views which do not conform to the predefined or canonical form for detecting views in a drawing. With the rotated view option, non-conforming views that have been detected may be rotated or translated so that each of the views conform to the predefined or canonical view form for processing and developing the 3-D model of the part. Assuming a canonical form such as that illustrated in FIG. 14E for detecting views of the part, each of the views in layout B in FIG. 14D may be detected based on the relative position of the views to the top view and the other detected views, as described above. If, for example, the layout A in FIG. 14D is to be used as a predefined or canonical view layout for processing the various views in a 2-D drawing having a top view, front view and a right view, then at step S.188 the right view in layout B may be rotated by 90 degrees to provide a modified view layout for the part that is similar to layout A. By rotating the right view in layout B by 90 degrees so that the right view of the part is provided on the right side of the top view of the part, the views in the drawing may be processed in accordance with the canonical form represented by layout A. A stored lookup table or matrix representing the predefined or canonical form may be used to compare the views of the 2-D drawing and to determine which views require rotation and translation.

In order to ensure that an accurate 3-D model of the part is developed from the views in the 2-D drawing, the respective dimensions in each of the views should be checked for consistency and matching. As further shown in FIG. 14A, at step S.190, the boundaries of the views in the data file may be detected in order to confirm that all of the dimensions of the respective views are in scale with one another. If it is determined that the views do not match within a predetermined tolerance (e.g., 0.0–0.01 inches), then appropriate modification may be made at step S.190 to redimension any particular view in order to ensure that all of the views are provided in the same scale. A warning component may be provided in server module 32 to alert a user that the view dimensions do not match so that the necessary modifications can be made to the 2-D drawing data that is present.

Various operations and processes may be utilized to detect and verify the consistency of the dimensions in the respective views of the part. For example, the corresponding dimensions of each of the views may be compared to determine if they are within a predetermined tolerance of one another. Such an analysis may include comparing the line entities that define the boundaries of each view of the part. Assuming the canonical form in FIG. 14E, a top view may be detected as matching a right view or a left view if the difference, for each view, between a maximal Y coordinate position and a minimal Y coordinate position is within a predetermined tolerance (e.g., 0.0–0.01 inches). Further, the top view may be detected as matching a front view or a back view if the difference, for each view, between a maximal X coordinate position and a minimal X coordinate position is within a predetermined tolerance (e.g., 0.0–0.01 inches). Moreover, the left view or right view may be determined as matching a front view or a back view if the difference between a maximal X coordinate position and a minimal X coordinate position compared to the difference between a maximal Y coordinate postion and a minimal Y coordinate position is within a predetermined tolerance (e.g., 0.0–0.01 inches). Once again, a warning component or module may be provided in server module 32 to alert a user when the view dimensions or related face dimensions do not match so that the necessary modifications can be made to the 2-D drawing data that is present.

Finally, at step S.192, the inside loops, holes and shapes of the part may be detected in accordance with the teachings of the face detection procedure of the present invention. The various holes and shapes provided on the interior of the faces of each view may be detected by looping through the various lines and boundaries of the part from the exterior of the part towards the center. Loop and entity analysis may be performed on each view of the part in the 2-D drawing. By analyzing each view from the outside and working inwardly towards the center of the part, the detected loops will define the boundaries and areas of the material and openings of the part based upon a cyclic sequence (e.g., material, opening, material, etc.). A loop tree, such as that in FIG. 10H, may be developed for each view to determine the location of the faces and any openings within each face. Unconnected entities, such as floating arcs or lines, within the faces of the part may also be detected and eliminated during step S.192.

An exemplary code for performing the 2-D clean-up operation of the present invention is provided in Appendix D. The code was written in C++ programming language and includes comments to facilitate the analysis of the logic and algorithms used therein. The code includes the various processes and operations of the 2-D clean-up mode, such as those discussed above with reference to FIGS. 14A–14C.

Referring back to FIG. 13, after a 2-D clean-up operation has been performed, logic flow will then continue to step S.164 where it may be determined whether the 2-D drawing represents or includes the thickness of the material (i.e., whether the 2-D drawing is with thickness). If the 2-D drawing is determined to contain the thickness amount, then at step S.166, an eliminate thickness procedure may be performed by server module 32 in order to prepare the 2-D drawing for subsequent processing into a 3-D model. The determination of the existence of thickness in the 2-D drawing may be performed automatically by server module 32 based on the data of the drawing, or may be performed by the server module through the assistance or response from the operator (e.g., the operator may be prompted to indicate whether thickness removal is necessary or desired). The thickness of the part may be eliminated due to the unique symmetry of all sheet metal parts. By eliminating the thickness of the part, the resultant sheet metal part with no thickness may be more easily analyzed by a sheet metal operator or designer. Further, the inventors of the present application have found that by eliminating the thickness of the 2-D, three view drawing, the time required to convert the 2-D drawing and develop the 3-D model may be substantially reduced.

Since most 2-D, three view drawings include a material thickness amount, an operator may often be confused by which bend lines should be selected in order to make a 3-D model from the 2-D drawing. As a result, considerable time is wasted in selecting the appropriate bend lines so that the 2-D, three view drawing may be converted into a 3-D model. An example of a three view, 2-D drawing with thickness is shown in FIG. 15A. According to an aspect of the present invention, an eliminate thickness procedure may be provided to display a simplified 2-D, three view drawing model which is represented and processed with no material thickness, but retains the material thickness amount and the inside or outside dimensions of the part in the bend model data. FIG. 15B illustrates the simplified three view, 2-D drawing that may be viewed and displayed to the operator at server module 32 after performing the eliminate thickness procedure.

When the eliminate thickness procedure is executed, the user may be prompted to specify the material thickness in the 2-D, three view display, and may be prompted to specify which dimension (i.e., the outside dimension or inside dimension) is to be retained in the display. The operator may indicate the thickness and surface to retain in one of the views by use of, for example, a mouse. Based upon the data entered by the user, server module 32 may modify the 2-D, three view drawing to eliminate the material thickness indicated by the user and to retain the inside or outside dimension based on the operator's selection.

In order to eliminate the thickness in the 2-D, three view drawing, the server module 32 may analyze each of the three views based on the selections made by the operator. The selected surface may be projected into each of the other views by geometrical computations (e.g., by detecting the corresponding entities that lie in the same X-coordinate or Y-coordinate projection as the selected entity line or surface) to detect the corresponding entities and lines in each of the views. The corresponding entities may be marked and retained, with the nonmatching entities or surfaces being eliminated or not displayed on the screen, such as that shown in FIG. 15B. Further, the thickness dimension line indicated by the operator may be similarly projected into each of the other views, with the matching thickness dimension lines or entities being eliminated, as further shown in the example if FIG. 15B. As a result, each of the views in the drawing may appropriately modified and then displayed to the user at the server module 32. The resultant 2-D, three drawing with no thickness may also be used for subsequent processing in order to develop the 3-D model of the part.

The thickness elimination procedure of the present invention may include a manual thickness elimination mode to permit an operator to selectively indicate in each view the thickness lines to be eliminated and the surface entities to be retained. A mouse or other appropriate input device may be used by the operator to indicate which areas in each of the displayed views are to be eliminated and which surfaces are to be retained. Based on the data entered by the operator, the server module 32 may eliminate each line entity selected by the operator from the 2-D, three view drawing in order to provide a drawing with no thickness.

The present invention may also include a warning system or module to analyze and detect whether all the thickness representations have been properly identified in the 2-D, three view drawing, and to alert the user when there are unmarked thickness components and/or when there are inconsistencies in the drawing data. For example, a thickness warning component may be provided to highlight on the display screen possible unmarked thickness segments, and a face warning component may be provided to highlight on the screen possible mismatched faces when the face dimension does not match the thickness mark in another view. A bendline warning component may also be provided to highlight inconsistent bendlines and highlight mismatching thickness arcs. An arc may be highlighted when at least one bendline projected on this arc is not bound by two cross thickness lines. For instance, FIG. 15C illustrates a thickness arc that is properly bounded by two or another non-zero even number of cross-thickness lines (i.e., a small line crossing the thickness in one of the views). Each bendline should also be bound by two or another non-zero even number of cross-thickness lines. The analysis of these entities of the part in each view may be based on performing a loop analysis on and analyzing the connectivity of the line and arc entities that make-up each view. An open thickness line may be defined based on a thickness line that has at least one end point that is not connected to another thickness line or arc. A side that includes an open thickness line may be defined as an open thickness side. A thickness line may be highlighted if the open thickness side of an open thickness line does not match the bounding box of a minimal loop. By providing such warnings relating to the processed 2-D, three view image to a user, the user may be alerted of inconsistencies in the drawing data, and the user will thus be able to modify and/or correct the drawing data before further processing is performed to develop the 3-D model of the part. Inclusion of such a warning system and user interaction also improves the accuracy of the representation of the part by the 3-D model.

At step S.168 in FIG. 13, the processed 2-D, three view drawing with no material thickness may then be converted and developed into a 3-D model. The conversion and development of the 3-D model from the 2-D, three view drawing may be performed by using well-known or established projection and/or extrusion methods. For example, in order to develop the 3-D model from the three view, 2-D drawing, the depths of each of the views may be detected and then each of the views projected in order to develop a 3-D model. The resultant 3-D model may then be used when developing the bend model data and also converted into a single view, 2-D flat drawing by applying the above-described unfolding algorithm. For more information geometric modeling techniques, see MORTENSON, FOLEY et al. and MANTYLA. For additional information on projection techniques to construct 3-D models from 2-D drawings, see, for example, WESLEY et al., W. A., *Fleshing Out Projections*, IBM J, Res. Develop., Vol. 25, No. 6, p.934–954 (1981); AOMURA, Shigeru, *Creating Solid Model with Machine Drawings*, The 6th Computational Mechanics Conference, JSME, No. 930–71, Japan, pp. 497–98 (1993); and AOMURA, Shigeru, *Recent Trends and Future Prospect of Research and Practical Use (Automatic Reconstruction of 3D Solid from Drawings)*, Toyo Engineering Corp., Japan, pp. 6–13 (1995); the disclosures of which are expressly incorporated herein by reference in their entireties.

When developing the 3-D model at step S.168, an additional clean-up process may be included in order to further process and refine the resultant 3-D model. In accordance with an aspect of the invention, a 3-D clean-up process may be provided to compensate for ambiguities that are present in the 2-D, three view drawing of the part and that create extraneous or superfluous information in the developed 3-D representation of the part. As will be appreciated by those skilled in the art, a 2-D, three view representation of a part includes ambiguities concerning the representations of various features of the part in 3-D coordinate space. When developing the 3-D model from the three view, 2-D drawing, extraneous and superfluous information may be generated as a result of these ambiguities. As such, according to an aspect of the invention, the 3-D clean-up process may include processes and operations for detecting and removing one sided open lines and for detecting and cleaning bendlines and trimming faces. The 3-D clean-up process may be performed automatically when developing the resultant 3-D model of the part, or may be selectively performed based on input from an operator when the developed 3-D model is determined to require further processing.

Figure 49A:
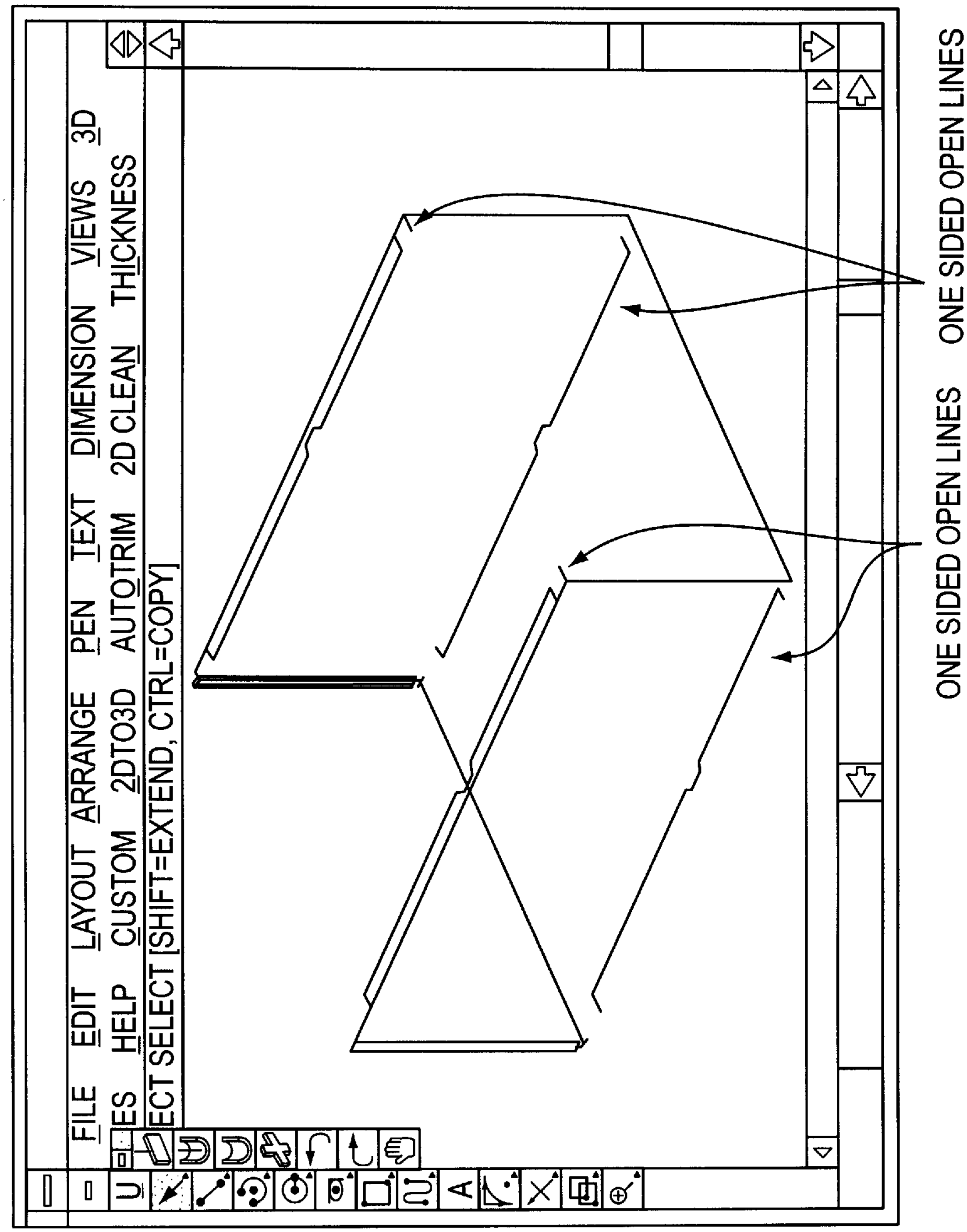
FIG. 49A illustrates an example of a 3-D representation of a part before one sided open lines are removed.
Figure 49B:
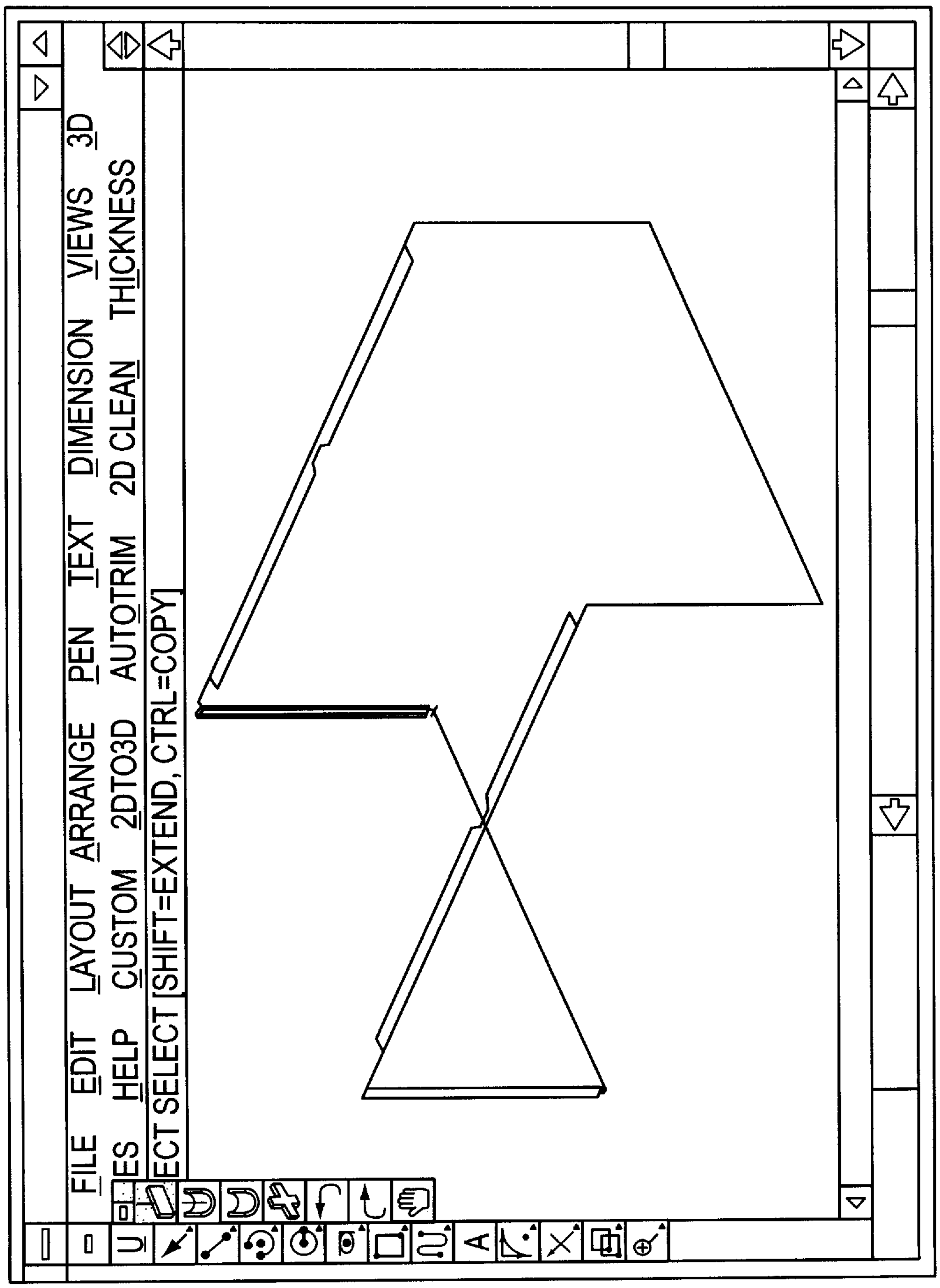
FIG. 49B illustrates the part after the one sided open lines have been removed from the 3-D representation, according to a 3-D clean-up process of the invention that may be used when developing a 3-D model of a part from a 2-D, three view drawing of the part.

According to the 3-D clean-up process, by analyzing the developed 3-D drawing data, every line or arc which is determined to be not connected to another entity at one of its endpoints may be identified and defined as a one sided open line. Any entity that is determined to be a one sided open line may be removed from the 3-D representation of the part. Once an open line is removed, it may cause another line or entity to be open. As such, new one sided open lines are also identified and removed recursively until all open lines or entities are removed. FIG. 49A illustrates an example of a 3-D representation of a part before one sided open lines are removed, and FIG. 49B illustrates the part after the one sided open lines have been removed from the 3-D representation.

Figure 50A:
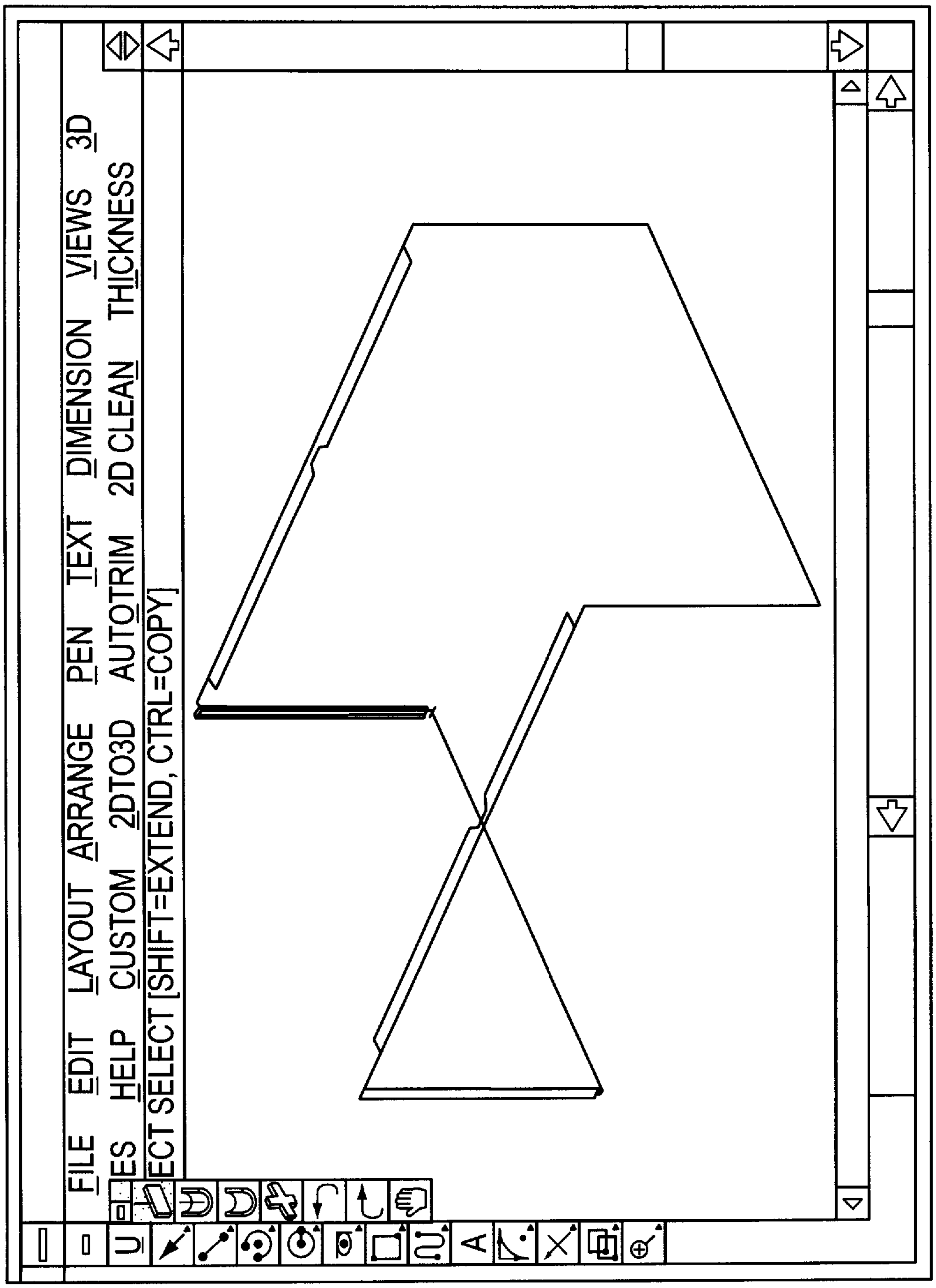
FIG. 50A illustrates an exemplary 3-D representation of a part before the bendlines have been identified.
Figure 50B:
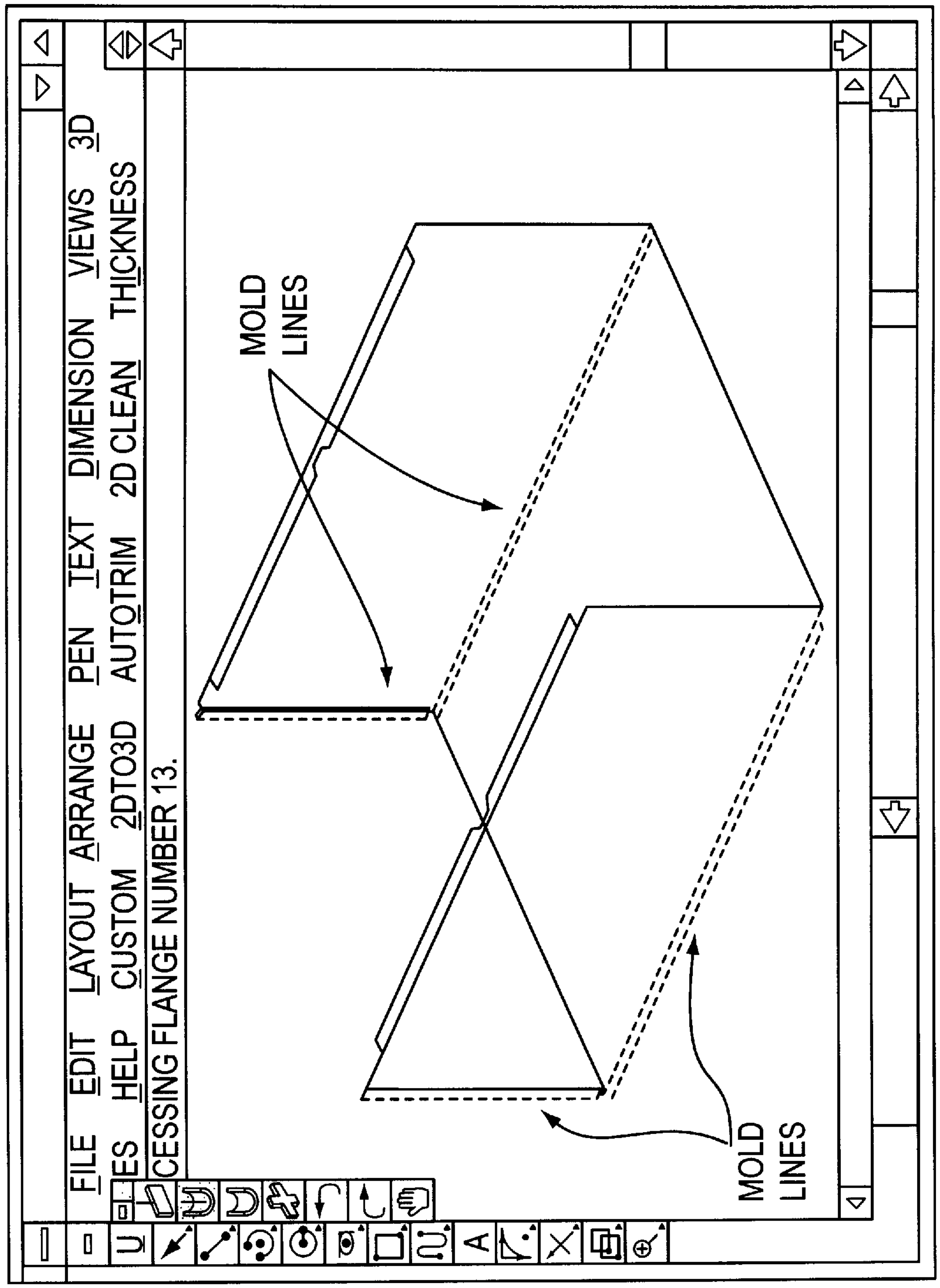
FIG. 50B illustrates the part after the mold lines have been added, according to a 3-D clean-up process of the invention.

As noted above, the 3-D clean-up process that may be performed at step S.168 may also include a process for detecting and cleaning bendlines. Bendlines may be identified and cleaned (e.g., by adding mold lines) in order to facilitate the detection of face information of the part in 3-D space. Based on the developed 3-D model data, each bendline may be identified from the detection of a pair of 3-D arcs (e.g., represented by arc entities in the drawing data) which have the same normal defined by their centers. During this process, mold lines may be added to the bendlines that are identified. The mold lines may be added by identifying corresponding endpoints in each pair of 3-D arcs, and extending mold lines (e.g., represented by line entities) between the corresponding endpoints of the 3-D arcs. FIG. 50A illustrates an exemplary 3-D representation of a part before the bendlines have been identified, and FIG. 50B illustrates the part after the mold lines (represented by dashed lines in the drawing) have been added.

Figure 51A:
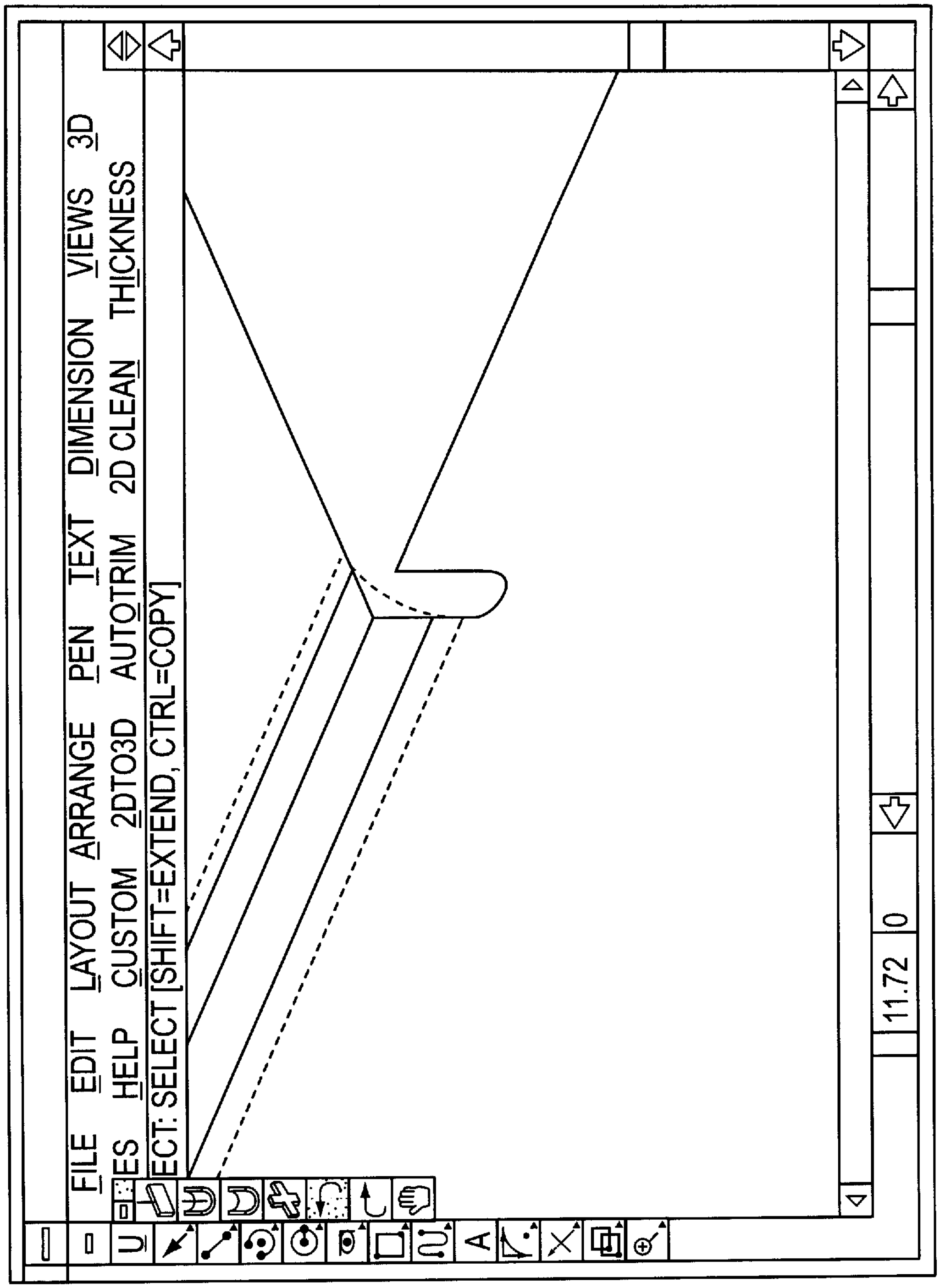
FIG. 51A illustrates an exemplary section of a part before cleaning the bendlines and trimming the faces.
Figure 51B:
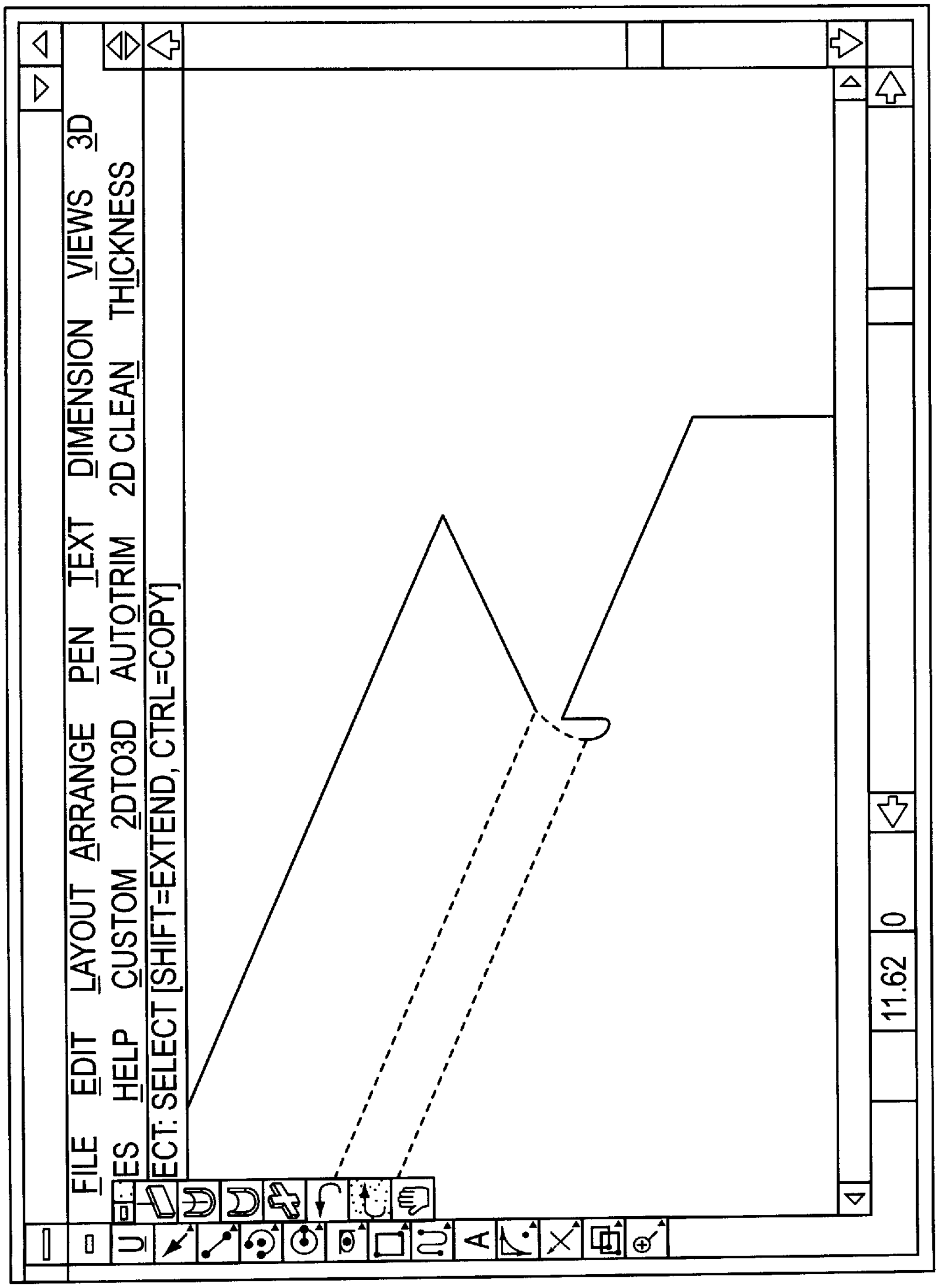
FIG. 51B shows the section of the part after cleaning and trimming has been performed, according to a 3-D clean-up process of the invention.

After the bendlines have been identified and the mold lines have been added, the 3-D clean-up process may further process the 3-D representation of the part to further clean all bendlines and trim the faces of the part. Due to frequent ambiguities in the views of the 2-D, three view drawing data, superfluous sections of the faces may be generated in the 3-D representation of the part. The 3-D clean-up process may identify these superfluous sections of the faces and trims the faces using sheet-metal domain knowledge (e.g., knowledge relating to what is unfoldable). Other extraneous information, such as extra holes or openings, may also be identified and eliminated. As a result, the superfluous sections of the part may be removed and the 3-D representation may provide a more accurate representation of the sheet metal part. FIG. 51A illustrates an exemplary section of a part before cleaning the bendlines and trimming the faces, and FIG. 51B shows the section of the part after cleaning and trimming has been performed.

FIG. 16 illustrates an example of the logic flow of the processes and operations that may be performed in order to develop a 3-D drawing with no material thickness from an original 3-D drawing with material thickness. At step S.200, the original 3-D drawing with material thickness may be entered or imported to server module 32. The 3-D model may be a 3-D, wire frame drawing with material thickness and may be a CAD drawing file, such as a DXF or IGES file. After the 3-D drawing has been imported to the server module 32, an eliminate thickness procedure may be performed at step S.204. The eliminate thickness procedure at step S.204 on the 3-D model may be performed in a similar manner to that provided in the Amada UNFOLD software system, described above. In order to eliminate the thickness in the 3-D model, the operator may first be prompted to indicate the thickness and to select the surface to be retained. Based on the operator's selection, the thickness is measured by analyzing the endpoints of the entity line defining the thickness. Thereafter, the boundaries of the selected surface may be traced, in a similar manner to that described above with respect to the loop and entity analysis process, with the entities to be kept being marked (e.g., by setting or incrementing a flag) and the corresponding thickness entities being eliminated. When tracing the entities of the 3-D part, the entities may be distinguished based on the length of the thickness entity selected by the user. Generally, all entities having the same length of the thickness entity may not be selected and eliminated, with the other entities that are not of the same length being marked and retained. Any remaining entities that are not marked during the surface trace of the 3-D part may also be eliminated. Once again, the server module 32 may provide a manual thickness removal mode, in which an operator may manually indicate each entity in the 3-D part that is to be removed.

After step S.204, the resultant 3-D model with no material thickness may be developed and/or displayed to the operator at step S.206. An unfolding algorithm or process may then be applied to the 3-D model with no material thickness to develop the single view, 2-D flat drawing for the bend model data, as described in greater detail above.

As discussed above, the design and manufacturing information that is stored in database 30 may include a bend model data file comprising part geometry and topology as well as manufacturing data for the sheet metal component. Further, the software that may be used to implement the various features of the invention may be developed using a high level programming language such as C++ and by using object oriented programming techniques. Different object oriented techniques may be used, such as Booch or OMT to implement the various features of the invention. If object oriented programming is utilized, an object oriented data model may be utilized to represent the sheet metal part and the bend model for the part may be implemented through a completely self-contained class library. In accordance with an aspect of the present invention, a description will now be provided of any exemplary data structure and access algorithm for the bend model, based on object oriented programming techniques.

Figure 17:
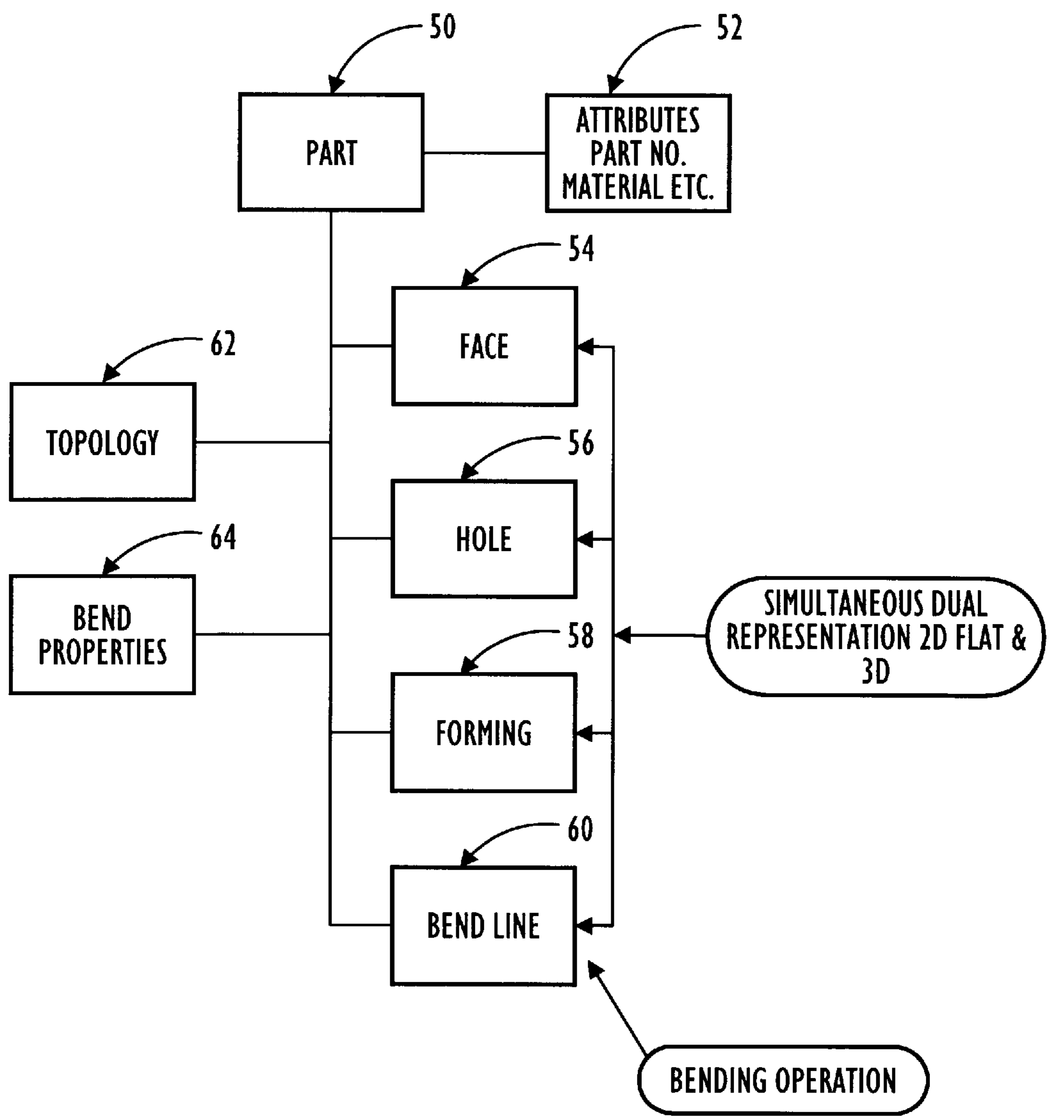
FIG. 17 illustrates an exemplary data structure and access algorithm of the bend model that may be utilized when implementing the present invention through, for example, object oriented programming techniques.

FIG. 17 illustrates an exemplary data structure and access algorithm of the bend model that may be utilized when implementing the present invention through object oriented programming. Object oriented programming is a type or form of software development that can model the real world by combining objects or modules that contain data as well as instructions that work upon that data. In object oriented programming, objects are software entities that may model something physical, like a sheet metal part, or they may model something virtual, like business transactions. Objects may contain one or more attributes (i.e., fields) that collectively define the state of the object, and may contain an identity that distinguishes it from all other objects. In addition, objects may include behavior that is defined by a set of methods (i.e., procedures) that can modify the attributes or perform operations on the object based on the existence of certain conditions.

According to an embodiment of the present invention, the sheet metal part may be represented as an object oriented data model. As shown in FIG. 17, the bend model for the sheet metal part may be defined as a completely self-contained class library. All of the required data manipulation and functions for the sheet metal part (e.g., folding, unfolding, etc.) may be captured as member functions of the class library. All of the geometrical and topological data may be defined in objects that are grouped within the bend model. The bend model class library may be a hierarchy of classes or objects with a part class being the top level class in the hierarchy. The part class may include a part object with various part attributes and may have various objects that define the part and the actions that may be performed on or to the part.

FIG. 17 shows an example of the various objects that may be grouped in the bend model class library. For example, a part class 50 may be provided that includes various attributes 52. The part attributes 52 may include various part information such as the part number and/or name, the part material type and the thickness of the part. The attributes 52 may also include bend sequence information for indicating the order in which the bends are to be performed and other manufacturing information such as tolerance requirements for the various dimensions of the part. Part class 50 may also comprise various objects, such as a faces object 54, a holes object 56, a formings object 58, and a bendlines object 60, as shown in FIG. 17. Each of the objects 54, 56, 58 and 60 may actually consist of a group of objects for each of the entities (e.g., faces, holes, formings, and bendlines) represented therein. The faces object 54, holes object 56, formings object 58 and bendlines object 60 may each include geometry and dimension data, location and coordinate data in both 2-D and 3-D space representations, and data relating to the edges and surfaces of their respective entities (e.g., faces, holes, formings, and bendlines) of the part. For example, the faces object 54 may include geometry and dimension data for each of the faces, location space data of the faces in both 2-D and 3-D representation, and edges and surface data for the edges and surfaces of the faces. In addition, the formings object 58 may include data relating to special formings in the part, including geometry and dimension data, 2-D and 3-D location space data, and edges and/or surfaces data.

As further shown in embodiment of FIG. 17, the part class 50 may also include a topology object 62 and a bend properties object 64. The topology object 62 may include the part topology data for the faces, holes, formings and bendlines of the part. The data in the topology object 62 may indicate the structure and geometric relationships of the various features of the part. The bend properties object 64 may also be provided and include information concerning special manufacturing constraints for one or more features of the part. For example, bend properties information concerning how the sheet metal part should be bent may be provided in the bend properties object 64. The bend properties information may include specific manufacturing data for different bend property types (e.g., simultaneous bend, colinear bend, Z-bend, etc.).

The bendlines object 60 may also include manufacturing specific data relating to the bends to be performed. Thus, in addition to providing geometry and dimension data, 2-D and 3-D location space data, and edges data for each bendline, the bendlines object 60 may also include V-width data, bend pitch data, bend count data and/or orientation data for each of the bendlines. Each of the bendlines may also include an associated bending operation, as shown in FIG. 17. The bending operations may be implemented as a group of objects with data and operations/instructions for performing bends at each bendline. If provided as an object, each bending operation may include data and instructions indicating how and what type of bending is be performed (e.g., conic bend, Z-bending, Hemming, arc bending, etc.), as well as pertinent bend data such as the bend angle, bend radius and/or bend deduction amount.

By implementing the bend model of the part through an object oriented data model, all of the complex mathematical calculations, computational geometry and matrix transformations may be built into a single class library. Special bending operations, such as hemming, Z-bending and arc bending, may also be captured inside the class library. Further, manufacturing information, such as the V-width, the bend deduction amount, and the bend sequence, may be also captured within the class library. With the bend model, simultaneous dual representation of both the 2-D flat model and 3-D model may be effectuated, as shown in FIG. 17. Further, bending operations may be performed in accordance with the bend lines object 60 of the bend model. General comments regarding the bend model and the part structure, as well as implementation of the same, are provided in Appendix K attached hereto.

Figure 18:
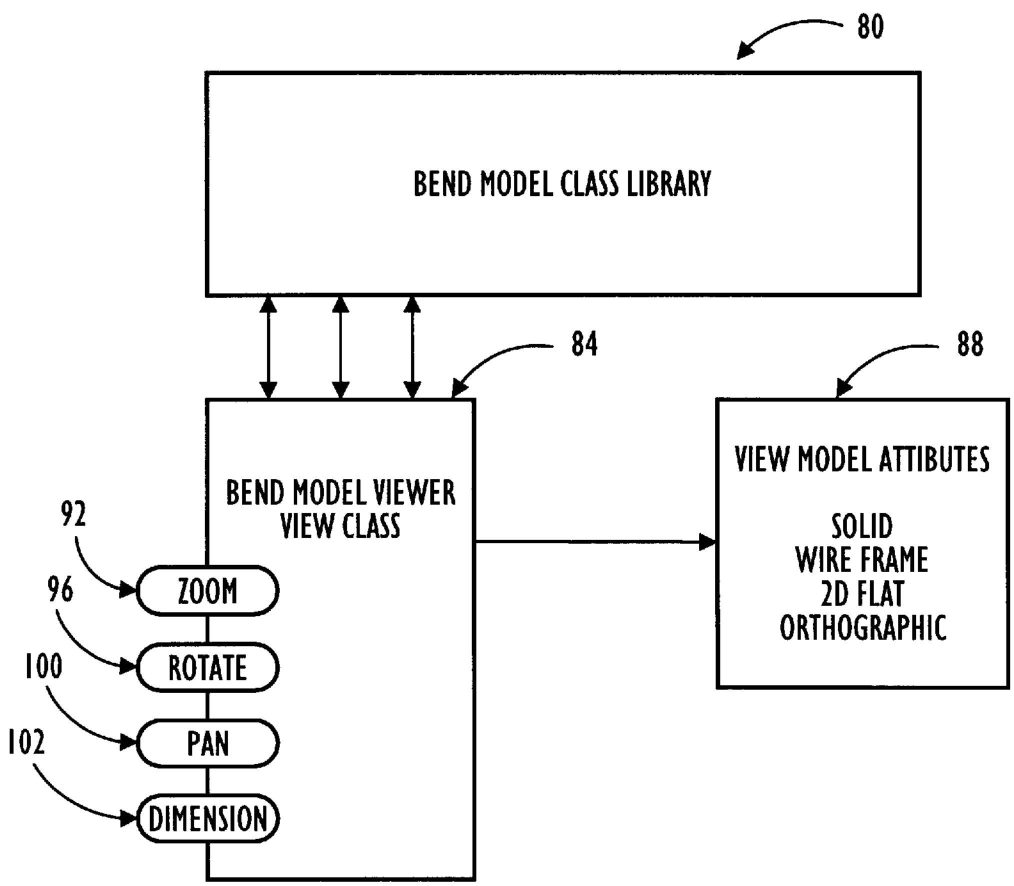
FIG. 18 illustrates a block diagram of the structure of the bend model viewer, in accordance with another aspect of the present invention.

A bend model viewer may be provided to interpret the bend model and display visual images of the part in 2-D and/or 3-D space representation. FIG. 18 illustrates a block diagram of the structure of the bend model viewer and its relation to the bend model, in accordance with another aspect of the present invention. The bend model viewer may be implemented through object oriented programming techniques and may be a Windows based application that permits users at the station modules of the various locations 10, 12, 14 . . . 20 in the facility 38 to display various views of the part based on the information provided in the bend model. The bend model viewer may comprise a set of application library modules that are used to visualize the sheet metal part. Further, the bend model viewer may be designed as a base view class of the Windows application so that it can be used as a base view class for any Windows application. Most of the standard operations to view the 2-D and 3-D models (e.g., zoom 92, rotate 96, pan 100, dimension 102, etc.) may be implemented as member functions of the bend model viewer. Geometric transformations and fundamental computer graphics techniques may be applied to the bend model objects when performing viewing operations. In addition, the bend model viewer may comprise view model attributes 88, that comprise, for example, four major view modes including a solid view, a wire frame view, a 2-D flat view and an orthographic view.

According to an aspect of the invention, the bend model class library 80 may include a set of procedures or functions that act upon sheet metal parts depending upon the selected view (e.g., solid, wire, 2-D flat or orthographic view). The bend model viewer view class 84 may comprise a series of standard operations, such as zoom 92, rotation 96, pan 100 and dimension 102; and, depending upon the state of the bend model viewer, the bend model viewer view class may call functions from the bend model class library 80. As shown in FIG. 18, the various view model attributes or features 88 that may be selected by a user may include a solid view, a wire frame view, a 2-D flat view and an orthographic view. A brief description of these various view modes that may be provided in the present invention is provided below with reference to FIGS. 19–22.

Fundamental computer graphics and geometric modeling techniques, such as geometric transformations and 3-D geometry techniques, may be utilized to implement the various features of the bend model viewer and to provided the different viewing modes and functions. Recent advancements and developments in computer-based 2-D and 3-D modeling and simulation, such as the availability of graphics libraries or packages, may be applied to implement these features of the present invention. In addition, a wide variety of publications and material are available regarding computer graphics and modeling. See, for example, MORTENSON, FOLEY et al., and MANTYLA, each of which is referenced above.

In order to provide the various viewing and modeling features of the present invention, each station module and the server module may be provided with a high resolution display screen, such as a SVGA screen with 800×600 resolution. A joystick and game card may also be provided at the station module and server module to permit the user to selectively modify and view the different 2-D and 3-D representations of the part. Software based graphics packages, such as OpenGL and RenderWare, may be used to provide graphical computations. Such graphics libraries or packages may be Windows based applications and can be used to render the various viewing modes. OpenGL, for example, may be used to render the various 2-D wire frame views based on the part geometry and topology data provided in the bend model. Further, Renderware may be utilized to render the various 2-D and 3-D solid views of the sheet metal part based on the part data provided in the bend model. For more information on OpenGL, see, for example, the *OpenGL Reference Manual* and the *OpenGL Programming Guide*, Release 1, OpenGL Architecture Review Board, Addison-Wesley Publishing Company, Reading, Mass. (1992). For information on RenderWare, see, for example, the *RenderWare API Reference Manual*, V2.0, Criterion Software Ltd., United Kingdom (1996).

In order to render the various views of the part, the bend model may be accessed from the database 30 by, for example, the station module of the operator. The bend model data may then be reformatted in accordance with the data format utilized by the graphics library or package (e.g., OpenGL or RenderWare) that is utilized. Thereafter, the graphics data may be processed in accordance with various programmed routines in order to render the viewing mode (wire, solid, etc.) selected by the operator or perform the viewing function (zoom, pan, etc.) executed by the user.

When a particular view mode is selected by an operator, the selected viewing mode is detected along with the current zoom ratio or factor and orientation of the view. This information is then used to make function calls to the graphics package to update the current display. Function calls to the graphics package may be made in accordance with the viewing mode to be rendered, as well as the zoom or other viewing function to be performed. Based on these function calls, the graphics package provides the necessary data so that the station module may render the view of the part to the operator. Based on the modifications to the 2-D or 3-D representation by the user (e.g., by moving a joystick or a mouse), additional function calls may be made to the graphics library to update the rendered image.

To provide the wire frame views of the part, the line entity data of the part may be provided to the graphics package to perform the necessary graphical computations. With solid views, however, one or more polygons should be derived for each of the faces and provided as input to the graphics package to render the view. Graphics packages such as OpenGL and RenderWare will take as input polygonal data and fill in the areas defined by the polygons to provide a solid image. Polygons may be derived from the face and bendline information in the bend model and by determining the boundaries of each face. Polygons should be created to present and define each face of the part. The faces may then be connected, based on the part topology and other data in the bend model, in order to render the overall sheet metal part. If a face contains an opening or hole, then it will be necessary to define the face with several polygons that do not encompass such openings. For orthographic views, data for each of the individual views (which may be wire frame or solid) may be sent to the graphics package and the resultant views combined on a single display screen, such as that further shown in FIG. 22.

An exemplary code for implementing the various viewing modes and functions of the bend model view is provided in Appendix E. The sample code is written in C++ and includes comments relating to the processes and operations performed therein. The code in combination with an appropriate graphics package (such as OpenGL and RenderWare) may not only be used to render the different views (e.g., 2-D and 3-D wire frame or solid), but also provide the functionality of each of the viewing functions (e.g., zoom, rotate, pan, etc.). A brief description of the various viewing mode display screens that may be rendered is provided below.

Figure 19:
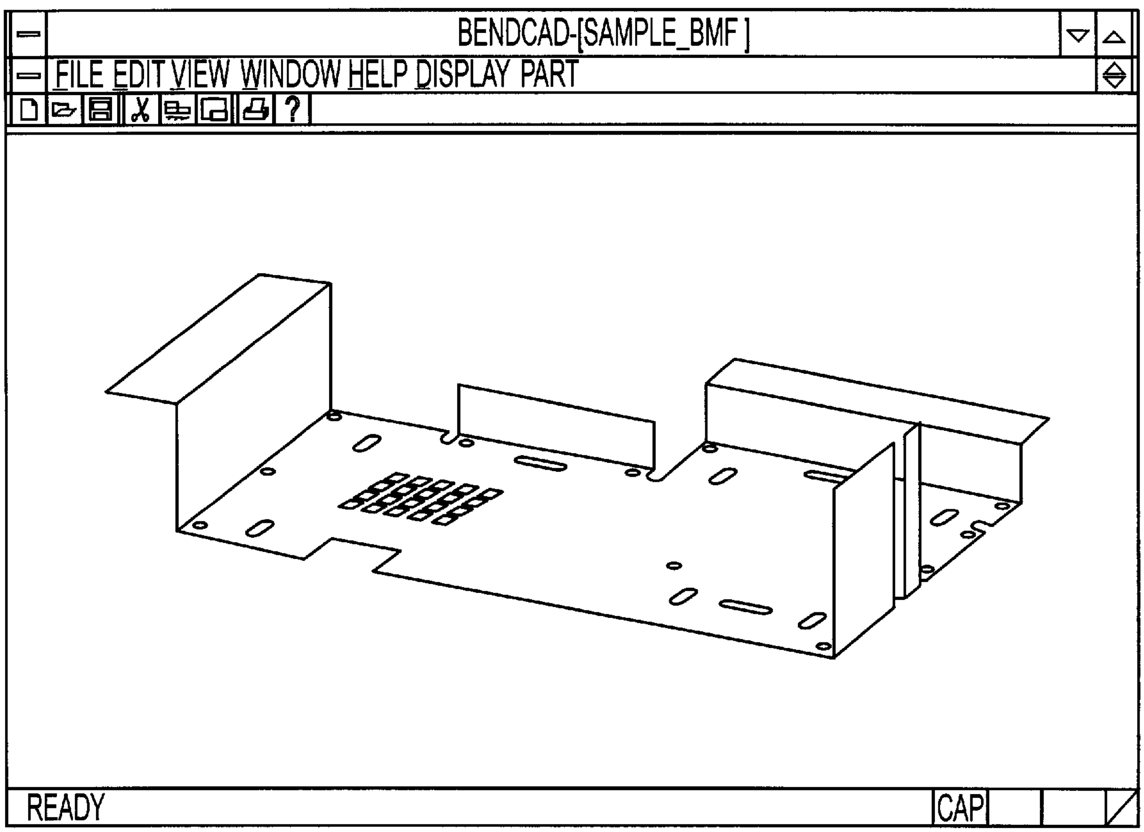
FIG. 19 illustrates an exemplary solid view window display that may be provided as output to a display screen.

The solid view mode displays a solid rendered 3-D view of the part defined by the bend model. FIG. 19 illustrates an exemplary solid view window that may be provided as output to a display screen provided at any of the locations 10, 12, 14 . . . 20 within the sheet metal facility 38. In the solid view mode, the user or operator may be provided with a plurality of viewing functions for manipulating 3-D space navigation and 3-D automatic dimensioning. The basic functions that may be provided for altering the solid view of the part may include rotation, zooming, panning, and/or standard view selections. The standard views that may be provided and selected by the user may include the following: isometric, top, bottom, front, back, left and right. An automatic or manual dimension operation may also be provided to display the critical dimensions of the part based on the current viewing angle. An exemplary embodiment of the dimension feature of the present invention is provided below with reference to FIGS. 23–27.

As shown in FIG. 19, the solid view window may be a Windows based application; and, thus, multiple windows or sectional views of the part may be provided. The multiple view windows may include a worm view that provides a very close-up isolated view within a window, and a bird's eye view which provides a very far away view of the part in an isolated window. The sectional view may provide a partial view of the object as selected by the user. In order to control the various viewing functions, a joystick interface may be provided at the server module 32 and the station modules of each of the locations 10, 12, 14 . . . 20. Operation of the joystick alone and/or in combination with operation of certain keys on the keyboard (e.g., a shift key or control key) may be performed by the user in order to carry out the various functions such as rotating, panning and zooming. In addition, the displayed texture of the solid view of the part may be selected in order to simulate the material specified for the part in the database. For this purpose, a material texture library may be provided that comprises a library of material textures, such as steel, stainless steel, aluminum, etc. The stored material texture library may be accessed and applied by an operator when a solid view is present, so that the surface of the displayed part will more closely simulate the actual texture of the sheet metal part.

Figure 20:
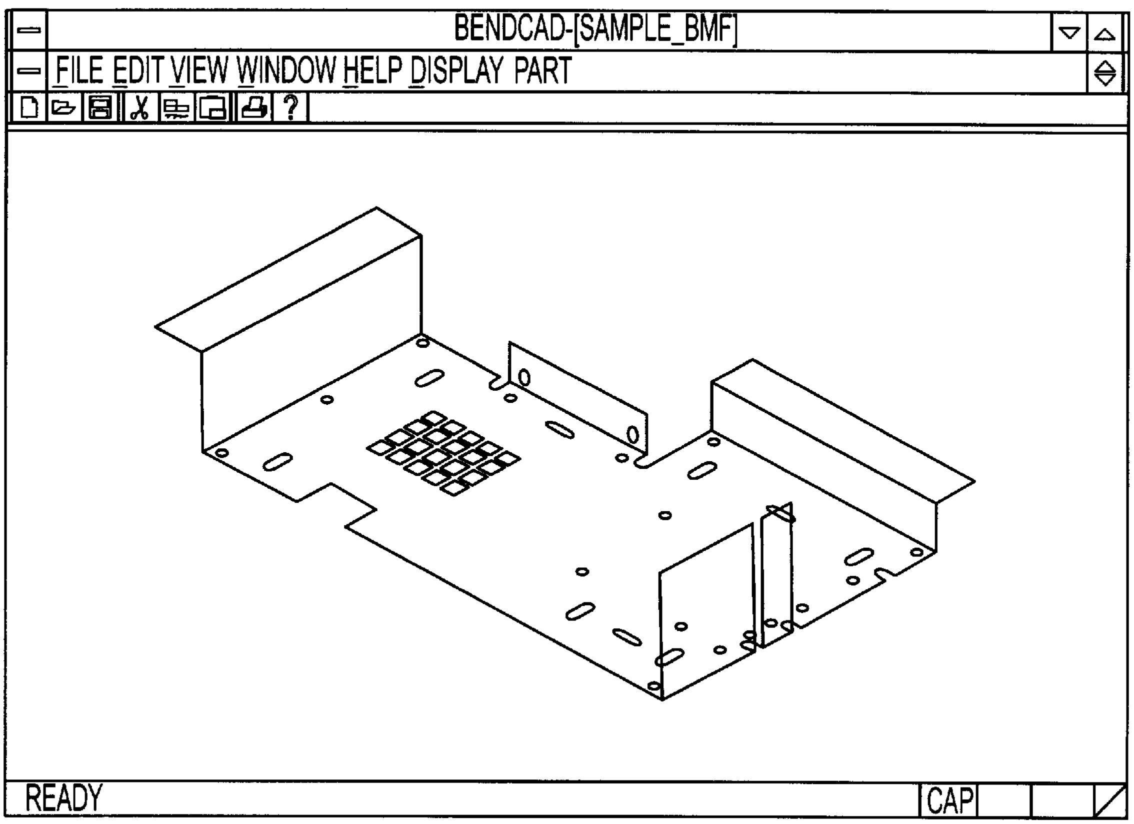
FIG. 20 illustrates an exemplary wire frame view window display that may be provided as output to a display screen.
Figure 21:
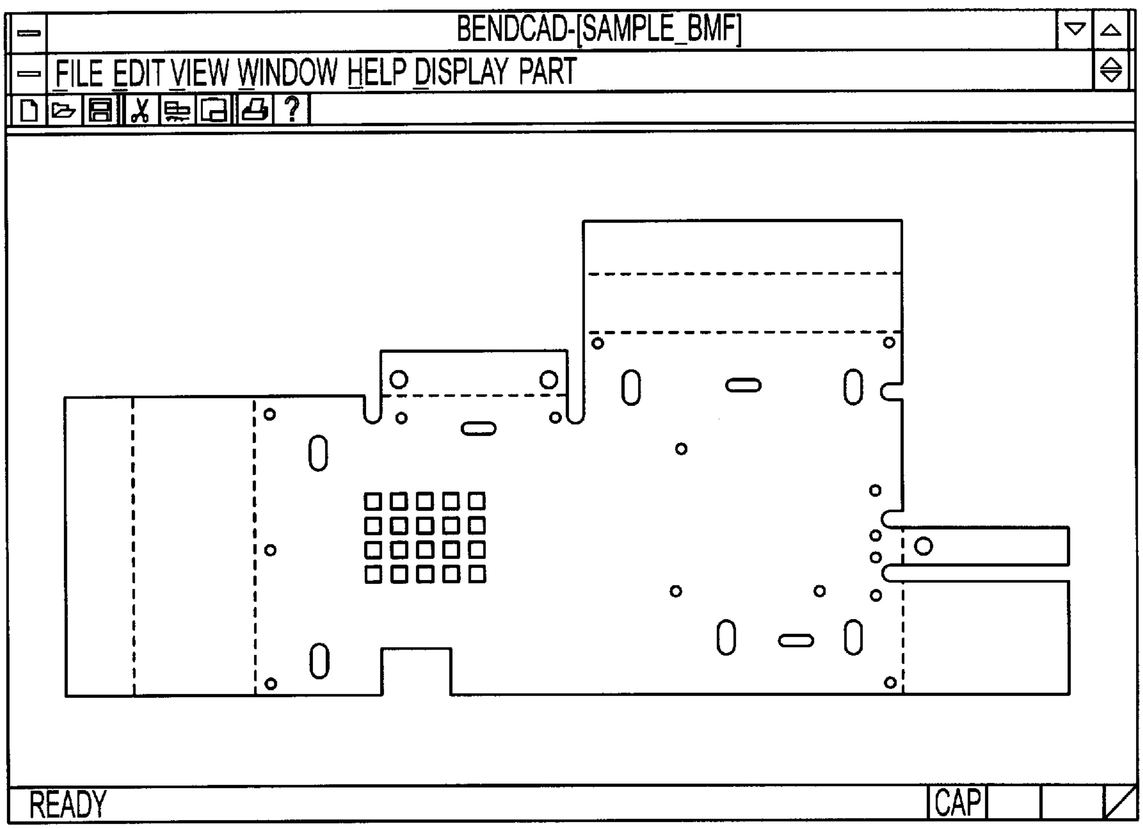
FIG. 21 illustrates a 2-D flat screen image window display that may be provided as output to a display screen.

The wire frame view mode may provide a Windows based display of a wire frame view of the sheet metal part. An example of a wire frame window is shown in FIG. 20. The key functions for providing 3-D space navigation and 3-D dimensioning in the wire frame view may be similar to that described above with respect to the solid view. For example, such functions as rotation, zooming, panning, and standard view selection may be provided. Automatic dimensioning, multiple view windows and sectional view options may also be provided in the wire frame view mode. In addition, a joystick and/or keyboard interface may be provided to permit the user to select and activate the various viewing functions.

The 2-D flat view mode may display an unfolded, 2-D flat view of the part in wire frame representation. An example of a 2-D flat view window is provided in FIG. 21. The 2-D flat view mode may comprise a plurality of viewing functions to permit a user to change or alter the view in the window. For example, zooming and panning functions may be provided to permit a user to selectively zoom and pan the 2-D flat wire frame view. In addition, dimensioning and multiple windows viewing functions may be provided in a similar manner to that described above with respect to the solid view mode. A joystick and/or keyboard interface may be provided to permit the user to pan, zoom and control other viewing functions. Any special forming or shapes that are provided in the part may be displayed as a form or shape on the outermost boundary of the formed area with a special forming indicator or description.

Figure 22:
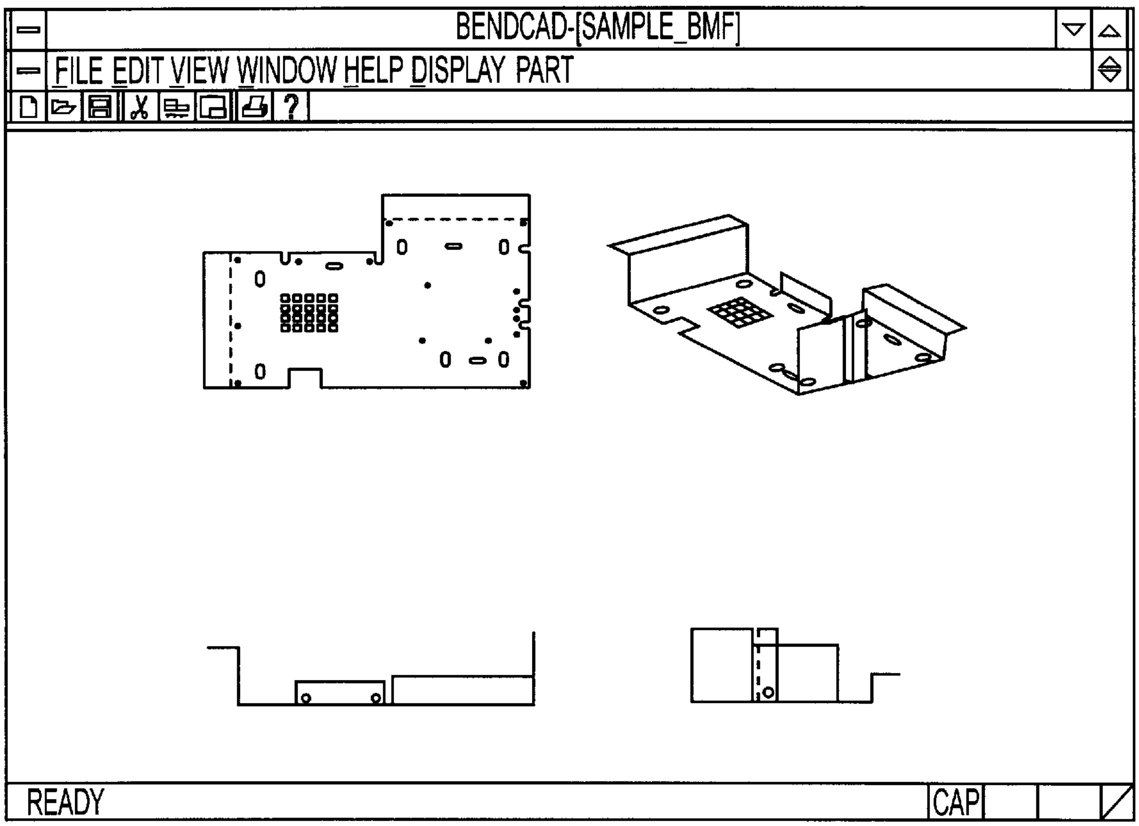
FIG. 22 illustrates an orthographic view screen image that may be provided as output to a display screen.

An orthographic view window, such as that illustrated in FIG. 22, may also be provided as part of the bend model viewer. The orthographic view mode may display the top, front, right and isometric views of the part in wire form representation. A hidden line option may be provided to occlude blocked lines based on the viewing angle. The hidden line option may be utilized to simplify each view window. Various view functions may also be provided in the orthographic view mode to permit the user to selectively manipulate and change the present view in the window. For example, zooming and panning functions may be provided, as well as dimensioning and multiple windows viewing functions. As described above, a multiple windows viewing feature may be provided to permit the user to selectively display a worm view and/or a bird's eye view of the orthographic views in multiple windows. A joystick and/or keyboard interface may be provided at each of the locations to permit the user to selectively activate and manipulate each of the viewing functions in the orthographic view mode.

In addition to rendering each of the various view displays noted above, the bend model viewer view class may be implemented with other features. For example, the bend model viewer may include and maintain a selection set to indicate those items or entities in the current view that are selected or highlighted by the operator. In accordance with an aspect of the present invention, an operator may be permitted to select faces, bendlines and other features of the rendered part in order to modify the data relating to the selected items or to perform certain operations of those items of the part. For instance, an operator may be permitted to select a face of the displayed part and change the dimensional data of the face along its width or length. The operator could also be permitted to modify the various bend data associated with each bendline, such as the bend angle or V-width.

The bend model viewer may maintain a list of entities or items (e.g., faces, bendlines, edges of a face or bendline, etc.) that are selected by the user. The viewer may update the list so that the current items that are currently selected by the operator are always maintained in the selection list. Other portions of the software in the invention may call the view class for the current list of selected entities when performing or executing different routines (e.g., manual dimensioning, etc.).

In addition, the bend model viewer may also provide a visibility function, which provides visibility information and coordinate information based on the current rendered view. As discussed more fully below, the visibility function may provide information as to whether a particular portion or entity of the part is currently visible on the screen and may also provide coordinate information as to where a screen entity is presently located. The visibility function of the bend model viewer may be called by a dimensioning feature of the invention in order to determine what portions of the part are currently visible on the screen, so that only dimensional information of the portions of the part that are visible on the screen are displayed to the viewer. A more detailed discussion of the dimensioning and visibility functions of the invention is provided below. In addition, an exemplary code for implementing the visibility function of the bend model viewer is provided in Appendix J attached hereto.

Referring now to FIGS. 23–27, an example of a dimensioning feature will be described in accordance with an aspect of the present invention. As described above, each of the viewing modes may include a dimensioning function which will automatically display the dimensions of the part based on the current viewing angle. An automatic dimensioning function may be provided so that the dimension of flanges or bend lines which cannot be seen at the current viewing angle will not be displayed to the user. When the automatic dimension function or mode is activated, only the viewable dimensions of the part will be displayed based upon the current viewing angle. Further, in the automatic dimensioning mode, only predetermined dimensions (i.e., those dimensions which are important to the bending operation) may be displayed based on the state of the current viewing angle. A manual dimension mode may also be provided, to permit a user to selectively indicate which dimension items are to be displayed. In the manual dimensioning mode, only those dimension items that have been selected by the user will be displayed based on the current viewing angle of the part. In both dimension modes, the displayed dimension items may be erased or removed from the window display when the part is being zoomed or panned.

Figure 23:
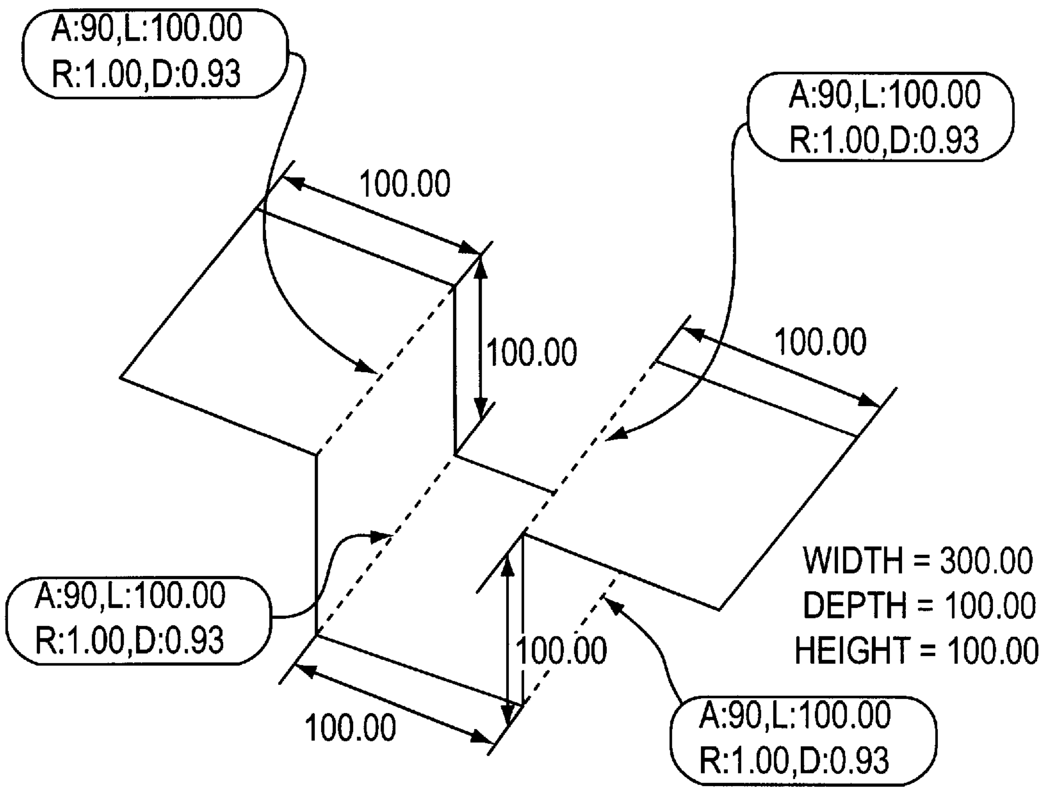
FIG. 23 illustrates an example of the various dimension items that may be displayed in an automatic dimension mode of the present invention.
Figure 24A:
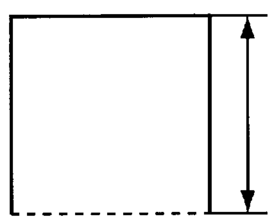
FIGS. 24A, 24B and 24C illustrate a manner in which the flange length may be defined for various different parts, according to an aspect of the invention.
Figure 24B:
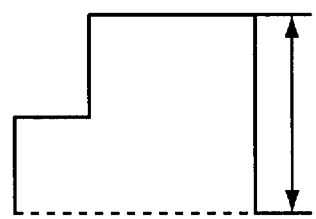
Figure 24C:
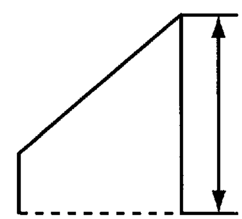
Figure 25A:
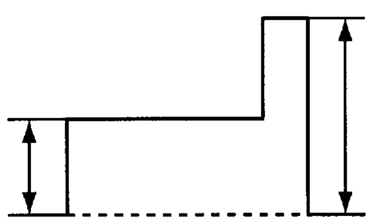
FIGS. 25A and 25B illustrate, in accordance with another aspect of the present invention, adding an auxiliary flange length for two different types of parts.
Figure 25B:
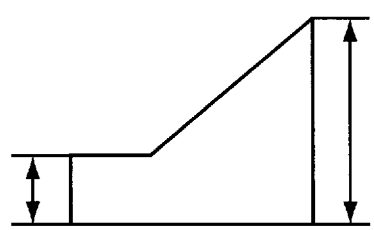

FIG. 23 illustrates an example of the various dimension items that may be displayed in an automatic dimension mode. The dimension items that are displayed in the automatic dimension mode consist of those items that are important to the bending operation (e.g., flange length, bend line length, bend angle, etc.) and not extraneous dimension items, such as the dimension of a punched hole or opening. The displayed dimension items may include, for example, the width, depth and height of the sheet metal part, as well as the flange lengths. In addition, the bend line length (L), the bend angle (A), the inside radius (R) and the bend deduction (D) of each bend line may be displayed either alone or together in a window or group information box. As noted above, only the visible dimension items will be displayed based on the current viewing angle. Further, all dimensions may be erased or removed from the display when the operator is rotating, zooming or panning to change the viewing angle of the part, and the dimensions may be redisplayed after each operation has been completed. The size and orientation of the display information (including any text and reference arrows) may always be sized relative to the screen size and not to the current zooming ratio or viewing angle. However, in order to improve the readability of the dimension information, the color, style, weight and/or font of the dimension information may be configurable to permit the user to alter the same. As a result, an operator or designer may highlight critical dimensions in a part by selecting a particular color, font size, etc. of the dimension information. For example, the color, size or font of dimension text, or the color, line weight, or style of a dimension reference, line or arrow may be highlighted or selectively altered to indicate critical dimensions within the part. An operator may also be permitted to color, fill or style the window information boxes, or to color particular bend lines to also highlight other critical dimensions within the part.

Various processes and operations may be utilized for implementing the dimensioning feature of the present invention. Further, as noted above, the bend model viewer may be provided with a visibility function that may provide visibility information to the dimensioning feature of the invention. Theses functions and features may be implemented by software at, for example, server module 32 and/or each of the station modules located throughout the factory. Exemplary code is provided in Appendices F–I to implement the automatic dimensioning feature of the invention. In addition, sample code for the visibility function of bend model viewer is provided in Appendix J. The code in these appendices are written in C++ programming language and include comments to facilitate an understanding of the logic flow of the processes and operations performed therein.

The logic flow of the dimensioning feature of the invention may be generally categorized into three phases. During the first phase, the bend model geometry and topology data for the part is accessed from the database 30 and is used to compute all dimensions of the part, as well as all possible ways that the dimensions can be displayed. For each bendline and face of the part, all of the extreme points at which data can be displayed is computed, and all ways in which the dimension lines and arrows can be displayed are computed with respect to these points. Certain heuristics may be applied when determining where the dimension data and other information may be displayed. For example, as a general rule, it may be determined that all information may only be displayed on the outside of the part. A heuristic such as this may be applied in order to provide a more meaningful and less crowded display of information to the viewer.

The first phase described above may be executed whenever the dimensioning feature of the invention is activated by an operator. Alternatively, the computations of the first phase may only be done once when the part is initially viewed by the user. In such a case, the computed data may be stored in memory for subsequent use and modified when the dimensions or other geometry data of the part is modified or changed by the user. In addition, all of the computations of the first phase may be performed relative to the geometry of the part and not the view screen, so that the data can be reused every time regardless of the current view or if the view is changed.

A second phase of the automatic dimensioning feature of the invention may be performed whenever the view of the part is updated. The main objective of the second phase is to filter the data developed during the first phase based on what entities of the part are visible in the changed view. During the second phase, all data that is not visible in the current view is filtered out so that only the data computed in the first phase that is presently visible remains. A function call to the bend model viewer may be performed in order to determine what points or portions of the part are presently visible. As noted above, the bend model viewer may include a visibility function that maintains and provides information on the visible portions of the part based on the present view that is displayed. Based on the orientation of the part, the bend model viewer may determine which faces and bendlines of the part (as well as what edges or portions of such faces and bendlines) are visible and which are hidden on the screen.

As noted above, sample code for implementing the visibility function of the bend model viewer is provided in Appendix J. In order to determine what points or portions of the part are visible, the bend model viewer may determine and maintain the current view orientation of the part and the current zoom aspect or ratio of the rendered part. The bend model viewer may use conventional perspective projection techniques (see, e.g., Chapter 12 of MORTENSON) to determine and maintain the current view orientation. When determining the visibility of any point on the part, the visibility function may first get the world coordinates (i.e., the coordinates in which the part is represented) of the point. Then, the screen coordinates (i.e., the pixel location on the screen) corresponding to the world coordinates are determined for that point based on the current view orientation and zoom aspect or ratio. Thereafter, based on the screen coordinates it is determined whether any entity or portion of the part is in front of the point of interest from the perspective of the screen viewpoint. The hidden nature of a point on the part may be determined based on whether some other entity or portion of the part is assigned the same screen point as the point of interest. A function call to a graphics package or library (such as OpenGl or RenderWare) may be made to determine whether more than one point of the part is assigned to the same screen point. If something is assigned to the same screen point, then it may be determined if the point of the part is behind it based on the respective Z-buffer depths of the points. The Z-buffer depth is used by graphics packages, such as OpenGL and RenderWare, to define the distance to each point from the viewpoint or camera position. The Z-depth may be determined by making a function call to the graphics package with the points of the part that are in interest.

The above-described processed of the visibility function of the bend model viewer may be executed whenever there is prompt to the bend model viewer from the auto-dimensioning feature of the invention. Such processes may, thus, be performed whenever the current view of the rendered part is modified or altered by the operator. As discussed above, the bend model viewer may maintain and update the status of the current view orientation and zoom ratio whenever there is a change made to the orientation of displayed image so as to accurately provide visibility information when required.

After determining which data is visible, the auto-dimensioning function may determine (e.g., based on the computations from the first phase) every possible way and locations that the dimension data and other information may be displayed. A set of heuristics may be applied to select the best way to display the data from the available ways that the data may be displayed. For example, a first heuristic may require that the area of the screen that is closer to the viewpoint of the viewer is preferred. A second heuristic may define that the data is to be displayed in an area that is closer to the area where the distance between the possible points defining the dimension is smallest. Other heuristics may also be applied based on the relative position of other dimension data and other information to prevent overlapping and crowding on the screen.

After determining the visible portions of the part and the best areas to display the information for the visible areas, a third phase of the auto-dimensioning function may be executed to draw the various information on the display screen. For example, based on the selection of areas to display the information, the dimension information may be displayed on the screen for each of the visible dimensions of the part. Further, based on which bendlines are visible, bendline information may also be displayed in information boxes (such as that shown in FIG. 23) in areas of the screen that do not overlap with other part information. The part dimensions, including the width, height and depth of the part, may also be displayed on the screen at a predetermined location (e.g., to the lower right of the part) or a location that is closest to that part and that will not overlap or block other information.

FIGS. 24–27 illustrate the various methods and definitions that may be used when displaying the dimension items in the dimensioning mode. In particular, FIGS. 24A, 24B and 24C illustrate the manner in which the flange length may be defined for various different parts. In accordance with an aspect of the present invention, the flange length may be defined as the farthest point on the flange from each bend line. If the farthest point of the flange does not exist on the longest edge of the flange which is parallel to the bend line, then the dimension of the longest flange may be added and displayed in the dimensioning mode. By way of non-limiting examples, FIGS. 25A and 25B illustrate adding an auxiliary flange length for two different types of parts.

Figure 26A:
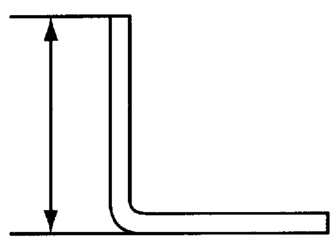
FIGS. 26A, 26B and 26C illustrate a manner in which the flange length may be indicated for various parts that are displayed with thickness, in accordance with yet another aspect of the invention.
Figure 26B:
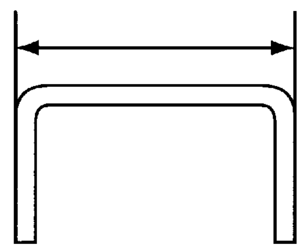
Figure 26C:
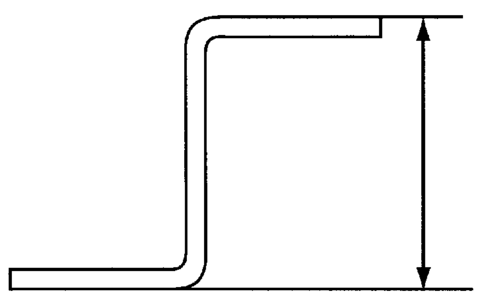

When the thickness of a part is displayed, the flange length may be displayed as an outside to outside dimension. For example, FIGS. 26A, 26B and 26C illustrate the manner in which the flange length may be indicated for various parts that are displayed with thickness. In addition, for parts with an acute angle bend, the flange length may be indicated in a variety of ways. For example, as shown in FIG. 27A, the flange length may be displayed based on a tangent dimension definition, in which the flange length is measured from a tangent line extending from the acute angle bend. Alternatively, an intersection dimension method may be used, such as that shown in FIG. 27B to indicate the flange length based on a point defined by the intersection of two lines extending from both sides of the acute bend angle. An operator may be permitted to choose between the tangent dimension or intersection dimension method for displaying the flange length, and/or a particular dimension method (e.g., the tangent dimension method) may be provided as a default setting.

In order to facilitate the development of the bending code sequence, a graphical user interface with various display functions may be provided to aid the development of the bending plan by the operator. FIGS. 28–32 illustrate the various processes and operations that may be performed to develop the bending code sequence through the use of a graphical user interface, in accordance with another aspect of the present invention.

Normally, the initial bend model data and other job information will be developed by a design programmer through entering the critical geometric and manufacturing data at server module 32. The resultant bend model file may then be stored in database 30. Before the sheet metal part may be produced, it will be necessary for a bending operator to develop a bending sequence for carrying out the required bending operations. The bending operator must also decide what type of tooling is required and define the tooling set-up for the bending machinery. This process of developing a bending plan may be aided and made more efficient by use of a graphical user interface and the various teachings of the present invention.

In order to develop the bending plan, a bending operator at, for example, bending station 18, may access and download the bend model and other job information from database 30. The bend model for the relevant part may be loaded or imported to the station module on the shop floor at bending station 18 via the communications network 26. This step is generally shown at step S.220 in FIG. 28. Thereafter, at step S.224, the bending operator may examine the shape and dimensions of the part by using the bend model viewer. At this point, the bend operator may selectively zoom and pan the various 2-D and 3-D views of the part at a display screen located at the bending station. By activating the automatic dimension feature of the present invention, the bending operator may also view the important bending dimensions for the part for carrying out the bending operations.

Once the operator understands the shape and dimensions of the part, the bending operator may begin to develop the bending plan by selecting and displaying a bend sequence input window, at step S.228. The bend sequence input window may provide a graphical user interface to assist a bending operator to create, modify and delete a bend sequence, and may also enable the operator to specify and enter various manufacturing parameters (e.g., backgauge location, tooling, NC data, etc.) for each step in the bend sequence. The bend sequence input window may contain a 2-D flat view image of the part displayed on a portion of the screen (e.g., at the center of the screen or towards the left hand side of the screen). The 2-D flat view image may include the various features of the unfolded part, including the flanges, holes and openings of the part. As the bending operator selects and indicates the bendlines and the bending sequence for each bendline, a solid 2-D or 3-D image of the intermediate part shape at each bending step may appear and be provided on a portion of the screen, such as on the right hand side of the screen, as shown for example in FIG. 29A. The images of the intermediate part shapes may be displayed in a sequence corresponding to the entered bend sequence, and may be simultaneously displayed on the screen with the 2-D flat view image of the part (such as in the example of FIG. 29A) or separately displayed on a different screen display.

Figure 29A:
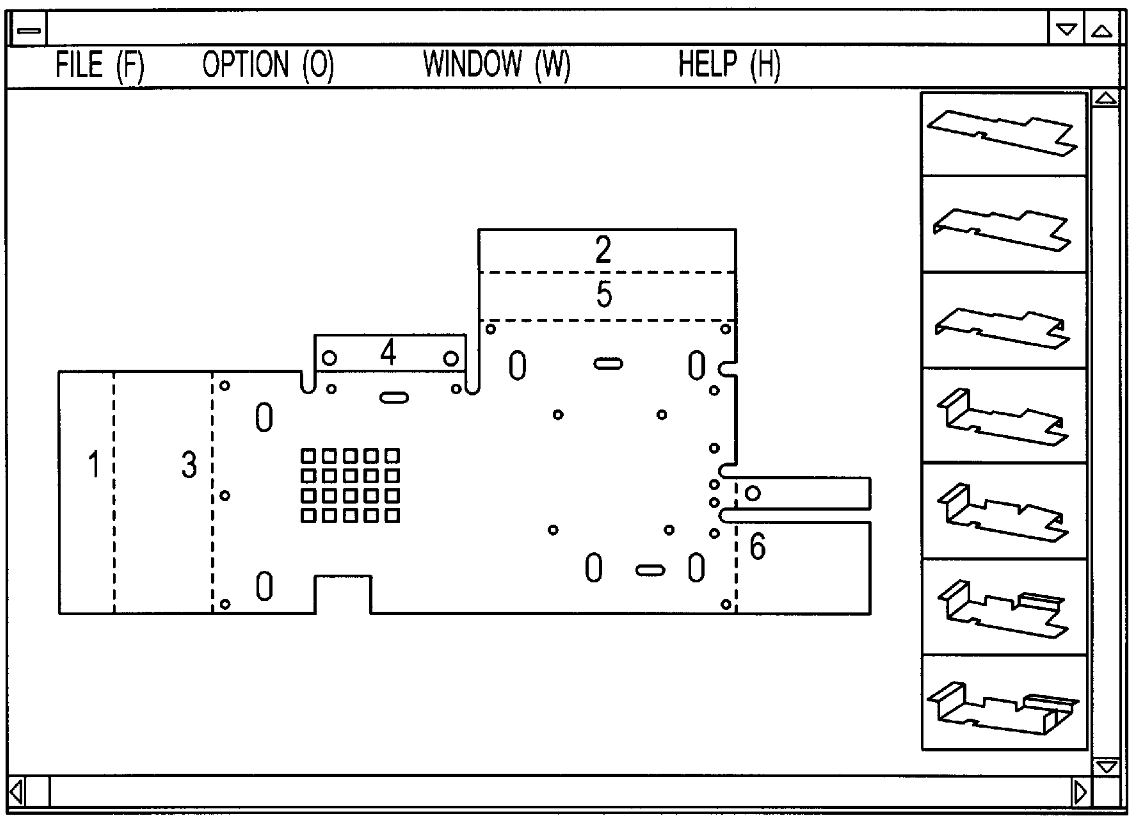
FIG. 29A illustrates an example of a bend sequence input screen image that may be displayed to a bending operator for developing a bending sequence.
Figure 29B:
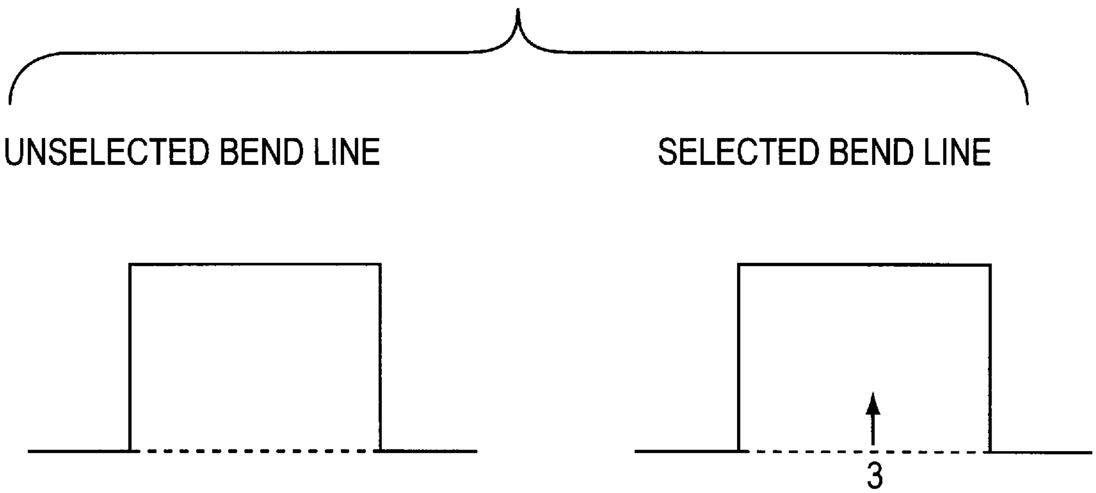
FIGS. 29B and 29C illustrates examples of selection a bend sequence and modifying the insertion direction, in accordance with another aspect of the present invention.
Figure 29C:
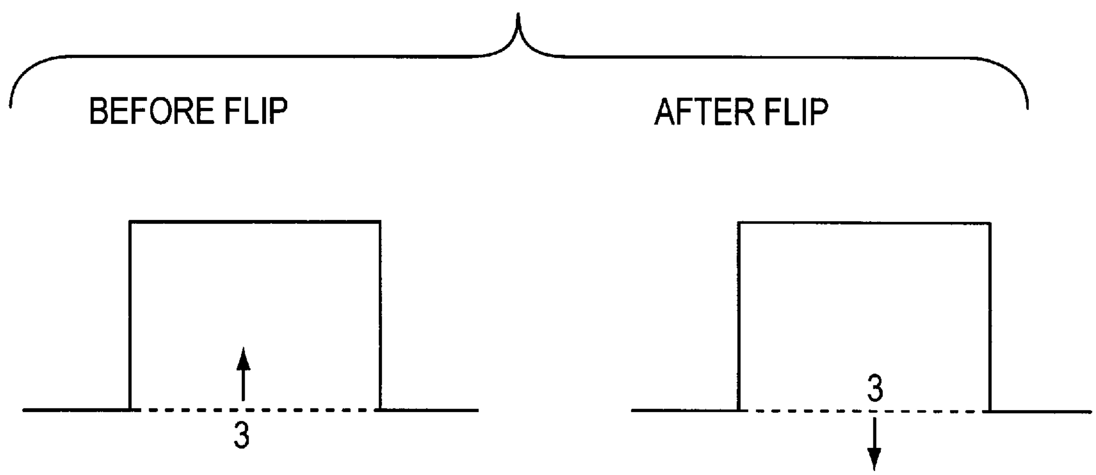
Figure 29D:
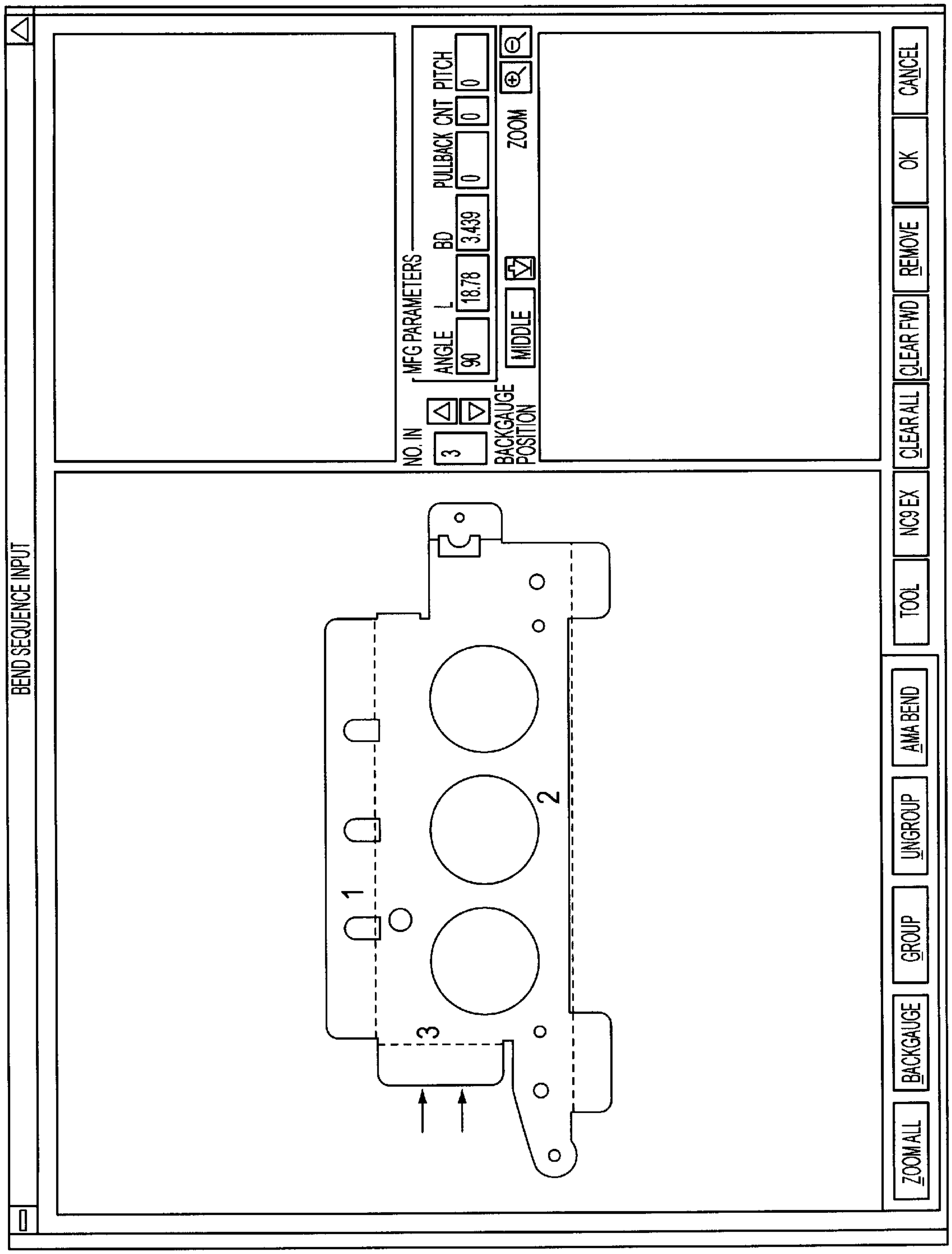
FIGS. 29D and 29E illustrate further examples of a bend sequence input screen image and a related screen display.
Figure 29E:
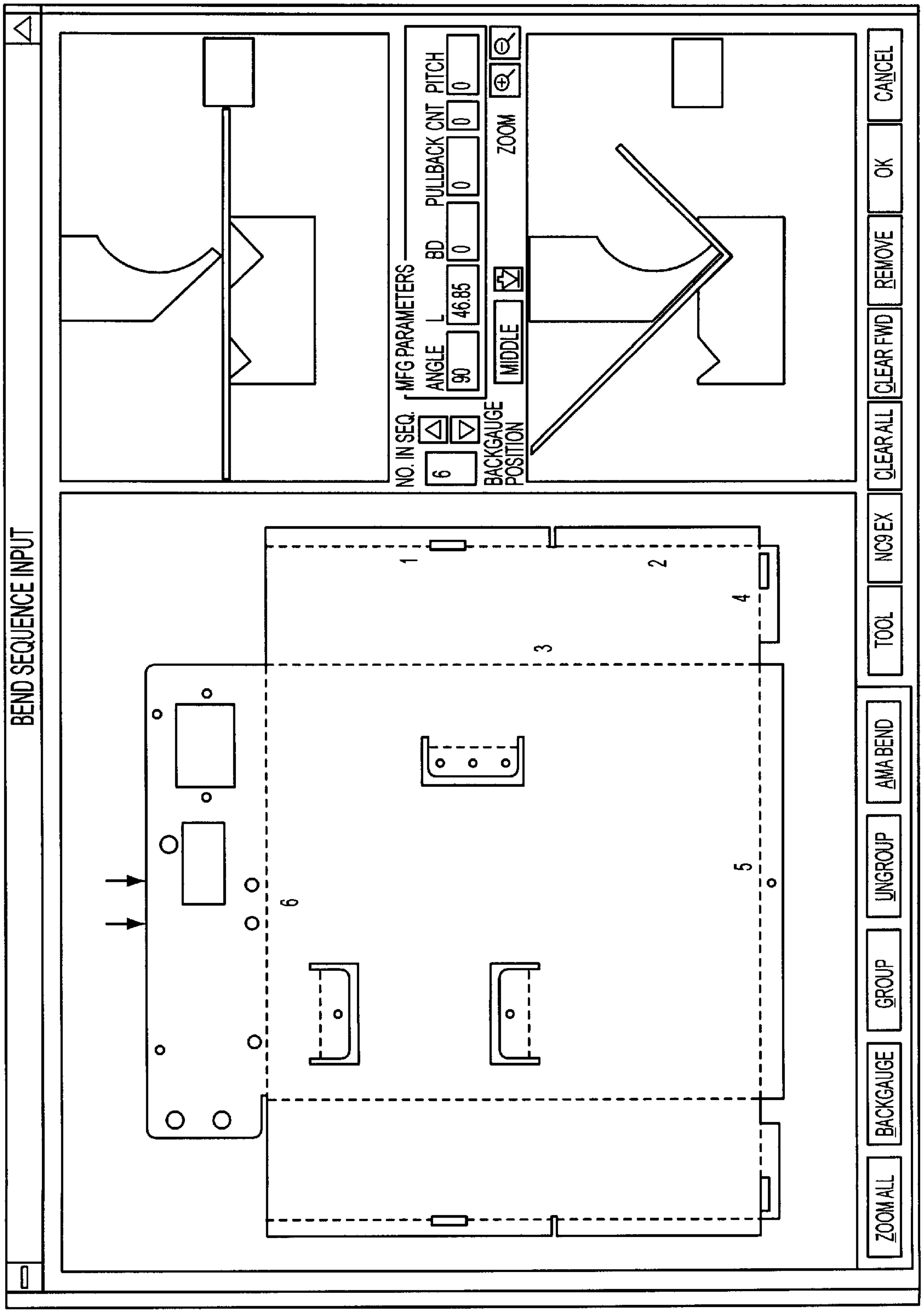

Further, as each bendline is selected, the bendline may be highlighted and a bend sequence number and an insert direction (e.g., represented by an arrow) may be displayed on or near the bendline, as shown for example in FIG. 29B. The bend sequence number for each bendline may be set automatically based on the sequence in which it has been selected, or the bend sequence number may be entered manually by an operator after each bendline has been selected. Other manufacturing information relating to the bendline, such as the bend angle, bendline length and backgauge position, may also be entered and/or displayed on the screen when each bendline is selected or highlighted, as shown for example in FIG. 29D and 29E. As shown in FIGS. 29D and 29E, dialog or information boxes may be displayed on the screen to permit a bending operator to select, enter or modify the manufacturing information and other parameters related to each bendline. The dialog or information box may also permit a bending operator to highlight or select a bendline, and hot function keys or fast switching keys may be displayed in the bend sequence input window to permit the bending operator to select or enter tooling and view and modify NC data. For example, a bending operator may select a Tool function key to switch from the bend sequence input window to a tool input display screen or display screens to enter tooling information. An NC function control key (e.g., NC9 Ex) may also be provided to permit an operator to view and/or modify NC data related to the bending operations to be performed.

Further, as shown in FIGS. 29D and 29E, other function keys and controls may also be provided related to defining and/or modifying the bendlines and the related manufacturing information. For example, a Zoom All key may be provided to zoom in and zoom out of the 2-D flat view image; a Backgauge key may be provided to select or set a position for the backgauge; a Group and Ungroup control key may be displayed to permit and control the bendlines that are to be bent together; and a control key (e.g., Ama Bend) may be provided to define special bend operations. Other functions keys may also be displayed to permit the bending operator to select, modify and/or delete the bend sequence (e.g., Remove, Clear Fwd, Clear All, OK, Cancel). With the bend sequence input window, the bending operator is able to efficiently view and modify the bend sequence and the various manufacturing information.

In addition, according to another aspect of the invention, cross-sectional views of the part and/or a bending simulation of the part may be displayed on the screen for each bending step in the bend sequence (see, e.g., FIG. 29E). The cross-sectional views and bend simulations may be selectively displayed on the screen or displayed as each bending line is selected by a bending operator. The cross-sectional views and bend simulations may include representations of, for example, the upper and lower bending tools (e.g., punch and die) and/or a backgauge position or setting, and may be displayed simultaneously on the screen with the 2-D flat view image of the part or displayed separately on a different screen display. The backgauge position may be determined automatically based on the topology of the part or may be set or modified by the operator. If the tooling information for the bendline has not been entered or set by the bending operator, the cross-sectional view and/or bend simulation may not be displayed on the screen, or only the representations of the intermediate part shape and a calculated or defined backgauge position may be displayed. The bend simulations may comprise a displayed simulation of any required flipping of the part, the handling and orientation of the part, and/or the bending of the part that is performed at each bendline. It is also possible to simultaneously display, on the display screen with the 2-D flat view image of the part, a cross-sectional view of the part before the bending step and a cross-sectional view of the part after the bending step has been formed (see, for example, FIG. 29E). These cross-sectional views may be provided on the right hand side of the screen and may include representations of the upper and lower bending tools and the backgauge for each bending step in the bend sequence. In addition, zoom control or function keys (ZoomIn and ZoomOut) may also be displayed to permit an operator to control the zoom ratio or aspect related to the before-bend and after-bend cross-sectional views. Techniques and processes similar to that disclosed in Japanese Examined Patent Application No. HEI 7-121418 (published on Dec. 25, 1995 in the names of NIWA et al.) and Japanese Unexamined Patent Application No. HEI 1-309728 (published on Dec. 14, 1989 in the names of NAGASAWA et al.), the disclosures of which are expressly incorporated herein by reference in their entireties, may be utilized to display the cross-sectional views and bend simulations of the part.

In accordance with an aspect of the invention, software or programmed logic may also be provided to automatically determine the insertion direction for the bend by calculating the shorter or smaller side of the part relative to the selected bendline. Based on a feature of the invention, each bendline may be used to divide the part into two sides. The insert direction may be determined for each bendline based on the side of the part that has a smaller or shorter length (e.g., the dimension of the side that is perpendicular to the bendline) or based on the side that has a smaller overall area. If an operator is not satisfied with the insertion direction that was selected, the operator may flip the insertion direction, as illustrated in FIG. 29C. The operator may change or flip the insertion direction by, for example, clicking a select button of the mouse or keypad when the bendline is highlighted. The insertion direction information may include an arrow and/or text to indicate the insertion direction of the flange defined by the bendline for bending the part with a bending apparatus or machinery. The insertion direction information may be displayed at or near the bendline (see, for example, FIGS. 29B and 29C) or at or near the end of related flange (see, for example, FIG. 29D). In addition, the insertion direction information may be displayed when each bendline is selected, or may be selectively displayed based on input received from a joystick device, mouse device or keyboard device.

Figure 30:
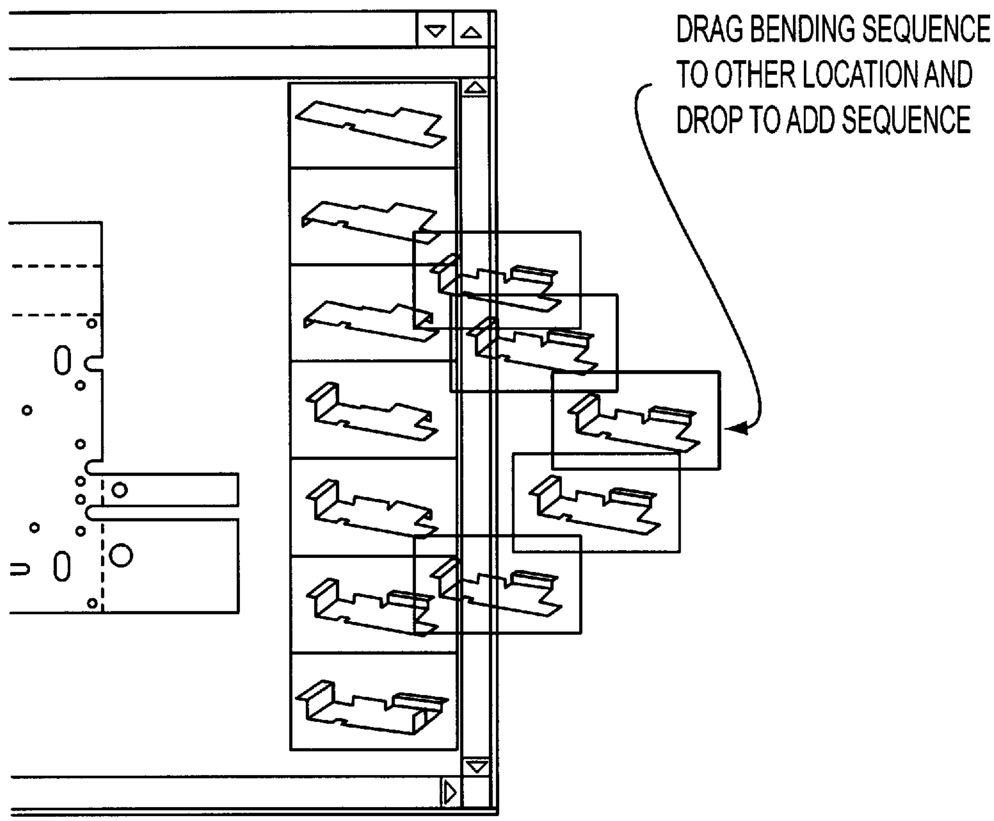
FIG. 30 illustrates, in accordance with an aspect of the present invention, a drag and drop editing feature that may be provided to facilitate a bending operator in modifying and editing a proposed bend sequence.

Thus, through the use of a graphical user interface, the bending operator can see the various intermediate shapes and the forming of the final part based on the selected bend sequence entered by the operator. Once again, the operator may enter and select data on the screen through an appropriate input device, such as a joystick interface, a mouse interface and/or a keyboard interface. If the bend operator is not satisfied with the proposed bend sequence, the bend operator may edit the bend sequence before finalizing the bending plan, as generally shown at step S.232. The editing of the bend sequence may be carried out in a variety of ways and methods. In particular, in accordance with an aspect of the present invention, a drag and drop editing feature may be provided to facilitate the bending operator in modifying and editing the bend sequence. As shown in FIG. 30, the operator may edit a selected bend sequence by simply grabbing one of the intermediate part shaped icons or displays provided on the left or right hand side of the screen and dropping it to its desired location in the sequence. Thereafter, based on the bend operator's modification to the bend sequence, the various intermediate part shapes illustrated on the screen will be modified to indicate the intermediate bend stages in accordance with the revised bend sequence. In addition, the bend sequence numbers on the 2-D flat view image may be revised based on the bend operator's drag and drop editing of the bend sequence.

Figure 31:
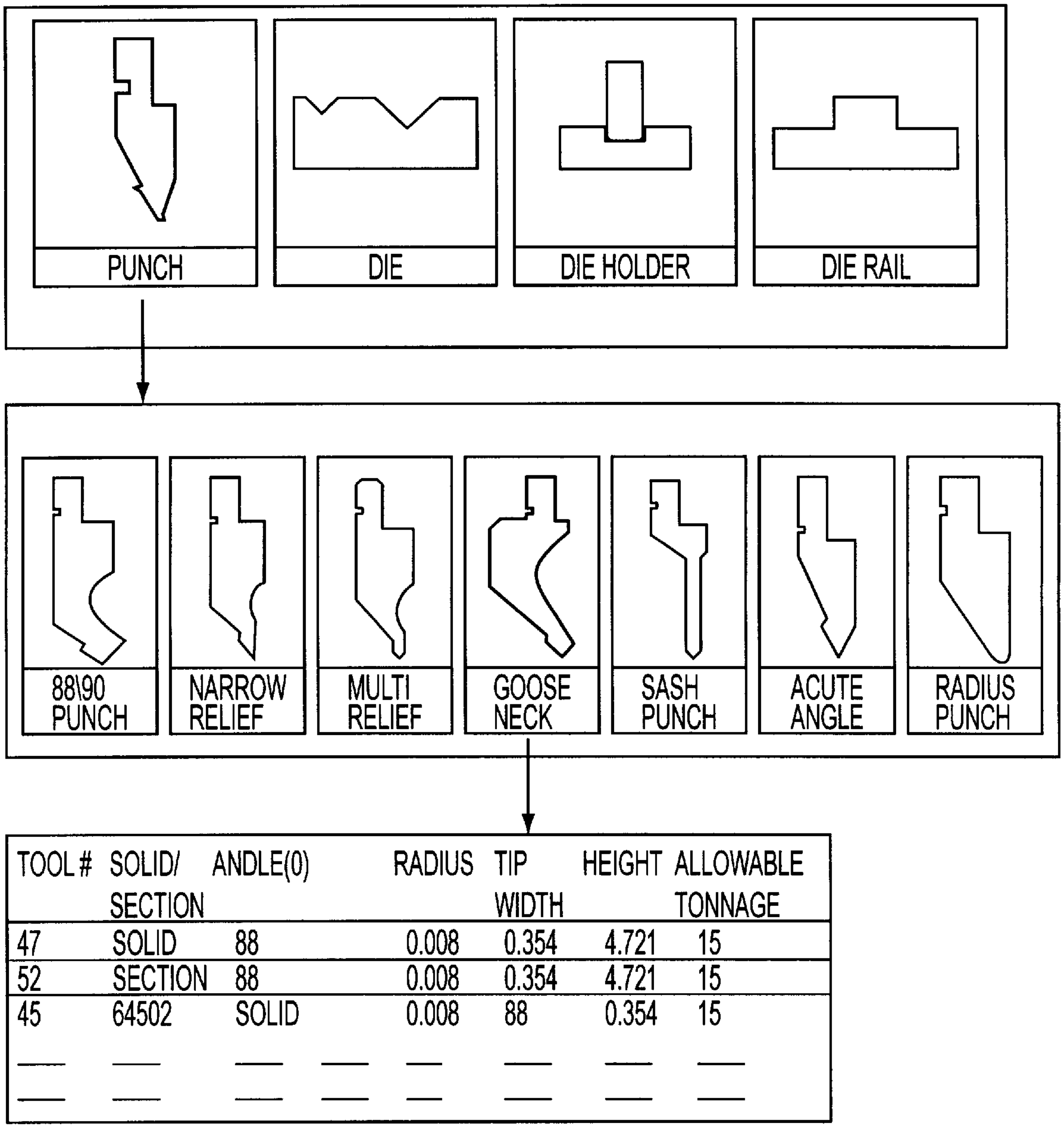
FIG. 31 illustrates an example of the various display menus and data tables that may be graphically displayed to aid a bending operator in selecting tooling.

After the bending sequence has been determined, the operator decides what type of tooling should be used by selecting tools from a stored library of tooling data, as shown at step S.236. The pertinent tooling information may be displayed to the bending operator on the shop floor and display menus may be provided to graphically aid the bending operator in selecting tooling from the library. Once a particular tool has been selected from the library, the pertinent data relating to the tool may be indicated on the screen. FIG. 31 illustrates an example of the various display menus and data tables that may be graphically displayed to the bending operator for manual tool selection. In the example of FIG. 31, successive display menus or screen displays are graphically displayed in order to aid the bending operator in picking a particular tool from the tool library. The successively displayed screen displays may be displayed simultaneously on the display device (e.g., in overlapping or cascading fashion), or may be individually displayed with the screen being cleared before each successive screen display is displayed. Once a particular tool has been selected, the particular data for that tool may be provided in a table and displayed to the operator. The data in the tooling library may be predefined and stored (e.g., in database 30) during an initial set-up procedure of the software.

The manual tool selection feature of the present invention may permit a user to select a tool type and the shape of the tool in each type. For example, various tool types may be selected, including punch, die, die holder, and die rail. Each type may consist of many shapes, and for each shape there may be many tools with different sizes and dimensions. To select a tool, a user would first pick one tool type by selecting one icon from the tool type icons that are displayed, such as that illustrated in FIG. 31. Thereafter, the user would be provided with a menu of different shapes that are available for the selected tool. After analyzing the tool shapes, the user may select a tool shape by selecting one of the shape icons from the displayed shape icons for the selected tool (e.g., in FIG. 31 a goose neck shape punch has been selected). Finally, the user may select the appropriate size and dimension for the tool shape that has been selected. As further shown in FIG. 31, a table may be displayed to the user to indicate the different sizes and dimensions of tools available for the tool shape that was selected. By selecting an item from the table, the selected tool may be displayed as an icon to replace the generic tool type icon and to confirm the selection of the tool.

Figure 32:
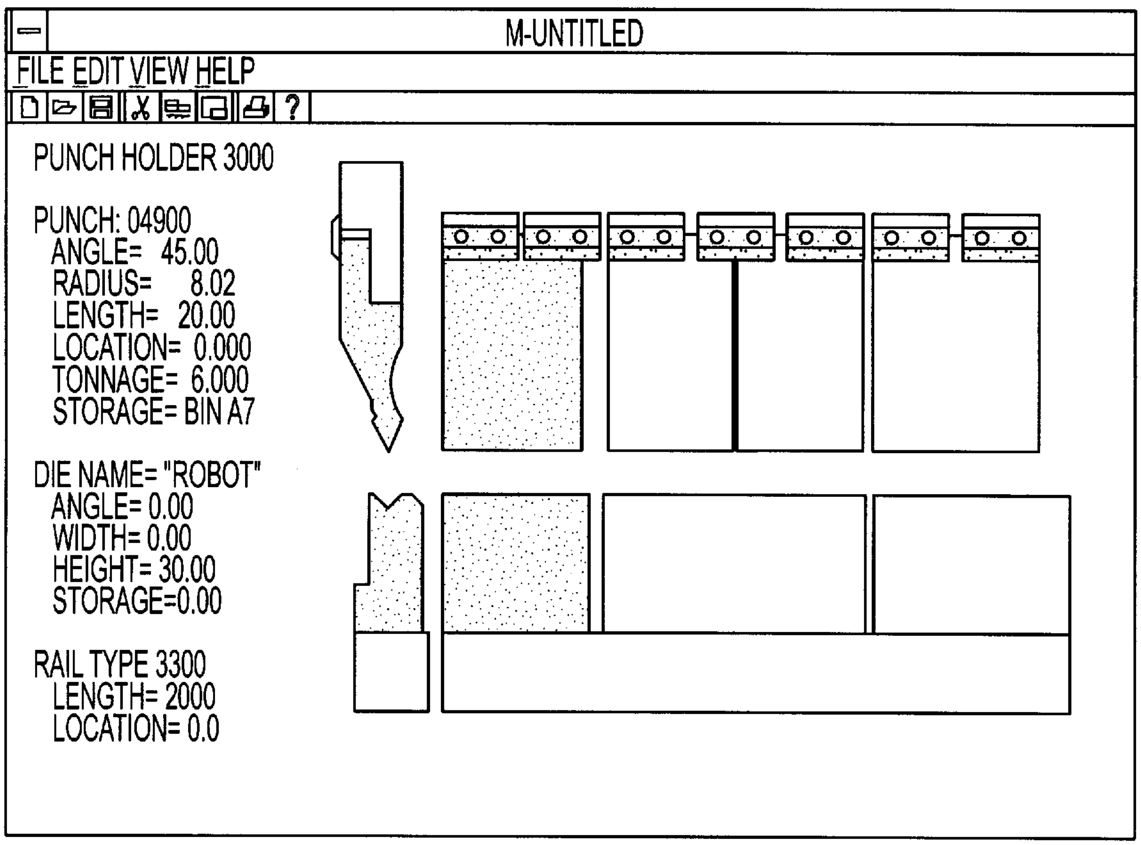
FIG. 32 illustrates an exemplary tool set-up window that may be displayed to a bending operator to facilitate the set-up of tooling in a proposed bending plan.

At step S.240, the bend operator may then set-up the various tool stages in the press brake by aid of a graphical interface. FIG. 32 illustrates an exemplary tool set-up window that may be provided to the bending operator to facilitate definition of the tool set-up to be used in the bending plan. Various punch, die and rail data may be indicated in the tool set-up window, as shown for example in FIG. 32. The tool and die information for the sheet metal part may be entered by the operator. A joystick may be provided at the bending operator's station module to permit the bending operator to indicate the tooling location and to select the tool and dies from a list of available tools and dies. In the tool set-up window, the left hand side of the screen may display the profile of the current tool set-up and the right hand side of the screen may display the location of the current set-up in the press brake. The current set-up location may be highlighted or shaded, as shown in FIG. 32.

Figure 28:
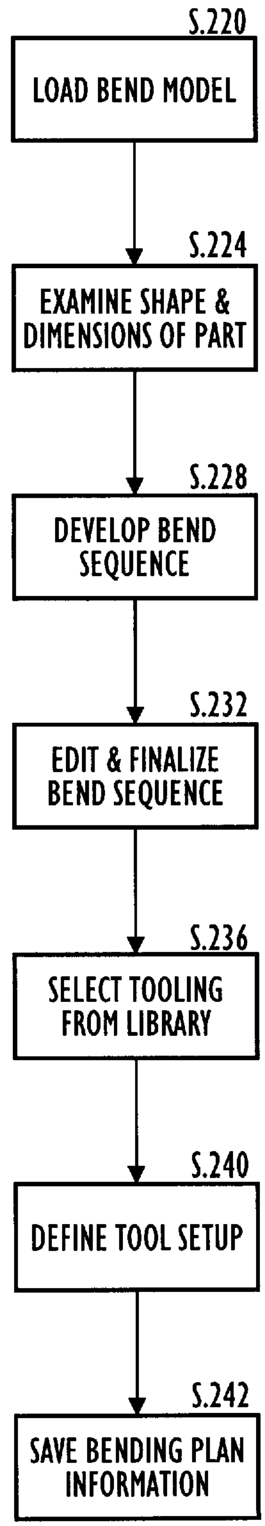
FIG. 28 is a flow chart of the logic flow of the processes and operations that may be performed to develop a bending plan through the use of a graphical user interface, in accordance with another aspect of the present invention.

Finally, once the bend operator is satisfied with the bend sequence, the bending plan information including the tooling and bend sequence information, may be saved with the bend model in the database 30, as generally shown at step S.242 in FIG. 28. Actual testing of the bend sequence may then be performed with the press brake in order to verify the bend sequence selected by the bend operator. If required, any further modifications to the tooling definitions or bend sequence may be performed by the operator or designer at the station module.

Various other features of the invention may be provided to aid the bending operator in the development of the bending plan. For example, in accordance with another aspect of the present invention, a tooling expert may be provided to automatically provide to the bending operator suggested tooling and bend sequences based on the part geometry and other information stored in the bend model. The suggestions from the tooling expert may be followed or revised by the bending operator after analyzing the same. In addition, a more complex tooling expert system may be provided to make tooling suggestions and bend sequence suggestions as to more complex operations based on the geometry of the part in the bend file and a profile analysis of the tooling to check for potential collisions and interference. Such expert systems may be used and implemented with either manual or robot assisted bending machinery. By way of non-limiting examples, the present invention may be implemented with the features and teachings disclosed in pending U.S. patent application Ser. No. 08/386,369, entitled "Intelligent System for Generating and Executing a Sheet Metal Bending Plan," in the names of David A. BOURNE et al., and U.S. patent application Ser. No. 08/338,115, entitled "Method for Planning/Controlling Robot Motion," in the names of David A. BOURNE et al., the disclosures of which are expressly incorporated herein by reference in their entireties.

As described above, a graphical user interface and various functions may be provided to facilitate the bend operator when developing the bending plan for a sheet metal part. In accordance with another aspect of the present invention, additional features may also be provided to aid in the design and manufacturing of the part. As described more fully below, various multimedia features may be implemented into the present invention, such as the storage of audio and visual information, to provide additional assistance to the bending operator when developing the bending plan or executing a bend sequence. Further, a collision check feature may be provided that automatically checks for potential interference and collision between the tools and the parts at each of the intermediate bending stages. This collision check feature may be provided to replace the cumbersome and time consuming manual check of the tool profiles and spacing in the part, which is customarily performed by bending operators when developing a bending plan. These features and others will now be described with reference to the accompanying drawings.

In accordance with an aspect of the present invention, a method may be provided for storing audio and video information with the bend model data. Various audio and video instructions can be recorded at the shop floor to provide special instructions with respect to, for example, the handling and bending of the sheet metal part. For this purpose, a CCD camera or digital camera may be provided at each of the station modules of the various locations 10, 12, 14 . . . 20, along with an audio microphone. Other equipment, such as a video camera with an audio microphone, may be provided at the station modules to permit the operator or user to record audio and video information. The various recording equipment may be connected to a station module computer at the shop floor. By way of a non-limiting example, an Intel PROSHARE personal conferencing CCD camera (available from Intel Corporation) may be used for recording audio and video information. Other commercially available CCD cameras or digital cameras may also be utilized to record such information.

The various audio and video information that is stored with the bend model data may be accessed and retrieved by the user according to various methods and procedures. For example, menu options may be displayed by the station module to permit the replay of stored audio and video information. In addition, in accordance with a preferred embodiment of the present invention, an operator may be provided the ability to attach and associate the stored audio and video information with the various display screens and views of the part by selecting and creating icons that are displayed in the view window. This feature may be implemented through software and object oriented programming techniques, whereby an icon object is created and stored within the bend model data structure. The icon object may contain procedures for retrieving attached audio and video information from memory based on certain conditions (e.g., the selection of the icon by the operator by double clicking a mouse or indicating selection by use of a joystick or other input means). With the icon feature of the present invention, the operator may associate different audio and video messages or information with different parts of the sheet metal part and to any display. By incorporating the icon into the part representation, the icons may be adapted to zoom, rotate and translate with the 2-D and/or 3-D model displays of the part as the view is changed on the screen.

Figure 33A:
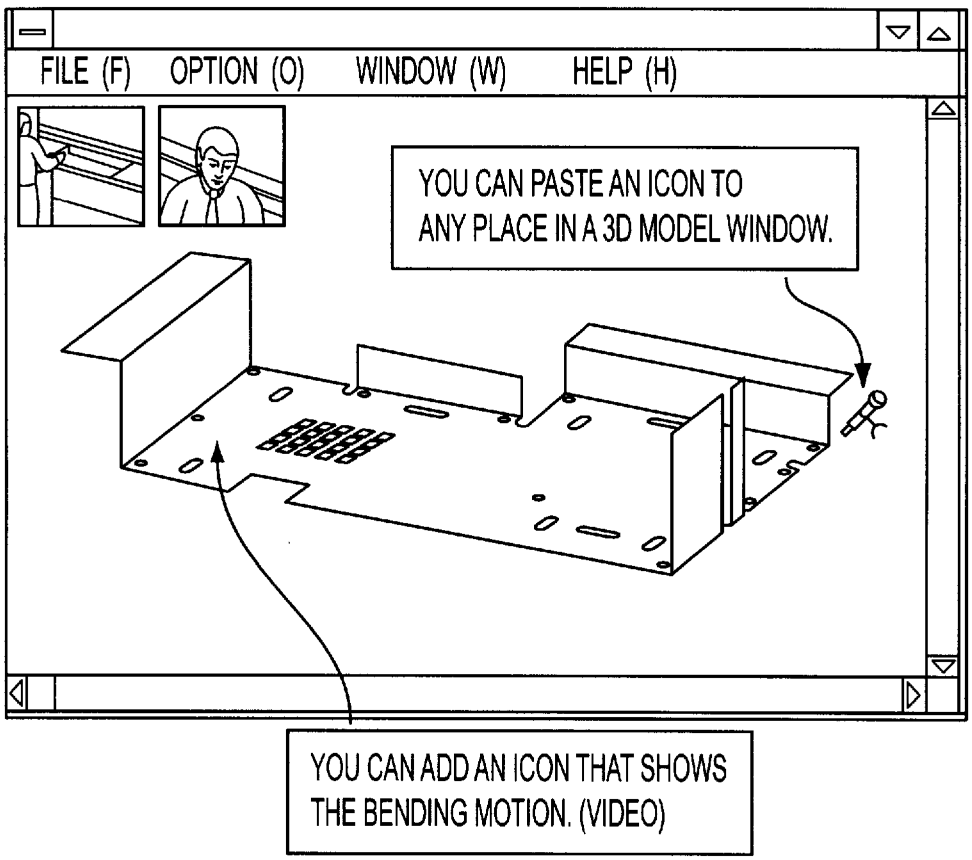
FIG. 33A illustrates an example of a 3-D solid view window display with audio and visual information attached through the use of pasted icons.

FIG. 33A illustrates an example of attaching audio and visual information through the use of icons pasted to a 3-D solid model of the part. After the user has recorded the audio and visual information, the operator may paste an icon at any location within the 3-D model window. When the icon is subsequently selected by an operator or user, the stored audio and visual information may be played back and displayed in the window to provide any special instructions or messages concerning the part or the area of the part to which the icon was placed. Other information, such as the simulation or recording of the bending motion, may be associated with the part by placing icons in proximity to the various bend lines of the part. The video information concerning the bending motion may then be played back to the user when the icon is selected.

The operator or user may record both audio and video information, or only record a simple audio message or a still or motion video signal, that may be selectively played back to the user. The icons that are attached to the window display may graphically indicate the type of information that is stored (e.g., a microphone icon may be depicted to indicate that audio information has been stored or a display monitor icon may be provided to indicate that video information has been stored). Special icons may also be provided to indicate that both audio and visual information are associated with that icon (e.g., an "A/V" symbol or a video camera icon that includes a microphone). A directory of icons may be provided and displayed to allow the user to select among the various icons when attaching audio and/or video information to the screen display or image.

Figure 33B:
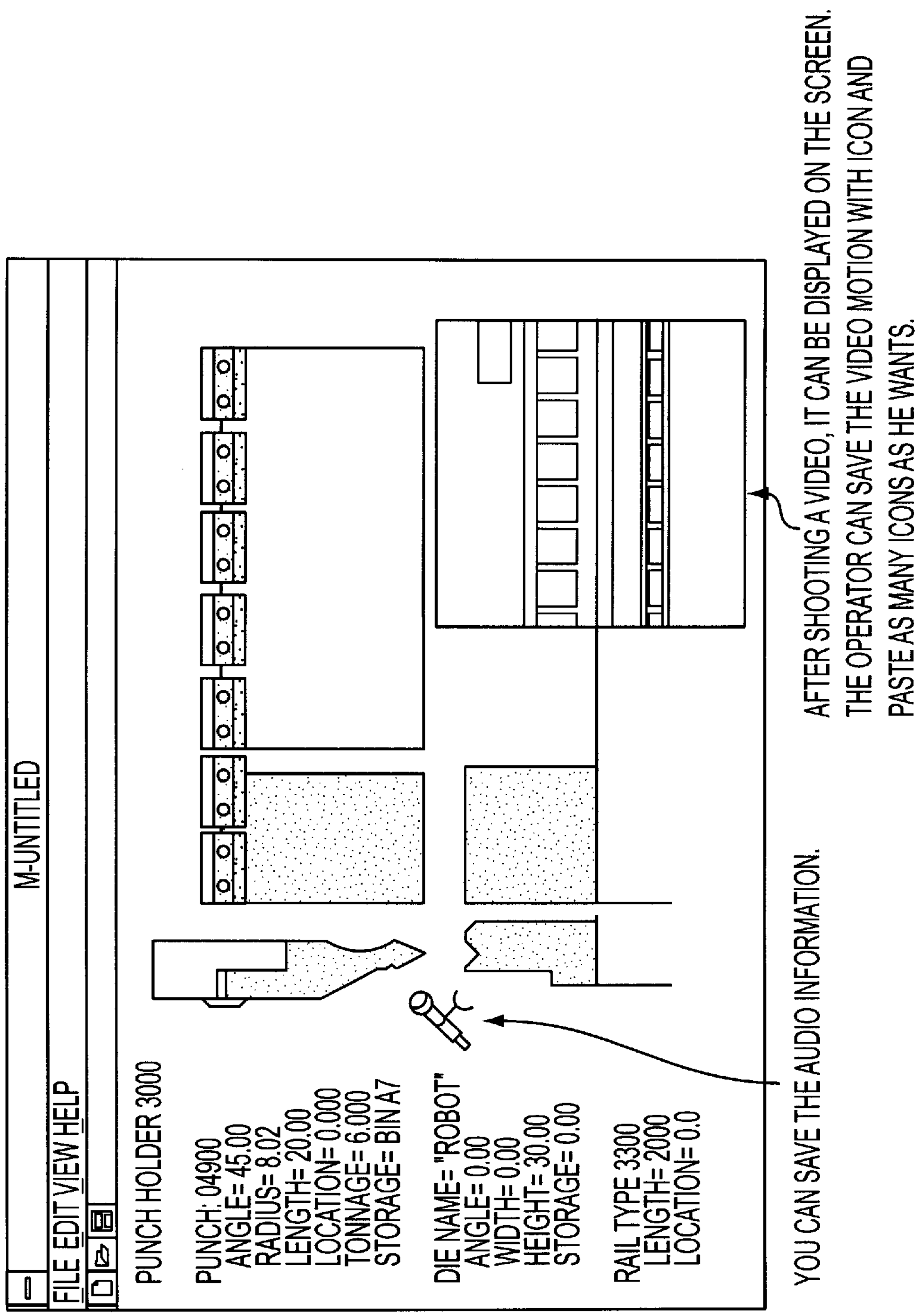
FIG. 33B illustrates another example of a display window that may be incorporated with icons for retrieving stored audio and video information, in accordance with an aspect of the invention.

FIG. 33B illustrates another example of a display window that may be incorporated with icons for retrieving stored audio and video information. The display window depicted in FIG. 33B relates to the tool set-up screen image, such as that described above with reference to FIG. 30. In the example of FIG. 33B, audio information may be stored and retrieved by a microphone icon and separate video information may be stored and retrieved by pasting a video icon to the display window. The audio and video information may relate to special instructions or information regarding tool set-up or operation. Further, regardless of the type of window display that is currently active, the operator may paste as many icons as required to the various areas in the window display so that different audio and video information may be later retrieved.

Figure 34:
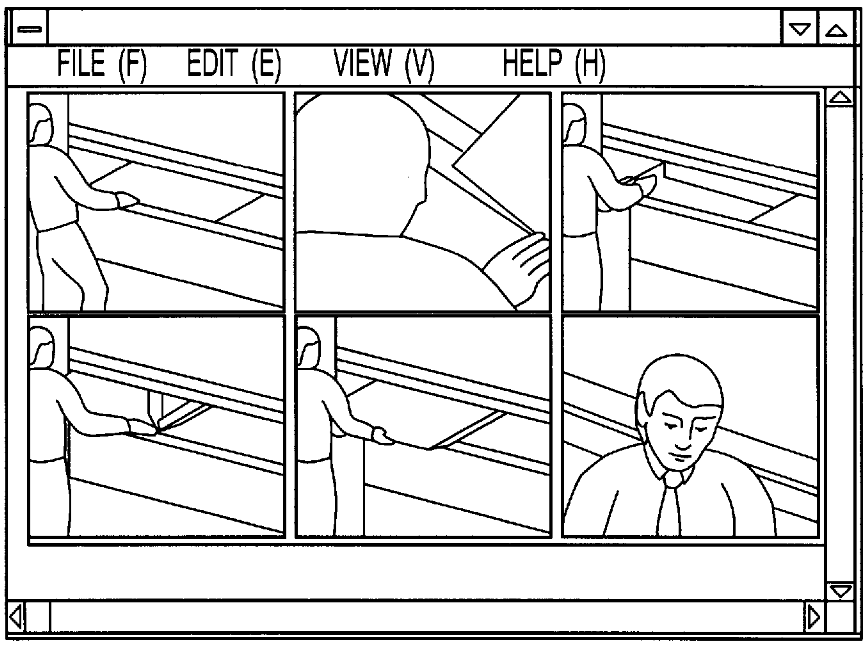
FIG. 34 illustrates an example of an image editing window that may be implemented in accordance with the teachings of the present invention.

In accordance with another aspect of the invention, an image editing window feature may be provided to facilitate the operator in selecting stored images and applying them to different screens. The imaging editing window feature may be provided as a Windows based application that may be accessed at, for example, server module 32 or any of the station modules provided throughout the manufacturing facility. FIG. 34 illustrates an example of the image editing window that may be implemented in accordance with the teachings of the present invention. The images displayed in the image editing window may include images shot by a digital camera or a CAM coder. The images that are displayed on the screen may be selectively chosen by the operator (e.g., through a mouse or other appropriate data input means) and copied to different screens so that they may be associated with particular model views of a part. The operator may then paste the image or an icon to the model window (e.g., a 3-D solid model window of the part, such as that shown above with respect to FIG. 33B). The images shown in FIGS. 33 and 34 are photocopy reproductions of actual screen images; the actual video images will themselves be clearer, dependent upon the resolution of the camera and screen used. The images can include, e.g., a still or motion video image of a bending operator discussing or illustrating special handling or other instructions relating to a bending operation, or may be a video image of a sheet metal bending operation. In other words, any actual image which may be useful can be taken and later displayed. Thus, the actual images shown in FIGS. 33–34 are for illustrative purposes only.

Figure 35A:
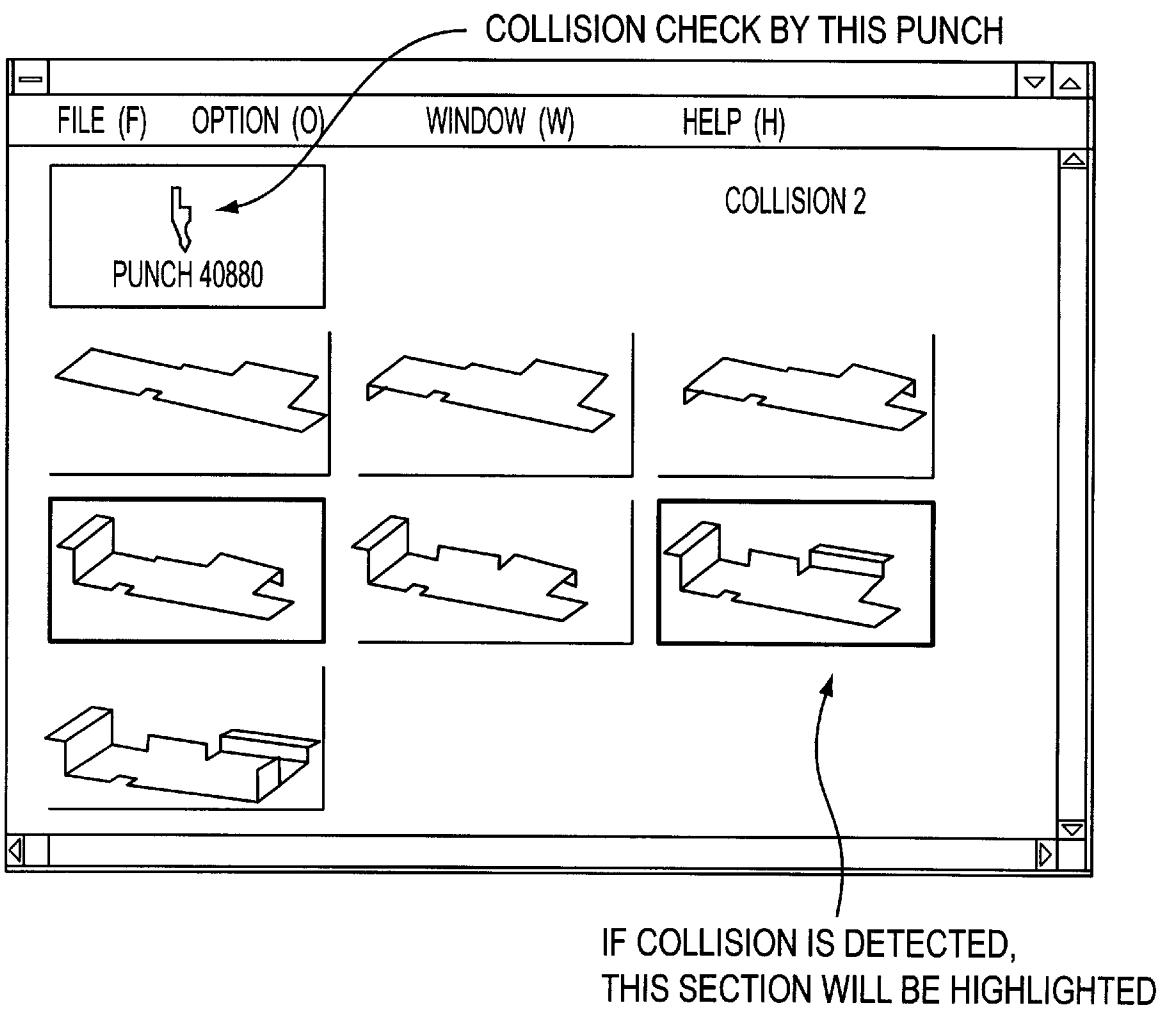
FIGS. 35A and 35B illustrate examples of a collision check function of the present invention that may be implemented through a graphical user interface.
Figure 35B:
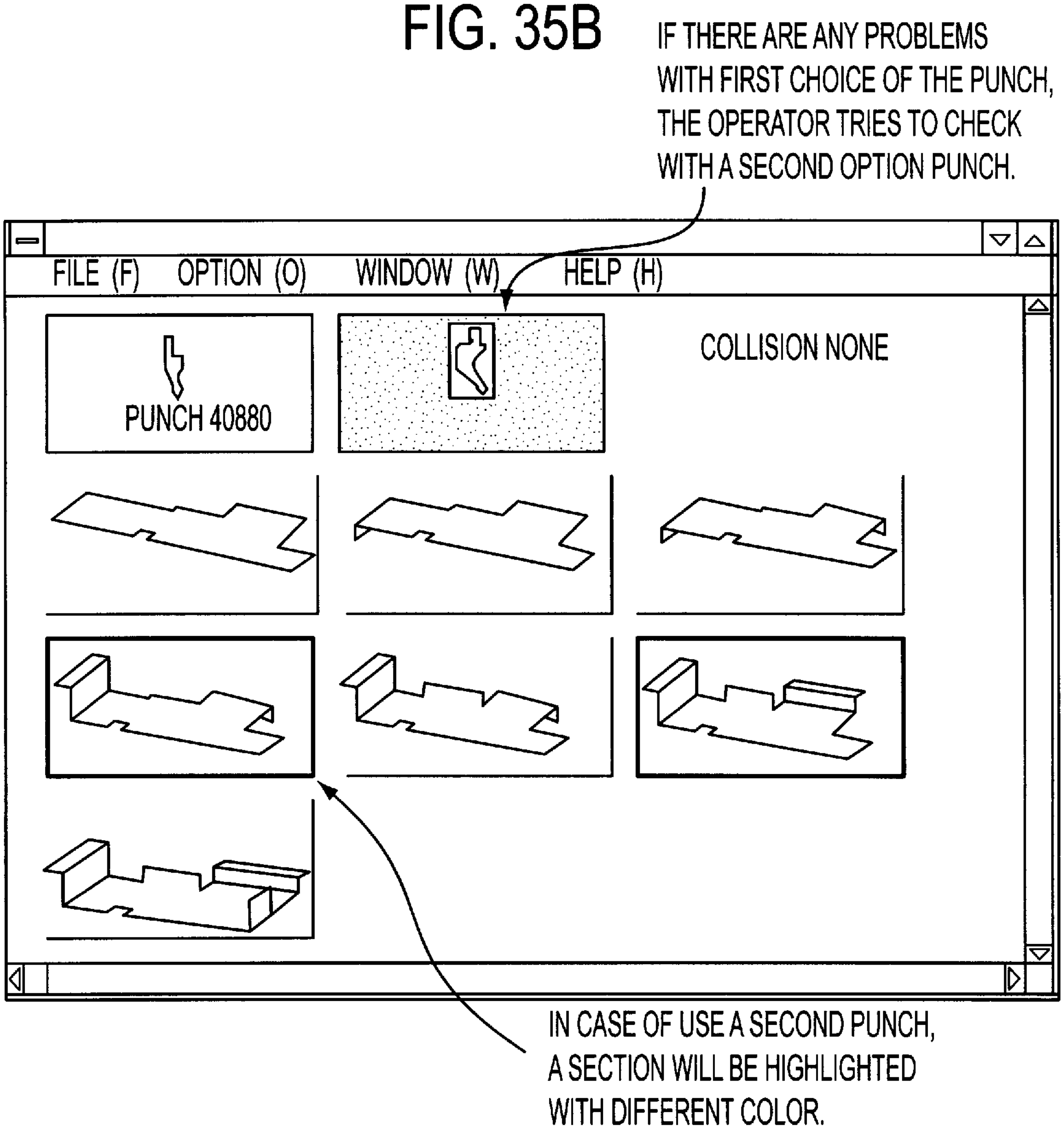

Referring now to FIGS. 35A and 35B, an example of a collision check function of the present invention will be provided. In accordance with an aspect of the present invention, a collision check function may be provided to allow users to check for potential collisions between the part and punch tool through use of a graphical user interface. The collision check function may be a Windows based application that may be accessed at any station module or location within the manufacturing facility. The automatic collision check function of the present invention may be used by a bending operator in place of the traditional and cumbersome manual profile check that is customarily performed when developing the bending plan.

Traditionally, when developing a bending plan for a sheet metal part, a bending operator will first determine the bend sequence for the part. The bend sequence defines the order and manner in which the sheet metal part is to be bent during production. After the bend sequence has been determined, the bending operator will select and define the tooling to be used to carry out each of the bending operations. During this process, the profile of the tools selected and the intermediate shapes of the part will be analyzed to ensure that there is no interference or collision(s) between the tools and the part when carrying out each of the bending steps. If a collision or interference is detected, then the type of tooling selected (or, if necessary, the bend sequence) will have to be modified so that the bending operations may be carried out without interference or collision between the tool(s) and the sheet metal part.

When detecting for potential collisions or interference, bending operators have traditionally relied upon manual methods to analyze the clearance between the profile of a tool and the bent parts or shapes of the sheet metal component. Typically, a model of the tool profile is constructed and used by a bending operator. The tool profile model is manually matched or overlaid with engineering or technical drawings (having the same scale size as the tool profile model) of the various intermediate shapes of the sheet metal. By fitting and matching the tool profile model with the drawings of the part, the bending operator can determine whether there is sufficient space and clearance between the tool and the part at each of the bending steps. This process, however, tends to be cumbersome and time consuming.

The present invention overcomes the disadvantages of such traditional methods by providing an automatic collision check function. The collision check function of the present invention may be implemented through a graphical user interface to permit the bending operator to check for collisions at each intermediate step within a defined bending sequence. FIGS. 35A and 35B illustrate examples of the collision check function implemented through a graphical user interface. When activated, the collision check function will automatically check for collisions between each intermediate shape of the part within the bending sequence and the punch tool or tools defined for that sequence. The intermediate shapes may be displayed on the screen (see, for example, FIGS. 35A and 35B) and if a collision is found, the step at which the collision is detected may be highlighted on the screen. In addition, other display indications, such as text, may be provided to indicate the number of collisions detected. In the examples of FIGS. 35A and 35B, the collision information is provided in the upper right hand area of the display window. In addition, the type of punch tool or tools for which the collision has been checked may be displayed or indicated in the upper left hand area of the display window.

If a collision is detected for the punch tool selected by the operator, the intermediate shapes or stages at which the collision is detected may be highlighted on the screen. In this case, an operator may select another punch tool for that particular bending stage and the collision check function may be reexecuted to determine if a collision will occur with the second choice for the punch tool. The operator may select a punch tool for each bend and check for collisions with the collision check function. Drag and drop editing may be provided to allow the user to change the bend sequence displayed in the window display by dragging the intermediate bending shapes and dropping it to a desired position within the proposed bend sequence. The bend sequence may then be modified based on the drag and drop editing performed by the operator, in a similar manner to that described above with reference to FIG. 32.

Various processes and operations may be used to implement the collision check feature of the present invention. For example, in order to detect for a potential collision, the geometry for the selected tool and the geometry for the part at each intermediate shape may be accessed. The geometrical data relating to the part at each intermediate step may be generated based on the bend sequence and the part dimensions and topology data. Each flange of the part may be folded in accordance with the bend data (e.g., bend angle, bendline location, deduction amount, etc.) in order to render the part at each intermediate stage in the bending sequence. The above described folding process and deduction compensation features of the invention may then be applied when generating the geometrical data for the part at each intermediate stage. With the tool and part geometry, the tool and part may be oriented with respect to one another by placing the tip of the tool at the bendline of the part at each of the bending stages. A collision may be detected by analyzing the geometrical data and boundaries of the tool and the part and determining whether there are common points or overlapping points in the tool and the part. When a collision is detected at a particular bending step, that step may be highlighted on the screen to indicate the detection of a collision to the user.

The tool data that is used to detect for collisions may be actively taken out of a tool shape library based on the tooling selection(s) made by the user. Recalculation of a collision at any intermediate bending step may be performed based on a different tool shape or modification of the bending sequence. By providing such features, and displaying such information through a graphical user interface, such as that described herein, the potential for collisions may more easily be determined and corrected by the bending operator.

As described above, a joystick or mouse device may be provided at each of the station modules and locations throughout the manufacturing facility in order to permit the user to selectively activate and control various viewing functions (e.g., zoom, pan, rotate, etc.) when viewing the rendered model of the sheet metal part. The joystick device may be a multi-axis joystick and include select and control buttons. The joystick may be implemented through various commercially available joystick devices, including a Microsoft SideWinder joystick, and may be plugged into a game port of the computer of each of the station modules and/or other locations in the facility. The mouse may also be implemented by any commercially available mouse support software, such as Windows 95 or Windows NT, and any commercially available mouse device that is plugged into a game or mouse port of the computer at each of the facility locations.

By way of non-limiting examples, FIGS. 36–41 illustrate various aspects of a system for manipulating 3-D geometrical shapes and renderings of the part by using a joystick or mouse device. The 3-D navigation system of the invention permits a user to control various viewing functions, such as rotation, zooming and panning. In accordance with an aspect of the present invention, the system may also use a dynamic rotation axis that is calculated based on the current zoom view when viewing the 3-D model. According to this aspect, the center of rotation may be dynamically changed and calculated based on the current view and zoom ratio or factor so that the zoomed area of the part will not disappear from the screen when the part is rotated with, for example, a high zoom ratio or factor.

In accordance with an aspect of the present invention, the 3-D manipulation and navigation system may be provided at the station modules and/or server module of the facility. The processes and operations of the 3-D navigation system may be implemented through software or programmed logic and by using any one of a wide variety of programming languages and techniques. For example, the system may be implemented by using a high level programming language such as C++ and using objected oriented programming techniques. Further, by way of a non-limiting example, VISUAL C++ may be utilized, which is a version of the C++ programming language provided by Microsoft Corporation for Windows based applications. The viewing functions (e.g., zoom, rotate, pan, etc.) may be defined and implemented as member functions of the view class of the bend model viewer of the present invention described above (see, e.g., FIG. 18 and the related disclosure provided above). Information concerning the current zoom factor and position of the part (e.g., the position of the part in 3-D space) may also be accessed from the bend model viewer to calculate the dynamic rotation axis and to provide the desired viewing functions.

Various hardware components and interfaces may also be provided in order to implement the 3-D navigation system of the present invention. For example, the software used to implement the system may be provided or reside in the computer or personal computer of the station modules and server module. As discussed above, the computer or personal computer may include a graphics card and a display screen or terminal, such as a high resolution monitor, to display 3-D renderings of the sheet metal part to the user. The computer or personal computer may also include a mouse or game port adapter card to connect and interface with the mouse or joystick device. Commercially available software may also be provided to interpret the command signals received by the mouse or game adapter card from the user-operated mouse or joystick device.

Figure 36A:
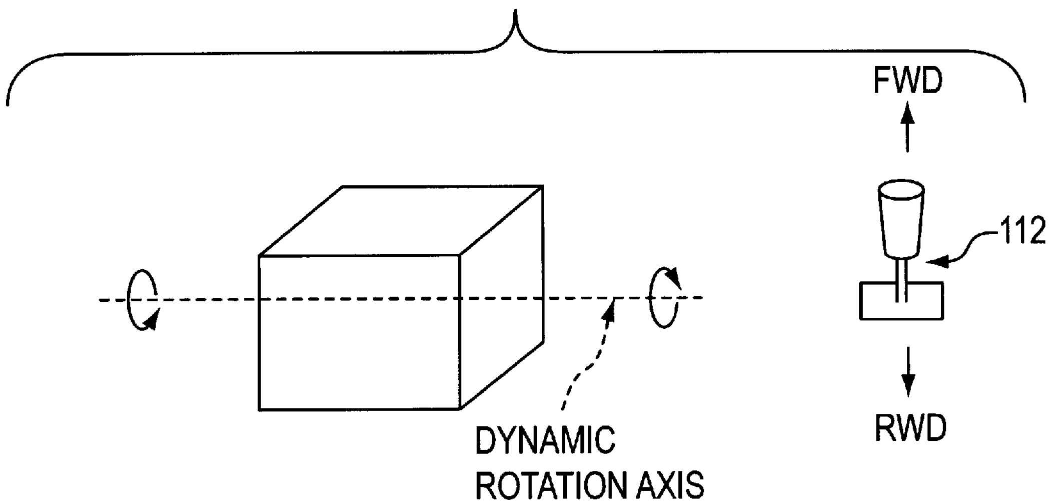
FIGS. 36A and 36B illustrate a manipulation system of the invention for manipulating the rotation and display of 3-D geometrical shapes by using, for example, a joystick.
Figure 36B:
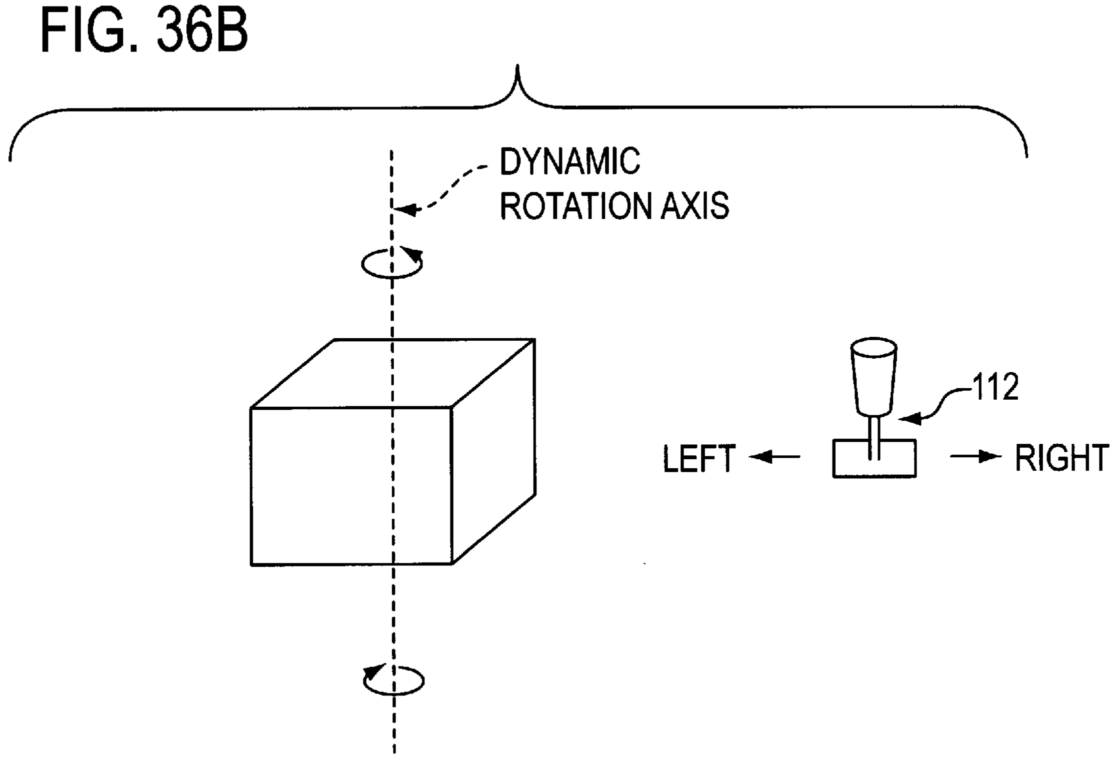

FIGS. 36A and 36B illustrate examples of rotation functions that may performed with a multi-axis joystick 112 to rotate, for example, a simple 3-D box shaped part. As noted above, a joystick may be provided and connected to a computer or equipment provided at the station modules and/or server module provided throughout the facility. As shown in FIGS. 36A and 36B, rotation of the part may be achieved by moving the joystick 112 forwardly or rearwardly, and to the left and the right. The orientation or direction of the rotation axis may be set based on the movement of the joystick 112 (or mouse). For example, moving the joystick 112 forwardly or rearwardly may cause the part to rotate in the clockwise or counter clockwise direction about a rotation axis defined along the X-coordinate axis (see, e.g., FIG. 36A). Further, moving the joystick 112, however, to the left or right may cause the part to rotate in the clockwise or counter clockwise direction about a rotation axis defined along the Y-coordinate axis (see, e.g., FIG. 36B).

When the zoom ratio or factor of the current view is low and the entire rendering of the part is provided on the screen, the rotation axis may be defined as passing through the geometric center or centroid of the part. As described above, the zoom factor and the visibility of the part on the screen may be determined based on the visibility function provided by the bend model viewer of the present invention. When it is determined that the entire part is displayed in the screen (such as that in FIGS. 36A and 36B), then coordinate geometry techniques may be used to define and set the rotation axis to the geometric center of the part. Rotation of the part may then be performed based on the user-defined movement of the joystick device and through the rotate member, viewing function of the bend model viewer of the present invention.

If, however, only part of the object is displayed on the screen and it is determined that portions of the part are not visible (e.g., a high zoom factor or ratio has been selected), the rotation axis should not be maintained at the geometric center or centroid of the part, since to do so may cause the zoomed portion of the part to disappear from the screen during rotation. Instead, according to the invention, when the zoom ratio is increased, the rotation axis is dynamically recalculated such that the rotation axis passes through the coordinate of the closest point to the viewpoint (or camera view) at the center of the screen. By dynamically recalculating the rotation axis based on changes in the zoom factor, the part may rotated about an axis that does not cause the visible portion of the part to go out of view during rotation.

Figure 37:
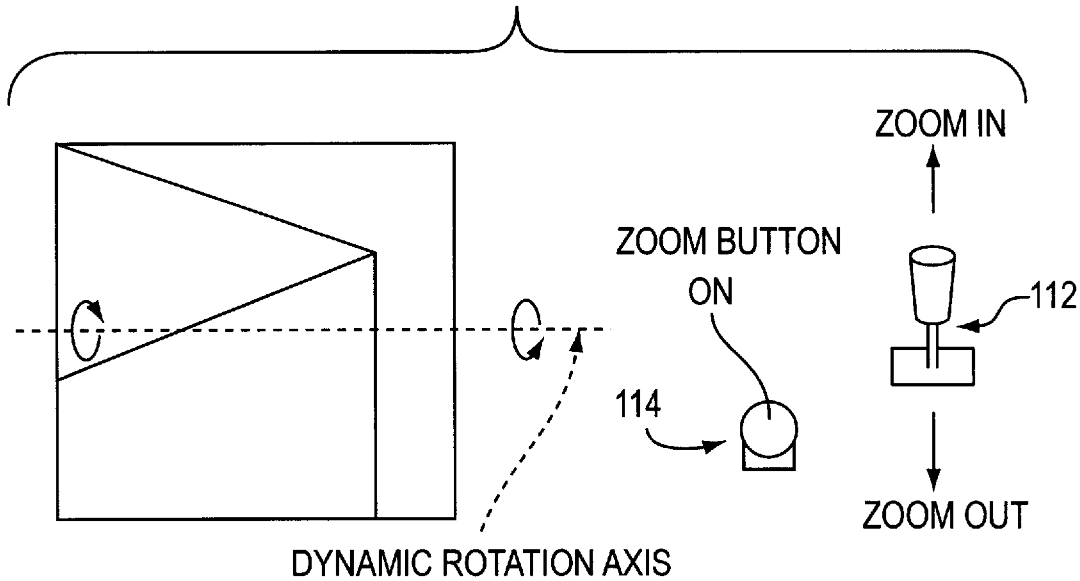
FIG. 37 illustrates a manipulation system of the invention for manipulating the zooming and display of 3-D geometrical shapes by using, for example, a joystick and zoom button.
Figure 38:
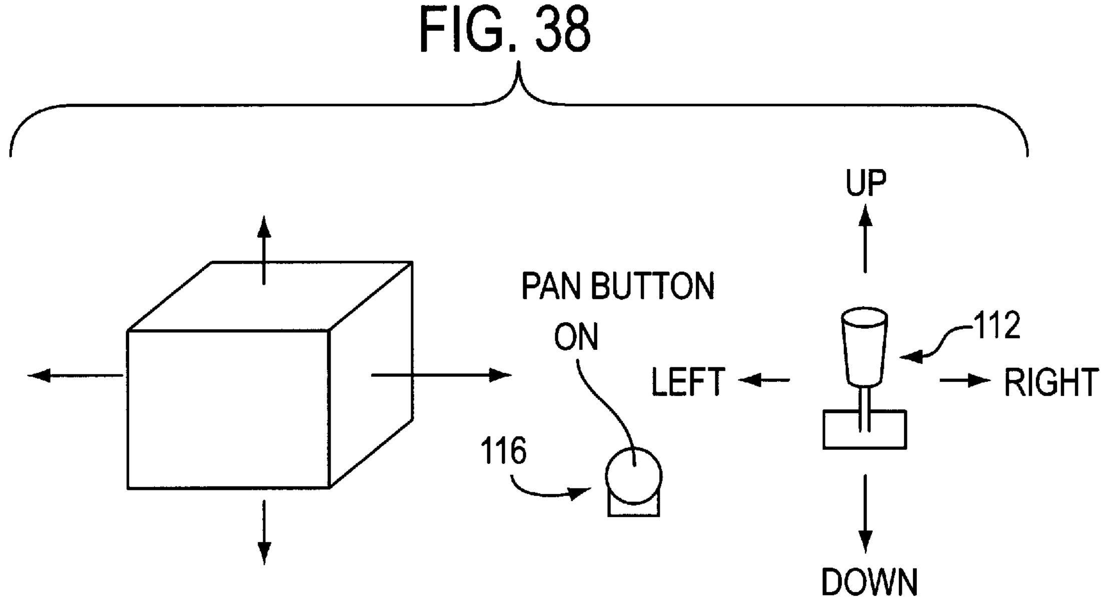
FIG. 38 illustrates a manipulation system of the invention for manipulating the panning and display of 3-D geometrical shapes by using, for example, a joystick and pan button.

In order to perform zooming and panning of the 3-D model, additional control buttons may be provided on a keypad that is provided separately or with the joystick or mouse device. For example, by pressing a zoom button 114, and moving the joystick 112 forwardly or rearwardly, the part may be zoomed in or out based on a predetermined rate, as shown in FIG. 37. As discussed above, the rotation axis may be recalculated within each zoom window to permit the user to view the zoomed portion of the part when rotation is performed. In addition, panning of the 3-D shape may be controlled by the user by pressing or activating a pan button 116 and moving the joystick 112, as shown in FIG. 38. As with the zoom button 114, the pan button 116 may be provided on a digital input pad that is provided separately or with the joystick or mouse device at each of the various locations of the facility.

In accordance with an exemplary embodiment of the invention, the various processes and operations that may be provided to implement the 3-D navigation and manipulation system will be described below with reference to FIGS. 39–41. As indicated above, the necessary processes and operations of the 3-D navigation system may be implemented through a combination of software or programmed logic, and hardware components and interfaces. Input signals from a user-controlled device, such as a joystick or mouse device, may be interpreted to determine the amount of movement and reorientation of the rendered part that is desired. In accordance with the invention, the rotation axis of the rendered part may be calculated dynamically, based on the current view and zoom factor, in order to prevent the zoomed area of the part from disappearing from the screen during rotation.

Figure 39:
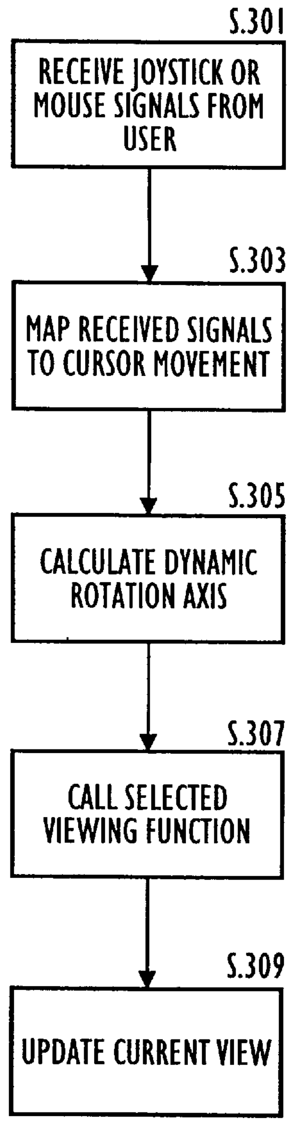
FIG. 39 is an exemplary flow chart of the processes and operations that may be performed in order to implement the 3-D navigation and manipulation system of the present invention.

When updating the current view of the rendered part, input signals are received from the user based on the manipulation of the joystick or mouse device, as generally indicated at step S.301 in FIG. 39. Movement of the joystick or mouse device by the user in a particular direction, and/or in combination with the activation of special control buttons, may cause certain viewing functions (e.g., rotate, zoom, pan, etc.) and movement of the rendered part in predetermined directions (e.g., clockwise or counterclockwise; zoom-in or zoom-out; left or right; etc.) to be effectuated, as described for examples in FIGS. 36–38. The received signals, whether they are from a joystick or mouse device, may be mapped to cursor movement to define the amount of movement on the screen that is desired by the user. If the user is not within one of the viewing function modes (e.g., the user is selecting information on the screen or reviewing information in a dialog box or window), then mapping of the received signals may not be required.

As will be appreciated by those skilled in the art, the signals that are received from conventional joystick or mouse devices are based on different coordinate or reference systems than that of the screen space, and must be translated in order to provide meaningful information regarding cursor movement on the screen. Therefore, after receiving the input signals from the user, the received signals may be mapped to cursor movement, as indicated at step S.303, before calculating the rotation axis and updating the current view of the rendered part.

Different methods and processes may be used to translate and map the input signals from the user-controlled device to cursor movements in screen space. Traditionally, movements of a mouse device have been translated and mapped to cursor movements by commercially available software. For example, Windows 95 and Windows NT include software routines for translating mouse movements to cursor movements. As such, movements of a mouse device may be mapped to cursor movement by using such commercially available software. If, however, the user is provided with a joystick interface, then the joystick movements should also be translated and mapped to cursor movements in order to provide useful information. Various methods and techniques may be used to map the joystick movements within the joystick virtual space to cursor movements within the screen space. For example, the joystick movement signals may be first processed and translated to mouse movements before they are finally mapped to cursor movements. Alternatively, the joystick signals may be directly mapped to cursor movements as a function of the ratio of the screen space size to the size of the joystick virtual space.

Figure 40:
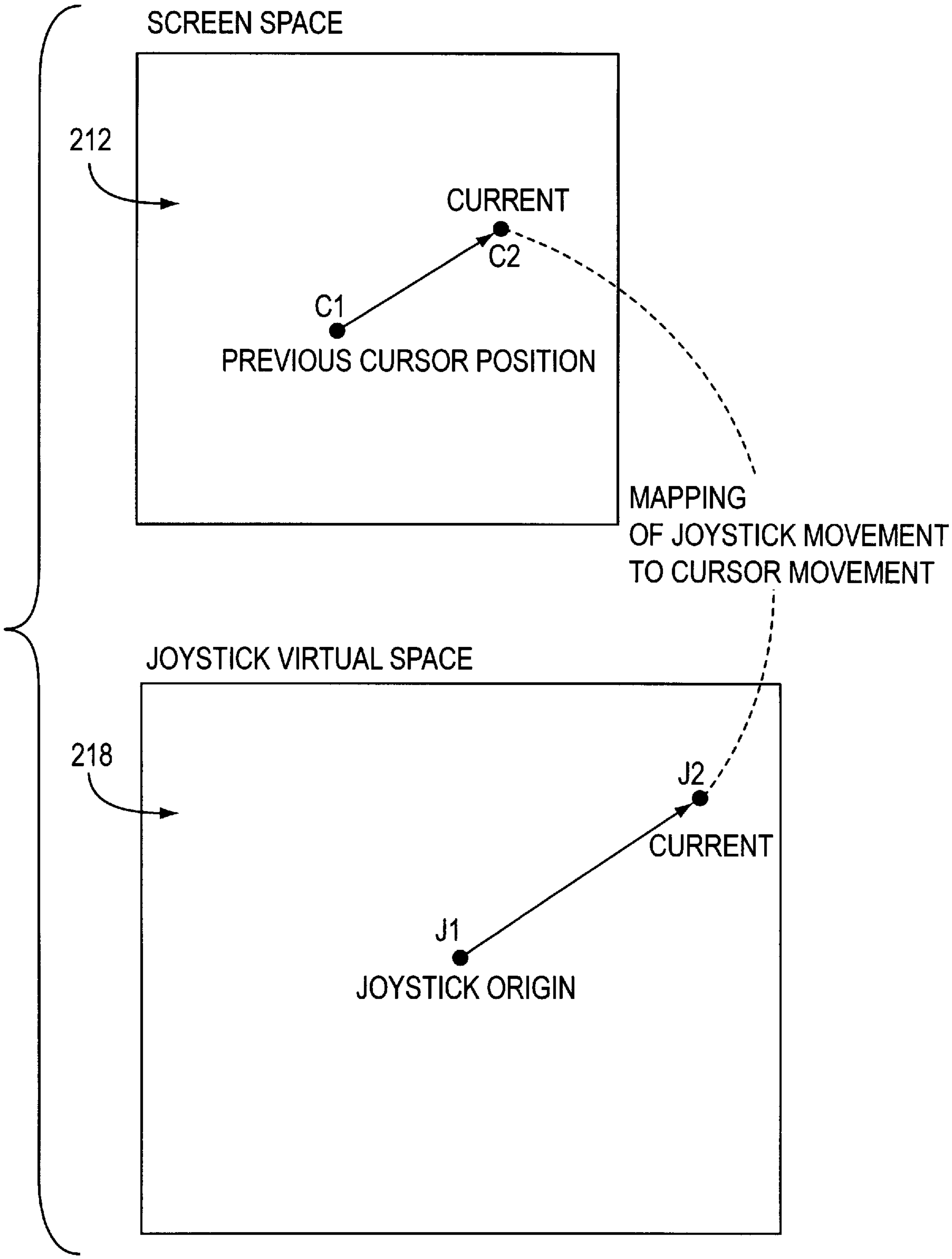
FIG. 40 illustrates an example of mapping joystick movements to cursor movements, in accordance with an aspect of the invention.

FIG. 40 illustrates an example of mapping joystick movements to cursor movements in screen space, in accordance with an aspect of the present invention. As indicated above, a joystick device may include its own virtual coordinate system or space 218. The joystick virtual space 218 includes an origin J1 that corresponds to the position at which the joystick is in a center or neutral position (i.e., a position at which the joystick is not moved). When the joystick is moved to a new position (e.g., a current position J2 as shown in FIG. 40), the joystick device generates signals to indicate the new or current position within the virtual space of the joystick. Since the joystick virtual space 218 is often larger (in terms of pixels) than the screen space 212, the virtual coordinates and movements of the joystick must be translated to screen coordinates in order to determine the desired cursor movements and, thus, movement of the part on the screen.

Various methods and processes may be utilized to map and translate the virtual coordinate movements of the joystick to screen coordinate movements. For example, joystick movements may be mapped to screen cursor movements based on the ratio of the screen space size to the joystick virtual space size. More particularly, when it is determined that a viewing function mode (e.g., zoom, rotate, pan, etc.) is active and the joystick device has been manipulated by the user, the actual movement of the cursor from a previous point C1 to current point C2 may be determined by the following equation: current_point=previous_point+(scale_factor×V); wherein, "current_point" is the current point C2 of the cursor; "previous_point" is the previous point C1 of the cursor; "scale_factor" is the ratio of the screen size to the joystick virtual space size (both in pixels); and "V" is a vector representing the movement and direction of the joystick from the joystick origin J1 to the joystick current position J2. Thus, in order to map joystick movements to cursor movements, a vector "V" indicating the direction and movement of the joystick from the origin J1 to the current position J2 may first be calculated based on the signals received from the joystick device when it is manipulated by a user. After the vector "V" has been calculated, the joystick movement may be mapped to cursor movement by using the vector "V" amount and the "scale_factor" amount in the equation described above; that is, the new or current position C2 of the cursor may be calculated by multiplying the vector "V" by the ratio of the screen size to the joystick space size (i.e., the "scale factor"), and then adding the result of this computation to the previous cursor position C1.

Depending on the scale factor, it may be necessary to increase or decrease the rate of scaling or movement by a predetermined or user selected adjustment factor. In such a case, and depending on the preference of the user, the scale factor may be multiplied by the adjustment factor when calculating the current point of the cursor in order to increase or decrease the rate of scaling. For example, if the ratio of the screen size to the joystick space size provides a scale factor of 1/64, then it may be preferable to increase the rate of scaling in order to provide a more satisfactory relationship between movements of the joystick and the rate of movement of the rendered part on the screen. By way of a non-limiting example, with a scale factor of 1/64, an adjustment factor of 3 may be used when zooming or rotating the rendered part. Further, for a scale factor of 1/64, an adjustment factor of 6 may be used when panning of the rendered part is performed. Of course, the rate of scaling may be modified based on the particular needs of the user, and the adjustment factor may be predetermined or the user may be given the option to adjust or select the adjustment factor to modify the rate of scaling. Further, as indicated in the example discussed above, the adjustment factor may be set to the same amount for each of the viewing functions or may be individually set to the same or different amounts for each of the viewing functions provided.

After the received signals have been appropriately mapped and translated, the rotation axis of the part may be dynamically calculated, as generally shown at step S.305 in FIG. 39. Depending on the current view of the part, the rotation axis may be defined to pass through the center of the part or to pass through another point so that the zoomed area of the part will not disappear from the screen when the part is rotated with, for example, a high zoom ratio or factor. Various methods and processes may be utilized to dynamically recalculate the rotation axis of the part based on the current zoom view. In accordance with another aspect of the invention, FIG. 41 illustrates an exemplary logic flow and sequence of processes and steps that may be performed to calculate the rotation axis whenever the view of the part has been modified by the user.

Figure 41:
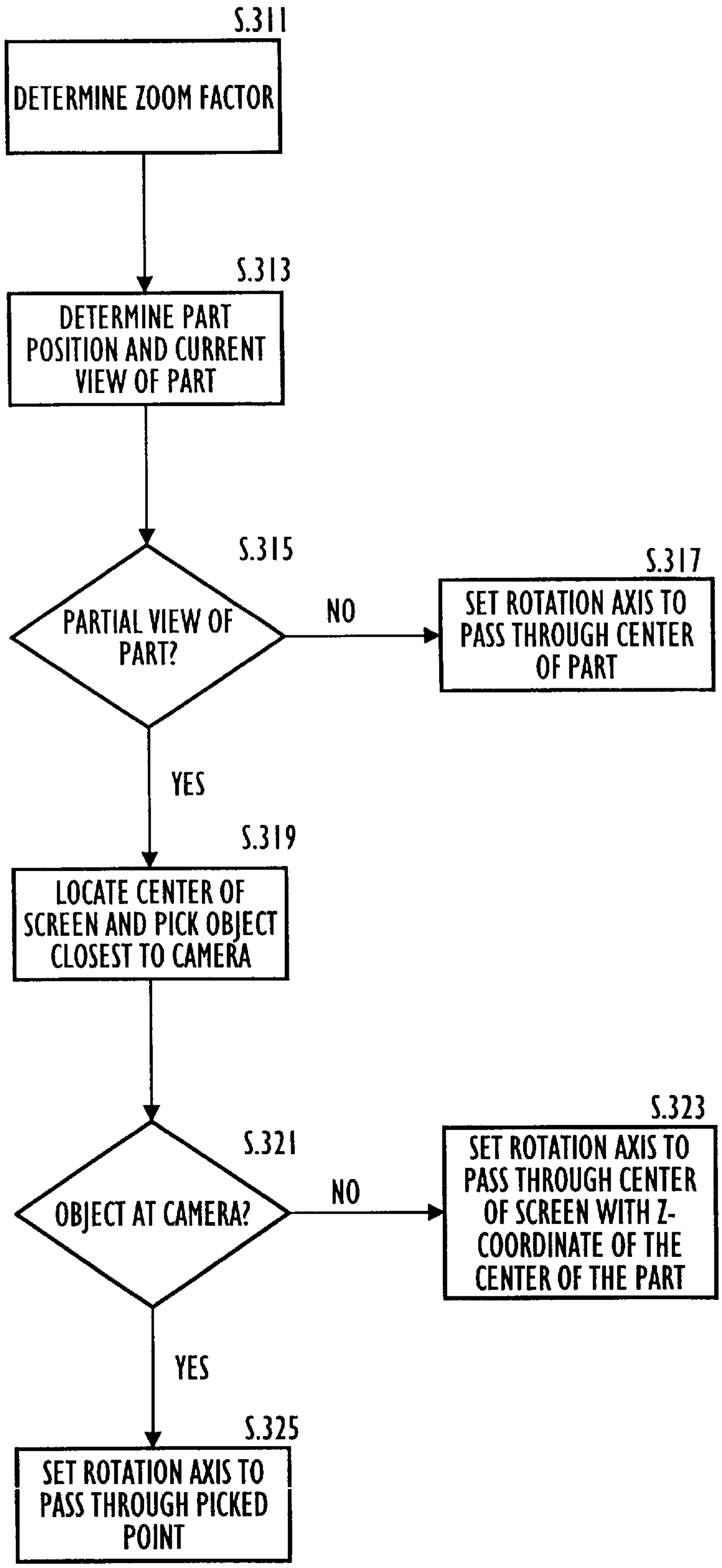
FIG. 41 is an exemplary flow chart of the processes and operations that may be performed to dynamically calculate the rotation axis of the rendered part.

As shown in FIG. 41, the current zoom factor or ratio and the part position and current view may be determined at steps S.311 and S.313. The zoom factor and orientation of the rendered part selected by the user will cause the entire part to be visible on the screen (i.e., a full view) or cause only a portion of the part to be made visible on the screen (i.e., a partial view). Thus, the current zoom factor and part orientation should be determined in order to properly set the rotation axis of the rendered part. Various methods and processes may be used in order to determine the current view of the part. As described above, a visibility function may be provided with the bend model viewer of the present invention to maintain and update the status of the current view orientation and zoom ratio whenever there is a change made to the displayed image. A function call may be made to the bend model viewer to determine what points or portions of the part are presently visible. Whether all of the part is displayed on the screen may be determined by comparing the view volume with the part's boundary base size.

If it is determined at step S.315 that a full view of the part is currently visible on the screen, then the rotation axis may be set to pass through the center of the part at step S.317. Setting the rotation axis to the center of the part when there is a full view is possible, since the entire rendered part will be visible on the screen when it is rotated by the user. With the entire part visible on the screen, the rotation axis may be defined so as to pass through the geometric center or centroid of the part. Conventional coordinate geometry techniques may be used to define and set the rotation axis to the geometric center of the part. In addition, the direction of the rotation axis may be defined as a vector that is perpendicular to the vector from the previous cursor position to the current cursor position.

If it is determined at step S.315 that only a partial view of the part is currently visible on the screen, then logic flow may continue to steps S.319–S.325 in order to calculate the rotation axis so that portions of the rendered part will not disappear from the screen when the zoomed part is rotated by the user. As described above, when a high zoom factor is selected by the user and only portions of the part are displayed on the screen, the rotation axis should not be set to pass through the geometric center of the part, since to do so may cause the zoomed portion(s) of the displayed part to disappear from the screen during rotation. In order to prevent the displayed portion of the part from being occluded or disappearing from the screen, the rotation axis should be set so as to pass through the coordinate of the closest point to the viewpoint (i.e., camera) at the center of the screen. In such a case, the direction of the rotation axis may be defined as a vector that is perpendicular to the vector from the previous cursor position to the current cursor position.

Thus, at step S.319, the center of the screen is located and the object or portion of the part at the center of the screen that is closest to the camera is selected. That is, the portion of the rendered part that is located at the center of the screen and that is closest to the camera or user viewpoint of the screen is picked. If it is determined at step S.321 that there is an object at the camera (e.g., that there is a solid portion of the part that is located at the center of the screen and that is closest to the camera), then at step S.325 the rotation axis may set to pass through the picked point. As discussed above, the direction of the rotation axis may be defined as a vector that is perpendicular to the vector from the previous cursor position to the current cursor position.

If it is determined at step S.321 that there is not an object at the camera (e.g., that the part includes a hole or opening that is located at the center of the screen and that is closest to the camera), then logic flow may continue to step S.323. At step S.323, the rotation axis may alternatively be define to pass through the center of the screen (e.g., the X and Y coordinate of the physical center of the screen) and at the Z-coordinate (i.e., depth) equal to the geometric center of the part. Thus, the rotation axis may be set to pass through the X, Y, and Z coordinates discussed above, with the direction of the rotation axis being defined as the vector that is perpendicular to the vector from the previous cursor position to the current cursor position.

Referring back to FIG. 39, after the dynamic rotation axis has been calculated, the selected viewing function (e.g., zoom, rotate, pan, etc.) may be called at step S.307. As discussed above, the various viewing functions of the 3-D manipulation system may be defined and implemented as member functions of the view class of the bend model viewer (see, e.g., FIG. 18 and the related disclosure provided above). In such a case, based on the viewing function selected by the user, a function call may be made to the bend model viewer to update the current view of the rendered part, at step S.309. The current view and orientation of the part may be updated based on the viewing function selected by the user and the mapped cursor movements received from the user-controlled input device (e.g., the mouse or joystick device). A graphics package, such as OpenGL or RenderWare, may be provided to facilitate the update of the current view provided to the user.

The logic flow and processes performed in the exemplary flowcharts of FIGS. 39 and 41 may be implemented by software and by using a wide variety of programming languages and techniques. For example, object oriented programming techniques and C++ may be used to implement the noted processes and operations. An exemplary code for implementing the 3-D manipulation system of the present invention is provided in Appendix L. The exemplary source code was written in C++ programming language and includes the various processes and operations for calculating the dynamic rotation axis. Comments are provided in the code of Appendix L to facilitate the analysis of the logic and algorithms used therein.

Although the 3-D manipulation system described above has been described with respect to the use of a joystick device and control buttons, the system may also be implemented by any other particular type of input means, including a mouse or keyboard. Further, in the above-described embodiments of FIGS. 37–38, boundaries may be defined to limit zooming or panning of the object in or out of the screen into infinity, since such continuous zooming or panning may cause the system to fail or crash.

In addition, various other features may be implemented in connection with the joystick interface. For example, movement in any of the viewing functions may not be effectuated unless the joystick is moved beyond a predetermined range or distance from the joystick center position. Requiring such a threshold of movement of the joystick before movement of the part is permitted prevents accidental movements of the rendered part based on inadvertent handling or pushing of the joystick from the center position. Other features may also be provided to improve the joystick interface and system interaction with the user. For instance, continuous or incremental (e.g., step-wise) movement in any one of the viewing functions (e.g., zoom, rotate, pan, etc.) may be provided based on the single operation of the joystick by the user. Selection of the continuous or incremental movements may also be provided based on the amount or duration of movement of the joystick in any single direction. If desired, the rate of scaling or movement of the rendered part may also be increased based on the degree or duration of movement of the joystick in any direction. Modification of the speed adjustment factor described above may also be implemented by permitting the user to manual insert the correction to the adjustment factor to increase or decrease the rate of scaling.

Various other features and embodiments may also be implemented in the present invention in order to aid in the design and manufacturing of components at the factory. For example, a bar code system may be implemented to keep track of and access information concerning each customer's order. A bar code with a predetermined reference or job number may be assigned to each part ordered by a customer. This bar code may be used for accessing and retrieving job information from database 30. A bar code reader or scanner, such as a Barcode Anything SCAN CCD sensor from Zebra Technologies VTI, Inc., Sandy, Utah, may be provided at each of the locations to permit users to scan the bar code for a particular job in to the server module or station module and to access and retrieve critical design and manufacturing information associated with that part that is stored in database 30. The bar code reader may be plugged into the computer of each of the station modules and/or the server module. The bar codes may be formatted in accordance with any conventional bar code formats, such as UPC-A, Codabar, Code 39, EAN/JAN-8 or Plessey, and the resultant bar code number may be translated in accordance with a lookup table to find the corresponding job reference number and/or file name in order to retrieve the job information from the database. Alternatively, the job number may be typed in or selected from a displayed directory at any of the stations located throughout the factory to instantaneously retrieve and display the job information at the user's location. The ability to instantaneously retrieve such information is aided by the use of communications network 26 and the storage of the design and information at a centrally located database, such as database 30.

In accordance with yet another aspect of the present invention, an apparatus and method for scheduling and assigning jobs may be provided in the proposed system. Conventionally, the scheduling and assignment of jobs throughout a manufacturing facility is performed by a shop or factory foreman who determines the current set-up and availability of machinery, as well as the status of current jobs. After gathering and analyzing this information, the shop or factory foreman may develop a schedule and distribute the assignments for the jobs (e.g., in the form of a job schedule sheet that is distributed to the factory floor) that are to be performed at the various locations in the factory. The scheduling and assignment of jobs is provided to ensure that each customer's job is completed in a timely fashion and by the specified delivery date. The conventional process of scheduling and assigning jobs is, however, often arduous and usually performed manually by the factory foreman.

In accordance with an aspect of the invention, a job assignment and scheduling system may be provided to assist a shop or factory foreman in establishing job schedules for the factory. The system may take advantage of communications network 26 and the bend model information that is stored in database 30 to automatically gather the necessary information so that the shop foreman may more easily develop a job schedule. The system may be implemented through software or programmed logic at the server module or station modules located throughout the factory. By entering the various jobs that need to be scheduled, the system software may analyze the design and part information and determine which machines are best suited for doing particular jobs. For this purpose, the current status and set-up of the machinery in the factory may be defined and stored in database 30 and accessed by the job scheduler software. Based on various criteria, the software may suggest to the foreman, in the form of a display, which machines are available to perform a particular job and which machines cannot perform other jobs. In this regard, a table may be displayed that ranks the availability of machines for particular jobs and that provides a proposed job schedule that may be implemented or modified by the shop foreman.

The criteria that may be used to set and recommend job schedules may include a wide variety of criteria including the current set-up of each machine in the factory, the types of bends and tooling required for each job and the other types of jobs that need to be performed within the same time frame or period. Information from the bend model file for each part may also be utilized, such as the bend angle, the flange length, and type of bending, in order to determine which machines can perform a particular job. A table stored at, for example, database 30, may include critical information as to the current set-up and capabilities of each of the punching and bending machines on the shop floor.

Based on the proposed job schedule, the foreman may assign jobs to various locations throughout the factory in order to optimize production and output capacity of the factory. The final job schedule or assignment may be entered electronically and routed to each of the machines through communications network 26. A pilot lamp, such as an LED, may be provided at each of the bending or machinery work stations to indicate and confirm that a job has been assigned or transferred to that station. The job assignment and schedule may be stored in a file of the server module that can be accessed instantaneously from any location within the factory.

In addition to the above features, other miscellaneous features may be implemented in accordance with the teachings of the present invention. For example, menu screens may be provided and displayed at the various station modules and locations to facilitate the user in selecting the various display and function modes of the present invention. For example, a main menu screen such as that shown in FIG. 42 may be provided to a user when the station module is initialized. The main menu window display may include icon images of each of the available window displays and viewing modes provided by the station module. The main menu screen may pop-up anytime a menu button (e.g., F1 key) is selected. The user may select a window by moving a highlighted block to the desired window icon and selecting the same. Such operations may be performed through the use of a keyboard, mouse or joystick.

Figure 43:
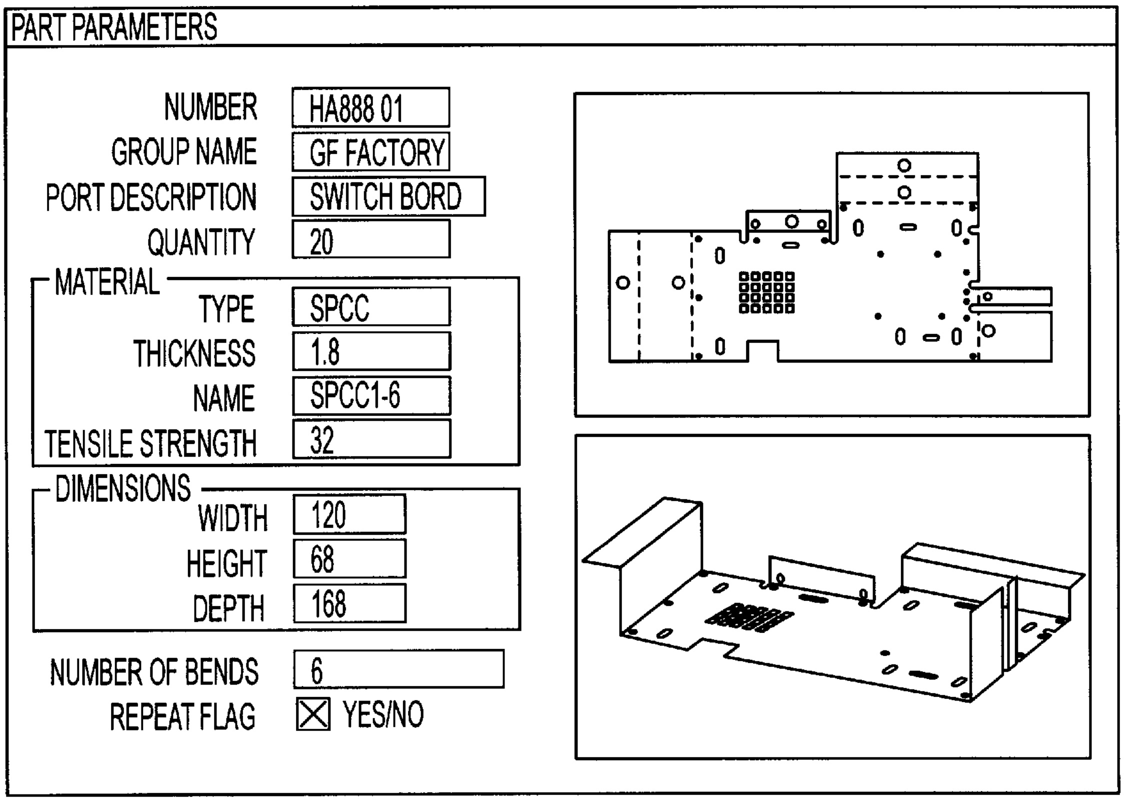
FIG. 43 illustrates an exemplary part information window display that may be provided to permit a user to enter and modify part information.
Figure 44:
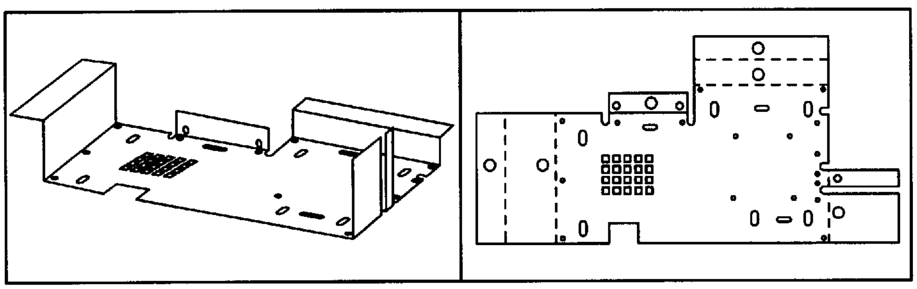
FIG. 44 illustrates an exemplary bendline information window display that may be provided to permit a user to enter and modify bendline information.

Other window screens may also be provided and displayed to the user to facilitate the entry and display of the job information. For example, a part information window may be displayed to permit a user to enter or modify the part information. An example of a part information window display is provided in FIG. 43. The part information window may include all of the pertinent part information (e.g., part number, material type, dimensions, etc.) and may include a 2-D flat drawing and isometric view of the sheet metal part. A bendline information window, such as that illustrated in FIG. 44, may also be provided to allow a user to view the various bendline information, including the bend sequence and deduction amount for each bendline. The bendline information window may permit the user to enter or modify the bendline information for each bend, and may include both a 2-D flat drawing and isometric view of the sheet metal part.

Figure 45:
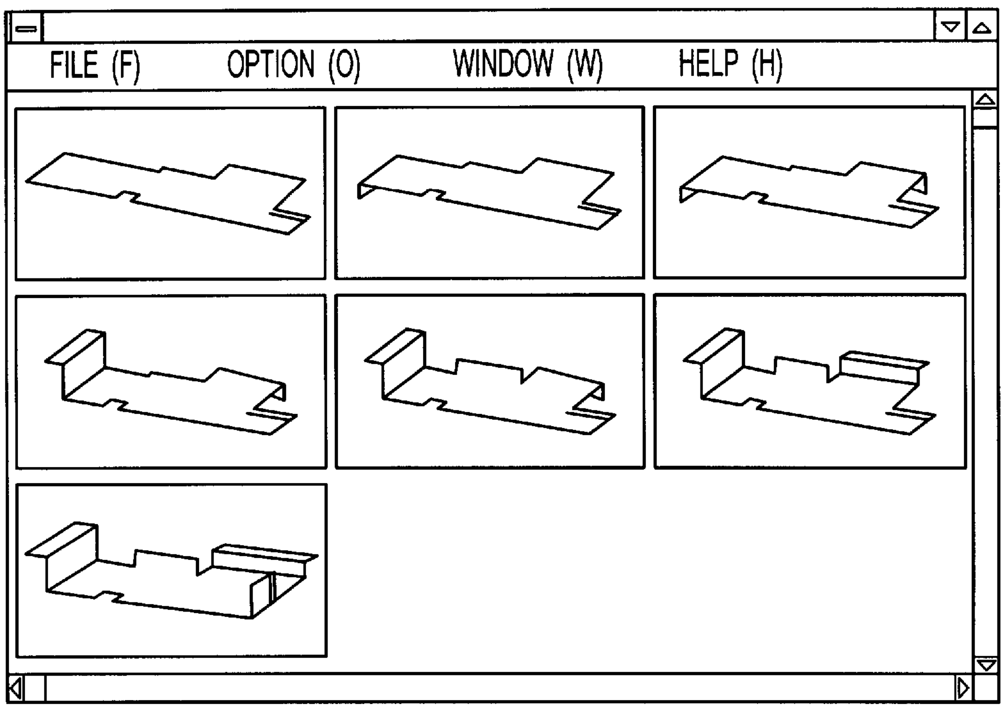
FIG. 45 illustrates an exemplary bend sequence window display of the present invention for viewing the intermediate bend stages of a sheet metal part.
Figure 46:
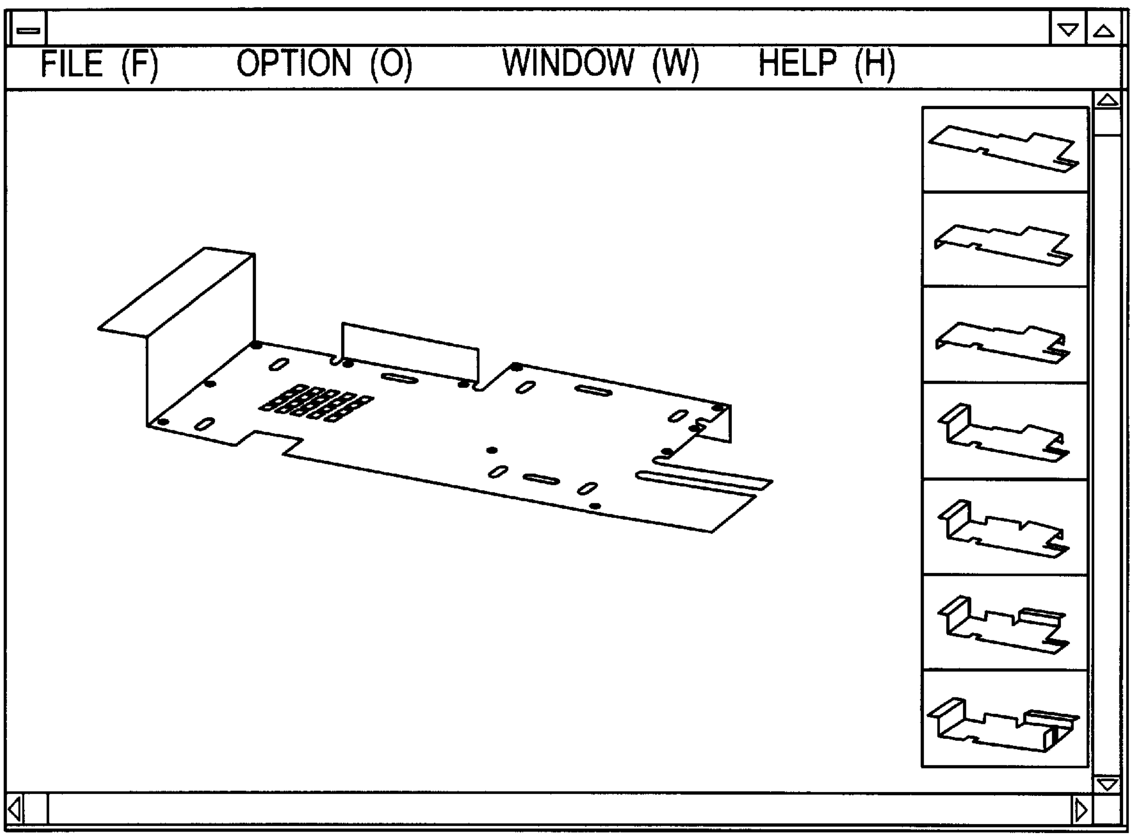
FIG. 46 illustrates an exemplary bend simulation window display of the invention for simulating the intermediate bend stages of a sheet metal part.

Additional window display may also be provided to facilitate a bending operator's analysis of the bending sequence. For example, a bend sequence window display and a bend simulation window display may be provided to indicate the various bending stages of the part and to simulate the part orientation during bending operations. A bend sequence window, such as that shown in FIG. 45, may be selected from the main menu screen and displayed to the user to indicate the intermediate shapes of the part (in static form) at each stage of the bending sequence. A bend simulation window (see, e.g., FIG. 46) may also be selected by the user and provide both static information of the bending stages (in the form of part icons provided on the righthand side of the screen) and active simulation (in the center of the display) of the orientation and bending performed at each stage in the bend sequence. By intermittently selecting the part icons on the screen, the user may view an active simulation of the orientation of the part during bending at the stage represented by the selected part icon. The part may be flipped, translated and bent/rotated about the bendlines in order to actively simulate each bend sequence.

Figure 42:
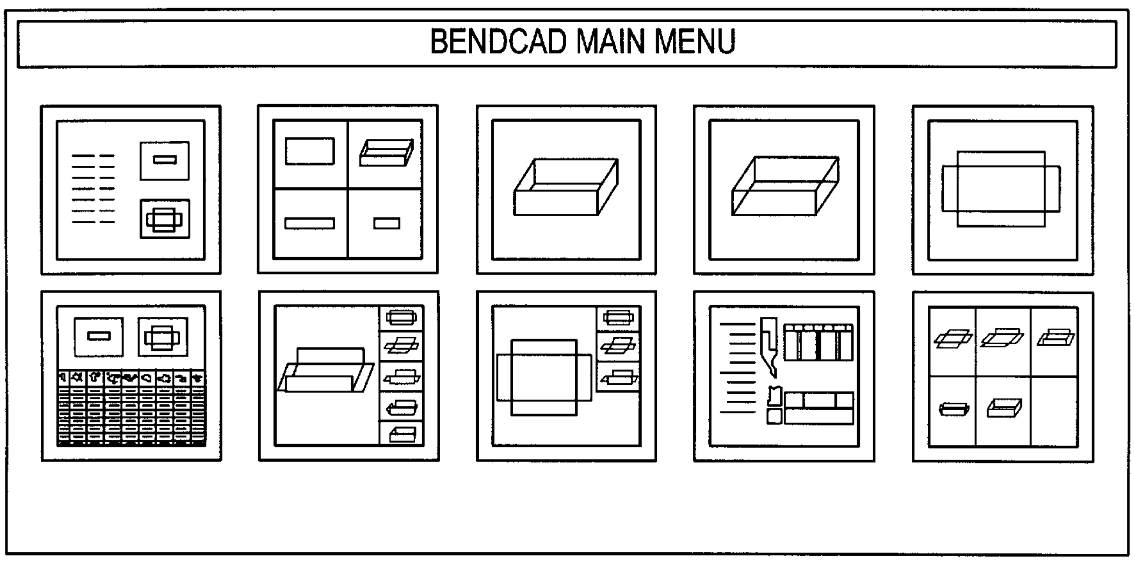
FIG. 42 illustrates an example of a main menu window display that may be provided and displayed at, for example, a station module.
Figure 47A:
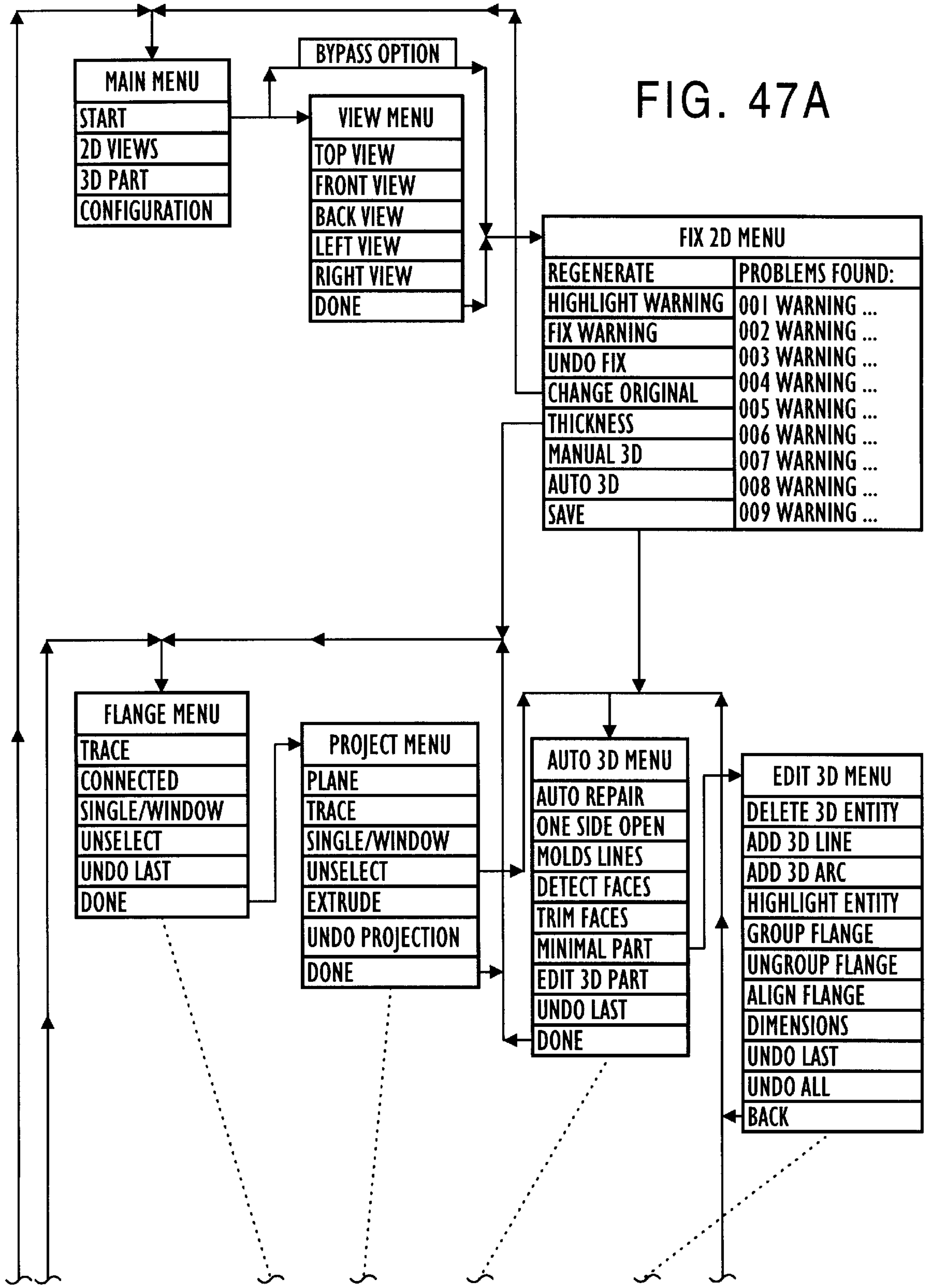
FIGS. 47A and 47B are is an exemplary menu screen diagram and structure of the present invention that may be provided and displayed to users for 2-D to 3-D conversions.
Figure 47B:
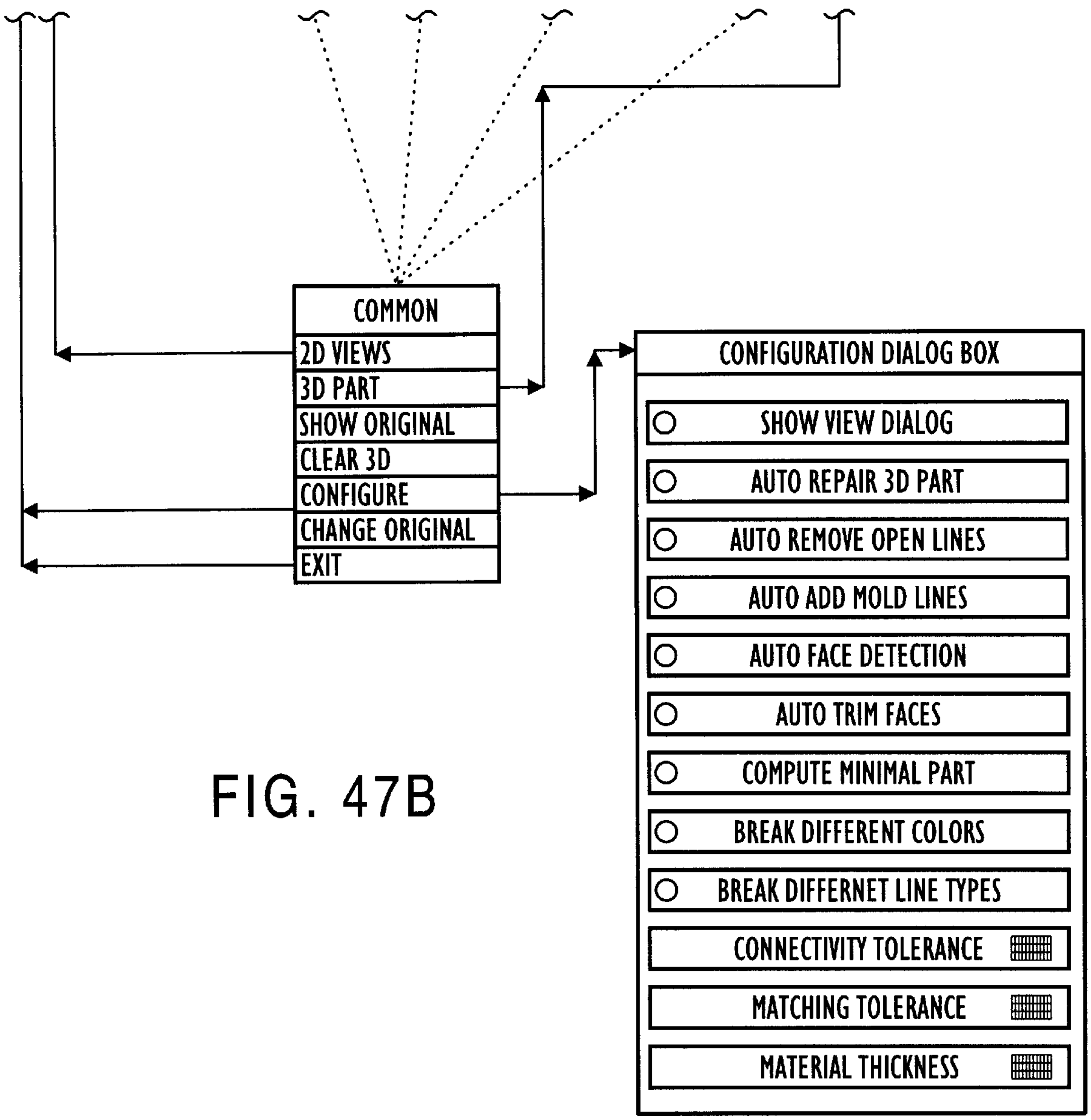

Each of the above-described window displays of FIGS. 43–46 may be selected and displayed to a user from the main menu window display of FIG. 42. In addition, a user at any of the station modules may select the appropriate window icons in the main menu window display to have the 2-D and/or 3-D representations of the part displayed in accordance with the viewing modes (e.g., 2-D flat, wire-frame, solid, orthographic) of the invention, as described in greater detail above with reference to FIGS. 19–22. Various menu windows may also be provided, for example, at the station modules to facilitate the operation of the features and functions of the present invention. FIG. 47 illustrates exemplary menus that may be displayed for the 2-D to 3-D operations. In addition, FIG. 48 illustrates an exemplary menu structure for the 2-D cleanup operation of the invention. The present invention, however, is not limited to these menu arrangement, and other menu screens and/or tool icon bars may be provided to facilitate a user's interaction with the system.

Other features may also be implemented in the present invention. For example, higher levels of automation may be provided to facilitate the development of the bending plan. For example, bending and tooling expert systems may be provided to develop and propose tooling set-up and bending sequences based on the part geometry and shape for each job, such as that disclosed in pending, U.S. patent application Ser. Nos. 08/386,369 and 08/338,115.

While the invention has been described with reference to several exemplary embodiments, it is understood that the words which have been used herein are words of description and illustration, rather than words of limitations. Changes may be made without departing from the scope and spirit of the invention and its various aspects. Although the invention has been described herein with reference to particular means, materials and embodiments, the invention is not intended to be limited to the particulars disclosed herein; rather, the invention extends to all functionally equivalent structures, methods and uses.

APPENDIX A

```
///////////////////////////////////////////////////////////////////
//                                                               //
//   Example of feature entity extraction from BendModel parts  //
//                                                               //
//                                                               //
//                    Copyright 1996 AmadaSoft America, Inc.     //
//                                                               //
///////////////////////////////////////////////////////////////////

int SPS_cal_part_matrix ( BM_PART *part, FENT **inp_sp, char
*pname,
                                int *inp_parrank, int
*inp_part_numface,
                                int *inp_part_numbend, int
*inp_part_maxface )
{
     // local variables
     int parrank, part_numface, part_numbend, part_maxface ;
     int **imatrix = NULL ;
     int *nbl_face = NULL ;
     BENDFACE *facelist = NULL ;
     BENDLINE *bendlinelist = NULL ;
     ARTIFICIAL_FACE *bendfacelist = NULL ;

     int num_error = 0 ;      // counter for the number of errors
in the part
     int face_1, face_2, bend_1, bend_0, i ;
     long num_of_faces, num_of_bendlines, entity_id;
     BM_FACE      *face;
     BM_BENDLINE *bendline;
     BM_2D_BODY   *two_d_body;
     BM_3D_BODY   *three_d_body;
     BM_BEND_OP   *bend_op;
     BM_TOPOLOGY_RECORD  *topology_record;

     // get name and number of faces and bendlines of the part
     part->get_name( pname ) ;
     double thickness = part->get_metal_thickness() ;
     num_of_faces = part->get_number_of_faces() ;
     num_of_bendlines = part->get_number_of_bendlines() ;
     if (num_of_faces == 0 || num_of_bendlines == 0) return ( -1 );

     // create local working array
     facelist = new BENDFACE [num_of_faces];
     bendlinelist = new BENDLINE [num_of_bendlines];

     // count number of faces defined.
     double maxfacearea = -1.0 ;
     part_maxface = 0 ;
```

APPENDIX A

```
     part_numface = 0 ;
     face = part->get_face_list() ;
     for ( i = 0 ; face && i < num_of_faces ;
               i++, face = (BM_FACE *)(face->next())) { // Count
the defined faces.
          // initialize the struc
          facelist[i].faceid = 0 ;
          facelist[i].facept = NULL ;
          facelist[i].twodpt = NULL ;
          facelist[i].threedpt = NULL ;
          facelist[i].topologyrecpt = NULL ;
          facelist[i].numadjbody = 0 ;
          facelist[i].numadjbend = 0 ;
          facelist[i].numadjhole = 0 ;
          facelist[i].numadjface = 0 ;
          facelist[i].face_area = 0. ;

          if (face == NULL) break ;
          two_d_body = face->get_3D_version() ;
          if (two_d_body == NULL) continue ;

          // It is considered as a valid face, when its BM_2D_BODY
exists.
          part_numface++ ;
          facelist[i].faceid = part_numface ;
          facelist[i].facept = face ;
          facelist[i].twodpt = two_d_body ;
          facelist[i].face_area = area_of_a_2D_body(two_d_body) ;
          if (maxfacearea < facelist[i].face_area) {
               maxfacearea = facelist[i].face_area ;
               part_maxface = facelist[i].faceid ;
          }
          three_d_body = two_d_body->get_3D_body() ;
          facelist[i].threedpt = three_d_body ;

          if (three_d_body == NULL) continue ;
          entity_id = three_d_body->get_name() ;
          facelist[i].org_entity = entity_id ;
          topology_record = three_d_body->get_adj_list() ;
          facelist[i].topologyrecpt = topology_record ;

          if (topology_record == NULL) continue ;
          facelist[i].numadjbody = (int)
topology_record->get_number_of_adjacent_bodies() ;
          facelist[i].numadjface = (int)
topology_record->get_number_of_adjacent_faces() ;
          facelist[i].numadjhole = (int)
topology_record->get_number_of_adjacent_holes() ;
          facelist[i].numadjbend = (int)
```

APPENDIX A

```
topology_record->get_number_of_adjacent_bendlines() ;
     }

     if (num_error > 0) {
          clean_up ( part_numface, imatrix, nbl_face, facelist,
bendlinelist, bendfacelist) ;
          return ( num_error ) ;
     }

     if (part_numface == 1) {
          // this is a trivial case, where the part only has one
flat face.
          *inp_part_numface = part_numface ;
          *inp_parrank = part_numface ;
          *inp_part_numbend = 0 ;
          *inp_part_maxface = 1 ;
          *inp_sp = new FENT [2] ;
          *inp_sp[2] = NullFent ;
          clean_up ( part_numface, imatrix, nbl_face, facelist,
bendlinelist, bendfacelist) ;
          return ( 0 ) ;
     }

     // varify all the valid face, the current requirements are:
     //    1) A face cannot be adjacent to another face.
     //    2) A face without an adjacent bendline is not allowed.
     //        (Note: The single faced part has been processed.)
     //   Also,  creat  a  pointer  array  that  links  assigned
part_face_id
     // to the netry in the facelist.
     int *fid_pt = new int [part_numface] ;
     for ( i = 0 ; i < num_of_faces ; i++) {
          if (facelist[i].faceid) {
               fid_pt[facelist[i].faceid] = i ;
               if (facelist[i].numadjface ||
                    facelist[i].numadjbend < 1) num_error++ ;
          }
     }
     if (fid_pt) delete [] fid_pt ;
     if (num_error > 0) {
          clean_up ( part_numface, imatrix, nbl_face, facelist,
bendlinelist, bendfacelist) ;
          return ( num_error ) ;
     }

     // count the number of bendlines that is defined.
     part_numbend = 0 ;
     bendline = part->get_bendline_list() ;
     for ( i = 0 ; bendline && i < num_of_bendlines ;
```

APPENDIX A

```
                i++, bendline = (BM_BENDLINE *)(bendline->next()))
{
          // initialize the struct
          bendlinelist[i].bendlineid = 0 ;
          bendlinelist[i].bendlinept = NULL ;          /        /
BM_BENDLINE pointer
          bendlinelist[i].bendoppt   = NULL ;          /        /
BM_BEND_OP pointer
          bendlinelist[i].twodpt      = NULL ;         /        /
BM_2D_BODY pointer
          bendlinelist[i].threedpt   = NULL ;          /        /
BM_3D_BODY pointer
          bendlinelist[i].topologyrecpt = NULL ;  /             /
BM_TOPOLOGY_RECORD pointer
          bendlinelist[i].numadjbody = 0 ;
          bendlinelist[i].numadjbend = 0 ;
          bendlinelist[i].numadjhole = 0 ;
          bendlinelist[i].numadjface = 0 ;

     if (bendline == NULL) break ;
          two_d_body = bendline->get_3D_version() ;
          if (two_d_body == NULL) continue ;

          // It is considered as a valid bendline, when its
BM_2D_BODY exists.
          part_numbend++ ;
          bendlinelist[i].bendlineid = part_numbend ;
          bendlinelist[i].bendlinept = bendline ; //  BM_BENDLINE
pointer
          bendlinelist[i].twodpt = two_d_body ;   //   BM_2D_BODY
pointer
          bend_op = bendline->get_bend_op() ;
          bendlinelist[i].bendoppt = bend_op ;    //   BM_BEND_OP
pointer
          if (bend_op == NULL) num_error++ ;      //  Note:  Bend
operation must be defined for each
                                                            //
  bendline, otherwise it is an error.
          three_d_body = two_d_body->get_3D_body() ;
          bendlinelist[i].threedpt = three_d_body ; // BM_3D_BODY
pointer

          if (three_d_body == NULL) continue ;
          entity_id = three_d_body->get_name() ;
          facelist[i].org_entity = entity_id ;
          topology_record = three_d_body->get_adj_list() ;
          bendlinelist[i].topologyrecpt = topology_record ;

          if (topology_record == NULL) continue ;
```

APPENDIX A

```
        bendlinelist[i].numadjbody    =    (int)
topology_record->get_number_of_adjacent_bodies() ;
        bendlinelist[i].numadjface    =    (int)
topology_record->get_number_of_adjacent_faces() ;
        bendlinelist[i].numadjhole    =    (int)
topology_record->get_number_of_adjacent_holes() ;
        bendlinelist[i].numadjbend    =    (int)
topology_record->get_number_of_adjacent_bendlines() ;
     }

     if (num_error > 0) {
          clean_up ( part_numface, imatrix, nbl_face, facelist,
bendlinelist, bendfacelist) ;
          return ( num_error ) ;
     }

     // varify all the valid bendlines, the current requirements
are:
     // 1) The total number of bendlines should not be less than
     //    the total number of faces  minus 1.
     // 2) A bendline without an adjacent face or bendline is not
allowed.
     // 3) A bendline with more than two adjacent faces and
bendlines is not allowed.
     // 4) The adjacent face or bendline of a bendline must be a
valid face or
     //       bendline that is defined in the facelist or
bendlinelist.
     // 5) Two adjacent faces, face1 and face2, will be defined for
each bendline
     //     a) If the bendline has an adjacent faces, then the
face's faceid is used
     //        as face1 or face2.
     //     b) If the bendline has an adjacent bendline, then     a
bendline_only_face
     //        will be created inbetween these two bendlines.  The
faceid of the
     //        bendline_only_face will be used as face1 or face2.
     //     c) If the bendline has only one adjacent face or
adjacent bendline, then
     //          a bendline_only_face will be created for this
bendline.  The faceid of
     //        the bendline_only_face is face2.
     // maxnewfaces is the maximum number of bendline_only_face
need to be created
     // without encounter error in the part.
     if (part_numbend > part_numface-1) num_error++ ; // condition
1
     if (num_error > 0) {
```

APPENDIX A

```
          clean_up ( part_numface, imatrix, nbl_face,
                          facelist, bendlinelist, bendfacelist) ;
          return ( num_error ) ;
     }

     int maxnewfaces = part_numbend + 1 - part_numface ;
     if (maxnewfaces > 0) {
          bendfacelist = new ARTIFICIAL_FACE [maxnewfaces] ;
          bendfacelist[0].faceid = -part_numface ;
     }

     for ( i = 0 ; i < num_of_bendlines ; i++) {
          if (bendlinelist[i].bendlineid) {
               bend_0 = bendlinelist[i].bendlineid ;
               int  numadj    =    bendlinelist[i].numadjface    +
bendlinelist[i].numadjbend ;
               if  (numadj  <  1  ||  numadj  >  2)  num_error++  ;  //
condition 2 & 3
               else {
                    if (bendlinelist[i].numadjface > 0) {   /   /
condition 4 - first face
                         t  h  r  e  e  _  d  _  b  o  d  y     =
bendlinelist[i].topologyrecpt->get_first_face() ;
                         face_1  =  find_face_id(  three_d_body,
facelist, num_of_faces ) ;
                         if (face_1 <= 0) num_error++ ;
                         else bendlinelist[i].face1 = face_1 ;
                    }
                    if (bendlinelist[i].numadjface == 2) {  /   /
condition 4 - second face
                         t  h  r  e  e  _  d  _  b  o  d  y     =
bendlinelist[i].topologyrecpt->get_next_face() ;
                         face_1  =  find_face_id(  three_d_body,
facelist, num_of_faces ) ;
                         if (face_1 <= 0) num_error++ ;
                         else bendlinelist[i].face2 = face_1 ;
                    }
                    if  (bendlinelist[i].numadjbend  >  0)  {     //
condition 4 - first bendline
                         t  h  r  e  e  _  d  _  b  o  d  y     =
bendlinelist[i].topologyrecpt->get_first_bendline() ;
                         bend_1 = find_bendline_id( three_d_body,
bendlinelist, num_of_bendlines ) ;
                         if (bend_1 <= 0) num_error++ ;
                         else {
                              face_1 = define_bendline_only_face (
bend_1, bend_0,

            bendfacelist, maxnewfaces ) ;
```

APPENDIX A

```
                                if (face_1 <= 0) num_error++ ;
                                else {
                                     if (bendlinelist[i].numadjface
> 0)
                                           bendlinelist[i].face2  =
face_1 ;
                                     else  bendlinelist[i].face1  =
face_1 ;
                                }
                           }
                      }
                      if  (bendlinelist[i].numadjbend == 2) {    //
condition 4 - second bendline
                           t h r e e _ d _ b o d y      =
bendlinelist[i].topologyrecpt->get_next_bendline() ;
                           bend_1 = find_bendline_id( three_d_body,
bendlinelist, num_of_bendlines ) ;
                           if (bend_1 <= 0) num_error++ ;
                           else {
                                face_1 = define_bendline_only_face (
bend_1, bend_0,

           bendfacelist, maxnewfaces ) ;
                                if (face_1 <= 0) num_error++ ;
                                else bendlinelist[i].face2 = face_1
;
                           }
                      }
                      if (numadj == 1) {
                           face_1  =  define_bendline_only_face   (
bend_0, 0,

      bendfacelist, maxnewfaces ) ;
                           if (face_1 <= 0) num_error++ ;
                           else bendlinelist[i].face2 = face_1 ;
                      }
                 }
            }
      }
      if (num_error > 0) {
           clean_up ( part_numface, imatrix, nbl_face,
                    facelist, bendlinelist, bendfacelist) ;
           return ( num_error ) ;
      }

      // now check whether there is any bendline only face been
created
      // increase the part_numface if there is.
      int numregfaces = part_numface ;
```

APPENDIX A

```
     int numnewfaces = 0 ;
     if (maxnewfaces > 0) {
          for ( i = 0 ; i < maxnewfaces ; i++ ) {
               if (bendfacelist[i].faceid <= 0) {
                    numnewfaces = i + 1 ;
                    break ;
               }
          }
          part_numface += numnewfaces ;
     }

     // first create a integer topological matrix to record all the
topological relations
     int j ;
     imatrix = new int *[part_numface] ;
     for ( i = 0 ; i < part_numface ; i++ ) {
          imatrix[i] = new int [part_numface] ;
          for ( j = 0 ; j < part_numface ; j++ ) imatrix[i][j] = 0
;
     }
     for ( i = 0 ; i < num_of_bendlines ; i++ ) {
          // save the bendline entry + 1 in imatrix
          if (bendlinelist[i].bendlineid) {
               face_1 = bendlinelist[i].face1 ;
               face_2 = bendlinelist[i].face2 ;
               imatrix[face_1-1][face_2-1] = i+1 ;
               imatrix[face_2-1][face_1-1] = i+1 ;
          }
     }

     // from imatrix to find the number of bendlines of each face,
nbl_face[i],
     // and to verify that each face has at least one bendline
     nbl_face = new int [part_numface] ;
     for ( i = 0 ; i < part_numface ; i++ ) {
          nbl_face[i] = 0 ;
          for ( j = 0 ; j < part_numface ; j++ ) {
               if ( imatrix[i][j] ) nbl_face[i]++;
          }
          if (!nbl_face[i]) num_error++ ;
     }
     if (num_error > 0) {
          clean_up ( part_numface, imatrix, nbl_face,
                         facelist, bendlinelist, bendfacelist) ;
          return ( num_error ) ;
     }

     // create the Cbpart's topological matrix's input data FENT
array
```

APPENDIX A

```
     // and initialize it.
     part->get_name( pname ) ;
     parrank = part_numface ;
     int spsize = parrank*(parrank + 1)/2 + 1 ;  // +1 is for End
of FENT array indicator
     FENT *sp = new FENT [ spsize ] ;
     for ( i = 0 ; i < spsize-1 ; i++ ) *(sp+i) = NoRelation ;
     *(sp+spsize-1) = NullFent ;

     // step 1: set up the positive or negative bend
     //          The included FENT's are:
     //         *    PosBend     =  '+'   ; // positive bend between
two faces
     //         *    NegBend     =  '-'   ; // negative bend between
two faces
     //         *    P90Bend     =  'A'   ;  // 90 deg positive bend
angle
     //         *    N90Bend     =  'B'   ;  // 90 deg negative bend
angle
     //              MrPosBend   =  '3'   ;   // multiple positive
bendlines between two faces
     //              MrNegBend   =  '4'   ;   // multiple negative
bendlines between two faces
     //         * marks what is currently implemented.
     for ( i = 0 ; i < num_of_bendlines ; i++ ) {
          if (bendlinelist[i].bendlineid) {
               face_1 = bendlinelist[i].face1 ;
               face_2 = bendlinelist[i].face2 ;
               FENT btype = NegBend ;
               BM_BEND_OP_REGULAR    *bendopregular    =
(BM_BEND_OP_REGULAR *)bendlinelist[i].bendoppt;
               if (bendopregular->get_bend_type()) btype = PosBend
;
               double angle = bendopregular->get_bend_angle() ;
               if (angle > PI) {
                    // angle > PI => reverse bend direction and
reset the bend angle
                    angle = 2*PI - angle ;
                    if (btype == PosBend)
                         btype = NegBend ;
                    else
                         btype = PosBend ;
               }
               bendlinelist[i].bendangle = angle ;
               bendlinelist[i].bendtype  = btype ;
               // set up 90 degree bend type
               if (angle == PI_over_2) {
                    if (btype == PosBend)
                         btype = P90Bend ;
```

APPENDIX A

```
                    else
                         btype = N90Bend ;
               }
               //
               set_FENT (sp, face_1, face_2, parrank, btype) ;
          }
     }

     // step 2: set up the corner relationships, which is the
relation
     //         between two faces that are connected to a common
face.
     //         The included FENT are:
     //         *    TouchCnr    =    'T' ;  // two faces same bend
dir
     //         *    OpenCnr     =    'O' ;  // two faces same bend
dir
     //         *    PrllBend    =    'P' ; // two parallel bendline
same bend angle dir opposite bendline dir
     //         *    SerlBend    =    'S' ; // two parallel bendline
same bend angle dir same bendline dir
     //         *    cLnrBend    =    'L' ;   // colinear bendline
same bend angle dir on one face
     //         *    DfClnrBend =    'D' ;   // colinear bendline
same bend angle on different faces
     //         *    tHkOffBend =    'H' ;    // tHickness offset
bendline same bend angle dir on two neighboring face
     //         *    touchCnr    =    't' ;  // two faces opposite
bend dir
     //         *    openCnr     =    'o' ;  // two faces opposite
bend dir
     //         *    prllBend    =    'p' ; // two parallel bendline
opposite bend angle dir opposite bendline dir
     //         *    serlBend    =    's' ; // two parallel bendline
opposite bend angle dir same bendline dir
     //         *    clnrBend    =    'l' ;   // colinear bendline
opposite bend angle dir on one face
     //              thkOffBend =    'h' ;    // tHickness offset
bendline opposite bend angle dir on two neighboring face
     //         * marks what is currently implemented.
     // Algorithm : for every face that has more than one bend line
then
     //                 a pair of any two bend lines    will have a
relationship.
     for ( i = 0 ; i < part_numface ; i++ ) {
          if (nbl_face[i] > 1) {
               int face_c = i + 1 ;
               // create a list of faces that are connected to this
face.
```

APPENDIX A

```
                    for ( j = 0 ; j < part_numface ; j++ ) {
                         if ( imatrix[i][j] ) {
                              int bl_1 = imatrix[i][j] ;
                              face_1 = j + 1 ;
                              for ( int k = j+1 ; k < part_numface ; k++
) {
                                   if ( imatrix[i][k] ) {
                                        int bl_2 = imatrix[i][k] ;
                                        face_2 = k + 1 ;
                                        // define the relation ship
between the two bendlines
                                        set_bendline_rel_FENT   (   sp,
parrank,
facelist, face_c, face_1, face_2,
bendlinelist, bl_1, bl_2, outfile) ;
                                   }
                              }
                         }
                    }
               }
          }

          //        *    tHkOffBend =    'H' ;    //  tHickness  offset
bendline same bend angle dir on two neighboring face
          // from imatrix to find the faces that may be of the thickness
offset bendlines
          // and verify these faces first based on the touch corner
infomation then based on
          // the bendlines' distance and parallel condition.
          for ( i = 0 ; i < part_numface ; i++ ) {
               if ( nbl_face[i] < 2 ) continue ;       // face i should
have at least 2 bendlines
               for ( j = i+1 ; j < part_numface ; j++ ) {
                    if ( !imatrix[i][j] || nbl_face[j] < 2 ) continue
;    // faces i and j must have a common bendline

                    // and face j should have at least 2 bendlines
                    for ( int i2 = 0 ; i2 < part_numface ; i2++ ) {
                         if ( !imatrix[i][i2] || i2 == j ) continue ; /
faces i and i2 must have a common bendline

                    // and face i2 is different from j
                         // first requirement - bendlines imatrix[i][j]
and
                         // imatrix[i][i2] form a touch corner
                         if  (  get_FENT(sp,  j+1,  i2+1,  parrank)  !=
TouchCnr ) continue ;
```

APPENDIX A

```
                    for ( int j2 = 0 ; j2 < part_numface ; j2++ )
{
                         if ( !imatrix[j][j2] || j2 == i ) continue
;
                         //   second   requirement   -   bendlines
imatrix[i][j] and
                         // imatrix[j][j2] also form a touch corner
                         if ( get_FENT(sp, i+1, j2+1, parrank) !=
TouchCnr ) continue ;
                         //  comes  here,  we  have  obtained  a
candidate for the
                         // thickness offset bendlines, the two
candidate
                         //   bendlines   are   imatrix[i,i2]   and
imatrix[j][j2]
                         int bl_1 = imatrix[i][i2] ;
                         int bl_2 = imatrix[j][j2] ;
                         check_thkoffbend ( sp, parrank,
facelist, i+1, i2+1, j+1, j2+1,
                                   bendlinelist,   bl_1,   bl_2,
thickness, outfile) ;
                    }
               }
          }
     }

     //             DfClnrBend =    'D' ;   // colinear bendline
same bend angle on different faces
     // Here is to find all the colinear bends that are colinear
but not related to each other
     // with a common face.
     int num_undetermined = 0 ;
     UNDETERMINED    *undetermined    =    new    UNDETERMINED
[num_of_bendlines] ;
     UNDETERMINED *undetpt = undetermined ;
     for ( i = 0 ; i < num_of_bendlines ; i++ ) {
          if (bendlinelist[i].bendlineid) {
               int face_i1 = bendlinelist[i].face1 ;
               int face_i2 = bendlinelist[i].face2 ;
               for ( j = i+1 ; j < num_of_bendlines ; j++ ) {
                    if (bendlinelist[j].bendlineid) {
                         int face_j1 = bendlinelist[j].face1 ;
                         int face_j2 = bendlinelist[j].face2 ;
                         if  (  face_i1  ==  face_j1  ||  face_i1  ==
face_j2 ||
                              face_i2  ==  face_j1  ||  face_i2  ==
face_j2 ) continue ;
                         if   (   bendlinelist[j].bendtype      !=
bendlinelist[j].bendtype  ) continue ;
```

APPENDIX A

```
                    if ( bendlinelist[j].bendangle !=
bendlinelist[j].bendangle ) continue ;

                    // come here when the two bend lines have
the same bend angle and type,
                    // and they do not share a common face.
                    // now examine whether they are colinear
                    int bl_i = i + 1 ;
                    int bl_j = j + 1 ;
                    int unknown = check_DfClnrBend ( sp,
parrank, facelist,
                                        face_i1, face_i2,
face_j1, face_j2,
                                        bendlinelist,
bl_i, bl_j,
                                        part_numface,
imatrix, outfile) ;
                    if (unknown) {

undetermined[num_undetermined].bendline_i = bl_i ;

undetermined[num_undetermined].bendline_j = bl_j ;
                         num_undetermined++ ;
                    }
               }
          }
     }
}

// Note: if num_undetermined is not zero, then there are
confirmed DfClnrBend
//      but with undetermined faces for specify this FENT.
//      A tree structure of all the faces that records the
connectivity between
//      faces need to be constructed.  And then each pair of
undetermined
//      bendlines need to be processed to determine which two
faces of the four
//      that connected with the two bendlines should be used
to record this FENT.
// Currently, we will neglect these information and simply
delete
// undetermined array, which will not be used any more.
delete [] undetermined ;


// transfer all the data back
*inp_part_numface = part_numface ;
*inp_parrank = parrank ;
```

APPENDIX A

```
     *inp_part_numbend = part_numbend ;
     *inp_part_maxface = part_maxface ;
     *inp_sp = sp ;

     num_error = fclose (outfile) ;
     clean_up ( part_numface, imatrix, nbl_face,
                  facelist, bendlinelist, bendfacelist) ;
     return ( num_error ) ;
}
```

APPENDIX B

```
///////////////////////////////////////////////////////////////////
//                                                               //
//   Example of similarity index feature.  Compares two parts    //
//   topological matrix and search for their best similarity     //
//   index.  The similarity index is the summation of all the    //
//   penalties of the mismatched FENTs of the two part's FENT    //
//   matrix (topological matrix).  The best similarity index     //
//   is the one with the smallest value.                         //
//                                                               //
//                     Copyright 1996 AmadaSoft America, Inc.    //
//                                                               //
///////////////////////////////////////////////////////////////////

int matrix_similarity_index
    ( FENT *newmatrix,   int newmatrixdim,   int *newmatchlist,
      FENT *oldmatrix,   int oldmatrixdim,   int *oldmatchlist,
       int nfacefixed,   int requiredvalue,  int *minimumvalue)
{   //input
    //          newmatrix       - new part topological matrix to be
matched on
     //                               by the oldmatrix
     //         newmatrixdim    - matrix dimension of newmatrix
     //         newmatchlist    - the first nfacefixed entries should
     //                               contain the entries (faces) of
the new part
     //                               matrix that has already been
fixed for
     //                               matching with the old part
matrix.
     //         oldmatrix       - old part matrix to match with the
new part
     //                               topological matrix
     //         oldmatrixdim    - matrix dimension of oldmatrix
     //         oldmatchlist    - the first nfacefixed entries should
     //                               contain the entries (faces) of
the old part
     //                               matrix that has already been
fixed for
     //                               matching with the new part
matrix.
     //         nfacefixed          -  the number of entries in
matchlist that
     //                               has already been matched.
Enter 0 when
     //                               there is no prematched
entries.
     //         requiredvalue   - the known or interested upper bound
on the
     //                               minimum similarity index.
When this value
```

APPENDIX B

```
     //                                   is inputed as a positive
value, then a
     //                                   branch of the search tree in
finding the
     //                                   minimum value of the
similarity index may
     //                                   be cut off when the branch's
current value
     //                                   becomes greater than this
minimum value.
     //                                   set to 0 or a negative value
when there is
     //                                   no restriction. In this case,
a minimumvalue
     //                                   and its corresponding
macthlists will always
     //                                   be found and returned.
    //output
     //        newmatchlist    - the first nfacefixed entries should
     //                          contain the entries (faces) of
the new part
     //                                   matrix that has already been
fixed for
     //                                   matching with the old part
matrix.
     //        oldmatchlist    - the first nfacefixed entries should
     //                          contain the entries (faces) of
the old part
     //                                   matrix that has already been
fixed for
     //                                   matching with the new part
matrix.
     //        minimumvalue    - the minimum similarity index, which
is the
     //                                   smallest possible value of
summation of all
     //                                   the penalties of the
mismatched FENTs of the
     //                                   two part's FENT matrix
(topological matrix).
     //                                   This value may not exist, if
the original
     //                                   inputed value (which is the
requirement) is
     //                                   too small.
     //        return                  - index on whether or not found
the minimum
     //                                   value.
     //                              = 1, found the minium value and
its match.
```

APPENDIX B

```
     //                                  = 0, a new minium value cannot
be reached.
     //                                  = -1, error in the input data
newmatchlist.
     //                                  = -2, error in the input data
oldmatchlist.
     //                                  =  -3,  error,  the  minimum
similarity index of
     //                                       the given matrices are
larger than the
     //                                       inputed minimumvalue.

///////////////////////////////////////////////////////////////////

     // create two integer pointer arrays to keep track the
     // corresponding entries of the two matrices that matches.
     int matrixdim = newmatrixdim ;
     if (matrixdim < oldmatrixdim) matrixdim = oldmatrixdim ;

     int *pnewmatchlist = new int[ matrixdim ];
     int *poldmatchlist = new int[ matrixdim ];
     if ( poldmatchlist && pnewmatchlist ) {
          int *p1 = pnewmatchlist;
          int *p2 = poldmatchlist;
          for ( int icol = 1; icol <= matrixdim; icol++,p1++,p2++)
               *p1 = *p2 = icol;
     }
     else
          cout << "Unable to allocate memory..." << endl ;

     // if there are already fixed entries (nfacefixed > 0),
then reset
     //  the  temporary  working  pointer  arrays  (newmatchlist  &
oldmatchlist)
     // to contain those fixed face list.
     if (nfacefixed > 0) {
          for (int icol = 0; icol < nfacefixed; icol++) {
               int iface = *(newmatchlist+icol) ;
               for ( int jcol = icol; jcol < matrixdim; jcol++) {
                    if (iface == *(pnewmatchlist+jcol)) {
                         if (jcol != icol) {
                              *(pnewmatchlist+jcol)    =
*(pnewmatchlist+icol) ;
                              *(pnewmatchlist+icol) = iface ;
                         }
                         break ;
                    }
                    // comes here only if the inputed face number
"iface"
                    // from newmatchlist is wrong
```

APPENDIX B

```
                return (-1) ;
            }
            iface = *(oldmatchlist+icol) ;
            for ( jcol = icol; jcol < matrixdim; jcol++) {
                if (iface == *(poldmatchlist+jcol)) {
                    if (jcol != icol) {
                        *(poldmatchlist+jcol)    =
*(poldmatchlist+icol) ;
                        *(poldmatchlist+icol) = iface ;
                    }
                    break ;
                }
                // comes here only if the inputed face number
"iface"
                // from oldmatchlist is wrong
                return (-2) ;
            }
        }
    }

    // convert the FENT matrix to the counter part of integer
matrix
    // at the same time, expand the smaller matrix to have the
same dimension.
    int *pnewmatrix = new int[matrixdim*matrixdim];
    int *poldmatrix = new int[matrixdim*matrixdim];
    convert_fent_to_int  (newmatrix,  newmatrixdim,  pnewmatrix,
matrixdim) ;
    convert_fent_to_int  (oldmatrix,  oldmatrixdim,  poldmatrix,
matrixdim) ;

    // define required value
    int requiredv = requiredvalue ;
    if (requiredv <= 0) requiredv = matrixdim * 400 ;
    //   create   the   FENT   counters   and   use
calculate_partial_similarity_index
    // to calculate the initial similarity index and set the
initial FENT
    // counts for each column of the fixed faces and that of all
the
    // unfixed faces.
    FENTCOUNT *pcnew = new FENTCOUNT[matrixdim+1];
    FENTCOUNT *pcold = new FENTCOUNT[matrixdim+1];
    int currentvalue = calculate_partial_similarity_index
            ( pnewmatrix, pnewmatchlist, pcnew,
              poldmatrix, poldmatchlist, pcold,
                  matrixdim,  nfacefixed ) ;
    if (currentvalue > requiredv) return (-3) ;

    // reset the unfixed faces in pnewmatchlist to be in the
```

APPENDIX B

```
sequence of
     // its total weighting.
     int  ncandidates = matrixdim - nfacefixed ;
     int *pcandidates = new int [ncandidates] ;
     int *pweights = new int [ncandidates] ;
     for ( int i = 0 ; i < ncandidates ; i++ ) {
          int facenew = *(pnewmatchlist+nfacefixed+i) ;
          *(pcandidates+i) = facenew ;
          int weight = 0 ;
          int *pnewi = pnewmatrix + (facenew-1)*matrixdim ;
          for ( int j = 0 ; j < matrixdim ; j++, pnewi++ )
               weight += fent_weight(*pnewi) ;
          *(pweights+i) = weight ;
     }
     sort_the_candidates (pcandidates, pweights, ncandidates) ;
     for ( i = 0 ; i < ncandidates ; i++ )
          * ( p n e w m a t c h l i s t + n f a c e f i x e d + i )    =
*(pcandidates+ncandidates-1-i) ;
     delete [] pcandidates ;
     delete [] pweights ;


     // call the internal routine recursively to perform similarity
index
     // search.
     *minimumvalue = requiredv ;
     int recursive_level = 0;
     int *newminmatchlist = new int[matrixdim];
     int *oldminmatchlist = new int[matrixdim];
     int *returnlevelcounts = new int[matrixdim];
     int errorcode = matrix_similarity_index_loop
                ( pnewmatrix, pnewmatchlist, newminmatchlist,
                  poldmatrix, poldmatchlist, oldminmatchlist,
                       pcnew,  pcold,  &currentvalue,  matrixdim,
nfacefixed,
                        &recursive_level,   minimumvalue,
returnlevelcounts) ;

     // clean up
     delete [] pnewmatchlist ;
     delete [] poldmatchlist ;
     delete [] pnewmatrix ;
     delete [] poldmatrix ;
     delete [] pcnew ;
     delete [] pcold ;
     delete [] returnlevelcounts ;
     delete [] newminmatchlist ;
     delete [] oldminmatchlist ;

     return (errorcode);
```

APPENDIX B

```
}

///////////////////////////////////////////////////////////////////
// extract the list of entries from an existing part matrix that
matches
// with a new part matrix.  The dimension of the part matrix must
// be greater then or equal to the dimension of the topological
matrix.
// Note: The first element of matchlist must be initialized to
//         contain the face number of the part matrix for macthing
//         with the first face in the topological matrix.
//         If nmatched is greater than 0, then the first nmatched
//         entries in matchlist should contain positive numbers to
//         indicate the already matched entries of the part matrix.

///////////////////////////////////////////////////////////////////

int matrix_similarity_index_loop
    ( int *pnewmatrix,   int *pnewmatchlist, int *newminmatchlist,
      int *poldmatrix,   int *poldmatchlist, int *oldminmatchlist,
       FENTCOUNT *pcnew,   FENTCOUNT *pcold,   int *currentvalue,
       int  matrixdim,          int  nfacefixed,          int
*recursive_level,
       int *minimumvalue,  int *returnlevelcounts)
{    // input
     //        pnewmatrix          - the new part's topological
matrix, where
     //                          the FENT contents have been changed
to
     //                           their representing integers.
     //                               (integer array of matrixdim *
matrixdim)
     //        pnewmatchlist  -  the  list  of  entries  of  the
newmatrix that
     //                                has  been  matched  by  the
oldmatrix.
     //                           (integer array of matrixdim)
     //        newminmatchlist      - the list of entries of the
newmatrix that
     //                                has  been  matched  by  the
oldmatrix that
     //                                provides the minimum value.
     //                           (integer array of matrixdim)
     //        poldmatrix          - the old parts's topological
matrix, where
     //                          the FENT contents have been changed
to
     //                           their representing integers.
     //                         (int array of matrixdim * matrixdim)
     //        poldmatchlist  -  the  list  of  entries  of  the
```

APPENDIX B

```
oldmatrix that
     //                                has   matched   with   the
newmatrix.
     //                          (integer array of matrixdim)
     //        oldminmatchlist     - the list of entries of the
oldmatrix that
     //                                has matched with the oldmatrix
that
     //                                provides the minimum value.
     //                          (integer array of matrixdim)
     //        matrixdim      -  the  matrix  dimension  of  both
matrices
     //        nfacematched   - the number of entries (faces) that
has
     //                                been fixed in matching the two
matrices.
     //        recursive_level     - this keep the number of times
this procedure
     //                                has been called recursivly.
This provides a
     //                                way to detect the error before
going into a
     //                                infinite   loop.   (integer
pointer)
     // output
     //        return         - error index,
     //                       = 0 means there is no error,
     //                       > 0 error code.
     //
     // verify the recursive level
     if ( *recursive_level > matrixdim ) {
          cout << "??? Error - the recursive level is too high.
???\n";
          cout << "    The matrix dimension is " << matrixdim <<
".\n";
          cout  <<  "       The  recursive  level  is    "  <<
*recursive_level << ".\n";
          return (9) ;
     }

     // Step 1) Choose a row to be matched with in the new matrix.
     // ( Currently, it uses whatever the next row in line.
Therefore,
     //   nothing to do at this moment.
     //   This may need to be changed to be properly matching up
with
     //   the algorithm that may be used in defining the sequence
of the
     //   candidate list.
     //   Note: If facenew is not next to the nfacefixed position,
```

APPENDIX B

```
then
     //         it should be changed to that position. )
     int  facenew = *(pnewmatchlist+nfacefixed) ;

     // Step 2) Create a list of candidate face list in the old
matrix.
     //        and calculate the increases in the similarity index
for
     //         each of the candidates.
     // ( Currently we are using what ever the sequence that is
inside
     //   the poldmatchlist.
     //   One may choose to use the faces that at least matches up
with
     //    the face connectivity of the chosen face in the new
matrix.
     //   Note: The sequence of faces in pcandidates does not need
to
     //         be corresponding to that in poldmatchlist. )
     int  ncandidates = matrixdim - nfacefixed ;
     int *pcandidates = new int [ncandidates] ;
     int *pincreases = new int [ncandidates] ;
     for ( int i = 0 ; i < ncandidates ; i++ ) {
          int faceold = *(poldmatchlist+nfacefixed+i) ;
          *(pcandidates+i) = faceold ;
          int increase = increase_on_similarity_index
          ( pnewmatrix,  pnewmatchlist, facenew,
                 poldmatrix,  poldmatchlist, faceold,
                 pcnew,       pcold,            currentvalue,
                 matrixdim,   nfacefixed,       minimumvalue) ;
          *(pincreases+i) = increase ;
     }

     // Step 3) Sort the candidate face based on the increased
values
     //           the candidates with the lower increase will be
tried first.
     sort_the_candidates (pcandidates, pincreases, ncandidates) ;

     // Step 4) change the FENT counters of the newmatrix for
fixing facenew
     int errorcode = change_counts_for_fix_one_face
     (  pnewmatrix,  pnewmatchlist,  facenew,  pcnew,  matrixdim,
nfacefixed) ;
     if (errorcode != 0) return (errorcode) ;

     // Step 5) Loop thru the candidate face and based on the
increased value
     //        determines whether or not to continue to the lower
level match.
```

APPENDIX B

```
     for ( int icandi = 0 ; icandi < ncandidates ; icandi++ ) {
          // get the candidate face number of the old matrix and
          // its corresponding amount of increase on similarity
index.
          int faceold = *(pcandidates+icandi) ;
          int increase = *(pincreases+icandi) ;

          // Now check whether it is any need to continue the
matching
          // If the current value plus the increase has already
exceed the
          // minimum value, then there is no need to continue the
matching.
          //  add  the  returnlevelcount  and  go  to  the  next
candidates.
          if (*currentvalue + increase >= *minimumvalue) {
               returnlevelcounts[nfacefixed] += 1 ;
          }

          else if (nfacefixed+1 == matrixdim) {
               // A new minimum similarity index has been found,
update
               // the minimum value
               *minimumvalue = *currentvalue + increase ;
               for ( i = 0 ; i < matrixdim ; i++ ) {
                    newminmatchlist[i] = pnewmatchlist[i] ;
                    oldminmatchlist[i] = poldmatchlist[i] ;
               }

          }

          else {
               // It is necessary to go down another level in this
recursive
               // call to define the similarity index.
               // change the FENT counters of the oldmatrix for
fixing faceold
               errorcode   =   change_counts_for_fix_one_face   (
poldmatrix,
               poldmatchlist,    faceold,    pcold,    matrixdim,
nfacefixed) ;
               if (errorcode != 0) return (errorcode) ;

               // call recursively
               *currentvalue += increase ;
               *recursive_level += 1 ;
               errorcode = matrix_similarity_index_loop
            ( pnewmatrix,          pnewmatchlist, newminmatchlist,
                    poldmatrix,          poldmatchlist, oldminmatchlist,
                    pcnew,          pcold,
```

APPENDIX B

```
currentvalue,
                    matrixdim,          nfacefixed+1,
recursive_level,
                    minimumvalue,  returnlevelcounts) ;
               if (errorcode != 0) return (errorcode) ;
               *recursive_level -= 1 ;
               *currentvalue -= increase ;

               // change the FENT counters of the oldmatrix for
unfixing faceold
               change_counts_for_unfix_one_face ( poldmatrix,
               poldmatchlist, pcold, matrixdim, nfacefixed+1) ;
          }
     }

     // change the FENT counters of the newmatrix for unfixing
facenew
     change_counts_for_unfix_one_face ( pnewmatrix,
               pnewmatchlist, pcnew, matrixdim, nfacefixed+1) ;

     //clean up
     delete [] pcandidates ;
     delete [] pincreases ;

     return (0);
}


/////////////////////////////////////////////////////////////////
// updates counters for fixing one more face.
/////////////////////////////////////////////////////////////////
int change_counts_for_fix_one_face
    ( int *pnewmatrix,    int *pnewmatchlist, int facenew,
      FENTCOUNT *pcnew,   int matrixdim,      int nfacefixed)
{    // input
     //       pnewmatrix          - the new part's topological
matrix, where
     //                           the FENT contents have been changed
to
     //                           their representing integers.
     //                               (integer array of matrixdim *
matrixdim)
     //       pnewmatchlist  - the list of entries of the
newmatrix that
     //                               has been matched by the
oldmatrix.
     //                           (integer array of matrixdim)
     //       facenew             - the face that is to be fixed.
```

APPENDIX B

```
    //        pcnew              - the FENTCOUNT of all the
faces.
    //        matrixdim      - the matrix dimension of both
matrices
    //        nfacematched   - the number of entries (faces) that
has
    //                           been fixed in matching the two
matrices.
    // output
    //        pnewmatchlist  - the updated list of entries of the
    //                           newmatrix matched by the
oldmatrix,
    //                           with the facenew entry is
moved to the
    //                           nfacefixed+1 location.
    //        pcnew              - the updated FENTCOUNT of all
the faces

    // switch the to be fixed face to the location of nfacefixed+1
    // in the pnewmatchlist
    int ifound = 0 ;
    for ( int i = nfacefixed ; i < matrixdim ; i++ ) {
         if (*(pnewmatchlist+i) == facenew) {
              *(pnewmatchlist+i) = *(pnewmatchlist+nfacefixed) ;
              *(pnewmatchlist+nfacefixed) = facenew ;
              ifound++ ;
         }
    }
    if ( ifound != 1 ) {
         cout << "Fatal error from change_counts_for_fix_one_face
/n" ;
         return ( 91 ) ;
    }

    // define the pointer to the FENT on the to be fixed face
    int *pnewrow = pnewmatrix + (facenew-1)*matrixdim ;

    // first change the counters for the previously fixed faces
    for ( i = 0 ; i < nfacefixed ; i++ ) {
         int newcol = *(pnewmatchlist+i) ;
         int pnewv  = *(pnewrow + newcol - 1) ;
         pcnew[newcol].count[pnewv]-- ;
         int igroup = fent_group (pnewv) ;
         pcnew[newcol].gcount[igroup]-- ;
         if ( pcnew[newcol].count[pnewv] < 0 ||
              pcnew[newcol].gcount[igroup] < 0 ) {
              c o u t    < <    " F a t a l    e r r o r    f r o m
change_counts_for_fix_one_face /n" ;
              return ( 92 ) ;
         }
```

APPENDIX B

```
     }

     // second change the counters for the unfixed faces
     // use count_specified_fents to initialize the FENTCOUNT of
     // the newly seleted face and count the numbers of fents of
     // the undetermined columns on the to be fixed rows
     int listdim = matrixdim - nfacefixed ;
     pcnew[facenew] = count_specified_fents ( pnewrow,
               pnewmatchlist+nfacefixed, matrixdim, listdim ) ;

     // decrease the FENTCOUNT of the newly seleted face from that
     // in remaining unfixed faces
     for ( i = 0; i < NumIntFent; i++ )
          pcnew[0].count[i] -= pcnew[facenew].count[i] ;
     for ( i = 0; i < NumIntFentGroup; i++ )
          pcnew[0].gcount[i] -= pcnew[facenew].gcount[i] ;

     return (0) ;
}


/////////////////////////////////////////////////////////////////
// This function updates the counters for release a fixed face.
// The released face is the face currently on location nfacefixed.
/////////////////////////////////////////////////////////////////
void change_counts_for_unfix_one_face
    ( int *pnewmatrix,    int *pnewmatchlist,
      FENTCOUNT *pcnew,   int matrixdim,      int nfacefixed)
{    // input
     //        pnewmatrix          - the new part's topological
matrix, where
     //                            the FENT contents have been changed
to
     //                            their representing integers.
     //                                (integer array of matrixdim *
matrixdim)
     //        pnewmatchlist  - the list of entries of the
newmatrix that
     //                               has been matched by the
oldmatrix.
     //                            (integer array of matrixdim)
     //        pcnew               - the FENTCOUNT of all the
faces.
     //        matrixdim      - the matrix dimension of both
matrices
     //        nfacematched   - the number of entries (faces) that
has
     //                               been fixed in matching the two
```

APPENDIX B

```
matrices.
     // output
     //        pcnew                   - the updated FENTCOUNT of all
the faces

     // get the to be unfixed face number and
     // define the pointer to the FENT on the to be fixed face
     int facenew = *(pnewmatchlist+nfacefixed-1) ;
     int *pnewrow = pnewmatrix + (facenew-1)*matrixdim ;

     // first change the counters for the previously fixed faces
     for ( int i = 0 ; i < nfacefixed-1 ; i++ ) {
          int newcol = *(pnewmatchlist+i) ;
          int pnewv  = *(pnewrow + newcol - 1) ;
          pcnew[newcol].count[pnewv]++ ;
          int igroup = fent_group (pnewv) ;
          pcnew[newcol].gcount[igroup]++ ;
     }

     // second change the counters for the unfixed faces by
     // adding the FENTCOUNT of the to be released face to that
     // of the remaining unfixed faces
     for ( i = 0; i < NumIntFent; i++ )
          pcnew[0].count[i] += pcnew[facenew].count[i] ;
     for ( i = 0; i < NumIntFentGroup; i++ )
          pcnew[0].gcount[i] += pcnew[facenew].gcount[i] ;

}



/////////////////////////////////////////////////////////////////
// This function counts the number of FENTs in the given array of
// intfent.
/////////////////////////////////////////////////////////////////
FENTCOUNT count_fents ( int *pintfentarray, int arraydim)
{    // input
     //        pintfentarray  - the pointer to the intfent array
     //        arraydim       - the dimension of the intfent array
     // output
     //        return                  - FENTCOUNT, the FENT count of
the
     //                                  input array

     // define an FENT count and initialize it
     static FENTCOUNT fentc ;
     for ( int j = 0; j < NumIntFent; j++ ) fentc.count[j] = 0 ;
     for ( j = 0; j < NumIntFentGroup; j++ ) fentc.gcount[j] = 0 ;
```

APPENDIX B

```
     // Count the numbers of fents in an array of intfent
     for ( int *i = pintfentarray ; i < pintfentarray+arraydim ;
i++ ) {
          fentc.count[*i]++ ;
          fentc.gcount[fent_group(*i)]++ ;
     }

     return (fentc) ;
}



//////////////////////////////////////////////////////////////////
// This function counts the number of FENTs in a specified set of
// an intfent array.
//////////////////////////////////////////////////////////////////
FENTCOUNT count_specified_fents ( int *pintfentarray,
                    int *locationlist, int arraydim, int listdim)
{    // input
     //        pintfentarray  - the pointer to the intfent array
     //        locationlist   - the locations in the intfent array
     //                              that are to be included in
counting
     //        arraydim       - the dimension of the intfent array
     //        listdim             - the dimension of the location
list
     // output
     //        return              - FENTCOUNT, the FENT count of
the
     //                              selected elements in the input
array

     // define an FENT count and initialize it
     static FENTCOUNT fentc ;
     for ( int j = 0; j < NumIntFent; j++ ) fentc.count[j] = 0 ;
     for ( j = 0; j < NumIntFentGroup; j++ ) fentc.gcount[j] = 0 ;

     // Count the numbers of fents in an array of intfent
     for ( int *i = locationlist ; i < locationlist+listdim ; i++
) {
          int intfent = *(pintfentarray+(*i)-1) ;
          fentc.count[intfent]++ ;
          fentc.gcount[fent_group(intfent)]++ ;
     }

     return (fentc) ;
}
```

APPENDIX B

```
////////////////////////////////////////////////////////////////////
// This function counts the number of FENTs in a specified set of
// an intfent matrix.
// Note: The intfent matrix is symmetric.  Only half of the matrix
//       are included in the counting.
////////////////////////////////////////////////////////////////////
FENTCOUNT count_specified_fents_matrix ( int *pintfentmatrix,
                    int *locationlist, int matrixdim, int listdim)
{    // input
     //        pintfentmatrix - the pointer to the intfent matrix
     //        locationlist   - the locations in the intfent matrix
     //                             that are to be included in
counting
     //        matrixdim      - the dimension of the intfent matrix
     //        listdim             - the dimension of the location
list
     // output
     //        return              - FENTCOUNT, the FENT count of
the
     //                             selected elements in the input
matrix

     // define an FENT count and initialize it
     static FENTCOUNT fentc ;
     for ( int j = 0; j < NumIntFent; j++ ) fentc.count[j] = 0 ;
     for ( j = 0; j < NumIntFentGroup; j++ ) fentc.gcount[j] = 0 ;

     // Count the numbers of fents in an matrix of intfent
     for ( int i = 0 ; i < listdim ; i++ ) {
          int facenum = *(locationlist+i) ;
          int    *pintfentrow   =   pintfentmatrix   +   (facenum   -
1)*matrixdim ;

          // Note: only half of the symmetric matrix is counted =>
          //       the k is atarted from i (diagonal included).
          for ( int k = i ; k < listdim ; k++ ) {
               int intfent = *(pintfentrow+(*(locationlist+k))-1)
;
               fentc.count[intfent]++ ;
               fentc.gcount[fent_group(intfent)]++ ;
          }
     }
     return (fentc) ;
}

////////////////////////////////////////////////////////////////////
// This function returns the penalty on a mismatched pair of FENT.
////////////////////////////////////////////////////////////////////
int penalty_of_fent_pair ( int intfent1, int intfent2)
{    // input
```

APPENDIX B

```
    //        intfent1  - the intfent of part 1
    //        intfent2  - the intfent of part 2
    // output
    //        return          - the penalty for the mismatched
intfents.

    // No penalty, if they are the same
    if (intfent1 == intfent2) return (0) ;

    // add the penalty for mismatching the individual intfent
    int indexvalue = 0;
    indexvalue += fent_weight(intfent1) ;
    indexvalue += fent_weight(intfent2) ;

    // add the penalty for mismatching their fent group
    int fentgroup1 = fent_group(intfent1) ;
    int fentgroup2 = fent_group(intfent2) ;
    if (fentgroup1 != fentgroup2) {
         indexvalue += fent_group_weight(fentgroup1) ;
         indexvalue += fent_group_weight(fentgroup2) ;
    }

    return (indexvalue) ;
}

//////////////////////////////////////////////////////////////////
// This function returns the minimum penalty for the least possible
// mismatches of two FENTCOUNT.
//////////////////////////////////////////////////////////////////
int penalty_of_FENTCOUNT_pair ( FENTCOUNT const &fentcount1,
                                FENTCOUNT   const
&fentcount2)
{   // input
    //        fentcount1     - the FENTCOUNT of part 1
    //        fentcount2     - the FENTCOUNT of part 2
    // output
    //        return         -  the  minimum  penalty  on  the
mismatches
    //                      of two FENTCOUNTs.

    // Now loop thru the FENTCOUNT,
    // currently method uses the penalty of the minimum possible

    // individual mismatches as the penalty plus the penalty of
    // the minimum possible mismatched groups
    int indexvalue = 0;
    for ( int i = 1; i < NumIntFent; i++ )
         if ( fentcount1.count[i] != fentcount2.count[i] )
              indexvalue += fent_weight(i) *
                   abs    (   fentcount1.count[i]    -
```

APPENDIX B

```
fentcount2.count[i] ) ;
     for ( i = 1; i < NumIntFentGroup; i++ )
          if ( fentcount1.gcount[i] != fentcount2.gcount[i] )
               indexvalue += fent_group_weight(i) *
                    abs ( fentcount1.gcount[i] -
fentcount2.gcount[i] ) ;

     return (indexvalue) ;
}

////////////////////////////////////////////////////////////////////
// This function returns the penalty on a mismatched pair of FENT.
////////////////////////////////////////////////////////////////////
int change_from_seperate_fent_sets ( int ntnew, int ntold,
                                     int nsnew, int nsold
)
{    // input
     //        ntnew     - number of FENT in the whole set of the
new part.
     //        ntold     - number of FENT in the whole set of the
old part.
     //        nsnew     - number of FENT in the sub-set of the new
part.
     //        nsold     - number of FENT in the sub-set of the old
part.
     // output
     //        return    - the change in the number of counts of
the mismatch
     //                    due to the separation of the sub-set
from the
     //                    whole set.

     int difforg = abs( ntnew-ntold ) ;
     int diffsub = abs( nsnew-nsold ) ;
     int diffnew = abs( ntnew-nsnew-ntold+nsold ) ;
     int change = diffsub + diffnew - difforg ;
     return ( change ) ;
}

////////////////////////////////////////////////////////////////////
// This function returns the minimum penalty for the least possible
// mismatches of two FENTCOUNT.
////////////////////////////////////////////////////////////////////
int increase_from_separate_a_pair_of_fent (
          FENTCOUNT const &pcnew_total, FENTCOUNT const
&pcold_total,
          int intfentnew_separ,    int intfentold_separ )
{    // input
     //        pcnew_total    - the total FENTCOUNT of the new part
     //        pcold_total    - the total FENTCOUNT of the old part
```

APPENDIX B

```
    //        intfentnew_separ - to be seperated FENT of the new
part
    //        intfentold_separ - to be seperated FENT of the old
part
    // output
    //        return          - the increase in the penalty due to
the
    //                        seperation of the FENTs.

    static int ntnew, ntold, igroup ;
    static int increase ;
    if (intfentnew_separ == intfentold_separ) {
         ntnew = pcnew_total.count[intfentnew_separ] ;
         ntold = pcold_total.count[intfentnew_separ] ;
         increase = fent_weight(intfentnew_separ) *
                   change_from_seperate_fent_sets(ntnew, ntold, 1,
1 ) ;
         igroup = fent_group(intfentnew_separ) ;
         ntnew = pcnew_total.gcount[igroup] ;
         ntold = pcold_total.gcount[igroup] ;
         increase += fent_group_weight(igroup) *
                   change_from_seperate_fent_sets(ntnew, ntold, 1,
1 ) ;
    }
    else {
         ntnew = pcnew_total.count[intfentnew_separ] ;
         ntold = pcold_total.count[intfentnew_separ] ;
         increase = fent_weight(intfentnew_separ) *
                   change_from_seperate_fent_sets(ntnew, ntold, 1,
0 ) ;
         ntnew = pcnew_total.count[intfentold_separ] ;
         ntold = pcold_total.count[intfentold_separ] ;
         increase += fent_weight(intfentold_separ) *
                   change_from_seperate_fent_sets(ntnew, ntold, 0,
1 ) ;

         if   (fent_group(intfentnew_separ)   ==
fent_group(intfentold_separ)) {
              igroup = fent_group(intfentnew_separ) ;
              ntnew = pcnew_total.gcount[igroup] ;
              ntold = pcold_total.gcount[igroup] ;
              increase += fent_group_weight(igroup) *
                        change_from_seperate_fent_sets(ntnew,
ntold, 1, 1 ) ;
         }
         else {
              igroup = fent_group(intfentnew_separ) ;
              ntnew = pcnew_total.gcount[igroup] ;
              ntold = pcold_total.gcount[igroup] ;
              increase += fent_group_weight(igroup) *
```

APPENDIX B

```
                         change_from_seperate_fent_sets(ntnew,
ntold, 1, 0 ) ;
               igroup = fent_group(intfentold_separ) ;
               ntnew = pcnew_total.gcount[igroup] ;
               ntold = pcold_total.gcount[igroup] ;
               increase += fent_group_weight(igroup) *
                         change_from_seperate_fent_sets(ntnew,
ntold, 0, 1 ) ;
          }
     }
     return (increase) ;
}

/////////////////////////////////////////////////////////////////
// This function returns the minimum penalty for the least possible
// mismatches of two FENTCOUNT.
/////////////////////////////////////////////////////////////////
int increase_from_separate_a_pair_of_fentcount (
          FENTCOUNT const &pcnew_total, F E N T C O U N T    c o n s t
&pcold_total,
          FENTCOUNT const &pcnew_separ, F E N T C O U N T    c o n s t
&pcold_separ )
{    // input
     //        pcnew_total     - the total FENTCOUNT of the new part
     //        pcold_total     - the total FENTCOUNT of the old part
     //        pcnew_separ     - to be seperated FENTCOUNT of the
new part
     //        pcold_separ     - to be seperated FENTCOUNT of the
old part
     // output
     //        return          - the increase in the penalty due to
the
     //                        seperation of the FENTCOUNTs.

     // Now loop thru the FENTCOUNT,
     // currently method uses the penalty of the minimum possible

     // individual mismatches as the penalty plus the penalty of
     // the minimum possible mismatched groups
     int change, increase ;
     increase  = 0;
     for ( int i = 1; i < NumIntFent; i++ ) {
          change = change_from_seperate_fent_sets (
                         p c n e w _ t o t a l . c o u n t [ i ] ,
pcold_total.count[i],
                         pcnew_separ.count[i],pcold_separ.count[i]
) ;
          if ( change != 0 ) increase += fent_weight(i) * change ;
     }
```

APPENDIX B

```
     for ( i = 1; i < NumIntFentGroup; i++ ) {
          change = change_from_seperate_fent_sets (
                              p c n e w _ t o t a l . g c o u n t [ i ] ,
pcold_total.gcount[i],
                              p c n e w _ s e p a r . g c o u n t [ i ] ,
pcold_separ.gcount[i] ) ;
          if ( change != 0 ) increase += fent_group_weight(i) *
change ;
     }

     return (increase) ;
}


/////////////////////////////////////////////////////////////////////
// This function calculates the similar index for the given set of
// faces up to the specified fixed faces.
// Note: only half of the matrix are included in the calculation.
/////////////////////////////////////////////////////////////////////
int direct_calculate_similarity_index
    ( int *pnewmatrix,    int *pnewmatchlist,
      int *poldmatrix,    int *poldmatchlist,     int matrixdim)
{
     // loop thru the faces and calculate the similarity index
     int indexvalue = 0 ;
     for (int iface = 0; iface < matrixdim; iface++) {
          int facenew = *(pnewmatchlist+iface) ;
          int faceold = *(poldmatchlist+iface) ;
          int *pnewrow = pnewmatrix + (facenew - 1)*matrixdim ;
          int *poldrow = poldmatrix + (faceold - 1)*matrixdim ;

          // first from the mismatches of the fixed faces.
          // Note: the diagonal terms of the matrix are always
iNoRelation.
          //       therefore, they are skip in the loop.
          //         also due to the symmetry, only half of the
matrix are
          //        included in the calculation of the similarity
index
          for (int icol = iface; icol < matrixdim; icol++) {
               int newcol = *(pnewmatchlist+icol) ;
               int oldcol = *(poldmatchlist+icol) ;
               int pnewv = *(pnewrow + newcol - 1) ;
               int poldv = *(poldrow + oldcol - 1) ;
               if   (   pnewv   !=   poldv   )   indexvalue   +=
penalty_of_fent_pair(pnewv,poldv) ;
          }
     }
     return (indexvalue) ;
}
```

APPENDIX B

```
//////////////////////////////////////////////////////////////////
// This function calculates the similar index for the given set of
// faces up to the specified fixed faces.
//////////////////////////////////////////////////////////////////
int calculate_partial_similarity_index
    ( int *pnewmatrix,    int *pnewmatchlist,    FENTCOUNT *pcnew,
      int *poldmatrix,    int *poldmatchlist,   FENTCOUNT *pcold,
       int matrixdim,      int nfacefixed)
{
     // loop thru the faces and calculate the similarity index
     int indexvalue = 0 ;
     for (int iface = 0 ; iface < nfacefixed; iface++) {
          int facenew = *(pnewmatchlist+iface) ;
          int faceold = *(poldmatchlist+iface) ;
          int *pnewrow = pnewmatrix + (facenew - 1)*matrixdim ;
          int *poldrow = poldmatrix + (faceold - 1)*matrixdim ;

          // first from the mismatches of the fixed faces.
          // Note: the diagonal terms of the matrix are always
iNoRelation.
          //       therefore, they are skip in the loop.
          //         also due to the symmetry, only half of the
matrix are
          //        included in the calculation of the similarity
index
          for (int icol = iface ; icol < nfacefixed; icol++) {
               int newcol = *(pnewmatchlist+icol) ;
               int oldcol = *(poldmatchlist+icol) ;
               int pnewv = *(pnewrow + newcol - 1) ;
               int poldv = *(poldrow + oldcol - 1) ;
               if   (   pnewv   !=   poldv   )   indexvalue   +=
penalty_of_fent_pair(pnewv,poldv) ;
          }

          // use count_specified_fents to initialize the FENTCOUNT
of
          // the facenew and faceold and to count the numbers of
fents of
          // the columns of the unfixed faces
          int listdim = matrixdim - nfacefixed ;
          pcnew[facenew] = count_specified_fents ( pnewrow,
                    pnewmatchlist+nfacefixed, matrixdim, listdim )
;
          pcold[faceold] = count_specified_fents ( poldrow,
                    poldmatchlist+nfacefixed, matrixdim, listdim )
;

          // Now loop thru the FENTCOUNT of the facenew and faceold
          // and calculate the penalty of their mismatches.
```

APPENDIX B

```
        indexvalue += penalty_of_FENTCOUNT_pair ( pcnew[facenew],
pcold[faceold] ) ;
     }

     // use count_specified_fents_matrix to get the FENTCOUNT
     // of the unfixed faces of both matrices
     int listdim = matrixdim - nfacefixed ;
     pcnew[0] = count_specified_fents_matrix ( pnewmatrix,
               pnewmatchlist+nfacefixed, matrixdim, listdim ) ;
     pcold[0] = count_specified_fents_matrix ( poldmatrix,
               poldmatchlist+nfacefixed, matrixdim, listdim ) ;

     // Finally calculate the penalty of the FENTCOUNT
     // of the unfixed faces of the two matrices.
     indexvalue += penalty_of_FENTCOUNT_pair ( pcnew[0],
                                                          pcold[0]
) ;

     // Return the amount of penalty on the two partially fixed
     // part matrices as its minimum possible similarity index.
     return (indexvalue);
}


/////////////////////////////////////////////////////////////////
// This function calculates the increase in the similar index for
// the mismatches of the given facenew and faceold.
/////////////////////////////////////////////////////////////////
int increase_on_similarity_index
    ( int *pnewmatrix,     int *pnewmatchlist, int facenew,
      int *poldmatrix,     int *poldmatchlist, int faceold,
       FENTCOUNT *pcnew,    FENTCOUNT *pcold,    int *currentvalue,
       int matrixdim,       int nfacefixed,      int *minimumvalue)
{
     // loop thru the faces to see how much increase is in the
     // current value.
     int increase = 0 ;
     int *pnewrow = pnewmatrix + (facenew-1)*matrixdim ;
     int *poldrow = poldmatrix + (faceold-1)*matrixdim ;

     // first loop thru the previously fixed faces and calculate
     // the increase for the mismatches between the chosen columns
     for ( int i = 0; i < nfacefixed; i++ ) {
          int newcol = *(pnewmatchlist+i) ;
          int oldcol = *(poldmatchlist+i) ;
          int pnewv = *(pnewrow + newcol - 1) ;
          int poldv = *(poldrow + oldcol - 1) ;
          if ( pnewv != poldv ) {
               FENTCOUNT pcnewcol = pcnew[newcol] ;
```

APPENDIX B

```
            FENTCOUNT pcoldcol = pcold[oldcol] ;
            increase += increase_from_separate_a_pair_of_fent (
                         pcnewcol, pcoldcol, pnewv, poldv ) ;
        }
    }

    // use count_specified_fents to initialize the FENTCOUNT of
    // the newly seleted face and count the numbers of fents of
    // the undetermined columns on the to be fixed rows
    int listdim = matrixdim - nfacefixed ;
    pcnew[facenew] = count_specified_fents ( pnewrow,
            pnewmatchlist+nfacefixed, matrixdim, listdim ) ;
    pcold[faceold] = count_specified_fents ( poldrow,
            poldmatchlist+nfacefixed, matrixdim, listdim ) ;
    increase += increase_from_separate_a_pair_of_fentcount (
            pcnew[0], pcold[0], pcnew[facenew], pcold[faceold]
) ;

    // Return the amount of increase in the similarity index for
    // the matching of the chosen two faces, facenew in new part
    // and the faceold in the old part.
    return (increase);
}
```

APPENDIX C

```
///////////////////////////////////////////////////////////////////
//                                                               //
//   Example of bendline detection with comments. This module   //
//   contains BM_PART::auto_bend() implementation.              //
//                                                               //
//               Copyright 1996 AmadaSoft America, Inc.         //
//                                                               //
///////////////////////////////////////////////////////////////////

/*
*********** ********** ********** ********** *********** *********
     This is a major high-level Bend Model function for part design
and construction.  Its purpose is to create bendlines between faces
so that the part becomes connected (if possible).

     This function was created to facilitate part creation.
Normally, a third-party CAD program is used to draw a part. Since
Bend Model does not have any control over the CAD system, for our
purposes this drawing is just a set of edges. Therefore this
drawing has to be analyzed in order to detect the structure of the
part. After that we can create faces and bendlines of the part.
However, the input drawing is often ambigious - bendlines are not
uniquely defined. In that case we use a number of heuristics to
create bendlines. This heuristics define preference criterias for
picking one outcome when many are possible.

     Since this problem is common to many applications this
function is part of the Bend Model.  Moreover, implementing this
function in Bend Model will simplify the face detection software
that has to be part of the CAD system.  In this function we assume
that edges of faces are sorted according to the left-hand side rule
in a way that is consistent with the plane normal (which defines
the plane orientation).  Basically, this function assumes that
every plane is correct by itself, when viewed in isolation.
However, this function does not require that the orientation of
adjacent planes be correct with respect to the bendlines between
them (there is a Bend Model function for fixing that later).

     This function can be used to generate bendlines for both
3D-version of the part and the flat version of the part. However,
the part can have either the flat or 3D version, but not both.
In other words, either all 3D-version of 3D-bodies must be NULL (in
which case we have a flat version), or all flat versions must be
NULL.
*/


/*
```

APPENDIX C

```
*********** ********** ********** ********** ********** **********
      Algorithm/Process :

      The objective of the algorithm is the create a minimum number
of bendlines (because we want to change the part as little as
possible) so that the entire part becomes connected (ie. all
faces all connected via bendlines - we don't want any stand-alone
faces hanging around), given the restriction that we don't create
loops in the topology graph of the part.

      It is not required that the input part contain no bendlines.
AutoBend takes into account  existing bendlines and adds new
bendlines to the part. On the top level, this algorithm performs a
version of the maximum spanning tree algorithm.
At any point in time, it has a current connected component and a
set of fringe faces (that are part of the connected component).
These fringe faces have contacts with faces outside of the
connected component. During one iteration, one new face that is
outside of the connected component will be added to the connected
component. Among the faces outside the connected component that are
in contact with a fringe face, AutoBend picks one that has the
largest contact.

      This heuristic of using the largest contact is based on the
fact that in sheet-metal manufacturing, the larger the contact the
better, usually.  However, when there is a tie - ie. there are
several faces outside the connected component that have the same
largest contact with a fringe face in the connected component,
we use another heuristic. This heuristic picks a face that would
minimize the diameter of the part. The diameter of the part is the
largest distance between any two faces in the topology graph of the
part.
*********** ********** ********** ********** ********** **********

      Technical notes :

      - This function probably does not work well if the part
thickness is not zero.

      - Note that this function creates bendline information that is
consistent with face1 in the algorithm (mainly, face1 normal).
However, face2 normal can be inconsistent with this information,
but that has to be fixed later.

      See comments in PART.HXX.

********** ********** ********** ********** ********** **********
*/
```

APPENDIX C

```
#include <stdio.h>
#include <stdlib.h>

#include "GLOBAL.HXX"
#include "ENTITY.HXX"
#include "PLANE.HXX"
#include "CYLINDER.HXX"
#include "LINE.HXX"
#include "LOOP.HXX"
#include "2D_BODY.HXX"
#include "FORMING.HXX"
#include "FACE.HXX"
#include "BEND_OP_R.HXX"
#include "BEND_PRP.HXX"
#include "BENDLINE.HXX"
#include "PART.HXX"
#include "DBM.HXX"

/*
     This function computes all contacts between the given two
faces.
     A contact is when two faces are touching each other (ie.
within some very small distance tolerance) and the line separating
them has length greaterthan 0 (ie. the common line is not a point,
but a real line).

     Purpose :
          To compute a list of potential bendlines between given
two faces.

     Assumptions :

          - both faces have a non-NULL 3D version that is up to
datewhich will be used for the computation.
          - all loops in either faces are closed.

     Requirements :

          - both faces must be in the same part.

     Returns :

          - a list of contacts

            This returned list has a structure :

            node 0 : obj is "number of contacts"

            node 2i-1 : obj is "head of the list on face1 side, of
```

APPENDIX C

```
contact i"
            node 2i    : obj is "head of the list on face2 side, of
contact i"

            where i is in [1,"number of contacts"].

            Note that each contact is a "closed" contact, ie. there
are no gaps in the contact.

            Each list on either side of the contact is a list of
lines (actually
            pointers to lines) such that the order of lines in the
list is
            opposite to sweep direction (currently XZY sweep).

     This is what a list of contacts looks like :

     # of contacts -> list1.face1.head -> list1.face2.head -> ...
-> list i.face1.head -> list i.face2.head.
                                    |                   |
            |                         |
                                          V                        V
                                     V                        V
                                  line1 in face1      line1 in face2
          line1 in face1           line1 in face2
                                    |                   |
            |                         |
                                          V                        V
                                     V                        V
                                          ...                     ...
                      ...                       ...
                                    |                   |
            |                         |
                                          V                        V
                                     V                        V
                                line i in face1     line j in face2
        line k in face1          line 1 in face2

     Note that in this function a co-linear bendline of k bends is
considered as
     k separate contacts.

     Notes :
     -------

     - By default we will consider all lines in both faces as
candidates for a bendline.
          However, if the user already known what the bendline is
(or actually, knows what the bendline
```

APPENDIX C

```
        edges are) he can use the name of these lines to instruct
this function to consider only
        those lines. This function will check if any of the lines
in face1 or face2 (faces 1 and 2
        are checked separately) have a name that is euqal to the
idx of the other face. If yes,
        only these lines will be considered as candidates for a
bendline on the side of that face.
*/

static int BM_compute_all_face_to_face_contacts(
     BM_FACE & face1 /* IN */,
     BM_FACE & face2 /* IN */,
     BM_LINKED_LIST_NODE **list_of_contacts /* OUT */)
{
     // initialize global variables.
     // this is the contacts list we will be computing. initially
list is NIL.
     *list_of_contacts = NULL ;

     // this points to the beginning of the contacts list.
     // it does not contain the number of contacts.
     // ie. points to "list_of_contacts[1]".
     BM_LINKED_LIST_NODE *contacts = NULL ;

     double *line_start_coordinates = NULL ; // used when the set
of lines is sorted
     BM_LINE **line_pointers = NULL ; // an array of lines
(actually pointers to lines) used to store
        // lines being swept.
        // once lines are sorted according to the XZY order, we
will scan this array from the end
        // to the beginning -> this implements the sweep.
        // at the same time, we maintain a list of open lines.
this is done by leaving line
        // pointers in this array "behind" as they are when we
move forward in the array.
        // to erase a line from the open list, we simple set the
pointer in the array to NULL.

     // endpoints of lines in face1 and face2 that are larger with
respect to XZY ordering.
     // used when processing contacts.
     BM_POINT p_face1, p_face2 ;

     // some variables used in many places.
     long i, j ;
     BM_POINT p ;
```

APPENDIX C

```
/*
     **********  **********  **********  **********  **********
********** ********** ********** **********
     Qualification check.
     **********  **********  **********  **********  **********
********** ********** ********** **********
*/
     // both faces must be in the same part
     if  (face1.get_part()  ==  NULL  ||  face1.get_part()  !=
face2.get_part()) return 0 ;
     d o u b l e   l o c a l _ t o l e r a n c e   =
(face1.get_part())->get_distance_tolerance() ;

     // first try 3D-versions of faces. if both of them are empty,
try flat versions.
     BM_2D_BODY *body1 = face1.get_current_3D_version() ;
     BM_2D_BODY *body2 = face2.get_current_3D_version() ;
     if (NULL == body1 && NULL == body2) {
          body1 = face1.get_flat() ;
          body2 = face2.get_flat() ;
          }
     // if either of the 3D-bodies is NULL we are successfully
done.
     if (NULL == body1 || NULL == body2) return 1 ;

     // both faces must have a plane as the underlying surface
     BM_SURFACE *surface1 = body1->get_surface() ;
     BM_SURFACE *surface2 = body2->get_surface() ;
     if (NULL == surface2 || NULL == surface2) return 0 ;
     if   (!   surface2->is(BM_TYPE_PLANE)   ||   !
surface2->is(BM_TYPE_PLANE)) return 0 ;

     // if any of the faces has an empty bloop, we are successfully
done
     BM_LOOP *bloop1 = body1->get_bloop() ;
     BM_LOOP *bloop2 = body2->get_bloop() ;
     if (NULL == bloop1 || NULL == bloop2) return 1 ;

/*
     **********  **********  **********  **********  **********
********** ********** ********** **********
     Here we will do a very quick check if these faces can be in
contact at all.
     Here we check if bloop of face2 touches (at more than one
point) or
     intersects the plane of face1.
     This will save some time when these two faces obviously cannot
be in contact.
     **********  **********  **********  **********  **********
```

APPENDIX C

```
********** ********** ********** **********
*/
     // these variables will be used to do a quick check if these
two
     // faces can possible touch each other
     double distance_plane_to_bloop1, distance_plane_to_bloop2,
          distance_plane_to_bloop3, distance_plane_to_bloop4 ;
     int distance_plane_to_bloop_count ;

     if (! bloop2->is_bbox_up_to_date()) bloop2->recompute_bbox()
;
     i                              f    (                          !
BM_distance_between_point_and_plane(bloop2->get_bbox_p1(),
          (BM_PLANE&)   (*surface1),   &distance_plane_to_bloop1,
NULL)) return 0 ;
     i                              f    (                          !
BM_distance_between_point_and_plane(bloop2->get_bbox_p2(),
          (BM_PLANE&)   (*surface1),   &distance_plane_to_bloop2,
NULL)) return 0 ;
     i                              f    (                          !
BM_distance_between_point_and_plane(bloop2->get_bbox_p3(),
          (BM_PLANE&)   (*surface1),   &distance_plane_to_bloop3,
NULL)) return 0 ;
     i                              f    (                          !
BM_distance_between_point_and_plane(bloop2->get_bbox_p4(),
          (BM_PLANE&)   (*surface1),   &distance_plane_to_bloop4,
NULL)) return 0 ;
     distance_plane_to_bloop_count = 0 ;
     if   (fabs(distance_plane_to_bloop1)   >=   local_tolerance)
distance_plane_to_bloop_count++ ;
     if   (fabs(distance_plane_to_bloop2)   >=   local_tolerance)
distance_plane_to_bloop_count++ ;
     if   (fabs(distance_plane_to_bloop3)   >=   local_tolerance)
distance_plane_to_bloop_count++ ;
     if   (fabs(distance_plane_to_bloop4)   >=   local_tolerance)
distance_plane_to_bloop_count++ ;
     if (distance_plane_to_bloop_count > 2) {
          // at most one of the bloop corners is on the plane.
          // that means, bbox itself is not in contact with face1.
          // however, it could be that different corners of bbox
are on different sides of the plane.
          // here we will return if all bloop2 points are on one
side of plane1
          // ie. these two faces cannot be in contact
          //
          // note : at most one of the 4 distance_plane_to_bloop-i
can be zero.
          //
          // in the next line we pick "distance_plane_to_bloop1"
```

APPENDIX C

```
for checking not because it is special,
          // but because any of the 4 would do.
          if (fabs(distance_plane_to_bloop1) >= local_tolerance) {
               i                                                   f
(distance_plane_to_bloop1*distance_plane_to_bloop2 >= 0.0 &&

distance_plane_to_bloop1*distance_plane_to_bloop3 >= 0.0 &&

distance_plane_to_bloop1*distance_plane_to_bloop4 >= 0.0) return 1
;
               }
          else {
               i                                                   f
(distance_plane_to_bloop2*distance_plane_to_bloop3 >= 0.0 &&

distance_plane_to_bloop2*distance_plane_to_bloop4 >= 0.0) return 1
;
               }
          }
     // if the count is 0, 1 or 2, it means that 2, 3 or 4 bbox
corners are on the plane.
     // that means, it is possible that there is a contact.

/*
     Now we check the same thing for bbox1 with respect to face2.
*/
     if (! bloop1->is_bbox_up_to_date()) bloop1->recompute_bbox()
;
     i                          f    (                          !
BM_distance_between_point_and_plane(bloop1->get_bbox_p1(),
          (BM_PLANE&)   (*surface2),   &distance_plane_to_bloop1,
NULL)) return 0 ;
     i                          f    (                          !
BM_distance_between_point_and_plane(bloop1->get_bbox_p2(),
          (BM_PLANE&)   (*surface2),   &distance_plane_to_bloop2,
NULL)) return 0 ;
     i                          f    (                          !
BM_distance_between_point_and_plane(bloop1->get_bbox_p3(),
          (BM_PLANE&)   (*surface2),   &distance_plane_to_bloop3,
NULL)) return 0 ;
     i                          f    (                          !
BM_distance_between_point_and_plane(bloop1->get_bbox_p4(),
          (BM_PLANE&)   (*surface2),   &distance_plane_to_bloop4,
NULL)) return 0 ;
     distance_plane_to_bloop_count = 0 ;
     if    (fabs(distance_plane_to_bloop1)    >=    local_tolerance)
distance_plane_to_bloop_count++ ;
     if    (fabs(distance_plane_to_bloop2)    >=    local_tolerance)
distance_plane_to_bloop_count++ ;
```

APPENDIX C

```
     if   (fabs(distance_plane_to_bloop3)   >=   local_tolerance)
distance_plane_to_bloop_count++ ;
     if   (fabs(distance_plane_to_bloop4)   >=   local_tolerance)
distance_plane_to_bloop_count++ ;
     if (distance_plane_to_bloop_count > 2) {
          // at most one of the bloop corners is on the plane.
          // here we will return if all bloop1 points are on one
side of plane2
          // ie. these two faces cannot be in contact
          if (fabs(distance_plane_to_bloop1) >= local_tolerance) {
               i                                                f
(distance_plane_to_bloop1*distance_plane_to_bloop2 >= 0.0 &&

distance_plane_to_bloop1*distance_plane_to_bloop3 >= 0.0 &&

distance_plane_to_bloop1*distance_plane_to_bloop4 >= 0.0) return 1
;
               }
          else {
               i                                                f
(distance_plane_to_bloop2*distance_plane_to_bloop3 >= 0.0 &&

distance_plane_to_bloop2*distance_plane_to_bloop4 >= 0.0) return 1
;
               }
          }

/*
     **********   **********   **********   **********   **********
********** ********** ********** **********
     Count the total number of lines in both faces. We need to
allocate memory.

     Note : we only count edges that are lines, because only lines
can make bendlines.

     Note : we will check if the user has specified bend edges.
User can restrict which edges
     will be considered as possible bend edge by setting the name
of those edges.
     **********   **********   **********   **********   **********
********** ********** ********** **********
*/
     long face1_has_user_defined_bend_edges = 0 ; // the number of
user-speicifed bend edges in face1
     long face2_has_user_defined_bend_edges = 0 ; // the number of
user-speicifed bend edges in face2
     long face1_line_count = 0, face2_line_count = 0 ;
     long  line_count  ;  //  sum  of  lines  in  faces  1  and  2
```

APPENDIX C

```
participating in the sweep.
     BM_LOOP *holes ;
     BM_EDGE *edges ;
     for  (edges  =  bloop1->get_first_edge()  ;  edges  ;  edges  =
(BM_EDGE *) edges->next()) {
          if (! edges->is(BM_ENTITY_TYPE_LINE)) continue ;
          if    (edges->get_name()    ==    face2.get_idx())
face1_has_user_defined_bend_edges++ ;
          face1_line_count++ ;
          }
     for  (holes  =  body1->get_first_hole()  ;  holes  ;  holes  =
(BM_LOOP *) holes->next()) {
          for (edges = holes->get_first_edge() ; edges ; edges =
(BM_EDGE *) edges->next()) {
               if (! edges->is(BM_ENTITY_TYPE_LINE)) continue ;
               if    (edges->get_name()    ==    face2.get_idx())
face1_has_user_defined_bend_edges++ ;
               face1_line_count++ ;
               }
          }
     for  (edges  =  bloop2->get_first_edge()  ;  edges  ;  edges  =
(BM_EDGE *) edges->next()) {
          if (! edges->is(BM_ENTITY_TYPE_LINE)) continue ;
          if    (edges->get_name()    ==    face1.get_idx())
face2_has_user_defined_bend_edges++ ;
          face2_line_count++ ;
          }
     for  (holes  =  body2->get_first_hole()  ;  holes  ;  holes  =
(BM_LOOP *) holes->next()) {
          for (edges = holes->get_first_edge() ; edges ; edges =
(BM_EDGE *) edges->next()) {
               if (! edges->is(BM_ENTITY_TYPE_LINE)) continue ;
               if    (edges->get_name()    ==    face1.get_idx())
face2_has_user_defined_bend_edges++ ;
               face2_line_count++ ;
               }
          }
     // if there are no lines, we are successfully done
     if  (face1_has_user_defined_bend_edges)  face1_line_count  =
face1_has_user_defined_bend_edges ;
     if  (face2_has_user_defined_bend_edges)  face2_line_count  =
face2_has_user_defined_bend_edges ;
     if (face1_line_count < 1 || face2_line_count < 1) return 1 ;
     line_count = face1_line_count + face2_line_count ;

/*
     **********  **********  **********  **********  **********
********** ********** ********** **********
     Allocate memory.
```

APPENDIX C

```
     ********** ********** ********** ********** **********
********** ********** ********** **********
*/
     if (NULL == (line_pointers = new BM_LINE*[line_count])) return
0 ;
     if (NULL == (line_start_coordinates = new double[line_count]))
{
          delete [] line_pointers ;
          }

/*
     ********** ********** ********** ********** **********
********** ********** ********** **********
     First, fill in the line pointers array.
     If required, take only user-specified edges.
     ********** ********** ********** ********** **********
********** ********** ********** **********
*/
     i = 0 ;
     for (edges = bloop1->get_first_edge() ; edges ; edges =
(BM_EDGE *) edges->next()) {
          if (! edges->is(BM_ENTITY_TYPE_LINE)) continue ;
          if (face1_has_user_defined_bend_edges &&
edges->get_name() != face2.get_idx()) continue ;
          line_pointers[i++] = (BM_LINE *) edges ;
          }
     for (holes = body1->get_first_hole() ; holes ; holes =
(BM_LOOP *) holes->next()) {
          for (edges = holes->get_first_edge() ; edges ; edges =
(BM_EDGE *) edges->next()) {
               if (! edges->is(BM_ENTITY_TYPE_LINE)) continue ;
               if (face1_has_user_defined_bend_edges &&
edges->get_name() != face2.get_idx()) continue ;
               line_pointers[i++] = (BM_LINE *) edges ;
               }
          }
     for (edges = bloop2->get_first_edge() ; edges ; edges =
(BM_EDGE *) edges->next()) {
          if (! edges->is(BM_ENTITY_TYPE_LINE)) continue ;
          if (face2_has_user_defined_bend_edges &&
edges->get_name() != face1.get_idx()) continue ;
          line_pointers[i++] = (BM_LINE *) edges ;
          }
     for (holes = body2->get_first_hole() ; holes ; holes =
(BM_LOOP *) holes->next()) {
          for (edges = holes->get_first_edge() ; edges ; edges =
(BM_EDGE *) edges->next()) {
               if (! edges->is(BM_ENTITY_TYPE_LINE)) continue ;
               if (face2_has_user_defined_bend_edges &&
```

APPENDIX C

```
edges->get_name() != face1.get_idx()) continue ;
                line_pointers[i++] = (BM_LINE *) edges ;
                }
        }

/*
     **********  **********  **********  **********  **********
********** ********** ********** **********
     Sort the array of lines by X-coordinate, then by Z-coordinate
and then by Y.
     **********  **********  **********  **********  **********
********** ********** ********** **********
*/
{ // this is a block of code for sorting the array
     // first, construct the array of points and lines associated
with them
     for (i = 0 ; i < line_count ; i++) {
          p                                                        =
BM_get_greater_point_by_XZY((line_pointers[i])->get_startpt(),(li
ne_pointers[i])->get_endpt()) ;
          line_start_coordinates[i] = p.X() ;
          }
     // sort by X
     DBM_QuickSort_double(line_start_coordinates, line_count, (long
*) line_pointers) ;

     // sort by Z
     double first_in_set_Z = line_start_coordinates[0] ;
     long set_Z_size = 1, first_in_set_Z_idx = 0 ;
     p                                                             =
BM_get_greater_point_by_XZY((line_pointers[0])->get_startpt(),(li
ne_pointers[0])->get_endpt()) ;
     line_start_coordinates[0] = p.Z() ;
     for (i = 1 ; i <= line_count ; i++) {
          if (i < line_count) {
               p                                                   =
BM_get_greater_point_by_XZY((line_pointers[i])->get_startpt(),(li
ne_pointers[i])->get_endpt()) ;
               if (line_start_coordinates[i] == first_in_set_Z) {
                    set_Z_size++ ;
                    line_start_coordinates[i] = p.Z() ;
                    continue ;
                    }
               }
          // else we have passed the end of the X-sequence

          i f     ( s e t _ Z _ s i z e     >     1 )
DBM_QuickSort_double(line_start_coordinates + first_in_set_Z_idx,
               set_Z_size,    (long    *)    line_pointers    +
```

APPENDIX C

```
first_in_set_Z_idx) ;

          // sort by Y
          long set_Z_end = first_in_set_Z_idx + set_Z_size ;
          d o u b l e   f i r s t _ i n _ s e t _ Y   =
line_start_coordinates[first_in_set_Z_idx] ;
          long   set_Y_size   =   1,   first_in_set_Y_idx   =
first_in_set_Z_idx ;
          B    M    _    P    O    I    N    T
pY(BM_get_greater_point_by_XZY((line_pointers[first_in_set_Z_idx]
)->get_startpt(),(line_pointers[first_in_set_Z_idx])->get_endpt()))
;
          line_start_coordinates[first_in_set_Z_idx] = pY.Y() ;
          for (j = first_in_set_Z_idx + 1 ; j <= set_Z_end ; j++)
{
               if (j < set_Z_end) {
                    p                                  Y   =
BM_get_greater_point_by_XZY((line_pointers[j])->get_startpt(),(li
ne_pointers[j])->get_endpt()) ;
                    if   (line_start_coordinates[j]   ==
first_in_set_Y) {
                         set_Y_size++ ;
                         line_start_coordinates[j] = pY.Y() ;
                         continue ;
                         }
                    }
               // else, we have passed the end of the Z-sequence

               i f   ( s e t _ Y _ s i z e   >   1 )
DBM_QuickSort_double(line_start_coordinates + first_in_set_Y_idx,
                    set_Y_size,   (long   *)   line_pointers   +
first_in_set_Y_idx) ;

               if (j < set_Z_end) {
                    set_Y_size = 1 ;
                    first_in_set_Y_idx = j ;
                    first_in_set_Y = line_start_coordinates[j] ;
                    line_start_coordinates[j] = pY.Y() ;
                    }
               }

          if (i < line_count) {
               set_Z_size = 1 ;
               first_in_set_Z_idx = i ;
               first_in_set_Z = line_start_coordinates[i] ;
               line_start_coordinates[i] = p.Z() ;
               }
          }
} // end of the block of code for sorting the array
```

APPENDIX C

```
/*
     **********   **********   **********   **********   **********
********** ********** ********** **********
     We don't need line_start_coordinates any more. Delete it.
     **********   **********   **********   **********   **********
********** ********** ********** **********
*/
     if (line_start_coordinates) {
          delete [] line_start_coordinates ;
          line_start_coordinates = NULL ;
          }

/*
     **********   **********   **********   **********   **********
********** ********** ********** **********
     **********   **********   **********   **********   **********
********** ********** ********** **********

     Main loop. Sweep the two faces.
     Always keep track of open lines (lines whose startpoint we
have seen,
     but have not yet seen an endpoint - actually, not
start-and-end-points, but endpoints larger
     and smaller with respect to XZY ordering).

     Initially the set of open lines is empty.

     During every iteration we will do :

          - remove all lines that were open, but should be closed
now,
          - check if the current line overlaps with open lines,
          - add this line to the set of open lines

     **********   **********   **********   **********   **********
********** ********** ********** **********
     **********   **********   **********   **********   **********
********** ********** ********** **********
*/
     // these represent lists of contacts
     BM_LINKED_LIST_NODE *face1_list, *face2_list ;
     BM_LINKED_LIST_NODE *last_face1_list, *last_face2_list ;
     BM_LINKED_LIST_NODE *left, *right ;
     BM_LINKED_LIST_NODE *new_left = NULL, *new_right = NULL ;
     BM_LINE *line_in_left, *line_in_right ;

     // these are the two lines we will be comparing
     BM_2D_BODY *face_of_line1, *face_of_line2 ;
     BM_LINE *line_in_face1, *line_in_face2 ;
```

APPENDIX C

```
     BM_LINE *line ;
     double k, dotp ;

     BM_POINT p_open ;
     BM_VECTOR v ;

     long num_of_contacts = 0 ;
     long open_line_idx ;

     for (i = line_count - 1 ; i >= 0 ; i--) {
          // initially face_of_line1 is the face of the current
line.
          // however, later we will sort the current-sweep-line and
current-open-line pointers.
          face_of_line1 =
((line_pointers[i])->get_loop())->get_2D_body() ;
          p =
BM_get_greater_point_by_XZY((line_pointers[i])->get_startpt(),(li
ne_pointers[i])->get_endpt()) ;

          // compare this current line against all open lines in
order to detect overlaps, ie. bendlines.
          for (open_line_idx = i + 1 ; open_line_idx < line_count
; open_line_idx++) {
               line = line_pointers[open_line_idx] ;
               if (NULL == line) {
                    // time-saving trick. if this is the last
pointer, there is no need to try it again.
                    // reduce the index.
                    if (open_line_idx == line_count - 1) {
                         --line_count ;
                         break ;
                         }
                    continue ;
                    }

               // ********** ********** ********** **********
**********
               // check if this open line should really be removed.
               // it should be removed if its endpoint is larger
than p (ie. the
               // startpoint of this line).
               // ********** ********** ********** **********
**********
               p_open =
BM_get_smaller_point_by_XZY(line->get_startpt(),line->get_endpt())
;
               if (BM_compare_points_by_XZY(p_open,p)) {
                    // time-saving trick.
```

APPENDIX C

```
                        // if the line we are removing from the open
list is the last one, reduce the index
                        // instead of setting the pointer to NULL. next
time we don't even try this element
                        // in the array, because it would be beyond the
boundary
                        if (open_line_idx == line_count - 1) {
                             --line_count ;
                             break ;
                             }
                        line_pointers[open_line_idx] = NULL ;
                        continue ;
                        }

                  //  **********  **********  **********  **********
**********
                  // first, check if both lines are in the same face.
if yes, skip it.
                  //  **********  **********  **********  **********
**********
                  face_of_line2 = (line->get_loop())->get_2D_body() ;
                  if (face_of_line1 == face_of_line2) continue ;

                  //  **********  **********  **********  **********
**********
                  // Check if this line and the open line overlap.
                  //  **********  **********  **********  **********
**********
                  // First check if the startpoint is on the (open)
line segment.
                  if (! line->is_point_on_line(p,&k)) continue ;
                  // Note that parameter k has to be in [0,1] now,
because
                  // the line "line" is open still, ie. it startpoint
is "before" p
                  // and endpoint is "after" p.
                  // Now check if vectors are parallel.
                  v = (line->get_v()) * ((line_pointers[i])->get_v())
;
                  if (v.Len() > BM_PRECISION) continue ;

                  // Last thing, it could be that only endpoints of
the lines overlap.
                  d o t p   =   ( l i n e - > g e t _ v ( ) )    %
((line_pointers[i])->get_v()) ;
                  if (dotp < 0.0) { // lines are opposite
                        //    startpoint-startpoint/endpoint-endpoint
should not match
                        i f    ( ( l i n e - > g e t _ s t a r t p t ( ) )    = =
```

APPENDIX C

```
((line_pointers[i])->get_startpt()) ||
                    (line->get_endpt())    ==
((line_pointers[i])->get_endpt())) continue ;
                }
            else { // lines have the same direction
                //    startpoint-endpoint/endpoint-startpoint
should not match
                if   ((line->get_endpt())    ==
((line_pointers[i])->get_startpt()) ||
                    (line->get_startpt())    ==
((line_pointers[i])->get_endpt())) continue ;
                }

            // **********  **********  **********  **********
**********
            // Ok, these two lines overlap.
            // First, sort lines according to which face they
are in
            // **********  **********  **********  **********
**********
            if   (&face1   ==   (BM_FACE   *)
face_of_line1->get_3D_body()) {
                line_in_face1 = line_pointers[i] ;
                line_in_face2 = line ;
                p_face1 = p ;
                p_face2    =
BM_get_greater_point_by_XZY(line->get_startpt(),line->get_endpt())
;
                }
            else {
                line_in_face1 = line ;
                line_in_face2 = line_pointers[i] ;
                p_face1    =
BM_get_greater_point_by_XZY(line->get_startpt(),line->get_endpt())
;
                p_face2 = p ;
                }

            // **********  **********  **********  **********
**********
            // Scan all known contacts and check if this contact
should be
            // added to an existing contact
            // **********  **********  **********  **********
**********
            for  (j  =  0,  last_face2_list  =  NULL  ;  j  <
num_of_contacts ; j++) {
                if (NULL == last_face2_list) {
                    last_face1_list = contacts ;
```

APPENDIX C

```
                    last_face2_list = last_face1_list->next()
;
                    }
               else {
                    last_face1_list = last_face2_list->next()
;
                    last_face2_list = last_face1_list->next()
;
                    }
               left    =    (BM_LINKED_LIST_NODE    *)
last_face1_list->get_obj() ;
               right    =    (BM_LINKED_LIST_NODE    *)
last_face2_list->get_obj() ;
               line_in_left = (BM_LINE *) left->get_obj() ;
               line_in_right = (BM_LINE *) right->get_obj() ;

               // Check if the line of this existing contact
overlaps the new contact.
               // condition is : point on the line and vectors
are parallel.
               i              f    (              !
line_in_left->is_point_on_line(p_face1,&k)) continue ;
               v    =    (line_in_left->get_v())    *
(line_in_face1->get_v()) ;
               if (v.Len() > BM_PRECISION) continue ;

               // Check that lines in face1 and face2 and
exact extensions of left and right in this contact
               // this is because we want every contact in the
list of contacts to be a "closed" contact
               // note it could be that one of the new lines
in already in this contact.
               // then we don't need to check.
               if (line_in_left != line_in_face1) {
                    dotp    =    (line_in_left->get_v())    %
(line_in_face1->get_v()) ;
                    if (dotp < 0.0) { // lines are opposite
                         // startpoints must match
                         if ((line_in_left->get_startpt()) !=
(line_in_face1->get_startpt()) &&
                              (line_in_left->get_endpt()) !=
(line_in_face1->get_endpt())) continue ;
                         }
                    else { // lines have the same direction
                         // endpoints must match
                         if ((line_in_left->get_endpt()) !=
(line_in_face1->get_startpt()) &&
                              (line_in_left->get_startpt()) !=
(line_in_face1->get_endpt())) continue ;
```

APPENDIX C

```
                              }
                         }
                    if (line_in_right != line_in_face2) {
                         dotp   =   (line_in_right->get_v())   %
(line_in_face2->get_v()) ;
                         if (dotp < 0.0) { // lines are opposite
                              // startpoints must match
                              if ((line_in_right->get_startpt()) !=
(line_in_face2->get_startpt()) &&
                                   (line_in_right->get_endpt()) !=
(line_in_face2->get_endpt())) continue ;
                              }
                         else { // lines have the same direction
                              // endpoints must match
                              if ((line_in_right->get_endpt()) !=
(line_in_face2->get_startpt()) &&
                                   (line_in_right->get_startpt())
!= (line_in_face2->get_endpt())) continue ;
                              }
                         }

                    // everything is fine. add lines to this
contact.
                    // note that is could be that the line is
already in the contact.
                    if (line_in_left != line_in_face1) {
                         if   (NULL   ==   (new_left   =   new
BM_LINKED_LIST_NODE(line_in_face1,NULL,left))) goto failure ;
                         last_face1_list->set_obj((BM_BASIC    *)
new_left) ;
                         new_left = NULL ;
                         }
                    if (line_in_right != line_in_face2) {
                         if   (NULL   ==   (new_right   =   new
BM_LINKED_LIST_NODE(line_in_face2,NULL,right))) goto failure ;
                         last_face2_list->set_obj((BM_BASIC    *)
new_right) ;
                         new_right = NULL ;
                         }

                    // now we have to break out of here. we added
this contact to an existing contact.
                    break ;
                    }
               // check if we checked all contacts and could not
find a match
               if (j < num_of_contacts) continue ;

               //  **********  **********  **********  **********
```

APPENDIX C

```
**********
               // Create a new contact.
               //  **********  **********  **********  **********
**********
               // First, create nodes for both lines.
               if (NULL == (left = new
BM_LINKED_LIST_NODE(line_in_face1))) goto failure ;
               if (NULL == (right = new
BM_LINKED_LIST_NODE(line_in_face2))) {
                    delete left ;
                    goto failure ;
                    }
               // Create lists for both sides of the contact.
               if (NULL == (face2_list = new
BM_LINKED_LIST_NODE((BM_BASIC *) right))) {
                    delete left ;
                    delete right ;
                    goto failure ;
                    }
               if (NULL == (face1_list = new
BM_LINKED_LIST_NODE((BM_BASIC *) left,NULL,face2_list))) {
                    delete left ;
                    delete right ;
                    delete face2_list ;
                    goto failure ;
                    }
               // add the new contact to the list of contacts
               if (num_of_contacts < 1) contacts = face1_list ;
               else last_face2_list->add_after(face1_list) ;

               ++num_of_contacts ;
               }

          // we use i to index line_pointers[] array.
          // since i will be decremented shortly, line_pointers[i]
will be "implictly" put on
          // the open list of sweep lines.
          }

/*
     **********  **********  **********  **********  **********
********** ********** ********** **********
     free memory if necessary
     **********  **********  **********  **********  **********
********** ********** ********** **********
*/
     if (line_start_coordinates) delete [] line_start_coordinates
;
     if (line_pointers) delete [] line_pointers ;
```

APPENDIX C

```
     // finally, create a node for the number of contacts
     if (NULL == (left = new BM_LINKED_LIST_NODE((BM_BASIC *)
num_of_contacts,NULL,contacts))) goto failure ;
     *list_of_contacts = left ;

     return 1 ;

failure :

     // free memory if necessary
     if (line_start_coordinates) delete [] line_start_coordinates
;
     if (line_pointers) delete [] line_pointers ;

     BM_LINKED_LIST_NODE *list, *next_list ;
     BM_LINKED_LIST_NODE *line_in_list, *next_line_in_list ;
     for (list = contacts ; list ; list = next_list) {
          next_list = list->next() ;
          for   (line_in_list    =    (BM_LINKED_LIST_NODE    *)
list->get_obj() ;
               line_in_list ; line_in_list = next_line_in_list) {
               next_line_in_list = line_in_list->next() ;
               delete line_in_list ;
               }
          delete list ;
          }

     if (new_left) delete new_left ;
     if (new_right) delete new_right ;

     return 0 ;
}


/*
     This function scans the list of contacts between two faces
(most likely created
     by BM_compute_all_face_to_face_contacts(...)) and removes all,
but the largest contact.

     Basically, it "filters" the list of contacts and removes those
contacts that do not
     belong to the longest contact. Note that, in general, the
longest contact is a list
     of simultaneous bendlines. Thus, the basic structure of the
contact list remains the same.
     For example, the first node in the list will be the number of
contacts in the longest
     contacts.
```

APPENDIX C

```
     This function also returns the length of the longest contact.

     In this function we will be using the fact that every contact
is "closed",
     such that in the list of lines in the contact, an endpoint of
a line is equal to the
     startpoint of the next line.
     This way the only tricky part is to compute the length of the
overlapping part in the
     first and last line. Then we just add the length of the lines
in the middle of the list.

     See previous function.
*/

static double
BM_keep_largest_contact_remove_the_rest(BM_LINKED_LIST_NODE
**list_of_contacts)
{
     long i, j ;

     if (NULL == list_of_contacts) return 0.0 ;
     BM_LINKED_LIST_NODE *contacts = *list_of_contacts ;
     if (NULL == contacts) return 0.0 ;

     // some of the most important parameters we compute in this
function.
     double length_of_largest_contact = 0.0 ;
     long largest_contact_i = -1 ;

     // we need to keep track of the lengths of contacts.
     // we need to store the length of every contact.
     //
     // NOTICE : here we try to save some heap allocation/release
time by using a pre-allocated
     // array if the list of contacts is not very long.
     //
     static double static_contact_len_array[32] ;
     double *dynamic_contact_len_array = NULL ;
     double *contact_len_array = NULL ;

     // get the number of contacts
     long num_of_contacts = (long) contacts->get_obj() ;
     contacts = contacts->next() ;

     // if no contacts, delete the entire list
     if (num_of_contacts < 1) {
          // there is no list. delete node 0 as well.
          delete *list_of_contacts ;
```

APPENDIX C

```
          *list_of_contacts = NULL ;
          return 0.0 ;
          }

     // allocate memory for the contact length array
     if (num_of_contacts <= 32) {
          contact_len_array = static_contact_len_array ;
          }
     else {
          if    (NULL    ==    (dynamic_contact_len_array    =    new
double[num_of_contacts])) goto computation_done__clean_up ;
          contact_len_array = dynamic_contact_len_array ;
          }

     // Scan all known contacts and compute the length of every
contact.
     // later we use these values to find the longest contact
(which could be a simultaneous bendline).
     BM_LINKED_LIST_NODE *last_face1_list, *last_face2_list ;
     BM_LINKED_LIST_NODE *line_in_list ;
     double k ;
     double first_k1, first_k2 ;
     double last_k1, last_k2 ;
     last_face2_list = NULL ;
     for (i = 0 ; i < num_of_contacts ; i++) {
          if (NULL == last_face2_list) last_face1_list = contacts
;
          else last_face1_list = last_face2_list->next() ;
          last_face2_list = last_face1_list->next() ;

          BM_LINKED_LIST_NODE  *left  =  (BM_LINKED_LIST_NODE  *)
last_face1_list->get_obj() ;
          BM_LINKED_LIST_NODE  *right  =  (BM_LINKED_LIST_NODE  *)
last_face2_list->get_obj() ;
          BM_LINE *first_line_in_left = (BM_LINE *) left->get_obj()
;
          BM_LINE    *first_line_in_right    =    (BM_LINE    *)
right->get_obj() ;

          // here is what we do. we know that the first lines in
left and right have to have
          // an overlapping part. we compute overlapping parameters
k1 and k2 with respect to the
          // first line on the left, between the first lines.
          // the idea is that one of the points that corresponds to
these parameters (k1 and k2)
          // is the extreme point of the contact. we just don't
know yet which one.
          // then we find the last points in both lists. we know
```

APPENDIX C

```
that they must have non-empty
        // overlapping part as well. we compute k1 and k2 for
these two lines as well.
        // then we compate k1,k2 for the first and last pairs to
find the two
        // extreme points of the contact. distance between them
is the length of the contact.

        // compute k1 and k2 for the first lines.

first_line_in_left->is_point_on_line(first_line_in_right->get_sta
rtpt(),&first_k1) ;

first_line_in_left->is_point_on_line(first_line_in_right->get_end
pt(),&first_k2) ;
        // we only want k1 and k2 within the first line
        if (first_k1 < 0.0) first_k1 = 0.0 ;
        else if (first_k1 > 1.0) first_k1 = 1.0 ;
        if (first_k2 < 0.0) first_k2 = 0.0 ;
        else if (first_k2 > 1.0) first_k2 = 1.0 ;
        // sort k1 and k2
        if (first_k1 > first_k2) { k = first_k1 ; first_k1 =
first_k2 ; first_k2 = k ; }

        // find the last line in the left.
        for (line_in_list = left->next() ; line_in_list ;
line_in_list = line_in_list->next()) {
                left = line_in_list ;
                }
        // "left" is the last node in the left now.
        BM_LINE *last_line_in_left = (BM_LINE *) left->get_obj()
;

        // find the last line in the right.
        for (line_in_list = right->next() ; line_in_list ;
line_in_list = line_in_list->next()) {
                right = line_in_list ;
                }
        // "right" is the last node in the left now.
        BM_LINE *last_line_in_right = (BM_LINE *)
right->get_obj() ;

        // compute k1 and k2 for the first lines.

last_line_in_left->is_point_on_line(last_line_in_right->get_start
pt(),&last_k1) ;

last_line_in_left->is_point_on_line(last_line_in_right->get_endpt
(),&last_k2) ;
```

APPENDIX C

```
        // we only want k1 and k2 within the last line
        if (last_k1 < 0.0) last_k1 = 0.0 ;
        else if (last_k1 > 1.0) last_k1 = 1.0 ;
        if (last_k2 < 0.0) last_k2 = 0.0 ;
        else if (last_k2 > 1.0) last_k2 = 1.0 ;
        // note that we have compute last k1 and k2 with respect
to the last line in the left.
        // we really need last k1 and k2 with respect to the
first line in the left.
        BM_POINT    lastk1(last_line_in_left->get_startpt()    +
last_k1*(last_line_in_left->get_v())) ;
        BM_POINT    lastk2(last_line_in_left->get_startpt()    +
last_k2*(last_line_in_left->get_v())) ;
        first_line_in_left->is_point_on_line(lastk1,&last_k1) ;
        first_line_in_left->is_point_on_line(lastk2,&last_k2) ;
        // sort k1 and k2
        if (last_k1 > last_k2) { k = last_k1 ; last_k1 = last_k2
; last_k2 = k ; }

        // now we need to take the extreme points of these two
pairs
        if (first_k1 > last_k1) first_k1 = last_k1 ;
        if (first_k2 < last_k2) first_k2 = last_k2 ;
        contact_len_array[i]    =    (first_k2    -
first_k1)*(first_line_in_left->get_len()) ;
        }

    // find the longest contact.
    // the main feature here is to check for simultaneous
bendlines
    last_face2_list = NULL ;
    for (i = 0 ; i < num_of_contacts ; i++) {
        if (NULL == last_face2_list) last_face1_list = contacts
;
        else last_face1_list = last_face2_list->next() ;
        last_face2_list = last_face1_list->next() ;

        // make sure we don't accept contacts that have zero
length.
        if (contact_len_array[i] < BM_PRECISION) continue ;

        BM_LINKED_LIST_NODE  *left  =  (BM_LINKED_LIST_NODE  *)
last_face1_list->get_obj() ;
        BM_LINE *first_line_in_left = (BM_LINE *) left->get_obj()
;

        // check if this contact is part of a simultaneous
bendline.
        // if yes, add its length to the first bendline in the
```

APPENDIX C

```
simultaneous bendline and
          // set this length here to -1.0, so that we know it later
          BM_LINKED_LIST_NODE   *temp_last_face1_list,
*temp_last_face2_list = NULL ;
          for (j = 0 ; j < i ; j++) {
               if (contact_len_array[i] < BM_PRECISION) continue ;
// already part of something else

               if   (NULL   ==   temp_last_face2_list)
temp_last_face1_list = contacts ;
               else   temp_last_face1_list   =
temp_last_face2_list->next() ;
               temp_last_face2_list = temp_last_face1_list->next()
;

               BM_LINKED_LIST_NODE   *temp_left   =
(BM_LINKED_LIST_NODE *) temp_last_face1_list->get_obj() ;
               BM_LINE  *temp_first_line_in_left  =  (BM_LINE  *)
temp_left->get_obj() ;

               // check if the lines overlap
               i                    f    (                    !
first_line_in_left->is_point_on_line(temp_first_line_in_left->get
_startpt(),NULL)) continue ;
               i                    f    (                    !
first_line_in_left->is_point_on_line(temp_first_line_in_left->get
_endpt(),NULL)) continue ;

               // ok, they overlap
               // add the length to the first in simultaneous bend
and set this to -1.0
               contact_len_array[j] += contact_len_array[i] ;
               contact_len_array[i] = -1.0 ;
               break ;
               }
          }
     // in this loop we actually find the largest
     for (i = 0 ; i < num_of_contacts ; i++) {
          // check to see if this new contact is the largest
          if (length_of_largest_contact < contact_len_array[i]) {
               length_of_largest_contact = contact_len_array[i] ;
               largest_contact_i = i ;
               }
          }

computation_done__clean_up :

     // remove all other contacts that are not largest
     BM_LINKED_LIST_NODE   *next_last_face1_list,
```

APPENDIX C

```
*next_last_face2_list = NULL ;
     BM_LINKED_LIST_NODE    *largest_contact_list_f1    =    NULL,
*largest_contact_list_f2 ;
     last_face1_list = contacts ;
     last_face2_list = last_face1_list->next() ;
     for (i = j = 0 ; i < num_of_contacts ; i++) {
          next_last_face1_list = last_face2_list->next() ;
          if    (next_last_face1_list)    next_last_face2_list    =
next_last_face1_list->next() ;
          else next_last_face2_list = NULL ;

          // make sure we don't delete the largest contact
          // note : we skip two lists, face1 list and face2 list
          if (contact_len_array[i] < 0.0 || largest_contact_i == i)
{
               if    (NULL    ==    largest_contact_list_f1)
largest_contact_list_f1 = last_face1_list ;
               e               l               s               e
largest_contact_list_f2->add_after(last_face1_list) ;
               largest_contact_list_f2 = last_face2_list ;

               // count the number of contacts
               ++j ;

               last_face1_list = next_last_face1_list ;
               last_face2_list = next_last_face2_list ;
               continue ;
               }

          // ok, this is not the largest contact, delete both face1
and face2 sides of the contact
          BM_LINKED_LIST_NODE *next_line_in_list ;
          for    (line_in_list    =    (BM_LINKED_LIST_NODE    *)
last_face1_list->get_obj() ;
               line_in_list ; line_in_list = next_line_in_list) {
               next_line_in_list = line_in_list->next() ;
               delete line_in_list ;
               }
          for    (line_in_list    =    (BM_LINKED_LIST_NODE    *)
last_face2_list->get_obj() ;
               line_in_list ; line_in_list = next_line_in_list) {
               next_line_in_list = line_in_list->next() ;
               delete line_in_list ;
               }
          delete last_face1_list ;
          delete last_face2_list ;

          last_face1_list = next_last_face1_list ;
          last_face2_list = next_last_face2_list ;
```

APPENDIX C

```
          }
     // end the contact list with a NULL pointer
     if (largest_contact_list_f2)
largest_contact_list_f2->add_after(NULL) ;

     // write the number of contacts left in node 0. also, set the
correct beginning of the list.
     // however, if there is no contact, erase the entire list.
     if (NULL == largest_contact_list_f1) {
          // there is no list. delete node 0 as well.
          delete *list_of_contacts ;
          *list_of_contacts = NULL ;
          }
     else {
          (*list_of_contacts)->set_obj((BM_BASIC *) j) ;
          (*list_of_contacts)->add_after(largest_contact_list_f1)
;
          }

     // delete dynamic_contact_len_array if it was allocated
     if (dynamic_contact_len_array) delete []
dynamic_contact_len_array ;

     return length_of_largest_contact ;
}


/*
     This function is used only by
          static int BM_create_bendline(...)
     as a subroutine.

     a big problem now is that we have deleted some lines.
     the problem is that if we have a simultaneous bend, other
contacts could still be refering
     to these lines we just deleted.
     we have to go and check that, and if true, replace pointers to
the lines we have changed/deleted
     with valid references.

     namely, lines that are affected are the first and last lines
in the left.
     potentially references to them need to be replaced with
references to l1 and l3.
*/

static void check_references_in_remaining_contacts(
     BM_LINKED_LIST_NODE *side_1, // current list we are working
with
```

APPENDIX C

```
     BM_LINKED_LIST_NODE *side_2, // list on the other side of the
contact
     BM_LINE *line1,
     BM_LINE *line3, // these are old references, to be checked if
still valid
     BM_LINE *l1,
     BM_LINE *l3 // l1 and l3 are the new references
     )
{
     BM_LINKED_LIST_NODE *side1 = side_1, *side2 = side_2 ;

process_next_contact :

     // find the beginnings of lists in the next contact
     BM_LINKED_LIST_NODE *contact_list ;
     if (NULL == (contact_list = side1->next())) return ; // done,
no more lists
     if (NULL == (side1 = contact_list->next())) return ; // done,
no more lists
     if (NULL == (contact_list = side2->next())) return ; // done,
no more lists
     if (NULL == (side2 = contact_list->next())) return ; // done,
no more lists

     // now we need to check the beginning of this contact and the
end of this contact exactly the same way.
     // we describe checking the beginning, check the end is the
same.
     // whenever we find a match, we can go to the next list (ie.
don't have to continue with the
     // current list).
     //
     // we take first lines is side1 and side2. if the first line
in side1 is either line1 or line3,
     // we check which of l1 and l3 overlaps the first line in
side2. we know that exactly one of
     // l1 and l3 has to overlap. then we replace the reference to
line1/line3 with a reference to the
     // one of l1/l3 that overlaps the first line in side2.

     BM_LINKED_LIST_NODE *start_side1 = (BM_LINKED_LIST_NODE *)
side1->get_obj() ;
     BM_LINKED_LIST_NODE *start_side2 = (BM_LINKED_LIST_NODE *)
side2->get_obj() ;

     // check the beginning of the contact
     BM_LINE *line_in_side1 = (BM_LINE *) start_side1->get_obj() ;
     BM_LINE *line_in_side2 = (BM_LINE *) start_side2->get_obj() ;
     if (line_in_side1 == line1 || line_in_side1 == line3) {
```

APPENDIX C

```
          if (l1) { // check if l1 overlaps first line in side2
               i                                                      f
(line_in_side2->is_point_on_line_segment(l1->get_startpt(), NULL)
||

line_in_side2->is_point_on_line_segment(l1->get_endpt(), NULL)) {
                    start_side1->set_obj(l1) ;
                    goto process_next_contact ;
                    }
               }
          if (l3) { // check if l3 overlaps first line in side2
               i                                                      f
(line_in_side2->is_point_on_line_segment(l3->get_startpt(), NULL)
||

line_in_side2->is_point_on_line_segment(l3->get_endpt(),   NULL))
start_side1->set_obj(l3) ;
               }
          goto process_next_contact ;
          }

     BM_LINKED_LIST_NODE *line_in_list, *prev_line_in_list ;
     // find the last line in side2.
     for  (line_in_list  =  start_side2->next()  ;  line_in_list  ;
line_in_list = line_in_list->next()) {
          prev_line_in_list = line_in_list ;
          }
     // "prev_line_in_list" is the last node in the left now.
     line_in_side2 = (BM_LINE *) prev_line_in_list->get_obj() ;
     // find the last line in side1.
     for  (line_in_list  =  start_side1->next()  ;  line_in_list  ;
line_in_list = line_in_list->next()) {
          prev_line_in_list = line_in_list ;
          }
     // "prev_line_in_list" is the last node in side1 now.
     line_in_side1 = (BM_LINE *) prev_line_in_list->get_obj() ;

     // check the end of the contact
     if (line_in_side1 == line1 || line_in_side1 == line3) {
          if (l1) { // check if l1 overlaps first line in side2
               i                                                      f
(line_in_side2->is_point_on_line_segment(l1->get_startpt(), NULL)
||

line_in_side2->is_point_on_line_segment(l1->get_endpt(), NULL)) {
                    prev_line_in_list->set_obj(l1) ;
                    goto process_next_contact ;
                    }
               }
```

APPENDIX C

```
        if (l3) { // check if l3 overlaps first line in side2
                i                                                f
(line_in_side2->is_point_on_line_segment(l3->get_startpt(), NULL)
||

line_in_side2->is_point_on_line_segment(l3->get_endpt(),   NULL))
prev_line_in_list->set_obj(l3) ;
                }
        }
     goto process_next_contact ;
}


/*
     This function will create a simple (regular) bendline between
the two faces,
     based on the contact list given as input. Once done, it will
erase the contact list.

     In this function we assume that edges of faces are sorted
according to the left-hand side rule.

     This function returns TRUE iff everything is fine.

     NB! the key here is not to invalidate anything in the part as
we create a new bendline.
     In order to accomplish that, we will create the bend op is
isolation (without the bendline), and
     then later attach it to the bendline.
     Also, we will create topology only after the bendline is built
and added to the part.

     Note that this function creates bendline information that is
consistent with face1 (mainly, face1 normal).
     However, face2 normal can be inconsistent with this
information, but that has to be fixed later.
*/

static int BM_create_bendline(BM_PART & part, BM_LINKED_LIST_NODE
**contact, BM_BENDLINE **bendline_created /* OUT */)
{
     // so far, nothing is created
     *bendline_created = NULL ;

     // it is possible, that we are building bendlines for the flat
version of the part.
     // if this variables is TRUE, we are building bendlines for
the 3D-version, otherwise for the flat.
     int using_3D_version = 1 ;
```

APPENDIX C

```
     // later we need to create a bendline centerline
     // these are the start-end points of the bendline centerline
     // note that they are points p1 and p2 on the face1 side of
the bendline
     // this is done because sometimes (when the bendline is not
bent) we use the
     // face1 surface as the bendline surface, ie. the bendline
orientation is defined
     // with respect to face1
     BM_POINT bendline_centerline_p1, bendline_centerline_p2 ;

     // contact list parameters
     BM_LINKED_LIST_NODE *line_in_list, *next_line_in_list ;
     BM_LINKED_LIST_NODE *left, *right ;
     int number_of_lists = (long) (*contact)->get_obj() ;
     BM_LINKED_LIST_NODE *contact_list = (*contact)->next() ;
     left = (BM_LINKED_LIST_NODE *) contact_list->get_obj() ;
     right = (BM_LINKED_LIST_NODE *)
(contact_list->next())->get_obj() ;
     BM_LINE *first_line_in_left = (BM_LINE *) left->get_obj() ;
     BM_LINE *first_line_in_right = (BM_LINE *) right->get_obj() ;
     BM_LINE *last_line_in_left ;
     BM_LINE *left_line, *right_line ;

     // get loops in both bodies
     BM_LOOP *face1_loop = first_line_in_left->get_loop() ;
     BM_LOOP *face2_loop = first_line_in_right->get_loop() ;
     if (NULL == face1_loop || NULL == face2_loop) return 0 ;

     // 2D-bodies of either face
     BM_2D_BODY *face1_body = face1_loop->get_2D_body() ;
     BM_2D_BODY *face2_body = face2_loop->get_2D_body() ;
     if (NULL == face1_body || NULL == face2_body) return 0 ;

     // get face1 and face2
     BM_FACE *face1 = (BM_FACE *) face1_body->get_3D_body() ;
     BM_FACE *face2 = (BM_FACE *) face2_body->get_3D_body() ;
     if (NULL == face1 || NULL == face2) return 0 ;

     // check whether we are using the flat version of the part, or
3D-version of the part.
     if   (face1->get_current_3D_version()   !=   face1_body   ||
face2->get_current_3D_version() != face2_body)
          using_3D_version = 0 ;

     // get surfaces of either faces
     BM_PLANE *face1_plane, *face2_plane ;
     face1_plane = (BM_PLANE *) face1_body->get_surface() ;
     face2_plane = (BM_PLANE *) face2_body->get_surface() ;
```

APPENDIX C

```
/*
     First we will do everything that has to do with the bendline
- create a bendline, create a
     bend op, set bend op parameters, create and set cylinder for
the bendline, set bendline centerline, etc.
*/
     // try to figure out whether we have a FRONT or BACK bend.
     B      M      _      V      E      C      T      O      R
v_face2_body((face2_plane->get_normal())*(first_line_in_right->ge
t_v())) ; // this vector
          // points towards the inside of face2 on the plane of
face2
     B      M      _      V      E      C      T      O      R
v_face2_normal(v_face2_body*(first_line_in_left->get_v()))  ;  //
this is the correct normal for face2 ?

     // compute the angle between faces
     double angle = v_face2_normal ^ (face1_plane->get_normal()) ;

     // compute bend type (FRONT/BACK)
     if (fabs(angle) <= BM_ANGLE_TOLERANCE) angle = PI ;
     else {
          BM_VECTOR v((face1_plane->get_normal())*v_face2_normal)
;
          if (v % (first_line_in_left->get_v()) > 0.0) angle = PI
+ angle ; // BACK bend
          else angle = PI - angle ; // FRONT bend
          }

     // create a new empty bendline and add it to the part
     BM_2D_BODY *new_auto_bendline = new BM_2D_BODY ;
     if (NULL == new_auto_bendline) return 0 ;
     BM_BENDLINE *new_bendline = new BM_BENDLINE(&part,
          using_3D_version ? NULL : new_auto_bendline,
          using_3D_version ? new_auto_bendline : NULL) ;
     if (NULL == new_bendline) {
          delete new_auto_bendline ;
          return 0 ;
          }

     // create a regular bend op for the bendline
     BM_BEND_OP_REGULAR   *new_bend_op    =    new
BM_BEND_OP_REGULAR(NULL,angle,0.0,0.0)  ;  //  don't  attach  to
bendline yet
     if (NULL == new_bend_op) {
          delete new_bendline ;
          return 0 ;
          }
     // attach this bend op to the bendline. this will just assign
```

APPENDIX C

```
the bend_op variable in the bendline
     new_bendline->attach_bend_op(new_bend_op) ;

     // create bendline surface. if angle is not 180 degrees, we
create a cylinder, otherwise a (face1) plane.
     BM_SURFACE *bend_surface ;
     if (fabs(angle - PI) <= BM_ANGLE_TOLERANCE) { // bendline not
being bent
          // note : face1 plane is the bendline surface
          bend_surface = new BM_PLANE(*face1_plane) ;
          new_bendline->Do_This_Bend(0) ; // this will invalidate
3D version as well. later we validate it.

          // set sense to the same as face1 sense
          new_auto_bendline->set_sense(face1_body->get_sense()) ;
          }
     else {
          // first, compute vx
          B    M    _    V    E    C    T    O    R
v_face1_body((face1_plane->get_normal())*(first_line_in_left->get
_v())) ;
          // v_face1_body points towards the inside of face1 on the
plane of face1
          v_face1_body.set_length(-1.0) ; // invert and normalize
          v_face2_body.set_length(-1.0) ; // invert and normalize

          // this is the vx vector of the bendline surface
          BM_VECTOR vx(v_face1_body + v_face2_body) ;

          b e n d _ s u r f a c e = n e w
BM_CYLINDER(first_line_in_left->get_startpt(),
first_line_in_left->get_endpt(), vx, 0.0) ;
          new_bendline->Do_This_Bend(1) ; // this will invalidate
3D version as well. later we validate it.

          // set sense to 0, because we want the bendline
(cylinder) to represent explicitly OUTSIDE
          // ie. thickness vector is opposite to the normal (=
radius vector).
          new_auto_bendline->set_sense(0) ;
          }
     if (NULL == bend_surface) {
          delete new_bendline ;
          return 0 ;
          }
     new_auto_bendline->set_surface(bend_surface) ;

     // lastly we need to create the bendline centerline, but for
that we need to know its length, and
```

APPENDIX C

```
     // start-end-points. However, for that we need to process the
contact list which contains the
     // lines that are adjacent. We will do that next, and when
done, will create bendline centerline.

/*
     Second, we will break some lines, if necessary, and combine
all adjacent lines into a one
     adjacent line. We will also create adjacency information
between face1-bendline and face2-bendline.
*/
     // notice that processing one side of the contact is
independent of the other side.
     // moreover, the logic is exactly the same. therefore, we will
use the following code
     // to process both face1' side and face2' side.
     char face2_processed = 0 ;

process_one_side_of_the_contact :

     // in general, the contact line (on the side of either face
(face1 and face2)) will consist
     // of three lines - we have a list of lines, first line is the
line before the contact, the
     // second line is the contact line, the last line is the line
after the contact.
     // these variables will be used to compute these three lines.
     double k ;
     double k0, k1, k2, k3 ; // parameters k for the first line in
the left
     double end_k1, end_k2 ; // parameters k for the last line in
the left list
     BM_POINT p0, p1, p2, p3 ; // p0 - p3 are the endpoints of the
edges that will be left (ie. endpoint of left_line, l2, l3).
          // p0 and p3 and the two extreme endpoints and trivial to
find. we really need to compute only p1 and p2.
     BM_LINE *l1, *l2, *l3 ; // l1 is the line before l2, l2 is the
line that is adjacent, l3 is the one after it.

     // process first line of the left side
     k0 = 0.0 ;
     k3 = 1.0 ;

first_line_in_left->is_point_on_line(first_line_in_right->get_sta
rtpt(),&k1) ;

first_line_in_left->is_point_on_line(first_line_in_right->get_end
pt(),&k2) ;
     if (k1 > 1.0) k1 = 1.0 ;
```

APPENDIX C

```
     else if (k1 < 0.0) k1 = 0.0 ;
     if (k2 > 1.0) k2 = 1.0 ;
     else if (k2 < 0.0) k2 = 0.0 ;
     if (k2 < k1) { k = k1 ; k1 = k2 ; k2 = k ; }
     // note that we cannot yet compute p0, p1 and p3 because we
don't know the relative order
     // of the first and last lines in the left list

     // find and process the last line
     for (line_in_list = left ; line_in_list ; line_in_list =
next_line_in_list) {
          if (NULL == (next_line_in_list = line_in_list->next()))
{
               left_line = (BM_LINE *) line_in_list->get_obj() ;

               // first, we have to find the end of the face2 list
               for (line_in_list = right ; line_in_list ;
line_in_list = next_line_in_list) {
                    if (NULL == (next_line_in_list =
line_in_list->next())) break ;
                    }
               right_line = (BM_LINE *) line_in_list->get_obj() ;

left_line->is_point_on_line(right_line->get_startpt(),&end_k1) ;

left_line->is_point_on_line(right_line->get_endpt(),&end_k2) ;
               if (end_k1 > 1.0) end_k1 = 1.0 ;
               else if (end_k1 < 0.0) end_k1 = 0.0 ;
               if (end_k2 > 1.0) end_k2 = 1.0 ;
               else if (end_k2 < 0.0) end_k2 = 0.0 ;
               if (end_k2 < end_k1) { k = end_k1 ; end_k1 = end_k2
; end_k2 = k ; }
               break ;
               }
          }

     // now we have to compute points p0, p1, p2 and p3.
     // but first we need to convert end-k parameters to equivalent
parameters with respect to the
     // first line in the left
     p0 = left_line->get_startpt() ;
     p1 = left_line->get_startpt() + end_k1 * (left_line->get_v())
;
     p2 = left_line->get_startpt() + end_k2 * (left_line->get_v())
;
     p3 = left_line->get_endpt() ;
     // check k0
     first_line_in_left->is_point_on_line(p0,&k) ;
     if (k < k0) k0 = k ;
```

APPENDIX C

```
     // check k1
     first_line_in_left->is_point_on_line(p1,&k) ;
     if (k < k1) k1 = k ;
     // check k2
     first_line_in_left->is_point_on_line(p2,&k) ;
     if (k > k2) k2 = k ;
     // check k3
     first_line_in_left->is_point_on_line(p3,&k) ;
     if (k > k3) k3 = k ;

     // here we can compute p0, p1 and p3. later we compute p2.
     p0    =    first_line_in_left->get_startpt()    +    k0    *
(first_line_in_left->get_v()) ;
     p1    =    first_line_in_left->get_startpt()    +    k1    *
(first_line_in_left->get_v()) ;
     p2    =    first_line_in_left->get_startpt()    +    k2    *
(first_line_in_left->get_v()) ;
     p3    =    first_line_in_left->get_startpt()    +    k3    *
(first_line_in_left->get_v()) ;

     // ok, we have computed p0-p3. now we will erase left list,
except for the first line.
     // we need the first line later.
     // actually, the first line will, in the future, point to new
line l2.
     BM_LOOP *left_loop = first_line_in_left->get_loop() ;
     last_line_in_left = NULL ; // the last line in the left. we
need it later to replace out-of-date pointers with valid ones.
     line_in_list = left->next() ; // this is the second line in
the left list.
     left->add_after(NULL) ;
     // note : we will erase all lines in the left list, starting
from the second line.
     for (; line_in_list ; line_in_list = next_line_in_list) {
          next_line_in_list = line_in_list->next() ;
          // store a pointer to the last line
          last_line_in_left = (BM_LINE *) line_in_list->get_obj()
;
          left_loop->remove_edge(last_line_in_left) ;
          delete last_line_in_left ;
          delete line_in_list ;
          }

     // finally, create the adjacent line l2, and two more lines
(l1 and l3) if necessary.
     if (p0 != p1) {
          l1 = first_line_in_left ;
          l1->set(p0,p1) ;
          l2 = new BM_LINE(p1,p2) ;
```

APPENDIX C

```
          left_loop->add_edge_after(l1,l2) ;
          }
     else {
          l1 = NULL ;
          l2 = first_line_in_left ;
          l2->set(p0,p2) ;
          }
     if (p2 != p3) {
          l3 = new BM_LINE(p2,p3) ;
          left_loop->add_edge_after(l2,l3) ;
          }
     else l3 = NULL ;

     // last thing, create topology by making this line adjacent to
the bendline
     l2->make_body_adjacent(new_bendline) ;

     // a big problem now is that we have deleted some lines.
     // the problem is that if we have a simultaneous bend, other
contacts could still be refering
     // to these lines we just deleted.
     // we have to go and check that, and if true, replace pointers
to the lines we have changed/deleted
     // with valid references.
     //
     // namely, lines that are affected are the first and last
lines in the left.
     // potentially references to them need to be replaced with
references to l1 and l3.
     if (l1 || l3) check_references_in_remaining_contacts(
          face2_processed ? contact_list->next() : contact_list, //
current list we are working with
          face2_processed ? contact_list : contact_list->next(), //
list on the other side of the contact
          first_line_in_left, last_line_in_left, // these are old
references, to be checked if still valid
          l1, l3 // l1 and l3 are the new references
          ) ;

     // we will use the same piece of code to process both sides of
the contact.
     // if face2 side has not been processed, do it now.
     // however, first we need to set some values of variables that
are commonly used.
     if (! face2_processed) {
          face2_processed = 1 ;

          // first, l2 should be the left line.
          // l2 is the real adjacent line (on the left). now it
```

APPENDIX C

```
becomes the right line.
          left->set_obj(l2) ;

          // now we need to switch left and right sides
          // switch lines
          first_line_in_left = first_line_in_right ;
          first_line_in_right = l2 ;

          // switch lists
          line_in_list = left ;
          left = right ;
          right = line_in_list ;

          // store bendline centerline start-end points
          bendline_centerline_p1 = p1 ;
          bendline_centerline_p2 = p2 ;

          goto process_one_side_of_the_contact ;
          }

/*
     We can delete contact lists now.
*/
     BM_LINKED_LIST_NODE *list, *next_list ;
     int lists_deleted = 0 ; // note, we can only delete first two
lists
     for (list = contact_list ; lists_deleted < 2 && list ; list =
next_list) {
          next_list = list->next() ;

          // delete the list
          for    (line_in_list    =    (BM_LINKED_LIST_NODE    *)
list->get_obj() ;
               line_in_list ; line_in_list = next_line_in_list) {
               next_line_in_list = line_in_list->next() ;
               delete line_in_list ;
               }
          delete list ;

          ++lists_deleted ;
          }
     // set the correct number of contacts left and update the
pointers
     long num_contacts = (long) (*contact)->get_obj() ;
     if (--num_contacts < 1) {
          // if no contacts left, erase the whole contacts list
          delete *contact ;
          *contact = NULL ;
          }
```

APPENDIX C

```
     else {
          (*contact)->set_obj((BM_BASIC *) num_contacts) ;
          (*contact)->add_after(list) ;
          }

/*
     Finally, create centerline. Make sure direction and length are
correct.
     Note, p1 and p2 are defined with respect to face1.
     Ie. p1 -> p2 is the direction on the contact on the side of
face1.
*/
     B         M         _         L         I         N         E
centerline(bendline_centerline_p1,bendline_centerline_p2) ;
     if (fabs(angle - PI) <= BM_ANGLE_TOLERANCE) { // bendline not
being bent
          // face1 plane is the bendline surface
          if    (face1->get_idx()    >    face2->get_idx())
centerline.reverse_line() ;
          }
     else if (angle < PI) {
          if    (face1->get_idx()    <    face2->get_idx())
centerline.reverse_line() ;
          }
     else { // angle is > PI
          if    (face1->get_idx()    >    face2->get_idx())
centerline.reverse_line() ;
          }
     new_auto_bendline->set_center_line(centerline) ;

     // if we are building bendlines for the 3D-version of the
part,
     // make sure 3D-version of the bendline is validated because
most likely we
     // want to UNFOLD right away.
     if (using_3D_version) new_bendline->validate_3D_version() ;

     *bendline_created = new_bendline ;
     return 1 ;
}


/*
     The purpose of this function is to create a minimum number of
bendlines so that a part
     that has disconnected components consisting of faces, the part
will be connected once
     we add these new bendlines.
```

APPENDIX C

This function assumes that the part has thickness 0.

The basic idea we use in this function is maximum spanning tree.
We model the part by an undirected graph, where faces are the nodes of the graph and
there is an edge between two nodes iff these two faces are in contact (ie. are touching each other),
the cost (or length) of the edge is the length of the longest contact between these two faces
(ie. the length of the longest possible bendline between the two faces).
In order to create bendlines we compute a maximum spanning tree for this graph and create a
bendline for every edge of the graph that is in the maximum spanning tree.

There are two problems however :

- It could be that the part already contains some bendlines (ie. some faces are already
connected).

- When we compute the maximum spanning tree, we can have two fringe-edges that have the
same length. In that case, we don't want to break ties randomly, but instead choose an
edge that would minimize the diameter of the spanning tree (the maximum distance between
any two vertices of the tree).

Algorithm :
-----------
We will process faces one-by-one, starting from the first faces of the part and proceeding
until the last faces, and building the maximum spanning tree along the way as we go.
For every pair of faces, such that at least one of the is not yet in the spanning tree,
we keep the longest contact between them. When we expand the spanning tree, we choose
the contact between a face in the tree and a face not in the tree that is the longest contact
between any face in the tree and a face outside. If there is a tie, we choose an edge that
would minimize the

*/

/*

APPENDIX C

```
     Given a face (face1) this structure contains information about
the contact between
     this face and another face.

     For any two faces, we need to know if there is a contact
between these two faces and if yes,
     what is its length. The simplest way to handle this data is to
store it as a two-dimensional
     array. However, this would take a lot of space, most of which
would be wasted, usually, since
     if there are many faces, most of them do not have any contacts
between them.

     Instead we will store this info for every face as a list of
structures. We will create
     this record (ie. structure) only if the length of the contact
between two faces is greater than 0.
*/

typedef struct CONTACT_INFO {

     // here we will keep track what is the length of the longest
contact between any two faces
     // this is really a two-dimensional array
     double length ;

     // here we keep a pointer to the other face
     BM_FACE *face2 ;

     // here we will keep the longest contact for any two faces
     // this is really a two-dimensional array stored as a linked
list of lists.
     BM_LINKED_LIST_NODE *contact ;

     // a pointer to the next structure in a list
     CONTACT_INFO *next ;

     } contact_info ;


/*
     This is a very basic function used by many functions in this
file.
     It deletes a contact list.
*/

static void delete_contact_info_list(contact_info *list)
{
     contact_info *c, *c_next ;
```

APPENDIX C

```
     BM_LINKED_LIST_NODE *clist, *next_clist ;
     BM_LINKED_LIST_NODE *line_in_list, *next_line_in_list ;

     for (c = list ; c ; c = c_next) {
          c_next = c->next ;

          if (c->contact) {
               // skip the header = num of contacts
               for (clist = (c->contact)->next() ; clist ; clist =
next_clist) {
                    next_clist = clist->next() ;

                    // delete the list
                    for (line_in_list = (BM_LINKED_LIST_NODE *)
clist->get_obj() ; line_in_list ; line_in_list = next_line_in_list)
{
                         next_line_in_list = line_in_list->next()
;
                         delete line_in_list ;
                         }
                    delete clist ;
                    }
               // delete the header
               delete c->contact ;
               }

          delete c ;
          }
}


static void delete_contact_info_structure(contact_info *c)
{
     BM_LINKED_LIST_NODE *clist, *next_clist ;
     BM_LINKED_LIST_NODE *line_in_list, *next_line_in_list ;

     if (NULL == c) return ;

     if (c->contact) {
          // skip the header
          for (clist = (c->contact)->next() ; clist ; clist =
next_clist) {
               next_clist = clist->next() ;

               // delete the list
               for (line_in_list = (BM_LINKED_LIST_NODE *)
clist->get_obj() ; line_in_list ; line_in_list = next_line_in_list)
{
                    next_line_in_list = line_in_list->next() ;
```

APPENDIX C

```
                    delete line_in_list ;
                    }
               delete clist ;
               }
          // delete the header
          delete c->contact ;
          }

     delete c ;
}


/*
     This function will compute and store the best (ie. longest)
contact between two faces.
*/

static int compute_the_longest_contact_between_faces(
     BM_FACE & face1 /* IN */,
     BM_FACE & face2 /* IN */,
     contact_info **computed_contact_list /* OUT */)
{
     // so far we have computed nothing
     *computed_contact_list = NULL ;

     BM_LINKED_LIST_NODE *contact_list ; // a list of all contacts
between face1 and face2 we will compute

     if  (!  BM_compute_all_face_to_face_contacts(face1,  face2,
&contact_list)) return 0 ;
     d       o       u       b       l       e     x      =
BM_keep_largest_contact_remove_the_rest(&contact_list) ;
     if (x < BM_PRECISION) return 1 ; // no contact between these
two faces

     contact_info *c ;
     if (NULL == (c = new contact_info)) {
          // delete contact list
          BM_LINKED_LIST_NODE *clist, *next_clist ;
          BM_LINKED_LIST_NODE *line_in_list, *next_line_in_list ;
          for  (clist  =  contact_list->next()  ;  clist  ;  clist  =
next_clist) {
               next_clist = clist->next() ;

               // delete the list
               for   (line_in_list   =   (BM_LINKED_LIST_NODE   *)
clist->get_obj() ; line_in_list ; line_in_list = next_line_in_list)
{
                    next_line_in_list = line_in_list->next() ;
```

APPENDIX C

```
                delete line_in_list ;
                }
            delete clist ;
            }
        delete contact_list ;

        return 0 ;
        }

    // initialize the structure
    c->contact = contact_list ;
    c->next = NULL ;
    c->face2 = &face2 ;
    c->length = x ;
    *computed_contact_list = c ;

    return 1 ;
}


/*
    This function adds a new face to the current connected
component.
    It also computes the longest contacts between this new face,
and all other faces that have not
    been processed.
*/

static int add_face_to_connected_component(BM_PART *part,
    BM_FACE *face2 /* this is the face we are adding to the
connected component */,
    long *end_id /* an index of the last face in the connected
component. this is where face2 is. */,
    contact_info **all_contacts /* all contact info between face2
and other outside faces will be here */
        /* we will compute it and construct this list in this
function */,
    BM_FACE **idx_to_face_mapping)
{
    BM_FACE *current_face ;
    contact_info *last_clist = NULL, *cl ;

    // just in case face2 has no adjacent faces outside the
connected component
    all_contacts[*end_id] = NULL ;

    // in this loop we want to compute all contacts between face2
and all other
    // faces not yet in any connected component.
```

APPENDIX C

```
     for (current_face = part->get_face_list() ; current_face ;
current_face = (BM_FACE *) current_face->next()) {
          if (current_face->get_user_id() >= 0) continue ; //
current_face is in some other connected component

          // compute the best contact between face2 and
current_face
          if (! compute_the_longest_contact_between_faces(*face2,
*current_face, &cl)) return 0 ;
          if (NULL == cl) continue ; // there is no contact between
these two faces

          if (NULL == last_clist) all_contacts[*end_id] = cl ;
          else last_clist->next = cl ;
          last_clist = cl ;
          }

     face2->set_user_id(*end_id) ;
     idx_to_face_mapping[*end_id] = face2 ;
     ++(*end_id) ;

     return 1 ;
}


/*
     These two functions allow the user to set and get the distance
between two faces in the topology graph.
     dist_btw_faces is a upper right half of a two dimensional
array.
*/

static long get_face2face_dist(unsigned char *dist_btw_faces,
     long number_of_faces, long dist_array_size, long j, long i)
{
     long k ;

     // distance between face_i and face_i is zero
     if (i == j) return 0 ;

     // sort indeces
     if (j < i) { k = i ; i = j ; j = k ; }

     k = number_of_faces - i ;
     return dist_btw_faces[dist_array_size - ((k*(k-1)) >> 1) + (j
- i) - 1] ;
}

static void set_face2face_dist(unsigned char *dist_btw_faces,
```

APPENDIX C

```
     long number_of_faces, long dist_array_size, long j, long i,
unsigned char distance)
{
     long k ;

     // distance between face_i and face_i cannot be set
     if (i == j) return ;

     // sort indeces
     if (j < i) { k = i ; i = j ; j = k ; }

     k = number_of_faces - i ;
     dist_btw_faces[dist_array_size - ((k*(k-1)) >> 1) + (j - i) -
1] = distance ;
}

/*
     This function returns the largest distance between the given
face and other faces in the
     connected component.
*/

static    long    get_largest_distance_for_face(unsigned    char
*dist_btw_faces,
     long number_of_faces, long dist_array_size, long start_id,
long end_id, long face_id)
{
     long j, k ;

     if (NULL == dist_btw_faces) return 0 ;

     long current_face_to_face_distance = 0 ;
     for (j = start_id ; j < end_id ; j++) {
          k                                                     =
get_face2face_dist(dist_btw_faces,number_of_faces,dist_array_size
,j,face_id) ;
          if    (k    >    current_face_to_face_distance)
current_face_to_face_distance = k ;
          }

     return current_face_to_face_distance ;
}


/*
     This is the main AutoBend function. Its purpose is to
automatically create bendlines for the part.
*/
```

APPENDIX C

```
int BM_PART::auto_bend(void)
{
     long i, j, k ;
     BM_FACE *current_face ;
     BM_FORMING *current_forming ;
     BM_BENDLINE *current_bendline ;

     // at end of the function we release memory. this code for
releasing memory is shared
     // between the cases when this function fails, or succeeds.
     // therefore, before we get to that code, we have to know the
return code.
     int ret_value ;

     // these are the two faces we will be creating a bendline for
(ie. between these two faces).
     BM_FACE *face1, *face2 ;

     // here we keep a list of information about contacts between
every face and other faces.
     // this is an array lists.
     contact_info **all_contacts = NULL ;

     // here we will keep track what face corresponds to each row
in face_to_face_length[] and all_contacts[] arrays
     BM_FACE **idx_to_face_mapping = NULL ;

     // this (two-dimensional) array is used to store distances
between faces in the TOPOLOGY GRAPH.
     // these distance values are used to break ties in the maximum
spanning tree algorithm when
     // two edges have the same length. Note that the distance
between (i,j) is the same as
     // the distance between (j,i). This means that the distance
matrix is a symmetric matrix, and we
     // only need to store one half (upper right triangle) to save
space.
     // we will use this method of breaking ties only when the
number of faces is less than 256.
     // this has two advantages : 1) the distance between any two
faces is always less than 256,
     // and therefore we only need a char (8 bits) to store the
distance values, 2) since we only
     // need a char for a pair, the total this array can take is
32K bytes, which is not too much memory.
     unsigned char *dist_btw_faces = NULL ;
     // this will be the size of the distance array, given some
number of faces
     long dist_array_size ;
```

APPENDIX C

```
     // we will have to create a heap because some portion of the
part can already be connected
     // and we need to make sure we don't create any bendlines for
that portion of the part.
     // we will use a heap to traverse that portion of the part.
     long body_priority = number_of_formings + number_of_faces +
number_of_bendlines ;
     // Check if there are any bodies. If no, we are done.
     if (body_priority < 1) return 1 ;
     // this is the heap we will allocate. this is used when we add
a face to the connected component
     // to add all other faces connected to it as well. the problem
is that the part could already
     // contain some bendlines.
     DBM_HEAP *heap = NULL ;

     // this is the start-index (in face_to_face_length[] and
all_contacts[]) arrays
     // of the current connected component
     long start_id = 0 ;
     // this is the end-index (in face_to_face_length[] and
all_contacts[]) arrays
     // of the current connected component
     long end_id = 0 ;

     // if TRUE, we are starting a new connected component
     int starting_new_connected_component = 1 ;

     // allocate memory for local variables
     if (NULL == (all_contacts = new
contact_info*[number_of_faces])) goto failure ;
     if (NULL == (idx_to_face_mapping = new
BM_FACE*[number_of_faces])) goto failure ;
     if (NULL == (heap = new DBM_HEAP(0,NULL,NULL,body_priority)))
goto failure ;
     if (number_of_faces < 256) { // allocate memory for the
face-face distance array only when
          // the number of faces is not too large
          dist_array_size = (number_of_faces*(number_of_faces - 1))
>> 1 ;
          if (NULL == (dist_btw_faces = new unsigned
char[dist_array_size])) goto failure ;
          }
     ++body_priority ; // just in case, we don't want the priority
to go to 0 later.

     // initialize arrays
     for (i = 0 ; i < number_of_faces ; i++) {
          all_contacts[i] = NULL ;
```

APPENDIX C

```
          idx_to_face_mapping[i] = NULL ;
          }

     // initially mark all faces as not processed
     for  (i  =  0,  current_face  =  first_face  ;  current_face  ;
current_face = (BM_FACE *) current_face->next()) {
          current_face->this_body_already_processed = 0 ;

          // this will tell us whether this face has been already
processed.
          // if yes, this id is the index in face_to_face_length[]
and all_contacts[] arrays.
          current_face->set_user_id(-1) ;
          }

/*
     First, try to expand the maximum spanning tree of the current
connected component of faces.
*/
     // these two variables are used in tie-breaking
     long best_face_to_face_distance, current_face_to_face_distance
;
     // this is the length of the best contact so far (ie. the
longest contact)
     double best_length ;
     // this is a pointer to the best contact_info structure found
so far
     contact_info *best_cntct ;

expand_spanning_tree :

     // first, check if all faces have been processed
     // end_id is where we will put the next face we add to the
connected component
     if (end_id >= number_of_faces) goto done ;

     contact_info *cntct, *cntct_next, *cntct_prev ;
     best_length = -1.0 ;
     best_face_to_face_distance = 999999 ; // a really large number
     // in this loop we check all faces already in the connected
component and try
     // to find a face that has the largest contact between itself
and an adjacent face outside the
     // current connected component.
     for (i = start_id ; i < end_id ; i++) {
          // in this loop we are checking for a largest contact
between the current face
          // in the connected component and all of its adjacent
faces outside the connected component.
```

APPENDIX C

```
          cntct_prev = NULL ;
          for  (cntct  =  all_contacts[i]  ;  cntct  ;  cntct  =
cntct_next) {
               cntct_next = cntct->next ;

               // check if this adjacent face is already processed
               if ((cntct->face2)->get_user_id() >= 0) {
                    // this means that face2 has already been added
to the connected component
                    // and we don't really need the contact info
stored in this structure any more.
                    // we will delete it.
                    // this will some time in the future and free
up some space.
                    delete_contact_info_structure(cntct) ;
                    if  (NULL  ==  cntct_prev)  all_contacts[i]  =
cntct_next ;
                    else cntct_prev->next = cntct_next ;
                    continue ;
                    }

               // ok, this adjacent face not processed.
               // check if it is better than the previously known
best.
               // first check if there is a tie, and if we have
allocated a face-face distance array
               // then use the face-to-face distances to break the
tie
               if   (fabs(cntct->length   -   best_length)   <=
distance_tolerance && dist_btw_faces) {
                    // if tie-breaking is used, compute the largest
distance for this face (ie. face1)
                    current_face_to_face_distance   =
get_largest_distance_for_face(dist_btw_faces,
                         number_of_faces,   dist_array_size,
start_id, end_id, i) ;

                    // prefer the one with the smaller largest
distance
                    if   (current_face_to_face_distance   <
best_face_to_face_distance) {
                         face1 = idx_to_face_mapping[i] ;
                         face2 = cntct->face2 ;
                         best_length = cntct->length ;
                         best_cntct = cntct ;
                         best_face_to_face_distance   =
current_face_to_face_distance ;
                         }
                    }
```

APPENDIX C

```
                // take simply the one that is better
                else if (cntct->length > best_length) {
                     face1 = idx_to_face_mapping[i] ;
                     face2 = cntct->face2 ;
                     best_length = cntct->length ;
                     best_cntct = cntct ;

                     // if tie-breaking is used, compute the largest
distance for this face (ie. face1)
                     best_face_to_face_distance =
                          current_face_to_face_distance    =
get_largest_distance_for_face(dist_btw_faces,
                          number_of_faces,    dist_array_size,
start_id, end_id, i) ;
                     }

                cntct_prev = cntct ;
                }
           }
     // at the end of this loop,
     // face1, face2, best_cntct should have correct values, if
best_length > 0.0,
     // that means we can expand the tree.

/*
     Check if we can expand the spanning tree.

     Note, for this point on until we get back to expanding the
connected component,
     we will be using only face2, ie. we won't be needing face1.
     The only case is when we create a new bendline, but we can
extract face id's from
     the contact list.
*/
     if (best_length < distance_tolerance) {
          // looks like we cannot expand the spanning tree
          // none of the faces in the current connected component
has any adjacent faces
          // outside the connected component.
          // most likely this connected component is finished and,
since there must be still faces left,
          // there is more than one connected component.
          //
          // next we try to find the first face in the next
connected component so that we
          // can continue and create all bendlines for this new
conencted component.
          for  (current_face  =  first_face  ;  current_face  ;
current_face = (BM_FACE *) current_face->next()) {
```

APPENDIX C

```
                if (current_face->get_user_id() < 0) break ;
                }
            if (NULL == current_face) goto done ; // we should never
get here

            // first, we can delete all contact information about the
current (now old) connected component
            for (i = start_id ; i < end_id ; i++) {
                delete_contact_info_list(all_contacts[i]) ;
                all_contacts[i] = NULL ;
                }

            // here we will be starting a new connected component
            starting_new_connected_component = 1 ;
            start_id = end_id ;

            // we will skip the bendline creation normally needed
when adding a face to a connected component
            face2 = current_face ;
            }
        else {
            // ok, we are in the middle of a conencted component
            starting_new_connected_component = 0 ;

            // create a bendline between face1 and face2
            // notice : we might have to create a simultaneous bend
            long num_contacts = (long)
(best_cntct->contact)->get_obj() ;
            BM_BEND_PROPERTY_SIMULTANEOUS *sim_bend = NULL ;
            if (num_contacts > 1) {
                sim_bend = new BM_BEND_PROPERTY_SIMULTANEOUS(this,
num_contacts, NULL) ;
                if (NULL == sim_bend) goto failure ;
                }
            BM_BENDLINE *new_bendline ;
            for (long contacts_done = 0 ; contacts_done <
num_contacts ; contacts_done++) {
                if (! BM_create_bendline(*this,
&(best_cntct->contact),&new_bendline)) goto failure ;
                // note that this function will delete one contact
for which a bendline was created as well
                if (num_contacts > 1) {
                    // add this bendline to the simultaneous
property
                    new_bendline->add_property(sim_bend) ;
                    }
                }
            }
```

APPENDIX C

```
    //  store  "1  +  the  current  index  of  the  last
connected-component-face"
    j = end_id ;
    // we could add face2 to the connected component right away,
but we could save some time by
    // first checking if face2 has any other stuff (outside this
connected component) connected to it.
    // if yes, we will be adding that stuff to this connected
component right away,
    // but in that case there is no need for us to compute
contacts between face2 and that other
    // stuff in the first place.
    // Therefore, we will just remember that face2 should be
added, will process adjacent stuff first,
    // and then will actually add face2 (and some more stuff
may-be) to the connected component.
    //
    // Note : we will actully put face2 in the heap, and when we
remove it from the heap,
    // we will remember to add it to the connected component

/*
    Now we need to check if this face (ie. face2) has any other
3D-bodies connected to it.
    It yes, then we need to pursue these connections in order to
add all faces connected to face2 to
    the current connected component.
*/
    heap->empty() ;
    if  (!  heap->insert(body_priority--,  (long)  face2))  goto
failure ;
    face2->this_body_already_processed = 1 ;

    // check if face2 has a parent face or not. if not, set the id
in local array equal to
    // face2's own id. this way we know it has no parent face.
    //
    // IMPORTANT : normally user_id of every face is a pointer to
its index in the contact-info array.
    // temporarily we will use this information to keep track
which of the faces already processed
    // is the parent-face (in the topology graph) of every new
face added to the connected component.
    // this information will be used later to compute distances in
the face topology graph.
    // the following loop (controlled by the heap) stores all
faces not yet in the connected
    // component, but connected to this face2.
    // later when the actualy adding of new faces to the conencted
```

APPENDIX C

```
component is done,
     // we overwrite user_id with the correct value.
     if (! starting_new_connected_component)
face2->set_user_id(face1->get_user_id()) ;
     else face2->set_user_id(end_id) ;

     // in the following while loop we will use
this_body_already_processed member variable to keep
     // track whether a varible is processed; not processed, but
sitting in the heap; or unseen yet.
     // 0 - unseen body
     // 1 - body in the heap
     // 2 - body already finished

     // also, in this while loop we will be using the
user_defined_id of every 3D-body to keep
     // track of the parent face of every 3D-body we traverse.
     // this has two benefits : 1) we will remember the parent face
of every face and can compute
     // distances between faces later, and
     // 2) this way when faces are later added to the spanning
tree, distance between some other
     // face and this face will not be computed, since it is not
necessary.

     BM_3D_BODY *body ;
     BM_TOPOLOGY_RECORD *toplgy ;
     while (heap->get_size() > 0) {
          if (! heap->remove(&i,(long *) &body)) goto failure ;
          // a safety check
          if (NULL == body) continue ;
          // check if this body is already finished
          if (body->this_body_already_processed > 1) continue ;

          // get body topology
          toplgy = body->get_adj_list() ;
          if (NULL == toplgy) continue ;

          // check if the body is a face. if yes, memorize.
          if (body->is(BM_ENTITY_TYPE_FACE)) {
               face2 = (BM_FACE *) body ;

               // memorize to add this face to the connected
component later
               idx_to_face_mapping[j++] = face2 ;
               }

          body->this_body_already_processed = 2 ;
```

APPENDIX C

```
        // process all adjacent bodies
        for (current_face = (BM_FACE *) toplgy->get_first_face()
;   current_face   ;   current_face   =   (BM_FACE   *)
toplgy->get_next_face()) {
                // make sure that we don't process faces twice
                if   (current_face->this_body_already_processed)
continue ;
                if   (!   heap->insert(body_priority--,(long)
current_face)) goto failure ;
                current_face->this_body_already_processed = 1 ;

                // make sure we memorize the parent face index in
the local spanning tree array
                current_face->set_user_id(body->get_user_id()) ;
                }
        for   (current_forming   =   (BM_FORMING   *)
toplgy->get_first_forming() ; current_forming ; current_forming =
(BM_FORMING *) toplgy->get_next_forming()) {
                if  (current_forming->this_body_already_processed)
continue ;
                if   (!   heap->insert(body_priority--,(long)
current_forming)) goto failure ;
                current_forming->this_body_already_processed = 1 ;

                // make sure we memorize the parent face index in
the local spanning tree array
                if   (body->is(BM_ENTITY_TYPE_FACE))
current_forming->set_user_id(j-1) ;
                e          l          s          e
current_forming->set_user_id(body->get_user_id()) ;
                }
        for   (current_bendline   =   (BM_BENDLINE   *)
toplgy->get_first_bendline() ; current_bendline ; current_bendline
= (BM_BENDLINE *) toplgy->get_next_bendline()) {
                if (current_bendline->this_body_already_processed)
continue ;
                if   (!   heap->insert(body_priority--,(long)
current_bendline)) goto failure ;
                current_bendline->this_body_already_processed = 1 ;

                // make sure we memorize the parent face index in
the local spanning tree array
                if   (body->is(BM_ENTITY_TYPE_FACE))
current_bendline->set_user_id(j-1) ;
                e          l          s          e
current_bendline->set_user_id(body->get_user_id()) ;
                }
        }
```

APPENDIX C

```
     // finally we need to compute contacts between this face and
all other faces, that we postponed
     // and add them to the connected component.
     long face1_id ;
     for (i = end_id ; i < j ; i++) {
          face2 = idx_to_face_mapping[i] ;
          // first, compute distances in the TOPOLOGY GRAPH between
this face (ie. face2)
          // and all faces previously in the connected component.
          // we will use the parent face id in the local spanning
tree array for that.
          face1_id = face2->get_user_id() ; // note : face1_id is
the parent id of face2 (ie. there is a bendline between face1_id
and face2 that we count).
          if (dist_btw_faces && face1_id != i) { // if equal ->
face2 has no parents,
               // ie. a new connected component (must be start_id
= end_id).
               // actually, it must be here true that face1_id < i
               for (k = start_id ; k < end_id ; k++) {
                    set_face2face_dist(dist_btw_faces,
number_of_faces, dist_array_size, k, i,

get_face2face_dist(dist_btw_faces,number_of_faces,dist_array_size
,k,face1_id) + 1) ;
                    }
               }
          // else if equal, it must be that i == 'the end_id' in
the beginning of this for-loop.
          //   note   that   the   next   function
(add_face_to_connected_component(...)) will increment end_id.

          if  (!  add_face_to_connected_component(this,  face2,
&end_id, all_contacts, idx_to_face_mapping)) goto failure ;
          }

     // ok, the current connected component has no connections to
the outside.
     // try to expand the spanning tree.
     goto expand_spanning_tree ;

done :

     ret_value = 1 ;

     goto release_memory_and_return ;

failure :
```

APPENDIX C

```
     ret_value = 0 ;

release_memory_and_return :

     // free memory if necessary
     for (i = 0 ; i < number_of_faces ; i++) {
          delete_contact_info_list(all_contacts[i]) ;
          }
     if (all_contacts) delete [] all_contacts ;
     if (idx_to_face_mapping) delete [] idx_to_face_mapping ;
     if (heap) delete heap ;
     if (dist_btw_faces) delete [] dist_btw_faces ;

     return ret_value ;
}
```

APPENDIX D

```
////////////////////////////////////////////////////////////////
//                                                            //
//   Example of 2d Cleanup function.                          //
//                                                            //
//                  Copyright 1996 AmadaSoft America, Inc.   //
//                                                            //
////////////////////////////////////////////////////////////////
#include <stdio.h>
#include <stdlib.h>
#include <math.h>
#include <memory.h>
#include <string.h>
/                                                                    *
=====================================================================
     Function  Name :
     1 control level
          TestFindBoundary

          TestFindDrawingSheetControl
          TestFindViewsControl

          TestFindBoundaryControl
          TestFindArrowControl
          TestFindOneSideOpenControl
          TestFindOneSideOpen2Control
          TestFindCenterLineControl
          TestFindOneSideOpenConnectControl
          TestFindSameColorControl
          TestFindSelectSingleControl
          TestUnselectSingleControl
          TestClearControl
          TestClearKeepFlagsControl
          TestDeleteControl
          TestUndoControl
          TestUndoPreControl
          TestDeleteViewsControl
          TestSetUndoFlagViewsControl
        TestBackColorControl

     2 applicate level
          F2dCleanUpFindDrawingSheet
          F2dCleanUpFindViews

          F2dCleanUpFindSameColorEntity
          F2dCleanUpFindCenterLineEntity
          F2dCleanUpFindOnesideOpenConnectEntity
          F2dCleanUpFindOneSideOpenEntity2
          F2dCleanUpClearDrawingEntity
          F2dCleanUpDeleteDrawingEntity
          F2dCleanUpDeleteViews
```

APPENDIX D

```
          F2dCleanUpUndo
          F2dCleanUpUndoPre

          F2dCleanUpPickUpAllOneSideOpenEntity
          F2dCleanUpPickUpAllArcEntity
          F2dCleanUpFindLongestEntity
          F2dCleanUpFindGroup

          F2dCleanUpCheckEntityExist

          F2dCleanUpFindViewsRelation
          F2dCleanUpFindRelativeViews

          F2dCleanUpFindOutSideLoop
          F2dCleanUpFindInSideEntity

          F2dCleanUpFindOneSideOpenEntity
          F2dCleanUpFindGroupMinX
          F2dCleanUpFindOutNextEntity
          F2dCleanUpFindOnesideOpenConnectEntityNext

          F2dCleanUpFindArrow
          F2dCleanUpFindArrowOneSideOpenEntity
          F2dCleanUpFindArrowEndEntity
          F2dCleanUpCheckStartEndEntity
          F2dCleanUpComputeCenterLineAngle
          F2dCleanUpFindArrowCenterEntity
          F2dCleanUpChangeArrowVertexFlag

          F2dCleanUpArcAngle
          F2dCleanUpLineAngle
          F2dCleanUpLineLength
          F2dCleanUpChangeColor
          F2dCleanUpChangeDrawingColor
          F2dCleanUpChangeChildrenFlag
          F2dCleanUpChangeDrawingFlag
          F2dCleanUpClearDrawingKeepFlags

          F2dVector
          F2dVectorUnit
          F2dDistancePointLine
=================================================================
*/
#ifdef VELLUM
#include "ck_cdlc.h"
// VCI_VLM.DLL include files
#include "system.h"

// CadKey emulation files
#include "vlm_ck.h"
```

APPENDIX D

```
#endif

#ifdef CKWIN
#include "ck_cdlc.h"
#include "ck_cde.h"
#include <ckcdll.h>
#include <ck_attr.h>
#define ck_setattr2 ck_setattr
#endif

#ifdef AUTOCAD
#include <ACAD_VCI.H>
#endif

// 2d3d files
#include "view3D.h"
//#include "Proto.h"  // includes prototypes of all functions.

#define VLM_ID_2DTO3D    32
#define Regular    0
#define ThreeViews 1
//#define SECURITY

// Some definitions
//
#undef DEBUG

//
// Following is the definition of the global variables
//

#ifdef CKWIN
int TopViewNum, IsometricViewNum;
// These  variables are used only with CADKEY when changing to
TopView or Isometric view.
#endif

// by Ji Feb.14,1996
double F2dCleanUpTolerance = 0.01;

//   undo flag ( set a No. for views )
extern int    F2dCleanUpExcutedNo = 0;

extern int    WorkLevel, TrimLevel, VW3DLevel;

// Three layers are useD: WorkLevel is used to highlight views and
display temporary drawings.
//                          TrimLevel is used to store the trimmed
drawing.
//                        VW3DLevel is used to store the projected
```

APPENDIX D

```
3D drawing.

// these are the four drawings used.
extern    struct    drawing    input_drawing,    projected_drawing,
trim_drawing, final_drawing;
// Three drawing structures are constructed:
//                         InputDrawing is constructed from the
input entities
//                                           taken from from all the
layers that are turned on.
//                        TrimmedDrawing is constructed from the
trimmed entities. Once the
//                                                Trimmed Drawing is
constructed, the Input Drawing is not used.
//                      ProjectedDrawing is constructed from the
entities projected in a single flange.
//                         If 'DoneProjection' is selected, then
these entities are saved on VW3DLevel.
//                        If 'UndoProjection' is selected, these
entities are discarded.

extern struct planar_flange *AllFlanges;
// this is a pointer to the list of flanges

extern char Messages[MaxMessages][80];
// This array stores the messages read from the message file.

extern int message_flag;
// This variable is assigned to '1' if the messages were read
successfully from the message file.
// Otherwise, it is set to '0'.

extern int number_of_views;
// This vairbale stores the number of disconnected components
discovered in the *input* drawing.

extern int number_of_entities;
// This variable stores the number of entities loaded for the
current drawing.

extern int number_trimmed_entities;
// This variable stores the number of entities loaded for the
trimmed drawing.

extern int n_edges;
// This variable stores the number of connecting edges between the
trimmed entities.

extern double MatchTolerance, ConnectivityTolerance;
// ConnectivityTolerance is used to determine whether two entities
```

APPENDIX D

```
are close enough to be considered connected.
// Matching Tolerance is used to determine whether two entities on
different views are matching.

extern double ArrowHeadAngle, ArrowHeadLength;
// These variuables define the structure of an arrow for the 2D
clean up funciton.

extern double view_boundaries[MaxNumberOfViews+1][4];
// This array is used to store the bounding box of each connected
component of the input drawing.
//       once the views are detected, several components might be
mapped to a single view.

extern int    type_of_view[MaxNumberOfViews+1];
// This array maps every view to its type, namely to one of Top,
Left, Right, Front, Back view.
// Its content is valid only after 'DoneViews' was called.

//int view_rotation_flag[MaxNumberOfViews+1];
// This array is used for marking rotated views.
// If the i'th element is '1' then the view is rotated.


//extern static char original_lvmask[32] ;
// At the beginning we save the (on,off) status of all the layers.

//extern static char twoDmask[32] ;
//extern static char threeDmask[32] ;
// The masks used to display the 2D and 3D models.


//extern static int original_worklevel ;
// Specifies the original work level of the user when fold is
started

// static int original_setup_available = 0 ;
// true iff original (layer) setup is available, ie. can be
restored


extern int dialog_open_flag = 0;
// This variable is a flag which specifies whether some dialog
boxes were opened.


extern int AtrimLineTypeSwitch, AtrimColorSwitch, AtrimWidthSwitch,
AtrimCenterLineSwitch;
// these switches are used to specify in which cases AutoTrim will
trim lines.
```

APPENDIX D

```
//struct node *F2dCleanUpInputEntity(char *, struct drawing *);
//static int select_flange(struct resbuf *rb);

typedef   struct Vector {
     double    x,y,z;
};

extern double BBminX,BBmaxX,BBminY,BBmaxY,BBminZ,BBmaxZ;

/*
=================================================================
     Function:
     Name :         TestFindBoundary

     Description:
               It is a manual function. When user selected a
boundary's entity of a view, the function would find all of the
connected entities for the view.

     Return Value:
               < 0: Error
               = 0: No proccess
               > 0: Completed successfully; the Number is the
counter of  found entities.

     Parameters:
     Subfunctions:
          int F2dCleanUpFindArrow
                    look for arrow type entity
          int F2dCleanUpFindArrowEndEntity
                    find arrow end line
          int F2dCleanUpFindArrowCenterEntity
                    find arrow center line
          int F2dCleanUpFindArrowOneSideOpenEntity
                    find one side open entity for arrow type
          int F2dCleanUpComputeCenterLineAngle
                    compute center line angle
          int F2dCleanUpCheckStartEndEntity
                    check start and end entities
          int F2dCleanUpFindOutSideLoop
                    look for out side loop entities
          int F2dCleanUpFindOutNextEntity
                    look for connected entity with out side loop
entities
          struct node *F2dCleanUpFindGroupMinX
                    look for minimum X-value for a entities group
          struct node_list *F2dCleanUpFindGroup
                    look for a group entities connected with input
entity
```

APPENDIX D

```
        struct node *F2dCleanUpInputEntity ( old function )
                  look for a selected entity on screen
        int F2dCleanUpLineAngle
                  compute a line type entity's angle
        int F2dCleanUpArcAngle
                  compute a arc type entity's angle.
        int F2dCleanUpChangeChildrenFlag
                  change entity's children flags
        int F2dCleanUpChangeArrowVertexFlag
                  change arrow top vertex's flags and
                       set arrow center line coordinates
        int F2dCleanUpChangeColor
                  change entity's color
        int F2dCleanUpFindOneSideOpenEntity
                  look for one side open entities and
                       they are vertical with arrow type entities
    double F2dCleanUpLineLength
                  compute line type entity's length

==================================================================
*/

int  TestFindBoundary()
{
     //   external functions
     int F2dCleanUpFindArrow();
     int F2dCleanUpChangeColor();
     int F2dCleanUpFindOneSideOpenEntity();
     int F2dCleanUpFindOutSideLoop();
     int F2dCleanUpChangeDrawingColor();
     struct node *F2dCleanUpInputEntity();
     struct node *F2dCleanUpFindGroupMinX();
     struct node_list *F2dCleanUpFindGroup();
     //   entities counter and flags
     int count = 0,
          assistant_line_flag = 0;
     //   link list and temp list
     struct node_list
          *Entities_change_color_list1;
     //   selected entity and temp entities
     struct node
          *entity,
          *MinXvalueEntity;

//   Begin
//-----------------------------------
//   Step_1:
//   check the number of entites
//  get count of all entities
//   if an error occurred, exit immidiately.
```

APPENDIX D

```
    if (number_of_entities<0)  return -1;

     for( ; ; )      {
//--------------------------------
//   Step_2:        select one entity
          entity = F2dCleanUpInputEntity( "Select a Boundary Entity
for a view",
                                         &trim_drawing);
          if ( entity == 0 )      return    0;
          if ( entity->flags != 0 )         continue;
//--------------------------------
//   Step_3:        find a connected entities group
          Entities_change_color_list1    =    F2dCleanUpFindGroup(
entity, &count );
          if ( Entities_change_color_list1 == 0 )      return    0
//--------------------------------
//   Step_4:        find arrow line
          F2dCleanUpFindArrow( Entities_change_color_list1 );
//--------------------------------
//   Step_5:        find one side open entities
          assistant_line_flag = F2dCleanUpFindOneSideOpenEntity(
               Entities_change_color_list1 );
//--------------------------------
//   Step_6:        find outside loop entities without assistant
entities
          //   check a flag for outside loop process
          if ( count < 1 )    continue;
          MinXvalueEntity = F2dCleanUpFindGroupMinX(
               Entities_change_color_list1);
          if ( MinXvalueEntity == 0 )   continue;
//--------------------------------
//   Step_7:
//   find outside loop entities
          F2dCleanUpFindOutSideLoop( MinXvalueEntity );
//--------------------------------
//   Step_X:
//   change color to Magenta for a selected boundary
         // turn off input levels
         ck_levels(CK_OFF,1,255);
#ifdef CKWIN
          F2dCleanUpChangeColor(Entities_change_color_list1);
#endif
#ifdef VELLUM
     F2dCleanUpChangeDrawingColor(&trim_drawing);
#endif
          //   clear a flag for outside loop process
          assistant_line_flag = 0;
          // turn ON the level used to store the trimmed entities.
         ck_levels(CK_ON,TrimLevel, TrimLevel);
#ifdef CKWIN
```

APPENDIX D

```
     if ( *SwitchRedraw == 1  )    ck_redraw( CK_PRIME_VP );
#endif
     }
     return count;
}

/*
=================================================================
     Function:
     Name :          F2dCleanUpFindGroup
     Description:
          look for a group entities connected with input entity
     Return Value:
               = 0: Completed successfully;
     Parameters:
               Input:
                    Entity: a entity
               Output:
               NodeList: a node list connected with input entity


=================================================================
*/
struct node_list *F2dCleanUpFindGroup(struct node *Entity, int *Cnt
)
{
     //   entities counter and flags
     int count = 0;
     //   link list and temp list
     struct node_list
          *EntitiesList1,
          *Out_temp_list,
          *temp_list,
          *temp_list1,
          *open_temp_list, *open_list;
     //   selected entity and temp entities
     struct node    *Next_entity;

//   initialize
     EntitiesList1 =
     ( struct node_list * ) calloc ( 1, sizeof ( struct node_list
));
     open_list =    ( struct node_list * ) calloc ( 1, sizeof (
struct node_list ));

     //   set a flag for the boundary entity
     count = 0;
     //   set pointer to first entity
     open_list->car = Entity;
     //   set a open flag     to the node
```

APPENDIX D

```
     open_list->car->flags = 1;
     //   set link address
     open_list->cdr = NULL;
     //   set the pointer to output node list
     EntitiesList1->car = open_list->car;
     EntitiesList1->cdr = open_list->cdr;
//--------------------------------
//   Step_3:
//   find connected entities
     for( temp_list = open_list;
          ( temp_list
          //   &&   (temp_list->cdr != 0)
           );
         )     {
          if ( temp_list->car == NULL ) break;
          //   get a pointer from open list
          Next_entity = temp_list->car;
          //   set a closed flag to the node
          Next_entity->flags = 2;
          //   close the node ( delete the node from open list )
          open_list = open_list->cdr;
          //   count the number of entities
          count++;

          // look for first connected entity whose flags=0.
          for (temp_list1=Next_entity->connected_nodes;
          //      temp_list1 && temp_list1->car->flags==1;
                ( temp_list1!=0 &&
                  temp_list1->car!=0 );
                  temp_list1=temp_list1->cdr) {
              if ( temp_list1->car == NULL ) break;
               // if found an unmarked connected entity
               if (temp_list1
                    && temp_list1->car->flags==0
                    &&   Entity->line_type   ==
temp_list1->car->line_type
                    && Entity->color == temp_list1->car->color
                    &&   Entity->is_thickness   ==
temp_list1->car->is_thickness
                  )      {
                    //   allocate memory for open list element
                    open_temp_list = ( struct node_list * ) calloc
( 1, sizeof ( struct node_list ));
                    //   allocate memory for output node list
element
                    Out_temp_list = ( struct node_list * ) calloc
( 1, sizeof ( struct node_list ));

                    //   add this entity to the open list
                    open_temp_list->car = temp_list1->car;
```

APPENDIX D

```
                    //   add this entity to the output node list
                    Out_temp_list->car = temp_list1->car;

                    //   set a open flag     to the node
                    open_temp_list->car->flags = 1;

                    //   connect to the open list
                    open_temp_list->cdr = open_list;
                    //   move the pointer of open list to the top
                    open_list = open_temp_list;
                    //   connect to the output node list
                    Out_temp_list->cdr = EntitiesList1;
                    //   move the pointer of output node list to
the top
                    EntitiesList1 = Out_temp_list;

               }
          }
          //   assign value to the loop variable
          temp_list = open_list;
     }
     *Cnt = count;
     return EntitiesList1;
}


/*
=================================================================
     Function:
     Name :         F2dCleanUpArcAngle
     Description:
               compute a arc type entity's angle.
     Return Value:
               RotateVertexFlag: direction flag
                    =1: vertex1 is rotate point
                    =2: vertex2 is rotate point
     Parameters:
               Input:
                    1 OriginVertex: rotationary vertex
                    2 Entity: arc type entity
               Output:
                    1 EntityAngle: direction angle ( radian )
                    2 EntityAngleAnother: another side direction
angle
================================================================
*/
int F2dCleanUpArcAngle(
          //   input
```

APPENDIX D

```
          struct    planar_vertex *OriginVertex,
          struct    node *Entity,
          //   output
          double    *EntityAngle,
          double    *EntityAngleAnother )
{
//   return value
     int  RotateVertexFlag=0;
//   length and angle
     double    Tolerance = 0.0;
     //   set tolerance
     Tolerance = F2dCleanUpTolerance;

     //   select connected side of entity
     if ( Entity->vertex1 == OriginVertex )  {
          //   get arc start-angle
          //        ( direction : from circle-center to start-point
)
          RotateVertexFlag    = 1;
          *EntityAngle   = ( Entity->AngBegin ) * pi / 180.0;
          //   change angle to oppsite direction
          //        ( direction : from start-point to circle-center
)
          *EntityAngle   = *EntityAngle + pi;
          //   check angle
          if ( *EntityAngle >(2.0*pi)) *EntityAngle = *EntityAngle
- 2.0*pi;
          if ( fabs(*EntityAngle-2.0*pi) < Tolerance ) *EntityAngle
= 0.0;
          //   compute tangent     line angle for the arc end-angle
          //        ( direction : from start-point to end-point )
          *EntityAngle = *EntityAngle + 1.5 * pi;
          //   check angle
          if ( *EntityAngle >(2.0*pi)) *EntityAngle = *EntityAngle
- 2.0*pi;
          if ( fabs(*EntityAngle-2.0*pi) < Tolerance ) *EntityAngle
= 0.0;
          //   get another side data
          //   get arc start-angle
          //        ( direction : from circle-center to end-point
)
          *EntityAngleAnother      =  (  Entity->AngEnd  )  *  pi  /
180.0;
          //   change angle to oppsite direction
          //        ( direction : from end-point to circle-center
)
          *EntityAngleAnother      = *EntityAngleAnother + pi;
          //   check angle
          if ( *EntityAngleAnother > 2.0*pi )
*EntityAngleAnother = *EntityAngleAnother - 2.0 * pi;
```

APPENDIX D

```
          else if ( fabs(*EntityAngleAnother-2.0*pi) < Tolerance )
*EntityAngleAnother = 0.0;
          //   compute tangent     line angle for the arc end-angle
          //        ( direction : from end-point to start-point )
          *EntityAngleAnother      = *EntityAngleAnother + 0.5 *
pi;
          //   check angle
          if ( *EntityAngleAnother > 2.0*pi )
*EntityAngleAnother = *EntityAngleAnother - 2.0 * pi;
          else if ( fabs(*EntityAngleAnother-2.0*pi) < Tolerance )
*EntityAngleAnother = 0.0;
     }
     else {
          //   get arc end-angle
          //        ( direction : from circle-center to end-point
)
          RotateVertexFlag    = 2;
          *EntityAngle        = ( Entity->AngEnd ) * pi / 180.0;
          //   change angle to oppsite direction
          //        ( direction : from end-point to circle-center
)
          *EntityAngle   = *EntityAngle + pi;
          if ( *EntityAngle > 2.0*pi ) *EntityAngle = *EntityAngle
- 2.0*pi;
          if ( fabs(*EntityAngle - 2.0*pi) < Tolerance )
*EntityAngle = 0.0;
          //   compute tangent     line angle for the arc end-angle
          //        ( direction : from end-point to start-point )
          *EntityAngle   = *EntityAngle + 0.5 * pi;
          if ( *EntityAngle > 2.0*pi ) *EntityAngle = *EntityAngle
- 2.0*pi;
          if ( fabs(*EntityAngle - 2.0*pi) < Tolerance )
*EntityAngle = 0.0;
          //   get another side data
          //   get arc start-angle
          //        ( direction : from circle-center to start-point
)
          *EntityAngleAnother      = ( Entity->AngBegin ) * pi /
180.0;
          //   change angle to oppsite direction
          //        ( direction : from start-point to circle-center
)
          *EntityAngleAnother      = *EntityAngleAnother + pi;
          if ( *EntityAngleAnother > 2.0*pi )
*EntityAngleAnother = *EntityAngleAnother - 2.0 * pi;
          if ( fabs(*EntityAngleAnother - 2.0*pi ) < Tolerance )
*EntityAngleAnother = 0.0;
          //   compute tangent     line   angle   for   the   arc
start-angle
          //        ( direction : from start-point to end-point )
```

APPENDIX D

```
          *EntityAngleAnother      = *EntityAngleAnother + 1.5 *
pi;
          if ( *EntityAngleAnother > 2.0*pi )
*EntityAngleAnother = *EntityAngleAnother - 2.0 * pi;
          if ( fabs(*EntityAngleAnother - 2.0*pi ) < Tolerance )
*EntityAngleAnother = 0.0;
     }
     //   the end of this function
     return RotateVertexFlag;
}

/*
=================================================================
     Function:
     Name :         F2dCleanUpLineAngle
     Description:
               It is a function for control how to compute a line
               type entity's angle.
     Return Value:
               RotateVertexFlag: direction flag
                    =1: vertex1 is rotate point
                    =2: vertex2 is rotate point
     Parameters:
               Input:
                    1 OriginVertex: rotationary vertex
                    2 Entity: line type entity
               Output:
                    1 EntityAngle: direction angle ( radian )
                    2  EntityAngleAnother: another side direction
angle
================================================================
*/
int F2dCleanUpLineAngle(
          //   input
          struct    planar_vertex *OriginVertex,
          struct    node *Entity,
          //   output
          double    *EntityAngle,
          double    *EntityAngleAnother
     )
{
     //   return value
     int  RotateVertexFlag=0;
     //   selected entity and temp entities
     struct planar_vertex
          *VertexTemp,
          *VertexAnotherTemp;
//   length and angle
     double    diff_x = 0.0,
```

APPENDIX D

```
                diff_y = 0.0,
                Tolerance = 0.0;
        //   set tolerance
        Tolerance = F2dCleanUpTolerance;
        //   select connected side of entity
        if ( Entity->vertex1 == OriginVertex )  {
             //   get vertex1->vertex2
             RotateVertexFlag    = 1;
             VertexTemp                = Entity->vertex1;
             VertexAnotherTemp   = Entity->vertex2;
        }
        else {  //     get vertex2->vertex1
             RotateVertexFlag    = 2;
             VertexTemp                = Entity->vertex2;
             VertexAnotherTemp   = Entity->vertex1;
        }
        //   compute angle
        if ( fabs( VertexTemp->X - VertexAnotherTemp->X ) < Tolerance
)       {
             //   angle = 0.5 * pi
             if  ( VertexTemp->Y < VertexAnotherTemp->Y )
                       *EntityAngle = 0.5 * pi;
             //   angle = 1.5 * pi
             else *EntityAngle = 1.5 * pi;
        }
        else {  //     -pi  < angle < pi
             diff_y = VertexAnotherTemp->Y - VertexTemp->Y;
             if ( fabs( diff_y ) > Tolerance )  {
                  diff_x = VertexAnotherTemp->X - VertexTemp->X;
                  *EntityAngle = atan2( diff_y, diff_x );
                  //   -pi < angle < 0.0
                  if    (   *EntityAngle   <   0.0   )   *EntityAngle   =
*EntityAngle + 2.0*pi;
             }
             else {  //     angle = 0.0    or pi
                  if ( VertexAnotherTemp->X > VertexTemp->X )
*EntityAngle = 0.0;
                  else *EntityAngle = pi;
             }
        }
        if  ( fabs(*EntityAngle - 2.0*pi) < Tolerance ) *EntityAngle =
0.0;
        //   get another side angle
        *EntityAngleAnother = *EntityAngle + pi;
        //  check angle
        if  ( *EntityAngleAnother > ( 2.0 * pi ) )    {
             *EntityAngleAnother = *EntityAngleAnother - 2.0 * pi;
        }
        if  ( fabs(*EntityAngleAnother - 2.0*pi) < Tolerance ) {
             *EntityAngleAnother = 0.0;
```

APPENDIX D

```
     }
     //   the end of this function
     return RotateVertexFlag;
}

/*
=================================================================
     Function:
     Name :          F2dCleanUpChangeColor
     Description:
               It is a function for changing entity's color.
     Return Value:
               = 0: Completed successfully;
     Parameters:
               Input:
                    Entities_change_color_list: a node list that
will be changed color
=================================================================
*/
int    F2dCleanUpChangeColor(struct   node_list
*Entities_change_color_list)
{
     //   link list and temp list
     struct node_list
          *Color_temp_list;
     //   selected entity and temp entities
     struct node
          *Next_entity;
     //   entity's specifitys
     CK_ENTATT attr;     //   specificity of entities

     int CountPrompt = 0;
     char message[64];

#ifdef VELLUM
          CountPrompt++;
          sprintf(  message,"Start  Change  Color  Entity  %d",
CountPrompt );
          ck_prompt( message );
#endif

#ifdef VELLUM
    // clear views highlighting
    ck_erase_level("VW_2D");
//    ck_erase_level("VW_TRIM");
#endif

     //   check all of entities on the list
     for( Color_temp_list=Entities_change_color_list;
```

APPENDIX D

```
             Color_temp_list;
             Color_temp_list = Color_temp_list->cdr)     {
            if ( Color_temp_list->car == NULL )     break;
            Next_entity = Color_temp_list->car;
            switch ( Next_entity->flags )
            {
                 case 1:
                      attr.color = CK_GREEN;
                      ck_setattr( Next_entity->id, CK_COLOR, NULL,
&attr );
                      break;
                 case 3:
                      attr.color = CK_GRAY;
                      ck_setattr( Next_entity->id, CK_COLOR, NULL,
&attr );
                      break;
                 case 4:
                      attr.color = CK_MAGENTA;
                      ck_setattr( Next_entity->id, CK_COLOR, NULL,
&attr );
                      break;
            }
      }

#ifdef VELLUM
            CountPrompt++;
            sprintf(  message,"Finished  change  color  Entity  %d",
CountPrompt );
            ck_prompt( message );
#endif
      return 0;
}

/*

=================================================================
      Function:
      Name :          F2dCleanUpChangeDrawingColor
      Description:
                 It is a function for changing entity's color.
      Return Value:
                 = 0: Completed successfully;
      Parameters:
                 Input:
                      1 In_drawing: drawing that will be
                           changed color
=================================================================
*/
int F2dCleanUpChangeDrawingColor(struct drawing *In_drawing)
{
```

APPENDIX D

```
     //   extern functions
     void draw_entity();
     //   selected entity and temp entities
     struct node *entity;
     int CountPrompt = 0;
     char message[64];

     //   entity's specifitys
     CK_ENTATT attr;      //   specificity of entities

#ifdef VELLUM
    // clear views highlighting
    ck_erase_level("VW_2D");
//    ck_erase_level("VW_TRIM");
          CountPrompt++;
          sprintf( message,"Start Change Color Sheet Entity %d",
CountPrompt );
          ck_prompt( message );
#endif
     //   check all of entities on the list
     for( entity=In_drawing->objects;
           entity;
           entity = entity->next)  {
          switch ( entity->flags )
          {
#ifdef VELLUM
               case 0:
                    draw_entity( entity, entity->color );
                    break;
               case 1:
                    draw_entity( entity, CK_GREEN );
                    break;
               case 2:
                    draw_entity( entity, entity->color );
                    break;
               case 3:
                    draw_entity( entity, CK_BLUE );
                    break;
               case 4:
                    draw_entity( entity, CK_MAGENTA );
                    break;
               case 5:
                    draw_entity( entity, entity->color );
                    break;
               case 6:
                    draw_entity( entity, CK_RED );
                    break;
               case 7:
                    draw_entity( entity, CK_YELLOW );
                    break;
```

APPENDIX D

```
                case 8:
                     draw_entity( entity, entity->color );
                     break;
                case 9:
                     draw_entity( entity, entity->color );
                     break;
                case 10:
                     draw_entity( entity, CK_CYAN );
                     break;
                case 11:
                     draw_entity( entity, entity->color );
                     break;
 #endif
 #ifdef CKWIN
                case 1:
                     attr.color = CK_L_GREEN;
                     ck_setattr( entity->id, CK_COLOR, NULL, &attr
);
                     break;
                case 3:
                     attr.color = CK_L_GRAY;
                     ck_setattr( entity->id, CK_COLOR, NULL, &attr
);
                     break;
                case 4:
                     attr.color = CK_MAGENTA;
                     ck_setattr( entity->id, CK_COLOR, NULL, &attr
);
                     break;
                case 6:
                     attr.color = CK_L_RED;
                     ck_setattr( entity->id, CK_COLOR, NULL, &attr
);
                     break;
                case 7:
                     attr.color = CK_YELLOW;
                     ck_setattr( entity->id, CK_COLOR, NULL, &attr
);
                     break;
                case 10:
                     attr.color = CK_L_CYAN;
                     ck_setattr( entity->id, CK_COLOR, NULL, &attr
);
                     break;
#endif
          }
          if ( entity->next == NULL )   break;
     }

#ifdef VELLUM
```

APPENDIX D

```
          CountPrompt++;
          sprintf( message,"Finished change color Sheet Entity %d",
CountPrompt );
          ck_prompt( message );
#endif
     return 0;
}

/*

=================================================================
     Function:
     Name :         F2dCleanUpUndoPre
     Description:
               To prepare data flags for undo function.
     Return Value:
               = 0: Completed successfully;
     Parameters:
               Input:
                    1  In_drawing:  drawing  that  will  be  changed
status
=================================================================
*/
int F2dCleanUpUndoPre(struct drawing *In_drawing)
{
     //   selected entity and temp entities
     struct node *entity;

     //   set flag
     F2dCleanUpExcutedNo = 2;
     //   check all of entities on the list
     for(   entity=In_drawing->objects;      entity;   entity   =
entity->next)  {
          entity->status = entity->flags;
          if  ( entity->next == NULL )       break;
     }
     return 0;
}

/*

=================================================================
     Function:
     Name :         F2dCleanUpUndo
     Description:
               To undo.
     Return Value:
               = 0: Completed successfully;
     Parameters:
               Input:
```

APPENDIX D

```
                    1 In_drawing: drawing that will be undoed
status
=================================================================
*/
int F2dCleanUpUndo(struct drawing *In_drawing)
{
     //   selected entity and temp entities
     struct node *entity;
     //   flag
     int NoChangeFlag = 0;


     //   check flag
     if ( F2dCleanUpExcutedNo == 0 )        return NoChangeFlag;
     //   check all of entities on the list
     for(   entity=In_drawing->objects;     entity;   entity   =
entity->next)  {
          if ( entity->status != entity->flags )  {
               NoChangeFlag = 1;
               entity->flags = entity->status;
          }
          if ( entity->next == NULL )       break;
     }
     //   check views flag
     if ( F2dCleanUpExcutedNo == 1 )        In_drawing->views   =
NULL;
     //   reset flag for views
     F2dCleanUpExcutedNo = 0;

     return NoChangeFlag;
}

/*
=================================================================
     Function:
     Name :         F2dCleanUpChangeDrawingFlag
     Description:
               It is a function for changing entity's flag.
     Return Value:
               = 0: Completed successfully;
     Parameters:
               Input:
                    1 In_drawing: drawing that will be
                    changed color
=================================================================
*/
int F2dCleanUpChangeDrawingFlag(struct drawing *In_drawing)
{
     //   selected entity and temp entities
```

APPENDIX D

```
     struct node *entity;
     int CountPrompt = 0;
     char message[64];

#ifdef VELLUM
          CountPrompt++;
          sprintf(  message,"Start  Flag  Sheet  Entity  %d",
CountPrompt );
          ck_prompt( message );
#endif
     //   check all of entities on the list
     for( entity=In_drawing->objects;
           entity;
           entity = entity->next)  {
          if ( entity->flags == 4 )  entity->flags = 3;
#ifdef VELLUM
          //CountPrompt++;
          //sprintf( message,"Flag Sheet Entity %d", CountPrompt );
          //ck_prompt( message );
#endif
          if ( entity->next == NULL )        break;
     }
#ifdef VELLUM
          CountPrompt++;
          sprintf(  message,"Finished  Flag  Sheet  Entity  %d",
CountPrompt );
          ck_prompt( message );
#endif
     return 0;
}

/*
=================================================================
     Function:
     Name :         F2dCleanUpFindSameColorEntity
     Description:
               find same color entity.
     Return Value:
               = 0: Completed successfully;
     Parameters:
               Input:
                    1 In_entity:  an entity
                    2 In_drawing: drawing that will be
                         changed color
=================================================================
*/
int F2dCleanUpFindSameColorEntity(
     struct node    *In_entity,
     struct drawing      *In_drawing)
{
```

APPENDIX D

```
     //   selected entity and temp entities
     struct node *entity;

     int CountPrompt = 0;
char message[64];

#ifdef VELLUM
          CountPrompt++;
          sprintf( message,"Start Find same color Entity %d",
CountPrompt );
          ck_prompt( message );
#endif
     //   check all of entities on the list
     for( entity=In_drawing->objects;
           entity;
           entity = entity->next)  {
          if ( entity->color == In_entity->color
               && entity->flags == 0) entity->flags = 3;
          if ( entity->next == NULL )   break;
     }

#ifdef VELLUM
          CountPrompt++;
          sprintf( message,"Finished find same color Entity %d",
CountPrompt );
          ck_prompt( message );
#endif

     return 0;
}

/*
=================================================================
     Function:
     Name :          F2dCleanUpClearDrawingEntity
     Description:
               It is a function for return entity's color.
     Return Value:
               = 0: Completed successfully;
     Parameters:
               Input:
                    1 In_drawing: drawing that will be
                        changed color
==============================================================
*/
int F2dCleanUpClearDrawingEntity(struct drawing *In_drawing)
{
     //   selected entity and temp entities
     struct node *entity;
```

APPENDIX D

```
     //   entity's specifitys
     CK_ENTATT attr;     //   specificity of entities

     int CountPrompt = 0;
     char message[64];

#ifdef VELLUM
    // clear views highlighting
    ck_erase_level("VW_2D");
//    ck_erase_level("VW_TRIM");
//        CountPrompt++;
//        sprintf( message,"Start Clear Entity %d", CountPrompt );
//        ck_prompt( message );
#endif

     //   check all of entities on the list
     for( entity=In_drawing->objects;
           entity;
           entity = entity->next)  {
          if ( entity == NULL )    break;
          switch ( entity->flags )
          {
               case 0:
               case 1:
               case 2:
               case 3:
               case 4:
               case 5:
               case 6:
               case 7:
               case 8:
               case 9:
               case 10:
                    entity->flags = 0;
                    draw_entity( entity, entity->color );
                    //attr.color = entity->color;
                    //ck_setattr( entity->id, CK_COLOR, NULL, &attr
);
               default:  break;
          }
     }

#ifdef VELLUM
//        CountPrompt++;
//        sprintf( message,"Finished clear Entity %d", CountPrompt
);
//        ck_prompt( message );
#endif
     //   clear views connected
     In_drawing->views = NULL;
```

APPENDIX D

```
     return 0;
}

/*
=================================================================
     Function:
     Name :         F2dCleanUpClearDrawingKeepFlags
     Description:
               To return entity's color but keep flags.
     Return Value:
               = 0: Completed successfully;
     Parameters:
               Input:
                    1 In_drawing: drawing that will be
                         changed color
=================================================================
*/
int F2dCleanUpClearDrawingKeepFlags(struct drawing *In_drawing)
{
     //   selected entity and temp entities
     struct node *entity;
     //   entity's specifitys
     CK_ENTATT attr;     //   specificity of entities

     int CountPrompt = 0;
     char message[64];

#ifdef VELLUM
    // clear views highlighting
    ck_erase_level("VW_2D");
#endif
     //   check all of entities on the list
     for( entity=In_drawing->objects;
           entity;
           entity = entity->next)  {
          switch ( entity->flags )
          {
               case 0:
               case 1:
               case 2:
               case 3:
               case 4:
               case 5:
               case 6:
               case 7:
               case 8:
               case 9:
               case 10:  //   center line
```

APPENDIX D

```
                    draw_entity( entity, entity->color );
                    //attr.color = entity->color;
                    //ck_setattr( entity->id, CK_COLOR, NULL, &attr
);
          }
          if ( entity->next == NULL )   break;
     }
     return 0;
}

/*
=================================================================
     Function:
     Name :         F2dCleanUpDeleteViews
     Description:
               It is a function for delete views.
     Return Value:
               = 0: Completed successfully;
     Parameters:
               Input:
                    1 In_drawing: drawing
=================================================================
*/
int F2dCleanUpDeleteViews(struct drawing *In_drawing)
{
     //   check drawing
     if ( In_drawing == NULL )     return 0;

     //   delete views ( Not release memory )
     In_drawing->views == NULL;
     return 0;
}

/*

=================================================================
     Function:
     Name :         F2dCleanUpDeleteDrawingEntity
     Description:
               It is a function for delete entities.
     Return Value:
               = 0: Completed successfully;
     Parameters:
               Input:
                    1 In_drawing: drawing

=================================================================
*/
int F2dCleanUpDeleteDrawingEntity(struct drawing *In_drawing)
{
```

APPENDIX D

```
     //   selected entity and temp entities
     struct node *entity;
     struct group *Gp;        //   group
     struct node_list *ETL;   //   Entity Temp List
     int       CountPrompt = 0;
     char message[64];

#ifdef VELLUM
          CountPrompt++;
          sprintf( message,"Start Delete Entity %d", CountPrompt );
          ck_prompt( message );
#endif
     //   check all of entities on the list
     for( entity=In_drawing->objects;
           entity;
           entity = entity->next)   {
          if ( entity->flags == 3 || entity->flags == 6
            || entity->flags == 0 || entity->flags == 10 )   {
#ifdef CKWIN
               ck_delent( entity->id );
#endif
#ifdef VELLUM
//             remove_entity ( entity,  In_drawing );
#endif
               entity->flags = 99;
          }
          if ( entity->next == NULL )   break;
     }
     if ( In_drawing->views == NULL )   return 0;
     //   unuse group entities
     for( Gp=In_drawing->views; Gp; Gp = Gp->next)     {
          if ( Gp == NULL )   break;
          if ( Gp->index != 0 )         continue;
          for ( ETL = Gp->entities; ETL; ETL = ETL->cdr )    {
#ifdef CKWIN
               ck_delent( ETL->car->id );
#endif
#ifdef VELLUM
 //            remove_entity ( ETL->car,  In_drawing );
#endif
                    ETL->car->flags = 99;
                    if ( ETL->cdr == NULL )  break;
          }
          if ( Gp->next == NULL )  break;
     }

#ifdef VELLUM
          CountPrompt++;
          sprintf( message,"Finished Delete Entity %d", CountPrompt
);
```

APPENDIX D

```
          ck_prompt( message );
#endif
     return 0;
}

/*
=================================================================
     Function:
     Name :          F2dCleanUpCheckEntityExist
     Description:
               check an entity for current drawing
               if the entity is not same to database, drawing was
changed
     Return Value:
               = 0: No change;
               = 1: Changed;
     Parameters:
               Input:
                    1 In_drawing: drawing
=================================================================
*/
int F2dCleanUpCheckEntityExist(struct drawing *In_drawing)
{
     //   selected entity and temp entities
     struct node *entity;
     //   define
     int ReturnCode = 0, etype = 0;
     double    x1=0.0,y1=0.0,z1=0.0,x2=0.0,y2=0.0,z2=0.0,
               rad=0.0,ang1=0.0,ang2=0.0;
     //   entity's specifitys
     CK_ENTATT attr;     //   specificity of entities


     //   check all of entities on the list
     if ( In_drawing->objects == NULL )   return  1;
     for( entity=In_drawing->objects;
           entity;
           entity = entity->next)  {
          if ( entity->flags == 99 )          continue;
          ReturnCode = ck_getentid( entity->id, &etype );
          if ( ReturnCode == CK_NO_ENT )     return    1;
          else {
               //   check all of entities on the list
               switch ( entity->type )
               {
                    case CK_ARC:   ck_getarc     (    entity->id,
&x1,&y1,&z1,
                                                  &rad,&ang1,&ang2,
```

APPENDIX D

```
&attr );
                                    break;
                   case CK_LINE:  ck_getline(   entity->id,
&x1,&y1,&z1,
                                              &x2,&y2,&z2, &attr );
                                    break;
               }
               if ( attr.level == 191 ) return    0;
               else                          return    1;
          }
          if ( entity->next == NULL )   break;
     }
     return 1;
}

/*
=================================================================
     Function:
     Name :         F2dCleanUpChangeArrowVertexFlag
     Description:
               to change arrow top vertex's flags
               and set arrow center line coordinates.
     Return Value:
               = 0: Completed successfully;
     Parameters:
               Input:
                    1 Flags: flag
                    2 TopVertex: arrow top vertex
                    3 Entity: arrow center line entity
=================================================================
*/
int F2dCleanUpChangeArrowVertexFlag(
          //   input
          int  *flags,
          struct    planar_vertex *TopVertex,
          struct    node *Entity)
{
     //   set flag to arrow top vertex
     TopVertex->flags = *flags;
     //   set arrow center line coordinates
     TopVertex->ArrowCenterLine_X1 = Entity->X1;
     TopVertex->ArrowCenterLine_Y1 = Entity->Y1;
     TopVertex->ArrowCenterLine_Z1 = Entity->Z1;
     TopVertex->ArrowCenterLine_X2 = Entity->X2;
     TopVertex->ArrowCenterLine_Y2 = Entity->Y2;
     TopVertex->ArrowCenterLine_Z2 = Entity->Z2;
     //   end
     return 0;
```

APPENDIX D

```
}

/*
=================================================================
     Function:
     Name :         F2dCleanUpFindArrowCenterEntity
     Description:
               to find arrow center line
               and set flags to arrow's members.
     Return Value:
               = 0: No arrow;
               = 1: Arrow
     Parameters:
               Input:
                    1 Nodes: connected node
                    2 TopVertex: arrow top vertex
                    3 StartEntity: arrow start line entity
                    4 EndEntity: arrow end line entity
                    5 CenterLineAngleTemp: arrow center line angle

=================================================================
*/
int F2dCleanUpFindArrowCenterEntity(
          //   input
          struct    node_list *Nodes,
          struct    planar_vertex *TopVertex,
          struct    node *StartEntity,
          struct    node *EndEntity,
          double    *CenterLineAngleTemp )
{
//   external functions
     int F2dCleanUpLineAngle();
     int F2dCleanUpChangeChildrenFlag();
     int F2dCleanUpChangeArrowVertexFlag();
     double F2dCleanUpLineLength();
//   nodes
     struct    node *CenterEntity;
//   link list and temp list
     struct node_list    *temp_list;
//   flags
     int ReturnFlag = 0,
          ArrowFlags = 3;
//   double
     double    CenterParentLength = 0.0,
               CenterParentAngle = 0.0,
               CenterParentAngleAnother = 0.0;
     double    Tolerance = 0.0;
     //   set value
     Tolerance = F2dCleanUpTolerance;
     //    look for arrow center line
```

APPENDIX D

```
     for( temp_list = Nodes;
            temp_list;
            temp_list = temp_list->cdr)  {
          //   check pointer address
          if ( StartEntity == temp_list->car
            || EndEntity == temp_list->car   )    continue;
          //   get new entity
          CenterEntity = temp_list->car;
          //   check flags
//        if ( CenterEntity->flags   != 2
//             && CenterEntity->flags != 3 ) continue;
          if ( CenterEntity->type != CK_LINE )    continue;
          if ( CenterEntity->line_type     != StartEntity->line_type
               && CenterEntity->color                    !     =
StartEntity->color
               &&    CenterEntity->is_thickness     !=
StartEntity->is_thickness )
                    continue;
          if ( CenterEntity->no_connected_1 < 2
               && CenterEntity->no_connected_2 < 2 )   continue;
        //   check length
          CenterParentLength    =    F2dCleanUpLineLength(
CenterEntity->parent );
          if ( CenterParentLength < Tolerance )   continue;
          //   arrow central-entity angle
          F2dCleanUpLineAngle(
               //   input
               TopVertex, CenterEntity->parent,
               //   output
               &CenterParentAngle, &CenterParentAngleAnother );
          //   check the angle for central entity
          if ( fabs( CenterParentAngle - *CenterLineAngleTemp )
               > Tolerance )       continue;
          //   set flags for arrow's entities
          ReturnFlag = 1;
          //   look for arrow entity's children
          F2dCleanUpChangeChildrenFlag( StartEntity->parent );
          F2dCleanUpChangeChildrenFlag( EndEntity->parent );
          F2dCleanUpChangeChildrenFlag( CenterEntity->parent );
          //   set flag to arrow top vertex
          F2dCleanUpChangeArrowVertexFlag( &ArrowFlags,
               TopVertex, CenterEntity );
          return ReturnFlag;
          if ( temp_list->cdr == NULL ) break;
     }
     return ReturnFlag;
}

/*
```

APPENDIX D

```
================================================================
     Function:
     Name :         F2dCleanUpFindArrowOneSideOpenEntity
     Description:
               to find one side open entity
     Return Value:
               = 0: No open;
               = 1: open
               = 2: open
     Parameters:
               Input:
                    1 Nodes: connected node
===============================================================
*/
int F2dCleanUpFindArrowOneSideOpenEntity( struct node_list *Nodes
)
{
//   link list and temp list
     struct node_list    *temp_list;
//   entities counter and flags
     int open_entity_flag = 0;
//   start
     for( temp_list = Nodes;
          temp_list;
          temp_list = temp_list->cdr)    {
          //   ckeck another side connected's counter
          if ( temp_list->car->no_connected_1 == 0
            && temp_list->car->no_connected_2 > 1 )      {
               open_entity_flag = 1;
               break;
          }
          if ( temp_list->car->no_connected_2 == 0
            && temp_list->car->no_connected_1 > 1 )      {
               open_entity_flag = 2;
               break;
          }
          if ( temp_list->cdr == NULL ) break;
     }
     return open_entity_flag;
}

/*

================================================================
     Function:
     Name :         F2dCleanUpCheckStartEndEntity
     Description:
               to check start and end entities
     Return Value:
               = 0: No arrow;
```

APPENDIX D

```
                = 1: good
     Parameters:
                Input:
                     1 StartEntity: arrow start line entity
                     2 EndEntity: arrow end line entity

=================================================================
*/
int F2dCleanUpCheckStartEndEntity(
          //   input
          struct    node *StartEntity,
          struct    node *EndEntity )
{
//   external functions
     double F2dCleanUpLineLength();
//   double
     double    arrow_start_parent_length = 0.0,
               arrow_end_parent_length = 0.0,
               arrow_tolerance = 0.0;
     //   set tolerance
     arrow_tolerance = F2dCleanUpTolerance;

     //   start
          //   compute entities' parent length
     arrow_start_parent_length = F2dCleanUpLineLength( StartEntity
);
     arrow_end_parent_length  = F2dCleanUpLineLength( EndEntity );
     //   check length
     if ( arrow_start_parent_length < arrow_tolerance )     return
0;
     if ( arrow_end_parent_length < arrow_tolerance )  return 0;
     //   check tloerance
     if ( fabs( arrow_start_parent_length - arrow_end_parent_length
)
               > arrow_tolerance ) return 0;
     //   check angle    :    if entities are parallel, STOP
     if (sqrt(fabs((( StartEntity->X1 - StartEntity->X2 )
                    * ( EndEntity->Y1   - EndEntity->Y2 ))
                    -(( EndEntity->X1   - EndEntity->X2 )
                    * ( StartEntity->Y1 - StartEntity->Y2 ))
          ))   < arrow_tolerance ) return 0;
     //   normal end
     return 1;
}

/*
=================================================================
     Function:
     Name :         F2dCleanUpComputeCenterLineAngle
```

APPENDIX D

```
     Description:
               to compute center line angle
     Return Value:
               = 0: No arrow;
               = 1: good
     Parameters:
               Input:
                    1 TopVertex: arrow top vertex
                    2 StartEntity: arrow start line entity
                    3 EndEntity: arrow end line entity
               Output:
                    1 CenterLineAngle: arrow center line angle

================================================================
*/
int F2dCleanUpComputeCenterLineAngle(
          //   input
          struct    planar_vertex *TopVertex,
          struct    node *StartEntity,
          struct    node *EndEntity,
          //   output
          double    *CenterLineAngle )
{
//   external functions
     int F2dCleanUpLineAngle();
//   entities counter and flags
     int ReturnFlag = 0;
//   double
     double    arrow_start_parent_angle = 0.0,
               arrow_end_parent_angle = 0.0,
               arrow_center_diff_angle = 0.0,
               RotateAxisAngleAnotherTemp = 0.0,
               arrow_center_parent_angle_temp = 0.0,
               arrow_tolerance = 0.0;
     //   set tolerance
     arrow_tolerance = F2dCleanUpTolerance;

     //   start
     //        compute central angle of arrow
     //
     //        angle_center = 0.5 * ( angle_start + angle_end )
     //        atan2 returns the arctangent of y/x
     //        atan2  returns  a  value  in  the  range  -pi  to  pi
radians
     //   get arrow start angle
     F2dCleanUpLineAngle(
          //   input
          TopVertex, StartEntity,
          //   output
          &arrow_start_parent_angle,&RotateAxisAngleAnotherTemp);
```

APPENDIX D

```
    //   arrow end angle
    F2dCleanUpLineAngle(
         //   input
         TopVertex, EndEntity,
         //   output
         &arrow_end_parent_angle, &RotateAxisAngleAnotherTemp);
    //   get difference angle
    arrow_center_diff_angle = fabs( arrow_end_parent_angle                                                                      -
arrow_start_parent_angle );
    //   same angle
    if ( arrow_center_diff_angle < arrow_tolerance )  return 0;
    if ( arrow_center_diff_angle < pi )         {
    //   diff < pi
         arrow_center_parent_angle_temp = 0.5 * (
              arrow_end_parent_angle + arrow_start_parent_angle );
    }
    else {
    //   diff > pi ( take opposite angle )
         arrow_center_parent_angle_temp = 0.5 * (
              arrow_end_parent_angle + arrow_start_parent_angle )
+ pi;
         //   angle > 2*pi
         if ( fabs ( arrow_center_parent_angle_temp - 2.0 * pi )
              < arrow_tolerance ) {
              arrow_center_parent_angle_temp = 0.0;
         }
         else {
              if ( arrow_center_parent_angle_temp > ( 2.0 * pi )
)    {
                   arrow_center_parent_angle_temp =
                        arrow_center_parent_angle_temp - 2.0 * pi;
              }
         }
    }
    *CenterLineAngle = arrow_center_parent_angle_temp;
    //   normal end
    return 1;
}

/*
=================================================================
    Function:
    Name :          F2dCleanUpFindArrowEndEntity
    Description:
              to find arrow end line
    Return Value:
              = 0: No arrow;
              = 1: Arrow
```

APPENDIX D

```
     Parameters:
               Input:
                    1 Nodes: connected node
                    2 TopVertex: arrow top vertex
                    3 StartEntity: arrow start line entity

=================================================================
*/
int F2dCleanUpFindArrowEndEntity(
          //   input
          struct    node_list *Nodes,
          struct    planar_vertex *TopVertex,
          struct    node *StartEntity )
{
//   external functions
     int F2dCleanUpFindArrowOneSideOpenEntity();
     int F2dCleanUpComputeCenterLineAngle();
     int F2dCleanUpCheckStartEndEntity();
     int F2dCleanUpFindArrowCenterEntity();
//   link list and temp list
     struct node_list    *temp_list;
//   selected entity and temp entities
     struct node
          *Next_entity,
          *arrow_start_entity_parent,
          *arrow_end_entity,
          *arrow_end_entity_parent;

//   entities counter and flags
     int assistant_line_flag = 0,
          ReturnFlag = 0;
//   double
     double    arrow_center_parent_angle_temp = 0.0;

     //   start
     for( temp_list=Nodes;
           temp_list;
           temp_list = temp_list->cdr)  {
          if ( temp_list->car == NULL ) break;
          Next_entity = temp_list->car;
          arrow_end_entity = temp_list->car;
//        if ( Next_entity->flags != 2 )     continue;
          if ( Next_entity->type != CK_LINE )     continue;
          if  ( Next_entity->line_type  !=  StartEntity->line_type
)    continue;
          if ( Next_entity->color != StartEntity->color )
continue;
          if    (    Next_entity->is_thickness    !=
StartEntity->is_thickness )  continue;
          //   set parent
```

APPENDIX D

```
          arrow_start_entity_parent = StartEntity->parent;
          arrow_end_entity_parent   = Next_entity->parent;
          //   look for broken entity's another side
          ReturnFlag = F2dCleanUpFindArrowOneSideOpenEntity(
               arrow_end_entity_parent->children );
          if ( ReturnFlag == 0 )   continue;
          //   check parents entities
          ReturnFlag = F2dCleanUpCheckStartEndEntity(
               //   input
               arrow_start_entity_parent, arrow_end_entity_parent
);
          if ( ReturnFlag == 0 )   continue;
//        look for central entity  of arrow
          ReturnFlag = F2dCleanUpComputeCenterLineAngle(
               //   input
               TopVertex,   arrow_start_entity_parent,
arrow_end_entity_parent,
               //   output
               &arrow_center_parent_angle_temp );
          if ( ReturnFlag == 0 )   continue;
          //   get central entity of arrow
          assistant_line_flag = F2dCleanUpFindArrowCenterEntity(
               //   input
               Nodes, TopVertex, StartEntity, arrow_end_entity,
               &arrow_center_parent_angle_temp );
          return assistant_line_flag;
     }
     return assistant_line_flag;
}
/*
=================================================================
     Function:
     Name :         F2dCleanUpChangeChildrenFlag
     Description:
               It is a function for changing entity's children
flags.
     Return Value:
               = 0: Completed successfully;
     Parameters:
               Input:
=================================================================
*/
int F2dCleanUpChangeChildrenFlag(struct node *Entity)
{
     //   temp list
     struct node_list
          *Temp_list;

     //   check all of children of the entity
```

APPENDIX D

```
     for( Temp_list=Entity->children;
           Temp_list;
           Temp_list = Temp_list->cdr)  {
          //   change flag to light gray
          Temp_list->car->flags = 3;
          if ( Temp_list->cdr == NULL ) break;
     }
     return 0;
}

/*

=================================================================
     Function:
     Name :          F2dCleanUpLineLength
     Description:
               It is a function for computing line type entity's
length.
     Return Value:
               = length;
     Parameters:
               Input:
                    Entity: a parent entity
================================================================
*/
double F2dCleanUpLineLength(struct node *Entity)
{
//   defination
     double    EntityLength=0.0;
//   compute entities' parent length
     EntityLength  =  sqrt(    (  Entity->X1  -  Entity->X2  )  *  (
Entity->X1 - Entity->X2 )
                               + ( Entity->Y1 - Entity->Y2 ) *    (
Entity->Y1 - Entity->Y2 )      );
     return    EntityLength;
}


/*

=================================================================
     Function:
     Name :          F2dCleanUpFindArrow
     Description:
               look for arrow type entity and set flags to them.
     Return Value:
               = 0: Completed successfully;
     Parameters:
               Input:
                    1  Entities_list:  a  node  list  that  will  be
```

APPENDIX D

```
checked

=================================================================
*/
int F2dCleanUpFindArrow( struct node_list *Entities_list )
{
//    external functions
      int F2dCleanUpLineAngle();
      int F2dCleanUpFindArrowEndEntity();
//    link list and temp list
      struct node_list
           *temp_nodes1,
           *arrow_list,
           *temp_list;
//    selected entity and temp entities
      struct node *Next_entity;
      struct planar_vertex      *top_vertex;

//    entities counter and flags
      int bug_flag = 0,
           ReturnFlag = 0,
           assistant_line_flag = 0;
      int CountPrompt = 0;
      char message[64];

#ifdef VELLUM
           CountPrompt++;
           sprintf(   message,"Start   Find   Arrow   Entity   %d",
CountPrompt );
           ck_prompt( message );
#endif

      //   Step_1:   look for one side open entity
      //                  arrow start entity
      for( temp_list=Entities_list;
            temp_list;
            temp_list = temp_list->cdr)  {
           Next_entity = temp_list->car;
//         if ( Next_entity->flags != 2 ) continue;
           if ( Next_entity->type != CK_LINE ) continue;
           if ( Next_entity->no_connected_1  == 0
                && Next_entity->no_connected_2 < 2 )  continue;
           if ( Next_entity->no_connected_1   < 2
                && Next_entity->no_connected_2 == 0 )  continue;
          //    select entity's side
           if ( Next_entity->no_connected_1 == 0 ) {
                // clear bug_flag
                bug_flag = 0;
                //   look for broken entity's another side
                for( arrow_list = Next_entity->parent->children;
```

APPENDIX D

```
                    arrow_list;
                    arrow_list = arrow_list->cdr) {
                    //   ckeck another side vertex's pointer
                    if ( Next_entity->parent->vertex2 ==
                        arrow_list->car->vertex2 )  {
                        bug_flag = 1;
                        break;
                    }
                    if ( arrow_list->cdr == NULL )     break;
               }
               if ( bug_flag == 1 )     {
                    top_vertex = Next_entity->parent->vertex2;
                    t e m p _ n o d e s 1      =
arrow_list->car->connected_nodes_2;
               }
          }
          else {
               // clear bug_flag
               bug_flag = 0;
               //   look for broken entity's another side
               for( arrow_list = Next_entity->parent->children;
                    arrow_list;
                    arrow_list = arrow_list->cdr) {
                    //   ckeck another side vertex's pointer
                    if ( Next_entity->parent->vertex1 ==
                        arrow_list->car->vertex1 )  {
                        bug_flag = 1;
                        break;
                    }
                    if ( arrow_list->cdr == NULL )     break;
               }
               if ( bug_flag == 1 )     {
                    top_vertex = Next_entity->parent->vertex1;
                    t e m p _ n o d e s 1      =
arrow_list->car->connected_nodes_1;
               }
          }
          if ( bug_flag != 1 )     continue;
          //   get end entity of arrow
          ReturnFlag = F2dCleanUpFindArrowEndEntity(
               //   input
               temp_nodes1, top_vertex, Next_entity );
          if ( ReturnFlag == 1 )   assistant_line_flag = 1;
          if ( temp_list->cdr == NULL ) break;
     }

#ifdef VELLUM
          CountPrompt++;
          sprintf( message,"Finished find arrows Entity %d",
CountPrompt );
```

APPENDIX D

```
          ck_prompt( message );
#endif
     return    assistant_line_flag;
}

/*
=================================================================
     Function:
     Name :         F2dCleanUpFindOneSideOpenEntity
     Description:
               look for one side open entities and
               they are vertical with arrow type entities.
     Return Value:
               = 0: Completed successfully and No found;
               = NUM: Open entities' number
     Parameters:
               Input:
                    1  Entities_list:  a  node  list  that  will  be
checked
================================================================
*/
int    F2dCleanUpFindOneSideOpenEntity(    struct    node_list
*Entities_list )
{
//   external functions
     int F2dCleanUpChangeChildrenFlag();
//   link list and temp list
     struct node_list *temp_list;
//   selected entity and temp entities
     struct node *Next_entity;
//   entities counter and flags
     int count = 0;
//   double
     double    assistant_line_angle = 0.0,
               arrow_tolerance = 0.0;
     int CountPrompt = 0;
     char message[64];
     //   set tolerance
     arrow_tolerance = F2dCleanUpTolerance;


#ifdef VELLUM
          CountPrompt++;
          sprintf( message,"Start Find One side open Entity %d",
CountPrompt );
          ck_prompt( message );
#endif
```

APPENDIX D

```
    // check all of entities which connected with outside loop
    for( temp_list=Entities_list;
           temp_list;
           temp_list = temp_list->cdr)  {
          if ( temp_list->car == NULL ) break;
          Next_entity = temp_list->car;
          //   check flags
//        if ( Next_entity->flags !=2 ) continue;
          //   check vertex' flag
          if ( Next_entity->vertex1->flags != 3
               && Next_entity->vertex2->flags != 3 )  continue;
          //   check lines vertically
          if ( Next_entity->vertex1->flags == 3 )      {
               assistant_line_angle = fabs (
                      ( Next_entity->X1 - Next_entity->X2 )
                    * (  Next_entity->vertex1->ArrowCenterLine_X1
                        -Next_entity->vertex1->ArrowCenterLine_X2
)
                    + ( Next_entity->Y1 - Next_entity->Y2 )
                    * (  Next_entity->vertex1->ArrowCenterLine_Y1
                        -Next_entity->vertex1->ArrowCenterLine_Y2
)
                    );
               }
          else {
               assistant_line_angle = fabs (
                      ( Next_entity->X1 - Next_entity->X2 )
                    * (  Next_entity->vertex2->ArrowCenterLine_X1
                        -Next_entity->vertex2->ArrowCenterLine_X2
)
                    + ( Next_entity->Y1 - Next_entity->Y2 )
                    * (  Next_entity->vertex2->ArrowCenterLine_Y1
                        -Next_entity->vertex2->ArrowCenterLine_Y2
)
                    );
          }
          //   check the angle for central entity
          if  (  sqrt(assistant_line_angle)  >  arrow_tolerance  )
continue;
          //   look for children
          F2dCleanUpChangeChildrenFlag( Next_entity->parent );
          count++;
     }

#ifdef VELLUM
          CountPrompt++;
          sprintf( message,"Finished find one side open Entity %d",
CountPrompt );
          ck_prompt( message );
#endif
```

APPENDIX D

```
     //   normal end
     return count;
}

/*
=================================================================
     Function:
     Name :         F2dCleanUpFindOneSideOpenEntity2
     Description:
               look  for  one  side  open  and  across  with  views'
boundaries
                    entities after found views
     Return Value:
               = 0: Completed successfully and No found;
               = NUM: Open entities' number
     Parameters:
               Input:
                    1 In_drawing: drawing
================================================================
*/
int F2dCleanUpFindOneSideOpenEntity2( struct drawing *In_drawing )
{
//   external functions
     int F2dCleanUpChangeChildrenFlag();
//   link list and temp list
     struct node_list *temp_list, *ConnectedNode;
//   selected entity and temp entities
     struct node *Entity;
//   define flag
     int  BoundaryFlag = 0;

     int CountPrompt = 0;
     char message[64];

#ifdef VELLUM
          CountPrompt++;
          sprintf( message,"2 Start Find Oneside Open  Entity %d",
CountPrompt );
          ck_prompt( message );
#endif
   //     check node list
      if ( In_drawing == NULL )     return    -1;
      if ( In_drawing->objects == NULL ) return    -1;
     // check all of entities which connected with outside loop
     for(  Entity=In_drawing->objects;Entity;Entity  =  Entity->next
)     {
          //   check connected nodes count
          if  ( Entity == NULL )    break;
          if  (( Entity->no_connected_1 == 0 )
```

APPENDIX D

```
              &&( Entity->no_connected_2 == 0 ))     continue;
          //   check flags
          if (( Entity->flags == 3 ) &&( Entity->type == CK_LINE )
            &&(( Entity->no_connected_1 == 0 )
             ||( Entity->no_connected_2 == 0 )))   {
               //   one side open and line type
               if ( Entity->no_connected_2 == 0 )
                     ConnectedNode = Entity->connected_nodes_1;
               else ConnectedNode = Entity->connected_nodes_2;
               //   clear found boundary's flag
               BoundaryFlag = 0;
               //   check across with views' boundary
               if ( ConnectedNode != NULL )  {
                    for ( temp_list = ConnectedNode; temp_list;
                         temp_list = temp_list->cdr )  {
                         //   check wrong data
                         if ( temp_list->car == NULL ) break;
                         if ( temp_list->car->flags == 4 )  {
                              //   find boundary's entity
                              BoundaryFlag = 1;
                              break;
                         }
                         if ( temp_list->cdr == NULL ) break;
                    }
                    if ( BoundaryFlag == 1 )
                     //  look for children
                     F2dCleanUpChangeChildrenFlag( Entity->parent
);
               }
          }
          //   check arc
          if (( Entity->type == CK_ARC )
            &&( Entity->flags != 99 )
            &&(( Entity->no_connected_1 == 0 )
             ||( Entity->no_connected_2 == 0 )))   {
               //   look for children
               F2dCleanUpChangeChildrenFlag( Entity->parent );
          }
          if ( Entity->next == NULL )   break;
     }

#ifdef VELLUM
          CountPrompt++;
          sprintf( message,"Finished 2 one side open Entity %d",
CountPrompt );
          ck_prompt( message );
#endif
     //   normal end
     return 0;
}
```

APPENDIX D

```
/*
==================================================================
     Function:
     Name :          F2dCleanUpFindGroupMinX
     Description:
               look for minimum X-value for a entities group
     Return Value:
               = 0: Completed successfully and no entity;
     Parameters:
               Input:
                    1  Entities_list:  a  node  list  that  will  be
checked
               Output
                    1 Entity: entity includes minimum X-value

=================================================================
*/
struct   node   *F2dCleanUpFindGroupMinX(   struct   node_list
*Entities_list )
{
//   double F2dCleanUpLineLength();
     //   entities counter and flags
     int open_entity_flag = 0;
     //   link list and temp list
     struct node_list
          *EntitiesList2,
          *Out_temp_list2,
          *open_temp_list2, *open_list2,
          *temp_list1,
          *temp_list2;
     //   selected entity and temp entities
     struct node
          *Next_entity,
          *MinXvalueEntity;
//   length and angle
     double    MinXvalueGroup = 0.0;
//   check all of entities which connected with outside loop
     //   initialize
     EntitiesList2 =
          ( struct  node_list  *  )  calloc  (  1,  sizeof  (  struct
node_list ));
     open_list2 =
          ( struct  node_list  *  )  calloc  (  1,  sizeof  (  struct
node_list ));

     //   check first entity
     //   search connected entity until real entity be found
     for ( temp_list2 = Entities_list;
     //   entity->connected_nodes;
```

APPENDIX D

```
          ( temp_list2!=0 &&
           temp_list2->car!=0 );
         temp_list2=temp_list2->cdr)   {
         if ( temp_list2->car == NULL )     break;
         if ( temp_list2->car->no_connected_1 == 0 ) continue;
         if ( temp_list2->car->no_connected_2 == 0 ) continue;
         if ( temp_list2->car->flags == 2 ) {
              //   set pointer to first entity
              open_list2->car = temp_list2->car;
              //   set minimum X value
              MinXvalueGroup = temp_list2->car->Min_X;
              MinXvalueEntity = temp_list2->car;
              break;
         }
         if ( temp_list2->cdr == NULL )     break;
    }
    if ( open_list2->car == 0 )         return 0;
    //   set link address
    open_list2->cdr = NULL;
    //   set the pointer to output node list
    EntitiesList2->car = open_list2->car;
    EntitiesList2->cdr = open_list2->cdr;
//
//  Step_6_1:
//  find connected entities
    for ( temp_list1 = open_list2;
          ( temp_list1
          //  &&   (temp_list->cdr != 0)
          );
    )    {
         //   get a pointer from open list
         if ( temp_list1->car == NULL )     break;
         Next_entity = temp_list1->car;
         //   set a closed flag to the node
         //   Next_entity->flags = 1;
         //   close the node ( delete the node from open list )
         open_list2 = open_list2->cdr;

         // look for first connected entity whose flags=0.
         for ( temp_list2 = Next_entity->connected_nodes;
                ( temp_list2!=0 &&
                 temp_list2->car!=0 );
               temp_list2=temp_list2->cdr)   {
              if ( temp_list2->car == NULL )     break;
               // if found an unmarked connected entity
               if ( temp_list2
                    && temp_list2->car->flags==2
                    &&   MinXvalueEntity->line_type   ==
temp_list2->car->line_type
                    &&   MinXvalueEntity->color   ==
```

APPENDIX D

```
temp_list2->car->color
                    &&   MinXvalueEntity->is_thickness    ==
temp_list2->car->is_thickness
                  )       {
                    //   check minimum X
                    if  ( temp_list2->car->Min_X < MinXvalueGroup
)     {
                         //   change minimum X value
                         MinXvalueGroup = temp_list2->car->Min_X;
                         MinXvalueEntity = temp_list2->car;
                    }
                    //   allocate memory for open list element
                    open_temp_list2 = ( struct node_list * ) calloc
( 1, sizeof ( struct node_list ));
                    //   allocate  memory  for  output  node  list
element
                    Out_temp_list2 = ( struct node_list * ) calloc
( 1, sizeof ( struct node_list ));

                    //   add this entity to the open list
                    open_temp_list2->car = temp_list2->car;
                    //   add this entity to the output node list
                    Out_temp_list2->car = temp_list2->car;

                    //   set a open flag     to the node
                    open_temp_list2->car->flags = 1;

                    //   connect to the open list
                    open_temp_list2->cdr = open_list2;
                    //   move the pointer of open list to the top
                    open_list2 = open_temp_list2;
                    //   connect to the output node list
                    Out_temp_list2->cdr = EntitiesList2;
                    //   move the pointer of output node list to
the top
                    EntitiesList2 = Out_temp_list2;
               }
               if ( temp_list2->cdr == NULL )     break;
          }
          //   assign value to the loop variable
          temp_list1 = open_list2;
     }
     return MinXvalueEntity;
}

/*
=================================================================
     Function:
     Name :         F2dCleanUpFindOutNextEntity
```

APPENDIX D

```
     Description:
               look  for  connected  entity  with  out  side  loop
entities
     Return Value:
               = 0: Completed successfully;
     Parameters:
               Input:
                    1 In_entity: rotate axis entity
                    2 In_Nodes:  entity's node
                    3 In_Vertex: entity's vertex
                    4 *In_Angle: entity's angle

=================================================================
*/
int F2dCleanUpFindOutNextEntity(
     //   input
     struct node                        *In_entity,
     struct node_list              *In_Nodes,
     struct planar_vertex     *In_Vertex,
     double                             *In_Angle )
{
     //   external functions
     int F2dCleanUpArcAngle();
     int F2dCleanUpLineAngle();
     //   link list and temp list
     struct node_list
          *temp_list,
          *RotateNodes,
          *RotateNodesTemp,
          *RotateNodesAnother,
          *RotateNodesAnotherTemp;
     //   selected entity and temp entities
     struct node
          *Next_entity,
          *RotateEntity;
     struct planar_vertex
          *RotateVertex,
          *RotateVertexTemp,
          *RotateVertexAnother,
          *RotateVertexAnotherTemp;
     int RotateVertexFlag = 0,
          RotateAxisEntityType = 0,
          RotateAxisEntityVertexFlag = 0,
          FindNextFlag = 0;
//   length and angle
     double    RotateAxisAngleAnother = 0.0,
               RotateAxisAngleAnotherTemp = 0.0,
               RotateMinAngleTemp = 0.0,
               RotateDiffAngleTemp = 0.0,
               RotateAxisAngle = 0.0,
```

APPENDIX D

```
                RotateAxisAngleTemp = 0.0;
//    set tolerance Tolerance
      double    Tolerance  = 0.0;
      Tolerance = F2dCleanUpTolerance;

      //   initialize
      RotateAxisAngleAnother    = *In_Angle;
      RotateEntity              = In_entity;
      RotateNodesAnother        = In_Nodes;
      RotateVertexAnother       = In_Vertex;
      //   check all of entities which connected with outside loop
      for( ; ; )      {
           //   set flag  for first entity on loop
           FindNextFlag = 0;
           RotateEntity->flags = 4;
           RotateAxisEntityType = RotateEntity->type;
           if ( RotateEntity->vertex1 == RotateVertexAnother )
RotateAxisEntityVertexFlag = 1;
           else      RotateAxisEntityVertexFlag = 2;
           //   set standard axis for first search
           RotateAxisAngle     = RotateAxisAngleAnother;
           RotateMinAngleTemp  = 2.0 * pi;
           RotateNodes              = RotateNodesAnother;
           RotateVertex        = RotateVertexAnother;
      //   check next connected entity
           if ( RotateNodes == 0 )  break;
           //   start loop process
      for( temp_list=RotateNodes;
                 temp_list;
                 temp_list = temp_list->cdr)  {
                if ( temp_list->car == NULL ) break;
                Next_entity = temp_list->car;
                //   check flags
                if ( Next_entity->flags == 4 )     break;
                if ( Next_entity->flags != 1 )     continue;
                switch ( Next_entity->type )  {
                     //   arc    type entity
                     case CK_ARC:
                          RotateVertexFlag = F2dCleanUpArcAngle(
                                    //   input
                                    RotateVertex, Next_entity,
                                    //   output
                                    &RotateAxisAngleTemp,
&RotateAxisAngleAnotherTemp);
                          break;
                     //   line  type entity
                     case CK_LINE:
                          RotateVertexFlag = F2dCleanUpLineAngle(
                                    //   input
                                    RotateVertex, Next_entity,
```

APPENDIX D

```
                                   //   output
                                   &RotateAxisAngleTemp,
&RotateAxisAngleAnotherTemp);
                         break;
                    //   wrong type entity
                    default:
                         break;
               }
               //   select connected side of entity
               if ( RotateVertexFlag == 1 )  {
                    //   get start->end
                    //   set rotation vertex node
                    RotateNodesTemp      =
Next_entity->connected_nodes_1;
                    RotateVertexTemp     = Next_entity->vertex1;
                    //   set another side vertex node
                    RotateNodesAnotherTemp    =
Next_entity->connected_nodes_2;
                    RotateVertexAnotherTemp   =
Next_entity->vertex2;
               }
               else {
                    //   set rotation vertex node
                    RotateNodesTemp      =
Next_entity->connected_nodes_2;
                    RotateVertexTemp     = Next_entity->vertex2;
                    //   set another side vertex node
                    RotateNodesAnotherTemp    =
Next_entity->connected_nodes_1;
                    RotateVertexAnotherTemp   =
Next_entity->vertex1;
               }
               //   compute diff angle
               //        for change current entity
               RotateDiffAngleTemp    =    RotateAxisAngleTemp    -
RotateAxisAngle;
               if ( fabs( RotateDiffAngleTemp ) < Tolerance )    {
                    switch( RotateAxisEntityType )     {
                         case CK_ARC:
                              switch(  RotateAxisEntityVertexFlag
)    {
                                   case 1:   RotateDiffAngleTemp =
2.0 * pi;
                                        break;
                                   case 2:   RotateDiffAngleTemp =
0.0;
                                        break;
                              }
                              break;
                         case CK_LINE:
```

APPENDIX D

```
                              switch( RotateVertexFlag )    {
                                   case 1:   RotateDiffAngleTemp =
0.0;
                                        break;
                                   case 2:   RotateDiffAngleTemp =
2.0 * pi;
                                        break;
                              }
                              break;
                         }
                    }
                    if ( RotateDiffAngleTemp < 0.0 )    {
                         RotateDiffAngleTemp = RotateDiffAngleTemp + 2.0
* pi;
                    }
                    if ( fabs( RotateDiffAngleTemp - RotateMinAngleTemp
) < Tolerance )      {
                         switch( Next_entity->type )    {
                              case CK_ARC:
                                   switch( RotateEntity->type )   {
                                        case CK_ARC:
                                             switch(  RotateVertexFlag
)    {
                                                  case 1:   //   n   o
change
                                                       break;
                                                  case 2:
                                                       RotateEntity
          = Next_entity;
                                                       RotateNodes
               = RotateNodesTemp;
                                                       RotateVertex
          = RotateVertexTemp;

RotateNodesAnother        = RotateNodesAnotherTemp;

RotateVertexAnother       = RotateVertexAnotherTemp;

RotateAxisAngleAnother    = RotateAxisAngleAnotherTemp;
                                                       break;
                                             }
                                             break;
                                        case CK_LINE:
                                             switch(  RotateVertexFlag
)    {
                                                  case 1:   //   n   o
change
                                                       break;
                                                  case 2:
                                                       RotateEntity
```

APPENDIX D

```
          = Next_entity;
                                                        RotateNodes
              = RotateNodesTemp;
                                                        RotateVertex
          = RotateVertexTemp;

RotateNodesAnother         = RotateNodesAnotherTemp;

RotateVertexAnother        = RotateVertexAnotherTemp;

RotateAxisAngleAnother     = RotateAxisAngleAnotherTemp;
                                                        break;
                                                }
                                                break;
                                        }
                                case CK_LINE:
                                        switch( RotateEntity->type )  {
                                                case CK_ARC:
                                                        if ( RotateEntity->vertex1
== RotateVertex )   {
                                                        RotateEntity
          = Next_entity;
                                                        RotateNodes
              = RotateNodesTemp;
                                                        RotateVertex
          = RotateVertexTemp;

RotateNodesAnother         = RotateNodesAnotherTemp;

RotateVertexAnother        = RotateVertexAnotherTemp;

RotateAxisAngleAnother     = RotateAxisAngleAnotherTemp;
                                                }
                                                break;
                                        }

                        }
                }
                if ( RotateDiffAngleTemp < RotateMinAngleTemp )   {
                        FindNextFlag = 1;
                        RotateMinAngleTemp = RotateDiffAngleTemp;
                        //   set rotation entity
                        RotateEntity              = Next_entity;
                        RotateNodes                    =
RotateNodesTemp;
                        RotateVertex              = RotateVertexTemp;
                        RotateNodesAnother        =
RotateNodesAnotherTemp;
                        RotateVertexAnother       =
RotateVertexAnotherTemp;
```

APPENDIX D

```
                    RotateAxisAngleAnother    =
RotateAxisAngleAnotherTemp;
                }
            }
            //   check flags
            //        if loop meet closed entity
            if ( Next_entity->flags == 4 )     break;
            if ( FindNextFlag == 0 ) break;
      }
      return 0;
}

/*
=================================================================
      Function:
      Name :          F2dCleanUpFindOutSideLoop
      Description:
                look for out side loop entities
      Return Value:
                = 0: Completed successfully and No found;
                = NUM: Outside entities' number
      Parameters:
                Input:
                     1 Entity: entity includes the loop's minimum
X-value
=================================================================
*/
int F2dCleanUpFindOutSideLoop( struct node *MinXvalueEntity )
{
      //   external functions
      int F2dCleanUpArcAngle();
      int F2dCleanUpLineAngle();
      int F2dCleanUpFindOutFirstEntity();
      int F2dCleanUpFindOutNextEntity();
      //   entities counter and flags
      int count = 0,
           count2 = 0,
           open_entity_flag = 0,
           RotateVertexFlag = 0,
           assistant_line_flag = 0;
      //   link list and temp list
      struct node_list
           *outside_loop_temp_list3,
           *RotateNodes,
           *RotateNodesTemp,
           *RotateNodesAnother,
           *RotateNodesAnotherTemp;
      //   selected entity and temp entities
```

APPENDIX D

```
     struct node
          *Next_entity,
          *RotateEntity;
     struct planar_vertex
          *RotateVertex,
          *RotateVertexTemp,
          *RotateVertexAnother,
          *RotateVertexAnotherTemp;
//   length and angle
     double    assistant_line_angle = 0.0,
               MinXvalueGroup = 0.0,
               RotateAxisAngleAnother = 0.0,
               RotateAxisAngleAnotherTemp = 0.0,
               RotateMinAngleTemp = 0.0,
               RotateDiffAngle = 0.0,
               RotateDiffAngleTemp = 0.0,
               RotateAxisAngle = 0.0,
               RotateAxisAngleTemp = 0.0;
//   set tolerance Tolerance
     double    loop_tolerance  = 0.00;
     loop_tolerance = F2dCleanUpTolerance;

//        loop direction : counter-clock
          //   check a flag for outside loop process
//        if ( count2 > 0 )         {
//   step_7_1: find first entity for the group
     //   set standard axis for first search
     RotateAxisAngle     = 1.5 * pi;
     RotateMinAngleTemp  = 2.0 * pi;
//   step_7_1_1: only one entity
     //   check entities' angle
     //   arc case : special case ( no vertex on min_x )
     if ( MinXvalueEntity->type == CK_ARC
           &&    (    fabs    (    MinXvalueEntity->Min_X    -
MinXvalueEntity->vertex1->X ) > loop_tolerance )
           &&    (    fabs    (    MinXvalueEntity->Min_X    -
MinXvalueEntity->vertex2->X ) > loop_tolerance ) )    {
          //   set rotation vertex node
          RotateNodesAnother  =MinXvalueEntity->connected_nodes_2;
          RotateVertexAnother = MinXvalueEntity->vertex2;
          RotateEntity        = MinXvalueEntity;
          //   get arc end-angle
          //        ( direction : from circle-center to end-point
)
          RotateAxisAngleAnotherTemp = ( MinXvalueEntity->AngEnd )
* pi / 180.0;
          //   change angle to oppsite direction
          //        ( direction : from end-point to circle-center
)
          RotateAxisAngleAnotherTemp = RotateAxisAngleAnotherTemp
```

APPENDIX D

```
+ pi;
          //   check angle
          if ( RotateAxisAngleAnotherTemp > ( 2.0 * pi )    )    {
               R o t a t e A x i s A n g l e A n o t h e r T e m p    =
RotateAxisAngleAnotherTemp - 2.0 * pi;
          }
          if ( fabs ( RotateAxisAngleAnotherTemp - ( 2.0 * pi )) <
loop_tolerance )    {
               RotateAxisAngleAnotherTemp = 0.0;
          }
          //   compute tangent     line angle for the arc end-angle
          //        ( direction : from end-point to start-point )
          RotateAxisAngleAnotherTemp = RotateAxisAngleAnotherTemp
+ 0.5 * pi;
          //   check angle
          if ( RotateAxisAngleAnotherTemp > ( 2.0 * pi )    )    {
               R o t a t e A x i s A n g l e A n o t h e r T e m p    =
RotateAxisAngleAnotherTemp - 2.0 * pi;
          }
          if ( fabs ( RotateAxisAngleAnotherTemp - ( 2.0 * pi )) <
loop_tolerance )    {
               RotateAxisAngleAnotherTemp = 0.0;
          }
          //   set rotation standard angle ( clock direction )
          RotateAxisAngleAnother = RotateAxisAngleAnotherTemp;
     }
//   step_7_1_2: multiple entities around Min_x
     else {
          //   select connected side of entity
          if   (    fabs    (    MinXvalueEntity->Min_X    -
MinXvalueEntity->vertex1->X ) < loop_tolerance )
               //   get start->end
               //   set rotation vertex node
               RotateVertex   = MinXvalueEntity->vertex1;
          else RotateVertex   = MinXvalueEntity->vertex2;
          switch ( MinXvalueEntity->type )    {
               //   arc    type entity
               case CK_ARC:
                    RotateVertexFlag = F2dCleanUpArcAngle(
                         //   input
                         RotateVertex, MinXvalueEntity,
                         //   output
                         & R o t a t e A x i s A n g l e T e m p ,
&RotateAxisAngleAnotherTemp);
                    break;
               //   line  type entity
               case CK_LINE:
                    RotateVertexFlag = F2dCleanUpLineAngle(
                         //   input
                         RotateVertex, MinXvalueEntity,
```

APPENDIX D

```
                              //   output
                              &RotateAxisAngleTemp,
&RotateAxisAngleAnotherTemp);
                         break;
                   default:
                         break;
             }
             //   select connected side of entity
             if ( RotateVertexFlag == 1 )  {
                   //   get start->end
                   //   set rotation vertex node
                   RotateNodesTemp        =
MinXvalueEntity->connected_nodes_1;
                   RotateVertexTemp       = MinXvalueEntity->vertex1;
                   //   set another side vertex node
                   RotateNodesAnotherTemp   =
MinXvalueEntity->connected_nodes_2;
                   RotateVertexAnotherTemp  =
MinXvalueEntity->vertex2;
             }
             else {
                   //   set rotation vertex node
                   RotateNodesTemp        =
MinXvalueEntity->connected_nodes_2;
                   RotateVertexTemp       = MinXvalueEntity->vertex2;
                   //   set another side vertex node
                   RotateNodesAnotherTemp   =
MinXvalueEntity->connected_nodes_1;
                   RotateVertexAnotherTemp  =
MinXvalueEntity->vertex1;
             }
             //   compute diff angle
             //        for change current entity
             RotateDiffAngleTemp    =    RotateAxisAngleTemp    -
RotateAxisAngle;
             if ( RotateDiffAngleTemp < 0.0 )   {
                   RotateDiffAngleTemp = RotateDiffAngleTemp + 2.0 *
pi;
             }
             if ( RotateDiffAngleTemp < RotateMinAngleTemp )   {
                   RotateMinAngleTemp = RotateDiffAngleTemp;
                   //   set rotation entity
                   RotateEntity              = MinXvalueEntity;
                   RotateNodes                    = RotateNodesTemp;
                   RotateVertex              = RotateVertexTemp;
                   RotateNodesAnother        = RotateNodesAnotherTemp;
                   RotateVertexAnother       = RotateVertexAnotherTemp;
                   RotateAxisAngleAnother    =
RotateAxisAngleAnotherTemp;
             }
```

APPENDIX D

```
    //   step_7_1_3: find next connected entity with first entity
around Min_x-vertex
         //        check all of entities which connected with
first entity
         if ( RotateNodes != 0 )   {
          for( outside_loop_temp_list3=RotateNodes;
                     outside_loop_temp_list3;
                     outside_loop_temp_list3   =
outside_loop_temp_list3->cdr) {
                    if ( outside_loop_temp_list3->car == NULL )
break;
                    Next_entity = outside_loop_temp_list3->car;
                    //   check flags
                    if ( Next_entity->flags !=1 ) continue;
                    switch ( Next_entity->type )  {
                         //   arc   type entity
                         case CK_ARC:
                              RotateVertexFlag   =
F2dCleanUpArcAngle(
                                        //   input
                                        RotateVertex, Next_entity,
                                        //   output
                                        &RotateAxisAngleTemp,
&RotateAxisAngleAnotherTemp);
                              break;
                         //   line  type entity
                         case CK_LINE:
                              RotateVertexFlag   =
F2dCleanUpLineAngle(
                                        //   input
                                        RotateVertex, Next_entity,
                                        //   output
                                        &RotateAxisAngleTemp,
&RotateAxisAngleAnotherTemp);
                              break;
                         //   wrong type entity
                         default:
                              break;
                    }
                    //   select connected side of entity
                    if ( RotateVertexFlag == 1 )  {
                         //   get start->end
                         //   set rotation vertex node
                         RotateNodesTemp     =
Next_entity->connected_nodes_1;
                         RotateVertexTemp    =
Next_entity->vertex1;
                         //   set another side vertex node
                         RotateNodesAnotherTemp    =
Next_entity->connected_nodes_2;
```

APPENDIX D

```
                        RotateVertexAnotherTemp   =
Next_entity->vertex2;
                    }
                    else {
                        //   set rotation vertex node
                        RotateNodesTemp      =
Next_entity->connected_nodes_2;
                        RotateVertexTemp     =
Next_entity->vertex2;
                        //   set another side vertex node
                        RotateNodesAnotherTemp    =
Next_entity->connected_nodes_1;
                        RotateVertexAnotherTemp   =
Next_entity->vertex1;
                    }
                    //   compute diff angle
                    //        for change current entity
                    RotateDiffAngleTemp  =  RotateAxisAngleTemp  -
RotateAxisAngle;
                    if ( RotateDiffAngleTemp < 0.0 )    {
                        RotateDiffAngleTemp = RotateDiffAngleTemp
+ 2.0 * pi;
                    }
                    if    (    fabs(    RotateDiffAngleTemp    -
RotateMinAngleTemp ) < loop_tolerance )       {
                        switch( Next_entity->type )    {
                            case CK_ARC:
                                switch( RotateEntity->type )  {
                                    case CK_ARC:
                                        s  w  i  t  c  h  (
RotateVertexFlag )  {
                                                case 1:   //   n
change
                                                    break;
                                                case 2:

RotateEntity              = Next_entity;

RotateNodes                   = RotateNodesTemp;

RotateVertex              = RotateVertexTemp;

RotateNodesAnother        = RotateNodesAnotherTemp;

RotateVertexAnother       = RotateVertexAnotherTemp;

RotateAxisAngleAnother    = RotateAxisAngleAnotherTemp;
                                                    break;
                                        }
```

APPENDIX D

```
                                    break;
                               case CK_LINE:
                                    s w i t c h (
RotateVertexFlag ) {
                                         case 1:   //   n
change
                                              break;
                                         case 2:

RotateEntity              = Next_entity;
RotateNodes                   = RotateNodesTemp;
RotateVertex              = RotateVertexTemp;
RotateNodesAnother        = RotateNodesAnotherTemp;
RotateVertexAnother       = RotateVertexAnotherTemp;
RotateAxisAngleAnother    = RotateAxisAngleAnotherTemp;
                                              break;
                                    }
                                    break;
                         }
                    case CK_LINE:
                         switch( RotateEntity->type )  {
                              case CK_ARC:
                                   i   f               (
RotateEntity->vertex1 == RotateVertex ) {
RotateEntity              = Next_entity;
RotateNodes                   = RotateNodesTemp;
RotateVertex              = RotateVertexTemp;
RotateNodesAnother        = RotateNodesAnotherTemp;
RotateVertexAnother       = RotateVertexAnotherTemp;
RotateAxisAngleAnother    = RotateAxisAngleAnotherTemp;
                                   }
                                   break;
                         }

                    }
               }
               if ( RotateDiffAngleTemp < RotateMinAngleTemp
)    {
```

APPENDIX D

```
                        RotateMinAngleTemp = RotateDiffAngleTemp;
                        //   set rotation entity
                        RotateEntity             = Next_entity;
                        RotateNodes                    =
RotateNodesTemp;
                        RotateVertex             =
RotateVertexTemp;
                        RotateNodesAnother       =
RotateNodesAnotherTemp;
                        RotateVertexAnother      =
RotateVertexAnotherTemp;
                        RotateAxisAngleAnother   =
RotateAxisAngleAnotherTemp;
                    }
                }
            }

    }
//   step_7_2: find next connected entity with first entity along
the loop
    F2dCleanUpFindOutNextEntity(
        //   input
        RotateEntity, RotateNodesAnother, RotateVertexAnother,
&RotateAxisAngleAnother );
    return 0;
}


/*

=================================================================
    Function:
    Name :         TestFindArrowControl

    Description:
              It is a manual function.
              To look for all arrow type entities for the view.

    Return Value:
              < 0: Error
              = 0: No proccess
              > 0: Completed successfully; the Number is the
counter of
                    found entities.
    Parameters:
    Subfunctions:
         struct node_list *F2dCleanUpPickUpAllOneSideOpenEntity
                   look for one side open entity
         int F2dCleanUpFindArrow
                   look for arrow type entity
```

APPENDIX D

```
        int F2dCleanUpFindArrowEndEntity
                find arrow end line
        int F2dCleanUpFindArrowCenterEntity
                find arrow center line
        int F2dCleanUpFindArrowOneSideOpenEntity
                find one side open entity for arrow type
        int F2dCleanUpComputeCenterLineAngle
                compute center line angle
        int F2dCleanUpCheckStartEndEntity
                check start and end entities
        int F2dCleanUpLineAngle
                compute a line type entity's angle
        int F2dCleanUpArcAngle
                compute a arc type entity's angle.
        int F2dCleanUpChangeChildrenFlag
                change entity's children flags
        int F2dCleanUpChangeArrowVertexFlag
                change arrow top vertex's flags and
                     set arrow center line coordinates
        int F2dCleanUpChangeDrawingColor
                change entity's color
    double F2dCleanUpLineLength
                compute line type entity's length
=================================================================
*/

int  TestFindArrowControl( int *SwitchRedraw )
{
     //   external functions
     int F2dCleanUpFindArrow();
     int F2dCleanUpChangeDrawingColor();
     struct node_list *F2dCleanUpPickUpAllOneSideOpenEntity();
     //   entities counter and flags
     int count = 0,
          assistant_line_flag = 0;
     //   link list and temp list
     struct node_list
          *Entities_change_color_list1;

//   Begin
//-----------------------------------
//   Step_1:
//   check the number of entites
//  get count of all entities
//   if an error occurred, exit immidiately.
    if (number_of_entities<0)  return -1;

//---------------------------------
//   Step_3:       pickup all one side open entities
     E n t i t i e s _ c h a n g e _ c o l o r _ l i s t 1    =
```

APPENDIX D

```
F2dCleanUpPickUpAllOneSideOpenEntity( &trim_drawing );
    if (Entities_change_color_list1 == 0)  return 0;
//--------------------------------
//   Step_4:       find arrow line
          F2dCleanUpFindArrow( Entities_change_color_list1 );
//--------------------------------
//   Step_X:
//   change color to Magenta for a selected boundary
    // turn off input levels
#ifdef CKWIN
     if ( *SwitchRedraw == 1  )    ck_levels(CK_OFF,1,255);
#endif
     if ( *SwitchRedraw == 1  )
F2dCleanUpChangeDrawingColor(&trim_drawing);
     //   clear a flag for outside loop process
     assistant_line_flag = 0;
     // turn ON the level used to store the trimmed entities.
#ifdef CKWIN
     if ( *SwitchRedraw == 1  )    ck_levels(CK_ON,TrimLevel,
TrimLevel);
     if ( *SwitchRedraw == 1  )    ck_redraw( CK_PRIME_VP );
#endif
     return count;
}

/*
=================================================================
     Function:
     Name :         TestFindOneSideOpen2Control
     Description:
               It is a manual function.
               To find all one side open and across with views'
boundaries
          entities
     Return Value:
               < 0: Error
               = 0: No proccess
     Parameters:
     Subfunctions:
          int F2dCleanUpFindOneSideOpenEntity2
                    look for all one side open and across with
views' boundaries
                         entities
          int F2dCleanUpChangeDrawingColor
                    change entity's color
================================================================
*/

int  TestFindOneSideOpen2Control( int *SwitchRedraw )
```

APPENDIX D

```
{
//   external functions
     int F2dCleanUpFindOneSideOpenEntity2();
     int F2dCleanUpChangeDrawingColor();

//   Step_1:   check the number of entites
//   if an error occurred, exit immidiately.
    if (number_of_entities<0)  return -1;

//   Step_2:   pickup all one side open entities
     F2dCleanUpFindOneSideOpenEntity2( &trim_drawing );

//   Step_X:   change color to Magenta for a selected boundary
    // turn off input levels
#ifdef CKWIN
     if ( *SwitchRedraw == 1  )    ck_levels(CK_OFF,1,255);
#endif
     if ( *SwitchRedraw == 1  )
F2dCleanUpChangeDrawingColor(&trim_drawing);
     // turn ON the level used to store the trimmed entities.
#ifdef CKWIN
     if ( *SwitchRedraw == 1  )    ck_levels(CK_ON,TrimLevel,
TrimLevel);
     if ( *SwitchRedraw == 1  )    ck_redraw( CK_PRIME_VP );
#endif
     return 0;
}

/*
=================================================================
     Function:
     Name :         TestFindOneSideOpenControl

     Description:
               It is a manual function.
               To find all one side open and vertical with arrow
               type entities for the view.

     Return Value:
               < 0: Error
               = 0: No proccess
               > 0:  Completed  successfully;  the  Number  is  the
                    counter of found entities.
     Parameters:
     Subfunctions:
          struct node_list *F2dCleanUpPickUpAllOneSideOpenEntity
                    look for one side open entity
          int F2dCleanUpChangeChildrenFlag
                    change entity's children flags
```

APPENDIX D

```
          int F2dCleanUpChangeDrawingColor
                    change entity's color
          int F2dCleanUpFindOneSideOpenEntity
                    look for one side open entities and
                         they are vertical with arrow type entities
=================================================================
*/

int  TestFindOneSideOpenControl( int *SwitchRedraw )
{
     //   external functions
     int F2dCleanUpFindOneSideOpenEntity();
     int F2dCleanUpChangeDrawingColor();
     struct node_list *F2dCleanUpPickUpAllOneSideOpenEntity();
     //   entities counter and flags
     int count = 0,
          assistant_line_flag = 0;
     //   link list and temp list
     struct node_list
          *Entities_list;

//   Begin
//-----------------------------------
//   Step_1:
//   check the number of entites
//   if an error occurred, exit immidiately.
    if (number_of_entities<0)  return -1;

//-----------------------------------
//   Step_2:        pickup all one side open entities
     Entities_list    =    F2dCleanUpPickUpAllOneSideOpenEntity(
&trim_drawing );
    if (Entities_list == 0)  return 0;
//-----------------------------------
//   Step_3:        find lines vertical with arrow type entities
     F2dCleanUpFindOneSideOpenEntity( Entities_list );
//-----------------------------------
//   Step_X:
//   change color to Magenta for a selected boundary
    // turn off input levels
#ifdef CKWIN
     if ( *SwitchRedraw == 1  )    ck_levels(CK_OFF,1,255);
#endif
     if ( *SwitchRedraw == 1  )
F2dCleanUpChangeDrawingColor(&trim_drawing);
     //   clear a flag for outside loop process
     assistant_line_flag = 0;
     // turn ON the level used to store the trimmed entities.
#ifdef CKWIN
     if ( *SwitchRedraw == 1  )    ck_levels(CK_ON,TrimLevel,
```

APPENDIX D

```
TrimLevel);
     if ( *SwitchRedraw == 1  )    ck_redraw( CK_PRIME_VP );
#endif
     return count;
}

/*
=================================================================
     Function:
     Name :          F2dCleanUpPickUpAllOneSideOpenEntity
     Description:
               look for all one side open entities in selected
               drawing
     Return Value:
               = 0: Completed successfully;
     Parameters:
               Input:
                    In_drawing: drawing
               Output:
                    NodeList: a node list for all one side open
entities
================================================================
*/
struct   node_list   *F2dCleanUpPickUpAllOneSideOpenEntity(struct
drawing *In_drawing )
{
     //   entities counter and flags
     int count = 0;
     //   link list and temp list
     struct node_list
          *EntitiesList1,
          *Out_temp_list;
     //   selected entity and temp entities
     struct node *entity;

//   initialize
     EntitiesList1 =
     ( struct node_list * ) calloc ( 1, sizeof ( struct node_list
));
     //   set a flag for the boundary entity
     count = 0;
     //   check pointer about first entity
     if ( In_drawing->objects == 0 )      return  0;
     //   set a open flag     to the node
     //   open_list->car->flags = 1;
     //   set the pointer to output node list
     //   set pointer to first entity
     for (entity=In_drawing->objects;
      entity && (count<number_trimmed_entities);
```

APPENDIX D

```
        entity=entity->next)       {
          if ( entity == NULL )    break;
          if ( entity->no_connected_1 > 0 && entity->no_connected_2
> 0 )     continue;
          if   (   entity->no_connected_1   ==   0   &&
entity->no_connected_2 == 0 ) continue;
        if ( entity->type != CK_LINE )  continue;
          EntitiesList1->car = entity;
          break;
     }
     //   set link address
     EntitiesList1->cdr = NULL;
//--------------------------------
//   find connected entities
     if ( EntitiesList1 == 0 ) return 0;
    if ( entity == 0 ) return 0;
    if ( entity->next == 0 ) return EntitiesList1;
    for (entity=entity->next;
      entity && (count<number_trimmed_entities);
        entity=entity->next)       {
          count++;
          if ( entity  == NULL )   break;
        if ( entity->type != CK_LINE )  continue;
          if ( entity->no_connected_1 > 0 && entity->no_connected_2
> 0 )     continue;
          if   (   entity->no_connected_1   ==   0   &&
entity->no_connected_2 == 0 ) continue;
          //   allocate memory for output node list element
          Out_temp_list = ( struct node_list * ) calloc ( 1, sizeof
( struct node_list ));
          //   add this entity to the output node list
          Out_temp_list->car = entity;
          //   connect to the output node list
          Out_temp_list->cdr = EntitiesList1;
          //   move the pointer of output node list to the top
          EntitiesList1 = Out_temp_list;
          if ( entity->next  == NULL )  break;
     }
    if (count>=number_trimmed_entities) return 0;
                                    else return EntitiesList1;
}


/*
=================================================================
     Function:
     Name :          F2dCleanUpPickUpAllArcEntity
     Description:
               look for all arc entities in selected drawing
```

APPENDIX D

```
     Return Value:
               = 0: Completed successfully;
     Parameters:
               Input:
                    In_drawing: drawing
               Output:
                    NodeList: a node list for all arc entities
================================================================
*/
struct  node_list  *F2dCleanUpPickUpAllArcEntity(struct  drawing
*In_drawing )
{
     //   entities counter and flags
     int count = 0;
     //   link list and temp list
     struct node_list
          *EntitiesList1,
          *Out_temp_list;
     //   selected entity and temp entities
     struct node *entity;

//   initialize
     EntitiesList1 =
     ( struct node_list * ) calloc ( 1, sizeof ( struct node_list
));
     //   set a flag for the boundary entity
     count = 0;
     //   check pointer about first entity
     if ( In_drawing->objects == 0 )      return  0;
     //   set pointer to first entity
     for (entity=In_drawing->objects;
      entity && (count<number_trimmed_entities);
         entity=entity->next)      {
        if ( entity == NULL ) break;
        if ( entity->type != CK_ARC )   continue;
          EntitiesList1->car = entity;
          break;
     }
     //   set link address
     EntitiesList1->cdr = NULL;
//---------------------------------
//   find connected entities
     if ( EntitiesList1 == 0 ) return 0;
    if ( entity == 0 ) return 0;
    if ( entity->next == 0 ) return EntitiesList1;
    for (entity=entity->next;
      entity && (count<number_trimmed_entities);
         entity=entity->next)      {
          count++;
          if ( entity == NULL )    break;
```

APPENDIX D

```
        if ( entity->type != CK_ARC )   continue;
          //   allocate memory for output node list element
          Out_temp_list = ( struct node_list * ) calloc ( 1, sizeof
( struct node_list ));
          //   add this entity to the output node list
          Out_temp_list->car = entity;
          //   connect to the output node list
          Out_temp_list->cdr = EntitiesList1;
          //   move the pointer of output node list to the top
          EntitiesList1 = Out_temp_list;
          if ( entity->next == NULL )   break;
      }
     if (count>=number_trimmed_entities) return 0;
                                  else return EntitiesList1;
}

/*
=================================================================
     Function:
     Name :         F2dCleanUpFindCenterLineEntity
     Description:
               look for arc's center line entities.
     Return Value:
               = 0: Completed successfully and No found;
               = NUM: Open entities' number
     Subfunctions:
          int F2dCleanUpChangeChildrenFlag
                    set flags for unuse entities
          double    F2dDistancePointLine
                    compute distance from arc's center point to
                    entity
     Parameters:
               Input:
                    1 In_Drawing: a    drawings
                    2 In_Entities_list: a node list for all arcs
=================================================================
*/
int F2dCleanUpFindCenterLineEntity(
          struct drawing           *In_drawing,
          struct node_list    *In_Entities_list )
{
//   external functions
     int F2dCleanUpChangeChildrenFlag();
     double    F2dDistancePointLine();
     double F2dCleanUpLineLength();
//   link list and temp list
     struct  node_list   *temp_list,  *temp_list2,  *temp_list3,
*temp_list4;
//   selected entity and temp entities
```

APPENDIX D

```
	struct node
		*ArcEntity,
		*ViewEntity;
//	define 3D coordinates
	struct Vector  Vsp, Vep, Vp;
//	entities counter and flags
	int count = 0;
//	double
	double	Distance = 0.0,
		DistanceViewEntity2Center = 0.0,
		DX = 0.0,
		DY = 0.0,
		ViewEntityLength = 0.0,
		Tolerance = 0.0;
	int CountPrompt = 0;
	char message[64];

	//	set tolerance
	Tolerance = F2dCleanUpTolerance;

#ifdef VELLUM
		CountPrompt++;
		sprintf(  message,"Start  Find  Center  Entity  %d",
CountPrompt );
		ck_prompt( message );
#endif

	// check all of entities which connected with outside loop
	for( temp_list=In_Entities_list;
		 temp_list;
		 temp_list = temp_list->cdr)  {
		if ( temp_list->car == NULL ) break;
		ArcEntity = temp_list->car;
		//   check all of entities in the view
		for( ViewEntity=In_drawing->objects;
			 ViewEntity;
			 ViewEntity = ViewEntity->next)    {
			//   check flags    : only no marks entities
			if ( ViewEntity->flags !=0
				&& ViewEntity->flags !=10 )   continue;
			//   check type : only line
			if ( ViewEntity->type != CK_LINE ) continue;
			//   check open side     : only open line
			if ( ViewEntity->no_connected_1 > 0
				&& ViewEntity->no_connected_2 > 0 )
continue;
			//   check open side     :  two  side  open  line  (
delete )
			if ( ViewEntity->no_connected_1 == 0
				&& ViewEntity->no_connected_2 == 0
```

APPENDIX D

```
                && ViewEntity->line_type != CK_CENTER ) {
                ViewEntity->flags = 3;
                continue;
            }
            //   check parent open side
            if ( ViewEntity->no_connected_1 == 0
                && ViewEntity->line_type != CK_CENTER ) {
                //   set center line flags ( look for children
)
                for( temp_list2=ViewEntity->parent->children;
                     temp_list2 && temp_list2->cdr;
                     temp_list2 = temp_list2->cdr)     {
                    //   change flag to light gray
                    if ( temp_list2->car == NULL ) break;
                    if ( temp_list2->car->vertex2
                         ==  ViewEntity->parent->vertex2   )
break;
                }
                if  (  temp_list2->car->no_connected_2  !=  0)
continue;
            }
            if ( ViewEntity->no_connected_2 == 0
                && ViewEntity->line_type != CK_CENTER ) {
                //   set center line flags ( look for children
)
                for( temp_list3=ViewEntity->parent->children;
                     temp_list3 && temp_list3->cdr;
                     temp_list3 = temp_list3->cdr)     {
                    //   change flag to light gray
                    if ( temp_list3->car == NULL ) break;
                    if ( temp_list3->car->vertex1
                         ==  ViewEntity->parent->vertex1   )
break;
                }
                if  (  temp_list3->car->no_connected_1  !=  0)
continue;
            }
            //   check distance from arc's center to line entity

Vsp.x=ViewEntity->X1;Vsp.y=ViewEntity->Y1;Vsp.z=ViewEntity->Z1;

Vep.x=ViewEntity->X2;Vep.y=ViewEntity->Y2;Vep.z=ViewEntity->Z2;
            Vp.x=ArcEntity->CenterX;Vp.y=ArcEntity->CenterY;
            Vp.z=ArcEntity->CenterZ;
            Distance = F2dDistancePointLine( Vsp, Vep, Vp );
            if ( Distance > Tolerance ) continue;
            //   check bounding box : only outside and no touch
            if (( ViewEntity->parent->Max_X >= ArcEntity->Min_X
                  &&    ViewEntity->parent->Max_X    <=
ArcEntity->Max_X )
```

APPENDIX D

```
                && ( ViewEntity->parent->Max_Y >=
ArcEntity->Min_Y
                     && ViewEntity->parent->Max_Y <=
ArcEntity->Max_Y )) {
                F2dCleanUpChangeChildrenFlag(
ViewEntity->parent );
                continue;
            }
            if (( ViewEntity->parent->Min_X >= ArcEntity->Min_X
                  && ViewEntity->parent->Min_X <=
ArcEntity->Max_X )
                && ( ViewEntity->parent->Min_Y >=
ArcEntity->Min_Y
                     && ViewEntity->parent->Min_Y <=
ArcEntity->Max_Y )) {
                F2dCleanUpChangeChildrenFlag(
ViewEntity->parent );
                continue;
            }
            if (( ArcEntity->Max_X >= ViewEntity->parent->Min_X
                  && ArcEntity->Max_X <=
ViewEntity->parent->Max_X )
                && ( ArcEntity->Max_Y >=
ViewEntity->parent->Min_Y
                     && ArcEntity->Max_Y <=
ViewEntity->parent->Max_Y )) {
                F2dCleanUpChangeChildrenFlag(
ViewEntity->parent );
                continue;
            }
            if (( ArcEntity->Min_X >= ViewEntity->parent->Min_X
                  && ArcEntity->Min_X <=
ViewEntity->parent->Max_X )
                && ( ArcEntity->Min_Y >=
ViewEntity->parent->Min_Y
                     && ArcEntity->Min_Y <=
ViewEntity->parent->Max_Y )) {
                F2dCleanUpChangeChildrenFlag(
ViewEntity->parent );
                continue;
            }
            //  check distance from arc to entity
            ViewEntityLength =
F2dCleanUpLineLength(ViewEntity->parent);
            DX =
0.5*(ViewEntity->parent->Min_X+ViewEntity->parent->Max_X)
                 - ArcEntity->CenterX;
            DY =
0.5*(ViewEntity->parent->Min_Y+ViewEntity->parent->Max_Y)
                 - ArcEntity->CenterY;
```

APPENDIX D

```
                DistanceViewEntity2Center = sqrt(DX*DX+DY*DY)
                      - ArcEntity->Radius - 0.5*ViewEntityLength;
                if ( DistanceViewEntity2Center <= ViewEntityLength
)     {
                     F2dCleanUpChangeChildrenFlag(
ViewEntity->parent );
                     continue;
                }
                //   set center line flags ( look for children )
                for( temp_list4=ViewEntity->parent->children;
                      temp_list4;
                      temp_list4 = temp_list4->cdr)      {
                     //   change flag to light gray
                     if ( temp_list4->car == NULL ) break;
                     temp_list4->car->flags = 10;
                     count++;
                }
                if ( ViewEntity->next == NULL )    break;
          }
     }

#ifdef VELLUM
          CountPrompt++;
          sprintf( message,"Finished find center Entity %d",
CountPrompt );
          ck_prompt( message );
#endif
     //   normal end
     return count;
}

/*
=================================================================
     Function:
     Name :         F2dCleanUpFindInSideEntity
     Description:
               look for in side entities for outside loop.
     Return Value:
               = 0: Completed successfully and No found;
               = NUM: Open entities' number
     Subfunctions:
          int F2dCleanUpChangeChildrenFlag
                    set flags for unuse entities
     Parameters:
               Input:
                    1 In_Drawing: a     drawings
                    2 In_Entities_list: a node list for outside
loop
=================================================================
```

APPENDIX D

```
*/
int F2dCleanUpFindInSideEntity(
          struct drawing          *In_drawing,
          struct node_list    *In_Entities_list )
{
//    external functions
      int F2dCleanUpChangeChildrenFlag();
//    link list and temp list
      struct node_list
           *temp_list, *temp_list2,
           *NewNodeList, *NewNodeListTemp;
      struct group
           *NewGroup,
           *temp_group_list;
      struct bounding_box  *NewBoundBox;
//    selected entity and temp entities
      struct node
           *OutsideEntity,
           *ViewEntity;
//    entities counter and flags
      int count = 0,
           NoFlag = 0;
//    double
      double    Tolerance = 0.0;
      //   set tolerance
      Tolerance = F2dCleanUpTolerance;

      //   initialize
      NewGroup = (struct group *)calloc(1,sizeof(struct group ));
      NewBoundBox = (struct bounding_box *)calloc(1,sizeof(struct
bounding_box ));
      NewNodeList  =  (struct  node_list  *)calloc(1,sizeof(struct
node_list ));
      //   set group data
      NewGroup->next = NULL;
      NewGroup->box = NewBoundBox;
      // check all of entities which connected with outside loop
     for( temp_list=In_Entities_list;
            temp_list; // && temp_list->cdr;
            temp_list = temp_list->cdr)  {
           if ( temp_list->car == NULL ) break;
           OutsideEntity = temp_list->car;
           //   check entity : only boundary group ( flags = 1 and
4 )
           if ( OutsideEntity->flags != 1
                && OutsideEntity->flags != 4 )     continue;
           if ( !OutsideEntity )    {
                NoFlag = 1;
                break;
           }
```

APPENDIX D

```
        NewGroup->box->Min_X = OutsideEntity->Min_X;
        NewGroup->box->Max_X = OutsideEntity->Max_X;
        NewGroup->box->Min_Y = OutsideEntity->Min_Y;
        NewGroup->box->Max_Y = OutsideEntity->Max_Y;
        break;
    }
    if ( NoFlag == 1 )  return    0;
    NewNodeList->car = OutsideEntity;
    NewNodeList->cdr = NULL;
    // check first group
    if( In_drawing->views == NULL )        {
        NewGroup->index = 1;
        In_drawing->views = NewGroup;
    }
    else {
        //   check group number
        for( temp_group_list= In_drawing->views;
              temp_group_list; //     && temp_group_list->next;
              temp_group_list = temp_group_list->next)     {
             if ( temp_group_list->next == NULL )     {
                  NewGroup->index = (temp_group_list->index)+1;
                  temp_group_list->next = NewGroup;
                  break;
             }
        }
    }
    // check connected entity
    if ( !temp_list->cdr && temp_list->car->type != CK_ARC )
return 0;
    // check all of entities which connected with outside loop
    if ( temp_list->cdr )     {
        for( temp_list2 = temp_list->cdr;
              temp_list2;  //    && temp_list2->cdr;
              temp_list2 = temp_list2->cdr)     {
             if ( temp_list2->car == NULL ) break;
             OutsideEntity = temp_list2->car;
             //   check entity : only boundary group ( flags = 1
and 4 )
             if ( OutsideEntity->flags != 1
                  && OutsideEntity->flags != 4 )     continue;
             if ( NewGroup->box->Min_X > OutsideEntity->Min_X )
                  NewGroup->box->Min_X = OutsideEntity->Min_X;
             if ( NewGroup->box->Max_X < OutsideEntity->Max_X )
                  NewGroup->box->Max_X = OutsideEntity->Max_X;
             if ( NewGroup->box->Min_Y > OutsideEntity->Min_Y )
                  NewGroup->box->Min_Y = OutsideEntity->Min_Y;
             if ( NewGroup->box->Max_Y < OutsideEntity->Max_Y )
                  NewGroup->box->Max_Y = OutsideEntity->Max_Y;
             //   allocate memory for node list
             NewNodeListTemp    =    (struct   node_list
```

APPENDIX D

```
*)calloc(1,sizeof(struct node_list ));
                //   add this entity to node list
                NewNodeListTemp->car = OutsideEntity;
                //   connect to the node list
                NewNodeListTemp->cdr = NewNodeList;
                //   move the pointer of the node list to the top
                NewNodeList = NewNodeListTemp;
                count++;
           }
     }
     //   check all of entities in the view
     for( ViewEntity=In_drawing->objects;
           ViewEntity;
           ViewEntity = ViewEntity->next)    {
          //   check flags    : only no marks entities
          if ( ViewEntity == NULL  )    break;
          if ( ViewEntity->flags !=0  ) continue;
          //   check bounding box: only inside entities
          if (( NewGroup->box->Min_X <= ViewEntity->Min_X )
            &&( NewGroup->box->Max_X >= ViewEntity->Max_X )
            &&( NewGroup->box->Min_Y <= ViewEntity->Min_Y )
            &&( NewGroup->box->Max_Y >= ViewEntity->Max_Y ))     {
               //   set flag
               ViewEntity->flags = 7;
               //   allocate memory for node list
               NewNodeListTemp    =    (struct    node_list
*)calloc(1,sizeof(struct node_list ));
               //   add this entity to node list
               NewNodeListTemp->car = ViewEntity;
               //   connect to the node list
               NewNodeListTemp->cdr = NewNodeList;
               //   move the pointer of the node list to the top
               NewNodeList = NewNodeListTemp;
               count++;
          }
     }
     //   set node list to group
     NewGroup->entities = NewNodeList;
     //   normal end
     return count;
}

/*
=================================================================
     Function:
     Name :         F2dCleanUpFindOnesideOpenConnectEntityNext
     Description:
               look for next entity connected with one side open
               entity
```

APPENDIX D

```
     Return Value:
               = Out_entity: Completed successfully;
     Parameters:
               Input:
                    1 In_entity: entity
=================================================================
*/
struct node *F2dCleanUpFindOnesideOpenConnectEntityNext(struct node
*In_entity)
{
//   selected entity and temp entities
     struct node *Out_entity;
//   link list and temp list
     struct node_list
          *TempList1, *TempList2, *TempList3, *NextNodes;
//   define
     int  Flag1 = 0,
          Flag2 = 0,
          Count = 0;

     int CountPrompt = 0;
     char message[64];

#ifdef VELLUM
          CountPrompt++;
          sprintf( message,"Start Find One Side Open Connected
Entity %d", CountPrompt );
          ck_prompt( message );
#endif
     //   initialize
     Out_entity = NULL;

     //   check input entity
     if ( !In_entity )   return    Out_entity;
     //   check open side
     for( TempList1=In_entity->connected_nodes_1;
          TempList1; //  && TempList1->cdr;
          TempList1 = TempList1->cdr)    {
          if ( TempList1->car == NULL ) break;
          if ( TempList1->car->flags == 6 )  Flag1 = 1;
     }
     for( TempList2=In_entity->connected_nodes_2;
          TempList2; //  && TempList2->cdr;
          TempList2 = TempList2->cdr)    {
          if ( TempList2->car == NULL ) break;
          if ( TempList2->car->flags == 6 )  Flag2 = 1;
     }
     //   first entity case
     if ( Flag1 == 0 && Flag2 == 0 )  {
```

APPENDIX D

```
          if ( In_entity->no_connected_1 == 0 )    Flag1 = 1;
          if ( In_entity->no_connected_2 == 0 )    Flag2 = 1;
     }
     //   finish case: return
     if (( Flag1 == 0 && Flag2 == 0 )
       ||( Flag1 == 1 && Flag2 == 1 ))  return    Out_entity;
     //   check all of entities connected with input entity
     if ( Flag1 == 1 )    NextNodes = In_entity->connected_nodes_2;
     else                 N  e  x  t  N  o  d  e  s        =
In_entity->connected_nodes_1;
     for( TempList3= NextNodes;
          TempList3; //  && TempList3->cdr;
          TempList3 = TempList3->cdr)   {
          if ( TempList3->car == NULL ) break;
          if ( TempList3->car->flags == 0 )  {
               Out_entity = TempList3->car;
               Count++;
          }
     }
     //   check result
     if ( Count != 1 )    Out_entity = NULL;

#ifdef VELLUM
          CountPrompt++;
          sprintf( message,"Finished one side open connected Entity
%d", CountPrompt );
          ck_prompt( message );
#endif
     return    Out_entity;
}

/*

=================================================================
     Function:
     Name :         F2dCleanUpFindOnesideOpenConnectEntity
     Description:
               look for one side open entity and single connected
               with it
     Return Value:
               = 0: Completed successfully;
     Subfunctions:
          struct node *F2dCleanUpFindOnesideOpenConnectEntityNext
                    look for next entity connected with one side
                    open entity
     Parameters:
               Input:
                    1 In_drawing: drawing
================================================================
*/
```

APPENDIX D

```
int    F2dCleanUpFindOnesideOpenConnectEntity(struct    drawing
*In_drawing)
{
     //   external functions
     struct node *F2dCleanUpFindOnesideOpenConnectEntityNext();
     //   selected entity and temp entities
     struct node *entity, *FindEntity, *NextEntity;

     //   check all of entities on the list
     for( entity=In_drawing->objects;
           entity;
           entity = entity->next)  {
          if ( entity == NULL )    break;
          if ( entity->flags != 0 )     continue;
          if ( entity->type != CK_LINE )     continue;
          if ( entity->no_connected_1 > 0
               && entity->no_connected_2 > 0 )    continue;
          if ( entity->no_connected_1 == 0
               && entity->no_connected_2 == 0 )   continue;
          if   ((entity->no_connected_1    ==    0    &&
entity->no_connected_2 >= 1)
             ||(entity->no_connected_2    ==    0    &&
entity->no_connected_1 >= 1)) {
               //   set flag
               entity->flags =     6;
               FindEntity = entity;
               //   find connected entity
               for (;;)  {
                    NextEntity =

F2dCleanUpFindOnesideOpenConnectEntityNext( FindEntity );
                    if ( NextEntity == NULL )     break;
                    //   set flag
                    FindEntity = NextEntity;
                    FindEntity->flags = 6;
               }
          }
     }
     return 0;
}


/*
=================================================================
     Function:
     Name :          F2dCleanUpFindLongestEntity
     Description:
               look for a longest entity for a drawing
     Return Value:
```

APPENDIX D

```
                = Entity: Completed successfully;
                = 0: No entity;
     Parameters:
                Input:
                     1 In_drawing: drawing
=================================================================
*/
struct   node   *F2dCleanUpFindLongestEntity(struct   drawing
*In_drawing)
{
     //   selected entity and temp entities
     struct node *entity, *LongestEntity;
     //   define
     double    LongestLength = 0.0,
               ArcLength = 0.0;

     //        check all of entities on the list
     for( entity=In_drawing->objects;
           entity;
           entity = entity->next)  {
          //   only not used
          if ( entity == NULL )    break;
          if ( entity->flags != 0 )     continue;
          //   check length
          if ( entity->parent->length <= LongestLength )
continue;
          //   check arc length
          if ( entity->type == CK_ARC ) {
               ArcLength = 2.0 * entity->parent->Radius;
               if ( entity->parent->length < ArcLength )
                    ArcLength = entity->parent->length;
               if ( ArcLength > LongestLength )    {
                    //   change max value and entity
                    LongestLength = ArcLength;
                    LongestEntity = entity;
               }
          }
          else {
               //   change max value and entity
               LongestLength = entity->parent->length;
               LongestEntity = entity;
          }
     }
     if ( LongestLength == 0.0 )        return    NULL;
     else                               return    LongestEntity;
}

/*
=================================================================
```

APPENDIX D

```
     Function:
     Name :          F2dCleanUpFindViews
     Description:
               look for view's groups for a drawing
     Return Value:
               =  Entity: Completed successfully;
               =  0: No entity;
     Subfunctions:
          struct node *F2dCleanUpFindLongestEntity
                    look for a longest entity for a drawing
          struct node_list *F2dCleanUpFindGroup
                    look for a group entities connected with input
entity
          struct node *F2dCleanUpFindGroupMinX
                    look for minimum X-value for a entities group
          int F2dCleanUpFindOutSideLoop
                    look for out side loop entities
          int F2dCleanUpFindInSideEntity
                    look for in side entities for outside loop
     Parameters:
               Input:
                    1 In_drawing: drawing
=================================================================
*/
int F2dCleanUpFindViews( struct drawing *In_drawing )
{
     //   external functions
     struct node *F2dCleanUpFindLongestEntity();
     struct node_list *F2dCleanUpFindGroup();
     struct node *F2dCleanUpFindGroupMinX();
     int F2dCleanUpFindOutSideLoop();
     int F2dCleanUpFindInSideEntity();
     //   selected entity and temp entities
     struct node *LongestEntity, *MinXvalueEntity;
     struct node_list *ViewGroup;
     //   define
     int  ReturnFlag = 1,
               NoGroup = 0,
               Count = 0;
     double    LongestLength = 0.0;
     int CountPrompt = 0;
     char message[64];

     //   check all views
     while( ReturnFlag )      {
#ifdef VELLUM
          CountPrompt++;
          sprintf(  message,"Start  Find  Views  Entity  %d",
CountPrompt );
          ck_prompt( message );
```

APPENDIX D

```
#endif
          //   Step_1:   find a longest entity for a drawing
          LongestEntity = F2dCleanUpFindLongestEntity( In_drawing
);
          if ( LongestEntity == NULL )  ReturnFlag = 0;
          else {
               //   set flag
               NoGroup = 1;
               //   clear counter
               Count = 0;
               //   Step_2:   find connected group with the longest
entity
               ViewGroup  =  F2dCleanUpFindGroup(  LongestEntity,
&Count );
               //   Step_3:   find outside loop entities
               //        check a flag for outside loop process
               if ( Count > 1 )    M i n X v a l u e E n t i t y    =
F2dCleanUpFindGroupMinX( ViewGroup );
               else                MinXvalueEntity = LongestEntity;
               if ( MinXvalueEntity == 0 )   continue;
               //   Step_4:   find outside loop entities
               if ( Count > 1 )    F2dCleanUpFindOutSideLoop(
MinXvalueEntity );
               else      MinXvalueEntity->flags = 4;
               //   Step_5:   find inside entities
               F2dCleanUpFindInSideEntity( In_drawing, ViewGroup );
          }
#ifdef VELLUM
          CountPrompt++;
          sprintf(  message,"Finished  find  view  Entity  %d",
CountPrompt );
          ck_prompt( message );
#endif
     }
     if ( NoGroup == 0 )      return    -1;
     else                               return    0;
}

/*
=================================================================
     Function:
     Name :         F2dCleanUpFindRelativeViews
     Description:
               look for relative views.
     Return Value:
               = 0: Completed successfully;
               = 1: Found relative Views
     Parameters:
               Input:
                    1 In_Drawing: a     drawing
```

APPENDIX D

```
                    2 In_Group:    a group
                    3 In_ToleranceViews: tolerance for views
================================================================
*/
int F2dCleanUpFindRelativeViews(
     struct drawing *In_drawing,
     struct group   *In_Group,
     double *In_ToleranceViews )
{
//   link list and temp list
     struct    group *TempGroup;
     struct    group_list *TempGroupList;
//   entities counter and flags
     int ReturnFlag = 0;
//   double
     double    Tolerance = 0.0;
     //   set tolerance
     Tolerance = *In_ToleranceViews;

     //   check views
     if( In_drawing->views == NULL )         return    0;
     if( In_Group == NULL )                  return    0;
     for( TempGroup= In_drawing->views;
           TempGroup; // && TempGroup->next;
           TempGroup = TempGroup->next) {
          //   check same group
          if ( TempGroup == NULL ) break;
          if ( TempGroup == In_Group )  continue;
          //   Step_1:   check top and bottom direction
          i                                                         f
((TempGroup->box->Max_X>=((In_Group->box->Max_X)-Tolerance ))

&&(TempGroup->box->Max_X<=((In_Group->box->Max_X)+Tolerance ))

&&(TempGroup->box->Min_X>=((In_Group->box->Min_X)-Tolerance ))

&&(TempGroup->box->Min_X<=((In_Group->box->Min_X)+Tolerance ))) {
               //   set return flag
               ReturnFlag = 1;
               //   Step_1_1: check top direction
               if  ( TempGroup->box->Min_Y > In_Group->box->Max_Y
)    {
                    //   check top direction relative views
                    if ( In_Group->to_top == NULL )     {
                         TempGroupList   =   (struct   group_list
*)calloc(1,sizeof(struct group_list ));
                         TempGroupList->car = TempGroup;
                         TempGroupList->cdr = NULL;
                         In_Group->to_top = TempGroupList;
                    }
```

APPENDIX D

```
                    else {
                         //   check distance
                         if ( In_Group->to_top->car->box->Min_Y >
TempGroup->box->Min_Y )  {
                              //   change top view
                              In_Group->to_top->car = TempGroup;
                         }
                    }
               }
               else
               //   Step_1_2: check bottom direction
               if  ( TempGroup->box->Max_Y < In_Group->box->Min_Y
)    {
                    //   check top direction relative views
                    if ( In_Group->to_bottom == NULL ) {
                         TempGroupList   =   (struct   group_list
*)calloc(1,sizeof(struct group_list ));
                         TempGroupList->car = TempGroup;
                         TempGroupList->cdr = NULL;
                         In_Group->to_bottom = TempGroupList;
                    }
                    else {
                         //   check distance
                         if ( In_Group->to_bottom->car->box->Max_Y
< TempGroup->box->Max_Y )     {
                              //   change top view
                              In_Group->to_bottom->car = TempGroup;
                         }
                    }
               }

          }
          else
          //   Step_2:   check left and right direction
          i                                                          f
((TempGroup->box->Max_Y>=((In_Group->box->Max_Y)-Tolerance ))

&&(TempGroup->box->Max_Y<=((In_Group->box->Max_Y)+Tolerance ))

&&(TempGroup->box->Min_Y>=((In_Group->box->Min_Y)-Tolerance ))

&&(TempGroup->box->Min_Y<=((In_Group->box->Min_Y)+Tolerance ))) {
               //   set return flag
               ReturnFlag = 1;
               //   Step_2_1: check right direction
               if  ( TempGroup->box->Min_X > In_Group->box->Max_X
)    {
                    //   check right direction relative views
                    if ( In_Group->to_right == NULL )   {
                         TempGroupList   =   (struct   group_list
```

APPENDIX D

```
*)calloc(1,sizeof(struct group_list ));
                        TempGroupList->car = TempGroup;
                        TempGroupList->cdr = NULL;
                        In_Group->to_right = TempGroupList;
                    }
                    else {
                        //   check distance
                        if ( In_Group->to_right->car->box->Min_X
> TempGroup->box->Min_X )     {
                            //   change left view
                            In_Group->to_right->car = TempGroup;
                        }
                    }
                }
                else
                //   Step_2_2: check left direction
                if ( TempGroup->box->Max_X < In_Group->box->Min_X
)    {
                    //   check left direction     relative views
                    if ( In_Group->to_left == NULL )    {
                        TempGroupList   =   (struct   group_list
*)calloc(1,sizeof(struct group_list ));
                        TempGroupList->car = TempGroup;
                        TempGroupList->cdr = NULL;
                        In_Group->to_left = TempGroupList;
                    }
                    else {
                        //   check distance
                        if ( In_Group->to_left->car->box->Max_X <
TempGroup->box->Max_X )  {
                            //   change right view
                            In_Group->to_left->car = TempGroup;
                        }
                    }
                }
            }
        }
    //   normal end
    return    ReturnFlag;
}

/*
=================================================================
    Function:
    Name :          F2dCleanUpFindViewsRelation
    Description:
                look for views relation for a drawing.
    Return Value:
                = 0: Completed successfully and No found;
```

APPENDIX D

```
              = NUM: Views' number
     Subfunctions:
          int F2dCleanUpFindRelativeViews
                    look for relative views
     Parameters:
              Input:
                    1 In_Drawing: a     drawings
=================================================================
*/
int F2dCleanUpFindViewsRelation( struct drawing   *In_drawing )
{
//   external functions
     int F2dCleanUpFindRelativeViews();
//   link list and temp list
     struct    group
          *MaxGroup,
          *TempGroup,
          *NextGroup;
     struct    group_list
          *OpenGroupList,
          *TempOpenGroupList,
          *TempGroupList;
     struct node_list *ETL;   //   Entity Temp List
//   entities counter and flags
     int NoFlag = 0;
//   double
     double    BiggestSize = 0.0,
               BiggestSizeTemp = 0.0;
     double    Tolerance = 0.0,
               ToleranceViews = 0.0;
     //   set tolerance
     Tolerance = F2dCleanUpTolerance;

     //   check views
     if( In_drawing->views == NULL )          return    0;
     //   Step_1:   get the biggest group's size
     for( TempGroup= In_drawing->views;
           TempGroup; // && TempGroup->next;
           TempGroup = TempGroup->next) {
          // clear flags
          TempGroup->index = 0;
          // compute size for box
          BiggestSizeTemp =
               fabs( TempGroup->box->Max_X - TempGroup->box->Min_X
)
            + fabs( TempGroup->box->Max_Y - TempGroup->box->Min_Y
);
          //   check size
          if ( BiggestSizeTemp > BiggestSize )    {
               BiggestSize = BiggestSizeTemp;
```

APPENDIX D

```
                MaxGroup   = TempGroup;
            }
            //   check last one
            if ( TempGroup->next == NULL )     break;
      }
      //   check views tolerance
      ToleranceViews = 0.01 * BiggestSize;
      if ( ToleranceViews < Tolerance ) ToleranceViews = Tolerance;

      //   Step_2:   find relationship for each view
      //         initialize a open list
      OpenGroupList = (struct group_list *)calloc(1,sizeof(struct
group_list ));
      OpenGroupList->car = MaxGroup;
      OpenGroupList->cdr = NULL;
      // set a open flag to the group
      MaxGroup->index = 1;
      for ( TempGroupList = OpenGroupList; TempGroupList; )  {
            //   get a pointer from open list
            if ( TempGroupList->car == NULL )  break;
            NextGroup = TempGroupList->car;
            //   set a closed flag to the group
            NextGroup->index = 2;
            //   close the group ( delete the group from open list )
            OpenGroupList = OpenGroupList->cdr;
            //   get relation
            NoFlag    =    F2dCleanUpFindRelativeViews(   In_drawing,
NextGroup, &ToleranceViews );
            if ( NoFlag == 0 )  break;
            //   check each direction for the view
            if ( NextGroup->to_top != NULL )        {
                  if ( NextGroup->to_top->car->index == 0 )    {
                        TempOpenGroupList    =    (struct   group_list
*)calloc(1,sizeof(struct group_list ));
                        T e m p O p e n G r o u p L i s t - > c a r    =
NextGroup->to_top->car;
                        TempOpenGroupList->cdr = OpenGroupList;
                        TempOpenGroupList->car->index = 1;
                        OpenGroupList = TempOpenGroupList;
                  }
            }
            if ( NextGroup->to_bottom != NULL )          {
                  if ( NextGroup->to_bottom->car->index == 0 ) {
                        TempOpenGroupList    =    (struct   group_list
*)calloc(1,sizeof(struct group_list ));
                        T e m p O p e n G r o u p L i s t - > c a r    =
NextGroup->to_bottom->car;
                        TempOpenGroupList->cdr = OpenGroupList;
                        TempOpenGroupList->car->index = 1;
                        OpenGroupList = TempOpenGroupList;
```

APPENDIX D

```
                    }
               }
               if ( NextGroup->to_left != NULL )       {
                    if ( NextGroup->to_left->car->index == 0 )    {
                         TempOpenGroupList    =    (struct    group_list
*)calloc(1,sizeof(struct group_list ));
                         T e m p O p e n G r o u p L i s t - > c a r    =
NextGroup->to_left->car;
                         TempOpenGroupList->cdr = OpenGroupList;
                         TempOpenGroupList->car->index = 1;
                         OpenGroupList = TempOpenGroupList;
                    }
               }
               if ( NextGroup->to_right != NULL )      {
                    if ( NextGroup->to_right->car->index == 0 )   {
                         TempOpenGroupList    =    (struct    group_list
*)calloc(1,sizeof(struct group_list ));
                         T e m p O p e n G r o u p L i s t - > c a r    =
NextGroup->to_right->car;
                         TempOpenGroupList->cdr = OpenGroupList;
                         TempOpenGroupList->car->index = 1;
                         OpenGroupList = TempOpenGroupList;
                    }
               }
               //   assign value to the loop variable
               TempGroupList = OpenGroupList;
          }

          //   Step_3:   clear flags for no relative groups
          for(  NextGroup=In_drawing->views;  NextGroup;  NextGroup  =
NextGroup->next)     {
               if ( NextGroup == NULL ) break;
               if ( NextGroup->index != 0 )       continue;
               for ( ETL=NextGroup->entities; ETL; ETL=ETL->cdr )     {
                    ETL->car->flags = 0;
                    if ( ETL->cdr == NULL  ) break;
               }
          }

          //   normal end
          return 0;
}

/*
=================================================================
          Function:
          Name :         F2dCleanUpFindDrawingSheet
          Description:
                    look for drawing sheet for a drawing
```

APPENDIX D

```
     Return Value:
               = -1: Error data;
               =  0: Completed successfully;
               =  1: No sheet;
     Subfunctions:
          struct node_list *F2dCleanUpFindGroup
                    look for a group entities connected with input
entity
     Parameters:
               Input:
                    1 In_drawing: drawing

=================================================================
*/
int F2dCleanUpFindDrawingSheet(
     struct drawing *In_drawing,
     struct bounding_box *InOut_BB,
     int        *In_TimesFlag )
{
     //   external functions
     struct node_list *F2dCleanUpFindGroup();
     //   selected entity and temp entities
     struct node *entity, *LongestEntityX, *LongestEntityY;
     struct node_list    *SheetGroup, *temp_list2;
     //   bounding box
     struct bounding_box BB, EBB;
     //   define
     int       SheetFlag = 0,
               count = 0,
               CountPrompt = 0;
     double    LongestLengthX = 0.0,
               LongestLengthY = 0.0,
               AlphaX = 0.0, AlphaY = 0.0;
     char message[64];
     double    Tolerance = 0.0;
     //   set tolerance
     Tolerance = F2dCleanUpTolerance;


#ifdef VELLUM
          CountPrompt++;
          sprintf(   message,"Start   Find   Sheet   Entity   %d",
CountPrompt );
          ck_prompt( message );
#endif
     //   STEP_1:   look for the longest line type parent entity

     //        check all of entities on the list
     for( entity=In_drawing->objects;
           entity;
```

APPENDIX D

```
         entity = entity->next)  {
        //   only line type
        if ( entity == NULL )    break;
        if ( entity->type != CK_LINE )     continue;
        //   only not used
        if ( entity->flags != 0 )     continue;
        //   check length
        if (( entity->parent->length <= LongestLengthX )
          &&( entity->parent->length <= LongestLengthY ))
continue;
        //   check horizontally and vertically
        //   if angle(alpha) was smaller than ( sin ( alpha ) =
alpha )
        AlphaX    =    fabs(    (    entity->parent->Max_X    -
entity->parent->Min_X )
                       / entity->parent->length );
        AlphaY    =    fabs(    (    entity->parent->Max_Y    -
entity->parent->Min_Y )
                       / entity->parent->length );
        if  (  ( AlphaX > Tolerance ) && ( AlphaY > Tolerance )
)    continue;
        //   change max value and entity
        if ( AlphaY < Tolerance )     {
             if ( entity->parent->length > LongestLengthX )    {

                  LongestLengthX = entity->parent->length;
                  LongestEntityX = entity;
             }
        }
        else {
             if ( entity->parent->length > LongestLengthY )    {

                  LongestLengthY = entity->parent->length;
                  LongestEntityY = entity;
             }
        }
    #ifdef VELLUM
        //CountPrompt++;
        //sprintf( message,"Sheet Entity %d", CountPrompt );
        //ck_prompt( message );
    #endif
    }
    //   check the longest entitiy's length
    if (( LongestLengthX < Tolerance )
      ||( LongestLengthY < Tolerance ))     return    -1;

    //   set bounding box
    BB.Min_X = LongestEntityX->parent->Min_X;
    BB.Max_X = LongestEntityX->parent->Max_X;
    BB.Min_Y = LongestEntityY->parent->Min_Y;
```

APPENDIX D

```
     BB.Max_Y = LongestEntityY->parent->Max_Y;
     //   check inside drawing sheet size
     if ( *In_TimesFlag == 1) *InOut_BB = BB;      //   set values
     else {
          if ( (InOut_BB->Min_X == 0.0 ) && (InOut_BB->Max_X == 0.0
)
           &&(InOut_BB->Min_Y == 0.0 ) && (InOut_BB->Max_Y == 0.0
))   return    0;
          if (( BB.Max_X - BB.Min_X ) < Tolerance )    return    0
          if  (  fabs((  InOut_BB->Max_X  -  InOut_BB->Min_X  )  /  (
BB.Max_X - BB.Min_X )) > 1.2 )     return     0;
     }
     //   set a flag to entity
     LongestEntityX->flags = 3;

     //   STEP_2:   look  for  connected  entities  group  and  make
boundary
     SheetGroup = F2dCleanUpFindGroup( LongestEntityX, &count );
     if ( SheetGroup == 0 )        return    0;

     //   STEP_3:   clear flags    for all entities
     for( entity=In_drawing->objects;
           entity;
           entity = entity->next)  {
          if ( entity == NULL )    break;
          if ( entity->flags == 3 )     continue;
          if ( entity->flags == 4 )     continue;
          entity->flags = 0;
     }

     //   STEP_4:   set flags the group
     for ( temp_list2 = SheetGroup;
            ( temp_list2!=0 &&
             temp_list2->car!=0 );
          temp_list2=temp_list2->cdr)   {
          if ( temp_list2->car == NULL )     break;
          temp_list2->car->flags = 3;
     }

     //   STEP_5:   set expanding box ( 20% for +X,-X,+Y,-Y )
     EBB.Min_X  =  (  BB.Min_X  )  -  0.2  *  fabs((  BB.Max_X  )  -  (
BB.Min_X ));
     EBB.Max_X  =  (  BB.Max_X  )  +  0.2  *  fabs((  BB.Max_X  )  -  (
BB.Min_X ));
     EBB.Min_Y  =  (  BB.Min_Y  )  -  0.2  *  fabs((  BB.Max_Y  )  -  (
BB.Min_Y ));
     EBB.Max_Y  =  (  BB.Max_Y  )  +  0.2  *  fabs((  BB.Max_Y  )  -  (
BB.Min_Y ));

     //   STEP_6:   check outside entity( out of the bounding box
```

APPENDIX D

```
) in the DRAWING
     //        if any entity was found, no sheet was found for this
drawing
     for( entity=In_drawing->objects;
           entity;
           entity = entity->next)  {
          if ( entity == NULL )    break;
          if ( entity->flags != 0 )     continue;
          //   look for out side entity
          if ( entity->Max_X > EBB.Max_X )    {
               SheetFlag = 1;
               break;
          }
          if ( entity->Max_Y > EBB.Max_Y )    {
               SheetFlag = 1;
               break;
          }
          if ( entity->Min_X < EBB.Min_X )    {
               SheetFlag = 1;
               break;
          }
          if ( entity->Min_Y < EBB.Min_Y )    {
               SheetFlag = 1;
               break;
          }
     }
     //   STEP_7:   look for sheet data ( out side of the boundary
)
     if ( SheetFlag == 0 )     {
          //   look for sheet data
          for( entity=In_drawing->objects;
                entity;
                entity = entity->next)  {
               if ( entity == NULL )    break;
               if ( entity->flags == 3 )     entity->flags = 4;
               if ( entity->flags != 0 )     continue;
               if (( entity->Min_X <= BB.Min_X )||( entity->Max_X
>= BB.Max_X )
                 ||( entity->Min_Y <= BB.Min_Y )||( entity->Max_Y
>= BB.Max_Y ))
                    //   set flag
                    entity->flags =     4;
          }

          //   Good
          return 0;
     }

     //   STEP_8:   clear flags ( No sheet was found ! )
     for( entity=In_drawing->objects;
```

APPENDIX D

```
          entity;
          entity = entity->next)  {
         if ( entity == NULL )    break;
         if ( entity->flags == 4 )     continue;
         entity->flags = 0;
     }
     if ( SheetFlag != 0 )    return 1;

#ifdef VELLUM
         CountPrompt++;
         sprintf(  message,"Finished  find  Sheet  Entity  %d",
CountPrompt );
         ck_prompt( message );
#endif
     return 0;
}

/*
=================================================================
     Function:
     Name :          TestFindDrawingSheetControl
     Description:
               It is a manual function.
               To find drawing sheet for a drawing.
     Return Value:
               < 0: Error
               = 0: No proccess
               >  0:  Completed  successfully;  the  Number  is  the
counter of
                     found entities.
     Parameters:
     Subfunctions:
         int F2dCleanUpFindDrawingSheet
                    look for drawing sheet for a drawing.
         int  F2dCleanUpChangeDrawingFlag
                    change entities' flags ( 4 >> 3 )
=================================================================
*/
int  TestFindDrawingSheetControl( int *SwitchRedraw )
{
     //   external functions
     int F2dCleanUpFindDrawingSheet();
     int F2dCleanUpChangeDrawingColor();
     int  F2dCleanUpChangeDrawingFlag();
     //   define
     struct bounding_box BB;
     int  ReturnFlag = 0;
     int  TimesFlag = 0;

//-----------------------------------
```

APPENDIX D

```
//   Step_1:        check the number of entites
//        if an error occurred, exit immidiately.
    if (number_of_entities<0)  return -1;
//---------------------------------
//   Step_2:        find center line entities
     TimesFlag = 1;
     ReturnFlag = F2dCleanUpFindDrawingSheet( &trim_drawing, &BB,
&TimesFlag );
     if( ReturnFlag == 1 )    return 0;
     if( ReturnFlag == -1 )   return 0;
     TimesFlag = 2;
     F2dCleanUpFindDrawingSheet( &trim_drawing, &BB, &TimesFlag );
//---------------------------------
//   Step_3:        change flags
     F2dCleanUpChangeDrawingFlag( &trim_drawing );
//---------------------------------
//   Step_X:        change color to light gray for a selected
center lines
    // turn off input levels
#ifdef CKWIN
     if ( *SwitchRedraw == 1  )    ck_levels(CK_OFF,1,255);
#endif
     if ( *SwitchRedraw == 1  )
F2dCleanUpChangeDrawingColor(&trim_drawing);
     // turn ON the level used to store the trimmed entities.
#ifdef CKWIN
     if ( *SwitchRedraw == 1  )    ck_levels(CK_ON,TrimLevel,
TrimLevel);
     //if ( *SwitchRedraw == 1     )    ck_redraw( CK_PRIME_VP );
#endif
     return 0;
}

/*
=================================================================
     Function:
     Name :         TestFindViewsControl
     Description:
               It is a manual function.
               To find views for a drawing.
     Return Value:
               < 0: Error
               = 0: No proccess
               > 0: Completed successfully; the Number is the
counter of
                    found entities.
     Parameters:
     Subfunctions:
          int F2dCleanUpFindViews
```

APPENDIX D

```
                look for view's groups for a drawing
        int F2dCleanUpFindViewsRelation
                look for views relation for a drawing
        int F2dCleanUpChangeDrawingColor
====================================================================
*/
int  TestFindViewsControl( int *SwitchRedraw )
{
    //   external functions
    int F2dCleanUpFindViews();
    int F2dCleanUpFindViewsRelation();
    int F2dCleanUpChangeDrawingColor();

//   Step_1:        check the number of entites
//        if an error occurred, exit immidiately.
   if (number_of_entities<0)  return -1;

//   Step_2:        find views' group
    if ( F2dCleanUpFindViews( &trim_drawing ) ==  -1 )      return
-1;

//   Step_3:        find views' relationship
    //   move to delete function ( Mar. 29,1996 )
    //F2dCleanUpFindViewsRelation( &trim_drawing );

//   Step_X:        change  color  to  light  gray  for  a  selected
center lines
   // turn off input levels
#ifdef CKWIN
    if ( *SwitchRedraw == 1  )    ck_levels(CK_OFF,1,255);
#endif
    if ( *SwitchRedraw == 1  )
F2dCleanUpChangeDrawingColor(&trim_drawing);
    // turn ON the level used to store the trimmed entities.
#ifdef CKWIN
    if ( *SwitchRedraw == 1  )    ck_levels(CK_ON,TrimLevel,
TrimLevel);
    if ( *SwitchRedraw == 1  )    ck_redraw( CK_PRIME_VP );
#endif
    return 0;
}

/*

====================================================================
    Function:
    Name :        TestFindBoundaryControl

    Description:
              It  is  a  manual  function.  When  user  selected  a
```

APPENDIX D

```
boundary's
                entity of a view, the function would find all of the

                connected entities for the view.

     Return Value:
                < 0: Error
                = 0: No proccess
                > 0: Completed successfully; the Number is the
counter of
                      found entities.
     Parameters:
     Subfunctions:
          int F2dCleanUpFindOutSideLoop
                    look for out side loop entities
          int F2dCleanUpFindInSideEntity
                    look for in side entities for outside loop
          int F2dCleanUpFindOutNextEntity
                    look for connected entity with out side loop
entities
          struct node *F2dCleanUpFindGroupMinX
                    look for minimum X-value for a entities group
          struct node_list *F2dCleanUpFindGroup
                    look for a group entities connected with input
entity
          struct node *F2dCleanUpInputEntity ( old function )
                    look for a selected entity on screen
          int F2dCleanUpLineAngle
                    compute a line type entity's angle
          int F2dCleanUpArcAngle
                    compute a arc type entity's angle.
          int F2dCleanUpChangeChildrenFlag
                    change entity's children flags
          int F2dCleanUpChangeArrowVertexFlag
                    change arrow top vertex's flags and
                         set arrow center line coordinates
          int F2dCleanUpFindViewsRelation
                    look for views relation for a drawing
          int F2dCleanUpChangeColor
                    change entity's color
      double F2dCleanUpLineLength
                    compute line type entity's length
=================================================================
*/

int  TestFindBoundaryControl( int *SwitchRedraw )
{
     //   external functions
     int F2dCleanUpChangeDrawingColor();
     int F2dCleanUpFindOutSideLoop();
```

APPENDIX D

```
     int F2dCleanUpFindInSideEntity();
     int F2dCleanUpFindViewsRelation();
     struct node *F2dCleanUpInputEntity();
     struct node *F2dCleanUpFindGroupMinX();
     struct node_list *F2dCleanUpFindGroup();

     //   entities counter and flags
     int count = 0;
     //   link list and temp list
     struct node_list *Entities_list;
     //   selected entity and temp entities
     struct node
          *entity,
          *MinXvalueEntity;

//   Begin
//-----------------------------------
//   Step_1:
//   check the number of entites
//  get count of all entities
//   if an error occurred, exit immidiately.
    if (number_of_entities<0)  return -1;

     for( ; ; )     {
//-----------------------------------
//   Step_2:        select one entity
          entity = F2dCleanUpInputEntity( "Select a Boundary Entity
for a view",
                                        &trim_drawing);
          if ( entity == 0 )       return    0;
          if ( entity->flags != 0 )          continue;
//-----------------------------------
//   Step_3:        find a connected entities group
          Entities_list = F2dCleanUpFindGroup( entity, &count );
//-----------------------------------
//   Step_4:        find outside loop entities without assistant
entities
          //   check a flag for outside loop process
          if ( count < 1 )    continue;
          MinXvalueEntity    =    F2dCleanUpFindGroupMinX(
Entities_list);
          if ( MinXvalueEntity == 0 )   continue;
//-----------------------------------
//   Step_5:   find outside loop entities
          F2dCleanUpFindOutSideLoop( MinXvalueEntity );
//-----------------------------------
//   Step_6:   find inside entities
          F2dCleanUpFindInSideEntity( &trim_drawing, Entities_list
);
//-----------------------------------
```

APPENDIX D

```
//   Step_7:        find views' relationship
     //   move delete function (Mar.29, 1996 By Ji )
     //F2dCleanUpFindViewsRelation( &trim_drawing );
//--------------------------------
//   Step_X:   change color to Magenta for a selected boundary
         // turn off input levels
#ifdef CKWIN
          if ( *SwitchRedraw == 1  )    ck_levels(CK_OFF,1,255);
#endif
          F2dCleanUpChangeDrawingColor(&trim_drawing);
          // turn ON the level used to store the trimmed entities.
#ifdef CKWIN
          if ( *SwitchRedraw == 1  )    ck_levels(CK_ON,TrimLevel,
TrimLevel);
          if ( *SwitchRedraw == 1  )    ck_redraw( CK_PRIME_VP );
#endif
     }
     return count;
}


/*
=================================================================
     Function:
     Name :         TestFindCenterLineControl
     Description:
               It is a manual function.
               To find center line for all arcs in the view.
     Return Value:
               < 0: Error
               = 0: No proccess
               > 0:  Completed  successfully;  the  Number  is  the
counter of
                     found entities.
     Parameters:
     Subfunctions:
          struct node_list *F2dCleanUpPickUpAllArcEntity
                    look for all arc entities in selected drawing
          int F2dCleanUpChangeDrawingColor
                    change entity's color
=================================================================
*/

int  TestFindCenterLineControl( int *SwitchRedraw )
{
     //   external functions
     int F2dCleanUpFindCenterLineEntity();
     int F2dCleanUpChangeDrawingColor();
     struct node_list *F2dCleanUpPickUpAllArcEntity();
```

APPENDIX D

```
     //   link list and temp list
     struct node_list
          *Entities_list;

//   Begin
//----------------------------------
//   Step_1:        check the number of entites
//   if an error occurred, exit immidiately.
    if (number_of_entities<0)  return -1;

//---------------------------------
//   Step_2:        pickup all arc entities
     Entities_list = F2dCleanUpPickUpAllArcEntity( &trim_drawing );
    if (Entities_list == 0)  return 0;
//---------------------------------
//   Step_3:        find center line entities
     F2dCleanUpFindCenterLineEntity( &trim_drawing, Entities_list
);
//---------------------------------
//   Step_X:        change color to light gray for a selected
center lines
    // turn off input levels
#ifdef CKWIN
     if ( *SwitchRedraw == 1  )    ck_levels(CK_OFF,1,255);
#endif
     if ( *SwitchRedraw == 1  )
F2dCleanUpChangeDrawingColor(&trim_drawing);
     // turn ON the level used to store the trimmed entities.
#ifdef CKWIN
     if ( *SwitchRedraw == 1  )    ck_levels(CK_ON,TrimLevel,
TrimLevel);
     if ( *SwitchRedraw == 1  )    ck_redraw( CK_PRIME_VP );
#endif
     return 0;
}

/*
=================================================================
     Function:
     Name :         TestFindOneSideOpenConnectControl
     Description:
               It is a manual function.
               To find one side open connected entities.
     Return Value:
               < 0: Error
               = 0: No proccess
               > 0: Completed successfully; the Number is the
counter of
                     found entities.
```

APPENDIX D

```
     Parameters:
     Subfunctions:
          int F2dCleanUpFindOnesideOpenConnectEntity
                    look for one side open connected entities.
=================================================================
*/
int  TestFindOneSideOpenConnectControl( int *SwitchRedraw )
{
     //   external functions
     int F2dCleanUpFindOnesideOpenConnectEntity();
     int F2dCleanUpChangeDrawingColor();

//------------------------------------
//   Step_1:        check the number of entites
//        if an error occurred, exit immidiately.
    if (number_of_entities<0)  return -1;
//-----------------------------------
//   Step_2:        find center line entities
     F2dCleanUpFindOnesideOpenConnectEntity( &trim_drawing );
//-----------------------------------
//   Step_X:        change color to light gray for a selected
center lines
    // turn off input levels
#ifdef CKWIN
     if ( *SwitchRedraw == 1  )    ck_levels(CK_OFF,1,255);
#endif
     if ( *SwitchRedraw == 1  )
F2dCleanUpChangeDrawingColor(&trim_drawing);
     // turn ON the level used to store the trimmed entities.
#ifdef CKWIN
     if ( *SwitchRedraw == 1  )    ck_levels(CK_ON,TrimLevel,
TrimLevel);
     if ( *SwitchRedraw == 1  )    ck_redraw( CK_PRIME_VP );
#endif
     return 0;
}

/*

=================================================================
     Function:
     Name :         TestFindSameColorControl

     Description:
               It is a manual function.
               To find same color entities.

     Return Value:
               = 0: Completed successfully; the Number is the
counter of
```

APPENDIX D

```
                    found entities.
     Parameters:
     Subfunctions:
          struct node *F2dCleanUpInputEntity ( old function )
                    look for a selected entity on screen
          int F2dCleanUpFindSameColorEntity
                    look for same color entities by a selected
entity
          int F2dCleanUpChangeDrawingColor
                    change entity's color
================================================================
*/

int  TestFindSameColorControl()
{
     //   external functions
     int F2dCleanUpChangeDrawingColor();
     int F2dCleanUpFindSameColorEntity();
     struct node *F2dCleanUpInputEntity();
     //   selected entity and temp entities
     struct node    *entity;

//   Begin
//-----------------------------------
//   Step_1:
//   check the number of entites
//   if an error occurred, exit immidiately.
    if (number_of_entities<0)  return -1;

     for( ; ; )      {
//-----------------------------------
//   Step_2:        select one entity
          entity = F2dCleanUpInputEntity( "Select a Unuse Color
Entity",
                                        &trim_drawing);
          if ( entity == 0 )       return    0;
          if ( entity->flags != 0 )          continue;
//-----------------------------------
//   Step_3:        find a connected entities group
          F2dCleanUpFindSameColorEntity( entity, &trim_drawing );
//-----------------------------------
//   Step_X:   change color to Magenta for a selected boundary
          // turn off input levels
#ifdef CKWIN
          ck_levels(CK_OFF,1,255);
#endif
          F2dCleanUpChangeDrawingColor(&trim_drawing);
          // turn ON the level used to store the trimmed entities.
#ifdef CKWIN
          ck_levels(CK_ON,TrimLevel, TrimLevel);
```

APPENDIX D

```
     if ( *SwitchRedraw == 1  )     ck_redraw( CK_PRIME_VP );
#endif
     }
     return 0;
}

/*
=================================================================
     Function:
     Name :         TestFindSelectSingleControl

     Description:
               It is a manual function.      To find a use entity.

     Return Value:
               = 0: Completed successfully;
     Parameters:
     Subfunctions:
          struct node *F2dCleanUpInputEntity ( old function )
                    look for a selected entity on screen
================================================================
*/
int  TestFindSelectSingleControl()
{
     //   external functions
     struct node *F2dCleanUpInputEntity();
     //   selected entity and temp entities
     struct node    *entity;
     //   entity's specifitys
     CK_ENTATT attr;     //   specificity of entities

//   Begin
//------------------------------------
//   Step_1:   check the number of entites
//   if an error occurred, exit immidiately.
    if (number_of_entities<0)  return -1;

     for( ; ; )      {
//-----------------------------------
//   Step_2:        select one entity
          entity = F2dCleanUpInputEntity( "Select an Unuse Entity",
&trim_drawing);
          if ( entity == 0 )       return    0;
//-----------------------------------
//   Step_3:        change flag
          if ( entity->flags == 7 )     {
               entity->flags = 0;
               attr.color     = CK_BLUE;
          }
          else if ( entity->flags == 0 )     {
```

APPENDIX D

```
                entity->flags = 7;
                attr.color      = CK_YELLOW;
            }
            else return     0;
//---------------------------------
//   Step_X:   change color to light gray for unuse entity
           // turn off input levels
//         ck_levels(CK_OFF,1,255);
            ck_setattr( entity->id, CK_COLOR, NULL, &attr );
            // turn ON the level used to store the trimmed entities.
//         ck_levels(CK_ON,TrimLevel, TrimLevel);
            ck_redraw( CK_PRIME_VP );
     }
     return 0;
}

/*
=================================================================
     Function:
     Name :          TestUnselectSingleControl

     Description:
               It is a manual function. To clear an unuse entity.
     Return Value:
               = 0: Completed successfully;
     Parameters:
     Subfunctions:
          struct node *F2dCleanUpInputEntity ( old function )
                    look for a selected entity on screen
================================================================
*/

int  TestUnselectSingleControl()
{
     //   external functions
     struct node *F2dCleanUpInputEntity();
     //   selected entity and temp entities
     struct node    *entity;
     //   entity's specifitys
     CK_ENTATT attr;     //   specificity of entities

//   Begin
//----------------------------------
//   Step_1:        check the number of entites
//   if an error occurred, exit immidiately.
    if (number_of_entities<0)  return -1;

     for( ; ; )     {
//---------------------------------
```

APPENDIX D

```
//   Step_2:        select one entity
          entity = F2dCleanUpInputEntity( "Select an Entity to
release",
                                        &trim_drawing);
          if ( entity == 0 )        return    0;
//---------------------------------
//   Step_3:        change flag
          if ( entity->flags != 3  && entity->flags != 4
               && entity->flags != 10 ) continue;
          entity->flags = 0;
//---------------------------------
//   Step_X:   change color to light gray for unuse entity
         // turn off input levels
         ck_levels(CK_OFF,1,255);
          attr.color = entity->color;
          ck_setattr( entity->id, CK_COLOR, NULL, &attr );
          // turn ON the level used to store the trimmed entities.
         ck_levels(CK_ON,TrimLevel, TrimLevel);
          ck_redraw( CK_PRIME_VP );
     }
     return 0;
}

/*
=================================================================
     Function:
     Name :         TestClearKeepFlagsControl

     Description:
               It is a manual function.
               To return all selected entities to back

     Return Value:
               = 0: Completed successfully;

     Parameters:
     Subfunctions:
          int F2dCleanUpClearDrawingKeepFlags
                    change entity's color to back but keep flags
=================================================================
*/

int  TestClearKeepFlagsControl( int *SwitchRedraw )
{
     //   external functions
     int F2dCleanUpClearDrawingKeepFlags();

//   Begin
//----------------------------------
```

APPENDIX D

```
//   check the number of entites
//   if an error occurred, exit immidiately.
    if (number_of_entities<0)  return -1;
//--------------------------------
    // turn off input levels

#ifdef CKWIN
     if ( *SwitchRedraw == 1  )    ck_levels(CK_OFF,1,255);
#endif
     F2dCleanUpClearDrawingKeepFlags(&trim_drawing);
     if ( *SwitchRedraw == 1  )    ck_redraw( CK_PRIME_VP );
     // turn ON the level used to store the trimmed entities.
#ifdef CKWIN
     if ( *SwitchRedraw == 1  )    ck_levels(CK_ON,TrimLevel,
TrimLevel);
     if ( *SwitchRedraw == 1  )    ck_redraw( CK_PRIME_VP );
#endif

     return    0;
}

/*
=================================================================
     Function:
     Name :         TestClearControl

     Description:
               It is a manual function.
               To return all selected entities to back

     Return Value:
               = 0: Completed successfully;

     Parameters:
     Subfunctions:
          int F2dCleanUpClearDrawingEntity
                    change entity's color to back
================================================================
*/

int  TestClearControl( int *SwitchRedraw )
{
     //   external functions
     int F2dCleanUpClearDrawingEntity();

//   Begin
//--------------------------------
//   check the number of entites
//   if an error occurred, exit immidiately.
```

APPENDIX D

```
    if (number_of_entities<0)  return -1;
//-----------------------------------
    // turn off input levels
#ifdef CKWIN
     if ( *SwitchRedraw == 1  )    ck_levels(CK_OFF,1,255);
#endif
     F2dCleanUpClearDrawingEntity(&trim_drawing);
     // turn ON the level used to store the trimmed entities.
#ifdef CKWIN
     if ( *SwitchRedraw == 1  )    ck_levels(CK_ON,TrimLevel,
TrimLevel);
     if ( *SwitchRedraw == 1  )    ck_redraw( CK_PRIME_VP );
#endif

     return    0;
}

/*
=================================================================
     Function:
     Name :          TestDeleteControl

     Description:
               It is a manual function. To delete all selected
entities.

     Return Value:
               = 0: Completed successfully;

     Parameters:
     Subfunctions:
          int F2dCleanUpDeleteDrawingEntity
                    delete selected entity

================================================================
*/

int  TestDeleteControl( int *SwitchRedraw )
{
     //   external functions
     int F2dCleanUpDeleteDrawingEntity();

//   Begin
//-----------------------------------
//   check the number of entites
//   if an error occurred, exit immidiately.
    if (number_of_entities<0)  return -1;
//   Step_7:         find views' relationship
     //   move from find boundary function (Mar.29, 1996 By Ji )
```

APPENDIX D

```
     F2dCleanUpFindViewsRelation( &trim_drawing );
//--------------------------------
#ifdef CKWIN
     if ( *SwitchRedraw == 1  )    ck_levels(CK_OFF,1,255);
#endif
     // turn ON the level used to store the trimmed entities.
     F2dCleanUpDeleteDrawingEntity(&trim_drawing);
#ifdef VELLUM
     if ( *SwitchRedraw == 1  )
F2dCleanUpChangeDrawingColor(&trim_drawing);
#endif
#ifdef CKWIN
     if ( *SwitchRedraw == 1  )    ck_levels(CK_ON,TrimLevel,
TrimLevel);
     if ( *SwitchRedraw == 1  )    ck_redraw( CK_PRIME_VP );
#endif

     return    0;
}

/*

=================================================================
     Function:
     Name :         TestBackColorControl
     Description:
               To undo.
     Return Value:
               = 0: Completed successfully;
     Parameters:
     Subfunctions:
               int F2dCleanUpUndo
                    undo
=================================================================
*/

int  TestBackColorControl( int *SwitchRedraw )
{
     //   external functions
     int F2dCleanUpChangeDrawingColor();

     if ( *SwitchRedraw == 1  )
F2dCleanUpChangeDrawingColor(&trim_drawing);

     return    0;
}

/*
=================================================================
     Function:
```

APPENDIX D

```
     Name :         TestUndoControl
     Description:
                To undo.
     Return Value:
                = 0: Completed successfully;
     Parameters:
     Subfunctions:
                int F2dCleanUpUndo
                     undo
================================================================
*/

int  TestUndoControl( int *SwitchRedraw )
{
     //   external functions
     int F2dCleanUpUndo();

//   check the number of entites :      if an error occurred, exit
immidiately.
    if (number_of_entities<0)  return -1;
//   Step_1:        get flags
     if ( F2dCleanUpUndo( &trim_drawing ) == 0 )   return 0;
#ifdef CKWIN
     if ( *SwitchRedraw == 1  )    ck_levels(CK_OFF,1,255);
#endif
     // turn ON the level used to store the trimmed entities.
#ifdef VELLUM
     if ( *SwitchRedraw == 1  )
F2dCleanUpChangeDrawingColor(&trim_drawing);
#endif
#ifdef CKWIN
     if ( *SwitchRedraw == 1  )    ck_levels(CK_ON,TrimLevel,
TrimLevel);
     if ( *SwitchRedraw == 1  )    ck_redraw( CK_PRIME_VP );
#endif

     return    0;
}

/*
=================================================================
     Function:
     Name :         TestUndoPreControl
     Description:
                To prepare undo.
     Return Value:
                = 0: Completed successfully;
     Parameters:
     Subfunctions:
                int F2dCleanUpUndoPre
```

APPENDIX D

```
                    to prepare undo
=================================================================
*/

int  TestUndoPreControl( int *SwitchRedraw )
{
     //   external functions
     int F2dCleanUpUndoPre();

//   check the number of entites: if an error occurred, exit
immidiately.
    if (number_of_entities<0)  return -1;
//   Step_1:        get flags
     F2dCleanUpUndoPre( &trim_drawing );

     return    0;
}

/*
=================================================================
     Function:
     Name :          TestSetUndoFlagViewsControl
     Description:
               To set a flag for undo.
                    flag=0: views are not exist.
                    flag=1: views are exist.
     Return Value:
               = 0: Completed successfully;
     Parameters:
=================================================================
*/

int  TestSetUndoFlagViewsControl( int *SwitchRedraw )
{
    //    set flag
    F2dCleanUpExcutedNo = 1;

     return    0;
}

/*
=================================================================
     Function:
     Name :          TestDeleteViewsControl
     Description:
               To delete views.
     Return Value:
               = 0: Completed successfully;
     Parameters:
```

APPENDIX D

```
     Subfunctions:
               int F2dCleanUpDeleteViews
                    to delete views
=================================================================
*/

int  TestDeleteViewsControl( int *SwitchRedraw )
{
     //   external functions
     int F2dCleanUpDeleteViews();

//   check the number of entites: if an error occurred, exit
immidiately.
    if (number_of_entities<0)  return -1;
//   delete views
     F2dCleanUpDeleteViews( &trim_drawing );

     return    0;
}

struct node  *F2dCleanUpInputEntity(char *prompt, struct drawing
*select_drawing)
{
     int etype, count, stat;
     unsigned long entid;
     struct node  *entity;
//   CK_ENTATT attr;

     if (( ck_getent(prompt, &etype, &entid) != CK_NOERROR)
      || ( stat == CK_BACKUP )
      || ( stat == CK_ESCAPE )) return 0;

     #ifdef DEBUG
     print("ID: %ld; #",entid);
     #endif

     count=0;
    for (entity=select_drawing->objects;
         entity && (count<number_trimmed_entities) && (entity->id
!=entid) && (entity->highlighted_id !=entid);
         entity=entity->next)
            count++;
    if (count>=number_trimmed_entities) return 0;
                                  else return entity;
}

/*
=================================================================
     Function:
```

APPENDIX D

```
     Name :         F2dVector

     Description:
               To compute line's unit vector.

     Return Value:
               = Out_v: Completed successfully;

     Parameters:
               Input:
                    1 In_sp: line entity start point coordinates
                    2 In_ep: line entity end point coordinates
               Output:
                    1 Out_v: line entity vector
================================================================
*/

struct Vector F2dVector( struct Vector In_sp, struct Vector In_ep
)
{
     struct Vector  Out_v;

     Out_v.x = In_ep.x - In_sp.x;
     Out_v.y = In_ep.y - In_sp.y;
     Out_v.z = In_ep.z - In_sp.z;

     return    Out_v;
}

/*

================================================================
     Function:
     Name :         F2dVectorUnit

     Description:
               To compute line's unit vector.

     Return Value:
               = Out_n: Completed successfully;
               < 0: Error.
     Parameters:
               Input:
                    1 In_v: line entity vector
               Output:
                    1 Out_n: line entity unit vector
================================================================
*/

struct Vector  F2dVectorUnit( struct Vector  In_v)
```

APPENDIX D

```
{
     struct    Vector    Out_n;
     double    Length = 0.0;
     //   tolerance
     double    tolerance = 0.0;
     tolerance = F2dCleanUpTolerance;

     Length = sqrt( In_v.x*In_v.x + In_v.y*In_v.y + In_v.z*In_v.z
);
     //   check length
     if ( Length < tolerance )     return    Out_n;

     Out_n.x = In_v.x / Length;
     Out_n.y = In_v.y / Length;
     Out_n.z = In_v.z / Length;

     return    Out_n;
}

/*
=================================================================
     Function:
     Name :         F2dDistancePointLine

     Description:
               To compute distance from a point to a line.

     Return Value:
               = 0: Completed successfully;

     Parameters:
               Input:
                    1 In_sp: line entity start point coordinates
                    2 In_ep: line entity end point coordinates
                    3 In_p:  point coordinates.
               Output:
                    1 Out_d: distance
=================================================================
*/

double    F2dDistancePointLine(
     //   input
     struct Vector In_sp, struct Vector In_ep, struct Vector In_p
)
{
     //   external functions
     struct Vector F2dVector();
     struct Vector F2dVectorUnit();
     //   define
```

APPENDIX D

```
     struct Vector  Ve, Vne, Vp;
     double Out_d=0.0;

     //   get vector
     Ve = F2dVector( In_sp, In_ep );
     Vp = F2dVector( In_sp, In_p );
     //   get unit vector
     Vne = F2dVectorUnit( Ve );
     //   compute distance
     Out_d = sqrt( Vp.x*Vp.x  + Vp.y*Vp.y
                    -(Vp.x*Vne.x  +  Vp.y*Vne.y)  *  (Vp.x*Vne.x  +
Vp.y*Vne.y) );

     return    Out_d;
}
```

APPENDIX E

```
///////////////////////////////////////////////////////////////////
//                                                               //
//   Example of bend model viewer implementation; contains       //
//   implementation of CBendCADViewPart member functions,        //
//   and implementation of menu-driven functions.                //
//                                                               //
//                    Copyright 1996 AmadaSoft America, Inc.     //
//                                                               //
///////////////////////////////////////////////////////////////////
#include "stdafx.h"

// include all BMAPI files
#include "ALLBMAPI.HXX"

// RW_DRAW library include file.
#include "RW_DRAW.HXX"

#include "BendCAD.h"
#include "BendCADDoc.h"
#include "BendCADViewPart.h"

// RenderWare include files; found in \rwwin\include
#include "rwlib.h"

// OpenGL include files.
#include "gl\gl.h"
#include "gl\glu.h"

// GL_LIST library include file.
#include "GL_LIST.HXX"

#include <stdlib.h>

// Orthoview dialog include file
#include "OrthoViewDlg.h"

///////////////////////////////////////////////////////////////////
////////////

#define WINDOWTITLE "BAJA CAD SYSTEM"

static    void    multiply_pt_by_matrix(BM_POINT    *point,    float
rot_matrix[4][4]);
static RwClump * RWCALLBACK do_transformations(RwClump *clump, void
*matrix);
static RwClump * RWCALLBACK clear_scene(RwClump *clump);
static    RwPolygon3d    *    RWCALLBACK    SetPolygonColor(RwPolygon3d
*polygon, void *color);

// The following variables are defined to set up the color palette
```

APPENDIX E

```
of the screen.
unsigned char threeto8[8] =
{
     0, 0111>>1, 0222>>1, 0333>>1, 0444>>1, 0555>>1, 0666>>1, 0377
};

unsigned char twoto8[4] =
{
     0, 0x55, 0xaa, 0xff
};

unsigned char oneto8[2] =
{
     0, 255
};

static int defaultOverride[13] =
{
     0, 3, 24, 27, 64, 67, 88, 173, 181, 236, 247, 164, 91
};

static PALETTEENTRY defaultPalEntry[20] =
{
     { 0,    0,    0,    0 },
     { 0x80,0,    0,    0 },
     { 0,    0x80,0,    0 },
     { 0x80,0x80,0,    0 },
     { 0,    0,    0x80, 0 },
     { 0x80,0,    0x80, 0 },
     { 0,    0x80,0x80, 0 },
     { 0xC0,0xC0,0xC0, 0 },

     { 192, 220, 192,  0 },
     { 166, 202, 240,  0 },
     { 255, 251, 240,  0 },
     { 160, 160, 164,  0 },

     { 0x80,0x80,0x80, 0 },
     { 0xFF,0,    0,    0 },
     { 0,    0xFF,0,    0 },
     { 0xFF,0xFF,0,    0 },
     { 0,    0,    0xFF, 0 },
     { 0xFF,0,    0xFF, 0 },
     { 0,    0xFF,0xFF, 0 },
     { 0xFF,0xFF,0xFF, 0 }
};


void PrintString(char *s)
{
```

APPENDIX E

```
}

//   This function initializes the RenderWare library, creates a
scene, camera and light.
int CBendCADViewPart::Init3D(HWND window)
{
     BOOL berr = FALSE;

     // Open the RenderWare library.
    if (!RwOpen("MSWindows", NULL))
    {
        ::MessageBox(window,
                   "Could not open the RenderWare library",
                   WINDOWTITLE,    MB_OK    |    MB_ICONSTOP    |
MB_APPLMODAL);
        return 0;
    }

     // Create a camera.
     RwInt32 x_size, y_size;
     x_size = GetSystemMetrics(SM_CXFULLSCREEN);           // The
camera should be able to display
     y_size = GetSystemMetrics(SM_CYFULLSCREEN);           // on
the maximum size allowed by the screen.
    m_camera = RwCreateCamera(x_size, y_size, NULL);

     if( ! m_camera)
     {
         ::MessageBox(window, "Could not create camera",
                   WINDOWTITLE,    MB_OK    |    MB_ICONSTOP    |
MB_APPLMODAL);
          return 0;
     }
     else {
       RwSetCameraProjection(m_camera, rwPARALLEL);

       RwWCMoveCamera(m_camera, 0.0f, 0.0f, 10000.0f);
           // Move camera far away from xy plane.
       RwSetCameraViewport(m_camera, 0, 0, x_size, y_size);
           // Default sizes of viewing volume
       RwSetCameraViewwindow(m_camera,   (float)(x_size),
(float)(y_size)); // and viewport.
     }
     // Create a scene.
    m_scene = RwCreateScene();
    if (m_scene == NULL)
    {
        RwDestroyCamera(m_camera);
        m_camera = NULL;
        RwClose();
```

APPENDIX E

```
        ::MessageBox(window, "Could not create the 3D Scene",
                    WINDOWTITLE,    MB_OK    |    MB_ICONSTOP    |
MB_APPLMODAL);
        return 0;
    }

     // Create lights.
     m_lights.RemoveAll();
     RwLight* light1 = RwCreateLight(rwDIRECTIONAL, 0.7f, -0.7f,
-0.7f, 0.8f); //- good corner
     RwLight* light2 = RwCreateLight(rwDIRECTIONAL, -1.0f, 1.0f,
-1.0f, 0.25f);
     RwLight*   light3   =   RwCreateLight(rwPOINT,   CREAL(0.0),
CREAL(0.0), CREAL(0.0), CREAL(1.0));
     if(light1)
     {
          m_lights.Add(light1);
          RwAddLightToScene(m_scene, light1);
     }
     else
          berr = TRUE;

     if(light2)
     {
          m_lights.Add(light2);
          RwAddLightToScene(m_scene, light2);
     }
     else
          berr = TRUE;

     if(light3)
     {
          m_lights.Add(light3);
          RwAddLightToScene(m_scene, light3);
     }
     else
          berr = TRUE;

     if (berr) AfxMessageBox("Could not create light source");

     //RwSetLightState(m_light, rwON);
     //RwSetLightColor(m_light,   CREAL(1.0),   CREAL(1.0),
CREAL(1.0));

     return 1;
}


// This function is used by the document class to initialize
certain
```

APPENDIX E

```
// parameters whenever a new part is loaded. What we do here is
compute the centroid,
// prepare RenderWare clumps and show the part as requested -
wireframe/shaded if show_solid is 0/1,
// flat/3d version of part if show_3d is 0/1.
void CBendCADViewPart::new_part_init(int show_solid, int show_3d)
{

  int i;
  BM_PART *part = NULL;
  CBendCADDoc* pDoc = GetDocument();
  ASSERT_VALID(pDoc);
  part = pDoc->get_part();
  if(! part) {
    mi_part_is_up_to_date = 0;
       return;
  }
  mi_part_is_up_to_date = 1;
  compute_part_centroid(part, 0, &m_flat_part_centroid);       //
Compute 3d and flat part centroids.
  compute_part_centroid(part, 1, &m_3d_part_centroid);
  m_part_centroid = m_3d_part_centroid;

  mi_show_3d = show_3d;
  mi_show_solid = show_solid;

  // Clear out any RenderWare clumps around.
  if(m_flat_base_clump) {
    RwRemoveClumpFromScene(m_flat_base_clump);
    RwDestroyClump(m_flat_base_clump);
    m_flat_base_clump = NULL;
  }
  if(m_3d_base_clump) {
    RwRemoveClumpFromScene(m_3d_base_clump);
    RwDestroyClump(m_3d_base_clump);
    m_3d_base_clump = NULL;
  }
  m_base_clump = NULL;

  if(mi_show_3d) {                                          // Prepare
3d solid or 3d wireframe.
    m_part_centroid = m_3d_part_centroid;
       if(! mi_show_solid) {                              //   Prepare
wireframe.
      i =  prepare_display_list(part, mi_show_3d, 1, 0, 1, 1,
md_face_color, md_bendline_color);
      if(! i) {
        mi_display_list_is_up_to_date = 0;
           return;
      }
```

APPENDIX E

```
      mi_display_list_is_up_to_date = 1;
      mi_3d_is_up_to_date = 1;
         mi_flat_is_up_to_date = 0;
       }
       else {                                                          //
Prepare solid.
      i   =   facet_part_rw(part,   &m_3d_base_clump,   mi_show_3d,
md_part_color);
         if( (! i) || (! m_3d_base_clump) ) return;
         m_base_clump = m_3d_base_clump;
         RwAddClumpToScene(m_scene, m_base_clump);
      mi_display_list_is_up_to_date = 0;
      mi_3d_is_up_to_date = 0;
         mi_flat_is_up_to_date = 0;
       }
  }
  else {                                                               //
Prepare flat solid or flat wireframe.
    m_part_centroid = m_flat_part_centroid;
       if(! mi_show_solid) {                                  //   Prepare
wireframe.
      i =   prepare_display_list(part, mi_show_3d, 1, 0, 1, 1,
md_face_color, md_bendline_color);
      if(! i) {
        mi_display_list_is_up_to_date = 0;
           return;
      }
      mi_display_list_is_up_to_date = 1;
      mi_flat_is_up_to_date = 1;
      mi_3d_is_up_to_date = 0;
       }
       else {                                                          //
Prepare solid.
      i   =   facet_part_rw(part,   &m_flat_base_clump,   mi_show_3d,
md_part_color);
         if( (! i) || (! m_flat_base_clump) ) return;
         m_base_clump = m_flat_base_clump;
         RwAddClumpToScene(m_scene, m_base_clump);
      mi_display_list_is_up_to_date = 0;
      mi_3d_is_up_to_date = 0;
         mi_flat_is_up_to_date = 0;
       }
  }

  mi_bbox_is_up_to_date = 0;
  ml_num_faces = part->get_number_of_faces();
  ml_num_bendlines = part->get_number_of_bendlines();
  ml_num_formings = part->get_number_of_formings();
  clear_selection_set();
  reset_selection_buffer();
```

APPENDIX E

```
  OnViewIsometric();

}


// This function destroys all parent clumps in the scene, and hence
all clumps in the scene.
// It always returns NULL.
static RwClump * RWCALLBACK clear_scene(RwClump *clump)
{
  int i = RwGetClumpNumChildren(clump);
  if(i) RwDestroyClump(clump);

  return NULL;
}


// This allows other classes to signal that the part has changed,
and hence
// current clumps/display lists are no longer valid. We recompute
centroids, prepare new clumps
// or display lists, and show the part in its current orientation
and zoom.
void CBendCADViewPart::invalidate_display(void)
{

  int i;
  BM_PART *part = NULL;
  CBendCADDoc* pDoc = GetDocument();
  ASSERT_VALID(pDoc);
  part = pDoc->get_part();
  if(! part) {
    mi_part_is_up_to_date = 0;
       return;
  }
  mi_part_is_up_to_date = 1;
  compute_part_centroid(part, 0, &m_flat_part_centroid);       //
Compute 3d and flat part centroids.
  compute_part_centroid(part, 1, &m_3d_part_centroid);
  mi_3d_is_up_to_date = 0;
  mi_flat_is_up_to_date = 0;

  // Clear out any RenderWare clumps around.
  if(m_flat_base_clump) {
    RwRemoveClumpFromScene(m_flat_base_clump);
    RwDestroyClump(m_flat_base_clump);
    m_flat_base_clump = NULL;
  }
  if(m_3d_base_clump) {
    RwRemoveClumpFromScene(m_3d_base_clump);
```

APPENDIX E

```
    RwDestroyClump(m_3d_base_clump);
    m_3d_base_clump = NULL;
  }
  m_base_clump = NULL;

  if(mi_show_3d) {                                          // Prepare
3d solid or 3d wireframe.
    m_part_centroid = m_3d_part_centroid;
       if(! mi_show_solid) {                                //   Prepare
wireframe.
      i =   prepare_display_list(part, mi_show_3d, 1, 0, 1, 1,
md_face_color, md_bendline_color);
      if(! i) {
        mi_display_list_is_up_to_date = 0;
           return;
      }
      mi_display_list_is_up_to_date = 1;
      mi_3d_is_up_to_date = 1;
         mi_flat_is_up_to_date = 0;
       }
       else {                                                        //
Prepare solid.
      i   =   facet_part_rw(part,  &m_3d_base_clump,   mi_show_3d,
md_part_color);
         if( (! i) || (! m_3d_base_clump) ) return;
         m_base_clump = m_3d_base_clump;
         RwAddClumpToScene(m_scene, m_base_clump);
       }
  }
  else {                                                             //
Prepare flat solid or flat wireframe.
    m_part_centroid = m_flat_part_centroid;
       if(! mi_show_solid) {                                //   Prepare
wireframe.
      i =   prepare_display_list(part, mi_show_3d, 1, 0, 1, 1,
md_face_color, md_bendline_color);
      if(! i) {
        mi_display_list_is_up_to_date = 0;
           return;
      }
      mi_display_list_is_up_to_date = 1;
      mi_flat_is_up_to_date = 1;
      mi_3d_is_up_to_date = 0;
       }
       else {                                                        //
Prepare solid.
      i  =  facet_part_rw(part,  &m_flat_base_clump,  mi_show_3d,
md_part_color);
         if( (! i) || (! m_flat_base_clump) ) return;
         m_base_clump = m_flat_base_clump;
```

APPENDIX E

```
        RwAddClumpToScene(m_scene, m_base_clump);
      }
  }

  mi_bbox_is_up_to_date = 0;
  ml_num_faces = part->get_number_of_faces();
  ml_num_bendlines = part->get_number_of_bendlines();
  ml_num_formings = part->get_number_of_formings();
  clear_selection_set();
  reset_selection_buffer();

  ml_last_function_chosen = RETURN_FROM_DIALOG_MODE;
  DrawPart(m_hdc);
  ml_last_function_chosen = NO_FUNCTION_MODE;

}


void CBendCADViewPart::OnShowFlat()
{

  if(! mi_show_3d) return;  // Flat is already being shown.

  int i;
  BM_PART *part = NULL;
  CBendCADDoc* pDoc = GetDocument();
  ASSERT_VALID(pDoc);
  part = pDoc->get_part();
  if(! part) {
    mi_part_is_up_to_date = 0;
       return;
  }
  // Store the current 3d view parameters.
  md_old_x_trans = md_x_trans;
  md_old_y_trans = md_y_trans;
  for(i=0; i < 3; ++i) {
    md_old_part_bbox_size[i] = md_part_bbox_size[i];
       md_old_view_vol[i] = md_current_view_vol[i];
  }
  if(md_old_rot_matrix) RwDestroyMatrix(md_old_rot_matrix);
  md_old_rot_matrix = RwDuplicateMatrix(md_rot_matrix);

  mi_show_3d = 0;
  m_part_centroid = m_flat_part_centroid;

  if(! mi_show_solid) {                  //  Compute  the  flat's
display list.
    if(! mi_flat_is_up_to_date) {
      i =   prepare_display_list(part, mi_show_3d, 1, 0, 1, 1,
md_face_color, md_bendline_color);
```

APPENDIX E

```
      if(! i) {
        mi_display_list_is_up_to_date = 0;
           return;
      }
    }
    mi_display_list_is_up_to_date = 1;
     mi_flat_is_up_to_date = 1;
       mi_3d_is_up_to_date = 0;
  }
  else {                                    // Compute flat's clump if
not already done.
    if(m_3d_base_clump) RwRemoveClumpFromScene(m_3d_base_clump);
       m_base_clump = NULL;
       if(! m_flat_base_clump) {
      i  =  facet_part_rw(part,  &m_flat_base_clump,  mi_show_3d,
md_part_color);
      if( (! i) || (! m_flat_base_clump) ) {
        mi_display_list_is_up_to_date = 0;
           return;
      }
       }
    m_base_clump = m_flat_base_clump;             // Set the base
clump to be the flat's base clump.
    RwAddClumpToScene(m_scene, m_base_clump);
  }

  mi_bbox_is_up_to_date = 0;
  OnViewTop();

}


// Here we show the 3d version, in its old orientation and zoom
(before flat was
// asked to be shown).
void CBendCADViewPart::OnShow3d()
{

  if(mi_show_3d) return;    // 3D view is already being shown.

  int i;
  BM_PART *part = NULL;
  CBendCADDoc* pDoc = GetDocument();
  ASSERT_VALID(pDoc);
  part = pDoc->get_part();
  if(! part) {
    mi_part_is_up_to_date = 0;
       return;
  }
```

APPENDIX E

```
// Restore the old 3d view parameters.
md_x_trans = md_old_x_trans;
md_y_trans = md_old_y_trans;
for(i=0; i < 3; ++i) {
  md_part_bbox_size[i] = md_old_part_bbox_size[i];
     md_current_view_vol[i] = md_old_view_vol[i];
}
if(md_rot_matrix) RwDestroyMatrix(md_rot_matrix);
md_rot_matrix = RwDuplicateMatrix(md_old_rot_matrix);

mi_show_3d = 1;
m_part_centroid = m_3d_part_centroid;

if(! mi_show_solid) {
  if(! mi_3d_is_up_to_date) {
    i =  prepare_display_list(part, mi_show_3d, 1, 0, 1, 1,
md_face_color, md_bendline_color);
    if(! i) {
      mi_display_list_is_up_to_date = 0;
         return;
    }
    mi_display_list_is_up_to_date = 1;
    mi_3d_is_up_to_date = 1;
       mi_flat_is_up_to_date = 0;
  }
}
else {                                    // Compute the 3d_version's
clumps if have not already done so.
        if(m_flat_base_clump)
RwRemoveClumpFromScene(m_flat_base_clump);
      m_base_clump = NULL;
  if(! m_3d_base_clump) {
    i = facet_part_rw(part, &m_3d_base_clump, mi_show_3d,
md_part_color);
    if( (! i) || (! m_3d_base_clump) ) {
      mi_display_list_is_up_to_date = 0;
         return;
    }
  }
  m_base_clump = m_3d_base_clump;                  // Set the base
clump to be the 3d version's base clump.
  RwAddClumpToScene(m_scene, m_base_clump);
}

mi_bbox_is_up_to_date = 0;
md_current_view_vol[1] = md_current_view_vol[0]/md_aspect;

RwSetCameraViewwindow(m_camera,(float)(md_current_view_vol[0]),
(float)(md_current_view_vol[1]));
```

APPENDIX E

```
  glMatrixMode(GL_PROJECTION);
  glLoadIdentity();
  glOrtho(- md_current_view_vol[0],     md_current_view_vol[0],
                          -    md_current_view_vol[1],
md_current_view_vol[1],
//                        - 50000.0, 50000.0);
          - md_current_view_vol[2], md_current_view_vol[2]);
  glMatrixMode(GL_MODELVIEW);

  DrawPart(m_hdc);

}


void CBendCADViewPart::OnHide3d()
{
  OnShowFlat();                     // For now, just switch to
showing flat.
}


void CBendCADViewPart::OnHideFlat()
{
  OnShow3d();                   // For now, just switch to showing
3D.
}


void CBendCADViewPart::OnViewWireframe()
{
  if(! mi_show_solid) return;    // Wireframe already being shown.
  int i;

  CreateRGBPalette(m_hdc);          // when wireframe -- recreate
the palette -- AK

  HGLRC hrc = wglGetCurrentContext(); // The rendering context of
OpenGL.
  wglMakeCurrent(NULL, NULL);
  wglMakeCurrent(m_hdc, hrc);          // Associate the rendering
context with this view.

  BM_PART *part = NULL;
  CBendCADDoc* pDoc = GetDocument();
  ASSERT_VALID(pDoc);
  part = pDoc->get_part();
  if(! part) {
    mi_part_is_up_to_date = 0;
       return;
  }
```

APPENDIX E

```
  mi_show_solid = 0;

  if(mi_show_3d) {
    if(! mi_3d_is_up_to_date) {
      i =   prepare_display_list(part, mi_show_3d, 1, 0, 1, 1,
md_face_color, md_bendline_color);
      if(! i) {
        mi_display_list_is_up_to_date = 0;
          return;
      }
      mi_display_list_is_up_to_date = 1;
        mi_3d_is_up_to_date = 1;
        mi_flat_is_up_to_date = 0;
    }
  }
  else {
    if(! mi_flat_is_up_to_date) {
      i =   prepare_display_list(part, mi_show_3d, 1, 0, 1, 1,
md_face_color, md_bendline_color);
      if(! i) {
        mi_display_list_is_up_to_date = 0;
          return;
      }
      mi_display_list_is_up_to_date = 1;
        mi_3d_is_up_to_date = 0;
        mi_flat_is_up_to_date = 1;
    }
  }

  ml_last_function_chosen = WIREFRAME_MODE;
  DrawPart(m_hdc);
  ml_last_function_chosen = NO_FUNCTION_MODE;

}


void CBendCADViewPart::OnViewShaded()
{

  if(mi_show_solid) return;        // Solid already being shown.
  int i;

  BM_PART *part = NULL;
  CBendCADDoc* pDoc = GetDocument();
  ASSERT_VALID(pDoc);
  part = pDoc->get_part();
  if(! part) {
    mi_part_is_up_to_date = 0;
      return;
  }
```

APPENDIX E

```
  mi_show_solid = 1;

  if(mi_show_3d) {
    if(! m_3d_base_clump) {
      i  =  facet_part_rw(part,  &m_3d_base_clump,  mi_show_3d,
md_part_color);
      if( (! i) || (! m_3d_base_clump) ) {
        mi_display_list_is_up_to_date = 0;
          return;
      }
    }
        RwRemoveClumpFromScene(m_base_clump);
    m_base_clump = m_3d_base_clump;              // Set the base
clump to be the 3d version's base clump.
    RwAddClumpToScene(m_scene, m_base_clump);
  }
  else {
    if(! m_flat_base_clump) {
      i  =  facet_part_rw(part,  &m_flat_base_clump,  mi_show_3d,
md_part_color);
      if( (! i) || (! m_flat_base_clump) ) {
        mi_display_list_is_up_to_date = 0;
          return;
      }
    }
        RwRemoveClumpFromScene(m_base_clump);
    m_base_clump = m_flat_base_clump;            // Set the base
clump to be the 3d version's base clump.
    RwAddClumpToScene(m_scene, m_base_clump);
  }

  ml_last_function_chosen = SOLID_MODE;
  DrawPart(m_hdc);
  ml_last_function_chosen = NO_FUNCTION_MODE;

}


void CBendCADViewPart::OnZoomWindow()
{
  ml_last_function_chosen = ZOOM_WINDOW_MODE;
  mi_bbox_is_up_to_date = 0;
}

void CBendCADViewPart::OnUpdateZoomWindow(CCmdUI* pCmdUI)
{
    pCmdUI->SetCheck((ZOOM_WINDOW_MODE == ml_last_function_chosen)
? TRUE : FALSE);
}
```

APPENDIX E

```
void CBendCADViewPart::OnZoomInOut()
{
  ml_last_function_chosen = ZOOM_IN_OUT_MODE;
  mi_bbox_is_up_to_date = 0;
}

void CBendCADViewPart::OnUpdateZoomInOut(CCmdUI* pCmdUI)
{
     pCmdUI->SetCheck((ZOOM_IN_OUT_MODE == ml_last_function_chosen)
? TRUE : FALSE);
}

void CBendCADViewPart::OnZoomAll()
{

  BM_PART *part = NULL;
  CBendCADDoc* pDoc;
  BM_VECTOR offset;

  if(! mi_bbox_is_up_to_date) {
    pDoc = GetDocument();
    ASSERT_VALID(pDoc);
    part = pDoc->get_part();
    if(! part) return;
          if(! mi_part_is_up_to_date) {
 // By now we expect the centroid to have already
               compute_part_centroid(part, 0,
&m_flat_part_centroid);  // been computed; this is only a safety
check.
               compute_part_centroid(part, 1, &m_3d_part_centroid);

               if(mi_show_3d) m_part_centroid = m_3d_part_centroid;
               else m_part_centroid =  m_flat_part_centroid;
          }
          compute_part_bbox(part,    mi_show_3d,    md_rot_matrix,
m_part_centroid, md_part_bbox_size, &offset);
          mi_bbox_is_up_to_date = 1;
          md_x_trans = -(offset.X());      // Adjust for the fact
that bbox center may
          md_y_trans = -(offset.Y());       // not coincide with
centroid of part.
  }

  set_new_view_volume(md_part_bbox_size[0],md_part_bbox_size[1]);
  ml_last_function_chosen = ZOOM_ALL_MODE;
  DrawPart(m_hdc);
  ml_last_function_chosen = NO_FUNCTION_MODE;

}
```

APPENDIX E

```
void CBendCADViewPart::OnUpdateZoomAll(CCmdUI* pCmdUI)
{
     pCmdUI->SetCheck((ZOOM_ALL_MODE == ml_last_function_chosen) ?
TRUE : FALSE);
}


void CBendCADViewPart::OnViewIsometric()
{
  ml_last_function_chosen = ISOMETRIC_VIEW_MODE;
  mi_bbox_is_up_to_date = 0;
  md_z_angle = 270.0;
  md_y_angle = 305.2643897;         // 270 + tan^-1(1/sqrt(2))
  RwRotateMatrix(RwScratchMatrix(),    0.0f,    0.0f,    1.0f,
CREAL(md_z_angle), rwREPLACE);
  RwRotateMatrix(RwScratchMatrix(),    0.0f,    1.0f,    0.0f,
CREAL(md_y_angle), rwPRECONCAT);
  md_z_angle = 45.0;
  RwRotateMatrix(RwScratchMatrix(),    0.0f,    0.0f,    1.0f,
CREAL(md_z_angle), rwPRECONCAT);
  if(md_rot_matrix) RwDestroyMatrix(md_rot_matrix);
  md_rot_matrix = RwDuplicateMatrix(RwScratchMatrix());

//   glPushMatrix();
//   glLoadIdentity();
//   glRotated(md_z_angle, 0.0, 0.0, 1.0);    // Rotation about z
axis.
//   glRotated(md_y_angle,  0.0, 1.0, 0.0);   // Rotation about y
axis.
//   md_z_angle = 45.0;
//   glRotated(md_z_angle, 0.0, 0.0, 1.0);
//   glGetDoublev(GL_MODELVIEW_MATRIX, md_rot_matrix);
//   glPopMatrix();

  OnZoomAll();
}


void CBendCADViewPart::OnViewRight()
{
  ml_last_function_chosen = RIGHT_VIEW_MODE;
  mi_bbox_is_up_to_date = 0;
  md_z_angle = 270.0;
  md_y_angle = 270.0;
  md_x_angle = 0.0;
  RwRotateMatrix(RwScratchMatrix(),    0.0f,    0.0f,    1.0f,
CREAL(md_z_angle), rwREPLACE);
  RwRotateMatrix(RwScratchMatrix(),    0.0f,    1.0f,    0.0f,
CREAL(md_y_angle), rwPRECONCAT);
```

APPENDIX E

```
  if(md_rot_matrix) RwDestroyMatrix(md_rot_matrix);
  md_rot_matrix = RwDuplicateMatrix(RwScratchMatrix());

//  glPushMatrix();
//  glLoadIdentity();
//   glRotated(md_z_angle, 0.0, 0.0, 1.0);    // Rotation about z
axis.
//   glRotated(md_y_angle,  0.0, 1.0, 0.0);   // Rotation about y
axis.
//  glGetDoublev(GL_MODELVIEW_MATRIX, md_rot_matrix);
//  glPopMatrix();

  OnZoomAll();
}


void CBendCADViewPart::OnViewFront()
{
  ml_last_function_chosen = FRONT_VIEW_MODE;
  mi_bbox_is_up_to_date = 0;
  md_y_angle = 0.0;
  md_z_angle = 0.0;
  md_x_angle = 270.0;
  RwRotateMatrix(RwScratchMatrix(),    1.0f,    0.0f,    0.0f,
CREAL(md_x_angle), rwREPLACE);
  if(md_rot_matrix) RwDestroyMatrix(md_rot_matrix);
  md_rot_matrix = RwDuplicateMatrix(RwScratchMatrix());

//  glPushMatrix();
//  glLoadIdentity();
//   glRotated(md_x_angle, 1.0, 0.0, 0.0);    // Rotation about x
axis.
//  glGetDoublev(GL_MODELVIEW_MATRIX, md_rot_matrix);
//  glPopMatrix();

  OnZoomAll();
}


void CBendCADViewPart::OnViewTop()
{
  ml_last_function_chosen = TOP_VIEW_MODE;
  mi_bbox_is_up_to_date = 0;
  RwIdentityMatrix(md_rot_matrix);

  OnZoomAll();
}

void CBendCADViewPart::OnViewsOrtho()
{
```

APPENDIX E

```
	if (NULL == GetDocument()->get_part()) { // no part
		return ;
		}

	 COrthoViewDlg orhodlg(NULL, GetDocument()->get_part(), this)
;
	int ret = orhodlg.DoModal() ;

	// if we are in a Client Mode, the user cannot have entered
anything.
	// we have to redisplay the main client menu bar.
	if (BENDCAD_CLIENT_MODE) {

::PostMessage(this->GetSafeHwnd(),WM_COMMAND,MAKEWPARAM(ID_DISPLA
Y_CLIENT_MENU,1),NULL) ;
		return ;
		}

	// when OK pressed, get return values
	if (IDOK == ret) {
		}

}


void CBendCADViewPart::OnViewBack()
{
  ml_last_function_chosen = BACK_VIEW_MODE;
  mi_bbox_is_up_to_date = 0;
  md_x_angle = 270.0;
  md_y_angle = 0.0;
  md_z_angle = 180.0;
  RwRotateMatrix(RwScratchMatrix(),    1.0f,    0.0f,    0.0f,
CREAL(md_x_angle), rwREPLACE);
  RwRotateMatrix(RwScratchMatrix(),    0.0f,    0.0f,    0.1f,
CREAL(md_z_angle), rwPRECONCAT);
  if(md_rot_matrix) RwDestroyMatrix(md_rot_matrix);
  md_rot_matrix = RwDuplicateMatrix(RwScratchMatrix());

  OnZoomAll();

}

void CBendCADViewPart::OnViewBottom()
{
  ml_last_function_chosen = BOTTOM_VIEW_MODE;
  mi_bbox_is_up_to_date = 0;
  md_x_angle = 0.0;
  md_y_angle = 180.0;
  md_z_angle = 0.0;
```

APPENDIX E

```
  RwRotateMatrix(RwScratchMatrix(),    0.0f,    1.0f,    0.0f,
CREAL(md_y_angle), rwREPLACE);
  if(md_rot_matrix) RwDestroyMatrix(md_rot_matrix);
  md_rot_matrix = RwDuplicateMatrix(RwScratchMatrix());

  OnZoomAll();
}

void CBendCADViewPart::OnViewLeft()
{
  ml_last_function_chosen = LEFT_VIEW_MODE;
  mi_bbox_is_up_to_date = 0;
  md_z_angle = 90.0;
  md_y_angle = 90.0;
  md_x_angle = 0.0;
  RwRotateMatrix(RwScratchMatrix(),    0.0f,    0.0f,    1.0f,
CREAL(md_z_angle), rwREPLACE);
  RwRotateMatrix(RwScratchMatrix(),    0.0f,    1.0f,    0.0f,
CREAL(md_y_angle), rwPRECONCAT);
  if(md_rot_matrix) RwDestroyMatrix(md_rot_matrix);
  md_rot_matrix = RwDuplicateMatrix(RwScratchMatrix());

  OnZoomAll();
}


void CBendCADViewPart::OnRotate()
{
  ml_last_function_chosen = ROTATION_MODE;
  mi_bbox_is_up_to_date = 0;
}

void CBendCADViewPart::OnUpdateRotate(CCmdUI* pCmdUI)
{
     pCmdUI->SetCheck((ROTATION_MODE == ml_last_function_chosen) ?
TRUE : FALSE);
}


void CBendCADViewPart::OnPan()
{

    ml_last_function_chosen = PAN_MODE;
    mi_bbox_is_up_to_date = 0;

}

void CBendCADViewPart::OnUpdatePan(CCmdUI* pCmdUI)
{
     pCmdUI->SetCheck((PAN_MODE == ml_last_function_chosen) ? TRUE
```

APPENDIX E

```
: FALSE);
}


// This function computes the rotation angles about x and y axes.
// It is called on mouse movement, if the rotation mode is on.
void CBendCADViewPart::compute_rotation_angles(int x_flag)
{

  double x_dir = (double)(m_current_point.x - m_previous_point.x);
  double y_dir = (double)(m_current_point.y - m_previous_point.y);
  double mag = sqrt(x_dir*x_dir + y_dir*y_dir);
  // Create the rotation matrix corresponding to the axis computed.
  if(mag > 0.1) {
     RwRotateMatrix(RwScratchMatrix(),    CREAL(y_dir/mag),
CREAL(x_dir/mag), CREAL(0.0),
                    CREAL(360.0*mag/(1.414*m_old_rect.bottom)),
rwREPLACE);
     RwTransformMatrix(RwScratchMatrix(),    md_rot_matrix,
rwPRECONCAT);
    if(md_rot_matrix) RwDestroyMatrix(md_rot_matrix);
    md_rot_matrix = RwDuplicateMatrix(RwScratchMatrix());
  }
//  glPushMatrix();
//  glLoadIdentity();
//  glRotated(md_y_angle, 0.0, 1.0, 0.0);     // Rotation about y
axis.
//  if(x_flag)
//    glRotated(md_x_angle,  1.0, 0.0, 1.0);  // Rotation about x
axis.
//  else
//    glRotated(md_z_angle,  0.0, 0.0, 1.0);  // Rotation about z
axis.
//  glMultMatrixd(md_rot_matrix);
//  glGetDoublev(GL_MODELVIEW_MATRIX, md_rot_matrix);
//  glPopMatrix();

}


// This function computes the x and y translation values.
// It is called on mouse movement, if the pan mode is on.
void CBendCADViewPart::compute_pan_translation(void)
{
  double x;
  if( (x = (double)m_old_rect.right) > 0.0 )
    md_x_trans += (m_current_point.x - m_previous_point.x)*
                   md_current_view_vol[0]/x;
  if( (x = (double)m_old_rect.bottom) > 0.0 )
    md_y_trans += -(m_current_point.y - m_previous_point.y)*   //
```

APPENDIX E

```
-ve sign for md_y_trans
                    md_current_view_vol[1]/x;                    //
bec. y axis points up screen.

}


// This funciton computes translation values when user zooms
in/out.
void CBendCADViewPart::compute_zoom_in_out_translation(void)
{
  double x;
  if( (x = (double)m_old_rect.right) > 0.0 )
    md_x_trans += -(m_current_point.x - m_previous_point.x)*
                   md_current_view_vol[0]/x;
}


// This funciton computes translation values when user zooms into
a
// selected rectangular region.
void CBendCADViewPart::compute_zoom_region_translation(void)
{
  double   x1   =   ((double)(m_lt_btn_down_point.x   +
m_lt_btn_up_point.x))/2.0;
  double delta_x = x1 - ((double)m_old_rect.right)/2.0;
  double   y1   =   ((double)(m_lt_btn_down_point.y   +
m_lt_btn_up_point.y))/2.0;
  double delta_y = -( y1 - ((double)m_old_rect.bottom)/2.0 );

  md_x_trans -= //m_part_centroid.X() - md_x_trans +

delta_x*2.0*md_current_view_vol[0]/((double)m_old_rect.right);
  md_y_trans -= //m_part_centroid.Y() - md_y_trans +

delta_y*2.0*md_current_view_vol[1]/((double)m_old_rect.bottom);
}


// This function computes the new view volume when the user zooms
in/out.
// The part has already been translated appropriately.
void CBendCADViewPart::compute_zoom_in_out_view_volume(void)
{
  double x = -(m_current_point.y - m_previous_point.y);
     m d _ c u r r e n t _ v i e w _ v o l [ 0 ]   - =
md_current_view_vol[0]*x/(double)m_old_rect.bottom;
  md_current_view_vol[1] = md_current_view_vol[0]/md_aspect;
  RwSetCameraViewwindow(m_camera,(float)(md_current_view_vol[0]),
(float)(md_current_view_vol[1]));
```

APPENDIX E

```
  glMatrixMode(GL_PROJECTION);
  glLoadIdentity();
  glOrtho(- md_current_view_vol[0],     md_current_view_vol[0],
                           -    md_current_view_vol[1],
md_current_view_vol[1],
//                         - 50000.0, 50000.0);
          - md_current_view_vol[2], md_current_view_vol[2]);
  glMatrixMode(GL_MODELVIEW);
}


// This function computes and sets the new view volume when the
user zooms into
// a selected rectangular region. (In the case of zoom all, the
selected
// region is simply the bounding box of the part).
// The part has already been translated appropriately.
void CBendCADViewPart::set_new_view_volume(double x_extent, double
y_extent)
{

  double longer =  __max(x_extent, y_extent);
  double shorter = __min(x_extent, y_extent);

  if(longer == x_extent) {    // The x extent is longer.
    if(longer/md_aspect < shorter)       // y extent does not fit
screen.
       longer = shorter*md_aspect;
     md_current_view_vol[0] = 0.55*longer;
     md_current_view_vol[1] = 0.55*longer/md_aspect;
     md_current_view_vol[2] = __max(longer, md_part_bbox_size[2]);
  }
  else {                                      // The y extent is
longer.
    if(longer*md_aspect < shorter)          // x extent does not
fit screen.
       longer = shorter/md_aspect;
     md_current_view_vol[0] = 0.55*longer*md_aspect;
     md_current_view_vol[1] = 0.55*longer;
     md_current_view_vol[2] = __max(longer, md_part_bbox_size[2]);
  }

  RwSetCameraViewwindow(m_camera,(float)(md_current_view_vol[0]),
(float)(md_current_view_vol[1]));

  glMatrixMode(GL_PROJECTION);
  glLoadIdentity();
  glOrtho(- md_current_view_vol[0],     md_current_view_vol[0],
                           -    md_current_view_vol[1],
md_current_view_vol[1],
```

APPENDIX E

```
//                      - 50000.0, 50000.0);
          - md_current_view_vol[2], md_current_view_vol[2]);
  glMatrixMode(GL_MODELVIEW);
  glLoadIdentity();

}


// This function draws a part on the view window. It is called by
OnDraw.
void CBendCADViewPart::DrawPart(HDC draw_dc)
{

     long size, i, parent_tag, key;
     static long *selected_items = NULL;
     RwClump *picked_clump, *parent_clump;
  static double red_color[3] = {1.0, 0.0, 0.0};
  static double green_color[3] = {0.0, 1.0, 0.0};
     double array[16];
     BV_SELECT_DATA *data = NULL;
     static RwMatrix4d *old_matrix[50];
     static float rw_array[4][4];

     if(mi_simulation_is_on) {          // Set camera parameters to
view window values.
       RwSetCameraViewport(m_camera,  0,  0,  m_old_rect.right,
m_old_rect.bottom);
    glViewport(0, 0, m_old_rect.right, m_old_rect.bottom);

          RwSetCameraViewwindow(m_camera,
(float)(md_current_view_vol[0]), (float)(md_current_view_vol[1]));
          glMatrixMode(GL_PROJECTION);
          glLoadIdentity();
          glOrtho(- md_current_view_vol[0],
md_current_view_vol[0],
                              -   md_current_view_vol[1],
md_current_view_vol[1],
//                            - 50000.0, 50000.0);
            - md_current_view_vol[2], md_current_view_vol[2]);
          glMatrixMode(GL_MODELVIEW);
     }

     if(! mi_show_solid) {      // Wireframe drawing; use OpenGL
drawing commands.
       glPushMatrix();
          glTranslated(m_camera_position.X(),
m_camera_position.Y(), m_camera_position.Z());
          gluLookAt(m_camera_position.X(), m_camera_position.Y(),
m_camera_position.Z(),
                                 m_camera_target.X(),
```

APPENDIX E

```
m_camera_target.Y(), m_camera_target.Z(),
                    m_camera_look_up.X(),   m_camera_look_up.Y(),
m_camera_look_up.Z());
    glTranslated(md_x_trans, md_y_trans, 0.0);
       convert_rw_matrix_to_gl_array(md_rot_matrix, array);
       glMultMatrixd(array);
       glTranslated(- m_part_centroid.X(), - m_part_centroid.Y(),
- m_part_centroid.Z());

    glClearColor(0.0f, 0.0f, 0.0f, 1.0f);
    glClear(GL_COLOR_BUFFER_BIT | GL_DEPTH_BUFFER_BIT);

       if(ml_last_function_chosen == SELECT_OBJECTS_MODE)
         glRenderMode(GL_SELECT);
       else
         glRenderMode(GL_RENDER);


       glSelectBuffer(512, mw_selected_objects);
       glInitNames();
       glPushName(0);

       if(! mi_simulation_is_on) {
               // First draw the selected items in red, if any.
               size = m_selection_set.list_size();

               if(size) {
                    selected_items = new long [size*2 + 1];  // +1
for safety.
                    m_selection_set.display(size,selected_items);
                    glColor3d(1.0, 0.0, 0.0);
                    for(i=0; i < size; ++i) {
                      data = (BV_SELECT_DATA *)selected_items[i*2
+1];
                         if(! data) continue;
                         if(data->edge) {
             // Edge is available, => not a trivial
                              g l C a l l L i s t ( ( u n s i g n e d
int)selected_items[i<<1]);               // bendline or body of
something.
                         }
                         else {
                         // Body of face/forming/bendline picked;
highlight whole thing.
                              key = selected_items[i<<1]/100000;
                              glCallList((unsignedint)key*100000);
                         }
                    }
            }
       }
```

APPENDIX E

```
        glCallList(1);

    glFinish();
        glPopMatrix();
    SwapBuffers(wglGetCurrentDC());
     }

     else {                 // Solid drawing; use RenderWare.

        // Transform the part if necessary.
        if(ml_last_function_chosen != NO_FUNCTION_MODE) {
       RwTranslateMatrix(RwScratchMatrix(),   CREAL(md_x_trans),
CREAL(md_y_trans), CREAL(0.0), rwREPLACE);
        RwTransformMatrix(RwScratchMatrix(),   md_rot_matrix,
rwPRECONCAT);
         RwTranslateMatrix(RwScratchMatrix(),   CREAL(-
m_part_centroid.X()), CREAL(- m_part_centroid.Y()),
                        CREAL(- m_part_centroid.Z()), rwPRECONCAT);

       // RwForAllClumpsInScenePointer(m_scene, do_transformations,
(void *)RwScratchMatrix());
      RwTransformClump(m_base_clump, RwScratchMatrix(), rwREPLACE);

     }

/*
     RwClump *clump;
  for(i=0; i < ml_num_faces + ml_num_bendlines + ml_num_formings;
++i) {
    clump = RwFindTaggedClump(m_base_clump, i + 10001);
          if(! clump) continue;
          old_matrix[i] = RwCreateMatrix();                    //
Store the current modeling matrix of the clump.
    RwGetClumpMatrix(clump, old_matrix[i]);
          RwGetMatrixElements(old_matrix[i], rw_array);
    RwTranslateMatrix(RwScratchMatrix(),   CREAL(md_x_trans),
CREAL(md_y_trans), CREAL(0.0), rwREPLACE);
    RwTransformMatrix(RwScratchMatrix(),   md_rot_matrix,
rwPRECONCAT);
     RwTranslateMatrix(RwScratchMatrix(),   CREAL(-
m_part_centroid.X()), CREAL(- m_part_centroid.Y()),
                       CREAL(- m_part_centroid.Z()), rwPRECONCAT);
          //RwForAllClumpsInScenePointer(m_scene,
do_transformations, (void *)RwScratchMatrix());
          RwTransformClump(clump, RwScratchMatrix(), rwPOSTCONCAT);

  }
*/
          // Now set the color of the clumps in the selection set
to red.
```

APPENDIX E

```
          size = m_selection_set.list_size();
          if(size) {
               selected_items = new long [(size << 1) + 1];  // +1
for safety.
               m_selection_set.display(size, selected_items);
               for(i=0; i < size; ++i) {
                    data  =  (BV_SELECT_DATA  *)selected_items[i*2
+1];
                    if(! data) continue;
                    if(data->edge) {         // Edge is available,
=> not a trivial bendline or body of something.
                         parent_tag = (selected_items[i<<1]/100000)
+ 10000;
                         p  a  r  e  n  t  _  c  l  u  m  p     =
RwFindTaggedClump(m_base_clump, parent_tag);
                    }
                    else {
                         key  =  selected_items[i<<1]%100000;    //
Check if it is a trivial bendline.
                         if((key/10000) == 6) {
                              p  a  r  e  n  t  _  t  a  g     =
(selected_items[i<<1]/100000) + 10000;
                              p  a  r  e  n  t  _  c  l  u  m  p    =
RwFindTaggedClump(m_base_clump, parent_tag);
                         }
                         else
                              parent_clump = m_base_clump;
                    }
                    key = selected_items[i<<1]%100000;
                    picked_clump = RwFindTaggedClump(parent_clump,
key);
                    RwForAllPolygonsInClumpPointer(picked_clump,
SetPolygonColor, (void *)red_color);
               }
          }

       // In case simulation is going on, we don't want to show the
m_sim_base_clump, only m_base_clump.
       if(mi_simulation_is_on) {
               i  f  (  m  _  s  i  m  _  b  a  s  e  _  c  l  u  m  p  )
RwRemoveClumpFromScene(m_sim_base_clump);
               if(mi_show_3d) {
                    m_base_clump = m_3d_base_clump;
                    RwAddClumpToScene(m_scene, m_base_clump);
               }
               else {
                    m_base_clump = m_flat_base_clump;
                    RwAddClumpToScene(m_scene, m_base_clump);
       }
       }
```

APPENDIX E

```
        // Now draw the part.
        RwInvalidateCameraViewport(m_camera);

    RwBeginCameraUpdate(m_camera, (void *)m_hwnd);
      RwClearCameraViewport(m_camera);
      i = RwGetSceneNumClumps(m_scene);
    // Render the scene.
        RwRenderScene(m_scene);
      RwEndCameraUpdate(m_camera);

    RwShowCameraImage(m_camera, (void*)(DWORD)draw_dc);    //
Show the image on the view window.

/*
        for(i=0;  i  <  ml_num_faces  +  ml_num_bendlines  +
ml_num_formings; ++i) {
                clump = RwFindTaggedClump(m_base_clump, i + 10001);
                if(! clump) continue;
                RwTransformClump(clump, old_matrix[i], rwREPLACE);
      RwGetClumpMatrix(clump, old_matrix[i]);
            RwGetMatrixElements(old_matrix[i], rw_array);
                if(old_matrix[i]) RwDestroyMatrix(old_matrix[i]);
          }
*/
        // Put the simulation clump back in the scene so that
simulation can see it.
        if(mi_simulation_is_on) {
                if(m_sim_base_clump)    RwAddClumpToScene(m_scene,
m_sim_base_clump);
                i f ( m i _ s h o w _ 3 d )
RwRemoveClumpFromScene(m_3d_base_clump);
                else RwRemoveClumpFromScene(m_flat_base_clump);
                m_base_clump = NULL;
        }

        // Now set the color of the clumps in the selection set back
to their original colors.
        if(size) {
          m_selection_set.display(size, selected_items);
          for(i=0; i < size; ++i) {
                    data  =  (BV_SELECT_DATA  *)selected_items[i*2
+1];
                    if(data->edge) {        // Edge is available,
=> not a trivial bendline or body of something.
                         parent_tag = (selected_items[i<<1]/100000)
+ 10000;
                         p a r e n t _ c l u m p     =
RwFindTaggedClump(m_base_clump, parent_tag);
                    }
                    else {
```

APPENDIX E

```
                        key = selected_items[i<<1]%100000;
  // Check if it is a trivial bendline.
                        if((key/10000) == 6) {
                             p a r e n t _ t a g     =
(selected_items[i<<1]/100000) + 10000;
                             p a r e n t _ c l u m p    =
RwFindTaggedClump(m_base_clump, parent_tag);
                        }
                        else
                             parent_clump = m_base_clump;

                   }
                   key = selected_items[i<<1]%100000;
                   picked_clump = RwFindTaggedClump(parent_clump,
key);
                   if( (! data->edge) && ((key/10000) == 6) )
// Trivial bendline.

RwForAllPolygonsInClumpPointer(picked_clump, SetPolygonColor, (void
*)green_color);
                   else

RwForAllPolygonsInClumpPointer(picked_clump, SetPolygonColor, (void
*)md_part_color);
          }
        }

        if(selected_items) delete [] selected_items;
        selected_items = NULL;
     }

     if(mi_simulation_is_on) {   // Restore camera parameters to
simulation values.
        RwSetCameraViewport(m_camera,    0,    0,    mi_bitmap_w    ,
mi_bitmap_h);
    glViewport(0, 0, mi_bitmap_w, mi_bitmap_h);
          R w S e t C a m e r a V i e w w i n d o w ( m _ c a m e r a ,
(float)(md_sim_view_vol[0]), (float)(md_sim_view_vol[1]));
          glMatrixMode(GL_PROJECTION);
          glLoadIdentity();
          glOrtho(- md_sim_view_vol[0], md_sim_view_vol[0],
                             -    m d _ s i m _ v i e w _ v o l [ 1 ] ,
md_sim_view_vol[1],
//                           - 50000.0, 50000.0);
            - md_current_view_vol[2], md_current_view_vol[2]);
          glMatrixMode(GL_MODELVIEW);
     }

}
```

APPENDIX E

```
/*
     if(size) {
       for(i=0 ; i < size; ++i) {
         BM_3D_BODY *b3;
          long three_d_type;
          if(selected_items[i*2 +1]) {                 // Edge is
available, => not a trival bendline or forming.
            three_d_type = (selected_items[i<<1]%100000)/10000;
            if((three_d_type  >=  3)  &&  (three_d_type  <  6))
three_d_type = BM_ENTITY_TYPE_FACE;
            else if((three_d_type >= 6) && (three_d_type < 9))
three_d_type = BM_ENTITY_TYPE_BENDLINE;
            else   if(three_d_type   >=   9)   three_d_type   =
BM_ENTITY_TYPE_FORMING;
            parent_tag = (selected_items[i<<1]/100000) + 10000;
            parent_clump   =   RwFindTaggedClump(m_base_clump,
parent_tag);
          }
          else {
          CBendCADDoc* pDoc = GetDocument();
          ASSERT_VALID(pDoc);
          BM_PART *part = pDoc->get_part();
          if(! part) return;           // Note: we do not expect
part to be NULL at this stage.
          BM_TOPOLOGY *topology = part->get_topology();
          if(! topology) return;
            three_d_type = selected_items[i<<1]/100000;        //
Terminology caution: three_d_type is not really
          b3 = topology->map_id_into_pointer(three_d_type);  // a
three_d_type until b3->get_type().
            three_d_type = b3->get_type();
            parent_clump = m_base_clump;
          }
          if(three_d_type == BM_ENTITY_TYPE_FACE) {
           for(j=0;   j   <   3;   ++j)   original_color[j]   =
md_face_color[j];
          }
          else if(three_d_type == BM_ENTITY_TYPE_BENDLINE) {
           for(j=0;   j   <   3;   ++j)   original_color[j]   =
md_bendline_color[j];
          }
          else if(three_d_type == BM_ENTITY_TYPE_FORMING) {
           for(j=0;   j   <   3;   ++j)   original_color[j]   =
md_forming_color[j];
          }
          key = selected_items[i<<1];
          key = key%100000;
         picked_clump = RwFindTaggedClump(parent_clump, key);
          RwForAllPolygonsInClumpPointer(picked_clump,
SetPolygonColor, (void *)original_color);
```

APPENDIX E

```
        }
    }
*/


// This callback function performs the necessary transformations on
each clump in the scene.
//  Transform  only  parent  clumps,  since  this  automatically
transforms child clumps as well.
static RwClump * RWCALLBACK do_transformations(RwClump *clump, void
*matrix)
{

  int i = RwGetClumpNumChildren(clump);
  if(i) {
     if( !(i = RwGetClumpNumPolygons(clump)) )
      RwSetClumpState(clump, rwOFF);         // Do not render this
clump if it has no polygons.
    RwTransformClump(clump, (RwMatrix4d *)matrix, rwREPLACE);
  }
  return clump;
}


// This callback function sets the color of the polygon to the
required color.
static   RwPolygon3d   *   RWCALLBACK   SetPolygonColor(RwPolygon3d
*polygon, void *color)
{
    polygon    =    RwSetPolygonColor(polygon,    CREAL(((double
*)color)[0]), CREAL(((double *)color)[1]),
                                                     CREAL(((double
*)color)[2]));
     return polygon;
}


// This function sets the pixel format of the view window to the
kind that
// OpenGL likes. Note: Pixel format of a window should be set only
once.
BOOL CBendCADViewPart::SetupPixelFormat(HDC hDC)
{
    static PIXELFORMATDESCRIPTOR pfd = {
        sizeof(PIXELFORMATDESCRIPTOR),  // size of this pfd
        1,                              // version number
        PFD_DRAW_TO_WINDOW |            // support window
          PFD_SUPPORT_OPENGL |          // support OpenGL
```

APPENDIX E

```
        PFD_DOUBLEBUFFER,                  // double buffered
        PFD_TYPE_RGBA,                     // RGBA type
        24,                                // 24-bit color depth
        0, 0, 0, 0, 0, 0,                  // color bits ignored
        0,                                 // no alpha buffer
        0,                                 // shift bit ignored
        0,                                 // no accumulation buffer
        0, 0, 0, 0,                        // accum bits ignored
        32,                                // 32-bit z-buffer
        0,                                 // no stencil buffer
        0,                                 // no auxiliary buffer
        PFD_MAIN_PLANE,                    // main layer
        0,                                 // reserved
        0, 0, 0                            // layer masks ignored
    };
    int pixelformat;

    if ( (pixelformat = ChoosePixelFormat(hDC, &pfd)) == 0 )
    {
        MessageBox("ChoosePixelFormat failed");
        return FALSE;
    }

    if (SetPixelFormat(hDC, pixelformat, &pfd) == FALSE)
    {
        MessageBox("SetPixelFormat failed");
        return FALSE;
    }

    // don't need this call any more; the function will be called
from OnActivateView()
     // and on OnViewWireframe() -- AK
     //CreateRGBPalette(hDC);

    return TRUE;
}


unsigned  char  CBendCADViewPart::ComponentFromIndex(int  i,  UINT
nbits, UINT shift)
{
    unsigned char val;

    val = (unsigned char) (i >> shift);
    switch (nbits) {

    case 1:
        val &= 0x1;
        return oneto8[val];
    case 2:
```

APPENDIX E

```
        val &= 0x3;
        return twoto8[val];
    case 3:
        val &= 0x7;
        return threeto8[val];

    default:
        return 0;
    }
}


void CBendCADViewPart::CreateRGBPalette(HDC hDC)
{
    PIXELFORMATDESCRIPTOR pfd;
    LOGPALETTE *pPal;
    int n, i;
    CDC dc;

    n = ::GetPixelFormat(hDC);
    ::DescribePixelFormat(hDC, n, sizeof(PIXELFORMATDESCRIPTOR),
&pfd);

    if (pfd.dwFlags & PFD_NEED_PALETTE)
    {
        n = 1 << pfd.cColorBits;
         pPal   =   (PLOGPALETTE)LocalAlloc(LMEM_FIXED,
sizeof(LOGPALETTE) +
                n * sizeof(PALETTEENTRY));
        pPal->palVersion = 0x300;
        pPal->palNumEntries = n;
        for (i=0; i<n; i++)
        {
            pPal->palPalEntry[i].peRed =
                    ComponentFromIndex(i,   pfd.cRedBits,
pfd.cRedShift);
            pPal->palPalEntry[i].peGreen =
                    ComponentFromIndex(i,   pfd.cGreenBits,
pfd.cGreenShift);
            pPal->palPalEntry[i].peBlue =
                    ComponentFromIndex(i,   pfd.cBlueBits,
pfd.cBlueShift);
            pPal->palPalEntry[i].peFlags = 0;
        }

        /* fix up the palette to include the default GDI palette */
        if ((pfd.cColorBits == 8)                           &&
            (pfd.cRedBits   == 3) && (pfd.cRedShift   == 0) &&
            (pfd.cGreenBits == 3) && (pfd.cGreenShift == 3) &&
            (pfd.cBlueBits  == 2) && (pfd.cBlueShift  == 6)
```

APPENDIX E

```
        )
        {
                for (i = 1 ; i <= 12 ; i++)
                   pPal->palPalEntry[defaultOverride[i]]     =
defaultPalEntry[i];
        }

        dc.Attach(hDC);

          CPalette  *pOldPal;

        // since we call this function not only when creating a
view,
          // but also each time activating, delete the prev palette
(if any) -- AK
          int resp = m_cPal.DeleteObject();

        m_cPal.CreatePalette(pPal);
        LocalFree(pPal);
        pOldPal = dc.SelectPalette(&m_cPal, FALSE);
        dc.RealizePalette();
        dc.Detach();
    }
}


// This function computes the bounding box parameters of the given
part -
// the x, y and z extents, in global coordinates, for the
orientation specified by orient_matrix.
// The computation is done with respect to the BM_POINT centroid as
origin.
// It does so by taking the bbox of each face, projecting each onto
the coordinate
// axes, and then finding the extents along each axis. If
threeD_flag is non-zero, the
// three-d version's bbox is computed; else, the flat's bbox is
computed. The results of the
// computation are put into the arry bbox_size[3]; if this pointer
is zero, no computation
// is performed. The offset, ie. the vector from the centroid's
coords to the bbox center's coords,
// is passed back in the pointer to the BM_VECTOR.
// Returns 1 if successful, 0 otherwise.
int    CBendCADViewPart::compute_part_bbox(BM_PART    *part,    int
threeD_flag, RwMatrix4d *orient_matrix,
                                        BM_POINT    centroid,    double
*bbox_size, BM_VECTOR *offset)
{
```

APPENDIX E

```
  BM_FACE *face = NULL;
  BM_BENDLINE *bendline = NULL;
  BM_2D_BODY *two_d_body = NULL;
  BM_LOOP *loop = NULL;
  BM_POINT dot1, dot2, dot3, dot4;
  double left, right, top, bot, front, back;       // First two
refer to x direction,
                                                               //
last two to z direction.
  BM_VECTOR vec1;
  int first_pass = 1;
  float rot_matrix[4][4];

  if(! part) return 0;
  if(   (part->get_number_of_faces()    ==    0)    &&
(part->get_number_of_bendlines() == 0) )
    return 0;
  if(! bbox_size) return 0;

  if(! part->get_number_of_faces()) {    // In this case, find
bendline bboxes.
    for(bendline = part->get_bendline_list(); bendline; bendline =
(BM_BENDLINE *)bendline->next()) {
       // First check that the bbox of the bloop is up to date; if
not compute bbox.
       if(threeD_flag)
         two_d_body = bendline->get_3D_version();
       else
         two_d_body = bendline->get_flat();
       if(two_d_body) loop = two_d_body->get_bloop();
       else continue;
       if(! loop) continue;
       if(!(loop->is_bbox_up_to_date())) loop->recompute_bbox();

       // Now find the envelope (union) of the projected bboxes.
       vec1 = BM_VECTOR(centroid.X(), centroid.Y(), centroid.Z());
       dot1 = loop->get_bbox_p1() + (-1.0)*vec1;  //   The    bbox
coordinates,
       dot2 = loop->get_bbox_p2() + (-1.0)*vec1;  // with respect
to the
       dot3 = loop->get_bbox_p3() + (-1.0)*vec1;  // centroid as
origin.
       dot4 = loop->get_bbox_p4() + (-1.0)*vec1;

       RwGetMatrixElements(orient_matrix, rot_matrix);

       multiply_pt_by_matrix(&dot1, rot_matrix);       // Transform
coords by the current
       multiply_pt_by_matrix(&dot2, rot_matrix);       // rotation
matrix.
```

APPENDIX E

```
        multiply_pt_by_matrix(&dot3, rot_matrix);
        multiply_pt_by_matrix(&dot4, rot_matrix);

        if(first_pass) {
          left  = __min(dot1.X(), dot2.X());
          right = __max(dot1.X(), dot2.X());
          bot   = __min(dot1.Y(), dot2.Y());
          top   = __max(dot1.Y(), dot2.Y());
          back  = __min(dot1.Z(), dot2.Z());
          front = __max(dot1.Z(), dot2.Z());
          first_pass = 0;
       }
        else {
          left  = __min(left,  dot1.X());
          left  = __min(left,  dot2.X());
          right = __max(right, dot1.X());
          right = __max(right, dot2.X());
          bot   = __min(bot  , dot1.Y());
          bot   = __min(bot  , dot2.Y());
          top   = __max(top  , dot1.Y());
          top   = __max(top  , dot2.Y());
          back  = __min(back , dot1.Z());
          back  = __min(back , dot2.Z());
          front = __max(front, dot1.Z());
          front = __max(front, dot2.Z());
        }
        left  = __min(left,  dot3.X());
        left  = __min(left,  dot4.X());
        right = __max(right, dot3.X());
        right = __max(right, dot4.X());
        bot   = __min(bot  , dot3.Y());
        bot   = __min(bot  , dot4.Y());
        top   = __max(top  , dot3.Y());
        top   = __max(top  , dot4.Y());
        back  = __min(back , dot3.Z());
        back  = __min(back , dot4.Z());
        front = __max(front, dot3.Z());
        front = __max(front, dot4.Z());
    }

     bbox_size[0] = right - left;
     bbox_size[1] = top   - bot;        // Copy bbox size into the
array passed.
     bbox_size[2] = front - back;

     if(offset)                             // Copy the bbox center
into the pointer passed.
       *offset = BM_VECTOR((right + left)/2.0, (top + bot)/2.0,
(front + back)/2.0);
     mi_bbox_is_up_to_date = 1;
```

APPENDIX E

```
      return 1;
   }

   // Faces are available, so find bbox of faces.
   for(face = part->get_face_list(); face; face = (BM_FACE
*)face->next()) {
     if(! face) break;
     // First check that the bbox of the bloop is up to date; if not
compute bbox.
      if(threeD_flag)
        two_d_body = face->get_3D_version();
      else
        two_d_body = face->get_flat();
      if(two_d_body) loop = two_d_body->get_bloop();
      else continue;
      if(! loop) continue;
      if(!(loop->is_bbox_up_to_date())) loop->recompute_bbox();

      // Now find the envelope (union) of the projected bboxes.

      vec1 = BM_VECTOR(centroid.X(), centroid.Y(), centroid.Z());
      dot1 = loop->get_bbox_p1() + (-1.0)*vec1;    // The bbox
coordinates,
      dot2 = loop->get_bbox_p2() + (-1.0)*vec1;    // with respect
to the
      dot3 = loop->get_bbox_p3() + (-1.0)*vec1;    // centroid as
origin.
      dot4 = loop->get_bbox_p4() + (-1.0)*vec1;

     RwGetMatrixElements(orient_matrix, rot_matrix);

      multiply_pt_by_matrix(&dot1, rot_matrix);         // Transform
coords by the current
      multiply_pt_by_matrix(&dot2, rot_matrix);         // rotation
matrix.
      multiply_pt_by_matrix(&dot3, rot_matrix);
      multiply_pt_by_matrix(&dot4, rot_matrix);

      if(first_pass) {
        left  = __min(dot1.X(), dot2.X());
        right = __max(dot1.X(), dot2.X());
        bot   = __min(dot1.Y(), dot2.Y());
        top   = __max(dot1.Y(), dot2.Y());
        back  = __min(dot1.Z(), dot2.Z());
        front = __max(dot1.Z(), dot2.Z());
        first_pass = 0;
      }
      else {
        left  = __min(left,  dot1.X());
        left  = __min(left,  dot2.X());
```

APPENDIX E

```
        right = __max(right, dot1.X());
        right = __max(right, dot2.X());
        bot   = __min(bot   , dot1.Y());
        bot   = __min(bot   , dot2.Y());
        top   = __max(top   , dot1.Y());
        top   = __max(top   , dot2.Y());
        back  = __min(back  , dot1.Z());
        back  = __min(back  , dot2.Z());
        front = __max(front, dot1.Z());
        front = __max(front, dot2.Z());
      }
      left  = __min(left,  dot3.X());
      left  = __min(left,  dot4.X());
      right = __max(right, dot3.X());
      right = __max(right, dot4.X());
      bot   = __min(bot   , dot3.Y());
      bot   = __min(bot   , dot4.Y());
      top   = __max(top   , dot3.Y());
      top   = __max(top   , dot4.Y());
      back  = __min(back  , dot3.Z());
      back  = __min(back  , dot4.Z());
      front = __max(front, dot3.Z());
      front = __max(front, dot4.Z());
  }

  bbox_size[0] = right - left;
  bbox_size[1] = top   - bot;      // Copy bbox size into the array
passed.
  bbox_size[2] = front - back;

  if(offset)                          // Copy the bbox center into
the pointer passed.
     *offset  =  BM_VECTOR((right  +  left)/2.0,  (top  +  bot)/2.0,
(front + back)/2.0);
  mi_bbox_is_up_to_date = 1;

  return 1;

}


// This function computes the part's centroid. This is done with
respect to
// the original (given) coordinates of the part. If threeD_flag is
non-zero, the
//  three-d  version's  centroid  is  computed;  else,  the  flat's
centroid is computed.
// The results are passed back in the pointer to a BM_POINT; if
this pointer is NULL, no
// computation is done. Returns 1 if successful, 0 otherwise.
```

APPENDIX E

```
int  CBendCADViewPart::compute_part_centroid(BM_PART  *part,  int
threeD_flag, BM_POINT *centroid)
{

  BM_FACE *face;
  BM_2D_BODY *two_d_body;
  BM_LOOP *loop;
  BM_POINT dot1, dot2, dot3, dot4;
  double left, right, top, bot, front, back;   // First two refer
to x direction,
                                                                //
last two to z direction.
  int first_pass = 1;

  if(! part) return 0;
   if(   (part->get_number_of_faces    ==    0)    &&
(part->get_number_of_bendlines == 0) )
    return 0;
  if(! centroid) return 0;

  for(face  =  part->get_face_list();  face;  face  =  (BM_FACE
*)face->next()) {
    if(! face) break;
    // First check that the bbox of the bloop is up to date; if not
compute bbox.
     if(threeD_flag)
       two_d_body = face->get_3D_version();
     else
       two_d_body = face->get_flat();
     if(two_d_body) loop = two_d_body->get_bloop();
     else continue;
     if(! loop) continue;
     if(!(loop->is_bbox_up_to_date())) loop->recompute_bbox();

     // Now find the envelope (union) of the projected bboxes.

     dot1 = loop->get_bbox_p1();
     dot2 = loop->get_bbox_p2();
     dot3 = loop->get_bbox_p3();
     dot4 = loop->get_bbox_p4();

     if(first_pass) {
       left  = __min(dot1.X(), dot2.X());
       right = __max(dot1.X(), dot2.X());
       bot   = __min(dot1.Y(), dot2.Y());
       top   = __max(dot1.Y(), dot2.Y());
       back  = __min(dot1.Z(), dot2.Z());
       front = __max(dot1.Z(), dot2.Z());
       first_pass = 0;
     }
```

APPENDIX E

```
      else {
        left  = __min(left,  dot1.X());
        left  = __min(left,  dot2.X());
        right = __max(right, dot1.X());
        right = __max(right, dot2.X());
        bot   = __min(bot  , dot1.Y());
        bot   = __min(bot  , dot2.Y());
        top   = __max(top  , dot1.Y());
        top   = __max(top  , dot2.Y());
        back  = __min(back , dot1.Z());
        back  = __min(back , dot2.Z());
        front = __max(front, dot1.Z());
        front = __max(front, dot2.Z());
      }
      left  = __min(left,  dot3.X());
      left  = __min(left,  dot4.X());
      right = __max(right, dot3.X());
      right = __max(right, dot4.X());
      bot   = __min(bot  , dot3.Y());
      bot   = __min(bot  , dot4.Y());
      top   = __max(top  , dot3.Y());
      top   = __max(top  , dot4.Y());
      back  = __min(back , dot3.Z());
      back  = __min(back , dot4.Z());
      front = __max(front, dot3.Z());
      front = __max(front, dot4.Z());
  }

  *centroid = BM_POINT((right + left)/2.0, (top    + bot )/2.0,
(front + back)/2.0); // Copy centroid into
/*
                                              // pointer supplied.
  if(threeD_flag) {
    m_3d_part_centroid.set_X((right + left)/2.0);
    m_3d_part_centroid.set_Y((top   + bot )/2.0);    // The part's
3d centroid.
    m_3d_part_centroid.set_Z((front + back)/2.0);
  }
  else {
    m_flat_part_centroid.set_X((right + left)/2.0);
    m_flat_part_centroid.set_Y((top   + bot )/2.0);        //  The
part's flat centroid.
    m_flat_part_centroid.set_Z((front + back)/2.0);
  }
*/
  return 1;

}
```

APPENDIX E

```
// This function multiplies a bend model point by a 4x4 RenderWare
transform matrix.
// The function is destructive.   It is NOT a BMAPPView member
function.
// Note that the point is considered to be a row vector; this is
// RenderWare's (and the Bend Model's) convention.
static   void   multiply_pt_by_matrix(BM_POINT   *point,   float
rot_matrix[4][4])
{

  double x = point->X();
  double y = point->Y();
  double z = point->Z();

  point->set_X((x*rot_matrix[0][0]   +   y*rot_matrix[1][0]   +
z*rot_matrix[2][0]));
  point->set_Y((x*rot_matrix[0][1]   +   y*rot_matrix[1][1]   +
z*rot_matrix[2][1]));
  point->set_Z((x*rot_matrix[0][2]   +   y*rot_matrix[1][2]   +
z*rot_matrix[2][2]));

}


// This function outlines the rectangular region selected by the
user.
void CBendCADViewPart::outline_region(void)
{

  CClientDC view_dc(this);
  CPoint  corner1_curr  =  m_lt_btn_down_point,  corner2_curr  =
m_lt_btn_down_point;
  CPoint  corner1_prev  =  m_lt_btn_down_point,  corner2_prev  =
m_lt_btn_down_point;

  corner1_curr.Offset(m_current_point.x - m_lt_btn_down_point.x,
0);
  corner2_curr.Offset(0,   m_current_point.y   -
m_lt_btn_down_point.y);

  corner1_prev.Offset(m_previous_point.x - m_lt_btn_down_point.x,
0);
  corner2_prev.Offset(0,   m_previous_point.y   -
m_lt_btn_down_point.y);

  view_dc.SetROP2(R2_NOT);
  view_dc.MoveTo(m_lt_btn_down_point);
  view_dc.LineTo(corner1_prev);
  view_dc.MoveTo(m_lt_btn_down_point);
  view_dc.LineTo(corner2_prev);
```

APPENDIX E

```
  view_dc.MoveTo(corner1_prev);
  view_dc.LineTo(m_previous_point);
  view_dc.MoveTo(corner2_prev);
  view_dc.LineTo(m_previous_point);

  view_dc.MoveTo(m_lt_btn_down_point);
  view_dc.LineTo(corner1_curr);
  view_dc.MoveTo(m_lt_btn_down_point);
  view_dc.LineTo(corner2_curr);
  view_dc.MoveTo(corner1_curr);
  view_dc.LineTo(m_current_point);
  view_dc.MoveTo(corner2_curr);
  view_dc.LineTo(m_current_point);

}


// This function processes the hits record to pick out the edge(s) selected by the
// user. If add_hit_to_list is non-zero, which it is if the control button is held down,
// the current hit, if any, is added to the selection set; else, the selection set
// is cleared and only the current hit is added to the list. If there is no hit, the
// selection set is cleared as well, unless add_to_list is non-zero, in which case
// nothing happens.
// This function recognizes trivial bendlines and formings and modifies the selection set
// appropriately.
void CBendCADViewPart::process_hits_record(int add_hit_to_list)
{

  RwClump *picked_clump = NULL;
  RwClump *parent_clump = NULL;
     RwV3d vert;
  long parent_tag, clump_tag, three_d_type = 0, offset = 0, key = 0;
  int num_hits = -3, j;
  unsigned long z_max = 0UL, z_min = ULONG_MAX, name_id = 0UL;
  unsigned int *ptr = mw_selected_objects;
  BM_EDGE *edge = NULL;
     long old_data;

  if(mi_show_solid) {              // RenderWare picking.
    if(m_pick.type == rwNAPICKOBJECT) {                  //   No clump was picked.
      if(add_hit_to_list) return;
              else clear_selection_set();
```

APPENDIX E

```
            return;
    }
    else if(m_pick.type == rwPICKCLUMP) {                   // Some
clump was picked; process it.
      picked_clump = m_pick.object.clump.clump;
            vert = m_pick.object.clump.wcpoint;
      RwTranslateMatrix(RwScratchMatrix(),   CREAL(md_x_trans),
CREAL(md_y_trans), CREAL(0.0), rwREPLACE);
      RwTransformMatrix(RwScratchMatrix(),   md_rot_matrix,
rwPRECONCAT);
       RwTranslateMatrix(RwScratchMatrix(),   CREAL(-
m_part_centroid.X()), CREAL(- m_part_centroid.Y()),
                        CREAL(- m_part_centroid.Z()), rwPRECONCAT);

         RwMatrix4d *inverse = RwCreateMatrix();
               RwInvertMatrix(RwScratchMatrix(), inverse);
               RwTransformPoint(&vert, inverse);
               RwDestroyMatrix(inverse);
               parent_clump = RwGetClumpParent(picked_clump);
               parent_tag = RwGetClumpTag(parent_clump);
               clump_tag = RwGetClumpTag(picked_clump);

               if(parent_tag == 1) {
                                                   // The body of a
face/bendline/forming was picked.
                    key = (clump_tag%10000)*100000 + clump_tag;

                    if(m_selection_set.find(key, NULL)) {

                         m_selection_set.remove(key, &old_data);
      // Remove clump from selection set (toggle).
                         if(old_data)   delete   (BV_SELECT_DATA
*)old_data;
                         return;
                    }
                    else {
                         if(!  add_hit_to_list)
clear_selection_set();     // Remove everything else in selection
set,
                         BV_SELECT_DATA *data = new BV_SELECT_DATA;
                         data->key = key;
                         data->edge = NULL;
          (data->world_pt) = BM_POINT(vert.x, vert.y, vert.z);
                         m_selection_set.insert(key,
(long)data);                  // insert this key and data.
                         return;
                    }
               }
               // Now an edge was picked.
               key = (parent_tag%10000)*100000 + clump_tag;
```

APPENDIX E

```
                if(clump_tag) {
                // Safety check; we expect clump_tag to be non-zero.
                     if(m_selection_set.find(key, NULL))      {
                       m_selection_set.remove(key, &old_data);
         // Remove clump from selection set (toggle).
                          if(old_data)    delete    (BV_SELECT_DATA
*)old_data;
                     }
                  else {
                          i f ( !   a d d _ h i t _ t o _ l i s t )
clear_selection_set();      // Remove everything else in selection
set.
                          e         d          g          e    =
map_list_name_to_bm_edge(parent_tag, clump_tag);
                          BV_SELECT_DATA *data = new BV_SELECT_DATA;
                          data->key = key;
                          data->edge = edge;
            (data->world_pt) = BM_POINT(vert.x, vert.y, vert.z);
                          m _ s e l e c t i o n _ s e t . i n s e r t ( k e y ,
(long)data);                   // insert this key and data.
                     }

                }
     }
  }

  else {                                               //    O p e n G L
Picking.
    num_hits = glRenderMode(GL_RENDER);                     //   The
number of hits.
    if(num_hits == -1) {
  // Selection buffer has overflowed.
      AfxMessageBox("Too many entities selected; change view and
try again.");
                return;
    }
    if(num_hits == 0) {
    // No hit; only a miss.
      if(add_hit_to_list) return;
                else clear_selection_set();
                return;
    }

    // Process the hits : find the edge with LOWEST z value of all
the edges picked.
    for(j=0; j < num_hits; ++j) {
      ptr += 1;                                     // Skip the 1st
element bec. it will always be 1,
      if( (unsigned long)(*ptr) < (unsigned long)z_min) {
                     z_min = (unsigned long)(*ptr);
```

APPENDIX E

```
                    ptr += 2;
                    name_id = (long)(*ptr); ++ptr;
               }
               else ptr += 3;
    }

    // Find the bm edge corresp. to the name and add it to the
selection set.
    if(name_id) {                                                //
Something was selected.
      if(m_selection_set.find(name_id, NULL)) {
                    m_selection_set.remove(name_id, &old_data);
  // Remove edge from    selection set (toggle).
                    if(old_data) delete (BV_SELECT_DATA *)old_data;
               }
               else {
                    if(! add_hit_to_list) clear_selection_set();
                    // First, we massage the name_id into the
format RenderWare picking uses.
                    parent_tag = name_id/100000 + 10000;
                    clump_tag = name_id%100000;
                    edge  =  map_list_name_to_bm_edge(parent_tag,
clump_tag);
                    BV_SELECT_DATA *data = new BV_SELECT_DATA;
                    data->key = key;
                    data->edge = edge;
        (data->world_pt) = BM_POINT(0.0, 0.0, 0.0);
                    m_selection_set.insert(name_id, (long)data);
               // insert this key and data.
               }

    }
  }

  return;

}


// This function maps a RenderWare parent clump and child clump
pair to the
// Bend Model edge which the child clump represents. The pointer to
the edge is returned.
// This function only needs to deal with "real" edges, ie. trivial
bendlines and
// formings are filtered out by process_hits_records itself.
BM_EDGE    *CBendCADViewPart::map_list_name_to_bm_edge(long
parent_tag, long clump_tag)
{
```

APPENDIX E

```
  long three_d_name, three_d_type, loop_name, edge_name, count = 0,
offset = 0;
  BM_3D_BODY *three_d_body = NULL;
  BM_2D_BODY *two_d_body = NULL;
  BM_LOOP *loop = NULL;
  BM_EDGE *edge = NULL;
  BM_PART *part = NULL;
  BM_TOPOLOGY *topology = NULL;

  CBendCADDoc* pDoc = GetDocument();
  ASSERT_VALID(pDoc);
  part = pDoc->get_part();
  if(! part) return NULL;             // Note: we do not expect
part to be NULL at this stage.
  topology = part->get_topology();
  if(! topology) return NULL;

  three_d_name = parent_tag%10000;
  three_d_body = topology->map_id_into_pointer(three_d_name);
  // Now we have a pointer to the face/bendline to which the picked
edge belongs.
  three_d_type = three_d_body->get_type();

  if(three_d_type == BM_ENTITY_TYPE_FACE)
     offset = 30000;
  if(three_d_type == BM_ENTITY_TYPE_BENDLINE)
     offset = 60000;
  if(three_d_type == BM_ENTITY_TYPE_FORMING)
     offset = 90000;
  loop_name = (clump_tag - offset)/100;
  edge_name = (clump_tag - offset)%100;

  if(loop_name == 0) return NULL;          // This should never be
the case.

  // Now have the edge_name-th edge in the loop_name-th loop of the
face/bendline/forming.

  // Now we have the face/bendline to which the edge belongs.
  if(mi_show_3d) two_d_body = three_d_body->get_3D_version();
  else two_d_body = three_d_body->get_flat();
  if(! two_d_body) return NULL;

  if(loop_name == 1) loop = two_d_body->get_bloop();
  else {
    count = 1;
    for(loop = two_d_body->get_first_hole(); loop; loop = (BM_LOOP
*)loop->next()) {
       if(! loop) return NULL;
       ++count;
```

APPENDIX E

```
      if(count == loop_name) break;
    }
  }

  // Now we have the loop to which the edge belongs.
  if(loop == NULL) return NULL;             // A trivial bendline
was picked.
  count = 0;
  for(edge  =  loop->get_first_edge();  edge;  edge  =  (BM_EDGE
*)edge->next()) {
     if(! edge) break;
     ++count;
     if(count == edge_name) break;
  }
  // Now we have the edge itself.
  return edge;

/*
  three_d_name = list_name/10000;
  loop_name = list_name%10000;        // The edge_name-th edge in
the loop_name-th
  loop_name /= 100;                   //   loop   of   the
three_d_name-th three-d-body,
  edge_name = list_name%100;     // starting with 1st bendline as
1st three-d-body.

  if(three_d_name > (ml_num_bendlines + ml_num_faces))
    return NULL;                 // The thing drawn is a forming.
  if(! loop_name) return NULL;        //  The  thing  drawn  is  a
trivial bendline.

  if(three_d_name > ml_num_bendlines) {   // The three_d_body is a
face.
    for(three_d_body = part->get_face_list(); three_d_body;
                          three_d_body    =    (BM_3D_BODY
*)three_d_body->next()) {
      if(! three_d_body) return NULL;
       ++count;
       if((ml_num_bendlines + count) == three_d_name) break;
     }
  }
  else {                                      // The three_d_body
is a bendline.
    for(three_d_body = part->get_bendline_list(); three_d_body;
                          three_d_body    =    (BM_3D_BODY
*)three_d_body->next()) {
      if(! three_d_body) return NULL;
       ++count;
       if(count == three_d_name) break;
    }
```

APPENDIX E

```
  }                            // Now we have the face/bendline to
which the edge belongs.

  if(mi_show_3d) two_d_body = three_d_body->get_3D_version();
  else two_d_body = three_d_body->get_flat();
  if(! two_d_body) return NULL;

  if(loop_name == 1) loop = two_d_body->get_bloop();
  else {
    count = 1;
    for(loop = two_d_body->get_first_hole(); loop; loop = (BM_LOOP
*)loop->next()) {
       if(! loop) return NULL;
       ++count;
       if(count == loop_name) break;
     }
  }                            // Now we have the loop to which the
edge belongs.

  count = 0;
  for(edge  =  loop->get_first_edge();  edge;  edge  =  (BM_EDGE
*)edge->next()) {
     if(! edge) break;
     ++count;
     if(count == edge_name) break;
  }

  return edge;
*/

}


// This function returns the number of items currently in the
selection set.
long CBendCADViewPart::get_number_of_selected_items(void)
{
  return m_selection_set.list_size();
}


/* This allows other classes to get the selection set. The selected
items are
   passed back in the array selected_items_array; it is the
responsibility of the
   user to ensure that this array is of sufficient size. An array
of size
   num_requested*2 is exactly sufficient. The function will pass
back up to
   num_requested items, if that many are available.
```

APPENDIX E

```
   The return value is the number of items actually passed back.

   The format of the returned items in the array is as follows:
   selected_items_array[2*i -2] contains the OpenGL Display List id
of the edge
   drawn, and selected_items_array[2*i -1] contains the Bend Model
pointer to that
   edge.  Eg.  selected_items_array[0],  selected_items_array[1]
correspond to the
   1st item in the selection set, etc. all the way up to
array[2*num_requested -2],
   array[2*num_requested -1] for the num_requested-th item in the
selection set.

   If the edge pointer is NULL, you need to do some further
processing:
   Let N be the OpenGl display list id of this edge; N is of type
long.
   Case   A):   If   N/10000   >   (num_bendlines_in_part   +
num_faces_in_part) then the
            user has picked the N - (num_bendlines + num_faces)
forming.
               Eg: num_bendlines = 4, num_faces = 3, num_formings
= 5, N/10000 = 9,
                   edge pointer is NULL. Then user has picked the
2nd forming.

   Case B): If (N%10000)/100 == 0 (ie. the hundredths digit of N is
zero) then
            the user has picked the center line of a trivial
(unbent) bendline.
               The bendline is the (N/10000) -th bendline.
               Eg: N/10000 = 3, edge pointer is NULL, (N%10000)/100
== 0. The user
                   has picked the 3rd bendline, which happens to be
unbent. (In case
                    you were wondering, this part is guaranteed to
have at least 3
                    bendlines).
*/
long CBendCADViewPart::get_selected_items(long num_requested, long
*selected_items_array)
{
  if(selected_items_array == NULL) return 0;
  long   i   =   m_selection_set.display(num_requested,
selected_items_array);
  return i;
}
```

APPENDIX E

```
// This allows others to clear the selection set.
void CBendCADViewPart::clear_selection_set(void)
{
     int size = m_selection_set.list_size();
     long *array = new long[(size<<1) + 1];

  m_selection_set.display(size, array);
     for(long i=0; i < size; ++i) {
       if(array[(i<<1) + 1]) delete (BV_SELECT_DATA *)array[(i<<1)
+ 1];
     }
  m_selection_set.remove();
     delete [] array;
}


// This function writes a RenderWare matrix's rotation part into an
array[16], which can be used by
// OpenGL.
int    CBendCADViewPart::convert_rw_matrix_to_gl_array(RwMatrix4d
*rw_matrix, double *array)
{
  RwReal rw_array[4][4], *test;
  test = RwGetMatrixElements(rw_matrix, rw_array);
  if(! test) return 0;

  int i, j;
  for(i=0; i < 4; ++i) {
     for(j=0; j < 4; ++j)
      array[4*i + j] = rw_array[i][j];
  }
  array[15] = 1.0;
  array[3] = array[7] = array[11] = 0.0;

  return 1;
}


// This function allows you to set the drawing mode: show_solid =
1 for solid, 0 for wireframe.
// This function assumes that the part has not changed.
void CBendCADViewPart::set_drawing_mode(int show_solid)
{
  if(show_solid) OnViewShaded();
     else OnViewWireframe();
}


// This function allows you to set the current view of the part:
show_3d = 1 for 3d version,
```

APPENDIX E

```
// 0 for flat.
// This function assumes that the part has not changed.
void CBendCADViewPart::set_current_view(int show_3d)
{
     if(show_3d) OnShow3d();
     else OnShowFlat();
}


// This allows you to set both solid/wireframe (show_solid = 0/1)
and flat/3d_version (show_3d = 0/1).
// If flat is asked for, the picture shown is top view, zoomed-all.
// If 3d is asked for and flat is currently in view, the picture
shown is 3d, isometric, zoomed-all.
// If 3d is asked for and 3d is already currently in view, the view
volume is not changed.
// If part_has_changed is not zero, re-faceting is done.
void CBendCADViewPart::set_drawing_view_mode(int show_solid, int
show_3d, int part_has_changed)
{

     int show_3d_isometric = 0;
     if( (! mi_show_3d) && (show_3d) )  show_3d_isometric = 1;

     mi_show_solid = show_solid;
     mi_show_3d = show_3d;

  int i;
  BM_PART *part = NULL;
  CBendCADDoc* pDoc = GetDocument();
  ASSERT_VALID(pDoc);
  part = pDoc->get_part();
  if(! part) {
    mi_part_is_up_to_date = 0;
       return;
  }
  mi_part_is_up_to_date = 1;
     if(part_has_changed) {
    compute_part_centroid(part, 0, &m_flat_part_centroid);     / /
Compute 3d and flat part centroids.
    compute_part_centroid(part, 1, &m_3d_part_centroid);
     }

     if(mi_show_solid) {           // Renderware stuff.
          if(mi_show_3d) {
            if(part_has_changed || (! m_3d_base_clump)) {
         i  =  facet_part_rw(part,  &m_3d_base_clump,  mi_show_3d,
md_part_color);
           if( (! i) || (! m_3d_base_clump) ) return;
               }
```

APPENDIX E

```
                RwRemoveClumpFromScene(m_base_clump);
        m_base_clump = m_3d_base_clump;
        RwAddClumpToScene(m_scene, m_base_clump);
         }
         else {
           if(part_has_changed || (! m_flat_base_clump)) {
       i  =  facet_part_rw(part,  &m_flat_base_clump,  mi_show_3d,
md_part_color);
            if( (! i) || (! m_3d_base_clump) ) return;
                }
                RwRemoveClumpFromScene(m_base_clump);
        m_base_clump = m_flat_base_clump;
        RwAddClumpToScene(m_scene, m_base_clump);
         }
     }
     else {                                              //  OpenGl
stuff.
    i  =   prepare_display_list(part,  mi_show_3d,  1,  0,  1,  1,
md_face_color, md_bendline_color);
    if(! i) {
      mi_display_list_is_up_to_date = 0;
         return;
    }
    mi_display_list_is_up_to_date = 1;
       if(mi_show_3d) {
      mi_3d_is_up_to_date = 1;
         mi_flat_is_up_to_date = 0;
          }
          else {
      mi_3d_is_up_to_date = 0;
         mi_flat_is_up_to_date = 1;
          }
     }

  mi_bbox_is_up_to_date = 0;
     if(mi_show_3d) m_part_centroid = m_3d_part_centroid;
     else m_part_centroid = m_flat_part_centroid;

     if(part_has_changed) {
          ml_num_faces = part->get_number_of_faces();
          ml_num_bendlines = part->get_number_of_bendlines();
          ml_num_formings = part->get_number_of_formings();
     }
  ml_last_function_chosen = RETURN_FROM_DIALOG_MODE;

     if(show_3d_isometric) {
       OnZoomAll();
          return;
     }
```

APPENDIX E

```
     if(! mi_show_3d) {
       OnViewTop();
          return;
     }

     return;

}
```

APPENDIX F

```
///////////////////////////////////////////////////////////////
//                                                           //
//   Example of BMAPI auto dimensioning main include file    //
//   with comments                                           //
//                                                           //
//                    Copyright 1996 AmadaSoft America, Inc. //
//                                                           //
///////////////////////////////////////////////////////////////
/*

     General Notes :
     ---------------
     ***************
     ---------------

     - Auto-Dimensioning package assumes that the part is already
up to date, ie. the 3D version is already computed. It takes the
current 3D-version of the part and uses it.

     - As of 04/02/96 Auto-Dimensioning only generates dimensions
for the 3D version of the part.

     - As of 04/02/96 Auto-Dimensioning assumes that the part is
shown with thickness (ie. it assumes that we are not showing just
one side of the sheetmetal).

     Overview :
     ---------------
     ***************
     ---------------

     Auto-Dimension draws two kinds of things :

          - flange length for every bendline

          - bendline information for every bendline

     Bendline information is drawn in a small info-box that points
to the bendline it is associated with.
     The only problem with drawing those info-boxes is whether the
bendline is visible, where to draw the info-box (ie. where on the
screen to draw it so that it looks good and does not interfere
with other stuff, for instance, does not overlap with other
things), how to associate it with the bendline. This stuff is
relatively straightforward.

     Flange length of the bendline is the largest outside distance
between the bendline and an adjacent flange on the side of the
bendline. Note that a bendline can have at most two adjacent
```

APPENDIX F flanges, so we have to draw flange length with respect to both adjacent flanges.

In practice, flange length is drawn (as a distance) between points that we call dimension points.

There are two types of dimension points. The first type is bendline dimension points.

Since flange length is the (largest outside) distance between a bendline and an adjacent flange, these dimension points that are on the side of the bendline are called bendline dimension points.

Their location is defined solely by the bendline.

Note that (at least in the current version of the BendModel/BendCAD) one bendline can have exactly two bendline dimension points with respect to each of the adjacent flanges.

Each of the two bendline dimension points corresponds to the two ends of a bendline.

Also note that usually these pairs of bendline dimension points with respect to both adjacent flanges match. That is - bendline dimension points with respect to adjacent flange A (there are two bendline dimension points with respect to A) and the same as bendline dimension points with respect to another adjacent flange B. That is, they are physically not the same, but they have the same values.

Bendline dimension points are calculated using intersection approximation (if the bend angle is no more that 90 degrees) or tangent approximation (if the bend angle is more than 90 degrees).

If the bend angle is not more than 90 degrees, pairs of bendline dimension points with respect both adjacent flanges are the same, because the intersection approximation points match.

The other type of dimension points is flange dimension points. They are points on the flange adjacent to the bendline, on the side of the bendline, that are the farthest away from the bendline. Assuming the flange is correct (ie. non-empty) there is at least one flange dimension point. However, theoretically there is no upper bound on the number of flange dimension points.

Note an important point. If a flange A, adjacent to a bendline B, and also is adjacent to a bendline C at its farthest point (ie. at the flange dimension point with respect to B), the flange dimension points of B with respect to A are really the same bendline dimension points of C with respect to A (ok, assuming that bendlines B and C are parallel, otherwise things get tricky and it is not true any more).

Flange dimension points are computed at the corners of the flange, because dimension have to be drawn at the side of the flange.

APPENDIX F

This is how the Auto-Dimension works :

--------------------------------------
**************************************
--------------------------------------

It is divided into two different tasks. One is computing all the dimension points (both bendline dimension points and flange dimension points). At this stage we compute all dimension points at which flange length could be drawn. Potentially this could be done only once and provided that the part does not change we can reuse this information later every time auto-dimensions have to be drawn. (However, the part usually does change - when the user rotates the part, then the viewer actually rotates the part, not the camera (which is usually done). So the 3D coordinates of the part change. However, we could base our calculations on Wflat of the part which is not affected by this kind of change, but fortunately computing all dimension points is pretty fast and it seems to be ok to recompute dimension points all the time. I just want to point out that we could, if needed, save some time by precomputing these dimension points once and then later reusing them).

Once we have computed all dimension points, we can draw dimensions. But first we have to figure out which of the dimension points are visible and which are not. When we have a wireframe picture, it is pretty easy. A dimension points is visible if it is in the view window. Checking this is very fast. If we have a solid (shaded) picture things are harder because flanges closer to the viewer usually block the view of some other flanges farther away, blocking some dimension points as well. So we need to do some kind of hidden line removal.

Once we have determined which dimension points are visible, it could be that a flange length can be drawn in a number of different ways, in which case we have to pick one, hopefully the best one. Note : to show flange length, we need a bendline dimension points and a flange dimension point. One heuristic is to pick bendline-flange-dimension points which are closest to the viewer and for which the side-ways distance is the smallest.

Once we have picked dimension points for all bendlines we can draw dimensions.

Main data structures of Auto-Dimension :

----------------------------------------
****************************************
----------------------------------------

There are three classes of objects used.

BM_AUTO_DIMENSION

APPENDIX F

```
-----------------

     is the top-level Auto-Dimension object and is usully part of
a BendCAD document along with a BM_PART.
     It contains a pointer to a BM_PART for which auto-dimensions
are being drawn, as well as document, view and device context
pointers. It also contains high-level information like the  view
window size, number of bendlines, a list of BM_AD_bendline objects,
etc.

     In the future (today is 04/03/96) it should store information
about the pen and brush properties, like line color, line width,
font size, etc.

     BM_AD_bendline
     --------------

     stores  all  auto-dimension  information  related  to  one
BM_BENDLINE.
     It has built-in two bendline dimension points with respect to
each of the adjacent flanges.
     It also has pointers to lists of flange dimension points with
respect to each of the adjacent flanges.

     BM_AD_dim_corner
     ----------------

     is a dimension point (either bendline or flange). Dimension
points can have either 1 or 3 BM_POINTs.
     One  important  member  of  a  dimension  points  is  opening
direction.  It  points  in  the  direction  in  which  the  acutual
dimension with respect to this dimension points has to be drawn.
Also, this is the direction from which this dimension point is
visible.
     Every dimension points also has a flag indicating whether it
is visible or not. If it is visible,
     it stores screen coodinates of all of its BM_POINTs.
*/

#ifndef BMAPI_AUTO_DIM_HXX_INCLUDED
#define BMAPI_AUTO_DIM_HXX_INCLUDED

// include some BMAPI include files

#include "POINT.HXX"
#include "VECTOR.HXX"
#include "LINE.HXX"
#include "PLANE.HXX"
#include "CYLINDER.HXX"
#include "2D_BODY.HXX"
```

APPENDIX F

```
#include "3D_BODY.HXX"
#include "BEND_OP.HXX"
#include "BENDLINE.HXX"
#include "PART.HXX"

// include header for mesh to determine clear regions for drawing
#ifndef __AD_MESH_H__
#include "AD_Mesh.h"
#endif

// some BendCAD classes

class CBendCADDoc ;
class CBendCADViewPart ;

// Auto-Dimension classes

class BM_AD_dim_corner ;
class BM_AD_bendline ;
class BM_AUTO_DIMENSION ;

/*
     **********   **********   **********   **********   **********
********** ********** ********** **********
     Auto-Dimension constants.
     **********   **********   **********   **********   **********
********** ********** ********** **********
*/

// dimension line length is 30 pixels
#define PIXELS_PER_DIMENSION_LINE       30.0
// arrow angle is 30 degrees
//#define ARROW_ANGLE                             0.524
// arrow length is 15 pixels
//#define PIXELS_PER_ARROW                      15.0

// this is the distance tolerance used in Auto-Dimension
#define AUTODIM_DISTANCE_TOLERANCE      0.001

/*
     **********   **********   **********   **********   **********
********** ********** ********** **********
     Objects of this type represent a dimension point in the part
for which a dimension could be drawn.
     **********   **********   **********   **********   **********
********** ********** ********** **********
*/

class BM_AD_dim_corner
{
```

APPENDIX F

```
     friend BM_AUTO_DIMENSION ;
     friend BM_AD_bendline ;

/*
     **********   **********   **********   **********   **********
********** ********** ********** **********
     All data members are private.
     **********   **********   **********   **********   **********
********** ********** ********** **********
*/

private :

     //  Auto-Dimension  BM_AD_bendline  object  that  owns  this
dimension point
     //
     BM_AD_bendline *bend ;

     // this is the 3D-body in the part that has to be visible
(actually some points on this
     // body have to be visible) in order for this dimension point
to be drawable.
     // note : this is used only when we are in solid mode.
     //
     // usually, for bend-dim points, this points to the bendline,
and for flange-dim points
     // points to the flange.
     // However, when this dimension point contains only one point
(point p), some special
     // considerations come into effect.
     //
     BM_3D_BODY *body_required_visible ;

     // this variable is used only when we are drawing in a solid
mode.
     // if TRUE, we will ignore this dimension point as if it was
not visible.
     //
     // in solid mode we will be using this heuristic in order to
save time.
     // when two bendlines are using equivalent flange-dimension
points for (potentially)
     //  displaying  flange-length,  we  will  only  compute  the
visibility information only
     // for the bendline (of these two bendlines) which has the
larger idx.
     //
     // this is initialized to FALSE, and set to TRUE only after
all other dim-point computations
     // have been done.
```

APPENDIX F

```
     //
     int ignore_in_solid_mode ;

     // Sometimes when the point in the part for which we want to
draw dimensions is a
     // bendline (either inside or outside) such that the radius
and thickness both are not 0,
     // we have to draw two short lines (as in the picture
following) that connect the
     // outsides of adjacent flanges. However, sometimes (when both
radius and thickness
     // are 0, or the point is just an outside edge of a face) we
need only one point.
     // To capture these two cases, we either compute three points
between which the
     // short line have to be drawn, or just one point (in which
case no short lines are needed).
     //
     //             ------------       p2
     //                |             \|/
     //             |   p ----------bbFFFFFFFFFFFF
     //             |      |     bbb  F
     //   two       |      |   bbb      F
     //    short ----->  |   b          F
     //   lines          | b          bbFFFFFFFFFFFF
     //                      |b           b
     //                      |b          b
     //                      b   b
     //                  b       b
     //                  p1 FFFFFFFF
     //                      F        F
     //                      F        F
     //                      F        F
     //                      F        F
     //                      F        F
     //
     // this is the number of points that we have computed here. it
is either 1 or 3.
     //
     int num_of_points ;
     //
     // p is always the centerpoint to which the dimension arrow
should be connected to
     // (actually it is what we call a 'dimension-line-extension').
     // if we have computed more than 1 point, p1 and p2 are the
side-points.
     //
     // IMPORTANT : p1 is on the plane of the adjacent body for
which the flange length is being drawn.
     //
```

APPENDIX F

```
     // Note : point p is always computed.
     //
     BM_POINT p, p1, p2 ;

     // this variable is used when this dimension point is a flange
dimension point, and
     // the edge in the flange, for which this flange dimension
points was computed,
     // is adjacent to a bendline. adj_bendline points to that
bendline.
     //
     // this is used to avoid drawing some flange-length twice. for
example, in this picture
     //
     //                                           B2-----------------
     //                                           |
     //                                           |  A
     //                                           |
     //                                           |
     //                ---------------B1
     //
     // we want to draw dimensions for face A in the middle only
once. That means that if
     // we draw flange length for bendline B1 with respect to A, we
should not draw it for
     // bendline B2 (with respect to A).
     //
     BM_BENDLINE *adj_bendline ;

     // this vector points to the direction in which the dimension
should be drawn for this dim-point.
     //
     // IMPORTANT : this vector should be normalized.
     //
     BM_VECTOR opening_direction ;
     //
     // if this is TRUE, we can reverse the opening_direction if we
need.
     // sometimes the dimension point correcponds to an extreme
point of an arc. in that case it does
     // not matter on which side we are drawing the dimension arc
(ie. we can reverse the opening direction).
     //
     int can_reverse_opening_dir ;
     //
     // these variable are used only when this dimension point is
actually drawn.
     // pos_len is the length of the dimension-line-extension drawn
in the direction of the opening vector.
     // neg_len is the length of the dimension-line-extension drawn
```

APPENDIX F

```
in the direction opposite to
     // the opening vector.
     //
     // they are initially set to 0 when the visibility of this
point is computed.
     //
     // the purpose is that we can use them to avoid redrawing the
same extension line, if several
     // other dimension points need it.
     //
     // Note : as of 04/02/96 these points are not used. KK.
     //
     double pos_len, neg_len ;

     // +1, this dimension point is visible and the dimension arc
can be drawn for this point.
     //  0, this dimension point is not visible.
     // -1, we don't know if this dimension points is visible.
     //
     // initially we set this to -1 and use it to compute the
visibility information on demand
     // (ie. only when we want to know if this points is visible.
sometimes we don't care).
     //
     int visible ;

     // these are the actual view window coordinates of all 3
points.
     //
     int screen_x, screen_x1, screen_x2 ;
     int screen_y, screen_y1, screen_y2 ;
     //
     // this is the z-buffer value of the point p when rendered.
     //
     double z_buf_value ;

     // this is used to construct lists of dim-points.
     //
     BM_AD_dim_corner *next ;

/*
     **********  **********  **********  **********  **********
********** ********** ********** **********
     Private member-functions. Used only by Auto-Dimension.
     **********  **********  **********  **********  **********
********** ********** ********** **********
*/
     // this function computes the visibility of this dimension
point.
     // it handles wireframe and solid modes separately.
```

APPENDIX F

```
     // this function checks strict visibility.
     //
     void compute_visibility(CBendCADViewPart *view) ;

     // this function will draw the dim-point in the given device context.
     // this is really just a debug function.
     //
     void draw_with_dim_line(CBendCADViewPart *view, CDC *dc, double object_space_per_pixel) ;

     // given a bendline dimension point and a list of flange dimension points, this function
     // returns TRUE iff there is a way to display the flange-length-dimension using these points
     // (ie. there is a pair of points that is visible) or FALSE if not.
     // If it returns TRUE, it also returns the best flange dimension point ; as well as
     // the distance between the bendline dimension point p and the best flange dimension point p,
     // with respect to the bendline dimension point.
     //
     // Note that the best distance returned could be negative since it is the k-factor with respect
     // to the bendline-dimension-opening-direction-vector.
     // Remember : bendline-dimension-opening-direction-vector should be normalized.
     //
     // this function checks strict visibility.
     //
     friend int compute_best_dim_pair(CBendCADViewPart *view, BM_AD_dim_corner *bend_dim_point,
          BM_AD_dim_corner *flange_dim_list, double object_space_per_pixel,
          // OUTPUT parameters
          double *best_distance /* distance of the best flange-dim points found */,
          BM_AD_dim_corner **best_flange_dim_point /* the best flange-dim points */) ;

     // this function draws one flange length dimension. the first argument is a bendline dimension point,
     // the second is a flange dimension point.
     // this function might allow cases where some dimension extension line is a little-bit
     // outside the view window.
     // however, endpoints of the dimension arrow have to be within the view window.
     //
```

APPENDIX F

```
	friend void draw_dim_point(BM_AD_dim_corner *bend_dim_point,
BM_AD_dim_corner *flange_dim_point,
		CBendCADViewPart  *view,  CDC  *dc,  double
object_space_per_pixel) ;

/*
	**********  **********  **********  **********  **********
********** ********** ********** **********
	Public member-functions.
	**********  **********  **********  **********  **********
********** ********** ********** **********
*/

public :

	BM_AD_dim_corner(void) ;

	// this constructor is for creating a dimension point that has
only one point (point p) in it.
	//
	BM_AD_dim_corner(BM_POINT const& p, BM_AD_bendline *bend,
BM_3D_BODY *body_required_visible,
		BM_VECTOR const& opening_direction, int reverse_bit,
		BM_AD_dim_corner **prev, BM_BENDLINE *adj_bendline) ;

	// this constructor is for creating a dimension point that has
3 points in it.
	//
	BM_AD_dim_corner(BM_POINT const& p, BM_POINT const& p1,
BM_POINT const& p2,
		BM_AD_bendline *bend, BM_3D_BODY *body_required_visible,
		BM_VECTOR const& opening_direction, int reverse_bit,
		BM_AD_dim_corner **prev, BM_BENDLINE *adj_bendline) ;

	// to assign one dimension point to another dimension point
	// it copies contents exactly. not sure if it is a very useful
function.
	//
	void operator=(BM_AD_dim_corner const &) ;

	// this function will return TRUE iff the given point is, for
the purpose of drawing dimensions,
	// the same as this point.
	// Two dimension points points are equivalent iff the point p
of one of them is on the
	// line defined by the line (point p, opening direction) of
the other dimension point,
	// and their opening directions match.
	//
	//  here we depend on the fact that opening vectors are
```

APPENDIX F

```
normalized.
     //
     // it returns 2 iff both points p match, otherwise 1.
     //
     int operator==(BM_AD_dim_corner const& another_dim_point) ;
} ;


/*
     **********  **********  **********  **********  **********
********** ********** ********** **********

     Objects of this class represent auto-dimensioning data
associated with one bendline.

     Basic AD operation with respect to a bendline is drawing
adjacent flange length.

     Technical notes :

     - the opening direction vectors of bendline dimension points
and flange dimension points are not
          correlated. That means that when drawing, you should
check for two point having the
          same opening direction.

     - algorithm : First we compute all bendline dimension points
for all bendlines. Then we compute
          all flange dimension points for all bendlines. The reason
is that when we compute flange
          dimension points, some edges in the flange and adjacent
to some other bendline.
          In order to create a flange dimension point, we need some
vectors about the other bendline
          (ie. bendlines should already be computed).
          If we compute all bendline dimensions first, we can take
these vectors from the bendline dimension
          points of some other BM_AD_bendline structure.

     **********  **********  **********  **********  **********
********** ********** ********** **********
*/

class BM_AD_bendline
{
     friend BM_AUTO_DIMENSION ;
     friend BM_AD_dim_corner ;

/*
     **********  **********  **********  **********  **********
```

APPENDIX F

```
********** ********** ********** **********
     All data members are private.
     **********  **********  **********  **********  **********
********** ********** ********** **********
*/

private :

/*
     **********  **********  **********  **********  **********
********** ********** ********** **********
     These data members are set by the constructor.
     **********  **********  **********  **********  **********
********** ********** ********** **********
*/
     // information stored in this BM_AD_bendline object refers to
this bendline.
     // ie. this dimension point is drawn to show the flange length
of this bendline.
     //
     BM_BENDLINE *bend ;

     // this object belongs to this Auto-Dimension object.
     //
     BM_AUTO_DIMENSION *parent ;

/*
     **********  **********  **********  **********  **********
********** ********** ********** **********
     These data members are computed when the bendline dimension
point data structures are
     computed - in BM_AD_bendline::compute_BM_AD_bendline(...).
     **********  **********  **********  **********  **********
********** ********** ********** **********
*/
     // if FALSE, this data for this object has not been yet
computed, or the computation failed.
     // this means that this object will always be ignored, no
matter what.
     //   this   can   be   set   to   TRUE   only   by
BM_AD_bendline::compute_BM_AD_bendline(...).
     //
     int data_valid ;

     // number of adjacent bodies for which we have to draw
dimensions. either 0, 1 or 2.
     //
     int num_of_adjacent_bodies ;

     // every bendline is adjacent to at most two bodies.
```

APPENDIX F

```
     // either of these can be NULL. you should always check for
that.
     //
     // adj_body1 is the adjacent body that has the smaller idx.
     // adj_body2 is the adjacent body that has the larger idx.
     //
     BM_3D_BODY *adj_body1 ;
     BM_3D_BODY *adj_body2 ;

     // this is the flange length with respect to each of the
adjacent bodies
     //
     double fl1 ;
     double fl2 ;

/*
     These parameters are computed some time during the process and
are needed later, so for
     performance reasons we store them so that we don't have to
recompute them later.

     Each of them is a vector pointing towards the adjacent body
(from the bendline) and is
     on a plane tangent to end end-point of the bend-arc touching
the adjacent body.
*/
     BM_VECTOR side_vector1 ;
     BM_VECTOR side_vector2 ;

/*
     These are some of the main data structures. For each adjacent
body, we have two points,
     one for each endpoint (ie. left and right) of the bendline.
     These points specify the points at which dimensions for flange
length can be drawn
     at the bendline (ie. on the side of the bendline).

     Remark : currently (04/02/96) we consider exactly two possible
points for drawing dimensions
     at every bendline. These two points are two extreme points of
the bendline in the direction of
     the bendline centerline.

     Note : these are called bendline dimension points of the
bendline.

     Note : these points are always computed, even if adj_body1 and
adj_body2 are NULL.
*/
     BM_AD_dim_corner bend_body1_point_left, bend_body1_point_right
```

APPENDIX F

```
;
	BM_AD_dim_corner bend_body2_point_left, bend_body2_point_right
;

	// these variables indicate whether the left(right) bendline dimension points
	// with respect to adj-body1 and adj-body2 are respectively equivalent.
	// these points should be computed right after bend_body1_point_left, bend_body1_point_right,
	// bend_body2_point_left, bend_body2_point_right are computed.
	//
	// if 0, they are not equivalent.
	// if 2, they are equivalent, and points p match.
	// if 1, they are equivalent, but points p don't match (ie. on the same line, but some distance apart).
	//
	// for us, equivalence value 2 is the only really useful one, because in that case we can
	// trust that when one is visible, the other is too, without checking. in that case they have the
	// same screen coordinates as well.
	//
	// note the same means not the same pointers, but the contents are equivalent.
	//
	int body12_left_the_same ;
	int body12_right_the_same ;

/*
	Here are two lists of dimension points. One with respect to adj-body1, the other with respect
	to adj-body2. Both lists contain points that are flange-length dimensions points.

	Note : these are called flange dimension points of the bendline.
*/
	BM_AD_dim_corner *body1_points ;
	BM_AD_dim_corner *body2_points ;

/*
	********** ********** ********** ********** ********** ********** ********** ********** **********
	These data members are used when dimensions are being drawn.
	********** ********** ********** ********** ********** ********** ********** ********** **********
*/
	// if this is TRUE, this bendline structure should be ignored for the purpose of drawing dimensions.
```

APPENDIX F

```
     // this is usually used when we have a simultaneous bendline.
in that case we have to draw
     // dimensions for only one of them, the rest should be
ignored.
     //
     int ignore ;

     // if TRUE, the adjacent body already has its flange length
drawn.
     //
     // if the value is 2, this bendline drew the flange dimension
with respect to the adj body.
     // if the value is 1, some other bendline drew the flange
dimension with respect to the adj body.
     //
     int body1_drawn ;
     int body2_drawn ;

     // when we draw flange length for adjacent bodies, we will
memorize the point at which the
     // dimensions were drawn.
     // actually the dimensions are always drawn between two points
- one at the bendline,
     // the other at the farthest point on the adjacent body (ie.
bendline dimension point and
     // flange dimension point).
     //
     // the reason we need to memorize these points is that
sometimes the flange-length-dimension
     // with respect to one bendline is also the flange-length
dimension with respect to the
     // other bendline. in that case we want to avoid drawing the
same thing twice.
     //
     // the first two points are bendline dimension points.
     // other two are flange dimension points.
     //
     // reason #2 : when we draw bendline dimensions with respect
to adj-body1 and adj-body2,
     // it depends whether the bend angle is acute or not. if the
bend angle is not more than
     // 90 degrees, then most likely we will be able to use the
same dimension-point at the bendline
     // to draw both flange length's. However, if the bend angle is
more than 90 degrees, we will
     // be using the tangent-dimension-point at the bendline and
these points are different for
     // each adjacent body. In general, we want to know, before we
draw a dimension-point at a
     // bendline, if we can use any of the dimension-points already
```

APPENDIX F

```
drawn at this bendline.
     //
     // note these points do not have to part of this AD_bendline
structure.
     //
     BM_AD_dim_corner *drawn_bend_dim_point1 ;
     BM_AD_dim_corner *drawn_bend_dim_point2 ;
     BM_AD_dim_corner *drawn_flange_dim_point1 ;
     BM_AD_dim_corner *drawn_flange_dim_point2 ;

/*
     **********   **********   **********   **********   **********
********** ********** ********** **********
     Private member-functions.
     **********   **********   **********   **********   **********
********** ********** ********** **********
*/
     // This function computes bendline dimension points of this
BM_AD_bendline structure.
     // Note that bend-dimension points will always be computed,
even if adj_body1 and adj_body2
     // are NULL.
     //
     int compute_BM_AD_bendline(void) ;

     // This function computes flange dimensions points of this
BM_AD_bendline structure
     // with respect to one adjacent body.
     //
     int compute_BM_AD_flange_points(BM_3D_BODY *adj_body) ;

     // This function computes the visibility of all bendline
dimension points of the bendline.
     // note the the visibility of bend-dimension points with
respect to adj-body1 is always
     // computed, even if adj_body1 pointer is NULL.
     // This is needed for drawing bendline info-boxes.
     //
     void compute_bendline_dim_points_visibility(void) ;

     // this function computes which dimension points are best to
draw flange length for this bendline.
     //
     // this function does it strictly for one bendline.
     //
     void compute_dim_points_to_display_indiv(
          BM_AD_bendline *best_AD_bendline[2] /* best AD_bendline
structure so far */,
          BM_AD_dim_corner  *bodies_bend_flange[6]  /*  0,1  is
bend-dim points; 3,4 is flange-dim points; 4,5 is flange lists */,
```

APPENDIX F

```
        double distance_and_z[4] /* 0,1 is distance; 3,4 is z-buf
*/) ;

     // this function does it for a given bendline, taking into
account simultaneous bendlines.
     // this function uses the previous function.
     //
     void compute_dim_points_to_display(void) ;

     // this function draws flange length dimensions for this
bendline.
     //    it    uses    the    information    computed    by
compute_dim_points_to_display() function.
     //
     void draw_dimension_points(void) ;

/*
     **********   **********   **********   **********   **********
********** ********** ********** **********
     Public member-functions.
     **********   **********   **********   **********   **********
********** ********** ********** **********
*/

public :

     // some trivial constructors, destructors.
     BM_AD_bendline(BM_AUTO_DIMENSION    *owner,    BM_BENDLINE
*bendline) ;
     ~BM_AD_bendline(void) ;
} ;


/*
     **********   **********   **********   **********   **********
********** ********** ********** **********
     This object can be used to create automatic dimensions for a
part.
     **********   **********   **********   **********   **********
********** ********** ********** **********
*/

class BM_AUTO_DIMENSION
{
     friend BM_AD_dim_corner ;
     friend BM_AD_bendline ;

/*
     **********   **********   **********   **********   **********
********** ********** ********** **********
```

APPENDIX F

```
     All data members are private.
     **********  **********  **********  **********  **********
********** ********** ********** **********
*/

private :

     // this is the document to which this auto-dim object is
attached to.
     // also, this is where we get the part.
     //
     CBendCADDoc *doc ;

     // view in which we draw the dimensions.
     // usually the view attached to the document.
     //
     CBendCADViewPart *view ;
     int view_size_x, view_size_y ;

     // device context in which we draw the dimensions.
     //
     CDC *dc ;

     // this is the part for which we will create dimensions.
     //
     BM_PART *part ;

     // is TRUE iff 3D view is being displayed, FALSE if flat.
     //
     int view_type ;

     // half of the metal thickness
     //
     double half_metal_thickness ;

     // if TRUE, we need to recompute auto dimension bendline and
point data structures
     //
     int dirty ;

     // number of bendlines in the part
     //
     int num_of_bendlines ;

     // this is an array of bendlines for which flange length has
to be drawn.
     //
     BM_AD_bendline **bends ;

     // this is the distance in object space that gets mapped into
```

APPENDIX F

```
one pixel on the screen.
     // we use it to draw lines of fixed pixel length (in that case
object-space length varies).
     //
     double object_space_per_pixel ;

     // if this variable is TRUE, it will set the flag which will
trigger
     // auto-dimensions to be drawn to FALSE in the view class,
once dimensions are drawn.
     // however, once it is done, this variable will be set to
FALSE automatically.
     //
     int reset_view_to_false_once_drawn ;

     // every time we construct new dim-point data structures, we
set this to FALSE.
     // when points which can be ignored in solid mode have been
computed, we set it to TRUE.
     //
     int points_to_ignore_in_solid_computed ;

     // pointer to mesh for determining clear areas of the screen
to draw dimension info
     //
     CAutoDimRgnMesh *pMesh;

     // region to keep track of dirty screen areas
     //
     CRgn* pDirtyRegion;

public:
     // Booleans for the show state of dimension info
     //
     BOOL m_bShowFlangeDim;
     BOOL m_bShowBendDim;
     BOOL m_bShowPartDim;

     // COLORREFs for drawing dimensions
     //
     COLORREF m_crFlange;
     COLORREF m_crBend;
     COLORREF m_crPart;

     // pointers to fonts
     //
     CFont* m_pFlangeFont;
     CFont* m_pBendFont;
     CFont* m_pPartFont;
```

APPENDIX F

```
    // line and arrow parameters
    //
    int m_nLineStyle;
    int m_nLineWeight;        // in pixels
    int m_nArrowStyle;
    int m_nArrowAngle;        // in degrees
    int m_nArrowLength;       // in pixels

/*
    **********  **********  **********  **********  **********
**********  **********  **********  **********
    Private member-functions.
    **********  **********  **********  **********  **********
**********  **********  **********  **********
*/

private :

    // This function is used to propagate the effects of drawing
a flange length for a given bendline,
    // to account for the fact that the flange dimension point is
adjacent to the given adj-body.
    // it returns TRUE iff the adj-bend will be marked as drawn as
well with respect to the given flange.
    //
    int compute_effects_flange_length_drawn(BM_BENDLINE *bendline,

        BM_3D_BODY *adj_body /* flange length with respect to
this body are being drawn */,
        BM_AD_dim_corner *bend_dim_point /* bend dim point for
bendline */,
        BM_AD_dim_corner *flange_dim_point /* flange dim points
for bendline */,
        BM_BENDLINE *adj_bend /* flange dim points is adjacent to
this bendline */) ;

    // this function returns a pointer to the BM_AD_bendline
structure that contains data
    // about the given bendline.
    //
    BM_AD_bendline *get_AD_bend_structure(BM_BENDLINE *bendline)
;

    // this function will return TRUE iff adj_bend has a
flange-dimension point with respect to the
    // given flange, that is adjacent to the given bendline.
    //
    // a handy function.
    //
    int  check_two_bendlines_adjacent_to_same_flange(BM_BENDLINE
```

APPENDIX F

```
*bendline,
          BM_3D_BODY *flange, BM_BENDLINE *adj_bend) ;

     // just a debug function
     //
     void test_draw(void) ;

     // Check if we can ignore some points in solid mode.
     //
     // in solid mode we will be using this heuristic in order to
save time.
     // when two bendlines are using equivalent flange-dimension
points for (potentially)
     //  displaying  flange-length,  we  will  only  compute  the
visibility information only
     // for the bendline (of these two bendlines) which has the
higher idx.
     //
     void compute_points_to_ignore_in_solid(void) ;

     // this function draws a box with bendline data for every
bendline.
     //
     void draw_bendline_data(CDC *pdc) ;

/*
     **********  **********  **********  **********  **********
********** ********** ********** **********
     Public member-functions.
     **********  **********  **********  **********  **********
********** ********** ********** **********
*/

public :

     BM_AUTO_DIMENSION(CBendCADDoc *BendCAD_doc) ;
     ~BM_AUTO_DIMENSION(void) ;

     // this function returns a (p->p2) vector for a given bendline
with respect to a given adj-body.
     //
     // It also computes a line between the p2 points of the bend
dimension points of the adjacent bendline
     // with respect to this flange.
     //
     BM_VECTOR  const&  compute_bend_direction_vector(BM_BENDLINE
*bendline, BM_3D_BODY *adj_body,
          BM_LINE *p2_line) ;

     // destroy the contents of this Auto-Dimensions object,
```

APPENDIX F

```
        //
        void delete_contents(void) ;

        // To set a new part. This updates the view class pointer as
well.
        //
        void set_part(BM_PART *new_part) ;

        // to force AD to recompute the dimension points.
        //
        inline void invalidate(void) { dirty = 1 ; }

        // get current view type when points were computed
        //
        inline int get_view_type(void) const { return view_type ; }

        // this function will build auto dimension bendline and point
data structures.
        //
        // This is the main function for computing dimension points.
        //
        int compute_auto_dimension_data(void) ;

        // draw flange dimension data
        //
        void    draw_dim_point(BM_AD_dim_corner    *bend_dim_point,
BM_AD_dim_corner *flange_dim_point,
              CBendCADViewPart     *view,     CDC     *dc,     double
object_space_per_pixel);

        // to draw part dimensions in this device context
        //
        int draw_auto_dimensions(CDC *target_dc) ;

        // Used with draw_auto_dimensions to construct a geometric pen
        //  with  user-defined  styles.  This  is  necessary  to  draw
patterned thick lines.
        //
        CPen* create_auto_dim_pen(CPen* pPen, int nLineStyle, int
nLineWeight, COLORREF cr) ;

        // this will enable us to draw part dimension only once
        //
        inline  void  disable_view_dimensions_flag_next_time(void)  {
reset_view_to_false_once_drawn = 1 ; }
} ;

#endif // BMAPI_AUTO_DIM_HXX_INCLUDED
```

APPENDIX G

```
///////////////////////////////////////////////////////////////
//                                                           //
//   Example of auto dimension drawing functions.  These     //
//   functions assume that the dimension points are          //
//   already computed.                                       //
//                                                           //
//                  Copyright 1996 AmadaSoft America, Inc.   //
//                                                           //
///////////////////////////////////////////////////////////////
/*
     Functions to compute dimension points are in AD_POINTS.CPP.

     First we need to detect which dimension points are visible,
which are not.

     Then we have to decide how to draw flange length dimensions.

*/

#include "stdafx.h"
#include "BendCAD.h"
#include "BendCADDoc.h"
#include "BendCADViewPart.h"
#include "BCAD_CTXT.HXX"
#include "AD_Arrow.h"

#include "AUTODIM.HXX"

/*
     **********  **********  **********  **********  **********
********** ********** ********** **********
     BM_AD_dim_corner class stuff.
     **********  **********  **********  **********  **********
********** ********** ********** **********
*/

/*
     This function computes the visibility of a dimension point.
*/

void BM_AD_dim_corner::compute_visibility(CBendCADViewPart *view)
{
     int i, j, k ;
     double z_buf ;

     // by default, the points is not visible
     visible = 0 ;
     if (num_of_points < 1) return ;

     // note : when in wireframe mode, we don't have to check if
```

APPENDIX G

```
points p1 and p2 actually
     // map into the same bendline/flange points. in solid mode we
need to check.
     // check if we have solid or wireframe mode.
     if (view->get_drawing_mode()) goto solid_picture ;

/*
     Wireframe, don't check if the 3D-body to which this dimension
points is actually in the foreground.
     In wireframe mode we assume that everything in the view window
is visible.
*/
     // get visibility data
     i = view->map_point_to_closest_edge(p, &screen_x, &screen_y,
&z_buf_value, NULL) ;
     if (! i) return ;
     if (num_of_points > 1) {
          i  =  view->map_point_to_closest_edge(p1,  &screen_x1,
&screen_y1, &z_buf, NULL) ;
          if (! i) return ;
          i  =  view->map_point_to_closest_edge(p2,  &screen_x2,
&screen_y2, &z_buf, NULL) ;
          if (! i) return ;
          }

     // process visibility data
     pos_len = neg_len = 0.0 ;
     visible = 1 ;
     return ;

/*
     Part shown in solid mode.
*/

solid_picture :

     // here we keep pointers to 3D-bodies that have to be visible.
     BM_3D_BODY *visible_bodies[4] ;
     visible_bodies[0] = body_required_visible ;
     if (body_required_visible->is(BM_ENTITY_TYPE_BENDLINE)) {
          visible_bodies[1]   =   (((BM_BENDLINE   *)
body_required_visible)->get_adj_list())->find_lowest_id_adj_body()
;
          visible_bodies[2]   =   (((BM_BENDLINE   *)
body_required_visible)->get_adj_list())->find_second_lowest_id_ad
j_body() ;
          visible_bodies[3] = NULL ;
          }
     else visible_bodies[1] = NULL ;
```

APPENDIX G

```
	// handle cases when there is just one point differently from
when there are 3 points.
	// if there is only 1 point, we have a complete paper-part -
thickness and radius both 0.
	// in that case there is really no bendline. we have to check
any of the adjacent bodies.
	if (num_of_points < 2) {
		// if this is a bend-dimension point, the
body_required_visible pointer should point to the
		// adjacent body with respect to this dimension point is
computed.
		i = view->is_3d_body_near_point(p, visible_bodies, &i,
&screen_x, &screen_y, &z_buf_value) ;
		if (! i) return ;
		}
	else {
/*
	SOLID HEURISTIC :

	this here is a new version of handling solid mode.
	first we check if all three points p, p1 and p2 are in the
view window.
	if true, we compute the centerpoint of the side profile of the
bend arc, and
	check if the bendline at this point is actually visible.
*/

		i = view->map_point_to_closest_edge(p, &screen_x,
&screen_y, &z_buf_value, NULL) ;
		if (! i) return ;

/*
	SOLID HEURISTIC :

	if the opening direction cannot be reversed, check if it is
not pointing away

		if (! can_reverse_opening_dir) {
			BM_POINT p_opening_direction(p + opening_direction)
;
			view->map_point_to_closest_edge(p_opening_direction,
&j, &k, &z_buf, NULL) ;
			if (z_buf > (z_buf_value + 0.001)) return ; // here
we use a special large tolerance
			// opening direction is pointing away
			}
*/

		// check if points p1 and p2 are in the view window as
well.
```

APPENDIX G

```
        i  =  view->map_point_to_closest_edge(p1,  &screen_x1,
&screen_y1, &z_buf, NULL) ;
        if (! i) return ;
        i  =  view->map_point_to_closest_edge(p2,  &screen_x2,
&screen_y2, &z_buf, NULL) ;
        if (! i) return ;

        BM_VECTOR v_pp1(p,p1) ;
        BM_VECTOR v_pp2(p,p2) ;
        BM_POINT p_center ;
        double angle_alpha = (v_pp1 ^ v_pp2)/2.0 ;
        if (angle_alpha < PI_over_2) {
            BM_VECTOR v_p1p2(0.5*(p2 - p1)) ;
            BM_POINT temp_p(p1 + v_p1p2) ;
            BM_VECTOR v_tip(p,temp_p) ;
            double z = (v_pp1.Len())/cos(angle_alpha) ;
            double y = z*sin(angle_alpha) ;
            v_tip.set_length((z   -   y)   +
(bend->parent)->half_metal_thickness) ;
            p_center = p + v_tip ;
            }
        else p_center = p ;

        i=view->is_3d_body_near_point(p_center,visible_bodies,
&i, &j, &k, &z_buf) ;
        if (! i) return ;

/*
  This the old version of handling solid mode. Here we check if the
point p is in the view window, and
  if points p1 and p2 have the underlying 3D-body visible.

        // if we have 3 points, the point p is not on any
3D-body. threfore we only check if it is
        // in the view window.
        view->is_3d_body_near_point(p,  NULL,  &i,  &screen_x,
&screen_y, &z_buf_value) ;
        if (! i) return ;

        // points p1 and p2 have to be on the 3D-body.
        i  =  view->is_3d_body_near_point(p1,  visible_bodies,
&visibility_count, &screen_x1, &screen_y1, &z_buf) ;
        if (! i) return ;
        i  =  view->is_3d_body_near_point(p2,  visible_bodies,
&visibility_count, &screen_x2, &screen_y2, &z_buf) ;
        if (! i) return ;
*/
        }

    // process visibility data
```

APPENDIX G

```
     pos_len = neg_len = 0.0 ;
     visible = 1 ;
}


/*
     this function will draw the dim-point in the given device
context.
     this is really just a debug function.
*/

void BM_AD_dim_corner::draw_with_dim_line(CBendCADViewPart *view,
CDC *dc, double object_space_per_pixel)
{
     int i, j ;
     double x ;
     static POINT points[3] ;
     BOOL res ;

     // if this point is not known to be visible, return.
     if (visible < 1) return ;
     if (num_of_points < 1) return ;

     points[1].x = screen_x ;
     points[1].y = screen_y ;

     // draw dimension line
     BM_POINT   p_dim_line(p   +   (PIXELS_PER_DIMENSION_LINE   *
object_space_per_pixel)*opening_direction) ;
     view->map_point_to_closest_edge(p_dim_line, &i, &j, &x, NULL)
;
     points[2].x = i ;
     points[2].y = j ;
     if (can_reverse_opening_dir) {
          p_dim_line   =   p   +   (-PIXELS_PER_DIMENSION_LINE   *
object_space_per_pixel)*opening_direction ;
          view->map_point_to_closest_edge(p_dim_line, &i, &j, &x,
NULL) ;
          points[1].x = i ;
          points[1].y = j ;
          res = dc->Polyline(points + 1, 2) ;
          points[1].x = screen_x ;
          points[1].y = screen_y ;
          }
     else res = dc->Polyline(points + 1, 2) ;

     if (num_of_points < 2) return ;

     points[0].x = screen_x1 ;
     points[0].y = screen_y1 ;
```

APPENDIX G

```
     points[2].x = screen_x2 ;
     points[2].y = screen_y2 ;

     res = dc->Polyline(points, 3) ;
}


/*
     This function draws one flange length dimension.
     The first argument is a bendline dimension point, the second
is a flange dimension point.
*/

void    BM_AUTO_DIMENSION::draw_dim_point(BM_AD_dim_corner
*bend_dim_point, BM_AD_dim_corner *flange_dim_point,
     CBendCADViewPart    *view,    CDC    *dc,    double
object_space_per_pixel)
{
     int i, j ;
     double x, y, z, dotp, half_dim_line ;
     BOOL res ;

     // points with screen coordinates. Windows type.
     static POINT points[3] ;

     //   these   variable   store   the   coordinates   of   the
dim-line-extension endpoints
     double bend_end_x, flange_end_x ;
     BM_POINT bend_end_p, flange_end_p ;
     BM_VECTOR end_v(bend_dim_point->opening_direction) ;

     // these variables store arrow head endpoints
     BM_POINT bend_arrow_p, flange_arrow_p ;

     // compute the dimension line extension
     BM_VECTOR v((flange_dim_point->p) - (bend_dim_point->p)) ;
     x = v % (bend_dim_point->opening_direction) ;
     if (fabs(x) > AUTODIM_DISTANCE_TOLERANCE) { // we have to
extend at least one dimension line
          half_dim_line    =    (PIXELS_PER_DIMENSION_LINE    *
object_space_per_pixel)/2.0 ;
          // here we will first compute extension lines, then the
arrow, and then the dimension points themselves
          if (x < 0.0) {
               // here we assume that for bendline, we cannot
reverse the opening direction.
               // it must be that the flange-dim points has a valid
opening direction in the same direction
               // as the bend-dim point.
               //
```

APPENDIX G

```
                // arrow point is to the right of the bend-dim
point.
                bend_arrow_p    =    (bend_dim_point->p)    +
half_dim_line*end_v ;
                if (! view->map_point_to_closest_edge(bend_arrow_p,
&i, &j, &y, NULL)) return ;
                points[0].x = i ;
                points[0].y = j ;
                flange_arrow_p  =  (flange_dim_point->p)  +  (-x  +
half_dim_line)*end_v ;
                i              f    (                            !
view->map_point_to_closest_edge(flange_arrow_p, &i, &j, &y, NULL))
return ;
                points[1].x = i ;
                points[1].y = j ;

                half_dim_line *= 2.0 ;
                bend_end_x = half_dim_line ;
                flange_end_x = -x + half_dim_line ;
                bend_end_p = bend_dim_point->p + bend_end_x*end_v ;
                flange_end_p    =    flange_dim_point->p    +
flange_end_x*end_v ;
                }
           else {
                // here we assume that for bendline, we cannot
reverse the opening direction.
                dotp   =   (bend_dim_point->opening_direction)   %
(flange_dim_point->opening_direction) ;
                // first lets try if we can reverse the flange-dim
point opening direction
                i f     ( d o t p    <     0 . 0     | |
flange_dim_point->can_reverse_opening_dir) {
                     // try to draw the arrow in the middle
                     //
                     // arrow point is midway between flange- and
bend-dim points.
                     z = x/2.0 ;
                     bend_arrow_p = (bend_dim_point->p) + z*end_v ;
                     i                 f    (                   !
view->map_point_to_closest_edge(bend_arrow_p,  &i,  &j,  &y,  NULL))
goto try_other_direction ;
                     points[0].x = i ;
                     points[0].y = j ;
                     flange_arrow_p   =   (flange_dim_point->p)   +
(-z)*end_v ;
                     i                 f    (                   !
view->map_point_to_closest_edge(flange_arrow_p, &i, &j, &y, NULL))
goto try_other_direction ;
                     points[1].x = i ;
                     points[1].y = j ;
```

APPENDIX G

```
                    bend_end_x = z + half_dim_line ;
                    flange_end_x = -x - half_dim_line ;
                    bend_end_p    =    bend_dim_point->p    +
bend_end_x*end_v ;
                    flange_end_p    =    flange_dim_point->p    +
flange_end_x*end_v ;

                    goto begin_to_draw ;
                    }

try_other_direction :
               i f    ( d o t p    >    0 . 0    | |
flange_dim_point->can_reverse_opening_dir) {
                    // arrow point is to the right of the
flange-dim point.
                    bend_arrow_p = (bend_dim_point->p) + (x +
half_dim_line)*end_v ;
                    i            f    (            !
view->map_point_to_closest_edge(bend_arrow_p, &i, &j, &y, NULL))
return ;
                    points[0].x = i ;
                    points[0].y = j ;
                    flange_arrow_p  =  (flange_dim_point->p)  +
half_dim_line*end_v ;
                    i            f    (            !
view->map_point_to_closest_edge(flange_arrow_p, &i, &j, &y, NULL))
return ;
                    points[1].x = i ;
                    points[1].y = j ;

                    half_dim_line *= 2.0 ;
                    bend_end_x = x + half_dim_line ;
                    flange_end_x = half_dim_line ;
                    bend_end_p    =    bend_dim_point->p    +
bend_end_x*end_v ;
                    flange_end_p    =    flange_dim_point->p    +
flange_end_x*end_v ;
                    }
               else return ; // failure, cannot draw because
opening direction don't match or not visible.
               }
          }
     else { // no need to extend dimension lines
          // check the direction of opening vector
          if (end_v % (flange_dim_point->opening_direction) < 0.0)
{
               if  (!  flange_dim_point->can_reverse_opening_dir)
end_v.reverse() ;
               }
          bend_end_x = flange_end_x = (PIXELS_PER_DIMENSION_LINE *
```

APPENDIX G

```
object_space_per_pixel) ;
          bend_end_p = bend_dim_point->p + bend_end_x*end_v ;
          flange_end_p = flange_dim_point->p + flange_end_x*end_v
;
          bend_arrow_p = bend_dim_point->p + (bend_end_x/2.0)*end_v
;
          flange_arrow_p    =    flange_dim_point->p    +
(flange_end_x/2.0)*end_v ;

          // compute arrow endpoints
          if (! view->map_point_to_closest_edge(bend_arrow_p, &i,
&j, &y, NULL)) return ;
          points[0].x = i ;
          points[0].y = j ;
          if (! view->map_point_to_closest_edge(flange_arrow_p, &i,
&j, &y, NULL)) return ;
          points[1].x = i ;
          points[1].y = j ;
          }

begin_to_draw :

/*
     Draw arrow.
*/
     // draw arrow line. points[0] is the bend-dim-points side of
the arrow.
     res = dc->Polyline(points, 2) ;

     // draw arrows
     BM_VECTOR v_arrow(flange_arrow_p - bend_arrow_p) ;
     x = v_arrow.Len() ; // this is the real flange length

     // change to solid pen for arrow heads
     CPen*   pArrowPen   =   new   CPen(PS_SOLID,
BCAD_context.m_nFlangeLineWeight, BCAD_context.m_crFlange);
     CPen* pOldPen = dc->SelectObject(pArrowPen);

     // compute arrow head at bend side
     CAutoDimArrow arrowBend(
          CPoint(points[0].x,points[0].y),
          CPoint(points[1].x,points[1].y),
          BCAD_context.m_nArrowAngle,
          BCAD_context.m_nArrowLength
     );

     arrowBend.DrawHead(dc);

     // compute arrow head at flange side
     CAutoDimArrow arrowFlange(
```

APPENDIX G

```
          CPoint(points[1].x,points[1].y),
          CPoint(points[0].x,points[0].y),
          BCAD_context.m_nArrowAngle,
          BCAD_context.m_nArrowLength
     );

     arrowFlange.DrawHead(dc);

     dc->SelectObject(pOldPen);
     delete pArrowPen;

     // write flange length on the screen
     int center_x = (points[0].x + points[1].x) >> 1 ;
     int center_y = (points[0].y + points[1].y) >> 1 ;
     int font_height = 21 ;
     double dx = (double) (points[1].x - points[0].x) ;
     double dy = (double) (points[1].y - points[0].y) ;
     if (fabs(dx) > AUTODIM_DISTANCE_TOLERANCE) {
          if (dy/dx > 0.0) center_y -= font_height ;
          }
     center_x += 3 ; // move the beginning to the right so that it
won't overlap the arrow line.
     CString str;
     str.Format("%6.4f",x);
     CSize sizeTextExtent = dc->GetTextExtent(str);

     if (pDirtyRegion != NULL)
     {
          CPoint pntText(center_x, center_y);
          CRect rectText(pntText, sizeTextExtent);

          if (!pDirtyRegion->RectInRegion(&rectText))
               dc->TextOut(center_x, center_y, str);

          CRgn rgn;
          rgn.CreateRectRgn(center_x,   center_y,   center_x   +
sizeTextExtent.cx, center_y + sizeTextExtent.cy);
          pDirtyRegion->CombineRgn(pDirtyRegion, &rgn, RGN_OR);
     }
     else
     {
          pDirtyRegion = new CRgn();
          pDirtyRegion->CreateRectRgn(center_x, center_y, center_x
+ sizeTextExtent.cx, center_y + sizeTextExtent.cy);
          dc->TextOut(center_x, center_y, str);
     }

/*
     if necessary draw p1,p2 for bend-dim-points
*/
```

APPENDIX G

```
     points[1].x = bend_dim_point->screen_x ;
     points[1].y = bend_dim_point->screen_y ;
     if (bend_dim_point->num_of_points > 1) {
          points[0].x = bend_dim_point->screen_x1 ;
          points[0].y = bend_dim_point->screen_y1 ;
          points[2].x = bend_dim_point->screen_x2 ;
          points[2].y = bend_dim_point->screen_y2 ;
          res = dc->Polyline(points, 3) ;
          }
     // draw dimension line extension
     view->map_point_to_closest_edge(bend_end_p, &i, &j, &x, NULL)
;
     points[2].x = i ;
     points[2].y = j ;
     res = dc->Polyline(points + 1, 2) ;

/*
     if necessary draw p1,p2 for flange-dim-points
*/
     points[1].x = flange_dim_point->screen_x ;
     points[1].y = flange_dim_point->screen_y ;
     if (flange_dim_point->num_of_points > 1) {
          points[0].x = flange_dim_point->screen_x1 ;
          points[0].y = flange_dim_point->screen_y1 ;
          points[2].x = flange_dim_point->screen_x2 ;
          points[2].y = flange_dim_point->screen_y2 ;
          res = dc->Polyline(points, 3) ;
          }
     // draw dimension line extension
     view->map_point_to_closest_edge(flange_end_p,  &i,  &j,  &x,
NULL) ;
     points[2].x = i ;
     points[2].y = j ;
     res = dc->Polyline(points + 1, 2) ;
}


/*
     given a bendline dimension point and a list of flange
dimension points, this function
     returns TRUE iff there is a way to display
flange-length-dimension using these points
     (ie. everything is visible) or FALSE if not.
     If it returns TRUE, it also returns the best flange dimension
point ; as well as
     the distance between the bendline dimension point p and the
best flange dimension point p,
     with respect to the bendline dimension point.

     Note that the best distance returned could be negative since
```

APPENDIX G

```
it is the k-factor with respect
     to the bendline-dimension-opening-direction-vector.
     Remember : bendline-dimension-opening-direction-vector should
be normalized.

     Note : right now this function assumes that the
dimension-extension-lines are drawn in the
     following way : one dimension-extension-line is unit-length,
and the other is as long as necessary
     to reach the first one. Ie. this function draws the dimension
arrow rigth next to one of the
     dimension points. Ie. it does not try to draw the dimension
arrow at some point in the
     middle of the line between the two dimension points.

     Note : in this function we will not directly check if dim
points are visible (we will call another
     function to do that). we will check that some
dimension-extension-lines be within the viewing window.

     Note : in this function we check points where dimension arrows
would go. We require that they
     be strictly within the viewing area.

     Note : in this function we really use approximated locations.
ie. as a heuristic.
*/

int compute_best_dim_pair(CBendCADViewPart *view, BM_AD_dim_corner
*bend_dim_point,
     BM_AD_dim_corner *flange_dim_list, double
object_space_per_pixel,
     // OUTPUT parameters
     double *best_distance /* distance of the best flange-dim
points found */,
     BM_AD_dim_corner **best_flange_dim_point /* the best
flange-dim points */)
{
     BM_VECTOR v ;
     BM_POINT dim_arrow_point ;
     int i, j, k ;
     double x, y, dotp ;

     // if the bendline dimension point is not known to be visible,
return FALSE.
     // otherwise we might be wasting our time.
     if (bend_dim_point->visible < 1) return 0 ;

     // scan the list of flange dimension points
     BM_AD_dim_corner *temp_point, *best_fdp = NULL ;
```

APPENDIX G

```
     double best_distance_so_far ;
     for (temp_point = flange_dim_list ; temp_point ; temp_point =
temp_point->next) {
          if (! temp_point->visible) continue ;

/*
     SOLID HEURISTIC :

     in solid mode we will be using this heuristic in order to save
time.
     when two bendlines are using equivalent flange-dimension
points for (potentially)
     displaying flange-length, we will only compute the visibility
information only
     for the bendline (of these two bendlines) which has the higher
idx.
*/
          if (view->get_drawing_mode() &&
temp_point->ignore_in_solid_mode) continue ;

          // compute a vector from bend-dim-p to flange-dim-p
          v = (temp_point->p) - (bend_dim_point->p) ;
          x = v % (bend_dim_point->opening_direction) ;
          // check that opening directions are valid.
          // idea : if both vectors points in opposite directions
are we cannot reverse them,
          // we cannot use these two dimension points to draw
dimensions.
          dotp = (bend_dim_point->opening_direction) %
(temp_point->opening_direction) ;
          if (dotp < 0.0 && ! temp_point->can_reverse_opening_dir
&& ! bend_dim_point->can_reverse_opening_dir) continue ;

          // check that the point where the dimension arrow would
go is in the view area
          // note : we will use
half-of-the-minimal-extension-length as the unit separating
          // zero and non-zero length extension lines.
          if (fabs(x) > AUTODIM_DISTANCE_TOLERANCE) {
               k = 0 ; // if k is TRUE at the end, we can draw the
dimension arrow point
               if (x < 0.0) {
                    // note : add space for a line segment where we
will draw the arrow
                    //
                    // check if the directions agree.
                    // we check this first, because it would give
us a smaller distance.
                    if (dotp > 0.0) {
                         dim_arrow_point = (temp_point->p) +
```

APPENDIX G

```
(-x)*(bend_dim_point->opening_direction) ;
                                  i                          f
(view->map_point_to_closest_edge(dim_arrow_point,  &i,  &j,  &y,
NULL)) k = 1 ;
                                  }
                              //  check  that  the  extension  of  the
bend-dim-line is visible.
                              // in that case the opening direction of the
flange-dime-line does not matter.
                              i   f          (   !   k          &   &
bend_dim_point->can_reverse_opening_dir) {
                                  dim_arrow_point = (bend_dim_point->p) +
(x)*(bend_dim_point->opening_direction) ;
                                  i                          f
(view->map_point_to_closest_edge(dim_arrow_point,  &i,  &j,  &y,
NULL)) k = 1 ;
                                  }
                              }
                          else { // x > 0.0
                              // note : add space for a line segment where we
will draw the arrow.
                              //
                              // check if the extension line is visible.
                              // we check this first, because it would give
us a smaller distance.
                              i f    ( d o t p    <    0 . 0    | |
temp_point->can_reverse_opening_dir) {
                                  dim_arrow_point  =  (temp_point->p)  +
(-x)*(bend_dim_point->opening_direction) ;
                                  i                          f
(view->map_point_to_closest_edge(dim_arrow_point,  &i,  &j,  &y,
NULL)) k = 1 ;
                                  }
                              // otherwise check if the directions agree.
                              if (!k) {
                                  dim_arrow_point = (bend_dim_point->p) +
(x)*(bend_dim_point->opening_direction) ;
                                  i                          f
(view->map_point_to_closest_edge(dim_arrow_point,  &i,  &j,  &y,
NULL)) k = 1 ;
                                  }
                              }

                          if (!k) continue ; // cannot draw the dimension
arrow point
                          }

                  // check if visibility information is already computed.
                  // if not, compute it. if flange dimension points not
visible, continue.
```

APPENDIX G

```
          if (temp_point->visible < 0) {
               temp_point->compute_visibility(view) ;
               if (! temp_point->visible) continue ;
               }

          // check if this new distance is the best distance
          if (best_fdp) {
               if (fabs(best_distance_so_far) > fabs(x)) {
                    best_fdp = temp_point ;
                    best_distance_so_far = x ;
                    }
               }
          else {
               best_fdp = temp_point ;
               best_distance_so_far = x ;
               }

          // check if we are done.
          // if we have a point with a distance 0, we are done
since we cannot find a better point.
          if    (best_fdp    &&    fabs(best_distance_so_far)    <=
AUTODIM_DISTANCE_TOLERANCE) break ;
          }

     if (best_fdp) {
          *best_distance = best_distance_so_far ;
          *best_flange_dim_point = best_fdp ;
          return 1 ;
          }

     return 0 ;
}


/*
     **********   **********   **********   **********   **********
********** ********** ********** **********
     BM_AD_bendline class stuff.
     **********   **********   **********   **********   **********
********** ********** ********** **********
*/

/*
     This  function  computes  the  visibility  of  all  bendline
dimension points of the bendline.

     Note : in order to save some time, we will check if body1,2
left(right) points are equivalent.
*/
```

APPENDIX G

```
void BM_AD_bendline::compute_bendline_dim_points_visibility(void)
{
     CBendCADViewPart *view = parent->view ;

     // here we always compute the visibility of adj-body1
bend-dimension points,
     // even though we don't check if adj_body1 pointer is NULL or
not,
     // because we might want to know the visibility even if they
don't exist.
     //
     // in practice this should not be a problem because almost
always there are two
     // adjacent bodies.
     //
     bend_body1_point_left.compute_visibility(view) ;
     bend_body1_point_right.compute_visibility(view) ;

     if (adj_body2) {
          if (2 == body12_left_the_same) {
               if   (bend_body2_point_left.visible   =
bend_body1_point_left.visible) {
                    // note we are switching points
                    bend_body2_point_left.screen_x   =
bend_body1_point_left.screen_x ;
                    bend_body2_point_left.screen_y   =
bend_body1_point_left.screen_y ;
                    bend_body2_point_left.screen_x1   =
bend_body1_point_left.screen_x2 ;
                    bend_body2_point_left.screen_y1   =
bend_body1_point_left.screen_y2 ;
                    bend_body2_point_left.screen_x2   =
bend_body1_point_left.screen_x1 ;
                    bend_body2_point_left.screen_y2   =
bend_body1_point_left.screen_y1 ;
                    bend_body2_point_left.z_buf_value   =
bend_body1_point_left.z_buf_value ;
                    }
               }
          else bend_body2_point_left.compute_visibility(view) ;

          if (2 == body12_right_the_same) {
               if   (bend_body2_point_right.visible   =
bend_body1_point_right.visible) {
                    // note we are switching points
                    bend_body2_point_right.screen_x   =
bend_body1_point_right.screen_x ;
                    bend_body2_point_right.screen_y   =
bend_body1_point_right.screen_y ;
                    bend_body2_point_right.screen_x1   =
```

APPENDIX G

```
bend_body1_point_right.screen_x2 ;
                        bend_body2_point_right.screen_y1    =
bend_body1_point_right.screen_y2 ;
                        bend_body2_point_right.screen_x2    =
bend_body1_point_right.screen_x1 ;
                        bend_body2_point_right.screen_y2    =
bend_body1_point_right.screen_y1 ;
                        bend_body2_point_right.z_buf_value   =
bend_body1_point_right.z_buf_value ;
                        }
                  }
            else bend_body2_point_right.compute_visibility(view) ;
            }
      // else adj_body2 is NULL and there is nothing to compute
}


/*
      This function tries to find the best way for drawing flange
length for one bendline.
      This function does it strictly for one bendline.
      Important : it only determines which way would be the best
way, but it does not
      decide if AD will really do it that way. Now will it do any
updating other data structures.
      In short, it does not change any of the AD data structures.

      Note : no checks in the beginning.

      Idea : in this function we use a heuristic to assign values
for different bend-flange-dim points
      combinations. Eventually we choose the best combination.
      The heuristic we use is a combination of the distance between
the bend and flange dim points, plus
      the distance of the bend-dim point from the view screen.

      A practical trick : first we check if the best known distance
values is already 0. If yes,
      we will try to find a best match for another bend-dim points
only if this new bend-dim points
      has a better z-buf value.
      Note : after testing 4 parts, I found that this gives just a
very slight improvement. may-be 5-10%. KK.
*/

void BM_AD_bendline::compute_dim_points_to_display_indiv(
      BM_AD_bendline   *best_AD_bendline[2]   /*  best   AD_bendline
structure so far */,
      BM_AD_dim_corner *bodies_bend_flange[6] /* 0,1 is bend-dim
points; 3,4 is flange-dim points; 4,5 is flange lists */,
```

APPENDIX G

```
	double distance_and_z[4] /* 0,1 is distance; 3,4 is z-buf */)
{
	BM_AD_dim_corner *best_fdp ;
	double best_distance ;

	// check adjacent body1
	if (adj_body1 && ! (body1_drawn)) {
		// check if we already have a distance 0 bend-flange-dim
points. if yes, go in only if the
		// new bend-dim points has a strictly better z-buf value.
		if ((NULL == best_AD_bendline[0]) || distance_and_z[2] >
(bend_body1_point_left.z_buf_value+AUTODIM_DISTANCE_TOLERANCE) ||
distance_and_z[0] > AUTODIM_DISTANCE_TOLERANCE) {
			if  (compute_best_dim_pair(parent->view,
&bend_body1_point_left, body1_points,
				parent->object_space_per_pixel, &best_distance,
&best_fdp)) {
				best_distance = fabs(best_distance) ;
				// check if the new point is better
				if (best_AD_bendline[0]) {
					// heuristic : if the sum of the z-buf
value and distance is smaller
					if  ((best_distance  +
bend_body1_point_left.z_buf_value)  <  (distance_and_z[0]  +
distance_and_z[2])) {
						best_AD_bendline[0] = this ;
						bodies_bend_flange[0]  =
&bend_body1_point_left ;
						bodies_bend_flange[2] = best_fdp ;
						bodies_bend_flange[4] = body1_points
;
						distance_and_z[0] = best_distance ;
						distance_and_z[2]  =
bend_body1_point_left.z_buf_value ;
					}
				}
				else {
					best_AD_bendline[0] = this ;
					bodies_bend_flange[0]  =
&bend_body1_point_left ;
					bodies_bend_flange[2] = best_fdp ;
					bodies_bend_flange[4] = body1_points ;
					distance_and_z[0] = best_distance ;
					distance_and_z[2]  =
bend_body1_point_left.z_buf_value ;
				}
			}
		}

		// check if we already have a distance 0 bend-flange-dim
```

APPENDIX G

```
points. if yes, go in only if the
          // new bend-dim points has a strictly better z-buf value.
          if (distance_and_z[2] >
(bend_body1_point_right.z_buf_value + AUTODIM_DISTANCE_TOLERANCE)
|| (NULL == best_AD_bendline[0]) || distance_and_z[0] >
AUTODIM_DISTANCE_TOLERANCE) {
               if (compute_best_dim_pair(parent->view,
&bend_body1_point_right, body1_points,
                    parent->object_space_per_pixel, &best_distance,
&best_fdp)) {
                    best_distance = fabs(best_distance) ;
                    // check if the new point is better
                    if (best_AD_bendline[0]) {
                         // heuristic : if the sum of the z-buf
value and distance is smaller
                         if ((best_distance +
bend_body1_point_right.z_buf_value) < (distance_and_z[0] +
distance_and_z[2])) {
                              best_AD_bendline[0] = this ;
                              bodies_bend_flange[0] =
&bend_body1_point_right ;
                              bodies_bend_flange[2] = best_fdp ;
                              bodies_bend_flange[4] = body1_points
;
                              distance_and_z[0] = best_distance ;
                              distance_and_z[2] =
bend_body1_point_right.z_buf_value ;
                              }
                         }
                    else {
                         best_AD_bendline[0] = this ;
                         bodies_bend_flange[0] =
&bend_body1_point_right ;
                         bodies_bend_flange[2] = best_fdp ;
                         bodies_bend_flange[4] = body1_points ;
                         distance_and_z[0] = best_distance ;
                         distance_and_z[2] =
bend_body1_point_right.z_buf_value ;
                         }
                    }
               }
          }

     // check adjacent body2
     if (adj_body2 && ! (body2_drawn)) {
          // check if we already have a distance 0 bend-flange-dim
points. if yes, go in only if the
          // new bend-dim points has a strictly better z-buf value.
          if ((NULL == best_AD_bendline[1]) || distance_and_z[3] >
(bend_body2_point_left.z_buf_value + AUTODIM_DISTANCE_TOLERANCE) ||
```

APPENDIX G

```
distance_and_z[1] > AUTODIM_DISTANCE_TOLERANCE) {
            if   (compute_best_dim_pair(parent->view,
&bend_body2_point_left, body2_points,
                parent->object_space_per_pixel, &best_distance,
&best_fdp)) {
                best_distance = fabs(best_distance) ;
                // check if the new point is better
                if (best_AD_bendline[1]) {
                    // heuristic : if the sum of the z-buf
value and distance is smaller
                    if   ((best_distance          +
bend_body2_point_left.z_buf_value)   <   (distance_and_z[1]   +
distance_and_z[3])) {
                        best_AD_bendline[1] = this ;
                        bodies_bend_flange[1]      =
&bend_body2_point_left ;
                        bodies_bend_flange[3] = best_fdp ;
                        bodies_bend_flange[5] = body2_points
;
                        distance_and_z[1] = best_distance ;
                        distance_and_z[3]       =
bend_body2_point_left.z_buf_value ;
                        }
                    }
                else {
                    best_AD_bendline[1] = this ;
                    bodies_bend_flange[1]       =
&bend_body2_point_left ;
                    bodies_bend_flange[3] = best_fdp ;
                    bodies_bend_flange[5] = body2_points ;
                    distance_and_z[1] = best_distance ;
                    distance_and_z[3]       =
bend_body2_point_left.z_buf_value ;
                    }
                }
            }

        // check if we already have a distance 0 bend-flange-dim
points. if yes, go in only if the
        // new bend-dim points has a strictly better z-buf value.
        if   (distance_and_z[3]       >
(bend_body2_point_right.z_buf_value + AUTODIM_DISTANCE_TOLERANCE)
||   (NULL   ==   best_AD_bendline[1])   ||   distance_and_z[1]   >
AUTODIM_DISTANCE_TOLERANCE) {
            if   (compute_best_dim_pair(parent->view,
&bend_body2_point_right, body2_points,
                parent->object_space_per_pixel, &best_distance,
&best_fdp)) {
                best_distance = fabs(best_distance) ;
                // check if the new point is better
```

APPENDIX G

```
                    if (best_AD_bendline[1]) {
                         // heuristic : if the sum of the z-buf
value and distance is smaller
                         if ((best_distance +
bend_body2_point_right.z_buf_value) < (distance_and_z[1] +
distance_and_z[3])) {
                              best_AD_bendline[1] = this ;
                              bodies_bend_flange[1] =
&bend_body2_point_right ;
                              bodies_bend_flange[3] = best_fdp ;
                              bodies_bend_flange[5] = body2_points
;
                              distance_and_z[1] = best_distance ;
                              distance_and_z[3] =
bend_body2_point_right.z_buf_value ;
                              }
                         }
                    else {
                         best_AD_bendline[1] = this ;
                         bodies_bend_flange[1] =
&bend_body2_point_right ;
                         bodies_bend_flange[3] = best_fdp ;
                         bodies_bend_flange[5] = body2_points ;
                         distance_and_z[1] = best_distance ;
                         distance_and_z[3] =
bend_body2_point_right.z_buf_value ;
                         }
                    }
               }
          }
}


/*
     This function determines how to draw flange length for a
bendline.
     It is different from the previous function in that using the
previous function as a subroutine,
     it decides how to draw flange length dimensions for a
bendline, as well as updates all
     data structures accordingly.

     Also, it takes into account simultaneous bendlines.
*/

void BM_AD_bendline::compute_dim_points_to_display(void)
{
     // qualification check
     if (NULL == bend) return ;
```

APPENDIX G

```
     BM_AD_bendline *bl ;
     long i ;

     // these variable store the bendline dimension data that will
be used later to draw
     // 0,1 is with respect to adj-body1; 2,3 is with respect to
adj-body2
     BM_AD_dim_corner  *bodies_bend_flange_list[6]  ;  //  0,1  is
bend-dim points; 2,3 is flange-dim points; 4,5 is flange lists
     double distance_and_z[4] ; // 0,1 is distance; 2,3 is z-buf
     // this is the bendline for which we will be drawing the
dimensions.
     // this is trivial when there is no simultaneous bendlines.
     BM_AD_bendline *best_AD_bendline[2] = { NULL, NULL } ;

/*
     Compute the best way for drawing flange length. Take
simultaneous bendlines into account.
*/
     // these variables are for handling simultaneous bendline
property things.
     BM_BEND_PROPERTY *prop ;
     BM_LINKED_LIST_NODE *prop_list ;
     DBM_ARRAY *bendlines ;
     BM_BENDLINE *bnd ;
     long size, this_bend_seen = 0 ;
     for  (prop_list  =  bend->get_properties()  ;  prop_list  ;
prop_list = prop_list->next()) {
          prop = (BM_BEND_PROPERTY *) prop_list->get_obj() ;
          if (prop->is(BM_TYPE_BEND_SIMULTANEOUS)) {
               bendlines = (DBM_ARRAY *) prop->get_bendlines() ;
               size = bendlines->get_size() ;
               for (i = 0 ; i < size ; i++) {
                    // get a bendline in the bend property object
                    if   (NULL   ==   (bnd   =   (BM_BENDLINE   *)
bendlines->get(i))) continue ;
                    bl = parent->get_AD_bend_structure(bnd) ;
                    if (NULL == bl) continue ;
                    if (bl == this) this_bend_seen = 1 ;
                    if (! bl->data_valid || bl->ignore) continue ;
                    // compute how to draw flange length dimensions
for this one bendline.

bl->compute_dim_points_to_display_indiv(best_AD_bendline,
bodies_bend_flange_list, distance_and_z) ;
                    }
               }
          }
     if (! this_bend_seen) { // make sure this bendline gets
processed
```

APPENDIX G

```
          bl = parent->get_AD_bend_structure(bend) ;
          if (bl && bl->data_valid && ! bl->ignore) {
bl->compute_dim_points_to_display_indiv(best_AD_bendline,
bodies_bend_flange_list, distance_and_z) ;
               }
          }

/*
     Mark all other bendlines in the simultaneous bend as "ignore".
*/
     for  (prop_list  =  bend->get_properties()  ;  prop_list  ;
prop_list = prop_list->next()) {
          prop = (BM_BEND_PROPERTY *) prop_list->get_obj() ;
          if (prop->is(BM_TYPE_BEND_SIMULTANEOUS)) {
               bendlines = (DBM_ARRAY *) prop->get_bendlines() ;
               size = bendlines->get_size() ;
               for (i = 0 ; i < size ; i++) {
                    // get next bendline in the bend property
object
                    if   (NULL   ==   (bnd   =   (BM_BENDLINE   *)
bendlines->get(i))) continue ;
                    bl = parent->get_AD_bend_structure(bnd) ;
                    if (NULL == bl) continue ;

                    // mark as ignore
                    if (bl->adj_body1 && ! (bl->body1_drawn) && bl
!= best_AD_bendline[0]) {
                         bl->body1_drawn = 1 ;
                         bl->drawn_bend_dim_point1    =
bodies_bend_flange_list[0] ;
                         bl->drawn_flange_dim_point1    =
bodies_bend_flange_list[2] ;
                         }
                    if (bl->adj_body1 && ! (bl->body2_drawn) && bl
!= best_AD_bendline[1]) {
                         bl->body2_drawn = 1 ;
                         bl->drawn_bend_dim_point2    =
bodies_bend_flange_list[1] ;
                         bl->drawn_flange_dim_point2    =
bodies_bend_flange_list[3] ;
                         }
                    }
               }
          }

/*
     mark this bendline for drawing
*/
     if (best_AD_bendline[0]) {
```

APPENDIX G

```
          best_AD_bendline[0]->body1_drawn = 2 ;
          best_AD_bendline[0]->drawn_bend_dim_point1   =
bodies_bend_flange_list[0] ;
          best_AD_bendline[0]->drawn_flange_dim_point1   =
bodies_bend_flange_list[2] ;
          }
     if (best_AD_bendline[1]) {
          best_AD_bendline[1]->body2_drawn = 2 ;
          best_AD_bendline[1]->drawn_bend_dim_point2   =
bodies_bend_flange_list[1] ;
          best_AD_bendline[1]->drawn_flange_dim_point2   =
bodies_bend_flange_list[3] ;
          }

/*
     Check if the flange-dim points is adjacent to a bendline.
     Here we will not check simultanoues bends, because they should
have exactly the same flange-list
     as the one we have here now.
*/
     BM_AD_dim_corner *temp_point ;
     if (best_AD_bendline[0]) {
          for (temp_point = bodies_bend_flange_list[4] ; temp_point
; temp_point = temp_point->next) {
               if (NULL == temp_point->adj_bendline) continue ;


(best_AD_bendline[0]->parent)->compute_effects_flange_length_draw
n(best_AD_bendline[0]->bend,
                    best_AD_bendline[0]->adj_body1,
bodies_bend_flange_list[0], bodies_bend_flange_list[2],
                    temp_point->adj_bendline) ;
               }
          }
     if (best_AD_bendline[1]) {
          for (temp_point = bodies_bend_flange_list[5] ; temp_point
; temp_point = temp_point->next) {
               if (NULL == temp_point->adj_bendline) continue ;


(best_AD_bendline[1]->parent)->compute_effects_flange_length_draw
n(best_AD_bendline[1]->bend,
                    best_AD_bendline[1]->adj_body2,
bodies_bend_flange_list[1], bodies_bend_flange_list[3],
                    temp_point->adj_bendline) ;
               }
          }
}
```

APPENDIX G

```
/*
     This function draws flange length for this bendline.
     It uses the information computed by
compute_dim_points_to_display() function.

     TODO : in this function we could keep track which bendline
dimension points have already been drawn.
     Sometimes bendline dimension points with respect to adj-body1
and adj-body2 match. In that case
     we should draw it really only once.
*/

void BM_AD_bendline::draw_dimension_points()
{
     // qualification check
     if (! data_valid || ignore) return ;

     if (adj_body1 && 2 == body1_drawn) {
          parent->draw_dim_point(drawn_bend_dim_point1,
drawn_flange_dim_point1,   parent->view,   parent->dc,
parent->object_space_per_pixel) ;
          }
     if (adj_body2 && 2 == body2_drawn) {
          parent->draw_dim_point(drawn_bend_dim_point2,
drawn_flange_dim_point2,   parent->view,   parent->dc,
parent->object_space_per_pixel) ;
          }
}


/*
     **********   **********   **********   **********   **********
********** ********** ********** **********
     BM_AUTO_DIMENSION class stuff.
     **********   **********   **********   **********   **********
********** ********** ********** **********
*/

/*
     This is a debug function.
*/

void BM_AUTO_DIMENSION::test_draw(void)
{
     BM_AD_dim_corner *temp_point ;
     int i ;

     for (i = 0 ; i < num_of_bendlines ; i++) {
          if (! bends[i]->data_valid) continue ;
```

APPENDIX G

```
          if (bends[i]->adj_body1) {

(bends[i]->bend_body1_point_left).draw_with_dim_line(view,dc,obje
ct_space_per_pixel) ;

(bends[i]->bend_body1_point_right).draw_with_dim_line(view,dc,obj
ect_space_per_pixel) ;

               for   (temp_point   =   bends[i]->body1_points    ;
temp_point ; temp_point = temp_point->next) {

temp_point->draw_with_dim_line(view,dc,object_space_per_pixel) ;
                    }
               }
          if (bends[i]->adj_body2) {

(bends[i]->bend_body2_point_left).draw_with_dim_line(view,dc,obje
ct_space_per_pixel) ;

(bends[i]->bend_body2_point_right).draw_with_dim_line(view,dc,obj
ect_space_per_pixel) ;

               for   (temp_point   =   bends[i]->body2_points    ;
temp_point ; temp_point = temp_point->next) {

temp_point->draw_with_dim_line(view,dc,object_space_per_pixel) ;
                    }
               }
          }
}


/*
     This function draws an info-box with bendline data for every
bendline.

     Idea : we will not check the bounding box of the visible
portion of the part in the viewing area,
     because in SOLID mode renderware does not give out that kind
of information.
     Moreover, very often the user zooms in to see part dimensions,
in which case there is no
     portion of the viewport that in not covered by the part, ie.
the bounding box would cover the
     entire view area and would be practically useless.

     Instead we will be drawing bendline information boxes along
the edges of the viewing area.
     We will divide the viewing area into 4 regions, and place
bendline info boxes in those areas,
```

APPENDIX G

```
     whichever is closer to the bendline point to which the
info-box refers to.

     As of right now, we will be drawing those boxes along the
left-right vertical edges of the viewport.
*/

void BM_AUTO_DIMENSION::draw_bendline_data(CDC *pdc)
{
     int i, j ;

     // these variables are used to calculate the info-box size and
to draw it
     int font_height = 21 ;
     int font_avg_char_width = 8 ; // average width of a character
     int box_height = (font_height << 1) /* 2 rows of text */ ;
     int half_box_height = box_height >> 1 ;
     int box_width = font_avg_char_width * 15 ; // space for 15
characters
     int box_x ;
     int vert_space_per_box ;
     int offset ;

     // compute maximum number of info-boxes we can draw.
     int half_max_num_info_boxes = view_size_y / box_height ;
     if (half_max_num_info_boxes < 1) return ; // not enough screen
space
     int max_num_info_boxes =  half_max_num_info_boxes << 1 ;

/*
     compute the number of bends we can display
*/
     int num_bends_to_be_drawn = 0 ;
     for (i = 0 ; i < num_of_bendlines ; i++) {
          if (! bends[i]->data_valid || NULL == bends[i]->bend)
continue ;
          // remember, visibility of adj_body1 bend-dimension
points is always computed.
          // here we only check visibility with respect to
adj_body1.
          // most likely visibility with respect to adj_body1 and
adj_body2 is the same.
          if    ((bends[i]->bend_body1_point_left).visible    ||
(bends[i]->bend_body1_point_right).visible) {
                ++num_bends_to_be_drawn ;
                }
          else continue ;
          if (num_bends_to_be_drawn >= max_num_info_boxes) break ;
// out of view space
          }
```

APPENDIX G

```
     // check if there are any bendlines to be drawn
     if (0 == num_bends_to_be_drawn) return ;

/*
     allocate space for storing bendline pointers and y-coordinates
of endpoints.
*/
     BM_AD_bendline **bendlines = new
BM_AD_bendline*[num_bends_to_be_drawn] ;
     if (NULL == bendlines) return ; // out of space
     double *bend_y_coordinates = new double[num_bends_to_be_drawn]
;
     if (NULL == bend_y_coordinates) { // out of space
          delete [] bendlines ; return ; }
     BM_AD_dim_corner **bend_points = new
BM_AD_dim_corner*[num_bends_to_be_drawn] ;
     if (NULL == bend_points) {
          delete [] bendlines ; delete [] bend_y_coordinates ;
return ; }

/*
     collect bendline pointers and bend-dim-point pointers
*/
     for (i = j = 0 ; i < num_of_bendlines ; i++) {
          if (! bends[i]->data_valid || NULL == bends[i]->bend)
continue ;
          if (! (bends[i]->bend_body1_point_left).visible && !
(bends[i]->bend_body1_point_right).visible)
               continue ;

          // first, decide which of the endpoints we will use
          bendlines[j] = bends[i] ;
          if ((bends[i]->bend_body1_point_left).visible) {
               if (! (bends[i]->bend_body1_point_right).visible)
bend_points[j] = &(bends[i]->bend_body1_point_left) ;
               else {
                    if
((bends[i]->bend_body1_point_left).z_buf_value <
(bends[i]->bend_body1_point_right).z_buf_value)
                         bend_points[j] =
&(bends[i]->bend_body1_point_left) ;
                    else bend_points[j] =
&(bends[i]->bend_body1_point_right) ;
                    }
               }
          else bend_points[j] = &(bends[i]->bend_body1_point_right)
;

          if (++j >= num_bends_to_be_drawn) break ; // out of view
space
```

APPENDIX G

```
        }

/*
     sort points according to which side of the screen the info-box
should be

     right side contains all boxes (at least initially) whose
bend-line-dim-point is
     not on the left side of the screen.
*/
     int half_screen = (view_size_x >> 1) ;
     i = 0 ; // i will be top
     j = num_bends_to_be_drawn - 1 ; // j will be bottom
     // we will use these to temporarily store stuff
     BM_AD_bendline *p_bend ;
     BM_AD_dim_corner *p_bend_point ;
     while (i < j) {
          while (i < j && bend_points[i]->screen_x < half_screen)
i++ ;
          while (i < j && bend_points[j]->screen_x >= half_screen)
j-- ;

          // switch i and j
          if (i < j) {
               p_bend = bendlines[i] ;
               p_bend_point = bend_points[i] ;

               bendlines[i] = bendlines[j] ;
               bend_points[i] = bend_points[j] ;

               bendlines[j] = p_bend ;
               bend_points[j] = p_bend_point ;
               }
          }
     if (bend_points[i]->screen_x < half_screen) i++ ;
     // i points to the first info-box on the right side

/*
     check that neither side (ie. left-right) has too many
info-boxes
*/
     if (i > half_max_num_info_boxes) {
          // too many boxes on the left side.
          // sort them according to x-coordinates.
          // this way we will move points with the largest
x-coordiates to the right side.
          for (j = 0 ; j < i ; j++) bend_y_coordinates[j] =
bend_points[j]->screen_x ;
          DBM_QuickSort_double(bend_y_coordinates, (unsigned long)
i, (long *) bendlines) ;
```

APPENDIX G

```
        i = half_max_num_info_boxes ;
        }
    else    if    ((num_bends_to_be_drawn    -    i)    >
half_max_num_info_boxes) {
        // too many boxes on the right side.
        // sort them according to x-coordinates.
        // this way we will move points with the smallest
x-coordiates to the left side.
        for  (j  =  i  ;  j  <  num_bends_to_be_drawn  ;  j++)
bend_y_coordinates[j] = bend_points[j]->screen_x ;
        DBM_QuickSort_double(bend_y_coordinates + i, (unsigned
long) (num_bends_to_be_drawn - i),
            (long *) (bendlines + i)) ;

        i = num_bends_to_be_drawn - half_max_num_info_boxes ;
        }

    // it could have been that when we chose a point for a
bendline, it is not the best point.
    // (although this point was used to place this point on the
left-right side).
    // imagine a point on the left. it could be that both
endpoints are visible, but
    // out point is not the best, because the other endpoint of
the bendline is actually to the
    // left of our point.
    for (j = 0 ; j < i ; j++) {
        // check if we have choice
        if (! (bendlines[j]->bend_body1_point_left).visible || !
(bendlines[j]->bend_body1_point_right).visible)
            continue ;
        if  ((bendlines[j]->bend_body1_point_left).screen_x  <
(bendlines[j]->bend_body1_point_right).screen_x)
            b e n d _ p o i n t s [ j ]  =
&(bendlines[j]->bend_body1_point_left) ;
        e l s e  b e n d _ p o i n t s [ j ]  =
&(bendlines[j]->bend_body1_point_right) ;
        }
    for (j = i ; j < num_bends_to_be_drawn ; j++) {
        // check if we have choice
        if (! (bendlines[j]->bend_body1_point_left).visible || !
(bendlines[j]->bend_body1_point_right).visible)
            continue ;
        if  ((bendlines[j]->bend_body1_point_left).screen_x  >
(bendlines[j]->bend_body1_point_right).screen_x)
            b e n d _ p o i n t s [ j ]  =
&(bendlines[j]->bend_body1_point_left) ;
        e l s e  b e n d _ p o i n t s [ j ]  =
&(bendlines[j]->bend_body1_point_right) ;
        }
```

APPENDIX G

```
     // store the y-coordinate for Quicksort
     for (j = 0 ; j < num_bends_to_be_drawn ; j++)
bend_y_coordinates[j] = bend_points[j]->screen_y ;

     // sort both sides according to the screen y-coordinate
     // note a glitch : while the bendlines[] array has been
permuted, the bend_points[] array has not been.
     // in the next paragraph we restore the point array. TODO :
may-be there is a better solution.
     //         we could resort the array, but then we need to get
original y-coordinates array.
     //         we could just compute a separate permutation array,
but then we need space for it, and
     //         the code to compute the permutation, which is
non-tirivial.
     // anyway, for now we just do it the easy way.
     if (i > 0) DBM_QuickSort_double(bend_y_coordinates, (unsigned
long) i, (long *) bendlines) ;
     if ((num_bends_to_be_drawn - i) > 0)
DBM_QuickSort_double(bend_y_coordinates + i,
          (unsigned long) (num_bends_to_be_drawn - i), (long *)
(bendlines + i)) ;

     for (j = 0 ; j < i ; j++) {
          if ((bendlines[j]->bend_body1_point_left).visible) {
               if (!
(bendlines[j]->bend_body1_point_right).visible) bend_points[j] =
&(bendlines[j]->bend_body1_point_left) ;
               else {
                    if
((bendlines[j]->bend_body1_point_left).screen_x <
(bendlines[j]->bend_body1_point_right).screen_x)
                         bend_points[j] =
&(bendlines[j]->bend_body1_point_left) ;
                    else bend_points[j] =
&(bendlines[j]->bend_body1_point_right) ;
                    }
               }
          else bend_points[j] =
&(bendlines[j]->bend_body1_point_right) ;
          }

     for (j = i ; j < num_bends_to_be_drawn ; j++) {
          if ((bendlines[j]->bend_body1_point_left).visible) {
               if (!
(bendlines[j]->bend_body1_point_right).visible) bend_points[j] =
&(bendlines[j]->bend_body1_point_left) ;
               else {
                    if
((bendlines[j]->bend_body1_point_left).screen_x >
```

APPENDIX G

```
(bendlines[j]->bend_body1_point_right).screen_x)
                              bend_points[j]    =
&(bendlines[j]->bend_body1_point_left) ;
                        else  bend_points[j]    =
&(bendlines[j]->bend_body1_point_right) ;
                        }
                  }
            else  bend_points[j]    =
&(bendlines[j]->bend_body1_point_right) ;
            }

/*
      Ok, now we are ready for drawing.
*/
      static char info_box_text[256] ;
      static POINT box_corners[5] ;
      static POINT arrow[3] ;
      BM_BENDLINE *b ;
      BM_BEND_OP *bop ;
      BM_2D_BODY *b_body ;

/*
      draw left side
*/
      int left = 3 ;
      int top ;

      if (0 == i) goto draw_right_side ;

      // compute vertical space per info-box
      vert_space_per_box = view_size_y / i ;
      // compute vertical offset for the top-left corner of the
info-box
      offset = (vert_space_per_box - box_height) >> 1 ;

      box_corners[0].x = box_corners[3].x = box_corners[4].x = left
;
      box_corners[1].x = box_corners[2].x = left + box_width ;

      for (j = 0 ; j < i ; j++) {
            b = bendlines[j]->bend ;
            bop = b->get_bend_op() ;
            if (NULL == bop) continue ;
// 043996KK
            if (view_type)
                  b_body = b->get_current_3D_version() ;
            else
                  b_body = b->get_flat() ;

            top = j*vert_space_per_box + offset ;
```

APPENDIX G

```
        box_corners[0].y = box_corners[1].y = box_corners[4].y =
top ;
        box_corners[2].y = box_corners[3].y = top + box_height ;

        sprintf(info_box_text,"A:%5.1f,L:%6.2f",

(bop->get_bend_angle2())*57.29578,(b_body->get_current_center_lin
e()).get_len()) ;
        pdc->TextOut(5, top, info_box_text,
strlen(info_box_text)) ;

        switch (bop->get_type()) {
            case BM_TYPE_BEND_OP_REGULAR :
                sprintf(info_box_text,"R:%5.2f,D:%5.2f",
                    ((BM_BEND_OP_REGULAR *)
bop)->get_bend_radius(),bop->get_bend_deduction()) ;
                pdc->TextOut(5, top + font_height,
info_box_text, strlen(info_box_text)) ;
                break ;

            case BM_TYPE_BEND_OP_CONIC :
// TODO : implement conic bend op.
                break ;
        }

        // draw box
        pdc->Polyline(box_corners, 5) ;

        // draw arrow
        arrow[0].x = left + box_width ;
        arrow[0].y = top + half_box_height ;

        // calculate arrow tip at fixed percentage length in from
end point
        CPoint
ptLeft(bendlines[j]->bend_body1_point_left.screen_x,
bendlines[j]->bend_body1_point_left.screen_y);
        CPoint
ptRight(bendlines[j]->bend_body1_point_right.screen_x,
bendlines[j]->bend_body1_point_right.screen_y);
        CSize sizeDiff = ptRight - ptLeft;
        CPoint ptArrowTip;
        if (bend_points[j] ==
&(bendlines[j]->bend_body1_point_left) )
        {
            ptArrowTip.x = ptLeft.x + sizeDiff.cx/8;
            ptArrowTip.y = ptLeft.y + sizeDiff.cy/8;
        }
        else
        {
```

APPENDIX G

```
            ptArrowTip.x = ptRight.x - sizeDiff.cx/8;
            ptArrowTip.y = ptRight.y - sizeDiff.cy/8;
        }
        arrow[1].x = ptArrowTip.x;
        arrow[1].y = ptArrowTip.y;

        pdc->Polyline(arrow, 2) ;

        // change to solid pen for arrow heads
        CPen*   pArrowPen   =   new   CPen(PS_SOLID,
BCAD_context.m_nBendLineWeight, BCAD_context.m_crBend);
        CPen* pOldPen = pdc->SelectObject(pArrowPen);

        // compute arrow head
        CAutoDimArrow arrowBend(
            ptArrowTip,
            CPoint(arrow[0].x,arrow[0].y),
            BCAD_context.m_nArrowAngle,
            BCAD_context.m_nArrowLength
        );

        // draw arrow head
        arrowBend.DrawHead(dc);

        pdc->SelectObject(pOldPen);
        delete pArrowPen;
    }

/*
    draw right side
*/

draw_right_side :

    if (0 == num_bends_to_be_drawn - i) goto done ;

    box_x = view_size_x - box_width - 3 ;
    left = box_x ;

    // compute vertical space per info-box
    vert_space_per_box = view_size_y / (num_bends_to_be_drawn - i)
;
    // compute vertical offset for the top-left corner of the
info-box
    offset = (vert_space_per_box - box_height) >> 1 ;

    box_corners[0].x = box_corners[3].x = box_corners[4].x = left
;
    box_corners[1].x = box_corners[2].x = left + box_width ;
```

APPENDIX G

```
     box_x += 2 ;
     for (j = i ; j < num_bends_to_be_drawn ; j++) {
          b = bendlines[j]->bend ;
          bop = b->get_bend_op() ;
          if (NULL == bop) continue ;
// 043996KK
          if (view_type)
               b_body = b->get_current_3D_version() ;
          else
               b_body = b->get_flat() ;

          top = (j - i)*vert_space_per_box + offset ;

          box_corners[0].y = box_corners[1].y = box_corners[4].y =
top ;
          box_corners[2].y = box_corners[3].y = top + box_height ;

          sprintf(info_box_text,"A:%5.1f,L:%6.2f",

(bop->get_bend_angle2())*57.29578,(b_body->get_current_center_lin
e()).get_len()) ;
          pdc->TextOut(box_x,    top,    info_box_text,
strlen(info_box_text)) ;

          switch (bop->get_type()) {
               case BM_TYPE_BEND_OP_REGULAR :
                    sprintf(info_box_text,"R:%5.2f,D:%5.2f",
                         ((BM_BEND_OP_REGULAR   *)
bop)->get_bend_radius(),bop->get_bend_deduction()) ;
                    pdc->TextOut(box_x,    top   +   font_height,
info_box_text, strlen(info_box_text)) ;
                    break ;

               case BM_TYPE_BEND_OP_CONIC :
// TODO : implement conic bend op.
                    break ;
               }

          // draw box
          pdc->Polyline(box_corners, 5) ;

          // draw arrow
          arrow[0].x = left ;
          arrow[0].y = top + half_box_height ;

          // calculate arrow tip at fixed percentage length in from
end point
          C          P          o          i          n          t
ptLeft(bendlines[j]->bend_body1_point_left.screen_x,
bendlines[j]->bend_body1_point_left.screen_y);
```

APPENDIX G

```
        C          P          o          i          n          t
ptRight(bendlines[j]->bend_body1_point_right.screen_x,
bendlines[j]->bend_body1_point_right.screen_y);
        CSize sizeDiff = ptRight - ptLeft;
        CPoint ptArrowTip;
        i f    (    b e n d _ p o i n t s [ j ]    = =
&(bendlines[j]->bend_body1_point_left) )
        {
             ptArrowTip.x = ptLeft.x + sizeDiff.cx/8;
             ptArrowTip.y = ptLeft.y + sizeDiff.cy/8;
        }
        else
        {
             ptArrowTip.x = ptRight.x - sizeDiff.cx/8;
             ptArrowTip.y = ptRight.y - sizeDiff.cy/8;
        }
        arrow[1].x = ptArrowTip.x;
        arrow[1].y = ptArrowTip.y;

        pdc->Polyline(arrow, 2) ;

        // change to solid pen for arrow heads
        CPen*    pArrowPen    =    new    CPen(PS_SOLID,
BCAD_context.m_nBendLineWeight, BCAD_context.m_crBend);
        CPen* pOldPen = pdc->SelectObject(pArrowPen);

        // compute arrow head
        CAutoDimArrow arrowBend(
             ptArrowTip,
             CPoint(arrow[0].x,arrow[0].y),
             BCAD_context.m_nArrowAngle,
             BCAD_context.m_nArrowLength
        );

        // draw arrow head
        arrowBend.DrawHead(dc);

        pdc->SelectObject(pOldPen);
        delete pArrowPen;
     }

/*
     Done, release memory we allocated.
*/

done :

     delete [] bend_points ;
     delete [] bend_y_coordinates ;
     delete [] bendlines ;
```

APPENDIX G

```
}


/*
     To draw part dimensions in the device context.
*/

int BM_AUTO_DIMENSION::draw_auto_dimensions(CDC *target_dc)
{
     BM_AD_dim_corner *temp_point ;
     int i ;

     // check that we have a valid dc
     if (NULL == target_dc) return 0 ;

     // check if we need to recompute the data structures
     if (dirty) {
          if (! compute_auto_dimension_data()) return 0 ;
          if (dirty) return 0 ;
          }
     if (NULL == part) return 1 ;
     dc = target_dc ;

     // get view size
     view_size_x = view->get_viewport_width() ;
     view_size_y = view->get_viewport_height() ;

     // create a mesh to determine clear spaces to draw dimensions
& data
     pMesh = new CAutoDimRgnMesh(view_size_x, view_size_y);

     // check if we need to compute points to ignore in solid
     if (view->get_drawing_mode() && !
points_to_ignore_in_solid_computed) {
          compute_points_to_ignore_in_solid() ;
          }

     object_space_per_pixel = view->get_object_to_device_ratio() ;

     // initially set all "ignore" flags to FALSE. we should not
ignore anything.
     // also, nothing is drawn yet.
     for (i = 0 ; i < num_of_bendlines ; i++) {
          bends[i]->ignore = 0 ;
          bends[i]->body1_drawn = bends[i]->body2_drawn = 0 ;
          }

/*
     Compute visibility of all bendline dimension points of all
bendlines.
```

APPENDIX G

```
*/
     for (i = 0 ; i < num_of_bendlines ; i++) {
          if (! bends[i]->data_valid) continue ;
          bends[i]->compute_bendline_dim_points_visibility() ;

          if (bends[i]->adj_body1) {
               for    (temp_point    =    bends[i]->body1_points    ;
temp_point ; temp_point = temp_point->next) temp_point->visible =
-1 ;
               }
          if (bends[i]->adj_body2) {
               for    (temp_point    =    bends[i]->body1_points    ;
temp_point ; temp_point = temp_point->next) temp_point->visible =
-1 ;
               }
          }

/*
     For all bendlines, compute dimension points to draw.
*/
     for (i = 0 ; i < num_of_bendlines ; i++) {
          if (! bends[i]->data_valid || bends[i]->ignore) continue
;
          bends[i]->compute_dim_points_to_display() ;
          }

/*
     Create a pen for drawing the part.
     Create a pen for drawing the flange dimensions.
*/
     // create the pen : type, (line)width, color.

     CPen penFlange;
     CPen*    pFlangePen    =    create_auto_dim_pen(&penFlange,
BCAD_context.m_nFlangeLineStyle,BCAD_context.m_nFlangeLineWeight,
BCAD_context.m_crFlange);

     // select new pen, save old pen
     CPen* pOldPen = dc->SelectObject(pFlangePen);
     C O L O R R E F    o l d t e x t c o l o r    =
dc->SetTextColor(BCAD_context.m_crFlange) ;
     int old_bk_mode = dc->SetBkMode(TRANSPARENT) ;

/*
     Display flange length dimension.
*/
     if (BCAD_context.m_bShowFlangeDim)
     {
          for (i = 0 ; i < num_of_bendlines ; i++) {
               if  (!  bends[i]->data_valid  ||  bends[i]->ignore)
```

APPENDIX G

```
continue ;
                bends[i]->draw_dimension_points();
          }
     }

/*
     // test display of dirty region
     CBrush brRed(RGB(255,0,0));
     CBrush* pOldBrush = dc->SelectObject(&brRed);
     dc->PaintRgn(pDirtyRegion);
     dc->SelectObject(pOldBrush);
*/
     delete pDirtyRegion;
     pDirtyRegion = NULL;

/*
     Create a pen for drawing the bendline info.
*/
     // create the pen : type, (line)width, color.
     CPen penBend;
     CPen*    pBendPen    =    create_auto_dim_pen(&penBend,
BCAD_context.m_nBendLineStyle,    BCAD_context.m_nBendLineWeight,
BCAD_context.m_crBend);
     // select the new pen
     dc->SelectObject(pBendPen);
     dc->SetTextColor(BCAD_context.m_crBend);

/*
     Draw bendline info.
*/
     if (BCAD_context.m_bShowBendDim)
          draw_bendline_data(dc) ;

     // Delete the mesh now that we are finished with it.
     //
     delete pMesh;

/*
     Restore old pen.
*/
     dc->SelectObject(pOldPen) ;
     dc->SetTextColor(oldtextcolor) ;
     dc->SetBkMode(old_bk_mode) ;

     // see if we have to disable auto-dimensioning in the view
class
     if (reset_view_to_false_once_drawn) {
          reset_view_to_false_once_drawn = 0 ;
          view->set_auto_dimensions(0) ;
          }
```

APPENDIX G

```
     return 1 ;
}

CPen*   BM_AUTO_DIMENSION::create_auto_dim_pen(CPen*   pPen,   int
nLineStyle, int nLineWeight, COLORREF cr)
{
     if (nLineWeight == 1 || nLineStyle == PS_SOLID)
          pPen->CreatePen(nLineStyle, nLineWeight, cr);     // for
speed
     else
     {
          CBrush brushNew(cr);
          LOGBRUSH lb;
          brushNew.GetLogBrush(&lb);

          DWORD dwStyleArray[6];
          int nStyleCount = 2;

          DWORD dwDashLength = 2 + (nLineWeight * 4);
          DWORD dwDotLength = dwDashLength / 4;
          DWORD dwGapLength = dwDashLength / 2;

          switch (nLineStyle)
          {
               case PS_DASH:
                    dwStyleArray[0] = dwDashLength;     // pixels on
                    dwStyleArray[1] = dwGapLength;      //   pixels
off
                    nStyleCount = 2;
                    break;

               case PS_DOT:
                    dwStyleArray[0] = dwDotLength;      // on
                    dwStyleArray[1] = dwGapLength;      // off
                    nStyleCount = 2;
                    break;

               case PS_DASHDOT:
                    dwStyleArray[0] = dwDashLength;     // on
                    dwStyleArray[1] = dwGapLength;      // off
                    dwStyleArray[2] = dwDotLength;      // on
                    dwStyleArray[3] = dwGapLength;      // off
                    nStyleCount = 4;
                    break;

               case PS_DASHDOTDOT:
                    dwStyleArray[0] = dwDashLength;     // on
                    dwStyleArray[1] = dwGapLength;      // off
                    dwStyleArray[2] = dwDotLength;      // on
                    dwStyleArray[3] = dwGapLength;      // off
```

APPENDIX G

```
                    dwStyleArray[4] = dwDotLength;      // on
                    dwStyleArray[5] = dwGapLength;      // off
                    nStyleCount = 6;
                    break;
          }
          pPen->CreatePen(PS_GEOMETRIC|PS_USERSTYLE,nLineWeight,
&lb, nStyleCount, dwStyleArray);
     }

     return pPen;
}


void CBendCADDoc::OnDrawAutoDim()
{
     // if we have no dimension object, do nothing.
     if (NULL == auto_dim) {
          auto_dim = new BM_AUTO_DIMENSION(this) ;
          }
     if (NULL == auto_dim) return ;

     CBendCADViewPart   *pActiveView   =   (CBendCADViewPart   *)
get_view(BENDCAD_VIEW_TYPE_PART) ;
     if (NULL == pActiveView) return ;
     if   (!   pActiveView->get_auto_dimensions())
auto_dim->disable_view_dimensions_flag_next_time() ;
     pActiveView->set_auto_dimensions(1) ;
     // always recompute dimension points
     auto_dim->invalidate() ;
     pActiveView->Invalidate(0) ;
}
```

APPENDIX H

```
////////////////////////////////////////////////////////////////
//                                                            //
//   Example of auto dimensioning functions for computing    //
//   dimension points.  Dimension points are computed        //
//   before flange length dimensions are drawn.              //
//                                                            //
//                Copyright 1996 AmadaSoft America, Inc.     //
//                                                            //
////////////////////////////////////////////////////////////////

#include "stdafx.h"
#include "BendCAD.h"
#include "BendCADDoc.h"
#include "BendCADViewPart.h"

#include "AUTODIM.HXX"

/*
     **********   **********   **********   **********   **********
********** ********** ********** **********
     BM_AD_bendline class stuff.
     **********   **********   **********   **********   **********
********** ********** ********** **********
*/

/*
     This is a local function used by
BM_AD_bendline::compute_BM_AD_flange_points(..) to compute
     the distance between a given reference point and an edge
point.
     It returns FALSE if the point is one the wrong side of the
refrence line.
     Vector dir should be a unit vector.
*/

static int compute_distance_from_ref_point(BM_POINT const& pt /*
given reference point */,
     BM_VECTOR const& dir /* direction vector */,
     BM_POINT *p /* point whose distance we want to compute */,
double &distance)
{
     BM_VECTOR v(*p - pt) ;
     double x = v % dir ;
     if (x < -AUTODIM_DISTANCE_TOLERANCE) return 0 ;
     distance = x ;
     return 1 ;
}


/*
```

APPENDIX H

```
     A    l o c a l   f u n c t i o n   u s e d   b y
BM_AD_bendline::compute_BM_AD_flange_points(...).

     Note : a dimension list we will be referring to is a list of
flange dimension points.
     A dimension list is open, it the number of dimension points in
the list open to the "left"
     is not equal to the number of dimension point in the list open
to the "right".
     Usually this means that the last flange dimension point we
added to the list has no
     matching "closing" flange dimension point.

     This whole thing is causes by the possibility that we can have
a line (that looks like one line)
     actually broken into small pieces. In that case the user does
not see those small pieces
     (to him it looks like one line) and we don't want to consider
points in the middle as
     legimate flange dimension points.

     This function returns TRUE iff we can skip the given edge and
leave the dimension list open,
     and FALSE iff we need to close the open dimension by creating
a left-side dimension point
     from one of the end-points of the current edge.

     Basically, this function returns TRUE iff the next edge in the
loop is a line that will not be ignored.
     acutally, plus some more conditions.

     Note : this function is called when the endpoint of the edge
is at flange-length distance
     and we are considering whether we should draw a (flange)
dimension point for this endpoint.
*/

static int leave_dimension_open(BM_EDGE *edge /* current edge */,
     BM_LOOP *bloop /* loop where the current edge belongs to */,
     BM_VECTOR const& side_vector /* side vector for the current
bendline-ajd_flange pair */,
     BM_VECTOR const& normal /* normal of the plane underlying the
adjacent flange */)
{
     BM_EDGE *next_edge = (BM_EDGE *) edge->next() ;
     if (NULL == next_edge) next_edge = bloop->get_first_edge() ;

     if (next_edge->is(BM_ENTITY_TYPE_LINE)) {
          // problem. if the next edge (which is a line) will be
ignored, we need to
```

APPENDIX H

```
        // close the dimension here.
        BM_VECTOR temp_v((((BM_LINE *) next_edge)->get_v()) *
side_vector) ;

        // if the next line will not be ignored we can skip the
current edge.
        if (temp_v.Len() > AUTODIM_DISTANCE_TOLERANCE && (temp_v
% normal) < 0.0) {
              // next edge is a line that will not be ignored.

              // note that there is a problem. if this edge is a
line, and one of the two lines
              // (rememeber, next edge is a line) is adjacent to
a bendline that
              // the other is not adjacent to, we should close the
dimension.
              if (! edge->is(BM_ENTITY_TYPE_LINE)) return 1 ;

              BM_3D_BODY *ab = edge->get_adj_body() ;
              BM_3D_BODY *ab_next = next_edge->get_adj_body() ;
              if (! ab) {
                    if (! ab_next) return 1 ;
                    if  (!  ab_next->is(BM_ENTITY_TYPE_BENDLINE))
return 1 ;
                    return 0 ;
                    }
              if (! ab_next) {
                    if (! ab->is(BM_ENTITY_TYPE_BENDLINE)) return
1 ;
                    return 0 ;
                    }

              if   ((!   ab->is(BM_ENTITY_TYPE_BENDLINE)   &&   !
ab_next->is(BM_ENTITY_TYPE_BENDLINE)) ||
                    ab == ab_next)
                    return 1 ;
              }
        }

    // if next edge is not a line, we have to close the open
dimension
    return 0 ;
}


/*
    A   l o c a l   f u n c t i o n   u s e d   b y
BM_AD_bendline::compute_BM_AD_flange_points(...).

    This function creates a dimension point in the most general
```

APPENDIX H

```
form.

     We assume that we are creating the dimension point for a line.
     This line could be adjacent to a bendline.
*/

static BM_AD_dim_corner *create_dim_point(double d /* bendline arc
outside length projected onto our plane */,
// these are basic parameters needed to draw any dimension point
     BM_POINT const& p /* point p in the flange dimension point */,
     BM_VECTOR const& rv /* reference vector to make sure point p
in the flange dimension point is on
          the same plane as defined by the bendline dimension point
*/,
     BM_VECTOR const& opening_direction_vector /* for flange
dimension point */,
     int opening_vector_reverse_bit,
     BM_AD_bendline *owner,
     BM_3D_BODY *Body_required_visible,
     BM_AD_dim_corner **prev /* previous flange dimension point in
the list of flange dim points */,
     BM_VECTOR const& side_vector,
// these parameters are used when the line for which we are
computing the dimension point is adjacent
// to another bendline.
     double d_proj_side_vector /* d projected onto the side-vector
: angle_factor*d in compute_BM_AD_flange_points(...) */,
     BM_VECTOR & bend_arc_direction /* direction of the bend arc
projected onto our plane */
          /* should be line->v * plane_normal */,
     BM_VECTOR & bend_direction /* points to the direction in which
the bendline "turns" */
          /* depends on whether the bend angle is acute or not. */
          /* if acute then tangent to the other end of bend arc */
          /* if not acute, then an endpoint of the tangent
approximation */
          /* basically this is the (p->p2) vector for the other
bendline with respect to this flange */,
     BM_BENDLINE *adj_bendline /* if the line is adjacent to a
bendline this is a pointer to it */
          /* this parameter is stored to avoid drawing some
dimenions twice */,
     BM_LINE const& adj_bend_p2_line /* this is the line between p2
points of the bend-dimension */
          /* points of the adjacent bendline with respect to this
flange */
          /* note that our p2 point has to be on that line. */
          /* usually our p->p2 vector is perpendicular to this
line, although not always */
     )
```

APPENDIX H

```
{
     // this our local copy of the adj-bendline-pointer
     BM_3D_BODY *adj_bend = adj_bendline ;

     BM_POINT p_local(p + rv) ;

     // note : even if this line is adjacent to another bendline,
     // but if the line we are creating the flange dimension point
for is not perpendicular to
     // the side-vector, we should not memorize that this flange
dimension point is adjacent to
     // a bendline, because the flange length dimension drawn at
this flange dimension point
     // is not parallel to the side-vector of the adjacent bendline
with respect to this flange.
     if (adj_bendline && fabs(bend_arc_direction % side_vector) <
(bend_arc_direction.Len() - AUTODIM_DISTANCE_TOLERANCE)) {
          // not perpendicular
          adj_bendline = NULL ;
          }

     // check if the line is attached to a bendline
     if (d <= AUTODIM_DISTANCE_TOLERANCE) {
          // not attached to a bendline, or both thickness and
bendline radius are 0.
          // create a 1-point flange-dimension point.
          // note that body_required_visible points to the flange
with respect to which
          // the dimension point is computed.
          return    new    BM_AD_dim_corner(p_local,    owner,
Body_required_visible,
               o p e n i n g _ d i r e c t i o n _ v e c t o r ,
opening_vector_reverse_bit, prev, adj_bendline) ;
          }

     // note that since we have 3 points now, this line is adjacent
to another bendline.

     // compute p1. p_local is p1.

     // compute p
     BM_POINT dim_p(p_local + d_proj_side_vector*side_vector) ;

     // compute p2
     bend_arc_direction.set_length(d) ;
     BM_POINT dim_p2(p_local + bend_arc_direction) ;
     // now the problem is that with respect to the adjacent
bendline, our flange dimension points
     // p and p1 might not be on the outside - they could be on the
inside.
```

APPENDIX H

```
     // the distance from p to p2 depends on that.
     // however, we know the p2-line of the adjacent bendline (with
respect to our flange),
     // so we will compute the distance between that p2-line and
dim_p2.
     // we will use that to compute the correct p2 point for our
flange dimension (note that
     // our p2 point has to be on the p2-line of the adjacent
bendline).
     double distance ;
     BM_distance_between_point_and_line(dim_p2, adj_bend_p2_line,
&distance, (BM_POINT *) NULL) ;
     bend_direction.set_length(distance) ;
     dim_p2 = dim_p2 + bend_direction ;

     // note that the body_required_visible pointer points not to
this flange, but to the
     // adjacent-bendline instead, ALWAYS, even if this flange dim
point will not be marked as
     // adjacent to another bendline.
     return new BM_AD_dim_corner(dim_p, p_local, dim_p2, owner,
          adj_bend ? adj_bend : Body_required_visible,
          opening_direction_vector,   opening_vector_reverse_bit,
prev, adj_bendline) ;
}


/*
     This function computes flange dimensions points with respect
to an adjacent flange.

     Note : The reference point computed right in the beginning of
the function is given in order
     to make sure we can handle any kind of adj-body surface.
     The first problem is that we don't know whether the 2D-body of
the 3D-version of the adj-body
     represents the OUTSIDE or INSIDE. We do know that the bendline
dimension points for the bendline
     are OUTSIDE points. However, it could be that the adj-body
represents the INSIDE explicitly.
     In that case we use to reference point (which is on the
outside surface of the adj-body)
     to compute a translation vector by which we will shift all
point we are going to compute here.
     Also we will use this translation vector to make sure the
points p1 and p2 of the
     flange dimension point are correct.
     (if the adj-body represents inside, we compute dimension
points really for outside and the line
     (p->p2) has to be constructed with care - it is shorter than
```

APPENDIX H

```
line (p->p1)).

     Note   :  this   function   is   very   much   like   BMAPI's
BM_2D_BODY::compute_outside_width(...) function,
     although we make more assumtions here.
*/

int    BM_AD_bendline::compute_BM_AD_flange_points(BM_3D_BODY
*adj_body)
{
     // flange dimension points we are going to compute will be
stored here
     BM_AD_dim_corner **list_of_points ; // list_of_points is where
we write the pointer to the
          // next flange dimension point
     BM_AD_dim_corner *temp_dp ;

     // these parameters are used as input to this function.
     double flange_length ; /* it is important that the flange
length be the correct flange length */
     BM_POINT ref_point ; /* reference point, defines the right
plane for flange dimension points */
     BM_VECTOR side_vector ; /* should be normalized */

     // check which adjacent body we compute
     if (adj_body == adj_body1) {
          flange_length = fl1 ;
          list_of_points = &body1_points ;
          ref_point = bend_body1_point_left.p ;
          side_vector = side_vector1 ;
          }
     else if (adj_body == adj_body2) {
          flange_length = fl2 ;
          list_of_points = &body2_points ;
          ref_point = bend_body2_point_left.p ;
          side_vector = side_vector2 ;
          }
     else return 0 ; // not an adjcent body

     // variables to store temporary values
     BM_VECTOR temp_v ;
     double temp_x ;

     // parameters for fixing the reference point
     BM_POINT rp(ref_point) ; // this a local copy of the reference
point. we will modify it.
     BM_VECTOR rv ; // a vector for translating flange dimension
points.
     int ref_vector_valid = 0 ; // if this is TRUE, we need to
translate all flange dimension points.
```

APPENDIX H

```
        // if TRUE, the only really tricky part is to construct
the p2 point in the flange dimension point.

     // qualification check
     BM_2D_BODY *adj_displayed_version ;
     if   (parent->get_view_type())    adj_displayed_version    =
adj_body->get_current_3D_version() ;
     else adj_displayed_version = adj_body->get_flat() ;
     if (NULL == adj_displayed_version) return 0 ;
     BM_SURFACE *surface = adj_displayed_version->get_surface() ;
     if (NULL == surface) return 0 ;
     BM_LOOP *bloop = adj_displayed_version->get_bloop() ;
     if (NULL == bloop) return 0 ;

     BM_EDGE *edge ; // here we will store edges as we scan the
loop.
     double distance1, distance2 ; // here we will store the
distance of points we see
     double d1, d2 ; // here we store distance that has to be added
because of a bend arc. for lines adjacent to a bendline.
     double td1, td2 ; // here we store the total distance which is
the sum of distanceX + dX.
     BM_3D_BODY *ab ; // here we store a pointer to a body that is
adjacent to the current edge.
     BM_BEND_OP *bop ; // here we store a pointer to the bend op
associated with the bendline that is
          // adjacent to the edge we scan (valid only iff the body
adjacent to the edge is a bendline).
     BM_VECTOR right_opening_direction ; // this is the right-side
opening direction vector.
     BM_VECTOR left_opening_direction ; // this is the left-side
opening direction vector.
     int fl_dim_open = 0 ; // if this is TRUE, we have created a
right-side flange dimension point, but
          // no corresponding left-side dimension point. That is,
the dimension is "open".
     BM_VECTOR bend_arc_direction ; // direction of the bend arc
projected onto our plane
          // should be line->v * plane_normal. Used when a line is
adjacent to a bendline.
     BM_VECTOR bend_direction ; // points in the direction in which
the bendline "turns"
          // depends on whether the bend angle is acute or not.
          // if acute then tangent to the other end of bend arc.
          // if not acute, then an endpoint of the tangent
approximation.
          // basically this is the (p->p2) vector for the other
bendline with respect to this flange.
          // this is used when a line is adjacent to a bendline, to
compute the p2 point for
```

APPENDIX H

```
        // the flange dimension point.
    BM_LINE adj_bend_p2_line ; // this is the left-right-p2 line,
of the adjacent bendline,
        // with respect to this flange.
        // this is used when a line is adjacent to a bendline, to
compute the p2 point for
        // the flange dimension point.
    double bend_arc_outside_length_proj ; // bendline arc outside
length projected onto our plane

/*
    Handle surface types.
*/
    if (surface->is(BM_TYPE_PLANE)) goto handle_planes ;

/*
********** ********** ********** ********** ********** **********
********** ********** **********
temporary resctiction : we only handle surfaces that are planes.
TODO : handle other surface types.
********** ********** ********** ********** ********** **********
********** ********** **********
*/
    // unknown surface
    return 0 ;

/*
    Here we handle planes.
*/

handle_planes :

    BM_PLANE *plane = (BM_PLANE *) surface ;

    // we assume that the reference point correctly defines the
plane (which is parallel to our plane)
    // that is the OUTSIDE plane.
    // check if reference point is on our plane. If not (in that
case our plane represents the INSIDE
    // plane) compute a translation vector for moving from our
plane to reference plane,
    // and move the reference point to our plane.
    rv = plane->get_normal() ;
    rv.normalise() ;
    temp_v = rp - (plane->get_pt()) ;
    temp_x = temp_v % rv ;
    if (fabs(temp_x) > AUTODIM_DISTANCE_TOLERANCE) {
        // ok, need to translate all dimension points. reference
point not on the plane.
        ref_vector_valid = 1 ;
```

APPENDIX H

```
          rv.set_length(temp_x) ;
          rp = rp + (-rv) ;
          }
     else rv = BM_null_vector ;

     // compute right- and left-side opening vectors.
     right_opening_direction = side_vector * (plane->get_normal())
;
     right_opening_direction.normalise() ;
     left_opening_direction = -(right_opening_direction) ;

/*
     **********   **********   **********   **********   **********
********** ********** ********** **********
     Main portion of this function. Scan the bounding loop of the
adj_body and construct dimension points.

     Notice that we only need to scan the bloop since the edge that
is the farthest away from the given
     line has to be in the bloop.
     **********   **********   **********   **********   **********
********** ********** ********** **********

     Note : when the dimension list is open, the last right-side
dimension point created must be different
     from the start-point of the current edge, at the beginning of
the loop.
     **********   **********   **********   **********   **********
********** ********** ********** **********
*/
     // scan all edges in the bloop
     // first, we have a problem where to start scanning.
     // if we start from the first edge, we basically start from an
arbitrary edge.
     // this might not be good since we might create dimension
points we don't really want.
     // therefore we will find an edge that is adjacent to our
bendline and start from that and
     // finish when we get back to it.
     BM_EDGE *start_edge, *stop_edge, *next_edge ;
     for  (start_edge  =  bloop->get_first_edge()  ;  start_edge  ;
start_edge = (BM_EDGE *) start_edge->next()) {
          if (start_edge->get_adj_body() == bend) break ; // edge
adjacent to this bendline is a good start-edge
          else if (! start_edge->is(BM_ENTITY_TYPE_LINE)) break ;
// any non-line is a good start-edge
          else { // any line that will be ignored is also a good
place to start
               temp_v  =  (((BM_LINE  *)  start_edge)->get_v())  *
side_vector ;
```

APPENDIX H

```
                // in these two cases this line will be ignored
                if  (temp_v.Len()  <=  AUTODIM_DISTANCE_TOLERANCE)
break ; // line parallel to the side-vector
                if ((temp_v % plane->get_normal()) > 0.0) break ; //
material "above" the line
                }
            }
    if (NULL == start_edge) {
            *list_of_points = NULL ;
            return 1 ;
            }

    // this is the main loop.
    // initially we set stop_edge to NULL. we would like to set it
to start-edge, but we cannot,
    // because in that case we would never enter the loop.
therefore we set it to NULL and right
    // after we enter the loop, we set it to start_edge.
    // (this is important in the case when the loop consists of
only one circle).
    stop_edge = NULL ;
    for (edge = start_edge ; edge != stop_edge ; edge = next_edge)
{
            stop_edge = start_edge ;

            // compute the next edge we will scan
            next_edge = (BM_EDGE *) edge->next() ;
            if   (NULL   ==   next_edge)   next_edge   =
bloop->get_first_edge() ;

            switch (edge->get_type()) {

                case BM_ENTITY_TYPE_LINE : { // compute distance for
start- and end-points
                        // first, we want to ignore lines that are
parallel to the side-vector.
                        // we also want to ignore lines that have
material "above" them when looking in the
                        // side-vector direction (because they cannot
have to largest width, since material is
                        // "above" them, there must be some other edge
bounding the body from above).
                        temp_v  =  (((BM_LINE  *)  edge)->get_v())  *
side_vector ;
                        if (temp_v.Len() <= AUTODIM_DISTANCE_TOLERANCE)
continue ; // line parallel to the side-vector
                        if  ((temp_v  %  plane->get_normal())  >  0.0)
continue ; // material "above" the line
                        // note that this leaves only lines whose
direction-vector goes to the "left"
```

APPENDIX H

```
                    // of the side-vector.

                    // we need to check if this line is adjacent to
a bendline
                    ab = edge->get_adj_body() ;
                    // check if this line is adjacent to a valid
bendline (ie. one that is not the
                    // bendline associated with this BM_AD_bendline
object).
                    d1 = d2 = bend_arc_outside_length_proj = 0.0 ;
                    if    (ab    &&    ab    !=    bend    &&
ab->is(BM_ENTITY_TYPE_BENDLINE)) {
                         // check if the bendline is being bent
                         bop = ((BM_BENDLINE *) ab)->get_bend_op()
;
                         if ((parent->get_view_type()) /* have to
have a 3D view */ &&
                              ((BM_BENDLINE  *)
ab)->get_bending_status() && bop) {
                              // a problem : it could be that the
bendline is not perpendicular to the side-vector.
                              // in that case we need to project
the bend-arc-approximation-value onto the side-vector.
                              // for example, if the bendline is
parallel to the side-vector, we should not add
                              // the approximation value at all,
since it plays no role in the width computation.
                              temp_x = side_vector ^ (((BM_LINE *)
edge)->get_v()) ; // temp_x is "angle_factor"
                              if (temp_x > PI_over_2) temp_x = PI
- temp_x ;

                              temp_x = sin(temp_x) ;

                              switch (bop->get_type()) {
                                   case BM_TYPE_BEND_OP_REGULAR :

bend_arc_outside_length_proj   =   ((BM_BEND_OP_REGULAR   *)
bop)->compute_3D_outside_approx_per_side() ;
                                        d   1              =
temp_x*bend_arc_outside_length_proj ;
                                        d2 = d1 ; // d2 is the same
as d1 !

                                        break ;
// TODO : implement more bend operations here.
                                   default : ; // unknown bend op
                                   }

                              // compute some needed parameters
                              // compute : direction of the bend
arc projected onto our plane
```

APPENDIX H

```
                              bend_arc_direction = (((BM_LINE *)
edge)->get_v()) * plane->get_normal() ;
                              b e n d _ d i r e c t i o n   =
parent->compute_bend_direction_vector((BM_BENDLINE *) ab, adj_body,
&adj_bend_p2_line) ;
                              }
                         }
                    else ab = NULL ; // make sure ab does not point
to anything we don't want to.

                    // handle two cases separately - depending on
whether the dimension list is open or not.
                    if (fl_dim_open) {
                         // if the dimension is open, we don't need
to check the start-point of the line,
                         //  since  it  is  at  the  flange  length
distance anyway.
                         //
                         // first we will check if the line is
perpendicular to the side-vector
                         if  (fabs(side_vector  %  ((BM_LINE  *)
edge)->get_v()) > AUTODIM_DISTANCE_TOLERANCE) {
                              // not perpendicular.
                              // this line has to be "coming down"
(because it is not perpendicular to the
                              // side-vector and the dimension is
open, ie. it cannot be "going up").
                              // now we have to close the dimension
by creating a left-hand-side dimension point
                              // from the start-point of the line.
                              i f    ( t e m p _ d p    =
create_dim_point(bend_arc_outside_length_proj,
                                   ( ( B M _ L I N E   * )
edge)->get_startpt(), rv, left_opening_direction, 0,
                                   this, adj_body, list_of_points,
side_vector, d1, bend_arc_direction,
                                   bend_direction, (BM_BENDLINE *)
ab, adj_bend_p2_line)) {
                                   l i s t _ o f _ p o i n t s   =
&(temp_dp->next) ;
                                   }
                              fl_dim_open = 0 ;
                              }
                         else {
                              // is perpendicular.
                              // here we need to check the type of
the next edge.
                              // if it is not line, we need to
close the dimension here by creating
                              // a left-hand-side dimension point
```

APPENDIX H

```
from the end-point of the line.
                              // if the next edge is a line, we can
just continue.
                              if
(leave_dimension_open(edge,bloop,side_vector,plane->get_normal()))
break ;

                              if (temp_dp =
create_dim_point(bend_arc_outside_length_proj,
                                   ((BM_LINE *) edge)->get_endpt(),
rv, left_opening_direction, 0,
                                   this, adj_body, list_of_points,
side_vector, d1, bend_arc_direction,
                                   bend_direction, (BM_BENDLINE *)
ab, adj_bend_p2_line)) {
                                   list_of_points =
&(temp_dp->next) ;
                                   }
                              // ok, close the dimension.
                              fl_dim_open = 0 ;

                              // this is a small trick that will
save us some time.
                              // if the next edge is a line that
will be ignored, we can skip is right now here.
                              if
(next_edge->is(BM_ENTITY_TYPE_LINE) && next_edge != stop_edge) {
                                   next_edge = (BM_EDGE *)
edge->next() ;
                                   if (NULL == next_edge) next_edge
= bloop->get_first_edge() ;
                                   }
                              }

                         break ;
                         }

                    if (! compute_distance_from_ref_point(rp,
side_vector, edge->get_edge_startpoint(), distance1)) continue ;
                    if (! compute_distance_from_ref_point(rp,
side_vector, edge->get_edge_endpoint(), distance2)) continue ;
                    td1 = distance1 + d1 ;
                    td2 = distance2 + d2 ;

                    // check if the start-point is a flange
dimension point
                    if (fabs(td1 - flange_length) <=
AUTODIM_DISTANCE_TOLERANCE) {
                         // check if the second point is a flange
dimension point
```

APPENDIX H

```
                    if   (fabs(td2   -   flange_length)   >
AUTODIM_DISTANCE_TOLERANCE) {
                         // only start-point is a flange
dimension point.
                         // create a left-right (ie. in both
directions) flange dim point and continue.
                         if   (temp_dp   =
create_dim_point(bend_arc_outside_length_proj,
                              ((BM_LINE  *)
edge)->get_startpt(), rv, right_opening_direction, 1,
                              this, adj_body, list_of_points,
side_vector, d1, bend_arc_direction,
                              bend_direction, (BM_BENDLINE *)
ab, adj_bend_p2_line)) {
                              list_of_points   =
&(temp_dp->next) ;
                              }
                         break ;
                         }

                    // else open the dimension list
                    // create right flange dimension point
from start-point
                    if   (temp_dp   =
create_dim_point(bend_arc_outside_length_proj,
                         ((BM_LINE *) edge)->get_startpt(),
rv, right_opening_direction, 0,
                         this,  adj_body,  list_of_points,
side_vector, d1, bend_arc_direction,
                         bend_direction, (BM_BENDLINE *) ab,
adj_bend_p2_line)) {
                         list_of_points = &(temp_dp->next) ;
                         }
                    // check if we can leave the dimension
list open and continue
                    if
(leave_dimension_open(edge,bloop,side_vector,plane->get_normal()))
{
                         fl_dim_open = 1 ;
                         break ;
                         }
                    // create left flange dim point from
end-point.
                    if   (temp_dp   =
create_dim_point(bend_arc_outside_length_proj,
                         ((BM_LINE *) edge)->get_endpt(), rv,
left_opening_direction, 0,
                         this,  adj_body,  list_of_points,
side_vector, d1, bend_arc_direction,
                         bend_direction, (BM_BENDLINE *) ab,
```

APPENDIX H

```
adj_bend_p2_line)) {
                                list_of_points = &(temp_dp->next) ;
                                }
                        // ok, close the dimension list.
                        fl_dim_open = 0 ;

                        // this is a small trick that will save us
some time.
                        // if the next edge is a line that will be
ignored, we can skip is right now here.
                        if (next_edge->is(BM_ENTITY_TYPE_LINE) &&
next_edge != stop_edge) {
                                next_edge = (BM_EDGE *) edge->next()
;
                                if (NULL == next_edge) next_edge =
bloop->get_first_edge() ;
                                }
                        break ;
                        }
                else if (fabs(td2 - flange_length) >
AUTODIM_DISTANCE_TOLERANCE) {
                        // the start-point is not a flange
dimension point
                        // if the end-point is also not a flange
dimension point, we can continue.
                        continue ;
                        }

                // ok, only the end-point is a flange dimension
point.
                // two possibilities. if we can leave the
dimension list open (right now dimension is
                // closed!) we don't even have to open it, we
can just continue.
                i                                               f
(leave_dimension_open(edge,bloop,side_vector,plane->get_normal()))
break ;
                // second possibility. now we have to create a
left-right flange dimension point.
                // dimension list stays closed.
                i f     ( t e m p _ d p     =
create_dim_point(bend_arc_outside_length_proj,
                        ((BM_LINE *) edge)->get_endpt(), rv,
right_opening_direction, 1,
                        this, adj_body, list_of_points,
side_vector, d1, bend_arc_direction,
                        bend_direction, (BM_BENDLINE *) ab,
adj_bend_p2_line)) {
                        list_of_points = &(temp_dp->next) ;
                        }
```

APPENDIX H

```
                    // this is a small trick that will save us some
time.
                    // if the next edge is a line that will be
ignored, we can skip is right now here.
                    if   (next_edge->is(BM_ENTITY_TYPE_LINE)   &&
next_edge != stop_edge) {
                         next_edge = (BM_EDGE *) edge->next() ;
                         if  (NULL  ==  next_edge)  next_edge  =
bloop->get_first_edge() ;
                         }
                    }
                    break ;

               case BM_ENTITY_TYPE_ARC : {
                    // note : we can always ignore the start-point
of the arc !
                    // because of the way we keep track of the open
dimension list.

                    // make sure the dimension list will be closed.
                    fl_dim_open = 0 ;

                    // first, compute start- and end-angles of the
arc with respect to the side vector.
                    // ie. convert start- and end-angles so as if
the side-vector was the 0-angle vector.
                    double    startang    =    ((BM_ARC    *)
edge)->get_startang() ;
                    double endang = ((BM_ARC *) edge)->get_endang()
;
                    temp_v    =    side_vector*(((BM_ARC    *)
edge)->get_vx()) ;
                    double delta_angle = (temp_v.Len())/(((BM_ARC
*) edge)->get_rad()) ;
                    if (delta_angle < -1.0) delta_angle = -1.0 ;
                    else if (delta_angle > 1.0) delta_angle = 1.0
;
                    delta_angle = asin(delta_angle) ;
                    if   (fabs(((BM_ARC   *)
edge)->get_normal())%temp_v) > 0.0) {
                         startang += delta_angle ;
                         endang += delta_angle ;
                         if  (startang > PI_times_2)  startang  -=
PI_times_2 ;
                         if  (endang  >  PI_times_2)  endang  -=
PI_times_2 ;
                         }
                    else {
                         startang -= delta_angle ;
                         endang -= delta_angle ;
```

APPENDIX H

```
                        if (startang < 0.0) startang += PI_times_2
;
                        if (endang < 0.0) endang += PI_times_2 ;
                        }

                // compute the extreme point
                BM_POINT arc_extreme_point ;
                // 0-angle point is the extreme point
                if  (endang  <  startang)  arc_extreme_point  =
((BM_ARC    *)    edge)->get_center()    +    (((BM_ARC    *)
edge)->get_rad())*side_vector ;
                else   arc_extreme_point   =   *(((BM_ARC   *)
edge)->get_edge_endpoint()) ;

                // check the distance of the extreme point
                if   (!   compute_distance_from_ref_point(rp,
side_vector, &arc_extreme_point, distance1)) continue ;
                if   (fabs(distance1   -   flange_length)   <=
AUTODIM_DISTANCE_TOLERANCE) {
                        // if we have the 0-angle point, create a
left-right flange dimension point.
                        // otherwise if next line is a non-ignored
line, don't do anything,
                        // otherwise create a left-right flange
dimension point.
                        if    (endang    >=    startang    &&
leave_dimension_open(edge,bloop,side_vector,plane->get_normal()))
{
                                continue ;
                                }

                        // create a left-right flange dimension
point. dimension list stays closed.
                        // this is a 1-point flange dimension
point.
                        if (temp_dp = new BM_AD_dim_corner(rv +
arc_extreme_point, this, adj_body,
                                right_opening_direction,    1,
list_of_points, NULL)) {
                                list_of_points = &(temp_dp->next) ;
                                }
                        }
                }
                break ;

        case BM_ENTITY_TYPE_CIRCLE :
                // circles are a much simpler version of the
arc case.
                {
                BM_POINT circle_extreme_point = ((BM_CIRCLE *)
```

APPENDIX H

```
edge)->get_center() + (((BM_CIRCLE *) edge)->get_rad())*side_vector
;

                    // we won't check the distance since it must be
a flange dimension point

                    // create a left-right flange dimension point.
                    // this is a 1-point flange dimension point.
                    if  (temp_dp  =  new  BM_AD_dim_corner(rv  +
circle_extreme_point, this, adj_body,
                         right_opening_direction,   1,
list_of_points, NULL)) {
                         list_of_points = &(temp_dp->next) ;
                         }
                    }

                    break ;

               case BM_ENTITY_TYPE_ELLIPSE :
// TODO : implement ellipse here. should be similar to the way arc
is handled.
continue ;
                    break ;

               default :
                    continue ; // unknown edge type
               }
          }

/*
     Ok, all done.
*/
     *list_of_points = NULL ;

     return 1 ;
}


/*
     This function computes bendline dimension points for one
BM_AD_bendline structure.

     Note : p1 is on the plane of adjacent body for which the
flange length is drawn.
     p is the centerpoint. p2 is the point on the side of the
bendline.

     Note : in this function we always compute bend-dimension
points with respect to adj-body1 and
     adj-body2. In might that we need to know the visibility of
```

APPENDIX H

```
these points in the future, although
     this bendline might have 1 or 0 adjacent bodies.
*/

int BM_AD_bendline::compute_BM_AD_bendline(void)
{
     double metal_thickness ; // thickness of the sheetmetal
     BM_2D_BODY *bendline_displayed_version ; // 3D-version of the
bendline
     BM_VECTOR temp_v ; // vector used for very short periods for
storing temporary stuff

     // initally mark the bendline data as invalid, in case we fail
here.
     data_valid = 0 ;

     // qualification check
     if (NULL == bend) return 0 ;
     if (NULL == bend->get_adj_list()) return 0 ;
     if (NULL == bend->get_part()) return 0 ;
     // this bendline has to have a 3D-version
     if (parent->get_view_type()) {
          if    (NULL    ==    (bendline_displayed_version    =
bend->get_current_3D_version())) return 0 ;
          }
     else {
          if    (NULL    ==    (bendline_displayed_version    =
bend->get_flat())) return 0 ;
          }

     metal_thickness = (bend->get_part())->get_metal_thickness() ;

/*   **********   **********   **********   **********   **********
********** ********** ********** **********
this is a temporary measure. we only process regular bendlines. ie.
ignore conic bendlines. 03/16/96. KK. */
if (bend->get_bending_status() && bend->get_bend_op() &&
! (bend->get_bend_op())->is(BM_TYPE_BEND_OP_REGULAR)) return 0 ;
/*   **********   **********   **********   **********   **********
********** ********** ********** ********** */

     // get the number of adjacent bodies.
     adj_body1 = (bend->get_adj_list())->find_lowest_id_adj_body()
;
     a   d   j   _   b   o   d   y   2          =
(bend->get_adj_list())->find_second_lowest_id_adj_body() ;
     num_of_adjacent_bodies = (adj_body1 ? 1 : 0) + (adj_body2 ? 1
: 0) ;

/*
```

APPENDIX H

```
     Compute side vectors.
*/
     if (adj_body1) {
          i                        f    (                        !
bendline_displayed_version->compute_vector_perp_towards_adj_body(
adj_body1, side_vector1)) return 0 ;
          side_vector1.normalise() ;
          }
     if (adj_body2) {
          i                        f    (                        !
bendline_displayed_version->compute_vector_perp_towards_adj_body(
adj_body2, side_vector2)) return 0 ;
          side_vector2.normalise() ;
          }

/*
     Compute bendline dimension points.
*/
     if (! bend->get_bending_status() /* bendline not bent */ ||
          ! parent->get_view_type() /* flat view */) {
          // note : here we don't know whether the dimension point
is OUTSIDE or INSIDE.
          // this has to be taken into account later.
          // however, it should work either way.

          bend_body1_point_left.num_of_points     =
bend_body1_point_right.num_of_points = 1 ;

          bend_body1_point_left.can_reverse_opening_dir     =
bend_body1_point_right.can_reverse_opening_dir = 0 ;

          bend_body1_point_left.p     =
(bendline_displayed_version->get_current_center_line()).get_start
pt() ;
          bend_body1_point_right.p     =
(bendline_displayed_version->get_current_center_line()).get_endpt()
;

          // note opening directions. left will get start-point,
right will get end-point, ie. vector goes left->right.
          bend_body1_point_right.opening_direction     =
(bendline_displayed_version->get_current_center_line()).get_v() ;
          (bend_body1_point_right.opening_direction).normalise();
          bend_body1_point_left.opening_direction     =
-(bend_body1_point_right.opening_direction) ;

          // points with respect to both adjacent bodies are the
same
          bend_body2_point_left.num_of_points     =
bend_body2_point_right.num_of_points = 1 ;
```

APPENDIX H

```
		bend_body2_point_left.can_reverse_opening_dir =
bend_body2_point_right.can_reverse_opening_dir = 0 ;
		bend_body2_point_right.opening_direction =
bend_body1_point_right.opening_direction ;
		bend_body2_point_left.opening_direction =
bend_body1_point_left.opening_direction ;
		bend_body2_point_left.p = bend_body1_point_left.p ;
		bend_body2_point_right.p = bend_body1_point_right.p ;
		}
	else {
		// first, get some bending parameters
		B M _ S U R F A C E   * s u r f a c e   =
bendline_displayed_version->get_surface() ;
		if (NULL == surface) return 0 ;
		BM_BEND_OP *bop = bend->get_bend_op() ;
		if (NULL == bop) return 0 ;
		double bend_angle = bop->get_bend_angle2() ;
		double bend_arc_angle = PI - bend_angle ;
		double half_bend_arc_angle = bend_arc_angle/2.0 ;

		switch (surface->get_type()) {
			case BM_TYPE_CYLINDER : { // note that the bend op
can be both regular and conic
				BM_CYLINDER *cylinder = (BM_CYLINDER *) surface
;
				double radius = cylinder->get_rad() ;
				double outside_radius = radius ;
				if (bendline_displayed_version->get_sense())
outside_radius += metal_thickness ;

				// set some common values
				bend_body1_point_left.can_reverse_opening_dir
= bend_body1_point_right.can_reverse_opening_dir = 0 ;
				bend_body1_point_right.opening_direction =
(bendline_displayed_version->get_current_center_line()).get_v() ;

(bend_body1_point_right.opening_direction).normalise() ;
				bend_body1_point_left.opening_direction =
-(bend_body1_point_right.opening_direction) ;

				i f   ( o u t s i d e _ r a d i u s   < =
AUTODIM_DISTANCE_TOLERANCE) {
					// special case : outside radius 0 -
trivial dimension point.
					bend_body1_point_left.num_of_points =
bend_body1_point_right.num_of_points = 1 ;
					b e n d _ b o d y 1 _ p o i n t _ l e f t . p =
(bendline_displayed_version->get_current_center_line()).get_start
pt() ;
					b e n d _ b o d y 1 _ p o i n t _ r i g h t . p =
```

APPENDIX H

```
(bendline_displayed_version->get_current_center_line()).get_endpt()
;

                              bend_body2_point_left.num_of_points    =
bend_body2_point_right.num_of_points = 1 ;

bend_body2_point_left.can_reverse_opening_dir    =
bend_body2_point_right.can_reverse_opening_dir = 0 ;
                              bend_body2_point_right.opening_direction
= bend_body1_point_right.opening_direction ;
                              bend_body2_point_left.opening_direction=
bend_body1_point_left.opening_direction ;
                              bend_body2_point_left.p    =
bend_body1_point_left.p ;
                              bend_body2_point_right.p    =
bend_body1_point_right.p ;
                              }
                        else {
                              bend_body1_point_left.num_of_points    =
bend_body1_point_right.num_of_points = 3 ;

                              // compute points p1 for adj_body1
                              bend_body1_point_left.p1    =
(bendline_displayed_version->get_current_center_line()).get_start
pt() ;
                              bend_body1_point_right.p1    =
(bendline_displayed_version->get_current_center_line()).get_endpt()
;
                              // the problem now is that it could be
that these centerline points (which are
                              // on the surface of the bendline), could
be only inside surface of the bendline.
                              i                                     f
(bendline_displayed_version->get_sense()  &&  metal_thickness  >
AUTODIM_DISTANCE_TOLERANCE) {
                                    temp_v = cylinder->get_vx() ;
                                    temp_v.set_length(metal_thickness) ;
                                    bend_body1_point_left.p1    =
bend_body1_point_left.p1 + temp_v ;
                                    bend_body1_point_right.p1    =
bend_body1_point_right.p1 + temp_v ;
                                    }

                              //  a  break  in  the  computation  of
adj_body1.p1.
                              // store current p1 values for adj_body2
as well. this will save some time.
                              //
                              // note that we should not really compute
adj_body2 points unless adj_body2 pointer
```

APPENDIX H

```
                        // is not NULL. However, this point
(adj_body2.p1) is very useful for computing
                        // adj_body1.p2 (if angle is acute). so we
compute it anyway.
                        bend_body2_point_left.p1 =
bend_body1_point_left.p1 ;
                        bend_body2_point_right.p1 =
bend_body1_point_right.p1 ;

                        // finish adj_body1.p1. rotate points p1
into their final correct location.
                        // note we rotate in the negative
direction since adj_body1 is the smallest-index
                        // adjacent body as is
"to-the-left-of-the-bendline-centerline", which means
                        // rotating to the left.
                        // first, compute the right vector for the
rotation line.
                        BM_VECTOR rot_v(cylinder->get_v()) ;
                        if (rot_v %
((bendline_displayed_version->get_current_center_line()).get_v())
< 0.0) {
                             rot_v.reverse() ;
                             }

BM_rotate_point_around_line(&(bend_body1_point_left.p1),
                             cylinder->get_pt1(), rot_v,
-half_bend_arc_angle) ;

BM_rotate_point_around_line(&(bend_body1_point_right.p1),
                             cylinder->get_pt1(), rot_v,
-half_bend_arc_angle) ;

                        // finish also adj_body2.p1. rotate points
p1 into their final correct location.

BM_rotate_point_around_line(&(bend_body2_point_left.p1),
                             cylinder->get_pt1(), rot_v,
half_bend_arc_angle) ;

BM_rotate_point_around_line(&(bend_body2_point_right.p1),
                             cylinder->get_pt1(), rot_v,
half_bend_arc_angle) ;

                        // compute points p for adj_body1.
                        double x ;
                        if (bop->is(BM_TYPE_BEND_OP_REGULAR)) {
                             x = ((BM_BEND_OP_REGULAR *)
bop)->compute_3D_outside_approx_per_side() ;
                             }
```

APPENDIX H

```
                        else if (bop->is(BM_TYPE_BEND_OP_CONIC))
{
// TODO : implement conic bendline here
return 0 ;
                             }
                        temp_v = -x*side_vector1 ;
                        bend_body1_point_left.p =
bend_body1_point_left.p1 + temp_v ;
                        bend_body1_point_right.p =
bend_body1_point_right.p1 + temp_v ;

                        // note : adj_body1.p2 and adj_body2.p,
adj_body2.p2 are yet to be computed.

                        // now there are two cases : 1) the bend
arc angle is acute (ie. no more than 90 degrees),
                        // 2) the bend arc angle is more than 90
degrees.
                        if (bend_arc_angle > (PI_over_2 +
BM_ANGLE_TOLERANCE)) { // use tangent approximation
                             // we will finish computing
adj_body1. adj_body1.p2 is left.
                             // idea : notice that adj_body1 is to
the left of the bendline-centerline
                             // because it is the lowest-index
neighbor. Therefore the cross-product
                             // of centerline-v by temp_v points
towards the cylinder (actually it is tangent
                             // to the cylinder).
                             BM_VECTOR
tangent_v(bend_body1_point_right.opening_direction * temp_v) ;
                             tangent_v.set_length(x) ;
                             bend_body1_point_left.p2 =
bend_body1_point_left.p + tangent_v ;
                             bend_body1_point_right.p2 =
bend_body1_point_right.p + tangent_v ;

                             // note adj_body2.p1 is already
computed. first set some common values.
                             bend_body2_point_left.num_of_points
= bend_body2_point_right.num_of_points = 3 ;

bend_body2_point_left.can_reverse_opening_dir =
bend_body2_point_right.can_reverse_opening_dir = 0 ;

bend_body2_point_right.opening_direction =
bend_body1_point_right.opening_direction ;

bend_body2_point_left.opening_direction =
bend_body1_point_left.opening_direction ;
```

APPENDIX H

```
                              // now compute adj_body2.p
                              temp_v = -x*side_vector2 ;
                              bend_body2_point_left.p    =
bend_body2_point_left.p1 + temp_v ;
                              bend_body2_point_right.p    =
bend_body2_point_right.p1 + temp_v ;

                              // finally, compute adj_body2.p2
                              //  note  the  order  in  the
cross-product !
                              tangent_v  =  temp_v  *
bend_body2_point_right.opening_direction ;
                              tangent_v.set_length(x) ;
                              bend_body2_point_left.p2    =
bend_body2_point_left.p + tangent_v ;
                              bend_body2_point_right.p2    =
bend_body2_point_right.p + tangent_v ;
                              }
                         else { // use intersection approximation
                              // note : adj_body2.p2 is the same as
asj_body1.p1.
                              bend_body1_point_left.p2    =
bend_body2_point_left.p1 ;
                              bend_body1_point_right.p2    =
bend_body2_point_right.p1 ;

                              //  when  using  intersection
approximation, dimensions points with respect to
                              // both adjacent bodies are the same,
so we just copy them.
                              bend_body2_point_left.num_of_points
= bend_body2_point_right.num_of_points = 3 ;

bend_body2_point_left.can_reverse_opening_dir    =
bend_body2_point_right.can_reverse_opening_dir = 0 ;

bend_body2_point_right.opening_direction    =
bend_body1_point_right.opening_direction ;

bend_body2_point_left.opening_direction    =
bend_body1_point_left.opening_direction ;
                              // note we are switching points
                              bend_body2_point_left.p2    =
bend_body1_point_left.p1 ;
                              bend_body2_point_right.p2    =
bend_body1_point_right.p1 ;
                              bend_body2_point_left.p    =
bend_body1_point_left.p ;
                              bend_body2_point_right.p    =
bend_body1_point_right.p ;
```

APPENDIX H

```
                        }
                    }

                }
                break ;

            case BM_TYPE_CONE :
                break ;

            default : ; // unknown or illegal surface ;
            }
        }

/*
    Compute flange length for each of the adjacent bodies.
*/
    if (adj_body1) {
        // if the flange length computation fails, pretend the
adjacent body does not exist. for simplicity.
        i                    f    (                          !
bend->compute_flange_length(parent->get_view_type(),adj_body1,fl1))
{
            adj_body1 = NULL ;
            --num_of_adjacent_bodies ;
            }
        }
    if (adj_body2) {
        i                    f    (                          !
bend->compute_flange_length(parent->get_view_type(),adj_body2,fl2))
{
            adj_body2 = NULL ;
            --num_of_adjacent_bodies ;
            }
        }

/*
    Done. Mark data as valid. Once bendline dimension points have
been computed for all bendlines,
    we can compute flange dimension points for all bendlines as
well.
*/
    data_valid = 1 ;

    // before we can return, we have to check if body1,2
left(right) bendline dimension points
    // are the same.
    // note the same means not the same pointers, but the contents
are equivalent.
    if (adj_body1 && adj_body2) {
        body12_left_the_same    =    (bend_body1_point_left    ==
```

APPENDIX H

```
bend_body2_point_left) ;
        body12_right_the_same = (bend_body1_point_right ==
bend_body2_point_right) ;
        }

/*
    Important. If any of the bend-dimension points contains only
1 point (point p), then
    the body_required_visible pointer should point to an adjacent
body because there really is no bendline
    to see.
*/
    if (1 == bend_body1_point_left.num_of_points)
bend_body1_point_left.body_required_visible = adj_body1 ;
    if (1 == bend_body1_point_right.num_of_points)
bend_body1_point_right.body_required_visible = adj_body1 ;
    if (1 == bend_body2_point_left.num_of_points)
bend_body2_point_left.body_required_visible = adj_body2 ;
    if (1 == bend_body2_point_right.num_of_points)
bend_body2_point_right.body_required_visible = adj_body2 ;

    return 1 ;
}


/*
    ********** ********** ********** ********** **********
********** ********** ********** **********
    BM_AUTO_DIMENSION class stuff.
    ********** ********** ********** ********** **********
********** ********** ********** **********
*/

/*
    SOLID HEURISTIC :

    Check if we can ignore some points in solid mode.

    in solid mode we will be using this heuristic in order to save
time.
    when two bendlines are using equivalent flange-dimension
points for (potentially)
    displaying flange-length, we will only compute the visibility
information only
    for the bendline (of these two bendlines) which has the higher
idx.
*/

void BM_AUTO_DIMENSION::compute_points_to_ignore_in_solid(void)
{
```

APPENDIX H

```
     int i ;

     BM_AD_dim_corner *temp_point ;
     for (i = 0 ; i < num_of_bendlines ; i++) {
          if (! bends[i]->data_valid) continue ;

          if (bends[i]->adj_body1) {
               for   (temp_point   =   bends[i]->body1_points   ;
temp_point ; temp_point = temp_point->next) {
                    if (NULL == temp_point->adj_bendline) continue
;
                    if  ((temp_point->adj_bendline)->get_idx()  >
(bends[i]->bend)->get_idx()) continue ;
                    i                                            f
(check_two_bendlines_adjacent_to_same_flange(bends[i]->bend,bends
[i]->adj_body1,
                         temp_point->adj_bendline)) {
                         temp_point->ignore_in_solid_mode = 1 ;
                         }
                    }
               }
          if (bends[i]->adj_body2) {
               for   (temp_point   =   bends[i]->body2_points   ;
temp_point ; temp_point = temp_point->next) {
                    if (NULL == temp_point->adj_bendline) continue
;
                    if  ((temp_point->adj_bendline)->get_idx()  >
(bends[i]->bend)->get_idx()) continue ;
                    i                                            f
(check_two_bendlines_adjacent_to_same_flange(bends[i]->bend,bends
[i]->adj_body2,
                         temp_point->adj_bendline)) {
                         temp_point->ignore_in_solid_mode = 1 ;
                         }
                    }
               }
          }

     points_to_ignore_in_solid_computed = 1 ;
}


/*
     This function will build auto dimension bendline and point
data structures.

     This is the main function for computing dimension points.
*/

int BM_AUTO_DIMENSION::compute_auto_dimension_data(void)
```

APPENDIX H

```
{
     int i ;

     // have to have a document
     if (NULL == doc) return 0 ;

     // if no part, try to get a new part from the document
     if (NULL == part) {
          set_part(doc->get_part()) ;
          }
     if (NULL == part) {
          dirty = 0 ;
          return 1 ;
          }

     points_to_ignore_in_solid_computed = 0 ;

/*
     get view type
*/
     if (view) {
          view_type = view->get_current_view() ;
          }
     else {
          // we are screwed
          return 0 ;
          }

/*
     Compute all bendline dimension points for all bendlines.
*/
     for (i = 0 ; i < num_of_bendlines ; i++) {
          bends[i]->compute_BM_AD_bendline() ;
          }

/*
     Compute flange dimension points for every bendline.
*/
     for (i = 0 ; i < num_of_bendlines ; i++) {
          if (bends[i]->data_valid) {
               if (bends[i]->adj_body1)
bends[i]->compute_BM_AD_flange_points(bends[i]->adj_body1) ;
               if (bends[i]->adj_body2)
bends[i]->compute_BM_AD_flange_points(bends[i]->adj_body2) ;
               }
          }

     dirty = 0 ;
     return 1 ;
}
```

APPENDIX I

```
///////////////////////////////////////////////////////////////
//                                                           //
//   Example of some basic auto-dimensioning functions,     //
//   constructors, destructors and some other basic         //
//   functions.                                              //
//                                                           //
//                  Copyright 1996 AmadaSoft America, Inc.  //
//                                                           //
///////////////////////////////////////////////////////////////

#include "stdafx.h"
#include "BendCAD.h"
#include "BendCADDoc.h"
#include "BendCADViewPart.h"

#include "AUTODIM.HXX"

/*
     **********   **********   **********   **********   **********
********** ********** ********** **********
     BM_AD_dim_corner class stuff.
     **********   **********   **********   **********   **********
********** ********** ********** **********
*/

BM_AD_dim_corner::BM_AD_dim_corner(void)
{
     visible = -1 ;
     num_of_points = 0 ;
     bend = NULL ;
     next = NULL ;
     adj_bendline = NULL ;
     body_required_visible = NULL ;
     ignore_in_solid_mode = 0 ;
}


/*
     This constructor is for creating a dimension point that has
only one point (point p) in it.
*/

BM_AD_dim_corner::BM_AD_dim_corner(BM_POINT   const&   P,
BM_AD_bendline *B, BM_3D_BODY *Body_required_visible,
     BM_VECTOR  const&  OD,  int  RB,  BM_AD_dim_corner  **prev,
BM_BENDLINE *adj_bend)
{
     visible = -1 ;
     num_of_points = 1 ;
     p = P ;
```

APPENDIX I

```
     bend = B ;

     opening_direction = OD ;
     can_reverse_opening_dir = RB ;

     next = NULL ;

     body_required_visible = Body_required_visible ;

     adj_bendline = adj_bend ;

     ignore_in_solid_mode = 0 ;

     if (prev) *prev = this ;
}


/*
     This constructor is for creating a dimension point that has 3
points in it.
*/

BM_AD_dim_corner::BM_AD_dim_corner(BM_POINT  const&  P,  BM_POINT
const& P1, BM_POINT const& P2,
     BM_AD_bendline *B, BM_3D_BODY *Body_required_visible,
     BM_VECTOR  const&  OD,  int  RB,  BM_AD_dim_corner  **prev,
BM_BENDLINE *adj_bend)
{
     visible = -1 ;
     num_of_points = 3 ;
     p = P ;
     p1 = P1 ;
     p2 = P2 ;

     bend = B ;

     opening_direction = OD ;
     can_reverse_opening_dir = RB ;

     next = NULL ;

     body_required_visible = Body_required_visible ;

     adj_bendline = adj_bend ;

     ignore_in_solid_mode = 0 ;

     if (prev) *prev = this ;
}
```

APPENDIX I

```
/*
     To assign one dimension point to another dimension point.
     This function copies the contents exactly. not sure if it is
     a very useful function.
*/

void    BM_AD_dim_corner::operator=(BM_AD_dim_corner    const&
given_point)
{
     num_of_points = given_point.num_of_points ;
     p = given_point.p ;
     p1 = given_point.p1 ;
     p2 = given_point.p2 ;
     bend = given_point.bend ;
     opening_direction = given_point.opening_direction ;
     can_reverse_opening_dir = given_point.can_reverse_opening_dir
;
     visible = given_point.visible ;
     screen_x = given_point.screen_x ;
     screen_y = given_point.screen_y ;
     z_buf_value = given_point.z_buf_value ;
     ignore_in_solid_mode = given_point.ignore_in_solid_mode ;
}


/*
     this function will return TRUE iff the given point is, for the
purpose of drawing dimensions,
     the same as this point.
     Two dimension points points are equivalent iff the point p of
one of them is on the
     line defined by the line (point p, opening direction) of the
other dimension point,
     and their opening directions match.

     here we depend on the fact that opening vectors are
normalized.

     it returns 2 iff both points p match, otherwise 1.
*/

int    BM_AD_dim_corner::operator==(BM_AD_dim_corner    const&
another_dim_point)
{
     int ret_val = 1 ;
     double k ;

     if (num_of_points < 1 || another_dim_point.num_of_points < 1)
return 0 ;
```

APPENDIX I

```
    // point has to be on the line
    if (! BM_is_point_on_line(p, opening_direction,
another_dim_point.p, &k)) return 0 ;
    if (fabs(k) <= BM_PRECISION) ret_val = 2 ;

    // since both vectors should be normalized, the dot-product is
the cos of the angle.
    double x = opening_direction %
another_dim_point.opening_direction ;
    // check if both vectors agree
    if (x > 0.99) return ret_val ;
    // check if they have opposite direction and one of the can be
reversed
    if (x < -0.99) {
        if (can_reverse_opening_dir ||
another_dim_point.can_reverse_opening_dir) return ret_val ;
        }

    return 0 ;
}


/*
    ********** ********** ********** ********** **********
********** ********** ********** **********
    BM_AD_bendline class stuff.
    ********** ********** ********** ********** **********
********** ********** ********** **********
*/

BM_AD_bendline::BM_AD_bendline(BM_AUTO_DIMENSION *owner,
BM_BENDLINE *bendline)
{
    parent = owner ;
    bend = bendline ;

    data_valid = 0 ; // data not valid - no data computed yet

    bend_body1_point_left.bend = bend_body1_point_right.bend =
this ;
    bend_body2_point_left.bend = bend_body2_point_right.bend =
this ;

    bend_body1_point_left.body_required_visible =
bend_body1_point_right.body_required_visible = bend ;
    bend_body2_point_left.body_required_visible =
bend_body2_point_right.body_required_visible = bend ;

    body1_points = NULL ;
    body2_points = NULL ;
```

APPENDIX I

```
}

BM_AD_bendline::~BM_AD_bendline(void)
{
     BM_AD_dim_corner *temp_point, *temp_p ;

     // delete lists of points
     for (temp_point = body1_points ; temp_point ; temp_point =
temp_p) {
          temp_p = temp_point->next ;
          delete temp_point ;
          }
     for (temp_point = body2_points ; temp_point ; temp_point =
temp_p) {
          temp_p = temp_point->next ;
          delete temp_point ;
          }
}

/*
     **********  **********  **********  **********  **********
********** ********** ********** **********
     BM_AUTO_DIMENSION class stuff.
     **********  **********  **********  **********  **********
********** ********** ********** **********
*/

BM_AUTO_DIMENSION::BM_AUTO_DIMENSION(CBendCADDoc *BendCAD_doc)
{
     doc = BendCAD_doc ;

     v i e w   =   ( C B e n d C A D V i e w P a r t   * )
doc->get_view(BENDCAD_VIEW_TYPE_PART) ;

     dc = NULL ;
     part = NULL ;
     dirty = 1 ;

     view_type = 1 ; // 3D view

     reset_view_to_false_once_drawn = 0 ;

     points_to_ignore_in_solid_computed = 0 ;

     num_of_bendlines = 0 ;
     bends = NULL ;

     // initialize show states for dimension info
```

APPENDIX I

```
     m_bShowFlangeDim = TRUE;
     m_bShowBendDim = TRUE;
     m_bShowPartDim = FALSE;

     // initialize Auto-Dim colors
     m_crFlange = RGB(0,0,255);
     m_crBend = RGB(0,0,255);
     m_crPart = RGB(0,0,255);

     // initialize font pointers
     m_pFlangeFont = NULL;
     m_pBendFont = NULL;
     m_pPartFont = NULL;

     // initialize line and arrow styles
     m_nLineStyle = PS_SOLID;
     m_nLineWeight = 1;        // in pixels
     m_nArrowStyle = 1;
     m_nArrowAngle = 30;       // in degrees
     m_nArrowLength = 15;      // in pixels

     // initialize dirty region pointer
     pDirtyRegion = NULL;
}


BM_AUTO_DIMENSION::~BM_AUTO_DIMENSION(void)
{
     delete_contents() ;
}


/*
     destroy the contents of this Auto-Dimension object,
*/

void BM_AUTO_DIMENSION::delete_contents(void)
{
     int i ;

     if (bends) {
          for (i = 0 ; i < num_of_bendlines ; i++) {
               if (bends[i]) delete bends[i] ;
               }
          delete [] bends ;
          bends = NULL ;
          }
     num_of_bendlines = 0 ;

     points_to_ignore_in_solid_computed = 0 ;
```

APPENDIX I

```
     part = NULL ;
     dirty = 1 ;
}


/*
     This function returns a pointer to the BM_AD_bendline
structure that contains dimensions data
     associated with the given bendline.
*/

B M _ A D _ b e n d l i n e
*BM_AUTO_DIMENSION::get_AD_bend_structure(BM_BENDLINE *bendline)
{
     int i ;

     for (i = 0 ; i < num_of_bendlines ; i++) {
          if (bends[i]->bend == bendline) return bends[i] ;
          }
     return NULL ;
}


/*
     This function returns a a (p->p2) vector for a given bendline
with respect to a given adj-body.
     It also computes a line between the p2 points of the bend
dimension points of the adjacent bendline
     with respect to this flange.
*/

B M _ V E C T O R c o n s t &
BM_AUTO_DIMENSION::compute_bend_direction_vector(BM_BENDLINE
*bendline, BM_3D_BODY *adj_body, BM_LINE *p2_line)
{
     static BM_VECTOR v ;
     int i ;

     for (i = 0 ; i < num_of_bendlines ; i++) {
          if (bends[i]->data_valid && bends[i]->bend == bendline)
{
               if (bends[i]->adj_body1 == adj_body) {
                    v = (bends[i]->bend_body1_point_left).p2 -
(bends[i]->bend_body1_point_left).p ;

p2_line->set((bends[i]->bend_body1_point_left).p2,(bends[i]->bend
_body1_point_right).p2) ;
                    return v ;
                    }
               else if (bends[i]->adj_body2 == adj_body) {
```

APPENDIX I

```
                    v  =  (bends[i]->bend_body2_point_left).p2  -
(bends[i]->bend_body2_point_left).p ;

p2_line->set((bends[i]->bend_body2_point_left).p2,(bends[i]->bend
_body2_point_right).p2) ;
                    return v ;
                    }
               }
          }

     return BM_null_vector ;
}


/*
     This function is used to propagate the effects of drawing a
flange length for a given bendline,
     to account for the fact that the flange dimension point is
adjacent to the given adj-body.
     it returns TRUE iff the adj-bend will be marked as drawn as
well with respect to the given flange.
*/

i                                  n                              t
BM_AUTO_DIMENSION::compute_effects_flange_length_drawn(BM_BENDLINE
*bendline, BM_3D_BODY *adj_body,
     BM_AD_dim_corner  *bend_dim_point  /*  bend  dim  point  for
bendline */,
     BM_AD_dim_corner *flange_dim_point /* flange dim points for
bendline */,
     BM_BENDLINE *adj_bend)
{
     BM_AD_dim_corner **p_body_points ;
     int *p_body_drawn ;
     BM_AD_dim_corner **p_drawn_bend_dim_point ;
     BM_AD_dim_corner **p_drawn_flange_dim_point ;

     int i ;

     // first we have to find a BM_AD_bendline structure for this
adj-bend
     for (i = 0 ; i < num_of_bendlines ; i++) {
          if (! bends[i]->data_valid || bends[i]->bend != adj_bend
|| bends[i]->ignore) continue ;

          if (bends[i]->adj_body1 == adj_body) {
               if (bends[i]->body1_drawn) return 0 ;

               p_body_points = &(bends[i]->body1_points) ;
               p_body_drawn = &(bends[i]->body1_drawn) ;
```

APPENDIX I

```
                p _ d r a w n _ b e n d _ d i m _ p o i n t   =
&(bends[i]->drawn_bend_dim_point1) ;
                p _ d r a w n _ f l a n g e _ d i m _ p o i n t   =
&(bends[i]->drawn_flange_dim_point1) ;
                break ;
                }
          else if (bends[i]->adj_body2 == adj_body) {
                if (bends[i]->body2_drawn) return 0 ;

                p_body_points = &(bends[i]->body2_points) ;
                p_body_drawn = &(bends[i]->body2_drawn) ;
                p _ d r a w n _ b e n d _ d i m _ p o i n t   =
&(bends[i]->drawn_bend_dim_point2) ;
                p _ d r a w n _ f l a n g e _ d i m _ p o i n t   =
&(bends[i]->drawn_flange_dim_point2) ;
                break ;
                }
          else return 0 ;
          }
     if (i >= num_of_bendlines) return 0 ;

     // now we need to check if the list of flange dimension points
for this newly found
     // BM_AD_bendline structure contains any flange dimension
points that are adjacent to our bendline
     BM_AD_dim_corner *temp_point ;
     for (temp_point = *p_body_points ; temp_point ; temp_point =
temp_point->next) {
          if (temp_point->adj_bendline == bendline) break ;
          }
     if (NULL == temp_point) return 0 ;

     // mark the flange length for the adj-bend drawn with respect
to this adj-body
     *p_body_drawn = 1 ;
     *p_drawn_bend_dim_point = flange_dim_point ;
     *p_drawn_flange_dim_point = bend_dim_point ;

     return 1 ;
}

/*
     this   function   will   return   TRUE   iff   adj_bend   has   a
flange-dimension point with respect to the
     given flange, that is adjacent to the given bendline.
*/

i                              n                              t
BM_AUTO_DIMENSION::check_two_bendlines_adjacent_to_same_flange(BM
_BENDLINE *bendline,
```

APPENDIX I

```
     BM_3D_BODY *flange, BM_BENDLINE *adj_bend)
{
     BM_AD_dim_corner **p_body_points ;

     int i ;

     // first we have to find a BM_AD_bendline structure for this
adj-bend
     for (i = 0 ; i < num_of_bendlines ; i++) {
          if (! bends[i]->data_valid || bends[i]->bend != adj_bend)
continue ;

          if (bends[i]->adj_body1 == flange) {
               p_body_points = &(bends[i]->body1_points) ;
               break ;
               }
          else if (bends[i]->adj_body2 == flange) {
               p_body_points = &(bends[i]->body2_points) ;
               break ;
               }
          else return 0 ;
          }
     if (i >= num_of_bendlines) return 0 ;

     // now we need to check if the list of flange dimension points
for this newly found
     // BM_AD_bendline structure contains a flange dimension points
that is adjacent to our bendline
     BM_AD_dim_corner *temp_point ;
     for (temp_point = *p_body_points ; temp_point ; temp_point =
temp_point->next) {
          if (temp_point->adj_bendline == bendline) return 1 ;
          }
     return 0 ;
}


/*
     To set a new part. This updates the view class pointer as well
and sets some other parameters.
*/

void BM_AUTO_DIMENSION::set_part(BM_PART *new_part)
{
     BM_BENDLINE *bendlist ;
     int i ;

     delete_contents() ;
     if (NULL == doc) return ;
```

APPENDIX I

```
     part = new_part ;
     if (NULL == part) return ;

     half_metal_thickness = (part->get_metal_thickness())/2.0 ;

     // allocate the bendlist
     if (0 == (num_of_bendlines = part->get_number_of_bendlines()))
return ;
     if (NULL == (bends = new BM_AD_bendline*[num_of_bendlines]))
goto failure ;
     bendlist = part->get_bendline_list() ;
     for (i = 0 ; i < num_of_bendlines ; i++) {
          if (bendlist) {
               bends[i] = new BM_AD_bendline(this,bendlist) ;
               bendlist = (BM_BENDLINE *) bendlist->next() ;
               }
          else bends[i] = NULL ;
          }
     // note, dirty is TRUE

     return ;

failure :
     delete_contents() ;
}
```

APPENDIX J

```
/////////////////////////////////////////////////////////////
//                                                         //
//   Example of bend model viewer implementation including //
//   entity visibility function for sheet metal part.      //
//                                                         //
//                  Copyright 1996 AmadaSoft America, Inc. //
//                                                         //
/////////////////////////////////////////////////////////////
#include "stdafx.h"

// include all BMAPI files
#include "ALLBMAPI.HXX"

// RW_DRAW library include file.
#include "RW_DRAW.HXX"

#include "BendCADDoc.h"
#include "BendCADViewPart.h"

// RenderWare include files; found in \rwwin\include
#include "rwlib.h"

// OpenGL include files.
#include "gl\gl.h"
#include "gl\glu.h"

// GL_LIST library include file.
#include "GL_LIST.HXX"

#include <stdlib.h>


/*
  Given a BM_POINT, which represents a point in world coordinates,
one can project it onto view window
  coordinates.
  A) If the display is showing the SOLID version of the part, this
function passes back a pointer to the
     edge closest to the camera that lies under that projected
point. The x_pos, y_pos, and z_depth
      pointers carry the view window coordinates (with top left
corner as (0,0) and the z-buffer value.
      If the projected point is not in the viewing volume, the
return value is 0; then of course the edge
      pointer is meaningless, and is set to NULL. If the projected
point IS within the viewing volume,
      then the return value is 1, and the edge pointer points to
the edge that lies under the projected point.
      If the pointer is NULL, no edge lies under the projected
point.
```

APPENDIX J

```
  B) If the display is showing the WIREFRAME version of the part,
only the return value: 1 if within
     view volume, 0 otherwise - should be examined. If return value
is 1, x_pos, y_pos and z_depth
      values have meaning. The edge pointer is always NULL.
*/
int  CBendCADViewPart::map_point_to_closest_edge(BM_POINT  const&
three_d_point, int *x_pos, int *y_pos,
                                                double    *z_depth,
BM_EDGE **closest_edge)
{

  int x, y, visible = 1;
  double z;

  visible = map_3d_to_screen(three_d_point, &x, &y, &z);

  if( ! visible ) {                //  Point  is  outside  viewing
volume.
    if(closest_edge) *closest_edge = NULL;
     if(x_pos) *x_pos = x;
     if(y_pos) *y_pos = y;
     if(z_depth) *z_depth = z;
     return 0;
  }

  // Now point is inside view volume.
  if(x_pos) *x_pos = x;
  if(y_pos) *y_pos = y;
  if(z_depth) *z_depth = z;

  if(! mi_show_solid) {                        // Wireframe being
drawn; just return that point is
    if(closest_edge) *closest_edge = NULL;    // within view vol.
     return 1;
  }

  // Now solid is being shown.
  if(! closest_edge) return 1;

  // Point is within view volume. Pick that point.
  pick_point_rw(x, y, closest_edge);
  return 1;

}

// This function returns the view window coordinates of a point,
with top left corner as (0,0), and the
// z-buffer depth, given the three-dimensional world coordinates of
the point. It does so by calling either
```

APPENDIX J

```
// map_3d_to_screen_solid or map_3d_to_screen_wire, depending on
whether wireframe or solid is being shown.
// On return, iff *x_pos, *y_pos are both zero, the point was not
mapped onto the screen at all.
int CBendCADViewPart::map_3d_to_screen(BM_POINT three_d_point, int
*x_pos, int *y_pos, double *z_depth)
{
  int visible;
  if(mi_show_solid) visible=map_3d_to_screen_solid(three_d_point,
x_pos, y_pos, z_depth);
  else visible = map_3d_to_screen_wire(three_d_point, x_pos, y_pos,
z_depth);
  return visible;
}


// This function returns the view window coordinates of a point,
with top left corner as (0,0), and the
// z-buffer depth, given the three-dimensional world coordinates of
the point, using OpenGL utilities
// (ie. when wireframe is on). If return value is 0, point is not
mapped onto screen, ie. not visible.
int CBendCADViewPart::map_3d_to_screen_wire(BM_POINT three_d_point,
int *x_pos, int *y_pos, double *z_depth)
{

  int viewport[4], visible = 1;
  double width, height, depth;
  double model_mat[16], proj_mat[16], array[16];

  // Get the current viewport coords.
  glGetIntegerv(GL_VIEWPORT, viewport);
  // Now build a modelview matrix out of the current set of
transformations.
  glMatrixMode(GL_MODELVIEW);
  glPushMatrix();
    glTranslated(md_x_trans, md_y_trans, 0.0);
     convert_rw_matrix_to_gl_array(md_rot_matrix, array);
     glMultMatrixd(array);
     glTranslated(- m_part_centroid.X(), - m_part_centroid.Y(), -
m_part_centroid.Z());
    glGetDoublev(GL_MODELVIEW_MATRIX, model_mat);
    glGetDoublev(GL_PROJECTION_MATRIX, proj_mat);
  glPopMatrix();

   gluProject(three_d_point.X(),   three_d_point.Y(),
three_d_point.Z(), model_mat, proj_mat,
                        viewport, &width, &height, &depth);
  if( ((int)width > m_old_rect.right) || ((int)width < 0) ) visible
= 0;
```

APPENDIX J

```
  if( ((int)height > m_old_rect.bottom) || ((int)height < 0) )
visible = 0;

  if(x_pos) *x_pos = (int) width;
  if(y_pos) *y_pos = (m_old_rect.bottom - (int) height);
  if(z_depth) *z_depth = depth;

  return visible;
}


// This function returns the view window coordinates of a point,
with top left corner as (0,0), and the
// z-buffer depth, given the three-dimensional world coordinates of
the point, using RenderWare utilities
// (ie. when solid is on). If return value is 0, point is not
mapped onto the screen, ie. not visible.
// Note: At present, same as map_3d_to_screen_wire.
int    CBendCADViewPart::map_3d_to_screen_solid(BM_POINT
three_d_point, int *x_pos, int *y_pos, double *z_depth)
{

  int viewport[4], visible = 1;
  double width, height, depth;
  double model_mat[16], proj_mat[16], array[16];

  // Get the current viewport coords.
  glGetIntegerv(GL_VIEWPORT, viewport);
  // Now build a modelview matrix out of the current set of
transformations.
  glMatrixMode(GL_MODELVIEW);
  glPushMatrix();
    glTranslated(md_x_trans, md_y_trans, 0.0);
     convert_rw_matrix_to_gl_array(md_rot_matrix, array);
     glMultMatrixd(array);
     glTranslated(- m_part_centroid.X(), - m_part_centroid.Y(), -
m_part_centroid.Z());
    glGetDoublev(GL_MODELVIEW_MATRIX, model_mat);
    glGetDoublev(GL_PROJECTION_MATRIX, proj_mat);
  glPopMatrix();

  gluProject(three_d_point.X(),   three_d_point.Y(),
three_d_point.Z(), model_mat, proj_mat,
                    viewport, &width, &height, &depth);
  if( ((int)width > m_old_rect.right) || ((int)width < 0) ) visible
= 0;
  if( ((int)height > m_old_rect.bottom) || ((int)height < 0) )
visible = 0;

  if(x_pos) *x_pos = (int) width;
```

APPENDIX J

```
  if(y_pos) *y_pos = (m_old_rect.bottom - (int) height);
  if(z_depth) *z_depth = depth;

  return visible;

}


// This function picks the point indicated by map_3d_to_screen,
using RenderWare picking, so this is
// called only when solid is being shown. Note that the pick
position is with respect to the top left
// corner of the view window being (0,0). If the pick results in an
edge, a pointer to the edge is
// passed back in picked_edge; else, picked_edge is set to null.
This does not modify the selection
// set in any way.
void CBendCADViewPart::pick_point_rw(int x_pos, int y_pos, BM_EDGE
**picked_edge)
{

  if(picked_edge == NULL) return;


  if( (x_pos > m_old_rect.right) || (y_pos > m_old_rect.bottom)) {
// Make sure point given is within
     *picked_edge = NULL;
               // viewport.
     return;
  }


  RwClump *picked_clump = NULL;
  RwClump *parent_clump = NULL;
  long parent_tag, clump_tag, key = 0;
  BM_EDGE *edge = NULL;

  if(! RwPickScene(m_scene, x_pos, y_pos, m_camera, &m_pick)) { //
Picking command was not successful.
    *picked_edge = NULL;
     return;
  }

  if(m_pick.type == rwNAPICKOBJECT) {                          // No
clump was picked.
     *picked_edge = NULL;
     return;
  }
  else if(m_pick.type == rwPICKCLUMP) {                       // Some
clump was picked; process it.
```

APPENDIX J

```
    picked_clump = m_pick.object.clump.clump;
     parent_clump = RwGetClumpParent(picked_clump);
     parent_tag = RwGetClumpTag(parent_clump);
     clump_tag = RwGetClumpTag(picked_clump);

     if(parent_tag == 1) {
       *picked_edge = NULL;
       return;                                                    //   A
trivial bendline or forming was picked.
     }
     // Now some real edge was picked.
     key = (parent_tag%10000)*100000 + clump_tag;
     if(clump_tag)                                                      /
Safety check; we expect clump_tag to be non-zero.
      *picked_edge    =    map_list_name_to_bm_edge(parent_tag,
clump_tag);
  }

}

// This function returns the ratio of the view volume dimension
(object space dimensions) to
// the viewport dimension (device space dimensions).
double CBendCADViewPart::get_object_to_device_ratio(void)
{
  double ratio;
  if(m_old_rect.right)
    ratio = 2.0*md_current_view_vol[0]/(double)(m_old_rect.right);
  else ratio = 0.0;
  return ratio;
}


/*
  Given a BM_POINT, which represents a point in world coordinates,
one can project it onto view window coordinates. This function
first checks if the projected point is within the viewing volume.
If it IS within viewing volume, the pointer "visible" carries value
1; else, 0. If the point is not visible, no other parameters have
any meaning; the return value is 0.

  Now suppose the point is visible.

  A) If the display is showing the SOLID version of the part, this
function checks if ANY of the three_d_bodies in the array
"three_db_array" lies "approximately under" the projected point. If
the answer is yes, return value is 1; else, return value is zero.
The x_pos, y_pos, and z_depth pointers carry the view window
coordinates (with top left corner as (0,0)) and the z-buffer value.
```

APPENDIX J

The array "thee_db_array" must be terminated by a NULL pointer to indicate end of array.

B) If the display is showing the WIREFRAME version of the part the return value is always zero. If the point is within view volume, *visible is set to 1; else, 0. If *visible is 1, x_pos, y_pos and z_depth values have the meaning mentioned above.
*/

```
int    CBendCADViewPart::is_3d_body_near_point(BM_POINT    const&
three_d_point, BM_3D_BODY **three_db_array,
                                          int *visible, int *x_pos,
int *y_pos, double *z_depth)
{

  int x, y, is_visible = 1;
  double z;
  int found = 0;
  is_visible = map_3d_to_screen(three_d_point, &x, &y, &z);

  if( ! is_visible) {                  // Point is outside viewing
volume.
     if(x_pos) *x_pos = x;
     if(y_pos) *y_pos = y;
     if(z_depth) *z_depth = z;
     if(visible) *visible = 0;
     return 0;
  }

  // Now point is inside view volume.
  if(x_pos) *x_pos = x;
  if(y_pos) *y_pos = y;
  if(z_depth) *z_depth = z;
  if(visible) *visible = 1;
  if(! mi_show_solid) {                          // Wireframe being
drawn; just return that point is return 1;
                 // within view volume.
  }

  // Now solid is being shown.
  if(! three_db_array) return 0;

  // Point is within view volume. Pick pixels in a triangle around
that point.
  found = pick_point_for_3db_rw((x - 2), (y - 2), three_db_array);
  if(found) return 1;

  found = pick_point_for_3db_rw((x - 2), (y + 2), three_db_array);
  if(found) return 1;
```

APPENDIX J

```
  found = pick_point_for_3db_rw((x + 2), (y + 2), three_db_array);
  if(found) return 1;

  found = pick_point_for_3db_rw((x + 2), (y - 2), three_db_array);
  if(found) return 1;

  return 0;

}


// This function picks the point indicated, using RenderWare
picking, so this is called only when solid is
// being shown. Note that the pick position is with respect to the
top left corner of the view window being
// (0,0). If the pick results in a three_d_body's clump, and the
picked clump corresponds to ANY  of the
// three_d_bodies in the array passed, return value is 1; if no
match or no three_d_body, return is 0.
// This does not modify the selection set in any way.
int CBendCADViewPart::pick_point_for_3db_rw(int x_pos, int y_pos,
BM_3D_BODY **three_db_array)
{

  if(three_db_array == NULL) return 0;


  if( (x_pos > m_old_rect.right) || (y_pos > m_old_rect.bottom)) {
// Make sure point given is within
          return 0;
                                                    // viewport.
  }

  RwClump *picked_clump = NULL;
  RwClump *parent_clump = NULL;
  long parent_tag, clump_tag, required_id;
     int found = 0;

  if(! RwPickScene(m_scene, x_pos, y_pos, m_camera, &m_pick)) { //
Picking command was not successful.
          return 0;
  }

  if(m_pick.type == rwNAPICKOBJECT) {                        //  No
clump was picked.
          return 0;
  }
  else if(m_pick.type == rwPICKCLUMP) {                      // Some
clump was picked; process it.
    picked_clump = m_pick.object.clump.clump;
```

APPENDIX J

```
		parent_clump = RwGetClumpParent(picked_clump);
		parent_tag = RwGetClumpTag(parent_clump);
		clump_tag = RwGetClumpTag(picked_clump);

		if(parent_tag == 1) {
					// Body of face/bendline/forming was picked.
			for(int i=0; three_db_array[i]; ++i) {
			 // Check if it matches any of the ones in array.
				if(three_db_array[i] == NULL) break;
				required_id = three_db_array[i]->get_idx();
				if(clump_tag%10000 == required_id) {
					found = 1;
					break;
				}
			}
			return found;
		}
		// Now some edge's clump was picked. Check if it matches
any of the ones in array.
		for(int i=0; three_db_array[i]; ++i) {
			if(three_db_array[i] == NULL) break;
			required_id = three_db_array[i]->get_idx();
			if(parent_tag%10000 == required_id) {
				found = 1;
				break;
			}
	}
  }

  return found;
}


// This allows the user to insert items into the selection set.
"list" is an array of pointers
// to three-d-bodies, terminated by NULL to indicate end of array.
If list is passed as NULL, every
// three-d-body in the part is inserted into the selection set.
void CBendCADViewPart::insert_selection_set(BM_3D_BODY **list)
{

	int tag;
	BV_SELECT_DATA *data = NULL;

  if(! list) {			// Insert every three_d_body in part
into selection set.
		BM_PART *part = NULL;
		CBendCADDoc* pDoc = GetDocument();
		ASSERT_VALID(pDoc);
		part = pDoc->get_part();
```

APPENDIX J

```
        if(! part) return;
    BM_FACE *face = NULL;
        BM_BENDLINE *bendline = NULL;
        BM_FORMING *forming = NULL;

        for(face = part->get_face_list(); face; face = (BM_FACE
*)face->next()) {
          if(! face) continue;
             tag   =   100000*(face->get_idx())   +   10000   +
face->get_idx();
             if(! m_selection_set.find(tag, NULL)) {
                  data = new BV_SELECT_DATA;
                  data->key = tag;
                  data->edge = NULL;
                  data->world_pt = BM_POINT(0.0, 0.0, 0.0);
                  m_selection_set.insert(tag, (long)data);
             }
        }

        for(bendline   =   part->get_bendline_list();   bendline;
bendline = (BM_BENDLINE *)bendline->next()) {
          if(! bendline) continue;
             tag   =   100000*(bendline->get_idx())   +   10000   +
bendline->get_idx();
             if(! m_selection_set.find(tag, NULL)) {
                  data = new BV_SELECT_DATA;
                  data->key = tag;
                  data->edge = NULL;
                  data->world_pt = BM_POINT(0.0, 0.0, 0.0);
                  m_selection_set.insert(tag, (long)data);
             }
        }

        for(forming = part->get_forming_list(); forming; forming
= (BM_FORMING *)forming->next()) {
          if(! forming) continue;
             tag   =   100000*(forming->get_idx())   +   10000   +
forming->get_idx();
             if(! m_selection_set.find(tag, NULL)) {
                  data = new BV_SELECT_DATA;
                  data->key = tag;
                  data->edge = NULL;
                  data->world_pt = BM_POINT(0.0, 0.0, 0.0);
                  m_selection_set.insert(tag, (long)data);
             }
        }
        DrawPart(m_hdc);
        return;
   }
```

APPENDIX J

```
     BM_3D_BODY *three_d_body;
     long i;

     for(i=0,   three_d_body   =   list[0];   three_d_body;   ++i,
three_d_body = list[i]) {
        if(! three_d_body) break;
           tag   =   100000*(three_d_body->get_idx())   +   10000   +
three_d_body->get_idx();
           if(! m_selection_set.find(tag, NULL)) {
                data = new BV_SELECT_DATA;
                data->key = tag;
                data->edge = NULL;
                data->world_pt = BM_POINT(0.0, 0.0, 0.0);
                m_selection_set.insert(tag, (long)data);
           }
     }
     DrawPart(m_hdc);
     return;

}

// This function returns the largest of the x, y and z projections
of the part's
// bounding box.
double CBendCADViewPart::get_approx_part_size(void)
{
  if(md_part_bbox_size) {
     double   size   =   __max(md_part_bbox_size[0],
md_part_bbox_size[1]);
    size = __max(size, md_part_bbox_size[2]);
    return size;
  }
  else return 0.0;
}


// This function passes back the bounding box size of the part in
its original orientation, in the
// array "dimensions". This array should be at least of size 3.
Returns 1 if successful, 0 otherwise.
//  Caution:  This  is  a  quick  and  hence  not  very  accurate
calculation; if you want greater precision,
// write your own function.
int CBendCADViewPart::get_part_dimensions(double *dimensions)
{
     CBendCADDoc* pDoc = GetDocument();
     if(! pDoc) return 0;
     BM_PART *part = pDoc->get_part();
     if(! part) return 0;
     if(! dimensions) return 0;
```

APPENDIX J

```
    int i;
    BM_POINT centroid;
    RwMatrix4d *temp = RwCreateMatrix();
    i = compute_part_centroid(part, 1, &centroid);
    if(! i) return 0;
  i = compute_part_bbox(part, 1, temp, centroid, dimensions, NULL);

    if(! i) return 0;
    RwDestroyMatrix(temp);

    return 1;
}
```

APPENDIX K

```
/////////////////////////////////////////////////////////////////
//                                                             //
//   PART.HXX comments on Bend Model and part structure, etc.  //
//                                                             //
//                  Copyright 1996 AmadaSoft America, Inc.     //
//                                                             //
/////////////////////////////////////////////////////////////////

/*
     This file contains BMAPI BM_PART class definitions.

     Most of the part functions are in PART.CPP.
     Constructors and destructors are in PART_NEW.CPP.
     Serialization functions are in PART_LOAD_x.CPP and
     PART_SAVE.CPP.
     Folding functions are in FOLD.CPP and 3D_FUNC.CPP.
     Unfolding functions are in UNFOLD.CPP.

***** ******** ********* ********* ********* ********* *********

     Discussion :

     - One of the design principles of BMAPI is that we want to
represent the entire part accurately, with thickness and
everything. One of the advantages of this is that we can query
anything and get an answer quickly. Even if the answer is not
explicitly represented, it is easy to compute.  Another advantage
of that is that it is straightforward to 3D modelling with the
part, since we are representing the part "as a solid part".

     - One of the special properties of sheetmetal is that it is
symmetric.  We can take anvantage of this fact when we represent
and reason about the part.  For example, we can represent only one
side of the sheetmetal, since the other side of the sheetmetal is
defined once we know the thickness vector.

     - One issue is if we are given a flat version of the part
(which usually does not include thickness), how do we construct the
part from that. Do we take that this flat represents the neutral
line of the part? In this BMAPI we have taken that the flat version
of the part that is explicitly represented in the bend model is the
BOTTOM side of the sheetmetal when the part is in TOP VIEW. Another
important point is that this flat version is on the X-Y plane. This
way even if the thickness changes, changes to our model are
minimal.

     - Although the flat represents the BOTTOM side of sheet-metal,
the dimensions of flat represent neutral-line dimensions. That is,
when we bent the part, the neutral-line dimensions of the bent part
match the flat dimensions (or are off by an amount defined by the
```

APPENDIX K bend deduction). This is irrelevant for faces since for them inside=neutral-line=outside. However, it is important for bendlines. That means that the underlying flat of a bendline is mapped onto neutral line of the bend arc.

- When a part is folded, BMAPI normally does not change the 2D->3D transformation of the base-body. However, when the base-body is a bendline and the user has changed some of the bend parameters (for instance, bend angle) the 2D->3D transformation matrix is marked as 'not-up-to-date'. If we used this old transformation matrix, the results would be worng. Therefore we cannot really use the old (out-of-date) transformation matrix. But in that case we don't have anything better to do than to reset the transformation matrix to an identity matrix.

- The size of every 3D body can change in two ways. First, if a face has an adjacent bendline whose bend deduction is non-zero, the face is trimmed by an amount equal to half of the bend deduction. Second, every body can have a trimming value associated with it with respect to an adjacent bendline. When the adjacent bendline is being bent, this body is trimmed by this amount.

- BM API can load all known (ie. latest and all earlier) versions of BMAPI files. However, it saves only in the latest file format.

- When a part is folded, only 2D->3D transformations are computed right away. The rest of the computations is done on demand, ie. whenever needed. When we unfold a part, everything is computed right away, ie. 3D-2D transformations and the flat version of the part.

- When a part is unfolded, BMAPI will use the current 3D-version of 3D-bodies, regardless of whether they are marked as up-to-date or not.

- BM_PART class contains several highlevel functions to facilitate part creation. For example, it contains functions that will inpect the flat version of the part and fix any problems found. Also, it contains functions for creating bendlines for the part when only a set of faces is given. These are high-level functions that are common tasks in many applications.

- For bendlines of the part it is absolutely necessary that they have a centerline specified. Without the centerline, a bendline is almost useless, it cannot be folded or unfolded.
Bendline centerline is used for three purposes :
  - for bendline folding-unfolding.
  - for representing the bendline when the bendline is empty.

APPENDIX K

- for determining the bendline orientation.

Notice that the centerline is the most "objective" in the 2D (ie. flat) version of the part, since the flat version has a fixed orientation (ie. normal has to be (0,0,1)). In 3D version of the part, centerline is somewhat "subjective" since its meaning is defined by the underlying surface, which can change. For example, we can flip the surface (which necessarily does not change the (sheet-metal) part and as a result have to reverse the centerline as well in order to keep the bendline orientation the same.

- Every bendline has a bend deduction associated with it. This bend deduction controls how part dimensions (at this bendline) change when the part is folded or unfolded. The bend deduction value can be both the positive and negative. When it is positive and we fold the part, then the part dimensions will expand, when it is negative then part dimensions will shrink. (I was told that) it is the industry standard that positive bend deduction means expanding part when folding and shrinking part when unfolding, and accordingly, negative bend deduction means shrinking part when folding and expanding part when unfolding.

- A BM_PART has a parameter bendline_dimensions_status which controls the part dimensions. It is added to facilitate part desing and creation. It is the case often, that the user is given the part dimensions, from outside to outside (for example). These dimensions are fixed and specified by the customer. The goal of a sheet-metal desing process is to produce a flat of this part so that when this flat is folded its dimensions exactly match the given dimensions. In the design process the user can change the part is a number of ways. However, given this, we always want to keep the part dimensions unchanged.

If bendline_dimensions_status is TRUE, BMAPI will try to keep to part dimensions (at every bendline) constant whenever possible, when the user changes the part/bendline parameters (like, metal thickness, or bendline raidus, etc.). Otherwise we don't care.

- Another issue that comes up in conjunction with the previous issue is that part dimensions are usually specified as OUTSIDE/INSIDE/NEUTRAL dimensions. For example, the user specifies that given a box, the outside dimensions of the box are 100x100. Technically the user is specifying that on the flat every bendline in this box represents outside dimensions. For example, when the user later changes the metal thickness, outside dimensions have to remain the same, ie. all the added thickness "has to go inside the box". In general, the user (or customer) might specify part dimensions as OUTSIDE/INSIDE/NEUTRAL dimensions, even in the same face. For example, the user might say that across the box, the

APPENDIX K dimensions are given as from the inside side of the metal of one side to the outside side of the metal on the other side.

We have a variable in the part to keep track whether the user wants to keep the part dimensions constant or not. If this variable is set so that the user does not require that the part dimensions be kept constant, this while business of INSIDE/OUTSIDE/NUETRAL-LINE is ignored.

```
*/


#ifndef BM_PART_HXX_INCLUDED
#define BM_PART_HXX_INCLUDED

#include <stdio.h>

#include "GLOBAL.HXX"
#include "ENTITY.HXX"
#include "TOPOLOGY.HXX"

class BM_PART : public BM_ENTITY
{
     friend BM_FACE ;
     friend BM_HOLE ;
     friend BM_BENDLINE ;
     friend BM_FORMING ;

     friend BM_TOPOLOGY ;
     friend BM_TOPOLOGY_RECORD ;

     friend BM_BEND_PROPERTY ;
     friend BM_BEND_PROPERTY_SIMULTANEOUS ;

     // every part has a (user-defined) name that it inherits from
BM_ENTITY.
     // also, the type (BM_ENTITY_TYPE_PART) is stored in
BM_ENTITY.

protected :

/*
     These variables let the user associate parameters, like a
name, number, material type, with the part.
*/
     char material_type[256] ;
     char name[256] ;
     char number[32] ;

/*
```

APPENDIX K

```
     These variables describe material and metal properties.
*/
     double metal_thickness ;

/*
     Within this part, two points are considered to be the same if
the distance between them is
     no more than this value.
*/
     double distance_tolerance ;

/*
     Every part has a list of bend properties. If a bendline has a
bend property,
     this property object has to be on the list of bend properties
associated with the part.
     This is needed when we save or load a part.

     These variables are used only internally. The user of BMAPI
has no access to these variables.
*/
     long number_of_bend_properties ;
     BM_BEND_PROPERTY *list_of_bend_properties ;

/*
     Part topology.

     Note that it is not possible to directly add bodies to the
lists here.
     This is done only when a body is added to the part topology.
*/
     BM_TOPOLOGY topology ;

     // number of different 3D bodies in the part.
     // these numbers should be consistent with the part topology.
     long number_of_faces ;
     long number_of_holes ;
     long number_of_bendlines ;
     long number_of_formings ;

     // lists of faces, holes and bendlines of the part
     // Note that these are lists of BM_3D_BODY's.
     BM_FACE *first_face ;
     BM_HOLE *first_hole ;
     BM_BENDLINE *first_bendline ;
     BM_FORMING *first_forming ;

/*
     These parameters represent a bend sequence associated with the
part.
```

APPENDIX K

```
*/
     long bend_sequence_size ;
     BM_LINKED_LIST_NODE *bend_sequence ;

/*
     This parameter controls part dimensions. If it is TRUE, BMAPI
will
     try to keep to part dimensions (at every bendline) constant
whenever
     possible, when the user changes the part/bendline parameters
(like,
     metal thickness, or bendline raidus, etc.). Otherwise we don't
care.

     Default value is 0 - no need to keep dimensions constant.
*/
     char bendline_dimensions_status ;

public :

/*
     Constructors and destructors. In PART_NEW.CPP.
*/
     BM_PART(void) ;
     BM_PART(BM_PART *existing_part) ;
     ~BM_PART(void) ;

     // use this to erase the content of the part. the part will be
empty.
     //  it  will  use  topology::erase_content()  to  destroy  the
topology and will then
     // destroy all bodies in the part.
     void erase_content(void) ;

     void get_material_type(char *out_mat_type) ;
     void set_material_type(char *in_mat_type) ;

     void get_name(char *out_name) ;
     void set_name(char *in_name) ;

     void get_part_number(char *out_number) ;
     void set_part_number(char *in_number) ;

     // get number of faces, holes, bendlines
     inline   long   get_number_of_faces(void)   const   {   return
number_of_faces ; }
     inline   long   get_number_of_holes(void)   const   {   return
number_of_holes ; }
     inline  long  get_number_of_bendlines(void)  const  {  return
number_of_bendlines ; }
```

APPENDIX K

```
     inline long get_number_of_formings(void) const { return
number_of_formings ; }

     // get pointers to lists of faces, holes and bendlines
     inline BM_FACE *get_face_list(void) const { return first_face
; }
     inline BM_HOLE *get_hole_list(void) const { return first_hole
; }
     inline BM_BENDLINE *get_bendline_list(void) const { return
first_bendline ; }
     inline BM_FORMING *get_forming_list(void) const { return
first_forming ; }

     // To get the number of bend properties and the first property
object on the list.
     inline BM_BEND_PROPERTY *get_list_of_bend_properties(void)
const { return list_of_bend_properties ; }
     inline long get_number_of_bend_properties(void) const { return
number_of_bend_properties ; }

     // this function tries to find a good default base face.
     // it chooses a face that has the largest bbox.
     BM_FACE *get_default_base_face(void) ;

/*
     Functions to get and change the distance tolerance associated
with the part.
*/
     inline double get_distance_tolerance(void) const { return
distance_tolerance ; }
     void set_distance_tolerance(double new_distance_tolerance) ;

/*
     To get the current metal thickness of this part.
*/
     inline double get_metal_thickness(void) const { return
metal_thickness ; }

/*
     Changing thickness will cause a lot of changes in the part.
Faces might need some trimming since changing thickness will most
likely change bendlines. Also 2D->3D transformations of faces will
most likely change. This will happen because the 3D shape of the
bendline will change and since the flat represents neutral-line
dimensions, the 3D dimensions of the part will most likely change.
Bendlines are almost certain to change significantly. W3D of all
bendlines has to be recomputed. Also, 2D->3D transformation might
have to be recomputed. Note that the part itself does not move in
space as the result of changing thickness.   However,   bendlines
2D->3D transformation will be marked as 'not-up-to-date'. One way
```

APPENDIX K to update them is to pick any face as a base-face and re-fold the part (this will work only if the face picked has its 2D->3D transformation up to date). The part will stay in the same place (since the base-face will stay in place) and bendlines will have their 2D->3D transformations updated.

Changing thickness is really tricky since most likely all bodies in the part will have 2D->3D transformations and 3D versions invalidated. The problem is that the user normally does not want to re-fold the part. Therefore we have to figure out how to get new valid 2D->3D transformations automatically. Note that this function does not do that. This is something that has to be done by some other function. Note that this function will not try to match faces-bendlines exactly. To accomplish that, call match_all_faces_adjacent_to_bendlines(...) after this function. Even better yet, use set_metal_thickness_update_part(...) which will set new thickness, and then match adjacent faces as well as compute new up-to-date 2D->3D transformations.

```
*/
     void set_metal_thickness(double thickness) ;
     void set_metal_thickness_update_part(double thickness) ;

/*
     This function will trim (if necessary) all faces so that in 3D
space they will exactly touch bendlines adjacent to them.

     This function is good to call after thickness has changed, or
after bendline parameters have been changed.
*/
     void match_all_faces_adjacent_to_bendlines(void) ;

/*
     Add a 3D body (face, hole, forming or bendline) to the part.
     Return FALSE if cannot add.
     This function basically calls add_body() member function of
the topology.
*/
     int add_3d_body(BM_3D_BODY *body) ;

     // get part topology
     inline  BM_TOPOLOGY  *get_topology(void)  const  {  return
(BM_TOPOLOGY *) &topology ; }

/*
     These function allow the user to query and specify whether
part dimensions at bendline should be kept constant whenever
possible, or not.
*/
     // to get the current status
```

APPENDIX K

```
     inline int get_bendline_dimensions_status(void) const { return
bendline_dimensions_status ; }
     // to set the new status.
     // for example, if we set it to TRUE, then from this point on,
BMAPI
     // will try to keep to current part dimensions constant.
     void   set_bendline_dimensions_status(int
new_bendline_dimensions_status) ;

/*
     Bend sequence related fundtions.
*/
     void delete_bend_sequence(void) ;
     inline long get_bend_sequence_size(void) const { return
bend_sequence_size ; }
     // this function returns the number of bendlines copied into
OUT array
     int    get_bend_sequence(BM_BENDLINE    *bendlines[],    long
bendlines_array_length) ;
     // this function sets a new bend sequence for this bendline
     int    set_bend_sequence(BM_BENDLINE    **bendlines,    long
bendlines_array_length) ;
     // this function checks is a bendline is in the current bend
sequence of the part.
     // if yes, it returns its index in the bend sequence (ie. the
number of this bendline
     // in the bend sequence order). This index is from 0 through
sequence_lenght - 1.
     // if this bendline is not in the bend sequence, it returns
-1.
     int is_bendline_in_bend_sequence(BM_BENDLINE *bendline) ;
     // this function removes a bendline from the bend sequence.
     // note that if the bendline is in a simultaneous bend
property, it will replace the bendline
     // with another bendline from the simultaneous bend property
that is not already in the bend sequence.
     void remove_bendline_from_bend_sequence(BM_BENDLINE *bendline)
;
     // this function deletes the current bend sequence (if one
exists) and creates a default
     // bend sequence.
     void create_default_bend_sequence(void) ;

/*
     This function will eliminate the flat version of all bendlines
that do not contain holes.
     This function can be useful after a part is unfolded. Normally
a folded version of the part contains non-trivial bendlines (ie.
inside radius and/or thickness not 0).
     When a part is unfolded, BMAPI transforms these bendlines into
```

APPENDIX K

```
a flat version exactly as they are.
     For example, a 3D-version of a bendline with non-zero
thickness or raidus has normally a bend arc drawn. This gets mapped
onto flat version of the bendline, which means in the
     flat version of the part, there is a rectangle between the two
faces corresponding to the bendline.
     However, sometimes we don't want to see this rectangle.

     This function processes only those bendlines that have a
simple flat (ie. no holes in the flat), and that are adjacent to
exactly two faces.

     This function trims all adjacenct faces so that they touch the
bendline centerline and deletes all loops in the bendline flat.

     Note that since this function is usually used right after
UNFOLD.  Once the flat is trimmed, it matches adjacent faces as
well - this means that is computes and sets some special trimming
values so that in the future when we fold the part we get a correct
3D-version where faces exactly meet bendlines. It does not change
the bendline.
*/
     void eliminate_simple_bendlines_in_flat_version_A(void) ;

/*
     This function will scan all 3D-bodies in the part (except
formings), and fix their flat versions. Basically it will call
BM_2D_BODY::fix_flat() function on every 3D_body (except formings)
in the part. Note that it will only check the current flat version.
It will return FAILURE when either some operation failed (ie.
memory allocation)or when it discovered a problem that it cannot
fix.
*/
     int fix_flat(void) ;

/*
     This function checks that face normals are consistent with
bendline definitions. For example, if face1 has normal (0,0,1) and
there is a 90 degree FRONT bend between face1 and face2, then face2
normal must be (-1,0,0). If there is a normal that is a reverse of
what it should be, it fixes it. Otherwise when it finds a problem,
it returns a FAILURE.

     If an input face is given, it only checks the connected
component centered at this face. Otherwise it checks the entire
part. In that case the order in which it checks faces is the order
of face indeces.

     This function makes some necessary checks (for example, when
a bendline is being bent, it has to have a bend op, a 3D-version
```

APPENDIX K (although it can be empty) and a surface.

This function checks if 3D-versions of all faces and bendline are up to date. If any is not it will return FAILURE. It will just check if the current version is up to date, it will not compute new 3D-version if the current version is not up to date (because this function is usually used right before unfold - we don't want to compute anything new at this point).

This function ignores holes and formings.

In 3D_FUNC.CPP.

```
*/
    int fix_3D_face_normals(BM_FACE *given_base_face = NULL) ;

/*
```

This function will check 3D-bodies in the part and fix problems it finds. Note that it will only check current 3D-versions. Also, it will not invalidate anything.

Right now, it checks : that face normals are consistent with bendline definitions. For example, if face1 has normal (0,0,1) and there is a 90 degree FRONT bend between face1 and face2, then face2 normal must be (-1,0,0).

It will return FAILURE when either some operation failed (ie. memory allocation) or when it discovered a problem that it cannot fix.

In 3D_FUNC.CPP.

```
*/
    int fix_3D(void) ;

/*
    **********  **********  **********  **********  **********
**********  **********  **********  **********
```

This is a major high-level Bend Model function for part design and construction.

Its purpose is :

- to create bendlines between faces so that the part becomes connected (if possible).

This function was created to facilitate part creation. Normally a third-party CAD program is used to draw a part. Since Bend Model does not have any control over the CAD system, for our purposes this drawing is just a set of edges. Therefore drawing has to be analyzed then in order to detect the structure of the part.

APPENDIX K

After that we can create faces and bendlines of the part.

However, the input drawing is often ambigious - faces and specially bendlines are not uniquely defined. Since this problem is common to many applications this function is part of the Bend Model. Moreover, implementing this function in Bend Model will simplify the face detection software that has to be part of the CAD system.

In this function we assume that edges of faces are sorted according to the left-hand side rule, in a way that is consistent with the plane normal (which defines the plane orientation). Basically, this function assumes that every plane is correct by itself, when viewed in isolation. However, this function does not require that the orientation of adjacent planes be correct with respect to the bendlines between them.

This function probably does not work well if the part thickness is not zero.

This function can be used to generate bendlines for both 3D-version of the part and the flat version of the part. However, the part can have either the flat or 3D version of the part, but not both. In other words, either all 3D-version of 3D-bodies must be NULL (in which case we have a flat version), or all flat versions must be NULL.

Implementation is in AUTO_BEND.CPP.

```
*/
     int auto_bend(void) ;

/*
```

This function was designed to facilitate part creation from data send to Bend Model by a CAD system.

The problem is that the part is often constructed piece by piece, as information becomes available.

However, the problem is that as we construct bodies of the part, we don't know in advance whether the input data represents the FLAT or 3D version of the part.

Usually it is a 3D_version. Therefore by default we assume that it is the 3D version.

Later, once all 3D-bodies of the part have been constructed, we can check it this is true. If not, we have to move all 3D-version "into" flat versions.

This function was designed only for this specific purpose and should not be used for any other purpose. Misuse of this function can crash the system.

This function checks first if the FLAT version of a body is

APPENDIX K

```
NULL. If not, it does not move the 3D-version.

 TODO : right now, it only moves faces.
*/

     void BM_PART::move_3D_to_flat(void) ;

/*
     ********** ********** ********** ********** **********
********** ********** ********** **********

     Bend Model can handle part manipulations in both directions :

     - Given a 3D version of the part, find the 2D (flat) version
of the part (ie. unfold).
     - Given a 2D (flat) version of the part, fold it given a set
of bending parameters.

     Since BMAPI will have two versions (2D and 3D) of the part
most of the time,it is important to maintain their consistency.

     BMAPI usually does not, for purposes of efficiency, explicitly
compute 2D and 3D versions of the part, but instead computes them
on demand - only when the user requests them. For most purposes, it
is enough if we just know the transformations that produce of
version of a body given another version of the body. Whenever the
user manipulates the part, he is actually manipulating the
transformations.

     There is one difference between 2D->3D and 3D->2D
transformations. 2D->3D transformation is usually specified by the
user and he can do it in any way he wants (sometimes the result
might not be valid for some reason, but we will ignore it here for
now). 3D->2D transformation corresponds to unfolding and there is
only one way to do it - there is only one final flat version of the
part given a fixed 3D-version.

     Both fold and unfold use the bend information of the part to
compute all 3D bodies separately according to their individual
bending parameters.  These transformation generally require that
all bodies in the part have 'flat' or '3D-version'.  That means,
when you initially have a 3D version of the part, you have to
unfold in before you can use 2D->3D transformations.

     Unfolding produces 'flat'. Folding produces '3D-version'.
Initially the user has to specify either the flat or the
3D-version.

     ********** ********** ********** ********** **********
********** ********** ********** **********
```

APPENDIX K

```
*/

/*
     This function will force BMAPI to compute the 3D version of
the part (from flat). Specifically, BMAPI will check every
face-hole-bendline and whenever the 3D version is not up to date,
it will compute an up-to-date 3D version from flat using the 2D->3D
transformation. If the 2D->3D transformation is not up to date, it
will try to compute a valid up to date 2D->3D transformation. Also,
whenever a new 3D-version is computed for a bendline, it will first
match adjacent bendlines.
*/
     void bring_3D_up_to_date(void) ;

/*
     **********  **********  **********  **********  **********
********** ********** ********** **********

     2D->3D transformation functions.

     **********  **********  **********  **********  **********
********** ********** ********** **********
*/

/*
     This function will reset all transformations to identity
transformations.
     It will also set 'bending_status' variable in every bendline
to FALSE.
     It will also mark all 3D versions of all faces as
'not-up-to-date' but won't recompute them.
     Note that this function will reset only the 2D->3D
transformation since 3D->2D transformation cannot be reset.
*/
     void reset_all_transformations(void) ;

/*
     Reset part's 2D->3D transformations.
     'body' is the face whose transformation will be an identity
transformation.
     other bodies will have their transformations set according to
the bend information with respect to this base body.
     This function will update all transformation matrices.
     Basically this function allows you to undo all rotations and
translations you have done on the entire part.
*/
     void reset_part_2Dto3D_transformations(BM_3D_BODY *base_body)
;

/*
```

APPENDIX K

```
     ********** ********** ********** ********** **********
********** ********** ********** **********

     These function let the user to rotate or translate part.
     For example, when bending the user might want to move the part
of flip it over.

     These functions will apply to the entire part equally, ie.
every face-hole-bendline changes in exactly the same way.

     Note that these are 2D->3D transformations, ie. they change
only the 3D version of the part, but they require that the flat
version of the part be computed.

     Basically the only thing these functions do is to change the
2D-3D transformation associated with every body and mark every
body's 3D-version as 'not-up-to-date'.

     ********** ********** ********** ********** **********
********** ********** ********** **********
*/

/*
     Rotate the entire part around the line by the angle (in
radians).
     Positive direction is defined as clockwise when we look in the
direction of the line.
*/
     void rotate(BM_LINE const& line, double const angle) ;

/*
     Translate the entire part by this vector.
*/
     void translate(BM_VECTOR const& translation_vector) ;

/*
     Apply this transformation to the part.
*/
     void transform(BM_TRANSFORM const& transformation) ;

/*
     ********** ********** ********** ********** **********
********** ********** ********** **********

     FOLD functions. In module FOLD.CPP.

     ********** ********** ********** ********** **********
********** ********** ********** **********
*/
```

APPENDIX K

```
/*
     Compute 3D version of the part.
     This function will compute the 3D version of the part with
respect to this base body.
     That is, 'base_body' will stay in place while the rest of the
part moves.
     Note that if you have done any rotations and/or translations
with the entire part in the past, they will be in effect after this
operation.  Normally you want to set some bendline parameters and
then call this function to update the part.  This function will
compute only the transformation matrices of those bodies that
change (the minimum change).  3D versions of every body will be
computed on demand, ie. only when the user requests them.This
function will use the 'bending_status' member variable of every
bendline to determine whether a bendline should be bent.

     Note that if the 2D->3D transformation of the base-body is not
up to date, FOLD will reset it to an identity transformation.
*/
     int fold(BM_3D_BODY *base_body) ;

/*
     This function does the same thing, except that it assumes that
the 'bending_status' member variable of every bendline is FALSE (if
it is not, it sets it to FALSE) and assumes that the list of
bendlines to bend is in the array 'bendline_array' (the length of
the array is 'number_of_bendlines'). At the end of this function,
the 'bending_status' member variable of every bendline indicates
whether the bendline was bent or not.
*/
     int fold(BM_3D_BODY *base_body, BM_BENDLINE *bendline_array[],
long number_of_bendlines) ;

/*
     This function will fold first n bendline in the bend sequence
of the part.
*/
     int fold_sequence(BM_3D_BODY *base_body, int n) ;

/*
     Given a 3D body that already has its 2D->3D transformation
matrix computed, this function will compute a transformation matrix
for a given bendline.

     This function will assume a number of things (these are not
checked) :

     - this bendline is adjacent to the body
     - this body already has an up-to-date transformation matrix
     - this bendline has an up-to-date center_line_2D
```

APPENDIX K

Note that these two functions require that bendlines have 2D centerline. This also means that bendlines should have a flat. For performance reasons these functions do not check if bendlines have a flat, but instead assume that they do and reference it directly. This function is used by FOLD.
*/

```
int bend_bendline_wrt_3D_body(BM_3D_BODY *body /* finished body */,
        BM_BENDLINE *current_bendline /* bendline whose transformation we are computing */,
        BM_TRANSFORM *tf /* start with this transformation */) ;
/*
```

The same, except the bendline is already finished and we are computing the 3D body.

This function is used by FOLD.
*/

```
int bend_3D_body_wrt_bendline(BM_BENDLINE *current_bendline /* finished bendline */,
        BM_3D_BODY *body /* body whose transformation we are computing */,
        BM_TRANSFORM *tf /* start with this transformation */) ;

/*
    ********** ********** ********** ********** **********
********** ********** ********** **********
```

UNFOLD functions. In module UNFOLD.CPP.

```
    ********** ********** ********** ********** **********
********** ********** ********** **********
*/

/*
```

This function will unfold the entire part.

It chooses a default base body for every connected component of the part. When the part is unfolded, this function will move it to the X-Y plane, such that the base-body overlaps the origin (0,0,0).

This function will first compute 3D->2D transformation for every 3D-body, then compute Wflat for every 3D-body, then trim Wflat and finally compute flat.

This function chooses the face with the smallest id that has a non-NULL normal as the base-body.

If that is not possible, it chooses the first bendline that has an underlying surface for which a non-NULL normal can be computed as the base-body.

APPENDIX K

```
     This function will use BM_PART::unfold(BM_3D_BODY *base_body)
to unfold all connected components of the part.

     This function returns 1 iff everything was fine; 0 iff
unfolding of some part of the part failed.

     First this function will check that all face normals are
correct with respect to current bendlines.

     Note that this function will use the current 3D-version of
every 3D-body. In order to unfold, all 3D-versions have to be up to
date. This function will not check if they are up to date, it will
actually mark all 3D-bodies as up to date. Also, it assumes that
all bendlines have a valid 3D-centerline. Again, it will not check
that, instead it will simply validate the current centerline.
*/
     int unfold(void) ;

/*
     This function will unfold only a connected component of the
part, centered around the base-body.
     This function is used by the BM_PART::unfold(void) function
that unfolds the entire part.
     This function will compute new 3D->2D transformations for
every 3D-body in the connected component, and will then use
BM_3D_BODY::compute_flat_from_3D() function to compute a new flat
version for every 3D-body.

     If the base-body is a face and the input flag is set to TRUE,
then thefirst thing this function does is to check that all face
normals are correct with respect to current bendlines - but only in
the connected component centered at this base-body(face).

     Note that this function will use the current 3D-version of
every 3D-body.
     Make sure that all 3D-versions are up to date before calling
this function.
     This function will actually mark all 3D-bodies it processes as
up to date.
*/
     int unfold(BM_3D_BODY *base_body, int check_face_normals = 0)
;

/*
     Given a 3D body that already has its 3D->2D transformation
matrix computed, this function will compute a transformation matrix
for a given bendline.

     This function will assume a number of things (these are not
checked) :
```

APPENDIX K

- this bendline is adjacent to the body
- this body already has an up-to-date transformation matrix
- this bendline has an up-to-date center_line_3D Note that these two functions require that bendlines have a centerline. This also means that bendlines a non-NULL 3D-version. For performance reasons these functions do not check that, but instead assume that they do and reference it directly.

This function is used by UNFOLD.

Note that this function is really an inverse of bend_bendline_wrt_3D_body(...).
*/

```
int unfold_bendline_wrt_3D_body(BM_3D_BODY *body /* finished body */,
        BM_BENDLINE *current_bendline /* bendline whose transformation we are computing */,
        BM_TRANSFORM *tf /* start with this transformation */) ;
```

/*

The same, except the bendline is already finished and we are computing the 3D body.

This function is used by UNFOLD.

Note that this function is really an inverse of bend_3D_body_wrt_bendline(...).
*/

```
int unfold_3D_body_wrt_bendline(BM_BENDLINE *current_bendline /* finished bendline */,
        BM_3D_BODY *body /* body whose transformation we are computing */,
        BM_TRANSFORM *tf /* start with this transformation */) ;
```

/*
******** ****** ****** ****** ****** ****** ****** ****** ********

This function returns a "paper model of this part". A paper model is a part that has thickness 0, bendline radius and bend deductions 0 as well. If required, this function will return a mapping from user-id's associated with bendlines into former values of 'inside radius' and 'bend deduction'.

******** ****** ****** ****** ****** ****** ****** ****** ********
*/

```
BM_PART *make_paper_model(double **inside_radius /* OUT */,
double **bend_deduction /* OUT */) ;
```

APPENDIX K

```
/*
     This function will save the current part in the given file in
PGF format.
     PGF format is used by CMU's BendCAD program.

     Returns : TRUE iff everything is fine and the part is saved.
*/
     int save_PGF_file(FILE *file) ;
     int save_PGF_file(char *filename) ;

/*
     Load functions are in PART_LOAD_x.CPP.
*/
     virtual int load(FILE *file) ;
     virtual int load(char *filename /* must not be NULL */) ;

     int BM_PART_Load(FILE *file, long version) ;

/*
     Save functions are in PART_SAVE.CPP.
*/
     virtual int save(FILE *file) ;
     virtual int save(char *filename /* must not be NULL */) ;
} ;

#endif // BM_PART_HXX_INCLUDED
```

APPENDIX L

```
//////////////////////////////////////////////////////////////////
//                                                              //
//   Example of 3-D manipulation and navigation with dynamic   //
//   calculation of the rotation axis.                          //
//                                                              //
//                    Copyright 1996 AmadaSoft America, Inc.    //
//                                                              //
//////////////////////////////////////////////////////////////////

void CBendCADViewPart::OnLButtonUp(UINT nFlags, CPoint point)
{
     ::ReleaseCapture();
     ::ClipCursor(NULL);          // Release mouse, free cursor.

     m_lt_btn_up_point = point;

     double x_extent, y_extent;
     int add_hit_to_list = 0;
     int viewport[4];
     BM_VECTOR offset;
     BM_PART *part = GetDocument()->get_part();
     RwV3d vert;

     switch(ml_last_function_chosen)     {

       case(ZOOM_WINDOW_MODE):
               if(mi_dynamic_rot_center_on) {
                    // User has further zoomed in.
                    compute_non_dyn_equivalent();
                    RwIdentityMatrix(md_dyn_rot_matrix);
               }
               compute_zoom_region_translation();
               x_extent  =  fabs((double)(m_lt_btn_down_point.x  -
m_lt_btn_up_point.x))*

2.0*md_current_view_vol[0]/(double)(m_old_rect.right);
               y_extent  =  fabs((double)(m_lt_btn_down_point.y  -
m_lt_btn_up_point.y))*

2.0*md_current_view_vol[1]/(double)(m_old_rect.bottom);
               set_new_view_volume(x_extent, y_extent);
          compute_part_bbox(part,    mi_show_3d,    md_rot_matrix,
m_part_centroid, md_part_bbox_size, &offset);
               mi_bbox_is_up_to_date = 0;    // Even though bbox
computed, we mark as not up to date so that zoom-all
               DrawPart(m_hdc);                                // will
work correctly.

               // Now turn on dynamic rotation center if need be.
               i f (    ( m d _ p a r t _ b b o x _ s i z e [ 0 ]    >
```

APPENDIX L

```
2.2*md_current_view_vol[0]) ||       // User has zoomed in so that
not all
                        (md_part_bbox_size[1]  >
2.2*md_current_view_vol[1]) ) {     // of the part is in view
volume.
                   if(! md_dyn_rot_matrix) md_dyn_rot_matrix =
RwCreateMatrix();
                   if(mi_show_solid) {
                        // Pick the center of the screen to find
point on clump to rotate around.
                        if(RwPickScene(m_scene,
m_old_rect.right/2, m_old_rect.bottom/2, m_camera, &m_pick)) {
                             if(m_pick.type  ==  rwNAPICKOBJECT)
{                      // No clump was picked.
                         m_dynamic_rot_center = BM_POINT(0.0, 0.0,
0.0);
                             }
                             else if(m_pick.type == rwPICKCLUMP)
{                // Some clump was picked; process it.
                                  vert                    =
m_pick.object.clump.wcpoint;
                         m_dynamic_rot_center = BM_POINT(vert.x,
vert.y, vert.z);
                             }
                        }
                   }
                   else {
                      m_dynamic_rot_center  =  BM_POINT(0.0,  0.0,
0.0);
                   }
                   mi_dynamic_rot_center_on = 1;
              }

              else {
                   compute_non_dyn_equivalent();
                   if(md_dyn_rot_matrix)
RwDestroyMatrix(md_dyn_rot_matrix);
                   md_dyn_rot_matrix = NULL;
                mi_dynamic_rot_center_on = 0;
              }
          break;

       case(SELECT_OBJECTS_MODE):
         if(nFlags & MK_CONTROL) add_hit_to_list = 1;
              if(! mi_show_solid)  {         //  Wireframe  being
displayed, which means OpenGL picking.
                   glGetIntegerv(GL_VIEWPORT, viewport);
                   glMatrixMode(GL_PROJECTION);
                   glPushMatrix();
                   glLoadIdentity();
```

APPENDIX L

```
                    gluPickMatrix((double)point.x,
(double)(m_old_rect.bottom - point.y), 3.0, 3.0, viewport);
                    glOrtho(-   md_current_view_vol[0],
md_current_view_vol[0],
                                        - md_current_view_vol[1],
md_current_view_vol[1],
                                        - md_current_view_vol[2],
md_current_view_vol[2]);
                    glMatrixMode(GL_MODELVIEW);
                    DrawPart(m_hdc);                            //
Draw the part in selection mode.
                    glMatrixMode(GL_PROJECTION);
                    glPopMatrix();
                    glMatrixMode(GL_MODELVIEW);

                    process_hits_record(add_hit_to_list);
                    ml_last_function_chosen = NO_FUNCTION_MODE;
                    DrawPart(m_hdc);
                    reset_selection_buffer();
               }
               else {                          // Solid being shown,
so RenderWare picking.
                    if(RwPickScene(m_scene,   point.x,   point.y,
m_camera, &m_pick))
                      process_hits_record(add_hit_to_list);
                    ml_last_function_chosen = NO_FUNCTION_MODE;
                    DrawPart(m_hdc);
               }
          break;

          case(ZOOM_IN_OUT_MODE):
          compute_part_bbox(part,    mi_show_3d,    md_rot_matrix,
m_part_centroid, md_part_bbox_size, &offset);
               mi_bbox_is_up_to_date = 0;
               if(mi_dynamic_rot_center_on) {
                    // User has further zoomed in.
                    compute_non_dyn_equivalent();
                    RwIdentityMatrix(md_dyn_rot_matrix);
               }
               // Now turn on dynamic rotation center if need be.
               if(    (md_part_bbox_size[0]    >
2.2*md_current_view_vol[0]) ||       // User has zoomed in so that
not all
                      (md_part_bbox_size[1]    >
2.2*md_current_view_vol[1]) ) {     // of the part is in view
volume.
                    mi_bbox_is_up_to_date = 0;    // Even though
bbox computed, we mark as not up to date so that zoom-all
                    if(! md_dyn_rot_matrix) md_dyn_rot_matrix =
RwCreateMatrix();                                       // will work
```

APPENDIX L

```
correctly.
                    if(mi_show_solid) {
                         // Pick the center of the screen to find
point on clump to rotate around.
                         if(RwPickScene(m_scene,
m_old_rect.right/2, m_old_rect.bottom/2, m_camera, &m_pick)) {
                              if(m_pick.type == rwNAPICKOBJECT)
{                      // No clump was picked.
                          m_dynamic_rot_center = BM_POINT(0.0, 0.0,
0.0);
                              }
                              else if(m_pick.type == rwPICKCLUMP)
{                 // Some clump was picked; process it.
                                   vert =
m_pick.object.clump.wcpoint;
                          m_dynamic_rot_center = BM_POINT(vert.x,
vert.y, vert.z);
                              }
                         }
                    }
                    else {
                      m_dynamic_rot_center = BM_POINT(0.0, 0.0,
0.0);
                    }
                    mi_dynamic_rot_center_on = 1;
               }

               else {
                    if(mi_dynamic_rot_center_on) {
                         compute_non_dyn_equivalent();
                         if(md_dyn_rot_matrix)
RwDestroyMatrix(md_dyn_rot_matrix);
                         md_dyn_rot_matrix = NULL;
                         mi_dynamic_rot_center_on = 0;
                    }
               }
               break;

        default: break;
      };
      ml_last_function_chosen = NO_FUNCTION_MODE;

      CBendCADView::OnLButtonUp(nFlags, point);
}
```

What is claimed:

1. A system for developing a bending plan through the use of a graphical user interface, said bending plan being adapted for use in the production of a part at a facility, said system comprising:

a bend sequence display system for generating and displaying a bend sequence input window on a display device, said bend sequence input window comprising a 2-D flat image of said part;

a tooling display system for generating and displaying tooling information on said display device, said tooling information relating to a plurality of tools;

an input device for entering a bend sequence based on said 2-D flat image of said part and for selecting tooling based on said tooling information displayed on said display device; and a bending plan storage system for storing said bending plan for said part based on said bend sequence and said tooling entered and selected by said input device;

said bend sequence display system being further adapted to generate and display a plurality of images of said part on said display device based on said bend sequence entered by said input device, each of said plurality of images relating to a representation of said part at a stage within said bend sequence, said plurality of images of said part being simultaneously displayed on said display device in a sequence corresponding to said bend sequence.

2. A system according to claim 1, wherein said 2-D flat image of said part includes representations of each bendline of said part, and wherein said input device is adapted to enter said bend sequence by selecting each said bendline displayed in said 2-D flat image of said part.

3. A system according to claim 2, wherein said input device is adapted to enter said bend sequence based on a sequence in which each said bendline is selected.

4. A system according to claim 2, wherein said input device is adapted to enter said bend sequence based on a bend sequence number entered by said input device when each said bendline is selected.

5. A system according to claim 1, wherein said input device comprises a joystick device.

6. A system according to claim 2, further comprising a bend sequence number display system for displaying, on said display device, a bend sequence number for each said bendline based on said bend sequence entered by said input device.

7. A system according to claim 2, further comprising an insert direction determination system for determining and displaying, on said display device, insert direction information for each said bendline of said part.

8. A system according to claim 7, wherein each said bendline divides said part into two sides, and wherein said insert direction determination system is adapted to determine said insert direction information for each said bendline based on the side of said part that has a smaller predetermined dimension.

9. A system according to claim 8, wherein said predetermined dimension is a length of each side that is perpendicular to said bendline.

10. A system according to claim 8, wherein said predetermined dimension is an area of each side relating to said bendline.

11. A system according to claim 7, wherein said displayed insert determination information for each said bendline comprises an arrow representing an insert direction for said bendline.

12. A system according to claim 1, further comprising a drag and drop editing system for modifying said bend sequence based on a modification of said displayed sequence of said plurality of images on said display device.

13. A system according to claim 12, wherein said drag and drop editing system is adapted to modify said displayed sequence when one of said plurality of images is selected by said input device and moved to a different position within said displayed sequence.

14. A system according to claim 12, wherein said bend sequence display system is adapted to regenerate and display said plurality of images and each said representation of said part based on said modified bend sequence.

15. A system according to claim 1, wherein said displayed tooling information comprises a plurality of tool icons displayed on said display device, each of said tool icons representing a predetermined tool.

16. A system according to claim 1, wherein said displayed tooling information comprises a table of tool data displayed on said display device, each entry within said table of tool data relating to a predetermined tool.

17. A system according to claim 1, wherein said tooling information is displayed by said tooling display system through a series of successively displayed screen displays, at least one of said successively displayed screen displays being displayed based on a previous selection by said input device.

18. A system according to claim 17, wherein said tooling information comprises at least one of tool type data, tool shape data or tool dimension data.

19. A system according to claim 18, wherein said tool type data relates to at least one of a punch, die, die holder or die rail.

20. A system according to claim 19, wherein said tooling display system is adapted to display, on said display device, a first screen display comprising a plurality of tool type icons, each of said tool type icons representing a tool type.

21. A system according to claim 20, wherein said tool type relates to at least one of a punch, die, die holder or die rail.

22. A system according to claim 20, wherein said tooling display system is adapted to display, in response to the selection of one of said tool type icons, a second screen display on said display device, said second screen display comprising a plurality of tool shape icons, each of said tool shape icons relating to said tool type icon selected by said input device.

23. A system according to claim 22, wherein said tooling display system is further adapted to display, in response to the selection of one of said tool shape icons, a table of tool dimension data on said display device, said tool dimension data relating to a plurality of tools, each of said tools relating to said tool shape icon selected by said input device.

24. A system according to claim 23, wherein at least a part of said tooling is selected and entered by said input device based on a selection of data from said table of tool dimension data.

25. A system according to claim 1, wherein said tooling information comprises tool set-up information relating to the tooling location within a bending machine for each tool to be used in said bending plan, said tooling display system being adapted to generate and display a tool set-up window on said display device for entering said tool set-up information with said input device.

26. A system according to claim 11, wherein said 2-D flat image of said part and said plurality of images of said part are simultaneously displayed on said display device.

27. A method for developing a bending plan through the use of a graphical user interface, said bending plan being adapted for use in the production of a part at a facility, said method comprising:

generating and displaying a bend sequence input window on a display device, said bend sequence input window comprising a 2-D flat image of said part;

entering, with an input device, a bend sequence based on said 2-D flat image of said part;

generating and displaying tooling information on said display device, said tooling information relating to a plurality of tools;

selecting, with said input device, tooling based on said tooling information displayed on said display device; and storing, in a storage device, said bending plan for said part based on said entered bend sequence and said selected tooling;

said method further comprising generating and displaying a plurality of images of said part on said display device based on said entered bend sequence, each of said plurality of images of said part relating to a representation of said part at a stage within said bend sequence, said generating and displaying including simultaneously displaying said plurality of images of said part on said display device in a sequence corresponding to said bend sequence.

28. A method according to claim 27, wherein said 2-D flat image of said part includes representations of each bendline of said part, said method further comprising entering said bend sequence by selecting each said bendline displayed in said 2-D flat image of said part.

29. A method according to claim 28, further comprising entering said bend sequence based on a sequence in which each said bendline is selected.

30. A method according to claim 28, further comprising entering said bend sequence based on a bend sequence number entered by said input device when each said bendline is selected.

31. A method according to claim 27, wherein said input device comprises a joystick device.

32. A method according to claim 27, further comprising displaying, on said display device, a bend sequence number for each said bendline based on said bend sequence entered by said input device.

33. A method according to claim 28, further comprising determining and displaying, on said display device, insert direction information for each said bendline of said part.

34. A method according to claim 33, wherein each said bendline divides said part into two sides, and wherein said insert direction information for each said bendline is determined based on the side of said part that has a smaller predetermined dimension.

35. A method according to claim 34, wherein said predetermined dimension is a length of each side that is perpendicular to said bendline.

36. A method according to claim 34, wherein said predetermined dimension is an area of each side relating to said bendline.

37. A method according to claim 34, wherein said displayed insert determination information for each said bendline comprises an arrow relating to an insert direction for said bendline.

38. A method according to claim 27, further comprising drag and drop editing to modify said bend sequence based on a modification of said displayed sequence of said plurality of images on said display device.

39. A method according to claim 38, further comprising modifying said displayed sequence by moving at least one of said plurality of images to a different position within said displayed sequence.

40. A method according to claim 38, further comprising regenerating and displaying said plurality of images and each said representation of said part based on said modified bend sequence.

41. A method according to claim 27, wherein said displayed tooling information comprises a plurality of tool icons displayed on said display device, each of said tool icons representing a predetermined tool.

42. A method according to claim 27, wherein said displayed tooling information comprises a table of tool data displayed on said display device, each entry within said table of tool data relating to a predetermined tool.

43. A method according to claim 27, further comprising displaying said tooling information through a series of successively displayed screen displays, at least one of said successively displayed screen displays being displayed based on a previous selection by said input device.

44. A method according to claim 43, wherein said tooling information comprises at least one of tool type data, tool shape data or tool dimension data.

45. A method according to claim 44, wherein said tool type data relates to at least one of a punch, die, die holder or die rail.

46. A method according to claim 43, further comprising displaying, on said display device, a first screen display comprising a plurality of tool type icons, each of said tool type icons representing a tool type.

47. A method according to claim 46, wherein said tool type relates to at least one of a punch, die, die holder or die rail.

48. A method according to claim 46, further comprising selecting one of said tool type icons with said input device and displaying, in response to the selection of one of said tool type icons, a second screen display on said display device, said second screen display comprising a plurality of tool shape icons, each of said tool shape icons relating to said tool type icon selected by said input device.

49. A method according to claim 48, further comprising selecting one of said tool shape icons with said input device and displaying, in response to the selection of one of said tool shape icons, a table of tool dimension data on said display device, said tool dimension data relating to a plurality of tools, each of said tools relating to said tool shape icon selected by said input device.

50. A method according to claim 49, further comprising selecting data from said table of tool dimension data in order to select and enter at least a part of said tooling of said bending plan.

51. A method according to claim 27, wherein said tooling information comprises tool set-up information relating to the tooling location within a bending machine for each tool to be used in said bending plan, said method further comprising generating and displaying a tool set-up window on said display device and selecting and entering, based on said tool set-up window, said tool set-up information with said input device.

52. A method according to claim 27, further comprising simultaneously displaying said 2-D flat image of said part and said plurality of images of said part on said display device.

53. A system for developing a bend sequence through the use of a graphical user interface, said bend sequence being adapted for use in the production of a part at a facility, said system comprising:

a bend sequence display system for generating and displaying a bend sequence input window on a display device, said bend sequence input window comprising a 2-D flat image of said part; and an input device for entering a bend sequence based on said 2-D flat image of said part;

wherein said bend sequence display system is further adapted to generate and display a plurality of images of said part based on said bend sequence entered by said input device, each of said plurality of images of said part relating to a representation of said part at a stage within said bend sequence, said plurality of images of said part being simultaneously displayed on said display device in a sequence corresponding to said bend sequence.

54. A system according to claim 53, further comprising a bending sequence storage system for storing said bending sequence for said part based on said bend sequence entered by said input device.

55. A system according to claim 53, wherein said 2-D flat image of said part includes representations of each bendline of said part, said bend sequence being entered by said input device by selecting each said bendline displayed in said 2-D flat image of said part.

56. A system according to claim 55, wherein said input device is adapted to enter said bend sequence based on a sequence in which each said bendline is selected.

57. A system according to claim 55, wherein said input device is adapted to enter said bend sequence based on a bend sequence number entered by said input device when each said bendline is selected.

58. A system according to claim 53, wherein said input device comprises a joystick device.

59. A system according to claim 55, further comprising a bend sequence number display system for displaying, on said display device, a bend sequence number for each said bendline based on said bend sequence entered by said input device.

60. A system according to claim 55, further comprising an insert direction determination system for determining and displaying, on said display device, insert direction information for each said bendline of said part.

61. A system according to claim 60, wherein each said bendline divides said part into two sides, and wherein said insert direction determination system determines said insert direction information for each said bendline based on the side that has a smaller predetermined dimension.

62. A system according to claim 60, wherein said displayed insert determination information for each said bendline comprises an arrow relating to an insert direction for said bendline.

63. A system according to claim 53, further comprising a drag and drop editing system for modifying said bend sequence based on a modification of said displayed sequence of said plurality of images on said display device.

64. A system according to claim 63, wherein said drag and drop editing system comprises means for modifying said displayed sequence when one of said plurality of images is selected by said input device and moved to a different position within said displayed sequence.

65. A system according to claim 63, wherein said bend sequence display system comprises means for regenerating and displaying said plurality of images and each said representation of said part based on said modified bend sequence.

66. A system according to claim 53, wherein said 2-D flat image of said part and said plurality of images of said part are simultaneously displayed on said display device.

67. A method for developing a bend sequence through the use of a graphical user interface, said bend sequence being adapted for use in the production of a part at a facility, said method comprising the steps of:

generating and displaying a bend sequence input window on a display device, said bend sequence input window comprising a 2-D flat image of said part;

entering, through an input device, a bend sequence based on said 2-D flat image of said part; and generating and displaying a plurality of images of said part based on said bend sequence entered by said input device, each of said plurality of images of said part relating to a representation of said part at a stage within said bend sequence, said method further comprising simultaneously displaying said plurality of images of said part on said display device in a sequence corresponding to said bend sequence.

68. A method according to claim 67, further comprising storing, in a database, said bending sequence for said part based on said bend sequence entered by said input device.

69. A method according to claim 67, further comprising drag and drop editing for modifying said bend sequence based on a modification of said displayed sequence of said plurality of images by said input device.

70. A method according to claim 69, wherein said drag and drop editing comprises modifying said displayed sequence by moving at least one of said plurality of images to a different position within said displayed sequence.

71. A method according to claim 69, further comprising regenerating and displaying said plurality of images and each said representation of said part based on said modified bend sequence.

72. A method according to claim 67, wherein said 2-D flat image of said part includes representations of each bendline of said part, said method further comprising entering said bend sequence with said input device by selecting each said bendline displayed in said 2-D flat image of said part.

73. A method according to claim 72, further comprising entering said bend sequence with said input device based on a sequence in which each said bendline is selected.

74. A method according to claim 72, further comprising entering said bend sequence with said input device based on a bend sequence number entered by said input device when each said bendline is selected.

75. A method according to claim 67, wherein said input device comprises a joystick device.

76. A method according to claim 72, further comprising displaying, on said display device, a bend sequence number for each said bendline based on said bend sequence entered by said input device.

77. A method according to claim 72, further comprising determining and displaying, on said display device, insert direction information for each said bendline of said part.

78. A method according to claim 77, wherein said bendline divides said part into two sides, and wherein said insert direction information for each said bendline is determined based on the side of said part that has a smaller predetermined dimension.

79. A method according to claim 77, wherein said displayed insert determination information for each said bendline comprises an arrow relating to an insert direction for said bendline.

80. A method according to claim 67, further comprising simultaneously displaying said 2-D flat image of said part and said plurality of images of said part on said display device.

81. A system for developing tooling for a part through the use of a graphical user interface, said tooling being adapted for use in the production of said part at a facility, said system comprising:

a tooling display system for generating and displaying tooling information on said display device, said tooling information being displayed through a series of successively displayed screen displays; and an input device for selecting tooling based on said tooling information displayed on said display device;

said tooling display system being adapted to display, on said display device, a first screen display comprising a plurality of tool type icons, each of said tool type icons representing a tool type, and said tooling display system being further adapted to display, in response to the selection of one of said tool type icons, a second screen display on said display device, said second screen display comprising a plurality of tool shape icons.

82. A system according to claim 81, wherein at least one of said successively displayed screen displays is displayed based on a previous selection by said input device.

83. A system according to claim 81, said displayed tooling information relating to a plurality of tools.

84. A system according to claim 81, wherein said displayed tooling information comprises a plurality of tool icons displayed on said display device, each of said tool icons representing a predetermined tool.

85. A system according to claim 81, wherein said displayed tooling information comprises a table of tool data displayed on said display device, each entry within said table of tool data relating to a predetermined tool.

86. A system according to claim 85, wherein said tooling information comprises at least one of tool type data, tool shape data or tool dimension data.

87. A system according to claim 86, wherein said tool type data relates to at least one of a punch, die, die holder or die rail.

88. A system according to claim 81, wherein said tool type relates to at least one of a punch, die, die holder or die rail.

89. A system according to claim 81, wherein each of said tool shape icons relate to said tool type icon selected by said input device.

90. A system according to claim 89, wherein said tooling display system is further adapted to display, in response to the selection of one of said tool shape icons, a table of tool dimension data on said display device, said tool dimension data relating to a plurality of tools, each of said tools relating to said tool shape icon selected by said input device.

91. A system according to claim 90, wherein at least a part of said tooling is adapted to be selected and entered by said input device based on a selection of data from said table of tool dimension data.

92. A system according to claim 81, wherein said tooling information comprises tool set-up information relating to the tooling location within a bending machine for each tool to be used in said bending plan, said tooling display system comprising means for generating and displaying a tool set-up window on said display device and for entering said tool set-up information with said input device.

93. A system according to claim 81, wherein said input device comprises a joystick device, said joystick device being controlled by an operator.

94. A system according to claim 92, said tool set-up window comprising a representation of a profile of at least one of said tools and a representation of the tooling location of said tool in said bending machine.

95. A method for developing tooling for a part through the use of a graphical user interface, said tooling being adapted for use in the production of said part at a facility, said method comprising the steps of:

generating and displaying tooling information on said display device, said tooling information being displayed on a series of successively displayed screen displays; and selecting, with an input device, tooling based on said tooling information displayed on said display device;

said method further comprising displaying, on said display device, a first screen display comprising a plurality of tool type icons, each of said tool type icons relating to a tool type, selecting one of said tool type icons with said input device, and displaying, in response to the selection of one of said tool type icons, a second screen display on said display device, said second screen display comprising a plurality of tool shape icons.

96. A method according to claim 95, further comprising displaying at least one of said successively displayed screen displays based in part on a previous selection made by said input device.

97. A method according to claim 95, wherein said displayed tooling information relates to a plurality of tools.

98. A method according to claim 95, wherein said displayed tooling information comprises a plurality of tool icons displayed on said display device, each of said tool icons relating to a predetermined tool.

99. A method according to claim 95, wherein said displayed tooling information comprises a table of tool data displayed on said display device, each entry within said table of tool data relating to a predetermined tool.

100. A method according to claim 95, wherein said tooling information comprises at least one of tool type data, tool shape data or tool dimension data.

101. A method according to claim 100 wherein said tool type data relates to at least one of a punch, die, die holder or die rail.

102. A method according to claim 95, wherein said tool type relates to at least one of a punch, die, die holder or die rail.

103. A method according to claim 95, further comprising selecting each of said tool shape icons relating to said tool type icon with said input device.

104. A method according to claim 103, further comprising selecting one of said tool shape icons with said input device and displaying, in response to the selection of one of said tool shape icons, a table of tool dimension data on said display device, said tool dimension data relating to a plurality of tools, each of said tools relating to said tool shape icon selected by said input device.

105. A method according to claim 104, further comprising selecting data from said table of tool dimension data to select and enter at least a part of said tooling of said bending plan.

106. A method according to claim 95, wherein said tooling information comprises tool set-up information relating to the tooling location within a bending machine for each tool to be used in said bending plan, said method further comprising generating and displaying a tool set-up window on said display device and selecting and entering, based on said tool set-up window, said tool set-up information with said input device.

107. A method according to claim 95, wherein said input device comprises a joystick device, said joystick device being controlled by an operator.

* * * * *